US012033646B2

(12) United States Patent
Schnell et al.

(10) Patent No.: US 12,033,646 B2
(45) Date of Patent: Jul. 9, 2024

(54) ANALYSIS/SYNTHESIS WINDOWING FUNCTION FOR MODULATED LAPPED TRANSFORMATION

(71) Applicant: Fraunhofer-Gesellschaft zur Förderung der angewandten Forschung e.V., Munich (DE)

(72) Inventors: Markus Schnell, Erlangen (DE); Manfred Lutzky, Erlangen (DE); Alexander Tschekalinskij, Erlangen (DE); Ralf Geiger, Erlangen (DE)

(73) Assignee: Fraunhofer-Gesellschaft zur Förderung der angewandten Forschung e.V., Munich (DE)

( * ) Notice: Subject to any disclaimer, the term of this patent is extended or adjusted under 35 U.S.C. 154(b) by 0 days.

(21) Appl. No.: 16/869,022

(22) Filed: May 7, 2020

(65) Prior Publication Data

US 2020/0272685 A1 Aug. 27, 2020

Related U.S. Application Data

(63) Continuation of application No. PCT/EP2018/080532, filed on Nov. 8, 2018.

(30) Foreign Application Priority Data

Nov. 10, 2017 (EP) .................................... 17201086

(51) Int. Cl.
*G06F 17/14* (2006.01)
*G06F 17/12* (2006.01)
(Continued)

(52) U.S. Cl.
CPC ............ *G10L 19/022* (2013.01); *G06F 17/12* (2013.01); *G06F 17/14* (2013.01); *G06F 17/142* (2013.01); *G06F 17/147* (2013.01); *G10L 25/45* (2013.01)

(58) Field of Classification Search
CPC ...... G06F 17/12; G06F 17/142; G06F 17/147; G06F 17/14; G10L 25/45; G10L 19/00; G10L 19/022
See application file for complete search history.

(56) References Cited

U.S. PATENT DOCUMENTS 4,972,484 A 11/1990 Link et al.
5,012,517 A 4/1991 Chhatwal et al.
(Continued)

FOREIGN PATENT DOCUMENTS

CN 1218339 A 6/1999
CN 1441950 A 9/2003
(Continued)

OTHER PUBLICATIONS

Sayood, Khalid., Introduction to Data Compression, Elsevier Science & Technology, 2005, section 16.4, figure 16.13, p. 529, (Year: 2005).*

(Continued)

*Primary Examiner* — Jyoti Mehta
*Assistant Examiner* — Huy Duong
(74) *Attorney, Agent, or Firm* — NKL LAW; Jae Youn Kim

(57) ABSTRACT

There are provided methods and apparatus for performing modified cosine transformation (MDCT) with an analysis/synthesis windowing function, using an analysis windowing function having a meandering portion which passes a linear function in correspondence of at least four points.

32 Claims, 32 Drawing Sheets

(51) Int. Cl.
*G10L 19/022* (2013.01)
*G10L 25/45* (2013.01)

(56) References Cited

U.S. PATENT DOCUMENTS 5,581,653 A 12/1996 Todd
5,651,091 A 7/1997 Chen et al.
5,781,888 A 7/1998 Herre
5,812,971 A 9/1998 Herre
5,819,209 A 10/1998 Inoue
5,822,723 A 10/1998 Kim et al.
5,909,663 A 6/1999 Iijima et al.
5,999,899 A 12/1999 Robinson
6,018,706 A 1/2000 Huang et al.
6,148,288 A 11/2000 Park
6,167,093 A * 12/2000 Tsutsui .................. G06F 17/147 375/242
6,349,284 B1 2/2002 Park et al.
6,452,627 B1 9/2002 Hamaguri et al.
6,507,814 B1 1/2003 Gao
6,570,991 B1 5/2003 Scheirer et al.
6,636,829 B1 10/2003 Benyassine et al.
6,665,638 B1 12/2003 Kang et al.
6,735,561 B1 5/2004 Johnston et al.
6,931,373 B1 8/2005 Bhaskar et al.
7,009,533 B1 3/2006 Wegener
7,302,396 B1 11/2007 Cooke
7,353,168 B2 4/2008 Chen et al.
7,395,209 B1 7/2008 Dokic et al.
7,539,612 B2 5/2009 Chen et al.
7,546,240 B2 6/2009 Chen et al.
7,548,790 B1 6/2009 Johnston et al.
8,015,000 B2 9/2011 Chen et al.
8,095,359 B2 1/2012 Boehm et al.
8,280,538 B2 10/2012 Kim et al.
8,473,301 B2 6/2013 Chen et al.
8,543,389 B2 9/2013 Ragot et al.
8,554,549 B2 * 10/2013 Oshikiri .................. G10L 19/00 704/223
8,612,240 B2 12/2013 Fuchs et al.
8,682,681 B2 3/2014 Fuchs et al.
8,738,385 B2 5/2014 Chen
8,751,246 B2 6/2014 Bayer et al.
8,847,795 B2 9/2014 Faure et al.
8,891,775 B2 11/2014 Mundt et al.
8,898,068 B2 11/2014 Fuchs et al.
9,026,451 B1 5/2015 Kleijn et al.
9,123,350 B2 9/2015 Zhao et al.
9,489,961 B2 11/2016 Kovesi et al.
9,595,262 B2 3/2017 Fuchs et al.
10,296,959 B1 5/2019 Chernikhova et al.
10,726,854 B2 7/2020 Ghido et al.
2001/0026327 A1 10/2001 Schreiber et al.
2002/0035470 A1 3/2002 Gao
2003/0088408 A1 5/2003 Thyssen et al.
2003/0101050 A1 5/2003 Cuperman et al.
2004/0158462 A1 8/2004 Rutledge et al.
2004/0162866 A1 8/2004 Malvar et al.
2004/0184537 A1 9/2004 Geiger et al.
2005/0010395 A1 1/2005 Chiu et al.
2005/0015249 A1 1/2005 Chen et al.
2005/0192799 A1 9/2005 Kim et al.
2005/0246178 A1 11/2005 Fejzo
2006/0143002 A1 6/2006 Ojanpera
2006/0288851 A1 12/2006 Esima et al.
2007/0033056 A1 2/2007 Herre et al.
2007/0063877 A1 3/2007 Shmunk et al.
2007/0078646 A1 4/2007 Lei et al.
2007/0118361 A1 5/2007 Sinha et al.
2007/0118369 A1 5/2007 Chen
2007/0124136 A1 5/2007 Den Brinker et al.
2007/0127729 A1 6/2007 Breebaart et al.
2007/0129940 A1 6/2007 Geyersberger et al.
2007/0154031 A1 7/2007 Avendano et al.
2007/0276656 A1 11/2007 Solbach et al.
2008/0004869 A1 1/2008 Herre et al.
2008/0033718 A1 2/2008 Zopf et al.
2008/0091418 A1 4/2008 Laaksonen et al.
2008/0126086 A1 5/2008 Kandhadai et al.
2008/0126096 A1 5/2008 Choo et al.
2009/0076805 A1 3/2009 Du et al.
2009/0076830 A1 3/2009 Taleb
2009/0089050 A1 4/2009 Mo et al.
2009/0138267 A1 5/2009 Davidson et al.
2009/0248424 A1 10/2009 Koishida et al.
2009/0254352 A1 10/2009 Zhao
2009/0315748 A1 12/2009 Liljeryd et al.
2010/0010810 A1 1/2010 Morii
2010/0070270 A1 3/2010 Gao
2010/0094637 A1 4/2010 Vinton
2010/0094642 A1 4/2010 Zhan et al.
2010/0115370 A1 5/2010 Ramo et al.
2010/0198588 A1 8/2010 Sudo et al.
2010/0204998 A1 8/2010 Villemoes
2010/0223061 A1 9/2010 Ojanpera
2010/0286990 A1 11/2010 Biswas et al.
2010/0312552 A1 12/2010 Kandhadai et al.
2010/0312553 A1 12/2010 Fang et al.
2010/0324912 A1 12/2010 Choo et al.
2011/0015768 A1 1/2011 Kim et al.
2011/0022924 A1 1/2011 Malenovsky et al.
2011/0035212 A1 2/2011 Briand et al.
2011/0060597 A1 3/2011 Chen et al.
2011/0071839 A1 3/2011 Budnikov et al.
2011/0095920 A1 4/2011 Ashley et al.
2011/0096830 A1 4/2011 Ashley et al.
2011/0116542 A1 5/2011 Antonini et al.
2011/0125505 A1 5/2011 Gournay et al.
2011/0145003 A1 6/2011 Bessette
2011/0173009 A1 7/2011 Fuchs et al.
2011/0178795 A1 7/2011 Bayer et al.
2011/0196673 A1 8/2011 Park et al.
2011/0200198 A1 8/2011 Bayer et al.
2011/0218797 A1 9/2011 Mittal et al.
2011/0218799 A1 9/2011 Mittal et al.
2011/0238425 A1 9/2011 Lecomte et al.
2011/0238426 A1 9/2011 Borsum et al.
2012/0010879 A1 1/2012 Kikuiri et al.
2012/0020406 A1 1/2012 Choo et al.
2012/0022881 A1 1/2012 Geiger et al.
2012/0072209 A1 3/2012 Krishnan et al.
2012/0109659 A1 5/2012 Chen et al.
2012/0214544 A1 8/2012 Rodriguez et al.
2012/0221325 A1 8/2012 Choo et al.
2012/0245947 A1 9/2012 Neuendorf et al.
2012/0265540 A1 10/2012 Fuchs et al.
2012/0265541 A1 * 10/2012 Geiger ................ G10L 19/0212 704/500
2013/0030819 A1 1/2013 Carlsson et al.
2013/0096912 A1 4/2013 Resch et al.
2013/0218579 A1 8/2013 Villemoes
2013/0226594 A1 8/2013 Fuchs et al.
2013/0246054 A1 9/2013 Jeong et al.
2013/0282369 A1 10/2013 Ryu et al.
2014/0052439 A1 2/2014 Nanjundaswamy et al.
2014/0067404 A1 3/2014 Baumgarte
2014/0074486 A1 3/2014 Dietz et al.
2014/0108020 A1 4/2014 Bai et al.
2014/0139362 A1 5/2014 Faure et al.
2014/0142957 A1 5/2014 Lee et al.
2014/0172141 A1 6/2014 Mangold
2014/0223029 A1 8/2014 Bhaskar et al.
2014/0303965 A1 10/2014 Lee et al.
2014/0358531 A1 12/2014 Vos
2015/0010155 A1 1/2015 Lang et al.
2015/0066488 A1 3/2015 Bayer et al.
2015/0081312 A1 3/2015 Fuchs et al.
2015/0142452 A1 5/2015 Lee et al.
2015/0154969 A1 6/2015 Craven et al.
2015/0170668 A1 6/2015 Kovesi et al.
2015/0221311 A1 8/2015 Jeon et al.
2015/0228287 A1 8/2015 Bruhn et al.
2015/0255079 A1 9/2015 Huang et al.
2015/0287417 A1 10/2015 Disch et al.

(56) References Cited

U.S. PATENT DOCUMENTS

| | | | |
|---|---|---|---|
| 2015/0302859 | A1 | 10/2015 | Aguilar et al. |
| 2015/0302861 | A1 | 10/2015 | Salami et al. |
| 2015/0325246 | A1 | 11/2015 | Chen et al. |
| 2015/0332689 | A1 | 11/2015 | Disch et al. |
| 2015/0348546 | A1 | 12/2015 | Sun et al. |
| 2015/0371647 | A1 | 12/2015 | Faure et al. |
| 2016/0019898 | A1 | 1/2016 | Schreiner et al. |
| 2016/0027450 | A1 | 1/2016 | Gao |
| 2016/0050420 | A1 | 2/2016 | Helmrich et al. |
| 2016/0078878 | A1 | 3/2016 | Ravelli et al. |
| 2016/0104487 | A1 | 4/2016 | Schnabel et al. |
| 2016/0111094 | A1 | 4/2016 | Dietz et al. |
| 2016/0163326 | A1 | 6/2016 | Resch et al. |
| 2016/0189721 | A1 | 6/2016 | Johnston et al. |
| 2016/0225384 | A1 | 8/2016 | Kjörling et al. |
| 2016/0247506 | A1 | 8/2016 | Lecomte et al. |
| 2016/0285718 | A1 | 9/2016 | Bruhn |
| 2016/0293174 | A1 | 10/2016 | Atti et al. |
| 2016/0293175 | A1 | 10/2016 | Atti et al. |
| 2016/0307576 | A1 | 10/2016 | Doehla et al. |
| 2016/0365097 | A1 | 12/2016 | Guan et al. |
| 2016/0372125 | A1 | 12/2016 | Atti et al. |
| 2016/0372126 | A1 | 12/2016 | Atti et al. |
| 2016/0379655 | A1 | 12/2016 | Truman et al. |
| 2017/0011747 | A1 | 1/2017 | Faure et al. |
| 2017/0053658 | A1 | 2/2017 | Atti et al. |
| 2017/0078794 | A1 | 3/2017 | Bongiovi et al. |
| 2017/0103769 | A1 | 4/2017 | Laaksonen et al. |
| 2017/0103774 | A1 | 4/2017 | Sorensen |
| 2017/0110135 | A1 | 4/2017 | Disch et al. |
| 2017/0133029 | A1 | 5/2017 | Markovic et al. |
| 2017/0140768 | A1 | 5/2017 | Fuchs et al. |
| 2017/0140769 | A1 | 5/2017 | Ravelli et al. |
| 2017/0154631 | A1 | 6/2017 | Bayer et al. |
| 2017/0154635 | A1 | 6/2017 | Doehla et al. |
| 2017/0221495 | A1 | 8/2017 | Sung et al. |
| 2017/0236521 | A1 | 8/2017 | Atti et al. |
| 2017/0249387 | A1 | 8/2017 | Hatami-Hanza |
| 2017/0256266 | A1 | 9/2017 | Sung et al. |
| 2017/0294196 | A1 | 10/2017 | Bradley et al. |
| 2017/0303114 | A1 | 10/2017 | Johansson et al. |
| 2019/0027156 | A1 | 1/2019 | Sung et al. |

FOREIGN PATENT DOCUMENTS

| | | | |
|---|---|---|---|
| CN | 1532808 | A | 9/2004 |
| CN | 1625768 | A | 6/2005 |
| CN | 1675683 | A | 9/2005 |
| CN | 1681213 | A | 10/2005 |
| CN | 1838238 | A | 9/2006 |
| CN | 1926608 | A | 3/2007 |
| CN | 101140759 | A | 3/2008 |
| CN | 101199121 | A | 6/2008 |
| CN | 101308658 | A | 11/2008 |
| CN | 101351840 | A | 1/2009 |
| CN | 101501759 | A | 8/2009 |
| CN | 101939781 | A | 1/2011 |
| CN | 102089812 | A | 6/2011 |
| CN | 102150201 | A | 8/2011 |
| CN | 102460975 | A | 5/2012 |
| CN | 102592602 | A | 7/2012 |
| CN | 102779526 | A | 11/2012 |
| CN | 102834862 | A | 12/2012 |
| CN | 102834863 | A | 12/2012 |
| CN | 103000177 | A | 3/2013 |
| CN | 103000178 | A | 3/2013 |
| CN | 103000186 | A | 3/2013 |
| CN | 103077722 | A | 5/2013 |
| CN | 103119646 | A | 5/2013 |
| CN | 103229235 | A | 7/2013 |
| CN | 103886863 | A | 6/2014 |
| CN | 104025189 | A | 9/2014 |
| CN | 105074819 | A | 11/2015 |
| CN | 105190749 | A | 12/2015 |
| CN | 105378835 | A | 3/2016 |
| CN | 105431903 | A | 3/2016 |
| CN | 106575509 | A | 4/2017 |
| CN | 106663444 | A | 5/2017 |
| CN | 107077854 | A | 8/2017 |
| CN | 107103908 | A | 8/2017 |
| EP | 0376553 | A2 | 7/1990 |
| EP | 0716787 | A1 | 6/1996 |
| EP | 0732687 | B2 | 9/1996 |
| EP | 0801790 | A1 | 10/1997 |
| EP | 1569203 | A2 | 8/2005 |
| EP | 1791115 | A2 | 5/2007 |
| EP | 2392003 | A1 | 12/2011 |
| EP | 2676266 | B1 | 12/2013 |
| EP | 2980796 | A1 | 2/2016 |
| EP | 2980799 | A1 | 2/2016 |
| EP | 3111624 | A1 | 1/2017 |
| FR | 2944664 | A1 | 10/2010 |
| JP | H05-281996 | A | 10/1993 |
| JP | H07-28499 | A | 1/1995 |
| JP | H0811644 | A | 1/1996 |
| JP | H9-204197 | A | 8/1997 |
| JP | H10-51313 | A | 2/1998 |
| JP | H1091194 | A | 4/1998 |
| JP | H11-330977 | A | 11/1999 |
| JP | 2004-138756 | A | 5/2004 |
| JP | 2006-527864 | A | 12/2006 |
| JP | 2007519014 | A | 7/2007 |
| JP | 2007-525718 | A | 9/2007 |
| JP | 2009-003387 | A | 1/2009 |
| JP | 2009-008836 | A | 1/2009 |
| JP | 2009-538460 | A | 11/2009 |
| JP | 2010-500631 | A | 1/2010 |
| JP | 2010-501955 | A | 1/2010 |
| JP | 2012-533094 | A | 12/2012 |
| JP | 2016-523380 | A | 8/2016 |
| JP | 2016-200750 | A | 12/2016 |
| JP | 2017-522604 | A | 8/2017 |
| JP | 2017-528752 | A | 9/2017 |
| KR | 970019119 | A | 4/1997 |
| KR | 100261253 | B1 | 7/2000 |
| KR | 20030031936 | A | 4/2003 |
| KR | 20040086879 | A | 10/2004 |
| KR | 1020050007853 | A | 1/2005 |
| KR | 1020090077951 | A | 7/2009 |
| KR | 10-2010-0136890 | A | 12/2010 |
| KR | 1020100136899 | A | 12/2010 |
| KR | 20130019004 | A | 2/2013 |
| KR | 1020130054993 | A | 5/2013 |
| KR | 1020160144978 | A | 12/2016 |
| KR | 20170000933 | A | 1/2017 |
| RU | 2337414 | C2 | 10/2008 |
| RU | 2376657 | C2 | 12/2009 |
| RU | 2413312 | C2 | 2/2011 |
| RU | 2419891 | C2 | 5/2011 |
| RU | 2439718 | C1 | 1/2012 |
| RU | 2483365 | C2 | 5/2013 |
| RU | 2520402 | C2 | 6/2014 |
| RU | 2568381 | C2 | 11/2015 |
| RU | 2596594 | C2 | 9/2016 |
| RU | 2596596 | C2 | 9/2016 |
| RU | 2015136540 | A | 3/2017 |
| RU | 2628162 | C2 | 8/2017 |
| RU | 2016105619 | A | 8/2017 |
| TW | 200809770 | A | 2/2008 |
| TW | 201005730 | A | 2/2010 |
| TW | 201126510 | A | 8/2011 |
| TW | 201131550 | A | 9/2011 |
| TW | 201207839 | A | 2/2012 |
| TW | 201243832 | A | 11/2012 |
| TW | 201612896 | A | 4/2016 |
| TW | 201618080 | A | 5/2016 |
| TW | 201618086 | A | 5/2016 |
| TW | 201642246 | A | 12/2016 |
| TW | 201642247 | A | 12/2016 |
| TW | 201705126 | A | 2/2017 |
| TW | 201711021 | A | 3/2017 |
| TW | 201713061 | A | 4/2017 |
| TW | 201724085 | A | 7/2017 |
| TW | 201732779 | A | 9/2017 |

(56) References Cited

FOREIGN PATENT DOCUMENTS

| | | | |
|---|---|---|---|
| WO | 9621220 | A1 | 7/1996 |
| WO | 9916050 | A1 | 4/1999 |
| WO | 03088212 | A1 | 10/2003 |
| WO | 2004/072951 | A1 | 8/2004 |
| WO | 2004114134 | A1 | 12/2004 |
| WO | 2005/086138 | A1 | 9/2005 |
| WO | 2005/086139 | A1 | 9/2005 |
| WO | 2007/073604 | A1 | 7/2007 |
| WO | 2007/138511 | A1 | 12/2007 |
| WO | 2008/025918 | A1 | 3/2008 |
| WO | 2008/046505 | A1 | 4/2008 |
| WO | 2008072701 | A1 | 6/2008 |
| WO | 2009/066869 | A1 | 5/2009 |
| WO | 2009089700 | A1 | 7/2009 |
| WO | 2010086020 | A1 | 8/2010 |
| WO | 2011/048118 | A1 | 4/2011 |
| WO | 2011/086066 | A1 | 7/2011 |
| WO | 2011/086067 | A1 | 7/2011 |
| WO | 2012/000882 | A | 1/2012 |
| WO | 2012/000882 | A1 | 1/2012 |
| WO | 2012/126893 | A | 9/2012 |
| WO | 2013090207 | A1 | 6/2013 |
| WO | 2014/165668 | A | 10/2014 |
| WO | 2014/202535 | A | 12/2014 |
| WO | 2014/202535 | A1 | 12/2014 |
| WO | 2015010949 | A1 | 1/2015 |
| WO | 2015/063045 | A1 | 5/2015 |
| WO | 2015/063227 | A1 | 5/2015 |
| WO | 2015/071173 | A1 | 5/2015 |
| WO | 2015063044 | A1 | 5/2015 |
| WO | 2015/174911 | A1 | 11/2015 |
| WO | 2016/016121 | A1 | 2/2016 |
| WO | 2016/142002 | A1 | 9/2016 |
| WO | 2016/142337 | A1 | 9/2016 |
| WO | 2018159094 | A1 | 9/2018 |

OTHER PUBLICATIONS

Patterson et al., Computer Organization and Design, The hardware/software interface, Revised Fourth Edition, Elsevier, 2012 (Year: 2012) (Year: 2012).*

Sayood, Khalid. Introduction to Data Compression, Elsevier Science & Technology, 2005. ProQuest Ebook Central, https://ebookcentral.proquest.com/lib/uspto-ebooks/detail.action?docID=333990 (Year: 2005).*

Tetsuyuki Okumachi, "Office Action for JP Application 2020-118837", dated Jul. 16, 2021, JPO, Japan.

Tetsuyuki Okumachi, "Office Action for JP Application 2020-118838", dated Jul. 16, 2021, JPO, Japan.

Tomonori Kikuchi, "Office Action for JP Application No. 2020-524874", dated Jun. 2, 2021, JPO Japan.

Rospatent Examiner, "Decision on Grant Patent for Invention for RU Application No. 2020118949", dated Nov. 11, 2020, Rospatent, Russia.

Sujoy Sarkar, "Examination Report for IN Application No. 202037018091", dated Jun. 1, 2021, Intellectual Property India, India.

P.A. Volkov, "Office Action for RU Application No. 2020120251", dated Oct. 28, 2020, Rospatent, Russia.

P.A. Volkov, "Office Action for RU Application No. 2020120256", dated Oct. 28, 2020, Rospatent, Russia.

D.V.Travnikov, "Decision on Grant for RU Application No. 2020118969", dated Nov. 2, 2020, Rospatent, Russia.

Guojun Lu et al., "A Technique towards Automatic Audio Classification and Retrieval, Forth International Conference on Signal Processing", 1998, IEEE, Oct. 12, 1998, pp. 1142 to 1145.

Hiroshi Ono, "Office Action for JP Application No. 2020-526135", dated May 21, 2021, JPO Japan.

Mao Xiaohong, "Examination Report for SG Application No. 11202004228V", dated Sep. 2, 2021, IPOS, Singapore.

Mao Xiaohong, "Search Report for SG Application No. 11202004228V", dated Sep. 3, 2021, IPOS, Singapore.

Nam Sook Lee, "Office Action for KR Application No. 10-2020-7015512", dated Sep. 9, 2021, KIPO, Republic of Korea.

ETSI TS 126 445 V13.2.0 (Aug. 2016), Universal Mobile Telecommunications System (UMTS); LTE; Codec for Enhanced Voice Services (EVS); Detailed algorithmic description (3GPP TS 26.445 version 13.2.0 Release 13) [Online]. Available: http://www.3gpp.org/ftp/Specs/archive/26_series/26.445/26445-d00.zip.

Geiger, "Audio Coding based on integer transform", Ilmenau: https://www.db-thueringen.de/receive/dbt_mods_00010054, 2004.

Henrique S Malvar, "Biorthogonal and Nonuniform Lapped Transforms for Transform Coding with Reduced Blocking and Ringing Artifacts", IEEE Transactions on Signal Processing, IEEE Service Center, New York, NY, US, (Apr. 1998), vol. 46, No. 4, ISSN 1053-587X, XP011058114.

Anonymous, "ISO/IEC 14496-3:2005/FDAM 9, AAC-ELD", 82. MPEG Meeting;Oct. 22, 2007-Oct. 26, 2007; Shenzhen; (Motion Picture Expert Group or ISO/IEC JTC1/SC29/WG11),, (Feb. 21, 2008), No. N9499, XP030015994.

Virette, "Low Delay Transform for High Quality Low Delay Audio Coding", Université de Rennes 1, (Dec. 10, 2012), pp. 1-195, URL: https://hal.inria.fr/tel-01205574/document, (Mar. 30, 2016), XP055261425.

ISO/IEC 14496-3:2001; Information technology—Coding of audio-visual objects—Part 3: Audio.

3GPP TS 26.403 v14.0.0 (Mar. 2017); General audio codec audio processing functions; Enhanced acPlus general audio codec; Encoder specification; Advanced Audio Coding (AAC) part; (Release 14).

ISO/IEC 23003-3; Information technology—MPEG audio technologies—Part 3: Unified speech and audio coding, 2011.

3GPP TS 26.445 V14.1.0 (Jun. 2017), 3rd Generation Partnership Project; Technical Specification Group Services and System Aspects; Codec for Enhanced Voice Services (EVS); Detailed Algorithmic Description (Release 14), http://www.3gpp.org/ftp//Specs/archive/26_series/26.445/26445-e10.zip, Section 5.1.6 "Bandwidth detection".

Eksler Vaclav et al, "Audio bandwidth detection in the EVS codec", 2015 IEEE Global Conference on Signal and Information Processing (Globalsip), IEEE, (Dec. 14, 2015), doi:10.1109/GLOBALSIP.2015.7418243, pp. 488-492, XP032871707.

Oger M et al, "Transform Audio Coding with Arithmetic-Coded Scalar Quantization and Model-Based Bit Allocation", International Conference on Acoustics, Speech, and Signalprocessing, IEEE, XX, Apr. 15, 2007 (Apr. 15, 2007), p. IV-545, XP002464925.

Asad et al., "An enhanced least significant bit modification technique for audio steganography", International Conference on Computer Networks and Information Technology, Jul. 11-13, 2011.

Makandar et al, "Least Significant Bit Coding Analysis for Audio Steganography", Journal of Future Generation Computing, vol. 2, No. 3, Mar. 2018.

ISO/IEC 23008-3:2015; Information technology—High efficiency coding and media delivery in heterogeneous environments—Part 3: 3D audio.

ITU-T G.718 (Jun. 2008): Series G: Transmission Systems and Media, Digital Systems and Networks, Digital terminal equipments—Coding of voice and audio signals, Frame error robust narrow-band and wideband embedded variable bit-rate coding of speech and audio from 8-32 kbit/s.

3GPP TS 26.447 V14.1.0 (Jun. 2017), Technical Specification, 3rd Generation Partnership Project; Technical Specification Group Services and System Aspects; Codec for Enhanced Voice Services (EVS); Error Concealment of Lost Packets (Release 14).

DVB Organization, "ISO-IEC_23008-3_A3_(E)_(H 3DA FDAM3).docx", DVB, Digital Video Broadcasting, C/O EBU—17A Ancienne Route—CH-1218 Grand Saconnex, Geneva—Switzerland, (Jun. 13, 2016), XP017851888.

Hill et al., "Exponential stability of time-varying linear systems," IMA J Numer Anal, pp. 865-885, 2011.

3GPP TS 26.090 V14.0.0 (Mar. 2017), 3rd Generation Partnership Project; Technical Specification Group Services and System Aspects;

(56) References Cited

OTHER PUBLICATIONS

Mandatory Speech Codec speech processing functions; Adaptive Multi-Rate (AMR) speech codec; Transcoding functions (Release 14).
3GPP TS 26.190 V14.0.0 (Mar. 2017), Technical Specification, 3rd Generation Partnership Project; Technical Specification Group Services and System Aspects; Speech codec speech processing functions; Adaptive Multi-Rate—Wideband (AMR-WB) speech codec; Transcoding functions (Release 14).
3GPP TS 26.290 V14.0.0 (Mar. 2017), Technical Specification, 3rd Generation Partnership Project; Technical Specification Group Services and System Aspects; Audio codec processing functions; Extended Adaptive Multi-Rate—Wideband (AMR-WB+) codec; Transcoding functions (Release 14).
Edler et al., "Perceptual Audio Coding Using a Time-Varying Linear Pre- and Post-Filter," in AES 109th Convention, Los Angeles, 2000.
Gray et al., "Digital lattice and ladder filter synthesis," IEEE Transactions on Audio and Electroacoustics, vol. vol. 21, No. No. 6, pp. 491-500, 1973.
Lamoureux et al., "Stability of time variant filters," CREWES Research Report—vol. 19, 2007.
Herre et al., "Enhancing the performance of perceptual audio coders by using temporal noise shaping (TNS)." Audio Engineering Society Convention 101. Audio Engineering Society, 1996.
Herre et al., "Continuously signal-adaptive filterbank for high-quality perceptual audio coding." Applications of Signal Processing to Audio and Acoustics, 1997. 1997 IEEE ASSP Workshop on. IEEE, 1997.
Herre, "Temporal noise shaping, quantization and coding methods in perceptual audio coding: A tutorial Introduction." Audio Engineering Society Conference: 17th International Conference: High-Quality Audio Coding. Audio Engineering Society, 1999.
Fuchs Guillaume et al, "Low delay LPC and MDCT-based audio coding in the EVS codec", 2015 IEEE International Conference on Acoustics, Speech and Signal Processing (ICASSP), IEEE, (Apr. 19, 2015), doi: 10.1109/ICASSP.2015.7179068, pp. 5723-5727, XP033187858.
Niamut et al, "RD Optimal Temporal Noise Shaping for Transform Audio Coding", Acoustics, Speech and Signal Processing, 2006. ICASSP 2006 Proceedings. 2006 IEEE International Conference on Toulouse, France May 14-19, 2006, Piscataway, NJ, USA, IEEE, Piscataway, NJ, USA, (Jan. 1, 2006), doi:10.1109/ICASSP.2006.1661244, ISBN 978-1-4244-0469-8, pp. V-V, XP031015996.
ITU-T G.711 (Sep. 1999): Series G: Transmission Systems and Media, Digital Systems and Networks, Digital transmission systems—Terminal equipments—Coding of analogue signals by pulse code modulation, Pulse code modulation (PCM) of voice frequencies, Appendix I: A high quality low-complexity algorithm for packet loss concealment with G.711.
Cheveigne et al., "YIN, a fundamental frequency estimator for speech and music." The Journal of the Acoustical Society of America 111.4 (2002): 1917-1930.
Ojala P et al., "A novel pitch-lag search method using adaptive weighting and median filtering", Speech Coding Proceedings, 1999 IEEE Workshop on Porvoo, Finland Jun. 20-23, 1999, Piscataway, NJ, USA, IEEE, US, (Jun. 20, 1999), doi:10.1109/SCFT.1999.781502, ISBN 978-0-7803-5651-1, pp. 114-116, XP010345546.
"5 Functional description of the encoder", Dec. 10, 2014 (Dec. 10, 2014), 3GPP Standard; 26445-C10_1_S05_S0501, 3rd Generation Partnership Project (3GPP)?, Mobile Competence Centre ; 650, Route Des Lucioles ; F-06921 Sophia-Antipolis Cedex ; France Retrieved from the Internet:URL: http://www.3gpp.org/ftp/Specs/2014-12/Rel-12/26_series/ XP050907035.
Santosh Mehtry, "Office Action for IN Application No. 202037019203", dated Mar. 19, 2021, Intellectual Property India, India.
John Tan, "Office Action for SG Application 11202004173P", dated Jul. 23, 2021, IPOS, Singapore.
Hiroshi Ono, "Office Action for JP Application No. 2020-526081", dated Jun. 22, 2021, JPO, Japan.
Hiroshi Ono, "Office Action for JP Application No. 2020-526084", dated Jun. 23, 2021, JPO, Japan.
O.E. Groshev, "Office Action for RU Application No. 2020118947", dated Dec. 1, 2020, Rospatent, Russia.
O.I. Starukhina, "Office Action for RU Application No. 2020118968", dated Dec. 23, 2020, Rospatent, Russia.
Takeshi Yamashita, "Office Action for JP Application 2020-524877", dated Jun. 24, 2021, JPO, Japan.
Nam Sook Lee, "Office Action for KR Application No. 10-2020-7016424", dated Feb. 9, 2022, KIPO, Korea.
Nam Sook Lee, "Office Action for KR Application No. 10-2020-7016503", dated Feb. 9, 2022, KIPO, Korea.
Dietz, Martin et al., "Overview of the EVS codec architecture." 2015 IEEE International Conference on Acoustics, Signal Processing (ICASSP), IEEE, 2015.
International Telecommunication Union, "G. 729-based embedded variable bit-rate coder: An 8-32 kbit/s scalable wideband coder bitstream interoperable with G.729". ITU-T Recommendation G.729.1., May 2006.
3GGP TS 26.445, "Universal Mobile TElecommunications System (UMTS); LTE; Codec for Enhanced Voice Services (EVS); Detailed algorithmic description (3GPP TS 26.445 version 13.4.1 Release 13)", ETSI TS 126 445 V13.4.1., Apr. 2017.
Nam Sook Lee, "Office Action for KR Application No. 10-2020-7016100", dated Jan. 13, 2022, KIPO, Republic of Korea.
Nam Sook Lee, "Office Action for KR Application No. 10-2020-7016224", dated Jan. 13, 2022, KIPO, Republic of Korea.
Nam Sook Lee, "Office Action for KR Application No. 10-2020-7015835", dated Jan. 13, 2022, KIPO, Republic of Korea.
Kazunori Mochimura, "Decision to Grant a Patent for JP application No. 2020-524579", dated Nov. 25, 2021, JPO, Japan.
Xiong-Malvar, "A Nonuniform Modulated Complex Lapped Transform", IEEE Signal Processing Letters, vol. 8, No. 9, Sep. 2001. (Year: 2001).
Raj et al., "An Overview of MDCT for Time Domain Aliasing Cancellation", 2014 International Conference on Communication and Network Technologies (ICCNT). (Year: 2014).
Malvar, "Biorthogonal and Nonuniform Lapped Transforms for Transform Coding with Reduced Blocking and Ringing Artifacts", IEEE Transactions on Signal Processing, vol. 46, No. 4, Apr. 1998. (Year: 1998).
Malvar, "Lapped Transforms for Efficient Transform/Subband Coding", IEEE Transactions on Acoustics, Speech, and Signal Processing, vol. 38, No. 6, Jun. 1990. (Year: 1990).
Malvar, "Fast Algorithms for Orthogonal and Biorthogonal Modulated Lapped Transforms", Microsoft Research, 1998. (Year: 1998).
Princen-Bradley, "Analysis/Synthesis Filter Bank Design Based on Time Domain Aliasing Cancellation", IEEE Transactions on Acoustics, Speech, and Signal Processing, vol. ASSP-34, No. 5, Oct. 1986. (Year: 1986).
Shlien, "The Modulated Lapped Transform, Its Time-Varying Forms, and Its Applications to Audio Coding Standards", IEEE Transactions on Speech and Audio Processing, vol. 5, No. 4, Jul. 1997. (Year: 1997).
ETSI TS 126 445 V12.0.0, "Universal Mobile Telecommunications System (UMTS); LTE; EVS Codec Detailed Algorithmic Description (3GPP TS 26.445 version 12.0.0 Release 12)", Nov. 2014.
ETSI TS 126 403 V6.0.0, "Universal Mobile Telecommunications System (UMTS); General audio codec audio processing functions; Enhanced aacPlus general audio codec; Encoder specification; Advanced Audio Coding (AAC) bart (3GPP TS 26.403 version 6.0.0 Release 6)", Sep. 2004.
ETSI TS 126 401 V6.2.0, "Universal Mobile Telecommunications System (UMTS); General audio codec audio processing functions; Enhanced aacPlus general audio codec; General description (3GPP TS 26.401 version 6.2.0 Release 6)", Mar. 2005.
3GPP TS 26.405, "3rd Generation Partnership Project; Technical Specification Group Services and System Aspects; General audio codec audio processing functions; Enhanced aacPlus general audio codec; Encoder specification parametric stereo part (Release 6)", Sep. 2004.
3GPP TS 26.447 V12.0.0, "3rd Generation Partnership Project; Technical Specification Group Services and System Aspects; Codec

(56) References Cited

OTHER PUBLICATIONS for Enhanced Voice Services (EVS); Error Concealment of Lost Packets (Release 12)", Sep. 2014.
ISO/IEC FDIS 23003-3:2011(E), "Information technology—MPEG audio technologies—Part 3: Unified speech and audio coding", ISO/IEC JTC 1/SC 29/WG 11, Sep. 20, 2011.
Valin et al., "Definition of the Opus Audio Codec", Internet Engineering Task Force (IETF) RFC 6716, Sep. 2012.
Nam Sook Lee, "Decision to Grant a Patent for KR Application No. 10-2020-7015511", dated Apr. 19, 2022, KIPO, Republic of Korea.
Nam Sook Lee, "Decision to Grant a Patent for KR Application No. 10-2020-7016100", dated Apr. 21, 2022, KIPO, Republic of Korea.
Nam Sook Lee, "Decision to Grant a Patent for KR Application No. 10-2020-7015836", dated Apr. 28, 2022, KIPO, Republic of Korea.
Nam Sook Lee, "Decision to Grant a Patent for KR Application No. 10-2020-7015512", dated Apr. 20, 2022, KIPO, Republic of Korea.
Nam Sook Lee, "Decision to Grant a Patent for KR Application No. 10-2020-7015835", dated Apr. 22, 2022, KIPO, Republic of Korea.
Nam Sook Lee, "Decision to Grant a Patent for KR Application No. 10-2020-7016224", dated Jul. 25, 2022, KIPO, Republic of Korea.
Audio codec processing functions, Extended Adaptive Multi-Rate—Wideband (AMR-WB+) codec. 3GPP TS 26.290 version 9.0.0 Release 9, Sep. 2009.
Yifang Wei, Research Audio Steganography and Steganalysis, Oct. 15, 2011.
M K Lee, Speech quality estimation of voice over internet protocol codec using a packet loss impairment model, The Journal of the Acoustical Society of America, Oct. 16, 2013.
Thi Minh Nguyet Hoang et al., A New Bitplane Coder for Scalable Transform Audio Coding, 2009.
Master Dissertation, research and development of MP3 real-time encoding and decoding system, University of Electronic Science and Technology of China.
Wang Yinfeng, Research on Voice Activity Detection and Speech Enhancement Based on Time-frequency Characteristics of Mandarin, Issue 10, Oct. 15, 2014, pp. 1-32.
Lee Barford, Filtering of Randomly Sampled Time-Stamped Measurements, IEEE Instrumentation and Measurement Technology Conference Proceedings, 2006, Dec. 31, 2006, pp. 1-32.
3GPP tsg_sa\WG4_CODEC 26.445-022, Aug. 30, 2014, pp. 1-41.
Herre et al., Enhancing the performance of perceptual audio coders by using temporal noise shaping (TNS), Audio Engineering Society Convention101, Dec. 30, 1996.
Niamut, RD Optimal Temporal Noise Shaping for Transform Audio Coding, 2006 ICASSP, Jan. 1, 2006.
Fuchs, Low delay LPC and MDCT-based audio coding in the EVS codec, 2015 ICASSP.
3GPP tsg_sa/WG4_CODEC, 3GPP 26445-010_s00_s04, Jul. 30, 2014.
3GPP tsg_salWG4_CODEC 26.445-022, Aug. 30, 2014, pp. 1-41.
R. Lefebvre et al. A hybrid concealment algorithm for non-predictive wideband audio coders. <Audio Engineering Society Convention 120> Dec. 31, 2006.
Baoguang Liu, Packet loss optimization in VoLTE based on AMR-WB Codec application level. China's outstanding master's academic dissertation full text database> vol. 7. Jul. 15, 2015.
Marcos Patricio dos Santos Junior, Office Action, Brazilian Application No. 1120200093254, Mar. 25, 2024, 4pages, Brazilian Patent and Trademark Office.

* cited by examiner

ANALYSIS/SYNTHESIS WINDOWING FUNCTION FOR MODULATED LAPPED TRANSFORMATION

CROSS-REFERENCES TO RELATED APPLICATIONS

This application is a continuation of copending International Application No. PCT/EP2018/080532, filed Nov. 8, 2018, which is incorporated herein by reference in its entirety, and additionally claims priority from European Application No. EP 17201086.0, filed Nov. 10, 2017, which is incorporated herein by reference in its entirety.

BACKGROUND OF THE INVENTION

Lapped transforms have been developed for several audiocoding applications. These transforms are normally performed on consecutive blocks of a larger dataset (e.g., two consecutive frames) for an audio signal. Subsequent blocks may be overlapped. Accordingly, a last part of one block coincides with a first part of a subsequent block. A windowing function may be used.

Asymmetric modified discrete cosine transform (MDCT) windows, asymmetric modified discrete sine transform (MDST), time to frequency transformations, have been developed which embody modulated lapped transforms.

Asymmetric modified discrete cosine transform (MDCT) windows, asymmetric modified discrete sine transform (MDST) windows and other types of windows have been developed in the past years as they provide improved frequency responses compared to symmetric shapes, esp. for low delay signal applications, such as audio coding applications.

The first generation of window shapes just focused on the design of the frequency response, e.g. the G.718 or MPEG-4 AAC-ELD window. Recent developments also take the temporal shape of the window into account which is responsible for the temporal modulation of the quantization error, e.g. the ALDO window as used in the 3GPP EVS codec.

However, the design approach presented there comes along with the problem that the window shapes show a non-continuous differentiation which leads to a suboptimal frequency response. The described invention in this document presents a solution to overcome this problem.

SUMMARY

According to an embodiment, an apparatus for encoding an information signal including a plurality of frames may have:

- a modulated lapped transform tool for transforming a time domain, TD, representation of the information signal, or a processed version thereof, into a frequency domain, FD, representation, the modulated lapped transform tool being configured to perform a modulated lapped transform analysis using an analysis windowing function having a meandering portion crossing a linear function in correspondence of at least four points; and
- a bitstream writer configured to prepare a bitstream based on the FD representation of the information signal or a processed version thereof,
- wherein the analysis windowing function is defined so as to be asymmetric,
- wherein the analysis windowing function is defined so as to be, in the meandering portion:
  - greater than the linear function in a first interval between a first crossing point and a second crossing point;
  - lower than the linear function in a second interval between the second crossing point and a third crossing point;
  - greater than the linear function in a third interval between the third crossing point and a fourth crossing point,
- wherein the analysis windowing function is defined so that the absolute maximum value is in one of the first and third interval,
- wherein the linear function is a constant function with constant value 1.

According to another embodiment, a method for encoding an information signal including a plurality of frames may have the steps of:

- performing a modified cosine transformation, MDCT, analysis for transforming a time domain, TD, representation of the information signal, or a processed version thereof, into a frequency domain, FD, representation, using an analysis windowing function having a meandering portion which passes a linear function in correspondence of at least four points,
- wherein the analysis windowing function is defined so as to be asymmetric,
- wherein the analysis windowing function is defined so as to be, in the meandering portion:
  - greater than the linear function in a first interval between a first crossing point and a second crossing point;
  - lower than the linear function in a second interval between the second crossing point and a third crossing point;
  - greater than the linear function in a third interval between the third crossing point and a fourth crossing point,
- wherein the analysis windowing function is defined so that the absolute maximum value is in one of the first and third interval,
- wherein the linear function is a constant function with constant value 1.

According to another embodiment, a non-transitory digital storage medium may have a computer program stored thereon to perform the inventive method, when said computer program is run by a computer.

In accordance to an aspect there is provided an apparatus for encoding an information signal comprising a plurality of frames, the apparatus comprising:

- a modulated lapped transform tool for transforming a time domain, TD, representation of the information signal, or a processed version thereof, into a frequency domain, FD, representation, the modulated lapped transform tool being configured to perform a modulated lapped transform analysis using an analysis windowing function having a meandering portion crossing a linear function in correspondence of at least four points and
- a bitstream writer configured to prepare a bitstream based on the FD representation of the information signal or a processed version thereof,
- wherein the analysis windowing function is defined so as to be asymmetric,
- wherein the analysis windowing function is defined so as to be, in the meandering portion
  - greater than the linear function in a first interval between a first crossing point and a second crossing point;

lower than the linear function in a second interval between the second crossing point and a third crossing point;

greater than the linear function in a third interval between the third crossing point and a fourth crossing point, wherein the analysis windowing function is defined so that the absolute maximum value is in one of the first and third interval, wherein the linear function is a constant function with constant value 1.

The analysis windowing function may be defined so that the maximum of the analysis windowing function is less than 25% greater than the value of the linear function at the same time instant.

The apparatus for encoding an information signal may comprise a plurality of frames, the apparatus may comprise:

a modulated lapped transform tool for transforming a time domain, TD, representation of the information signal, or a processed version thereof, into a frequency domain, FD, representation, the modulated lapped transform tool being configured to perform a modulated lapped transform analysis using an analysis windowing function having a meandering portion crossing a linear function in correspondence of at least four points; and a bitstream writer configured to prepare a bitstream based on the FD representation of the information signal or a processed version thereof, wherein the analysis windowing function is defined so as to be asymmetric, wherein the analysis windowing function is defined so that the maximum of the analysis windowing function is less than 25% greater than the value of the linear function at the same time instant, wherein the linear function is a constant function.

The apparatus for encoding an information signal may comprise a plurality of frames, the apparatus may comprise:

a modulated lapped transform tool for transforming a time domain, TD, representation of the information signal, or a processed version thereof, into a frequency domain, FD, representation, the modulated lapped transform tool being configured to perform a modulated lapped transform analysis using an analysis windowing function having a meandering portion crossing a linear function in correspondence of at least four points; and a bitstream writer configured to prepare a bitstream based on the FD representation of the information signal or a processed version thereof.

The apparatus may comprise the modulated lapped transform tool is configured to:

scale time input buffers and/or cosine or sine values with values of the analysis windowing function.

The apparatus may comprise the modulated lapped transform tool is configured to use input buffers in the form of $$t(n)=x(Z-N_F+n) \text{ for } n=0 \ldots 2N_F-1-Z, \text{ and}$$

$$t(2N-Z+n)=0 \text{ for } n=0 \ldots Z-1$$

wherein x(n) is a TD sample of the information signal or a processed version of the information signal at the time instant n, $N_F$ is the number of samples processed in one frame, and Z is the number of leading zeros in modulated lapped transform window.

The apparatus may comprise the modulated lapped transform tool that is configured to perform:

$$X(k) = \sqrt{\frac{2}{N_F}} \sum_{n=0}^{2N_F-1} w_N(n) \cdot t(n) \cos\left[\frac{\pi}{N_F}\left(n + \frac{1}{2} + \frac{N_F}{2}\right)\left(k + \frac{1}{2}\right)\right]$$

$$\text{for } k = 0 \ldots N_F - 1$$

where X(k) is the modulated lapped transform frequency value at a frequency index k, n is the time instant, $w_N$ (n) is the analysis windowing function, t (n) is a time input buffer, and $N_F$ is the number of samples processed in one frame.

The apparatus for decoding an information signal, or a processed version thereof, defined in the frequency domain, FD, the apparatus may comprise:

a bitstream reader configured to read a bitstream encoding the information signal; and an inverse modulated lapped transform tool configured to perform an inverse modulated lapped transform synthesis on the information signal, or a processed version thereof, using a synthesis windowing function having a meandering portion crossing a linear function in correspondence of at least four points, wherein the synthesis windowing function is defined so as to be asymmetric, wherein the synthesis windowing function is defined so as to be, in the meandering portion:

greater than the linear function in a first interval between a first crossing point and a second crossing point;

lower than the linear function in a second interval between the second crossing point and a third crossing point;

greater than the linear function in a third interval between the third crossing point and a fourth crossing point, wherein the synthesis windowing function is defined so that the absolute maximum value is in one of the first and third interval, wherein the linear function is a constant function with constant value 1.

The apparatus may comprise the synthesis windowing function that defined so that the maximum of the synthesis windowing function is less than 25% greater than the value of the linear function at the same time instant.

The apparatus for decoding an information signal, or a processed version thereof, defined in the frequency domain, FD, the apparatus may comprise:

a bitstream reader configured to read a bitstream encoding the information signal; and an inverse modulated lapped transform tool configured to perform an inverse modulated lapped transform synthesis of the information signal, or a processed version thereof, using a synthesis windowing function having a meandering portion crossing a linear function in correspondence of at least four points, wherein the synthesis windowing function is defined so as to be asymmetric, wherein the synthesis windowing function is defined so that the maximum of the synthesis windowing function is less than 25% greater than the value of the linear function at the same time instant, wherein the linear function is a constant function.

An apparatus for decoding an information signal, or a processed version thereof, defined in the frequency domain, FD, the apparatus may comprise:

a bitstream reader configured to read a bitstream encoding the information signal; and an inverse modulated lapped transform tool configured to perform an inverse modulated lapped transform synthesis on the information signal, or a processed version thereof, using a synthesis windowing function having a meandering portion crossing a linear function in correspondence of at least four points.

The apparatus wherein the inverse modulated lapped transform tool may be configured to:

scale values at a time domain aliasing buffer with values of the synthesis windowing function.

The apparatus wherein the inverse modulated lapped transform tool may be configured to generate a time domain, TD, signal representation in the form of $$\hat{t}(n) = \sqrt{\frac{2}{N_F}} \sum_{k=0}^{N_F-1} \hat{X}(k)\cos\left[\frac{\pi}{N_F}\left(n + \frac{1}{2} + \frac{N_F}{2}\right)\left(k + \frac{1}{2}\right)\right]$$

$$\text{for } n = 0 \ldots 2N_F - 1$$

wherein $\hat{t}(n)$ is an aliasing buffer, $\hat{X}(k)$ is the information signal or a processed version thereof, and $N_F$ is the number of samples for a TD frame.

The apparatus wherein the inverse modulated lapped transform tool may be configured to:

perform a windowing of the time-aliased buffer.

The apparatus wherein the inverse modulated lapped transform tool may be configured to perform a windowing operation by performing:

$$\hat{t}(n)=w_N(2N-1-n)\cdot\hat{t}(n) \text{ for } n=0 \ldots 2N_F-1$$

The apparatus wherein the inverse modulated lapped transform tool may be configured to perform an overlap-and-add operation.

The apparatus wherein the inverse modulated lapped transform tool may be configured to perform an overlap-and-add operation as:

$$\hat{x}(n)=\text{mem\_ola\_add}(n)+\hat{t}(Z+n) \text{ for } n=0 \ldots N_F-Z-1$$

$$\hat{x}(n)=\hat{t}(Z+n) \text{ for } n=N_F-Z \ldots N_F-1$$

$$\text{mem\_ola\_add}(n)=\hat{t}(N_F+Z+n) \text{ for } n=0 \ldots N_F-Z-1$$

wherein $\hat{x}(n)$ is the output value, $\hat{t}(.)$ is a windowed time-aliasing buffer, and $N_F$ is the number of samples in one frame.

The apparatus may be so that:

the analysis windowing function and/or the synthesis windowing function may be defined so as to be, in the meandering portion:

greater than the linear function in a first interval between a first crossing point and a second crossing point;

lower than the linear function in a second interval between the second crossing point and a third crossing point;

greater than the linear function in a third interval between the third crossing point and a fourth crossing point.

The apparatus may be so that the analysis windowing function and/or the synthesis windowing function may be defined so that the absolute maximum value is in the first or third interval.

The apparatus may be so that the analysis windowing function and/or the synthesis windowing function may be defined so that, in the meandering portion, a relative maximum value is in the first or third interval and a relative minimum value is in the second interval.

The apparatus may be so that the analysis windowing function and/or the synthesis windowing function may be defined so that, in the meandering portion, the value of the meandering window function in correspondence to at least one of the first and third interval is greater than 0.9.

The apparatus may be so that the analysis windowing function and/or the synthesis windowing function may be defined so as to present, in the meandering portion, a value greater than the linear function in an interval comprised of the 30% and 50% of two frames.

The apparatus may be so that the analysis windowing function and/or the synthesis windowing function may be defined so that the maximum of the analysis windowing function and/or the synthesis windowing function is less than 25% greater than the value of the linear function at the same time instant.

The apparatus may be so that the analysis windowing function and/or the synthesis windowing function may be defined so that the maximum of the analysis windowing function and/or the synthesis windowing function is less than 5% greater than the value of the linear function at the same time instant.

The apparatus may be so that the analysis windowing function and/or the synthesis windowing function may be defined so as to present a second numerical differentiation between $-3*10^{-4}$ and $+3*10^{-4}$.

The apparatus may be so that the analysis windowing function and/or the synthesis windowing function may be defined so as to present a third numerical differentiation between $-2*10^{-5}$ and $+2*10^{-5}$.

The apparatus may be so that the analysis windowing function and/or synthesis windowing function is defined so as to present a first numerical differentiation between −0.01 and +0.01.

The apparatus may be so that the analysis windowing function and/or synthesis windowing function is defined so as to present a second numerical differentiation between $-10^{-4}$ and $+10^{-4}$.

The apparatus may be so that the analysis windowing function and/or synthesis windowing function is defined so as to present a second numerical differentiation between $-10^{-5}$ and $+10^{-5}$.

The apparatus may be so that the linear function may be defined so as to be a non-increasing function.

The apparatus may be so that the linear function may be defined so as to be a strictly decreasing function.

The apparatus may be so that the linear function may be defined so as to be a non-decreasing function.

The apparatus may be so that the linear function may be defined so as to be a strictly increasing function.

The apparatus may be so that the linear function may be defined so as to have a value which is constant or varies of maximum +2% or −2%.

The apparatus may be so that the linear function may be defined so as to have increments between −0.05 and −0.20.

The apparatus may be so that the analysis windowing function and/or the synthesis windowing function may be defined so as to be asymmetric.

The apparatus may be so that the analysis windowing function and the synthesis windowing function may be defined to be time reversed versions of each other.

The apparatus may comprise:

a storage space to store the values of the analysis windowing function and/or the synthesis windowing function.

The apparatus wherein the modified lapped transform may be a modified discrete cosine transform, MDCT, or a modified discrete sine transform, MDST, and the inverse modified lapped transform is an inverse modified discrete cosine transform, IMDCT, or inverse modified discrete sine transform, IMDST.

The apparatus may be so that the analysis windowing function and/or the synthesis windowing function may be a constant function with constant value 1.

A system which may comprise:

an encoder as a decoder as the apparatus.

The system wherein the encoder may comprise a communication unit configured to transmit a bitstream and/or the decoder comprises a communication unit configured to receive a bitstream.

According to an aspect there is provided a method which comprises performing a modified cosine transformation, MDCT, analysis for transforming a time domain, TD, representation of an information signal, or a processed version thereof, into a frequency domain, FD, representation, using an analysis windowing function having a meandering portion which passes a linear function in correspondence of at least four points.

According to an aspect there is provided a method which comprises performing a modified cosine transformation, MDCT, analysis for transforming a time domain, TD, representation of an information signal, or a processed version thereof, into a frequency domain, FD, representation, using an analysis windowing function having a meandering portion which passes a linear function in correspondence of at least four points, wherein the analysis windowing function is defined so as to be asymmetric, wherein the analysis windowing function is defined so as to be, in the meandering portion:

greater than the linear function in a first interval between a first crossing point and a second crossing point;

lower than the linear function in a second interval between the second crossing point and a third crossing point;

greater than the linear function in a third interval between the third crossing point and a fourth crossing point, wherein the analysis windowing function is defined so that the absolute maximum value is in one of the first and third interval, wherein the linear function is a constant function with constant value 1.

According to an aspect there is provided a method which comprises performing a modified cosine transformation, MDCT, analysis for transforming a time domain, TD, representation of an information signal, or a processed version thereof, into a frequency domain, FD, representation, using an analysis windowing function having a meandering portion which passes a linear function in correspondence of at least four points, wherein the analysis windowing function is defined so as to be asymmetric, wherein the analysis windowing function is defined so that the maximum of the analysis windowing function is less than 25% greater than the value of the linear function at the same time instant, wherein the linear function is a constant function.

According to an aspect there is provided a method which comprises performing a modified cosine transformation, MDCT, synthesis for transforming a frequency domain, FD, representation of an information signal, or a processed version thereof, into a time domain, TD, representation, using a synthesis windowing function having a meandering portion which passes a linear function in correspondence of at least four points.

According to an aspect there is provided a method which comprises performing a modified cosine transformation, MDCT, synthesis for transforming a frequency domain, FD, representation of an information signal, or a processed version thereof, into a time domain, TD, representation, using a synthesis windowing function having a meandering portion which passes a linear function in correspondence of at least four points, wherein the synthesis windowing function is defined so as to be, in the meandering portion:

greater than the linear function in a first interval between a first crossing point and a second crossing point;

lower than the linear function in a second interval between the second crossing point and a third crossing point;

greater than the linear function in a third interval between the third crossing point and a fourth crossing point, wherein the synthesis windowing function is defined so that the absolute maximum value is in one of the first and third interval, wherein the linear function is a constant function with constant value 1.

According to an aspect there is provided a method comprising performing a modified cosine transformation, MDCT, synthesis for transforming a frequency domain, FD, representation of an information signal, or a processed version thereof, into a time domain, TD, representation, using a synthesis windowing function having a meandering portion which passes a linear function in correspondence of at least four points, wherein the synthesis windowing function is defined so as to be asymmetric, wherein the synthesis windowing function is defined so that the maximum of the synthesis windowing function is less than 25% greater than the value of the linear function at the same time instant, wherein the linear function is a constant function.

A non-transitory storage unit storing instructions which, when running on a processor, may cause the processor to execute a method.

There is provided an apparatus for encoding an information signal comprising a plurality of frames, the apparatus comprising:

- a modified discrete cosine transformation, MDCT, tool for transforming a time domain, TD, representation of the information signal, or a processed version thereof, into a frequency domain, FD, representation, the MDCT tool being configured to perform an MDCT analysis using an analysis windowing function having a meandering portion crossing a linear function in correspondence of at least four points; and
- a bitstream writer configured to prepare a bitstream based on the FD representation of the information signal or a processed version thereof.

In examples, the MDCT tool is configured to scale time input buffers and/or cosine values with values of the analysis windowing function.

In examples, the MDCT tool is configured to use input buffers in the form of $$t(n)=x(Z-N_F+n) \text{ for } n=0 \ldots 2N_F-1-Z,$$

wherein x(n) is a TD sample of the information signal or a processed version of the information signal at the time instant n, $N_F$ is the number of samples processed in one frame, and Z is the number of leading zeros in MDCT window.

In examples, an initialization may be performed as:

$$t(2N-Z+n)=0 \text{ for } n=0 \ldots Z-1$$

In examples, the MDCT (or MDST) tool is configured to perform:

$$X(k)=\sqrt{\frac{2}{N_F}}\sum_{n=0}^{2N_F-1} w_N(n)\cdot t(n)\cos\left[\frac{\pi}{N_F}\left(n+\frac{1}{2}+\frac{N_F}{2}\right)\left(k+\frac{1}{2}\right)\right]$$
$$\text{for } k=0 \ldots N_F-1$$

where X(k) is the MDCT (or MDST) frequency value at a frequency index k, n is the time instant, $w_N(n)$ is the analysis windowing function, t(n) is a time input buffer, and $N_F$ is the number of samples processed in one frame.

In examples, there is provided an apparatus which comprises a bitstream reader configured to read a bitstream encoding the information signal; and

- an inverse modified cosine transformation, IMDCT (or IMDST), tool, configured to perform an IMDCT (or IMDST) synthesis on the information signal, or a processed version thereof, using a synthesis windowing function having a meandering portion crossing a linear function in correspondence of at least four points.

In examples, the IMDCT (or IMDST) tool is configured to scale values at a time domain aliasing buffer with values of the synthesis windowing function.

In examples, the IMDCT (or IMDST) tool is configured to generate a time domain, TD, signal representation in the form of $$\hat{t}(n)=\sqrt{\frac{2}{N_F}}\sum_{k=0}^{N_F-1}\hat{X}(k)\cos\left[\frac{\pi}{N_F}\left(n+\frac{1}{2}+\frac{N_F}{2}\right)\left(k+\frac{1}{2}\right)\right]$$
$$\text{for } n=0 \ldots 2N_F-1$$

wherein $\hat{t}(n)$ is an aliasing buffer, $\hat{X}(k)$ is the information signal or a processed version thereof, and $N_F$ is the number of samples for a TD frame.

In examples, the IMDCT (or IMDST) tool is configured to perform a windowing of the time-aliased buffer.

In examples, the IMDCT (or IMDST) tool is configured to perform a windowing operation by performing:

$$\hat{t}(n)=w_N(2N-1-n)\cdot\hat{t}(n) \text{ for } n=0 \ldots 2N_F-1$$

In examples, the IMDCT (or IMDST) tool is configured to perform an overlap-and-add operation, which may be, for example, as:

$$\hat{x}(n)=\text{mem\_ola\_add}(n)+\hat{t}(Z+n) \text{ for } n=0 \ldots N_F-Z-1$$

$$\hat{x}(n)=\hat{t}(Z+n) \text{ for } n=N_F-Z \ldots N_F-1$$

$$\text{mem\_ola\_add}(n)=\hat{t}(N_F+Z+n) \text{ for } n=0 \ldots N_F-Z-1$$

wherein $\hat{x}(n)$ is the output value, $\hat{t}(.)$ is a windowed time-aliasing buffer, and $N_F$ is the number of samples in one frame.

In examples, the analysis windowing function and/or the synthesis windowing function is defined so as to be, in the meandering portion:

- greater than the linear function in a first interval between a first crossing point and a second crossing point;
- lower than the linear function in a second interval between the second crossing point and a third crossing point;
- greater than the linear function in a third interval between the third crossing point and a fourth crossing point.

In examples, the analysis windowing function and/or the synthesis windowing function is defined so that the absolute maximum value is in the first or third interval.

In examples, the analysis windowing function and/or the synthesis windowing function is defined so that, in the meandering portion, a relative maximum value is in the first or third interval and a relative minimum value is in the second interval.

In examples, the analysis windowing function and/or the synthesis windowing function is defined so that, in the meandering portion, the value of the meandering window function in correspondence to at least one of the first and third interval is greater than 0.9.

In examples, the analysis windowing function and/or the synthesis windowing function is defined so as to present, in the meandering portion, a value greater than the linear function in an interval comprised of the 30% and 50% of two frames.

In examples, the analysis windowing function and/or the synthesis windowing function is defined so that the maximum of the analysis windowing function and/or the synthesis windowing function is less than 25% (in particular 5%) greater than the value of the linear function at the same time instant.

In examples, the analysis windowing function and/or the synthesis windowing function is defined so as to present a second numerical differentiation is between $-3*10^{-4}$ and $+3*10^{-4}$ and/or the third numerical differentiation is between $-2*10^{-5}$ and $+2*10^{-5}$.

In examples, the linear function is defined so as to have a value which is constant or varies of maximum +2% or −2%.

In examples, the linear function is defined so as to have increments between −0.05 and −0.20.

In examples, the analysis windowing function and/or the synthesis windowing function is defined so as to be asymmetric.

In examples, the analysis windowing function and the synthesis windowing function is defined are symmetric with each other.

In examples, a storage space to store the values of the analysis windowing function and/or the synthesis windowing function.

In examples, there is provided a system comprising:

an encoder as an apparatus as above and/or below; and a decoder as an apparatus as above and/or below.

In examples, the encoder comprise a communication unit configured to transmit a bitstream and/or the decoder comprises a communication unit configured to receive a bitstream.

In examples, there is also provided a method comprising performing an MDCT (MDST), analysis for transforming a time domain, TD, representation of an information signal, or a processed version thereof, into a frequency domain, FD, representation, using an analysis windowing function having a meandering portion which passes a linear function in correspondence of at least four points.

In examples, there is also provided a method comprising performing an MDCT (or MDST), synthesis for transforming a frequency domain, FD, representation of an information signal, or a processed version thereof, into a time domain, TD, representation, using a synthesis windowing function having a meandering portion which passes a linear function in correspondence of at least four points.

In has been noted that the analysis and/or synthesis windowing functions used for the invention are particularly suitable for performing MDCT (or MDST) synthesis and analysis.

Examples of analysis/synthesis windowing functions for modulated lapped transformation and methods and apparatus for using them are disclosed hereinafter.

BRIEF DESCRIPTION OF THE DRAWINGS

Embodiments of the present invention will be detailed subsequently referring to the appended drawings, in which.

DETAILED DESCRIPTION OF THE INVENTION

Examples

An information signal may be described in the time domain, TD, as a succession of samples (e.g., $x_b(n)$ for a block b and index, e.g., instant, n). The TD representation may be made of a plurality of frames, each associated to a plurality of samples. In the frequency domain, FD, a frame may be represented as a succession of bins (e.g., X (k), each associated to a particular frequency (each frequency being associated to an index k).

It is possible to convert a TD representation into an FD representation using a modulated lapped transform technique (such as a modified discrete cosine transform, MDCT, technique or a modified discrete sine transform, MDST, technique, for example). Such a technique may be implemented, for example, at an encoder side, so as to transform sampled values into frequency values.

It is possible to convert an FD representation into a TD representation using an inverse modulated lapped transform technique (such as an inverse modified discrete cosine transform, IMDCT, technique or an inverse modified discrete sine, IMDST, technique). Such a technique may be implemented, for example, at a decoder side, so as to transform frequency values into TD values (e.g., for performing reproduction).

The table below indicates symbols used in the following sections.

| Symbol | Description |
|---|---|
| N or $N_F$ | Frame size; number of sample processed in one frame |
| $f_s$ | Sampling rate |
| $x_b(n)$ | Time domain sample of block b and index n |
| $X_b(k)$ | Frequency domain bin of block b and frequency index k |
| Z or $L_Z$ | Number of leading zeros in MDCT window |

Figure 13:
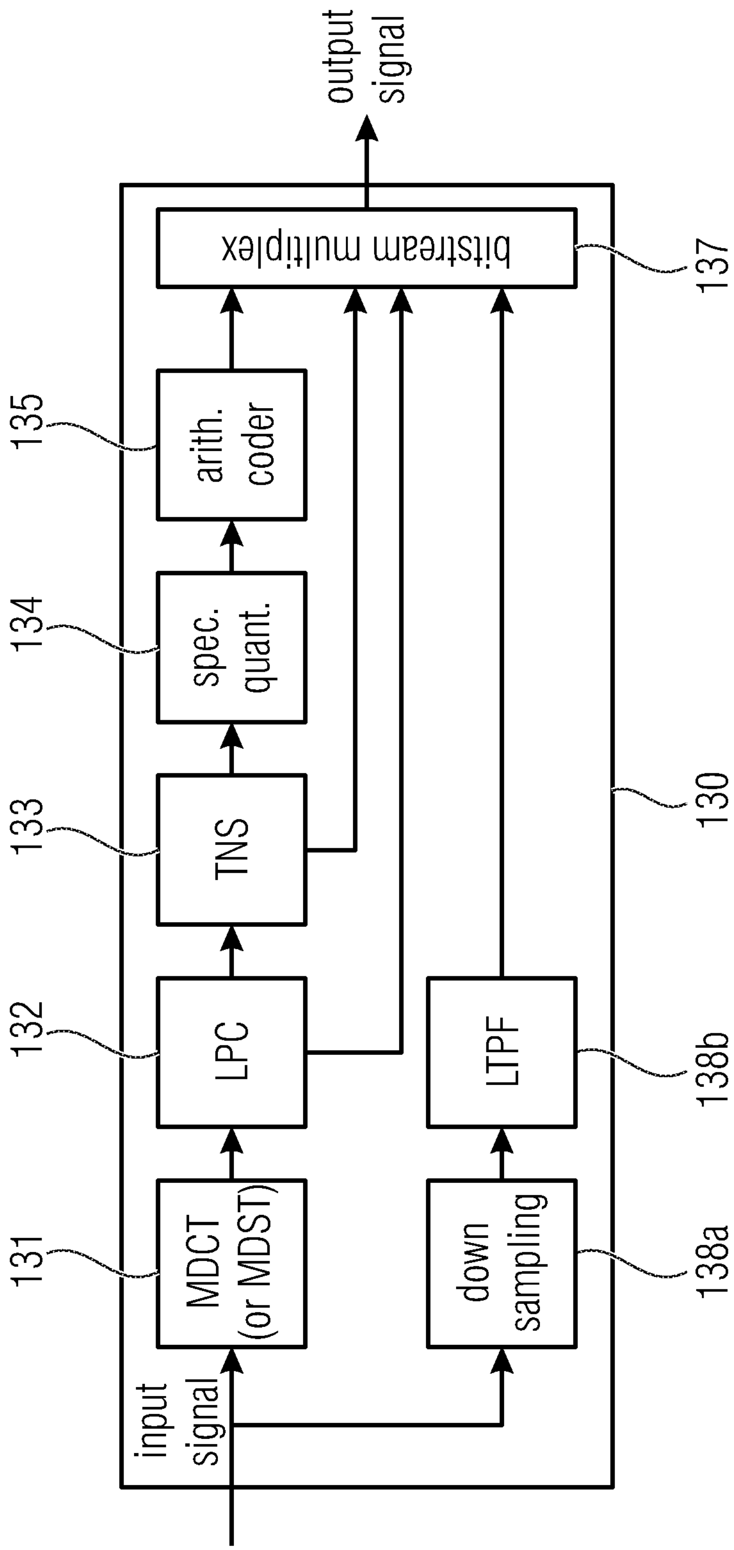
FIGS. 13 and 13A show encoders according to examples.
Figure 13A:
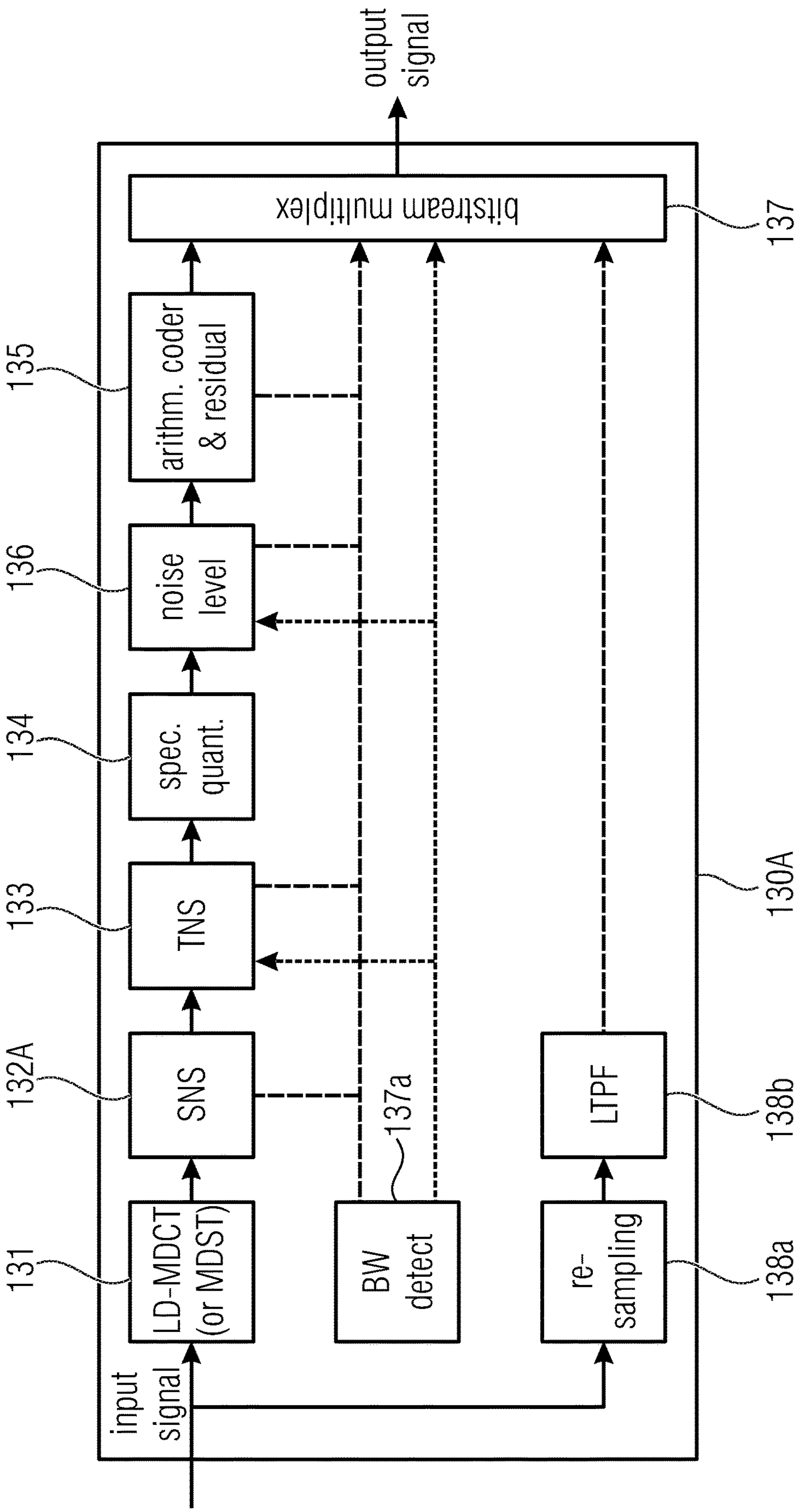

FIGS. 13 and 13A show encoder apparatus 130 and 130A, respectively. Each of the encoder apparatus 130 or 130A may comprise a plurality of tools, such as functional blocks capable of performing signal processing techniques. Each of these blocks may be a standalone device or may be a functional block which divides a hardware structure with other tools of the encoder apparatus 130 and 130A.

The encoder apparatus 130 or 130A may comprise a modulated lapped transform tool 131 (such as a low delay modified discrete cosine transform, MDCT, tool, or a low delay modified discrete sine transform, MDST, tool, or another type of modulated lapped transform tool) which may convert an information signal (e.g., an audio signal) from a time domain, TD, representation to a frequency domain, FD, representation. The modulated lapped transform tool 131 (e.g., MDCT or MDST tool) performs modulated lapped transform analysis (e.g., an MDCT analysis, MDST analysis).

Other tools may be provided. e.g., downstream to the modulated lapped transform tool 131 or operating in TD. Some of them are here mentioned.

The encoder apparatus 130 may comprise a linear predictive coding, LPC, tool 132 for performing an LPC analysis in the FD. The encoder apparatus 130A may comprise a spectral noise shaping, SNS, tool 132A for performing an LPC analysis in the FD.

SNS may be seen as a generalization of LPC and, therefore, in some examples, the LPC block 132 may be seen as a particular example of the SNS tool 132A (and the encoder apparatus 130 may be seen as a particular example of the encoder apparatus 130A).

Each of the encoder apparatus 130 and 130A may comprise a temporal noise shaping, TNS, tool 133, to control the temporal shape of noise within each window of the information signal (e.g., as output by the modulated lapped transform tool) in the FD.

Each of the encoder apparatus 130 and 130A may comprise a spectral quantizer 134 processing signals in the in the FD. The signal as output by the TNS tool 133 may be quantized, e.g., using dead-zone plus uniform thresholds scalar quantization.

Each of the encoder apparatus 130 and 130A may comprise a noise level estimator 136, e.g., downstream to the spectral quantizer 134.

Each of the encoder apparatus 130 and 130A may comprise a coder 135 processing signals in the FD, for example, to perform entropy coding, e.g., to compress a bitstream. The coder 135 may, for example, perform entropy coding.

Each of the encoder apparatus 130 and 130A may comprise a bandwidth detector 137*a* which may control, for example, a bandwidth controller at the decoder.

Each of the encoder apparatus 130 and 130A may comprise tools which process signals in the time domain, TD. For example, the encoder apparatus 130 or 130A may comprise a re-sampling tool 138*a* (e.g., a downsampler) and/or a long term postfiltering, LTPF, tool 138*b*, for controlling an LTPF active in TD at the decoder side.

Each of the encoder apparatus 130 and 130A may comprise a bitstream multiplexer tool (bitstream writer) 137 to prepare a bitstream with data obtained from TD and/or FD tools placed upstream. The bitstream may comprise a digital representation of an information signal together with control data to be used at the decoder side. The bitstream may be compressed or include portions which are compressed.

Figure 14:
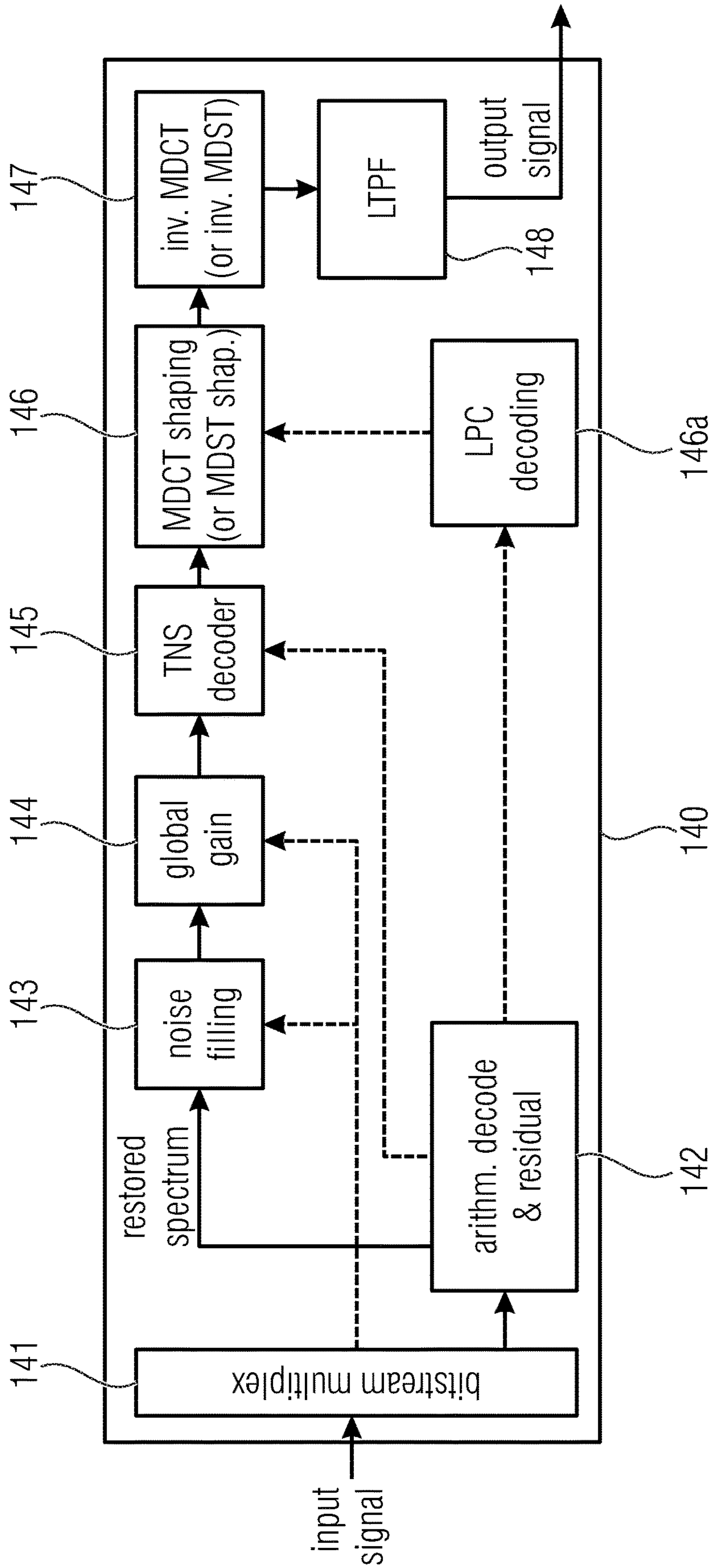
FIGS. 14 and 14A shows decoders according to examples.
Figure 14A:
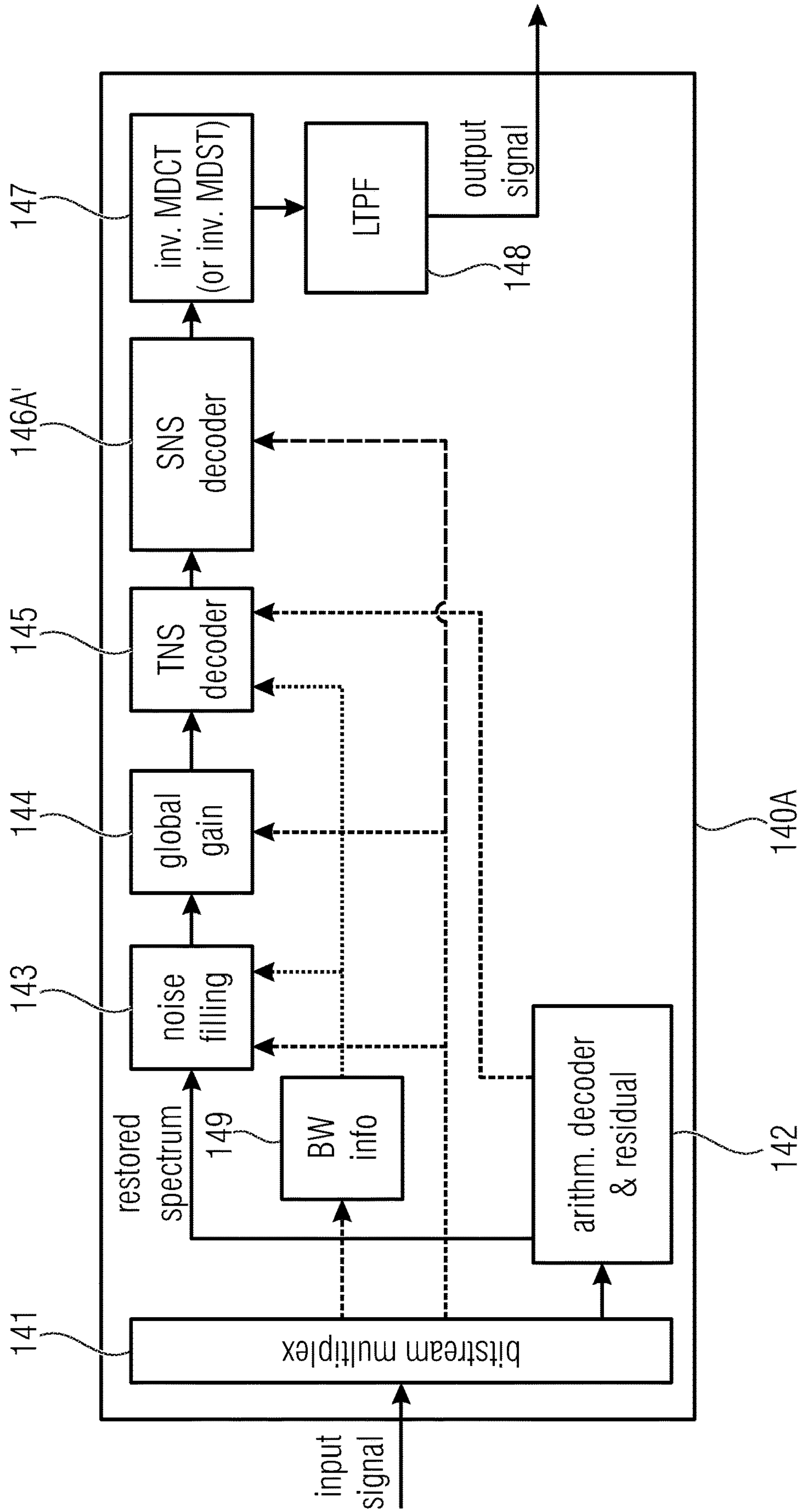

FIGS. 14 and 14A show decoder apparatus 140 and 140A, respectively. Each of them may decode a digital representation of an information signal, e.g., as encoded by the encoder 130 or 130A, for example.

Each of the decoder apparatus 140 and 140A may comprise an inverse modulated lapped transform tool 147 (e.g., a low delay inverse MDCT tool or a low delay inverse DMST tool) to transform signal representations from FD to TD. The modulated lapped transform tool 147 performs a modulated lapped transform synthesis (e.g., an MDCT synthesis and/or an MDST synthesis, etc.).

Other tools may be provided, e.g., upstream to the inverse modulated lapped transform tool 147 or operating in TD. Some of them are here mentioned.

Each of the decoder apparatus 140 and 140A may comprise a bitstream multiplex tool 141 to obtain a bitstream (e.g., by transmission) from an encoder apparatus (e.g., the apparatus 130 or 130A). For example, an output from the encoder apparatus 130 or 130A may be provided as an input signal to the decoder apparatus 140 or 140A.

Each of the decoder apparatus 140 and 140A may comprise a decoder 142 which may, for example, decompress data in the bitstream. Arithmetic decoding may be performed. A residual decoding may be performed.

Each of the decoder apparatus 140 and 140A may comprise a noise filling tool 143 processing signals in the FD.

Each of the decoder apparatus 140 and 140A may comprise a global gain tool 144 processing signals in the FD.

Each of the decoder apparatus 140 and 140A may comprise a TNS decoder tool 145 processing signals in the FD.

The decoder apparatus 140 may comprise an MDCT (or MDST) shaping tool 146 (other lapped transformation tools are possible). The MDCT (or MDST) shaping tool 146 may process signals by applying gain factors computed from decoded LP filter coefficients (obtained from an LPC decoding tool 146*a*, for example) transformed to the FD spectrum (e.g., MDCT or MDST spectrum, etc.).

The decoder apparatus 140A may comprise an SNS decoder tool 146A', for example, obtaining LPC coefficients from the SNS tool 132A.

Each of the decoder apparatus 140 and 140A may comprise an LTPF tool 148 for performing a postfilter in the TD.

The decoder apparatus 140A may comprise a decoder bandwidth controller 149 which may obtain bandwidth information from the bandwidth detector 137*a*, for example.

The encoder apparatus 130 (or 130A) and the decoder apparatus 140 (or 140A) may be composed to each other to form a system.

Basically, the tools downstream to the modulated lapped transform tool 131 in the encoder apparatus 130 or 130A and the tools upstream to the inverse modulated lapped transform tool 147 in the decoder apparatus 140 or 140A may perform signal processing in the FD and are therefore FD tools.

Techniques are here discussed regarding the conversion techniques, e.g., at the tools 131 and 147.

In general terms, the MDCT, MDST, etc., are discrete transforms which have the additional property of being lapped transforms. One of these transforms is performed on consecutive blocks of a larger dataset (e.g., two consecutive frames). Subsequent blocks may be overlapped. Accordingly, a last part of one block may coincide with a first part of a subsequent block. A windowing function $w_n(n=0, \ldots, 2N-1)$ may be used. In particular, the windowing function may be used as a weight. An advantage is that it is possible to avoid or reduce discontinuities at the borders of the blocks.

Figure 15:
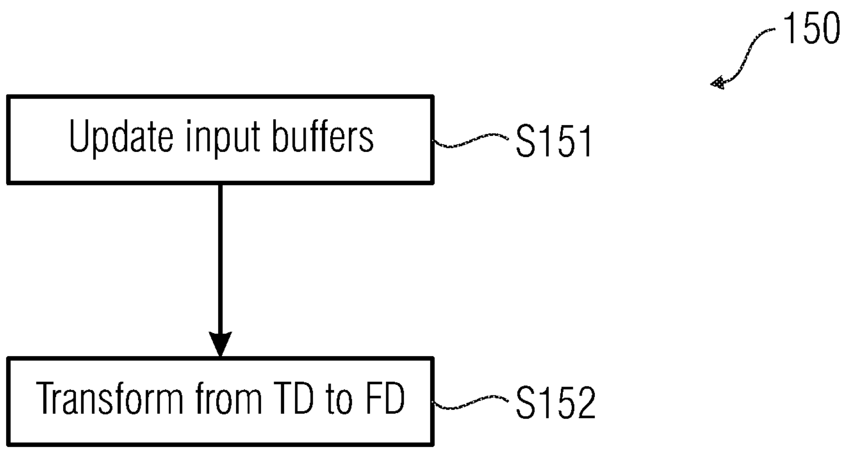
FIGS. 15 and 16 show methods according to examples.

FIG. 15 shows a method 150 for performing a modulated lapped transform analysis, e.g., at the modulated lapped transform tool 131 (which may be a MDCT tool). The input signal $x_b(n)$ of the current frame b may consist of N audio samples, where the newest one is located at $x_b(N-1)$.

At step S151, input buffers may be updated. The time input buffer for the modulated lapped transform t may be updated according to $$t(n)=x_{b-1}(Z+n) \text{ for } n=0 \ldots N-1-Z$$

$$t(N-Z+n)=x_b(n) \text{ for } n=0 \ldots N-1$$

$$t(2N-Z+n)=0 \text{ for } n=0 \ldots Z-1$$

The latter is an initialization just used for consistency.

At step S152, a block of N time samples may be transformed to frequency coefficients X(k) using the following equation:

$$X(k)=\sqrt{\frac{2}{N}}\sum_{n=0}^{2N-1} w_N(n)\cdot t(n)\cos\left[\frac{\pi}{N}\left(n+\frac{1}{2}+\frac{N}{2}\right)\left(k+\frac{1}{2}\right)\right]$$

$$\text{for } k=0 \ldots N-1$$

where $w_N$ is an asymmetric modulated lapped transform window (e.g., MDCT window) according to the used frame size.

Figure 16:
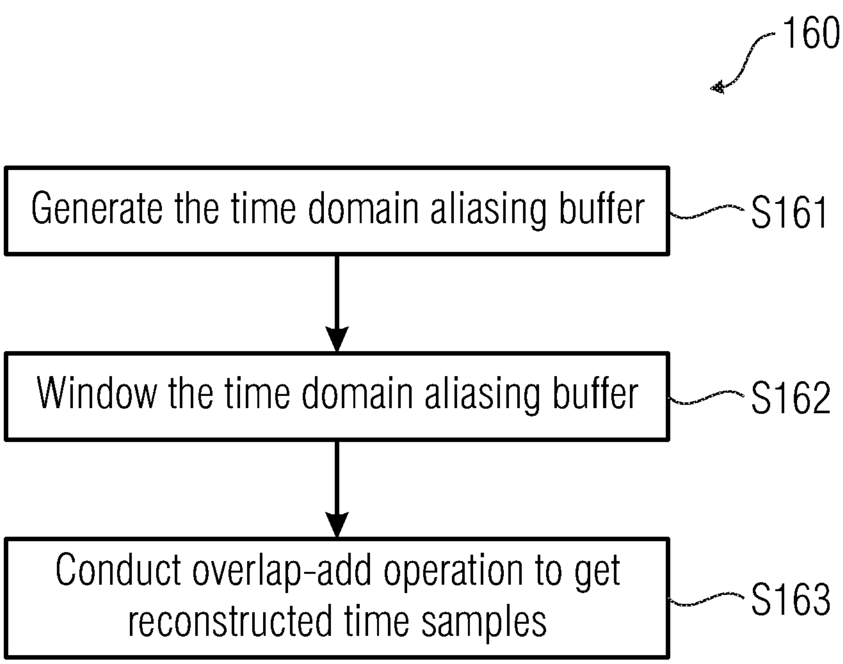

FIG. 16 shows a method 160 for performing a modulated lapped transform synthesis (e.g., MDCT synthesis), e.g., at the modulated lapped transform tool 147 (which may be an IMDCT tool). Here, a spectrum $\hat{X}_b(k)$ (i.e., a representation in the FD) may be transformed to TD by the following steps:

At step S161, a generation of time domain aliasing buffer $\hat{x}_{T,b}(n)$ of frame b may be performed.

For example:

$$\hat{x}_{T,b}(n)=\sqrt{\frac{2}{N}}\sum_{k=0}^{N-1}\hat{X}_b(k)\cos\left[\frac{\pi}{N}\left(n+\frac{1}{2}+\frac{N}{2}\right)\left(k+\frac{1}{2}\right)\right]$$

$$\text{for } n=0 \ldots 2N-1$$

At step S162, windowing of time domain aliasing buffer may be performed. For example:

$$\widehat{x_{w,b}}(n)=w_N(2N-1-n)\cdot\widehat{x_{T,b}}(n) \text{ for } n=0 \ldots 2N-1$$

At step S163, overlap-add operation to get reconstructed time samples $\widehat{x_b}(n)$ of frame b may be conducted. For example:

$$\widehat{x_b}(n)=\widehat{x_{w,b-1}}(N+Z+n)+\widehat{x_{w,b}}(Z+n) \text{ for } n=0 \ldots N-Z-1$$

$$\widehat{x_b}(n)=\widehat{x_{w,b}}(Z+n) \text{ for } n=N-Z \ldots N-1$$

Notably, the windowing function $w_N(n)$ at the analysis (analysis windowing function) and the windowing function $w_N(2N-1-n)$ at the synthesis (synthesis windowing function) may be defined so as to be time reversed with each other. The window coefficients of the analysis and synthesis window are time reversed versions of each other.

It has been noted that a particularly effective windowing function (e.g., synthesis windowing function) may be an analysis windowing function having a meandering portion crossing a linear function in correspondence of four points.

Figure 4:
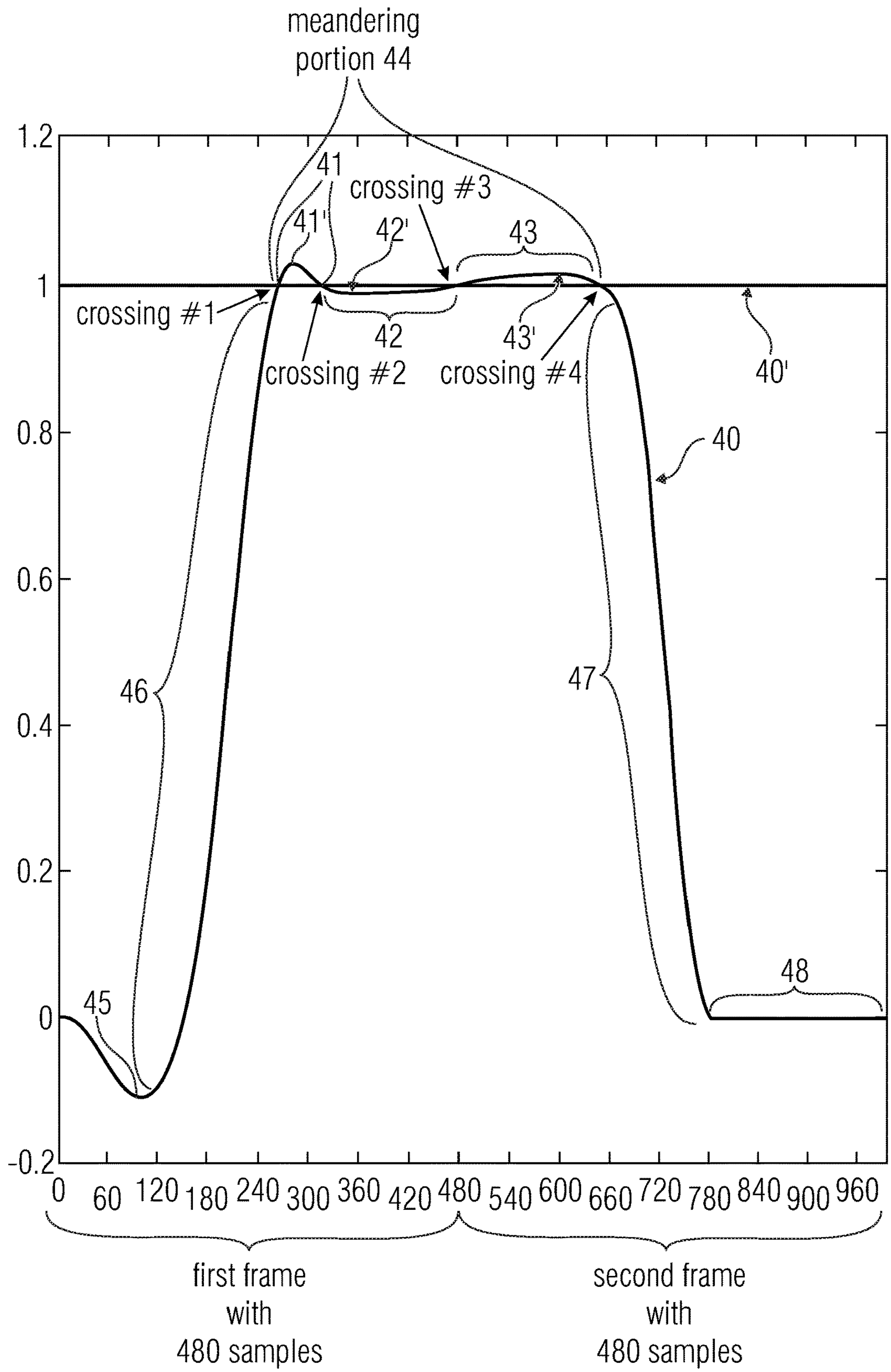

FIG. 4 shows an analysis windowing function 40. The analysis windowing function 40 may be defined between 0 and 2N or between 0 and a value intermediate between the 80% and the 85% or 90% of 2N (e.g., 81.25%). In some examples, the analysis windowing function 40 may be defined in a different (e.g., broader) range.

The analysis windowing function 40 may be defined, at least for one portion, with reference to a linear function 40'. In FIG. 4, the linear function 40' is a constant function whose value is 1. However, the linear function 40' may be in general a linear function, e.g., defined in terms of y=an+b, where n is the index between the 0 and 2N (or its non-zero portion) and a and b are constants.

The analysis windowing function 40 may comprise a meandering portion 44. The meandering portion 44 may be so that the analysis windowing function 40 encounters and/or crosses the linear function 40' at four points #1, #2, #3,#4.

The meandering portion 44 may be so that the analysis windowing function 40 is different from the linear function 40' at the majority of indexes e.g., for more than the 99% of the indexes.

The meandering portion 44 may be so that, at least at one index immediately preceding one of the indexes associated to the points (crossing points #1, #2, #3, #4, the value of the analysis windowing function 40 is greater than the value of the linear function (e.g., 1) at the crossing point (#1, #2, #3, of #4), and, at least at the index immediately subsequent the same index (associated to the crossing point), the value of the analysis windowing function 40 is smaller than the value of the linear function at the crossing point.

The meandering portion 44 may be so that, at least at one index immediately preceding one of the indexes associated to the crossing points #1, #2, #3, #4, the value of the analysis windowing function 40 is smaller than the value of the linear function (e.g., 1) at the crossing point (#1, #2, #3, of #4), and, at least at the index immediately subsequent the same index (associated to the crossing point), the value of the analysis windowing function 40 is greater than the value of the linear function at the crossing point.

The meandering portion 44 may be such that each of the crossing points #1, #2, #3, #4 is not immediately consecutive with the previous and the following ones. For example, between two crossing points #1, #2, #3, and #4, there is at least one index of the analysis windowing function 40 whose value does not coincide with the value of the analysis windowing function 40 at the same index.

The analysis windowing function 40 may be defined so as to be, in correspondence to the meandering portion 44:

- greater than the linear function 40' in a first interval 41 between a first crossing point #1 and a second crossing point #2;
- lower than the linear function 40' in a second interval 42 between the second crossing point #2 and a third crossing point #3;
- greater than the linear function 40' in a third interval 43 between the third crossing point #3 and a fourth crossing point #4.

The first crossing point #1 may precede the second crossing point #2, which may precede the third crossing point #3, which may precede the fourth crossing point #4.

The meandering portion 44 may extend between the first and the last (e.g., fourth) crossing point. The crossing points may be only four, in some examples.

The analysis windowing function 40 may also comprise an initial decreasing portion 45, in which a negative minimum may be reached. The negative minimum may be localized between the 6.25% of 2N and the 18.75% of 2N. The analysis windowing function 40 may also comprise a rapidly increasing portion 46, rapidly increasing from the negative minimum towards the meandering portion 44 (e.g., towards the first crossing point #1). The analysis windowing function 40 may also comprise a rapidly decreasing portion 47, rapidly decreasing from the meandering portion 44 to 0. The analysis windowing function 40 may also comprise a constantly null portion 48, which may start between the 80% and the 85% or 90% of 2N (size of two frames) and continue to the end of 2N.

The absolute maximum value 41' is in the first interval 41 (or in the third interval).

The analysis windowing function 40 may, in the meandering portion 44, have a relative maximum value 43' in the third interval 43 (or in the first interval) and a relative minimum value 42' is in the second interval 42.

The analysis windowing function 40 may, in the meandering portion 44, have the values of the meandering window function 40 in correspondence to the second interval 42 greater than 0.9. The second interval 42 may be above 0.9.

The analysis windowing function 40 may present, in the meandering portion 44, a value lower than the linear function 40' in an interval comprised of the 30% and 50% of two frames (2N). In examples, after the 50% of two frames (2N), the windowing function 40 may greater than the linear function 40'. Hence, point #3 may be in correspondence to the last index of the first frame or in correspondence to the first index of the second frame. In the interval 30% to 50% of two frames, the meandering window portion 44 may be below the linear function.

The maximum 41' of the meandering window function 44 may be less than 25% (and advantageously less than 5% or 3%) greater than the value of the linear function 40' at the same index n.

The analysis windowing function 40 may present a first numerical differentiation between 0.02 and −0.02. The second numerical differentiation may be between $-5*10^{-4}$ and $+5*10^{-4}$, and advantageously between $-3*10^{-4}$ and $+3*10^{-4}$. The third numerical differentiation may be between $-2*10^{-5}$ and $+2*10^{-5}$.

The linear function 40' may be a non-increasing function. In their examples, the linear function 40' may be a non-decreasing function. The linear function 40' may have a value which is constant or varies of maximum +2% or −2%.

The analysis windowing function may be defined so as to be asymmetric.

In some examples, the analysis windowing function may be such that some of the interval (subsections) of the meandering portion 44 are in reverse order with respect to the description above.

Figure 26:
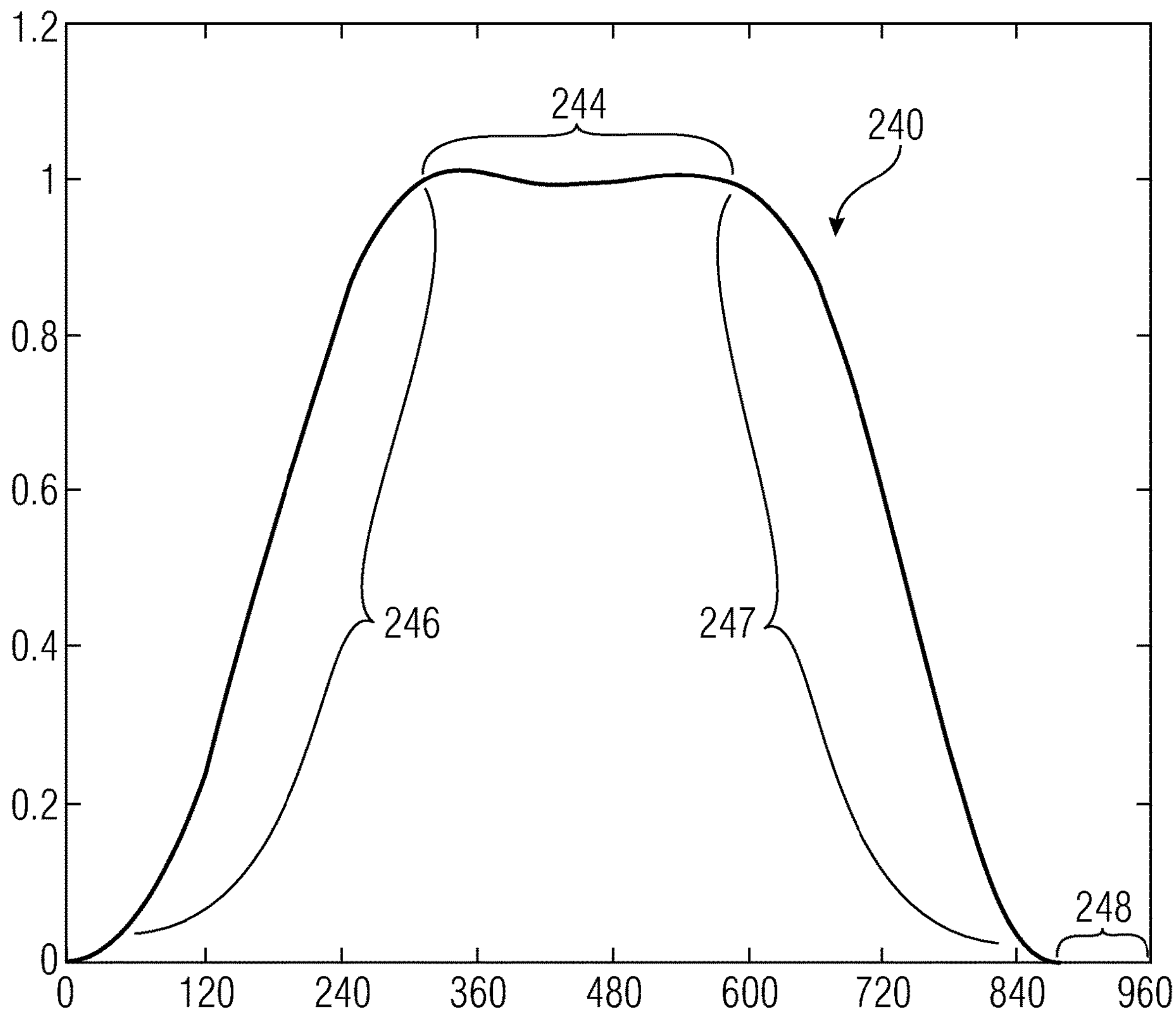
FIGS. 26 to 31 show schemes of functions according to examples.
Figure 27:
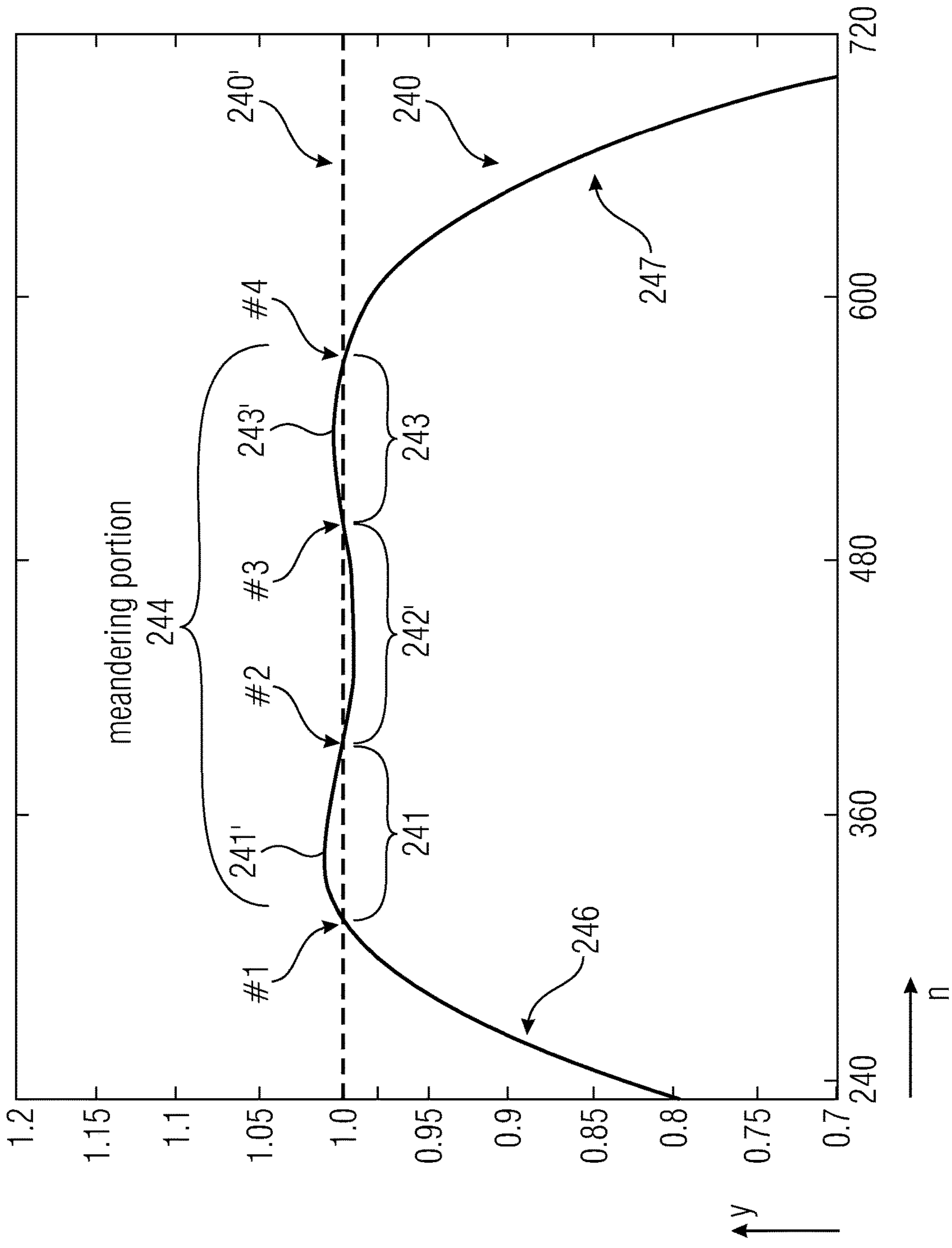

FIGS. 26 and 27 show an analysis windowing function 40 (FIG. 27 is an enlarged view of a portion of FIG. 26). The analysis windowing function 240 may be defined between 0 and 2N or between 0 and a value intermediate between the 80% and the 85% or 90% of 2N (e.g., 81.25%). In some examples, the analysis windowing function 40 may be defined in a different (e.g., broader) range.

The analysis windowing function 40 may be defined, at least for one portion, with reference to a linear function 240'. In FIG. 27, the linear function 240' is a constant function whose value is 1. However, the linear function 40' may be in general a linear function, e.g., defined in terms of y=an+b, where n is the index between the 0 and 2N (or its non-zero portion) and a and b are constants (e.g., a=0, b=1).

The analysis windowing function 240 may comprise a meandering portion 244. The meandering portion 244 may be so that the analysis windowing function 240 encounters and/or crosses the linear function 240' at four points #1, #2, #3, #4.

The meandering portion 244 may be so that the analysis windowing function 240 is different from the linear function 240' at the majority of indexes e.g., for more than the 99% of the indexes.

The meandering portion 244 may be so that, at least at one index immediately preceding one of the indexes associated to the points (crossing points) #1, #2, #3, #4, the value of the analysis windowing function 240 is greater than the value of the linear function 240' at the crossing point (#1, #2, #3, of #4), and, at least at the index immediately subsequent the same index (associated to the crossing point), the value of the analysis windowing function 240 is smaller than the value of the linear function 240' at the crossing point (#1, #2, #3, of #4).

The meandering portion 244 may be so that, at least at one index immediately preceding one of the indexes associated to the crossing points #1, #2, #3, #4, the value of the analysis windowing function 40 is smaller than the value of the linear function 240' at the crossing point (#1, #2, #3, of #4), and, at least at the index immediately subsequent the same index (associated to the crossing point), the value of the analysis windowing function 40 is greater than the value of the linear function 240' at the crossing point.

The meandering portion 244 may be such that each of the crossing points #1, #2, #3, #4 is not immediately consecutive with the previous and the following ones. For example, between two crossing points #1, #2, #3, and #4, there is at least one index of the analysis windowing function 240 whose value does not coincide with the value of the analysis windowing function 240 at the same index.

The analysis windowing function 240 may be defined so as to be, in correspondence to the meandering portion 244:

- greater than the linear function 240' in a first interval 241 between a first crossing point #1 and a second crossing point #2;
- lower than the linear function 240' in a second interval 242 between the second crossing point #2 and a third crossing point #3;
- greater than the linear function 240' in a third interval 243 between the third crossing point #3 and a fourth crossing point #4.

The first crossing point #1 may precede the second crossing point #2, which may precede the third crossing point #3, which may precede the fourth crossing point #4.

The meandering portion 244 may extend between the first and the last (e.g., fourth) crossing point. The crossing points may be only four, in some examples.

The analysis windowing function 240 may have all positive values. The minimum may be a 0 value, which may be at the first index of the analysis windowing function 240 and/or at the last indexes of the analysis windowing function 240. The analysis windowing function 240 may comprise a rapidly increasing portion 246, rapidly increasing towards the meandering portion 244 (e.g., the first crossing point #1). The analysis windowing function 240 may also comprise a rapidly decreasing portion 247, rapidly decreasing from the meandering portion 244 to 0. The analysis windowing function 240 may comprise a constantly null portion 248, which may start between the 84% and the 90% of 2N (size of two frames) and continue to the end of 2N.

The absolute maximum value 241' is in the first interval 41 (or in the third interval).

The analysis windowing function 240 may, in the meandering portion 244, have a relative maximum value 243' in the third interval 243 (or in the first interval) and/or a relative minimum value 242' is in the second interval 242.

The analysis windowing function 240 may, in the meandering portion 244, have the values of the meandering window function 240 in correspondence to the second interval 242 greater than 0.95. The second interval 242 may be above 0.95. The first and/or third interval 241 and/or 243 may be less than 1.05.

The analysis windowing function 240 may present, in the meandering portion 244, a value lower than the linear function 240' in an interval comprised of the 30% and 50% of two frames (2N). In examples, after the 50% of two frames (2N), the windowing function 240 may greater than the linear function 240'. Hence, point #3 may be in correspondence to the last index of the first frame or in correspondence to the first index of the second frame. In the interval 30% to 50% of two frames, the meandering window portion 244 may be below the linear function.

The maximum 241' of the meandering window function 244 may be less than 25% (and advantageously less than 5% or 3%) greater than the value of the linear function 240' at the same index n.

The analysis windowing function 240 may present a first numerical differentiation between −0.01 and +0.01. The second numerical differentiation may be between $-10^{-4}$ and $+10^{-4}$. The third numerical differentiation may be between $-10^{-5}$ and $+10^{--5}$.

The linear function 40' may be a non-increasing function. In their examples, the linear function 40' may be a non-decreasing function. The linear function 40' may have a value which is constant or varies of maximum +2% or −2%.

The analysis windowing function may be defined so as to be asymmetric.

In some examples, the analysis windowing function 240 may be such that some of the interval (subsections) of the meandering portion 244 are in reverse order with respect to the description above.

Figure 28:
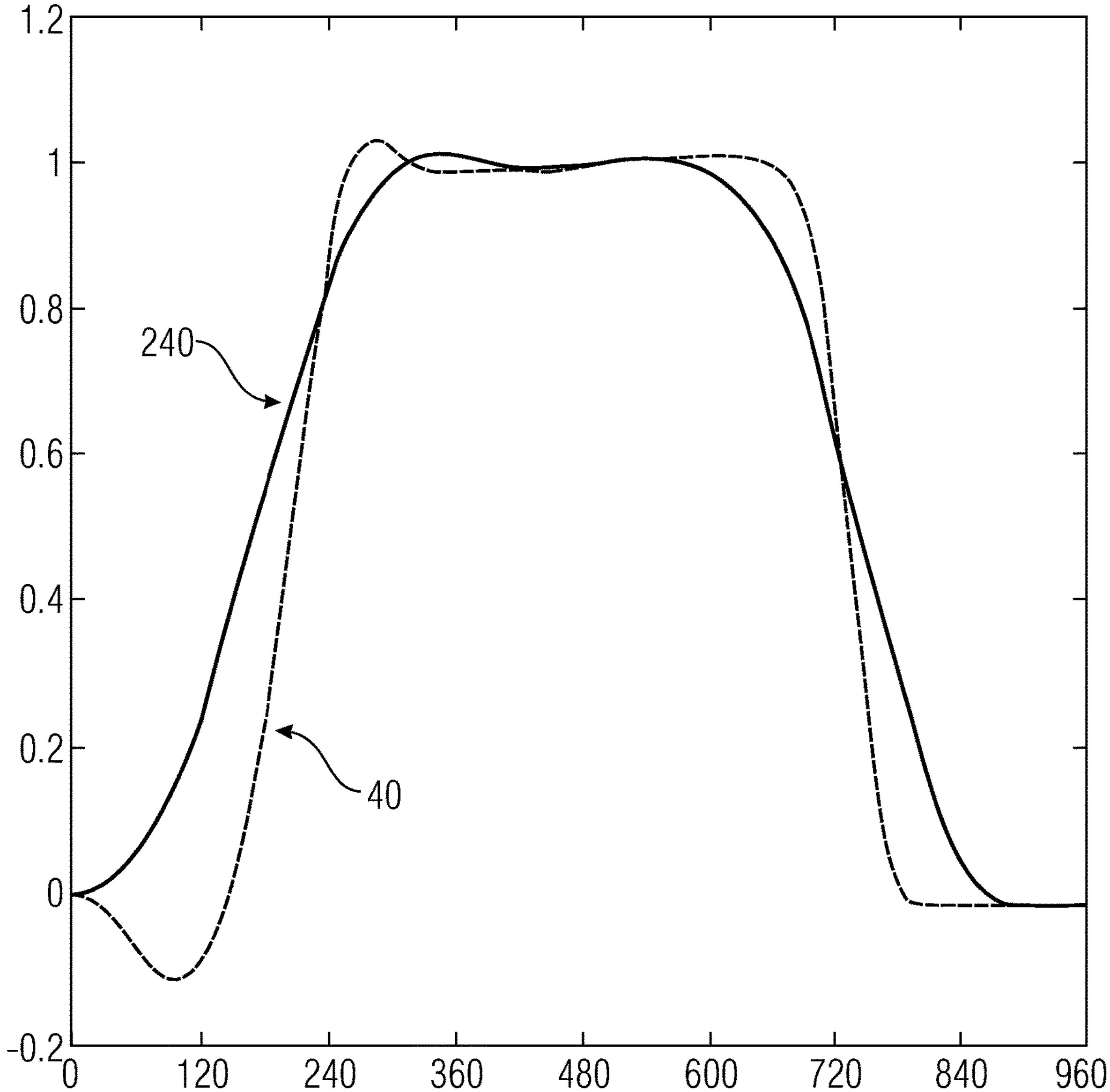
Figure 29:
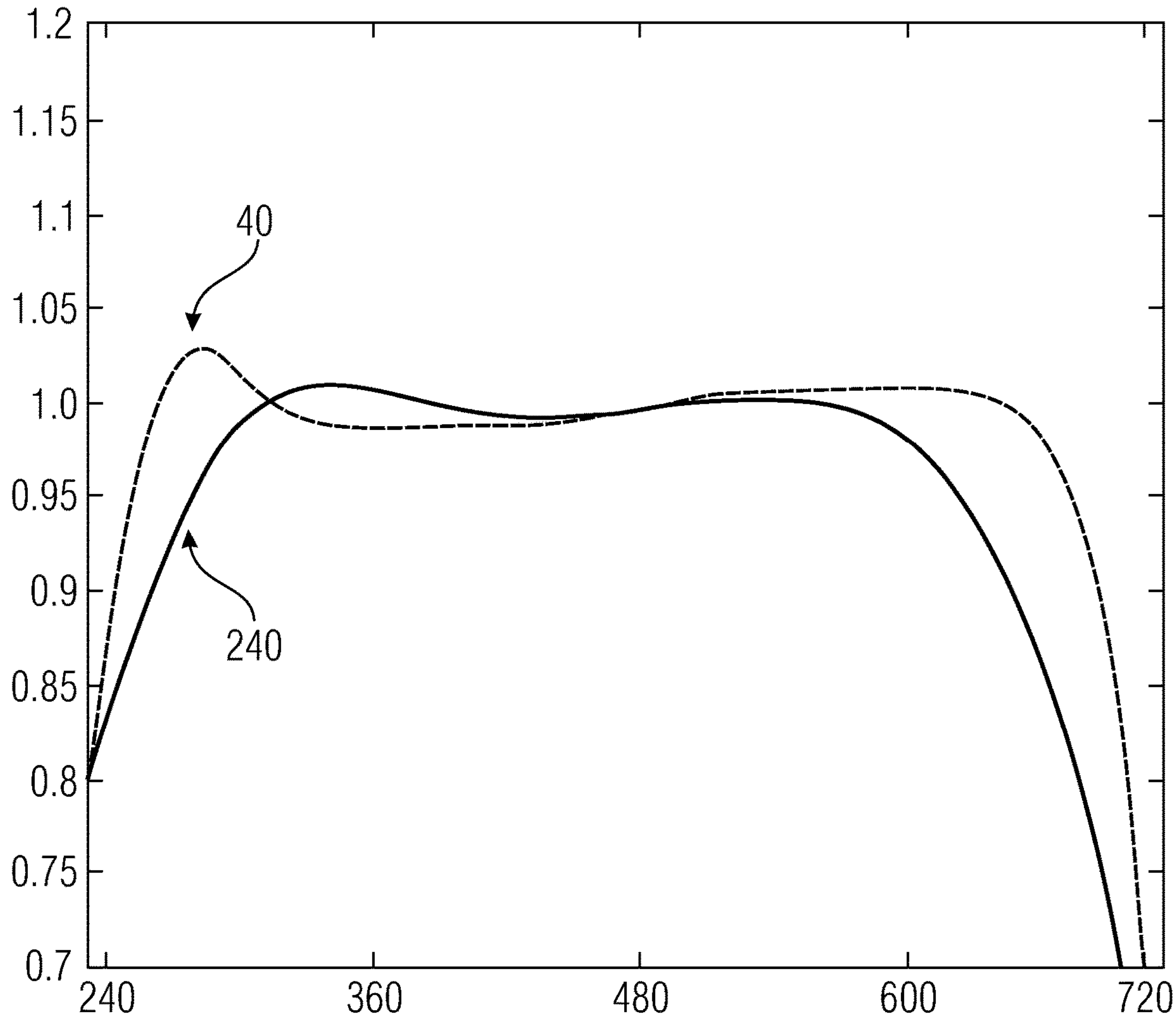

FIGS. 28 and 29 compare the analysis windowing functions 40 and 240.

Figure 6:
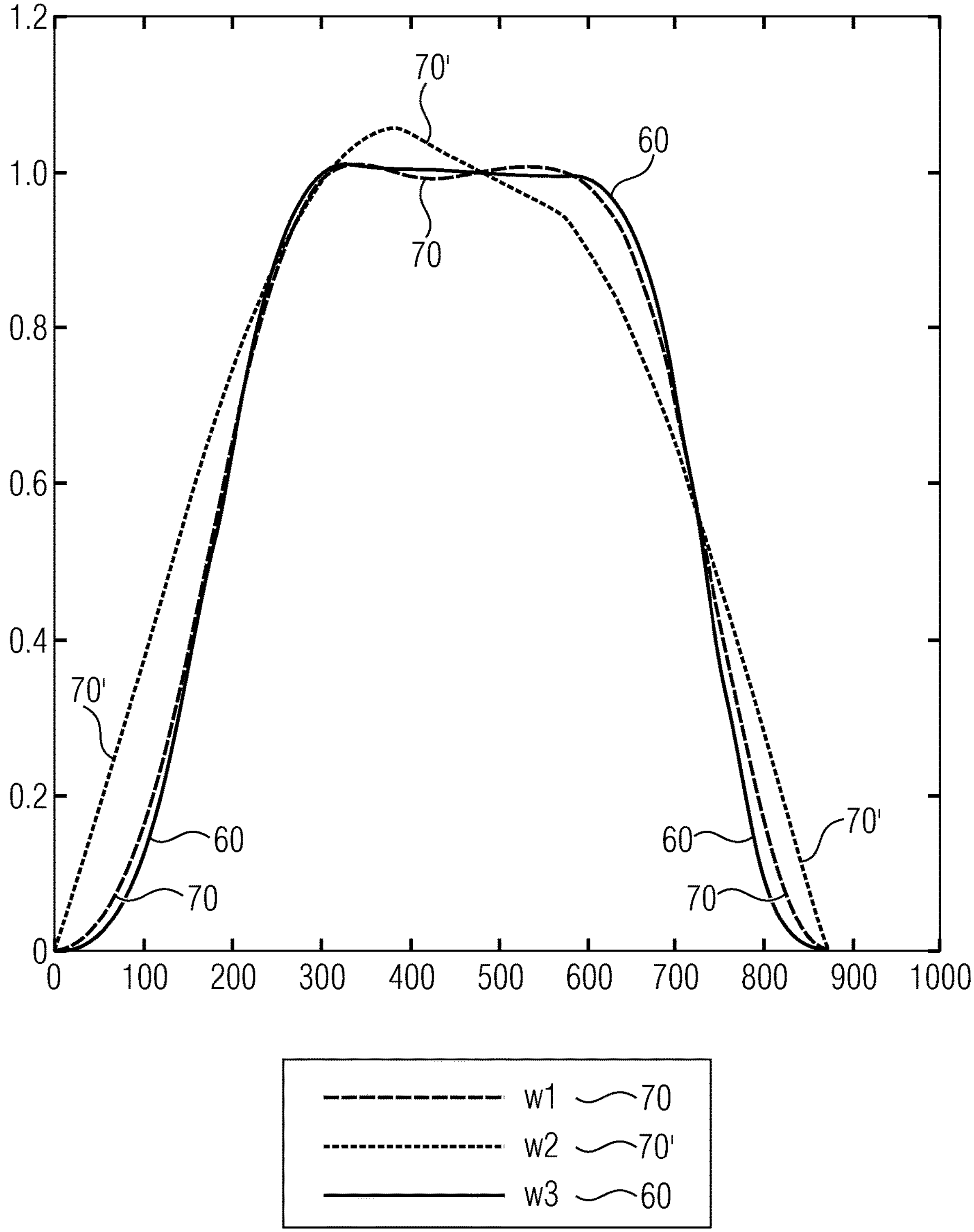
Figure 7:
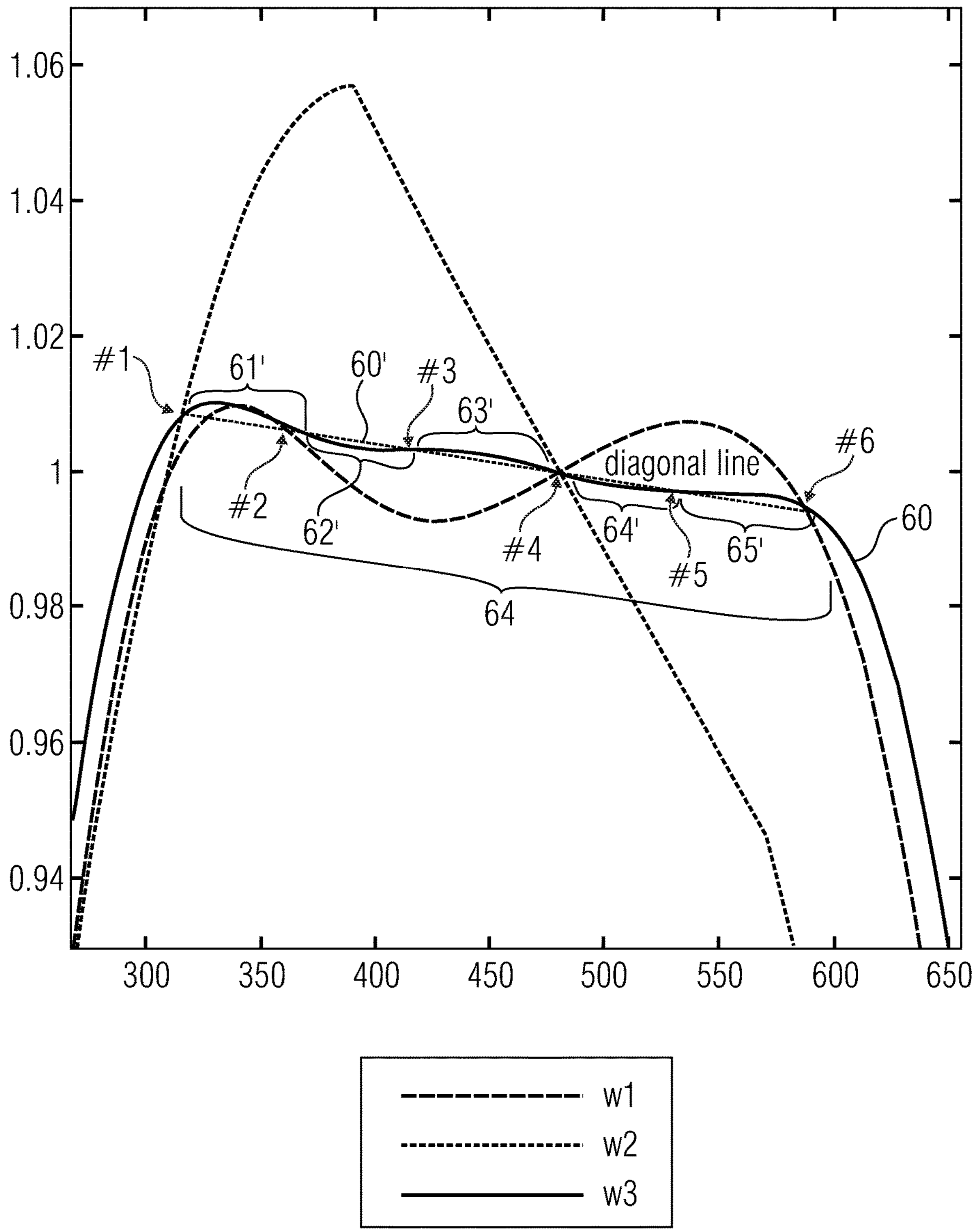

FIG. 6 shows another example of analysis windowing function 60. FIG. 7 shows an enlarged view of the analysis windowing function 60 in correspondence of a meandering portion 64.

In this case, the analysis windowing function 60 may be defined, at least for one portion, with reference to a linear function 60'. In FIG. 7, the linear function 60' is a linear decreasing function ("diagonal line").

The meandering portion 64 may be so that the analysis windowing function 60 encounters and/or crosses the linear function 60' at four points.

The analysis windowing function 40 may be defined so as to be, in correspondence to the meandering portion 64:

- greater than the linear function 60' in a first interval 61' between a first crossing point #1' and a second crossing point #2';
- lower than the linear function 60' in a second interval 62' between the second crossing #2' point and a third crossing point #3';
- greater than the linear function 60' in a third interval 63' between the third crossing point #3' and a fourth crossing point #4';
- lower than the linear function 60' in a fourth interval 64' between the fourth crossing point #4' and a fifth crossing point #5';
- greater than the linear function 60' in a fifth interval 65' between the fifth crossing point #5' and a sixth crossing point #6'.

The absolute maximum value may be in the first interval 61' (in other examples, e.g., where the linear function is increasing, may be in the fifth interval).

The analysis windowing function 60 may, in the meandering portion 64, have a relative maximum value in the third interval 63' and/or in the fifth interval 65', a relative minimum value being in the second interval 62' and/or in the fourth interval 64'.

The analysis windowing function 60 may, in the meandering portion 64, have the value of the windowing function in correspondence to at least one of the first and third interval greater than 0.9 and in particular 0.95 (in other examples, e.g., where the linear function is increasing, may be in the third and fifth interval).

The analysis windowing function 60 may present, in the meandering portion 64, a value greater than the linear function 60' in an interval comprised of the 30% and 50% of two frames (2N).

The maximum of the windowing function 60 may be less than 25% (and advantageously less than 5%) greater than the value of the linear function 60 at the same index n.

The linear function 60' may be a non-increasing function, in particular a strictly decreasing function.

The analysis windowing function may be defined so as to be asymmetric.

In examples, the analysis windowing function may have the intervals which are reversed with respect to FIG. 6.

In examples, a synthesis windowing function may be construed to be symmetric with respect to the analysis windowing function. For example, the symmetry axis may be in the middle of the 2N range (479 or 480, for example).

Figure 9:
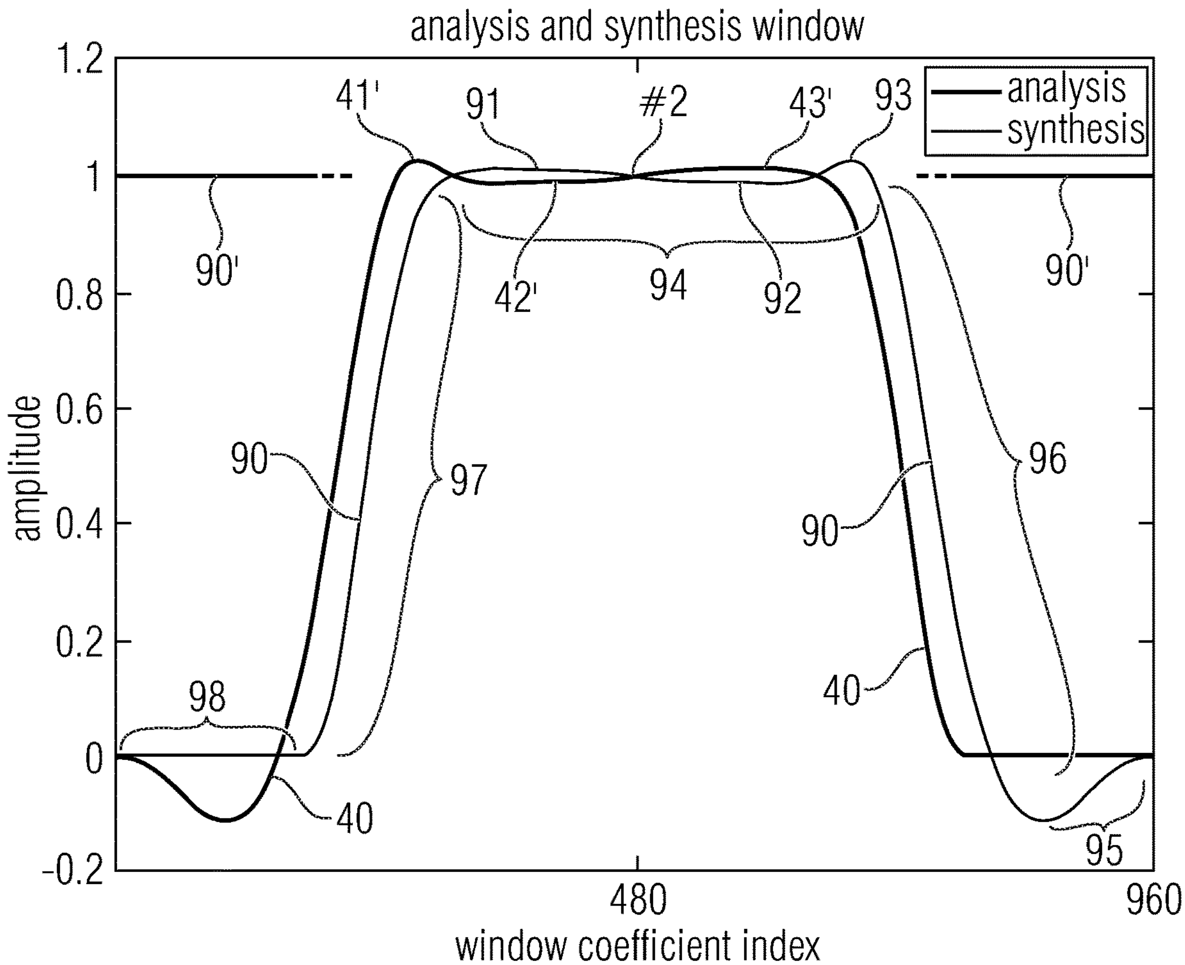
Figure 10:
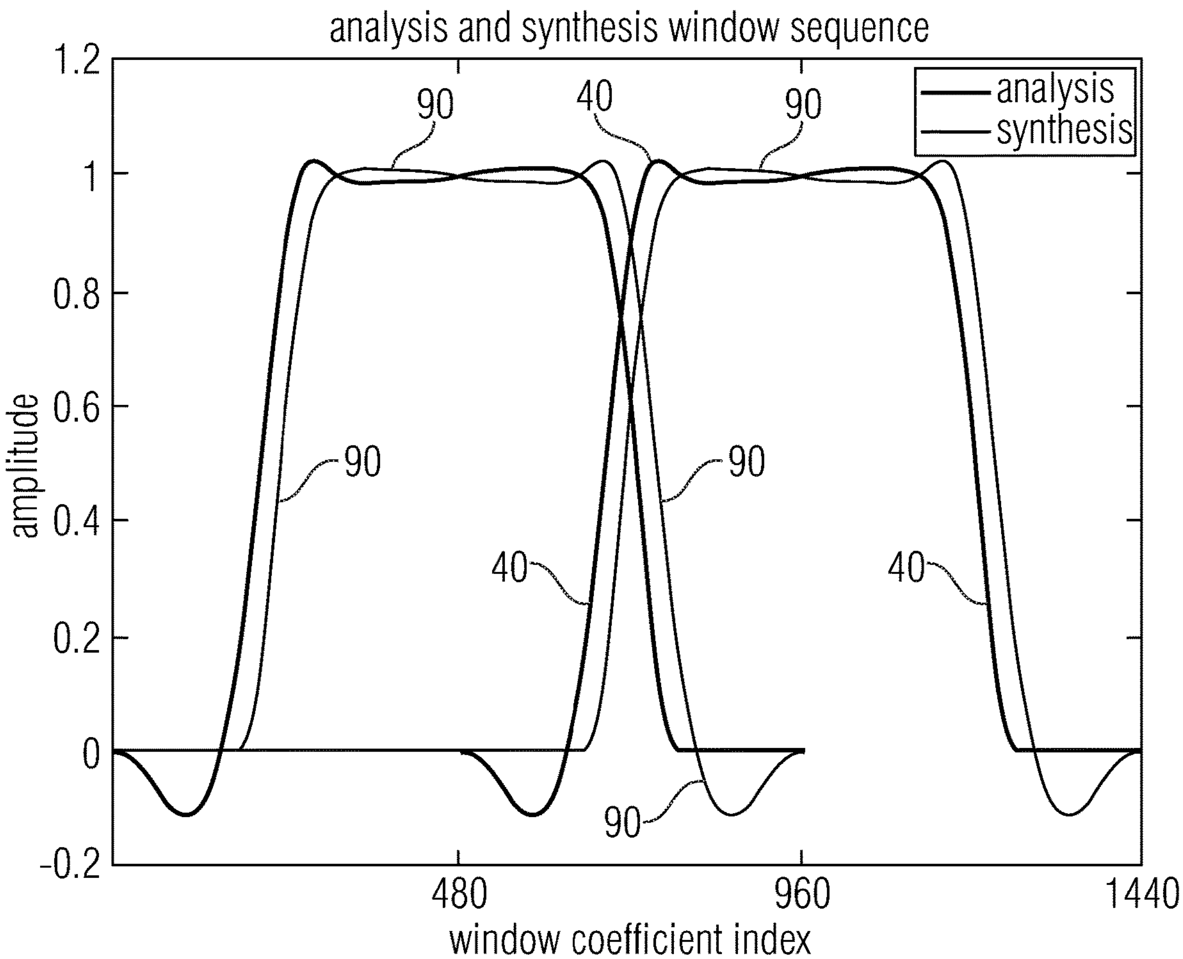
Figure 11:
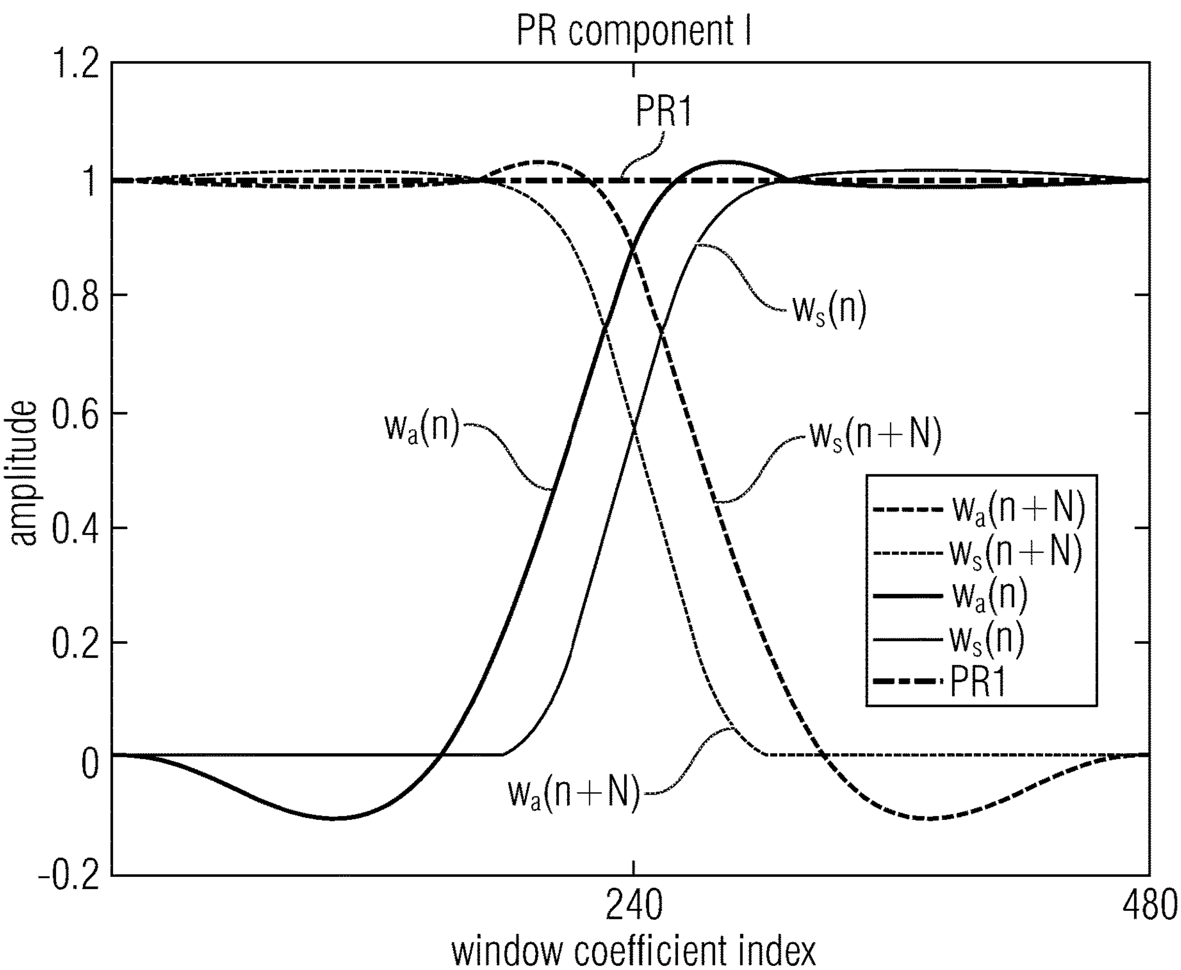
Figure 12:
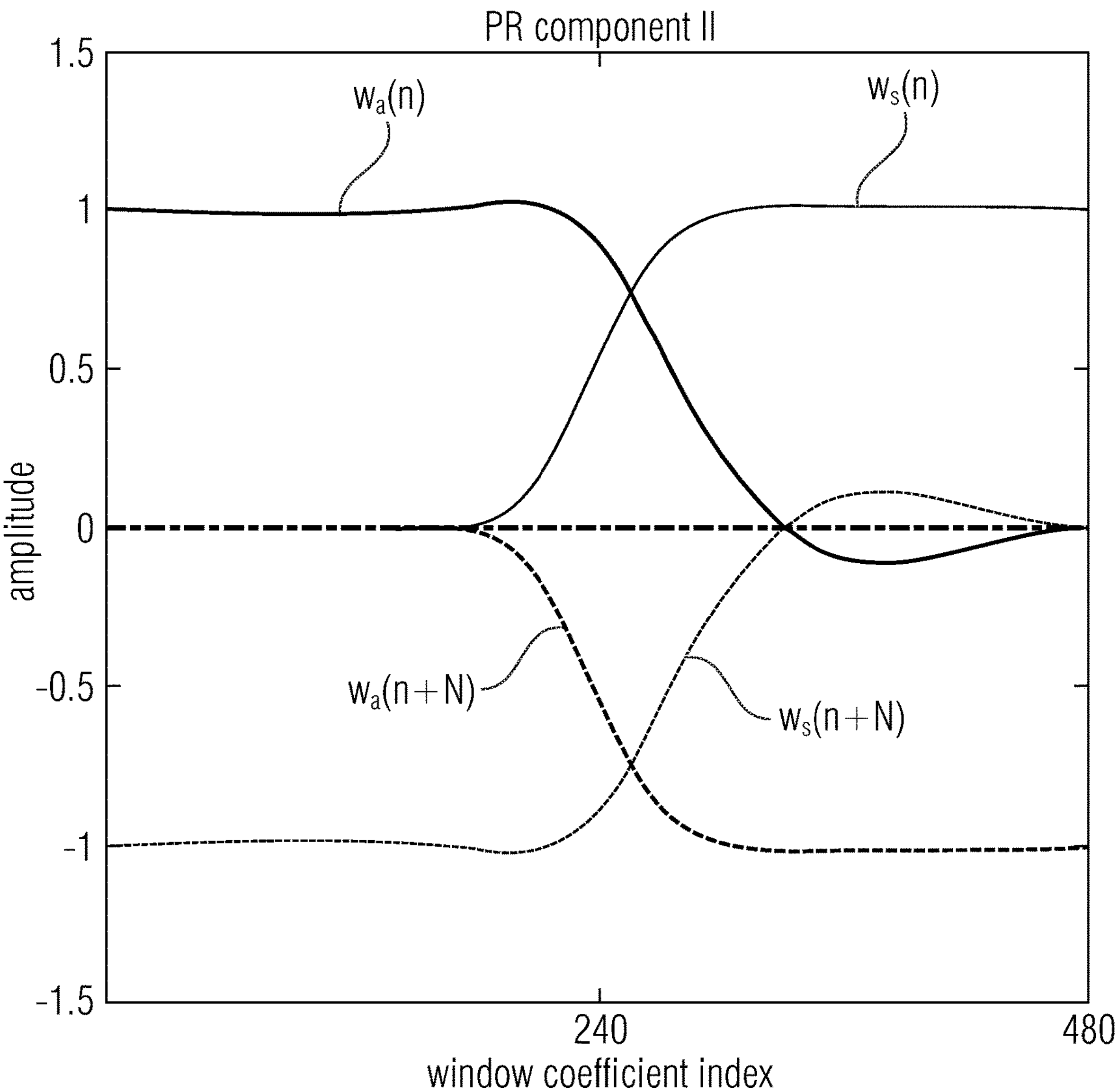

An example of synthesis windowing function 90 is provided in FIG. 9 (e.g., the synthesis windowing function associated to the analysis windowing function 40 of FIG. 4). The synthesis windowing function 90 may be defined between 0 and 2N or between a value intermediate between the 10% or 15% and the 20% of 2N and 2N.

The synthesis windowing function 90 may be defined, at least for one portion, with reference to a linear function (which in this case is not shown but is a constant value 1). In FIG. 9, the linear function may be a constant function whose value is 1. However, the linear function may be in general a linear function, e.g., defined in terms of y=an+b.

The synthesis windowing function 90 may comprise a meandering portion 94. The meandering portion 94 may be so that the synthesis windowing function 90 encounters and/or crosses the linear function 90' (constant 1, only partially shown for the sake of clarity) at four crossing points #1, #2, #3, #4 (only #2 being illustrated). The synthesis windowing function may cross the value 1 in the middle of the window (point #2), i.e. between sample N−1 and N.

The meandering portion 94 may be so that the synthesis windowing function 90 is different from the linear function 90' at the majority of indexes e.g., for more than the 99% of the indexes.

The meandering portion 94 may be so that, at least at one index immediately preceding one of the indexes associated to the points #1, #2, #3, #4, the value of the synthesis windowing function 90 is greater than the value of the linear function (e.g., 1) at the point (#1, #2, #3, of #4), and, at least at the index immediately subsequent the same index (associated to the point), the value of the synthesis windowing function 90 is smaller than the value of the linear function at the crossing point. The meandering portion 94 may be so that, at least at one index immediately preceding one of the indexes associated to the points #1, #2, #3, #4, the value of the synthesis windowing function 90 is smaller than the value of the linear function at the point (#1, #2, #3, of #4), and, at least at the index immediately subsequent the same index (associated to the crossing point), the value of the synthesis windowing function 90 is greater than the value of the linear function at the crossing point (#1, #2, #3, of #4).

The meandering portion 94 may be such that each of the points #1, #2, #3, #4 is not immediately consecutive with another of the points #1, #2, #3, #4. For example, between two points of #1, #2, #3, and #4, there may be at least one index of the synthesis windowing function 90 whose value does not coincide with the value of the synthesis windowing function 90 at the same index.

The synthesis windowing function 90 may be defined so as to be, in correspondence to the meandering portion 94:

- greater than the linear function 90' in a first interval 91 between a first crossing point #1 (not shown in FIG. 9, but representable as symmetrical to point #4 in FIG. 4) and a second crossing point #2 (which, in this case, is at the $480^{th}$ sample, e.g., in the middle of the 2N range);
- lower than the linear function 90' in a second interval 92 between the second crossing point #2 and a third crossing point #3 (not shown in FIG. 9, but representable as symmetrical to point #3 in FIG. 4);
- greater than the linear function 90' in a third interval 93 between the third crossing point #3 and a fourth crossing point #4 (not shown in FIG. 9, but representable as symmetrical to point #1 in FIG. 4).

The synthesis windowing function 90 may also comprise a constantly null portion 98, which may be located between the 10% and the 15% of 2N. The synthesis windowing function 90 may also comprise a rapidly increasing portion 97, rapidly increasing towards the meandering portion 94 from 0. The synthesis windowing function 90 may also comprise a rapidly decreasing portion 96, rapidly decreasing towards a negative minimum from the meandering portion 94. The negative minimum may be localized between the 81.25% of 2N and the 93.7% of 2N. The synthesis windowing function 90 may also comprise a final increasing portion 95, which reaches 0 from the negative minimum.

The absolute maximum value may be in the third interval 93 (or in the first interval).

The synthesis windowing function 90 may, in the meandering portion 94, have a relative maximum value in the first interval 91 (or in the third interval) and a relative minimum value is in the second interval.

The synthesis windowing function 90 may, in the meandering portion 94, have the value of the meandering window function in correspondence to at least one of the first and third interval (91, 93) greater than 0.9. The third interval may be above 0.9.

The synthesis windowing function 90 may present, in the meandering portion 94, a value greater than the linear function in an interval comprised of the 30% and 50% of two frames (2N).

The maximum of the synthesis windowing function 90 may be less than 25% (and advantageously less than 5%) greater than the value of the linear function at the same index n.

The synthesis windowing function 90 may present a numerical differentiation between 0.02 and −0.02. The second numerical differentiation may be between $-5*10^{-4}$ and $+5*10^{-4}$, and advantageously between $-3*10^{-4}$ and $+3*10^{-4}$. The third numerical differentiation may be between $-2*10^{-5}$ and $+2*10^{-5}$.

The synthesis linear function 90 may be a non-increasing function. In other examples, the synthesis linear function 90 may be a non-decreasing function. The synthesis linear function may 90 have a value which is constant or varies of maximum +2% or −2%.

The synthesis windowing function 90 may be defined so as to be asymmetric.

In some examples, the synthesis windowing function 90 may be a function symmetrical with respect to the shape shown in FIG. 9. E.g., the value at 0 would be the value which is at 960 in FIG. 9; the value at 1 would be the value which is at 959 in FIG. 9, and so on.

Figure 30:
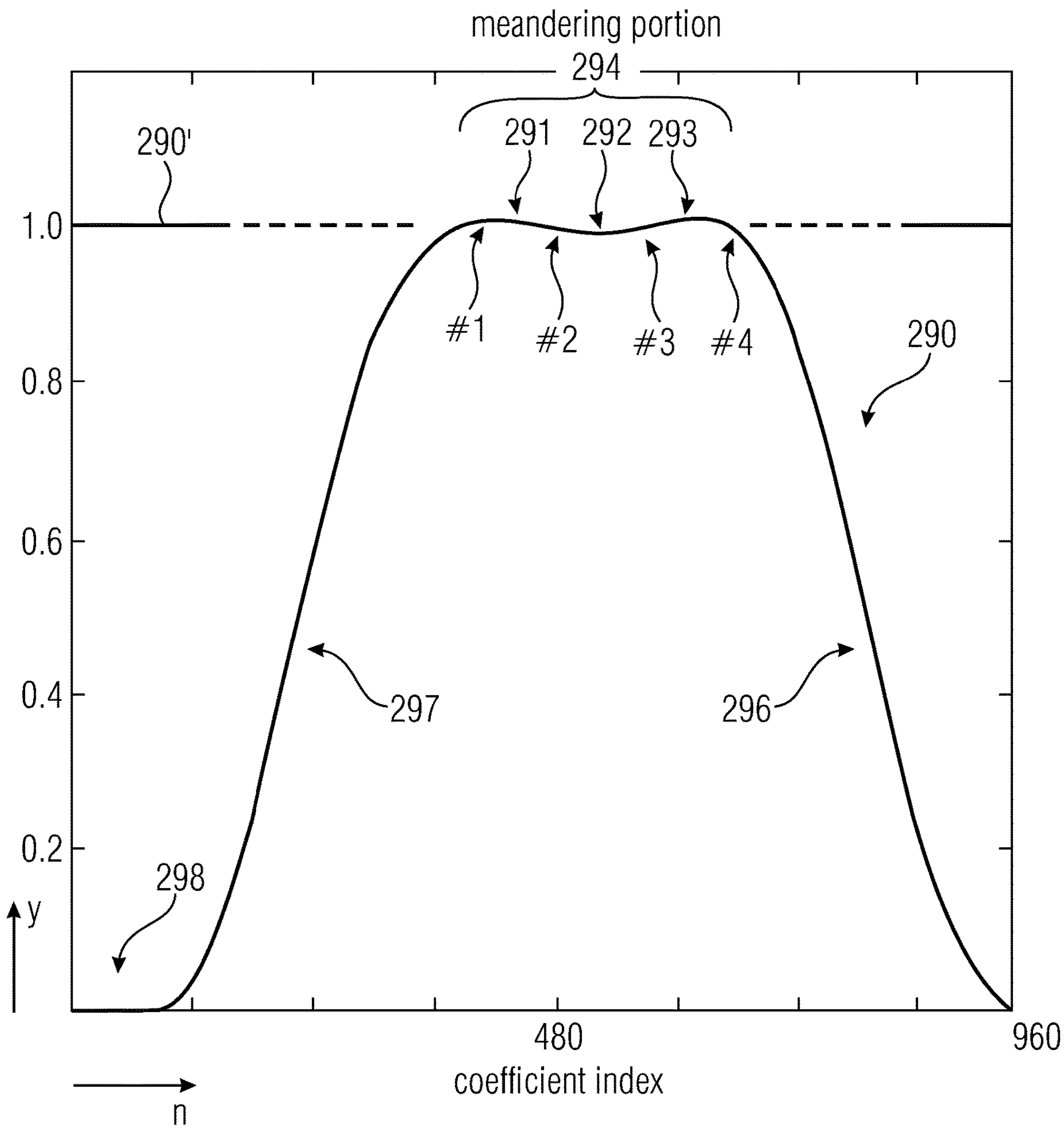

An example of synthesis windowing function 290 is provided in FIG. 30 (e.g., the synthesis windowing function associated to the analysis windowing function 240 of FIGS. 26 to 29). The synthesis windowing function 290 may be defined between 0 and 2N or between a value intermediate between the 10% or 15% and the 20% of 2N and 2N.

The synthesis windowing function 290 may be defined, at least for one portion, with reference to a linear function 290' (which in this case is not shown but is a constant value 1).

In FIG. 30, the linear function 290' may be a constant function whose value is 1. However, the linear function may be in general a linear function, e.g., defined in terms of y=an+b.

The synthesis windowing function 290 may comprise a meandering portion 294. The meandering portion 294 may be so that the synthesis windowing function 290 encounters and/or crosses the linear function 290' (constant 1, only partially shown for the sake of clarity) at four crossing points #1, #2, #3, #4 (only #2 being illustrated). The synthesis windowing function may cross the value 1 in the middle of the window (point #2), i.e. between sample N−1 and N.

The meandering portion 294 may be so that the synthesis windowing function 290 is different from the linear function 290' at the majority of indexes e.g., for more than the 99% of the indexes.

The meandering portion 294 may be so that, at least at one index immediately preceding one of the indexes associated to the points #1, #2, #3, #4, the value of the synthesis windowing function 90 is greater than the value of the linear function (e.g., 1) at the point (#1, #2, #3, of #4), and, at least at the index immediately subsequent the same index (associated to the crossing point), the value of the synthesis windowing function 90 is smaller than the value of the linear function at the crossing point.

The meandering portion 294 may be so that, at least at one index immediately preceding one of the indexes associated to the points #1, #2, #3, #4, the value of the synthesis windowing function 290 is smaller than the value of the linear function at the crossing point (#1, #2, #3, of #4), and, at least at the index immediately subsequent the same index (associated to the crossing point), the value of the synthesis windowing function 290 is greater than the value of the linear function at the crossing point (#1, #2, #3, of #4).

The meandering portion 294 may be such that each of the crossing points #1, #2, #3, #4 is not immediately consecutive with another of the points #1, #2, #3, #4. For example, between two crossing points of #1, #2, #3, and #4, there may be at least one index of the synthesis windowing function 290 whose value does not coincide with the value of the synthesis windowing function 290 at the same index.

The synthesis windowing function 290 may be defined so as to be, in correspondence to the meandering portion 294.

- greater than the linear function 290' (e.g., greater than 1) in a first interval 291 between a first crossing point #1 and a second crossing point #2 (which, in this case, is at the $480^{th}$ sample, e.g., in the middle of the 2N range);
- lower than the linear function 290' in a second interval 292 between the second crossing point #2 and a third crossing point #3;
- greater than the linear function 290' in a third interval 293 between the third crossing point #3 and a fourth crossing point #4.

The synthesis windowing function 290 may comprise a constantly null portion 298, which may be located. at one border of the window (2N samples) and may comprise between 10% and 15% of the samples. The synthesis windowing function 290 may also comprise a rapidly increasing portion 297, rapidly increasing towards the meandering portion 294 from 0. The synthesis windowing function 290 may comprise a rapidly decreasing portion 296, rapidly decreasing towards 0 from the meandering portion 294.

The absolute maximum value may be in the third interval 293 (or in the first interval).

The synthesis windowing function 290 may, in the meandering portion 294, have a relative maximum value in the first interval 291 (or in the third interval) and a relative minimum value is in the second interval.

The synthesis windowing function 290 may, in the meandering portion 294, have the value of the meandering window function in correspondence to at least one of the first and third interval (291, 293) greater than 0.9 or 0.95. The third interval may be above 0.95.

The synthesis windowing function 290 may present, in the meandering portion 294, a value greater than the linear function in an interval comprised of the 30% and 50% of two frames (2N).

The maximum of the synthesis windowing function 290 may be less than 25% (and advantageously less than 5% or 3%) greater than the value of the linear function at the same index n.

The synthesis windowing function 290 may present a numerical differentiation between −0.01 and +0.01. The second numerical differentiation may be between $-10^{-4}$ and $+10^{-4}$. The third numerical differentiation may be between $-10^{-5}$ and $+10^{--5}$.

The synthesis linear function 90 may be a non-increasing function. In other examples, the synthesis linear function 90 may be a non-decreasing function. The synthesis linear function may 90 have a value which is constant or varies of maximum +2% or −2%.

The synthesis windowing function 90 may be defined so as to be asymmetric.

In some examples, the synthesis windowing function 90 may be a function symmetrical with respect to the shape shown in FIG. 9. E.g., the value at 0 would be the value which is at 960 in FIG. 9; the value at 1 would be the value which is at 959 in FIG. 9, and so on.

Discussion

It has been noted that this function has particularly interesting features which are extremely suited for the MDCT (or MDST or other) and IMDCT (or IMDST or other) techniques, in particular for audio coding.

As a metric for the smoothness of MDCT window shape, we use the numerical differentiation like $$dw(t) = \frac{w(1+h) - w(t-h)}{2h} \text{ for } 1 = h \ldots 2N-1-h$$

Another metric in order to assess the quality of MDCT window is temporal shape of the quantization error which is described by $$S_q(t)=w^2(t+N)+w^2(t) \text{ for } t=0 \ldots N-1$$

The quantization error may be introduced in the spectral domain as part of an audio coding process.

Figure 1:
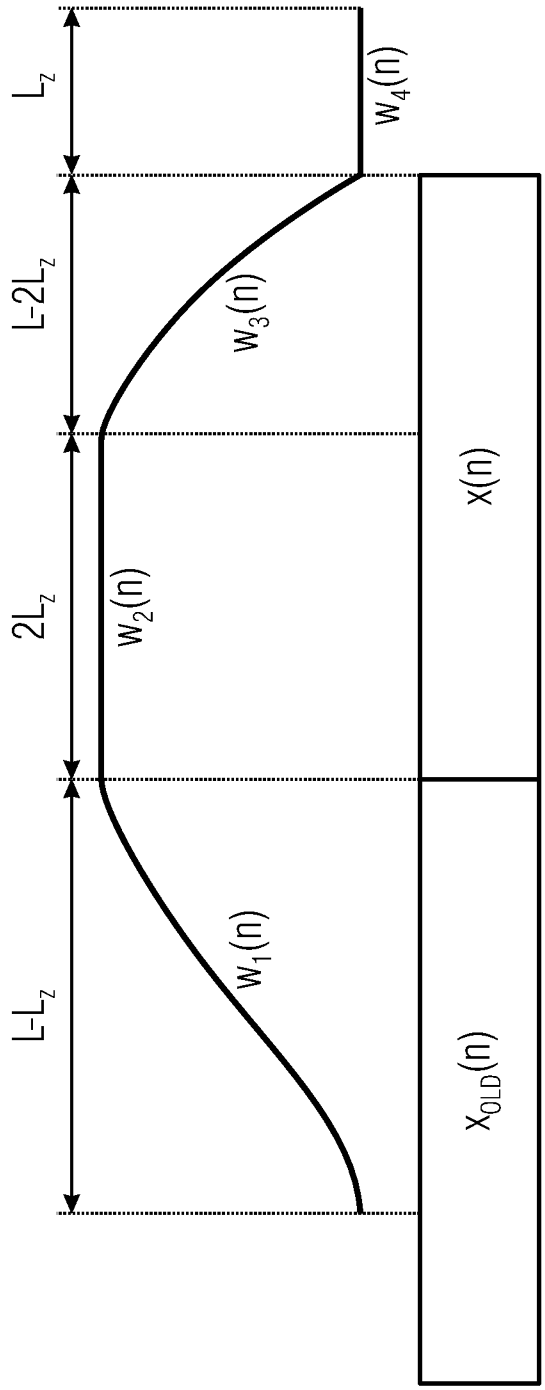
FIGS. 1 and 2 show schemes according to conventional technology.

The ALDO window is here discussed. ALDO is a design approach for asymmetric window providing an improved temporal shape. The design process of the ALDO window as used in the EVS codec is described in (3GPP) and [2]. FIG. 1 shows a schematic window shape for a ALDO window scheme.

An ALDO window consists of four sections, a raising function, a section of strict ones, a decay function and zeros. The number of zeros in $w_4$ also determines the number of ones in $w_2$, with $w_2=2*w_4$. How to obtain $w_1$ and $w_3$ is described in [1] and [2].

Figure 2:
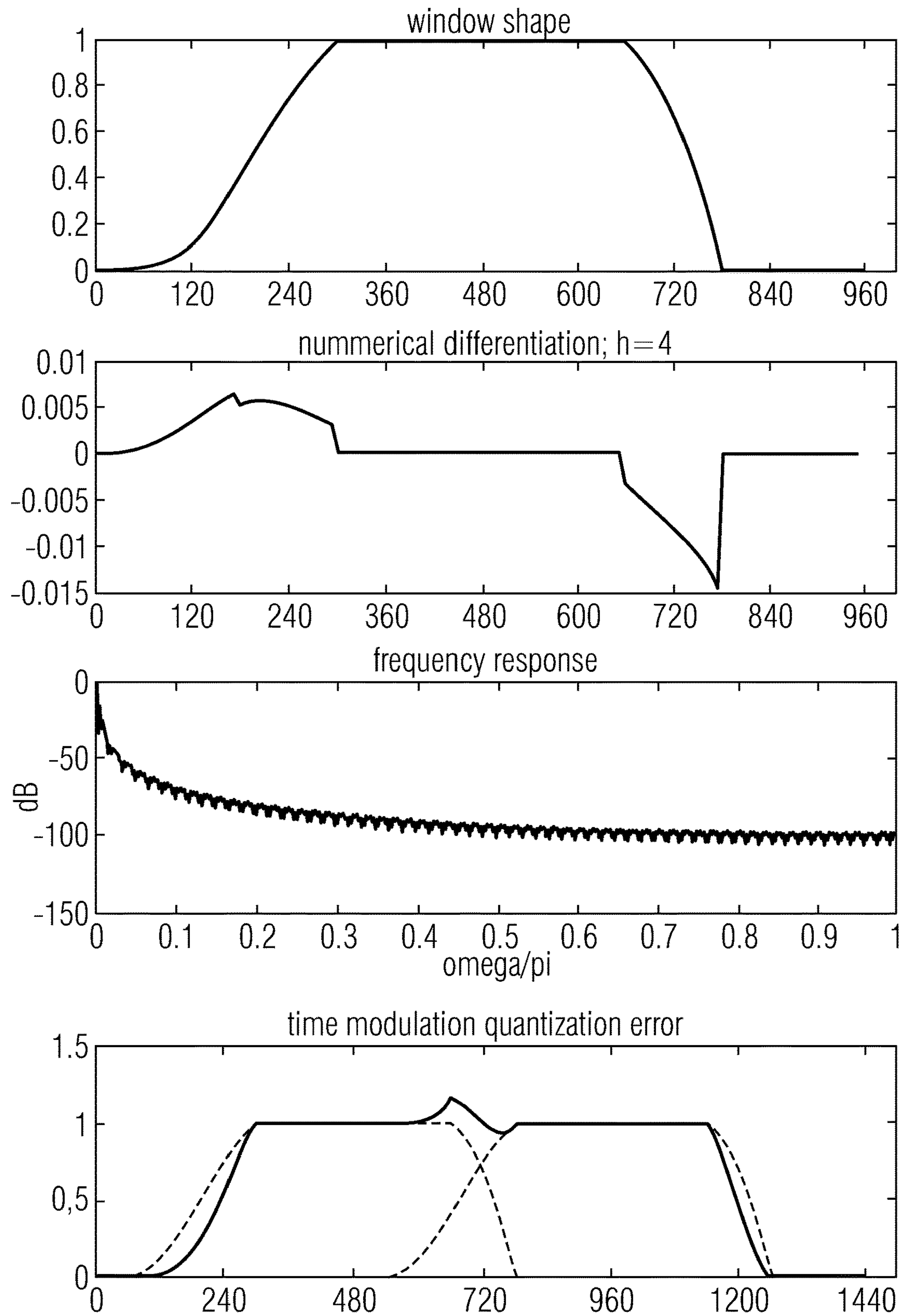

FIG. 2 shows an ALDO window designed according to [1] and [2] for parameters Lz=180 (number of leading zeroes in the MDCT window, $W_4(n)$ in FIG. 1) and the total window length is 960 samples.

As can be seen in the fourth subplot of FIG. 2 (“Time modulation quantization error”), the ALDO shows a good temporal shape of the quantization error which mean the energy sum of two subsequent overlapping synthesis windows is close to one. The optimal result would involve only ones which are achieved by symmetric window shapes.

The drawbacks of this design approach are mainly visible in the second subplot of FIG. 2 (“Numerical differentiation”), where the numerical differentiation is outlined. It can be seen that the window shape is a not a continuously differentiable mathematical function and is therefore non-optimal regarding the frequency response. Due to static ones in the window shape, smooth transitions coming from the raise function and going to the decay function are not possible.

The present invention breaks up with the design constraint to maintain a section of strict ones in order to optimize the temporal shape. Instead, the ones are replaced by a sequence of values meandering around a linear function (e.g., a constant value, such as “1”). This solution allows the smooth and continuous window shape while keeping the temporal shape close to an optimal state.

Figure 3:
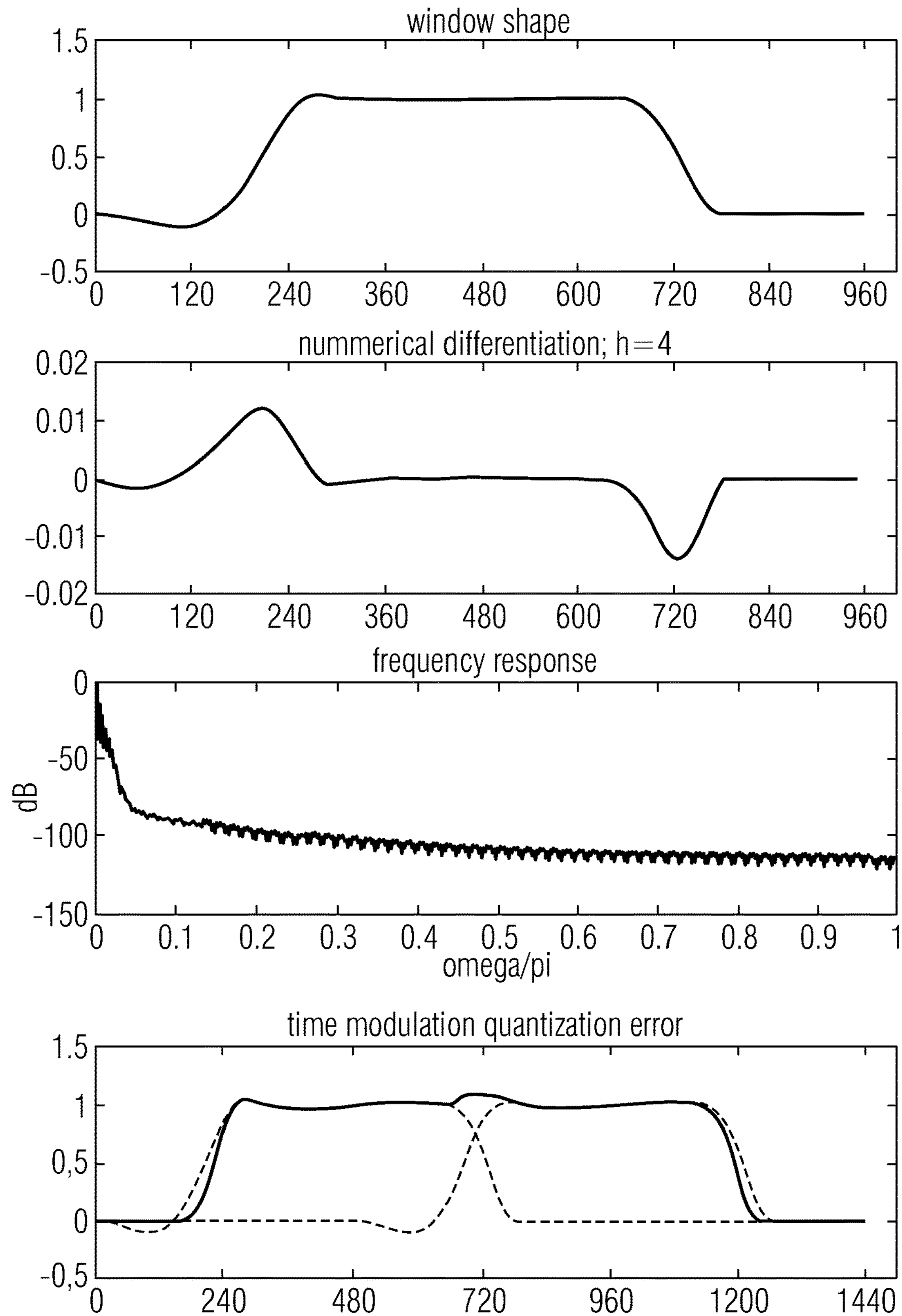
FIGS. 3 to 12 show schemes of functions according to examples.

FIG. 3 shows an example window designed with a meandering section (portion) according to the invention. As can be seen in the fourth subplot of FIG. 3 (“Time modulation quantization error”), the window's property regarding the temporal shaping of the quantization error is similar to the ALDO window. However, comparing the second subplot of FIG. 3 (“Numerical differentiation”) to second subplot of FIG. 2 (ALDO window), it may be understood that the invention permits to generate window shapes which are continuously differentiable. This enables for instance the design of window shapes with higher stop band attenuation, so far not possible with design process used for the ALDO window.

FIG. 4 outlines an example window shape 40 in more detail. In this example, the meandering section is based on crossing, in correspondence of four points, a linear function (in this case, a constant value “1”). Even a higher number of crossings is possible but four is considered as the minimum number.

Such a window can be the result of a mathematical optimization process combining one error function for the frequency response with and error function representing the deviation from the optimal temporal shaping of the quantization noise.

Some implementation involved specific data formats, e.g. fix-point implementations. For such implementation, the value range of the window coefficients might be scales as values above one involve a different scaling. In such cases, the meandering section might not be around one. Only after descaling, the values get into the obvious range.

Figure 5:
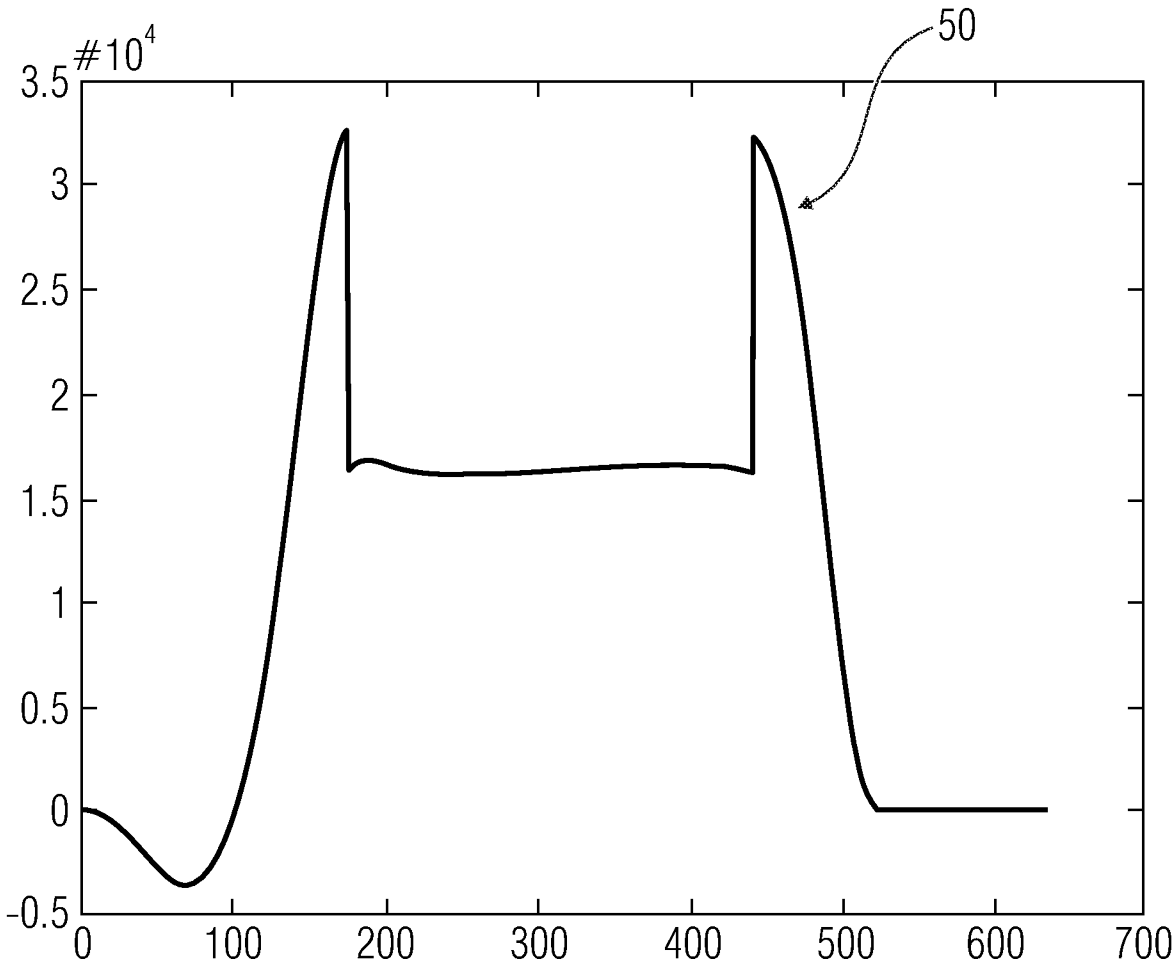

FIG. 5 shows an example how the MDCT window coefficients 50 are represented inside an fix-point implementation. It is an example representation where some values are scaled by $2^x$ and other by $2^{x-1}$ due to fix point architecture.

Considering a general case, the window does not necessarily meander around 1 but may meander around a virtual diagonal line without crossing the one. FIG. 6 shows three different windows, i.e.

- $w_1$: New optimized meandering around 1 (windowing function 70);
- $w_2$: G.718 window (not meandering at all) (windowing function 70');
- $w_3$: New optimized window for special case: Meandering around a diagonal (windowing function 60).

The described MDCT window fulfils the perfect reconstruction property. For that, we consider the MDCT to be decomposed as a windowing operation, a time domain alias cancellation (TDAC) step and a discrete cosine transform (DCT) type IV kernel, as for instance described in [3].

Figure 8:
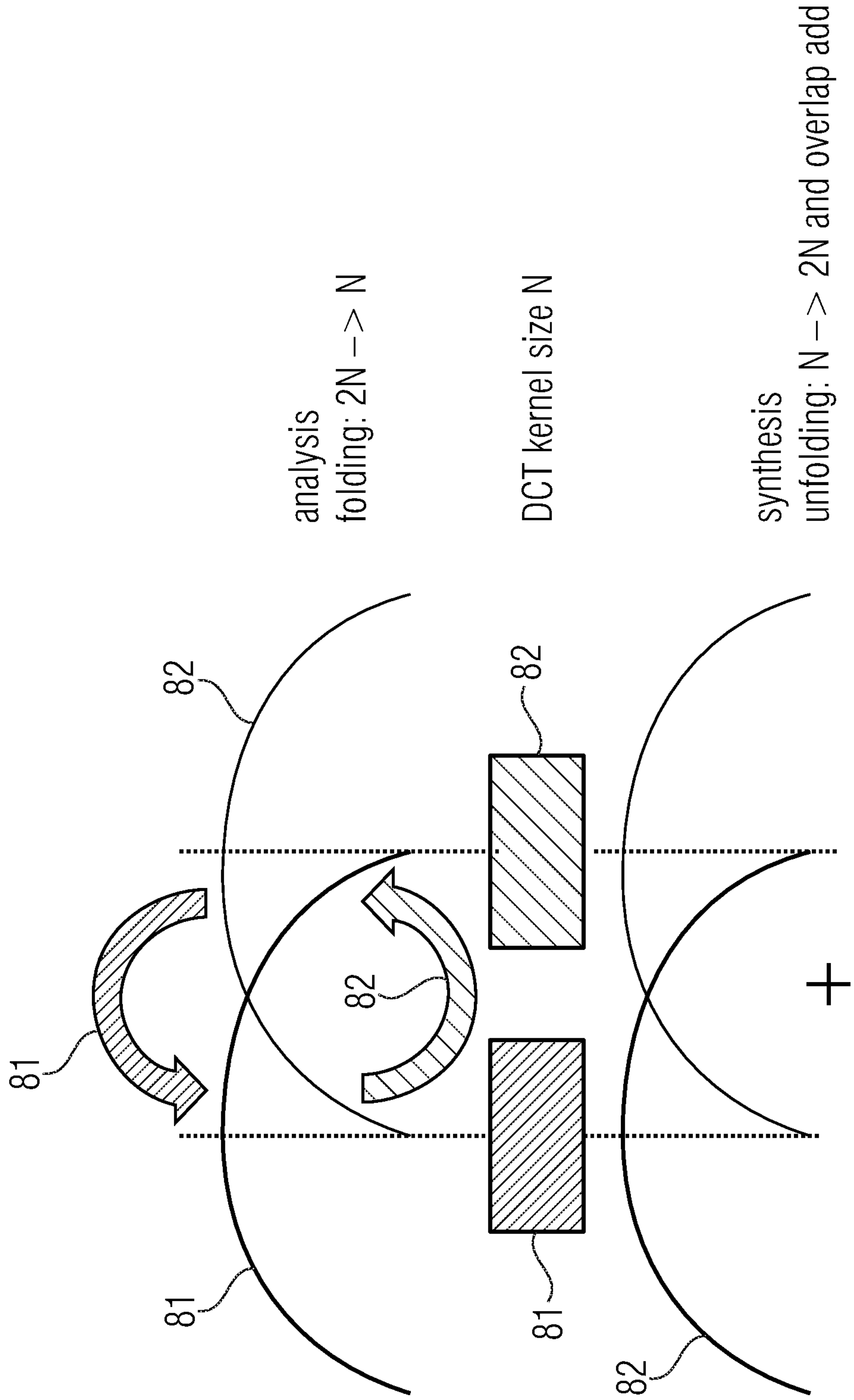

Therefore, the windowing and TDAC can be seen as a folding step on analysis and an unfolding step on synthesis side. At the latter one, the unfolded sequences of two blocks are combined in the overlap-and-add operation. See FIG. 8, which refers to a scheme of a block 1 (81) and a block 2 (82).

For the overlapping region on the analysis side, the windowing and TDAC of block 1 can be described as $$P_1(n)=w_a(N+n)-w_a(2N-1-n) \text{ for } n=0 \ldots N-1$$

and block 2

$$P_2(n)=w_a(N+n)+w_a(N-1-n) \text{ for } n=0 \ldots N-1$$

For the syntheses side, P1 and P2 are folded-out, windowed and overlap-and-add is performed:

$$O(n)=w_s(N+n)P_1(n)+w_s(n)P_2(n) \text{ for } n=0 \ldots N-1$$

This can be written as $$O(n)=w_a(N+n)w_s(N+n)-w_a(2N-1-n)w_s(N+n)+w_a(n)w_s(n)+w_a(N-1-n)w_s(n)$$

for n=0 . . . N−1 which can be separated into two components:

PR1: Perfect reconstruction component $$w_a(N+n)w_s(N+n)+w_a(n)w_s(n)=1$$

for n=0 . . . N−1

PR2: Alias cancellation component $$w_a(N-1-n)w_s(n)-w_a(2N-1-n)w_s(N+n)=0$$

for n=0 . . . N−1

FIGS. 9-12 show analysis and synthesis sequences.

Figure 19:
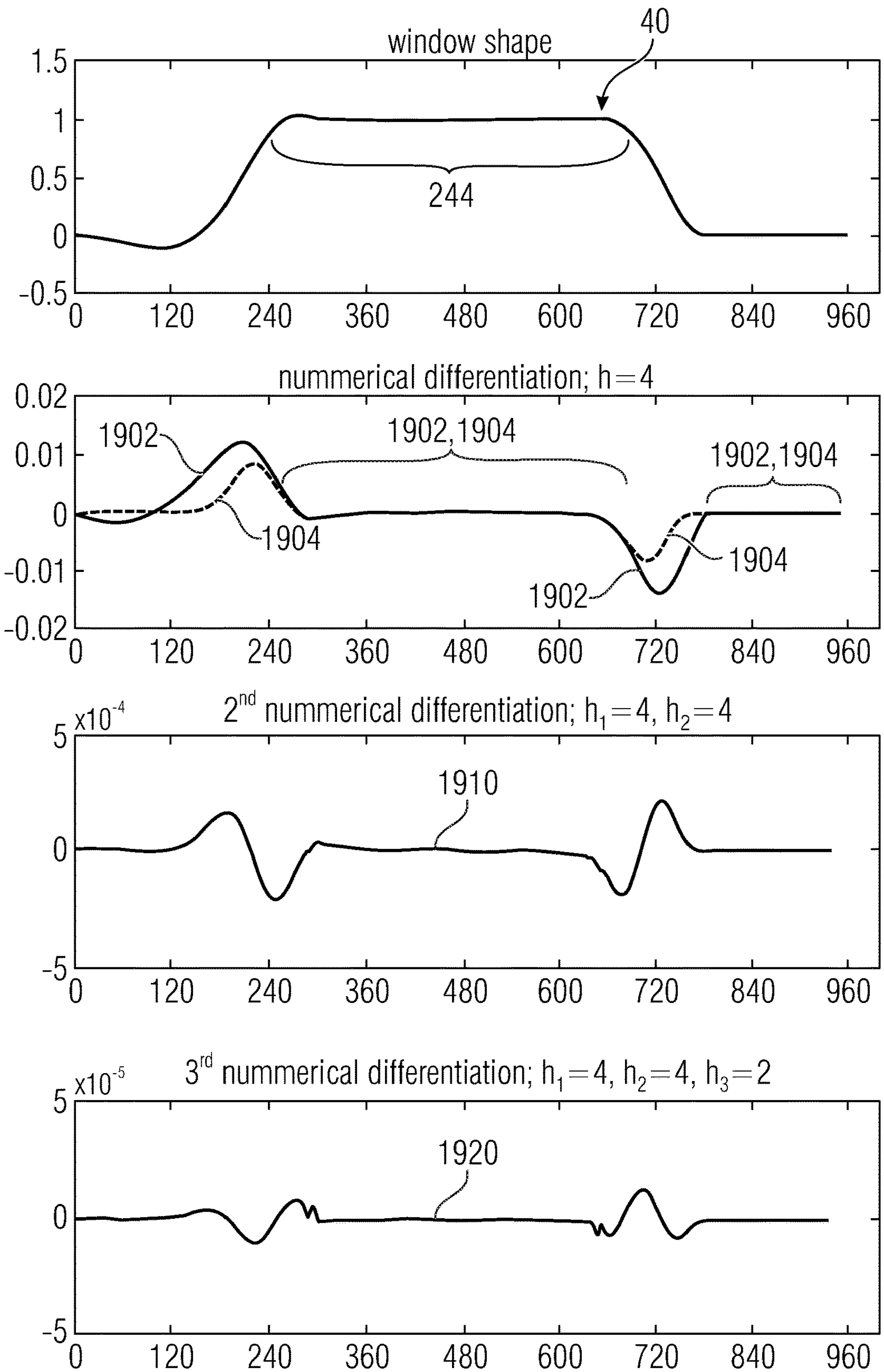
FIG. 19 shows a scheme according to examples.
Figure 20:
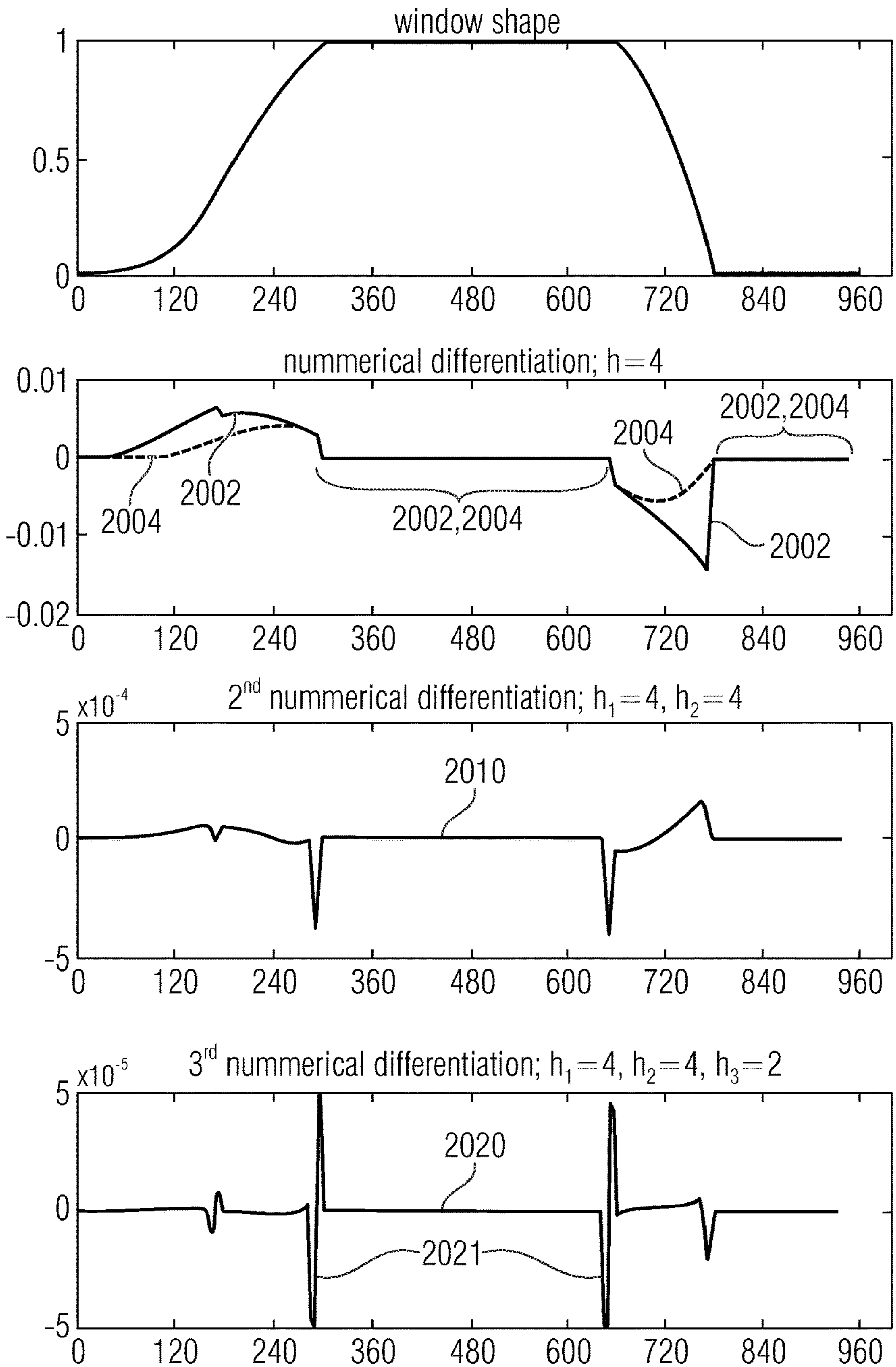
FIG. 20 shows a scheme according to conventional technology.

Reference is now made to FIGS. 19 and 20 with reference to the numerical differentiation of the present analysis and synthesis windowing functions.

By considering also the 2$^{nd}$ and 3$^{rd}$ numerical differentiation, it is possible to clearly distinguish the properties of present examples (e.g., FIG. 19 with reference to the example of FIG. 4, and FIG. 31 with reference to the example of FIG. 26) with those of conventional technology (ALDO, FIG. 20).

As a metric for the smoothness of modulated lapped transform window shape (e.g., MDCT or MDST window shape), we may use the numerical differentiation like:

$$dw(t)=\frac{w(t+h)-w(t-h)}{2h}\quad \text{for } t=h\ \ldots\ 2N-1-h$$

In order to weight the importance of each coefficient, i.e. higher amplitudes have a higher weight, the following describes a weighted.

$$wdw(t)=dw(t)\frac{w(t+h)+w(t-h)}{2}\quad \text{for } t=h\ \ldots\ 2N-1-h$$

This allows neglecting low level window coefficients in the analysis of the continuity of the window shape.

Figure 31:
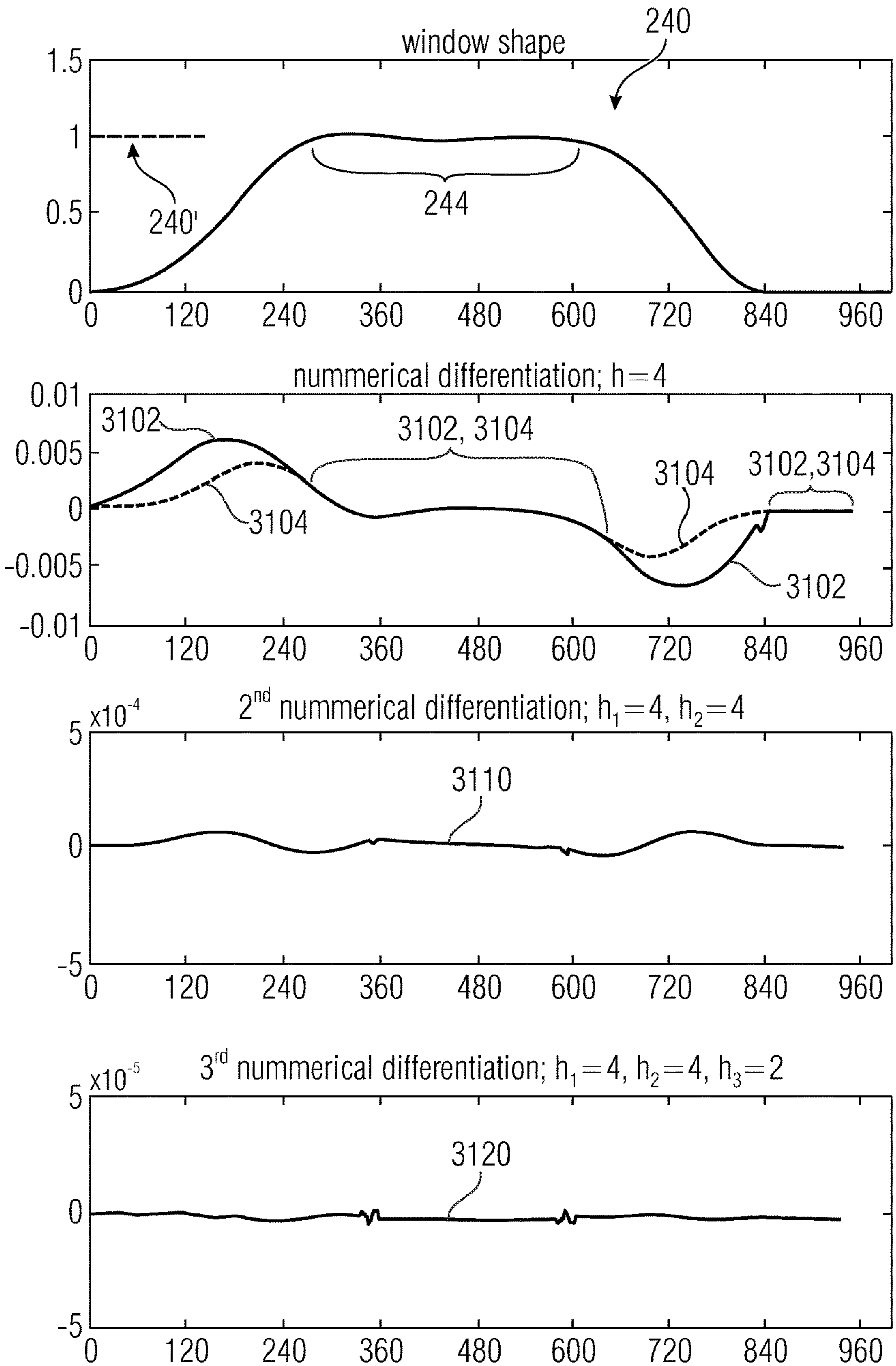

In FIGS. 19 and 20 and 31, the 1$^{st}$ numerical differentiation is plotted in the regular and weighted version (dashed). 1902 and 3102 refer to the 1$^{st}$ numerical differentiation for the inventive windowing function; 1904 and 3104 (dashed) refer to the weighted version of the 1$^{st}$ numerical differentiation for the inventive windowing function. 2002 refers to the 1$^{st}$ numerical differentiation for the ALDO windowing function; 2004 (dashed) refers to the weighted version of the 1$^{st}$ numerical differentiation for the ALDO windowing function.

For the 2$^{nd}$ and 3$^{rd}$ numerical differentiation (ND), the weighted version of the 1$^{st}$ one is used. 1910 and 3110 refer to the weighted version of the 2$^{nd}$ numerical differentiation for the inventive windowing function. 2010 refers to the weighted version of the 2$^{nd}$ numerical differentiation for the ALDO windowing function. 1920 refers to the weighted version of the 3$^{rd}$ numerical differentiation for the inventive windowing function. 2020 and 3120 refer to the weighted version of the 3$^{rd}$ numerical differentiation for the ALDO windowing function.

As can be observed, the 2$^{nd}$ ND version shows some clear peaks 2021 for the ALDO window while the inventive windows show only moderate changes. For the 3$^{rd}$ ND, also the amplitude level of both windows clear differentiate and can be expressed.

An analysis of the degree of freedom for window design for ALDO and for the inventive window function is here presented.

The ALDO design approach [2] offers only the parameters C1, C2 and the number of zeros Lz as degree of freedom. Any focus regarding near field or far field attenuation is not possible by the proposed method as the given degree of freedom in the design process is very limited.

In order to extend the ALDO algorithm and allowing a higher degree of freedom, the design approach in [2] has to be given up and has to be exchanged by a numerical optimization method. In a first step the section of strict ones in the middle of the window is maintained while the free window coefficients (or design parameter) are optimized.

Assuming that analysis and synthesis window are typically time reversed versions of each other, the perfect reconstruction constraint can be expressed by $$w_a(N+n)w_s(N+n)+w_a(n)w_s(n)=1 \text{ for } n=0\ \ldots\ N-1$$

$$\rightarrow w(N+n)w(2N-n)+w(n)w(N+n)=1 \text{ for } n=0\ \ldots\ N-1$$

This can typically be fulfilled by restricting the number of free coefficients to 1.5N, e.g. by $$w(2N-n)=(1-w(n)w(N+n))/w(N+n) \text{ for } n=0\ \ldots\ N-1$$

The zero section is located inside w(2N−n). For the constraint of the strict ones in the middle, 2*Lz of the window coefficients are considered as non-free coefficients. For a transformation length of N=480 and a window size of 2N and Lz=180, this leads to a degree of freedom of 1.5N−2*Lz=360 free coefficients. This window is referred to as intermediate window.

The new invention increases the degree of freedom to the maximum by exchanging the portion of strict ones by a meandering section (e.g., 44, 64, 94) around one or around any other linear (e.g., diagonal) line (e.g., 40', 60', 90'). Thus, only half of the middle section needs to be excluded from the free coefficients. Consequently, the number of available coefficients is increased to 1.5*480−180=540 free coefficients. This allows to maximally optimize the frequency response towards any indented focus.

Figure 21:
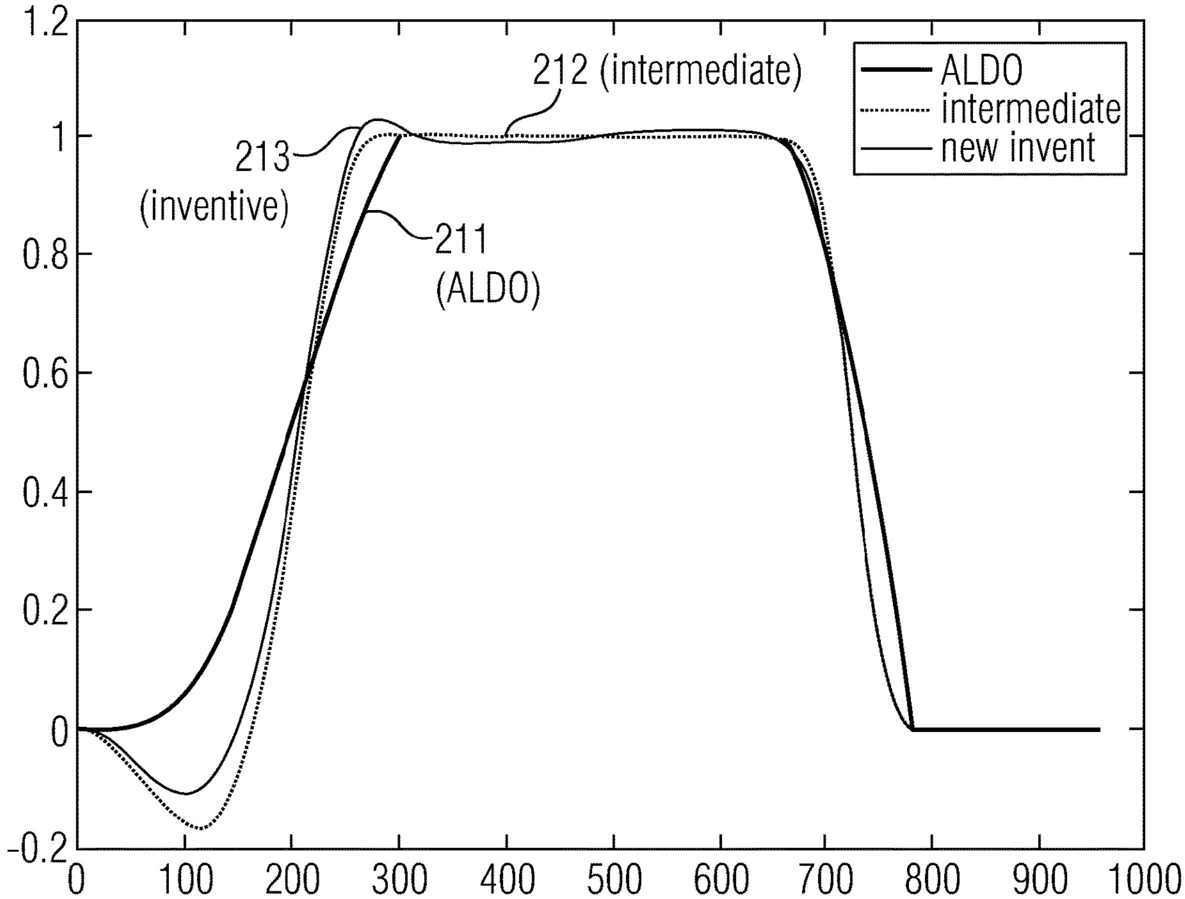
FIGS. 21 to 25 shows schemes according to examples.
Figure 22:
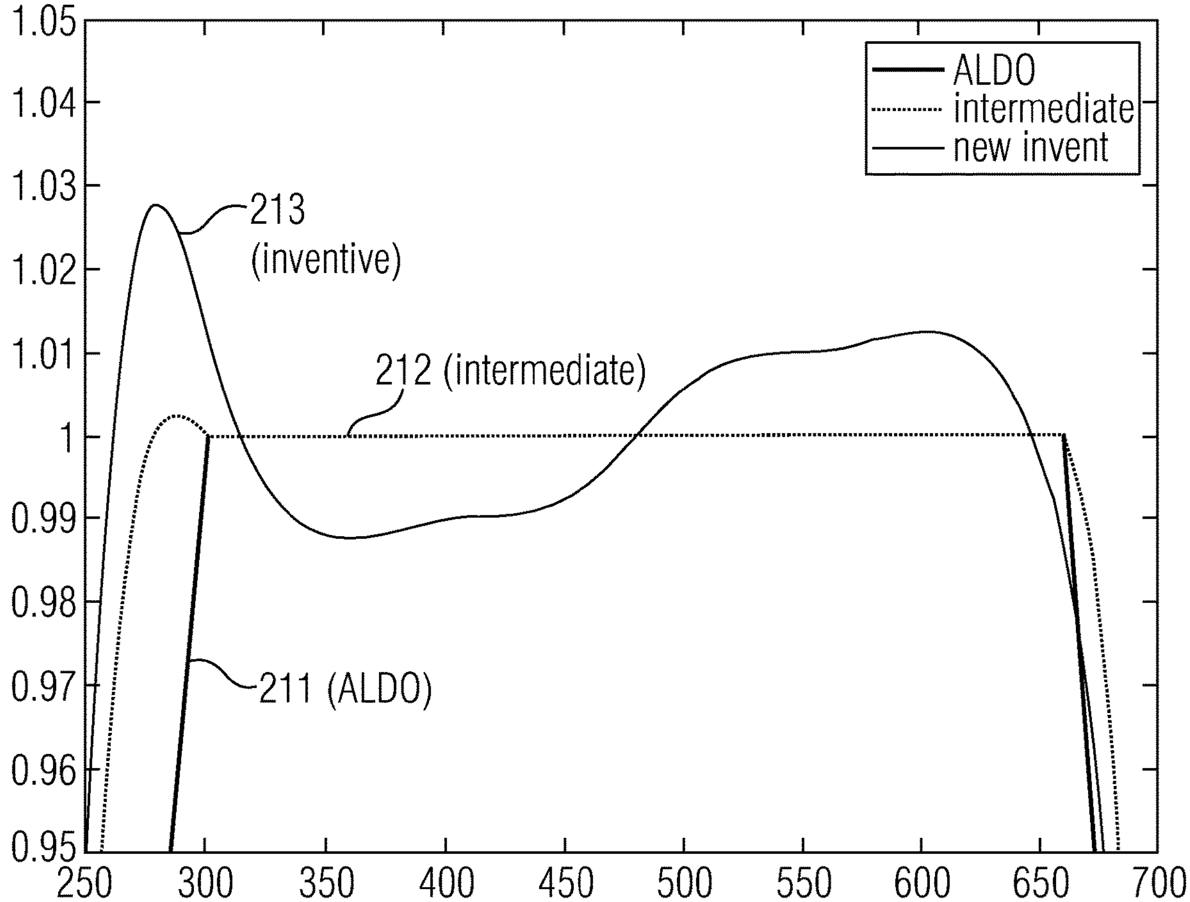

FIGS. 21 and 22 show a comparison of the design approaches. In particular, FIG. 21 shows a comparison window shape ALDO (211) vs intermediate (212) vs new invention (213). FIG. 22 shows a zoom (enlarged view) of window shapes ALDO (211), intermediate (212), new invention (213).

The intermediate window and the new invention window are optimized towards the same focus.

Figure 23:
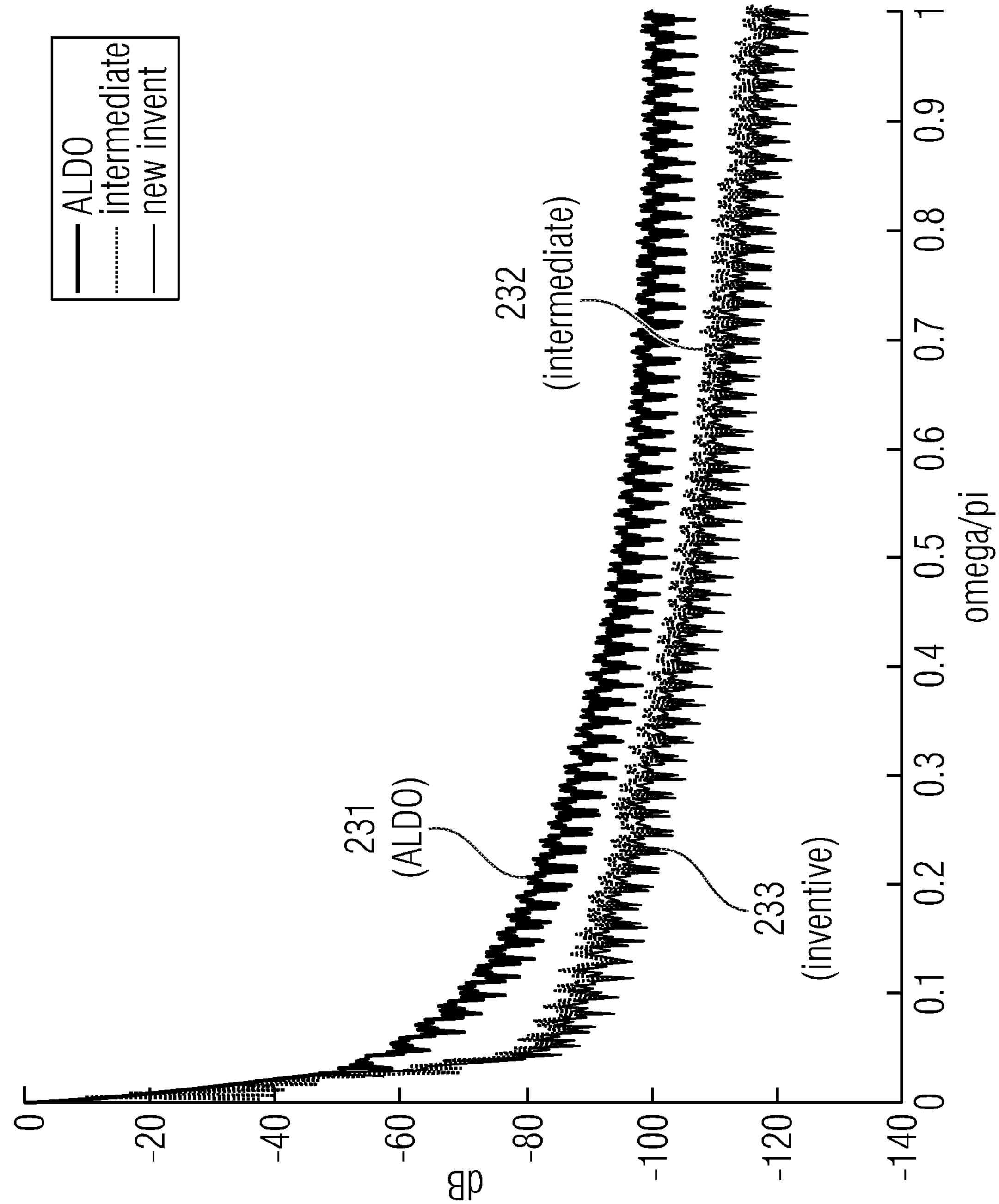

FIG. 23 shows a plot frequency response with ALDO (231), intermediate (232), new invention (233). The intermediate (231) and new invention window (233) can focus on different areas, achieving in this case a better far field attenuation. This may be used for instance to avoid any aliasing distortions caused by band limited signals or whenever signals are resampled through a filter bank. This focus is impossible for the ALDO window, as there are only two parameters available controlling the shape. Comparing the intermediate and the new invention window, it becomes evident that the new invention achieves much less fluctuations in the response due to the very continuous shape in the time domain.

Figure 24:
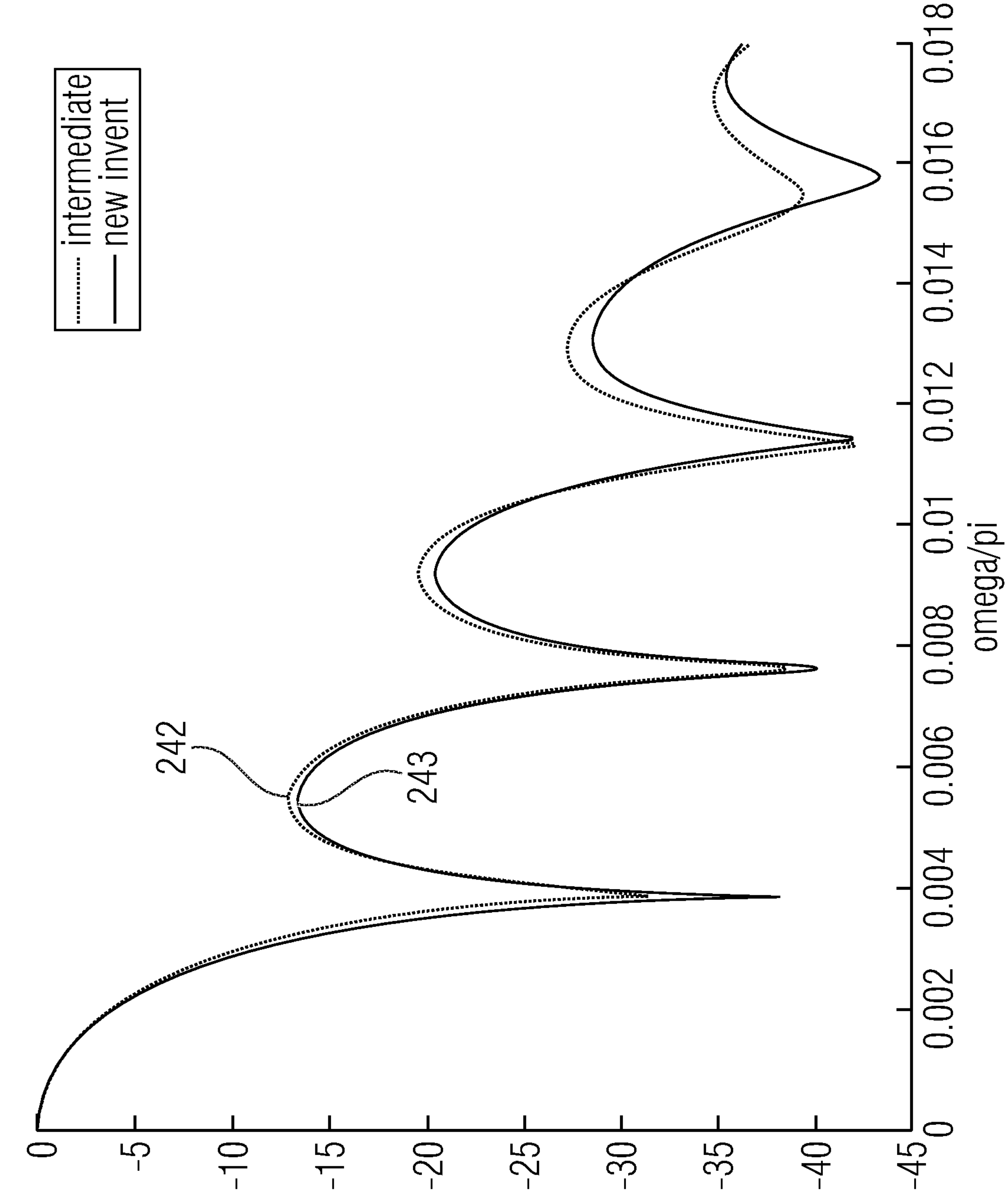

FIG. 24 shows a zoom (enlarged view) of frequency response comparing intermediate (242) and new invention (243). As can be observed, the new invention window (243) typically shows a significant higher attenuation of all side lopes. This confirms that the meandering portion (44, 64, 94) is beneficial in the window design over a portion of strict ones.

With reference of the time modulation of window, it is noted that the main motivation for the ALDO window was to combine an asymmetric shape with a maximum amplitude of 1, in order to avoid large temporal fluctuations of the quantization error. The quantization error is added in the frequency domain and its temporal shape is controlled by the synthesis window shape.

Figure 25:
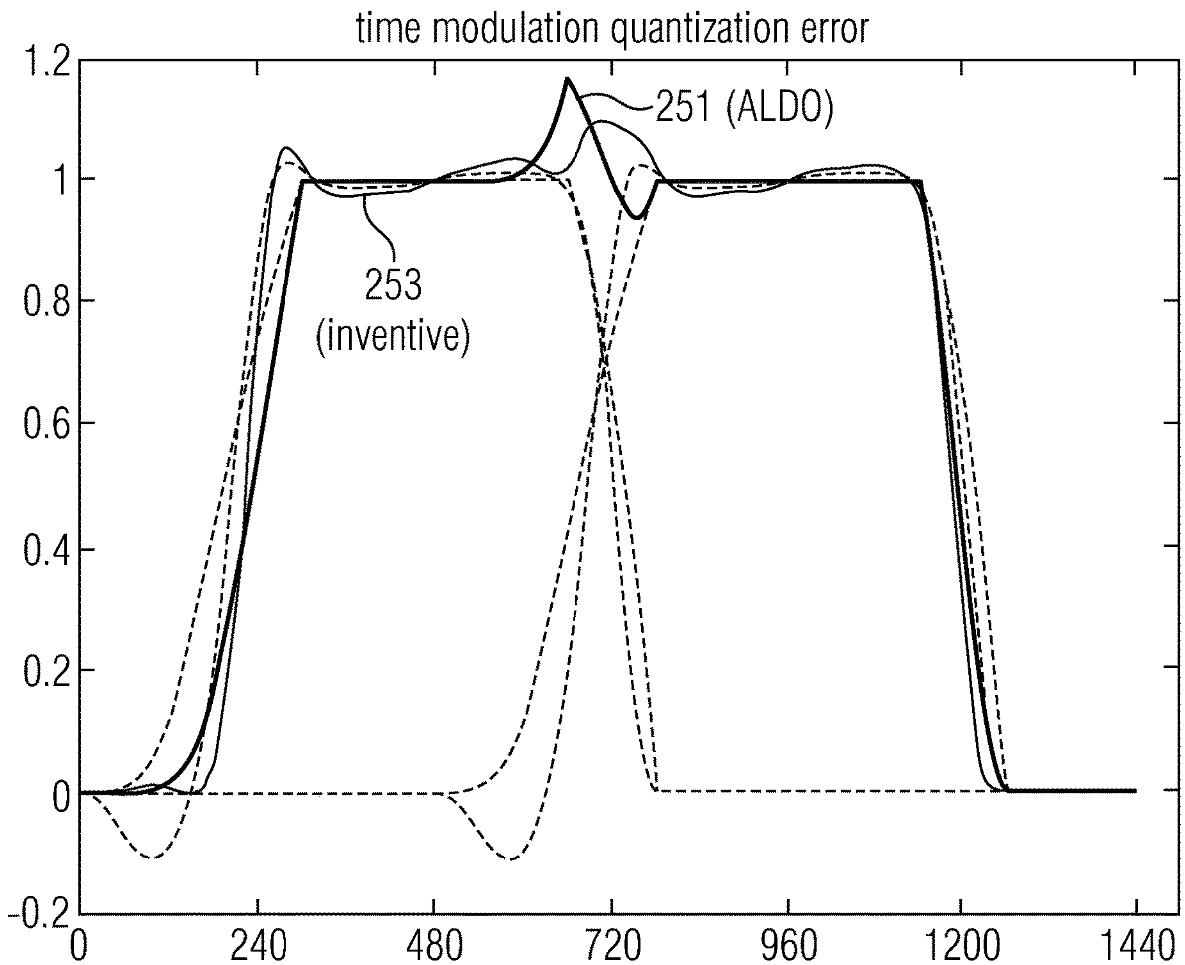

Actually, here also the meandering sequence even improves this window property. FIG. 25 shows a direct comparison the time modulation of the quantization error caused by an ALDO window (253) and a proposed invention (251). As can be seen, the maximum temporal distortion is lower for the new invention and therefore provides less noticeable distortions.

In examples above, the meandering portion may be, for example, in correspondence (at least partial) with the DCT kernel. In examples, at least one first crossing point (e.g., #1) is in the first frame, while at least another crossing point (e.g., #3) is in the subsequent frame. In examples, one crossing point (e.g., #2) at the border between the first and the subsequent frames.

In examples, "meandering" refers to the fact that there are at least four intersections with a linear function (the meandering portion crosses the linear function in at least two or in some cases in at least four points). For example, a meandering portion may have an increasing part, followed by a decreasing part, followed by an increasing part, and so on, or a decreasing part, followed by an increasing part, followed by a decreasing part, and so on.

Other Examples

Figure 17:
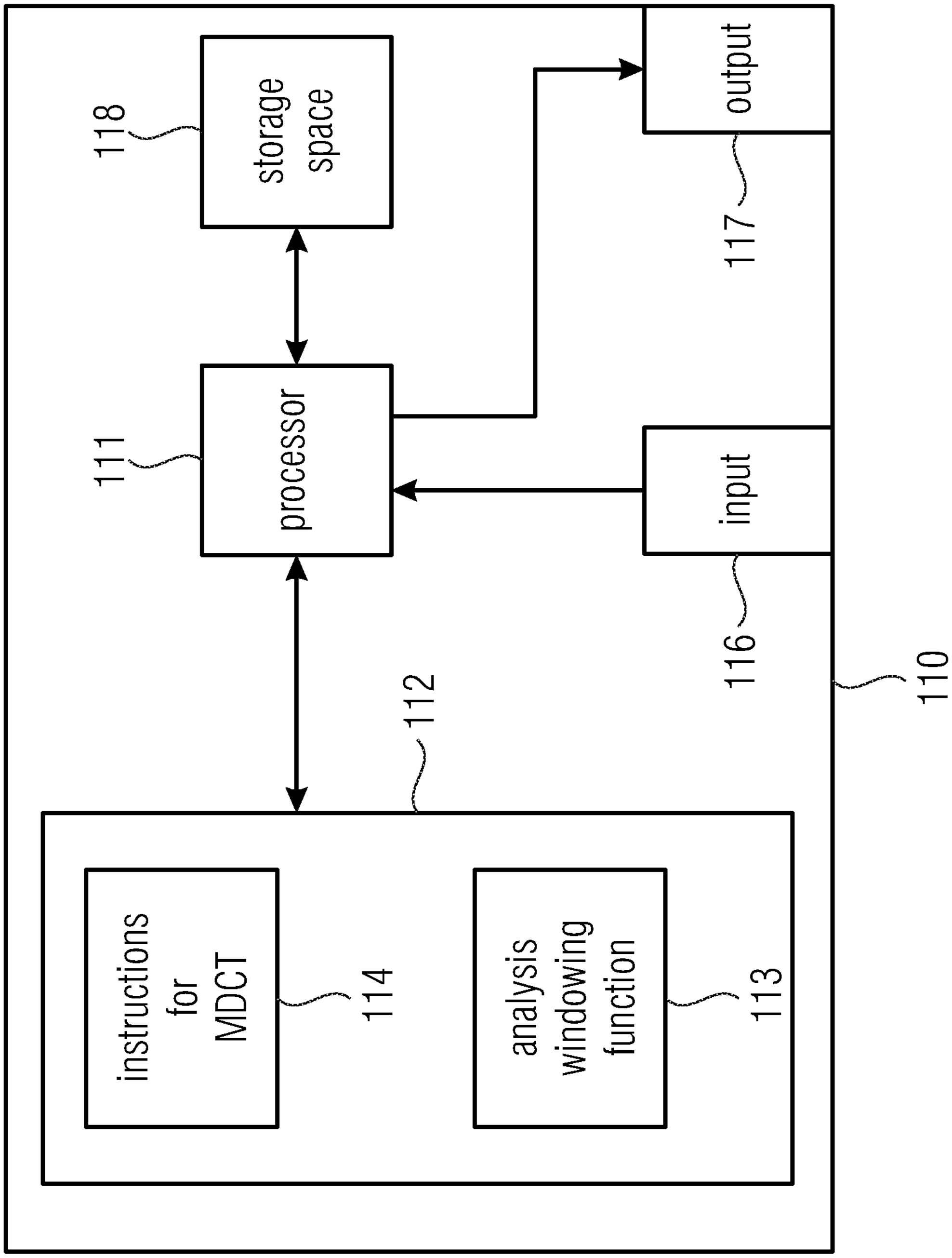
FIGS. 17 and 18 show apparatus according to examples.

FIG. 17 shows an apparatus 110 which may implement the encoder apparatus 130 (or 130A) and/or MDCT tool 131 and/or perform at least some steps of the method 150. The apparatus 110 may comprise a processor 111 and a non-transitory memory unit 112 with a block 114 storing instructions which, when executed by the processor 111, may cause the processor 111 to perform a MDCT synthesis. The non-transitory memory unit 112 may also store, block 113, an analysis windowing function, e.g., as discussed above. The apparatus 110 may comprise an input unit 116, which may obtain an input information signal (e.g., an audio signal). A transitory storage space 118 may be reserved for saving data to be updated (e.g., input buffers).

Figure 18:
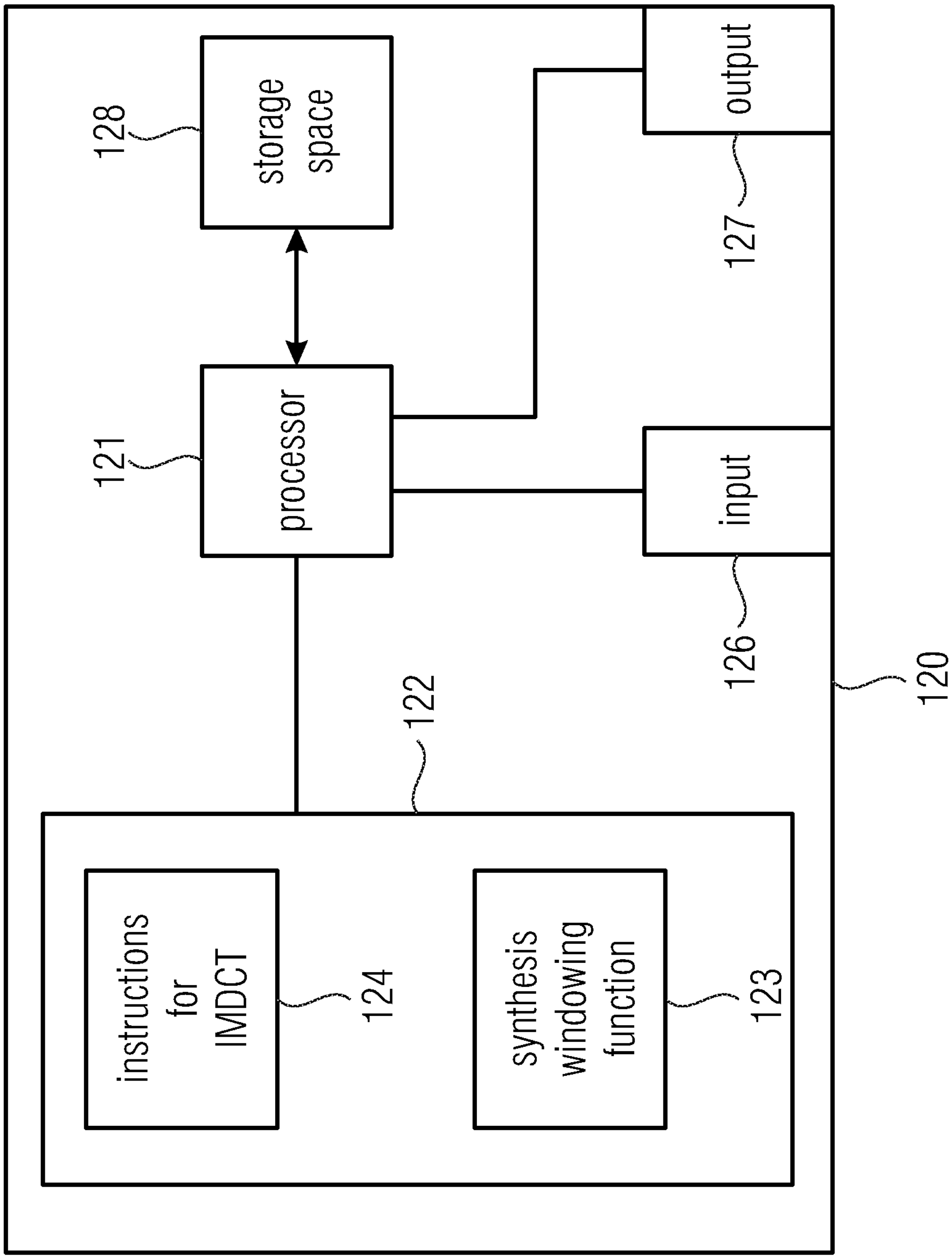

FIG. 18 shows an apparatus 120 which may implement the decoder apparatus 140 (or 140A) and/or the IMDCT 147 and/or perform the method 160. The apparatus 120 may comprise a processor 121 and a non-transitory memory unit 122 with a block 124 storing instructions which, when executed by the processor 121, may cause the processor 121 to perform, inter alia, an MDCT synthesis process. The apparatus 120 may comprise an input unit 126, which may obtain a decoded representation of an information signal (e.g., an audio signal) in the FD. The processor 121 may therefore perform processes to obtain a TD representation of the information signal. This decoded representation may be provided to external units using an output unit 127. The output unit 127 may comprise, for example, a communication unit to communicate to external devices (e.g., using wireless communication, such as Bluetooth) and/or external storage spaces. The processor 121 may save the decoded representation of the audio signal in a local storage space 128.

In examples, the apparatus 110 and 120 may be the same device. In examples, the apparatus 110 and 120 exchange information signals and/or control data e.g., wirelessly, e.g., using protocol Bluetooth.

Depending on certain implementation requirements, examples may be implemented in hardware. The implementation may be performed using a digital storage medium, for example a floppy disk, a Digital Versatile Disc (DVD), a Blu-Ray Disc, a Compact Disc (CD), a Read-only Memory (ROM), a Programmable Read-only Memory (PROM), an Erasable and Programmable Read-only Memory (EPROM), an Electrically Erasable Programmable Read-Only Memory (EEPROM) or a flash memory, having electronically readable control signals stored thereon, which cooperate (or are capable of cooperating) with a programmable computer system such that the respective method is performed. Therefore, the digital storage medium may be computer readable.

Generally, examples may be implemented as a computer program product with program instructions, the program instructions being operative for performing one of the methods when the computer program product runs on a computer. The program instructions may for example be stored on a machine readable medium.

Other examples comprise the computer program for performing one of the methods described herein, stored on a machine-readable carrier. In other words, an example of method is, therefore, a computer program having a program instruction for performing one of the methods described herein, when the computer program runs on a computer.

A further example of the methods is, therefore, a data carrier medium (or a digital storage medium, or a computer-readable medium) comprising, recorded thereon, the computer program for performing one of the methods described herein. The data carrier medium, the digital storage medium or the recorded medium are tangible and/or non-transitionary, rather than signals which are intangible and transitory.

A further example comprises a processing unit, for example a computer, or a programmable logic device performing one of the methods described herein.

A further example comprises a computer having installed thereon the computer program for performing one of the methods described herein.

A further example comprises an apparatus or a system transferring (for example, electronically or optically) a computer program for performing one of the methods described herein to a receiver. The receiver may, for example, be a computer, a mobile device, a memory device or the like. The apparatus or system may, for example, comprise a file server for transferring the computer program to the receiver.

In some examples, a programmable logic device (for example, a field programmable gate array) may be used to perform some or all of the functionalities of the methods described herein. In some examples, a field programmable gate array may cooperate with a microprocessor in order to perform one of the methods described herein. Generally, the methods may be performed by any appropriate hardware apparatus.

The above described examples are illustrative for the principles discussed above. It is understood that modifications and variations of the arrangements and the details described herein will be apparent. It is the intent, therefore, to be limited by the scope of the impending patent claims and not by the specific details presented by way of description and explanation of the examples herein.

Some Examples of Windowing Functions

Numerical examples are here provided. As no mathematical formula in closed form for obtaining the function has been found, examples are herewith provided. The values hereinbelow may be provided in backword or forward order, in the sense that in some examples the first value is associated to the time instant n=0 and the last value is associated to the last time instant n=2N−1 (forward direction), while in some examples the first value is associated to the time instant n=2N−1 and the last value is associated to the first time instant n=0 (backward direction). In some cases, the analysis windowing function and the synthesis windowing function are taken from the same list, but the analysis windowing function is read in the backward (or forward) direction, while the synthesis windowing function is read in the forward (or backward) direction.

In order to embody at least one of the examples below, it is possible to extract a sub-succession of at least 10 values (e.g., consecutive values), when the 10 values are different from 0 (e.g., all the samples or at least the majority thereof may form the at least 10 values). A tolerance or ±1% may be possible; in some cases ±0.5%, ±0.05%, in other cases, ±2%, ±5%, in other cases 0%.

Examples Associated to FIGS. 4 and 9

In the examples, a notation such as −7.078546706512391 e−04f means $-7.078546706512391*10^{-4}$. "f" refers to the notation in floating point (in some cases, it may be omitted).

A numerical example of windowing function $w_{30}$, for frame size N=80, is herewith provided by the 160 entries for n=0 . . . 2N−1. As explained above, the last values may be constantly 0.

−7.078546706512391 e−04f, −2.098197727900724 e−03f, −4.525198076002370 e−03f, −8.233976327300612 e−03f, −1.337713096257934 e−02f, −1.999721557401502 e−02f, −2.800909464274782 e−02f, −3.721502082245055 e−02f, −4.731768261606175 e−02f, −5.794654834034055 e−02f, −6.867606753531441 e−02f, −7.904647440788692 e−02f, −8.859705468085925 e−02f, −9.688303623049199 e−02f, −1.034961241263523 e−01f, −1.080766457616878 e−01f, −1.103242262600913 e−01f, −1.099809851424550 e−01f, −1.068172142230882 e−01f, −1.006190418791648 e−01f, −9.116452506492527 e−02f, −7.820617483254730 e−02f, −6.146688124166948 e−02f, −4.063362855701623 e−02f, −1.536329520788766 e−02f, +1.470155068746303 e−02f, +4.989736509080558 e−02f, +9.050369257152079 e−02f, +1.366911019414417 e−01f, +1.884686389218322 e−01f, +2.456456803467095 e−01f, +3.077789078889820 e−01f, +3.741642373060188 e−01f, +4.438114799213576 e−01f, +5.154735456539700 e−01f, +5.876661722564289 e−01f, +6.587619767809000 e−01f, +7.270576699841359 e−01f, +7.908752989295335 e−01f, +8.486643364959733 e−01f, +8.991320235484349 e−01f, +9.413348145272842 e−01f, +9.747634827941575 e−01f, +9.994114730415857 e−01f, +1.015760373791603 e+00f, +1.024736164069697 e+00f, +1.027634294456205 e+00f, +1.025991493983836 e+00f, +1.021427210603284 e+00f, +1.015439859549357 e+00f, +1.009366925499550 e+00f, +1.003508162416449 e+00f, +9.988898206257559 e−01f, +9.953133902427869 e−01f, +9.925943919208190 e−01f, +9.905771957917731 e−01f, +9.891371616557014 e−01f, +9.881790747212391 e−01f, +9.876249269174586 e−01f, +9.874056275509585 e−01f, +9.874524849192456 e−01f, +9.876951134084213 e−01f, +9.880640617030884 e−01f, +9.884926873551375 e−01f, +9.889230031022089 e−01f, +9.893074965384659 e−01f, +9.896146331889107 e−01f, +9.898319269347060 e−01f, +9.899693102025342 e−01f, +9.900603352632121 e−01f, +9.901575015155720 e−01f, +9.903255289051605 e−01f, +9.906303787150326 e−01f, +9.911298894709990 e−01f, +9.918665491182922 e−01f, +9.928619727154252 e−01f, +9.941156069136238 e−01f, +9.956033775539884 e−01f, +9.972793109558521 e−01f, +9.990784840729244 e−01f, +1.000922365901945 e+00f, +1.002728111386909 e+00f, +1.004416038098237 e+00f, +1.005919224127911 e+00f, +1.007189345025525 e+00f, +1.008200146369426 e+00f, +1.008949493525753 e+00f, +1.009458241425143 e+00f, +1.009768980817384 e+00f, +1.009940336228694 e+00f, +1.010039453539107 e+00f, +1.010132323996401 e+00f, +1.010272524848519 e+00f, +1.010494354532353 e+00f, +1.010808068774316 e+00f, +1.011201071127927 e+00f, +1.011641272406023 e+00f, +1.012080125934687 e+00f, +1.012458183122033 e+00f, +1.012706955800289 e+00f, +1.012755013843985 e+00f, +1.012530134411619 e+00f, +1.011962331100864 e+00f, +1.010982135506986 e+00f, +1.009512438049510 e+00f, +1.007460860286395 e+00f, +1.004708677491086 e+00f, +1.001111413242302 e+00f, +9.965041017623596 e−01f, +9.907199995730845 e−01f, +9.823765865983288 e−01f, +9.708821747608998 e−01f, +9.546732976073705 e−01f, +9.321553861564006 e−01f, +9.018003682081348 e−01f, +8.623984077953557 e−01f, +8.132817365236141 e−01f, +7.544551974836834 e−01f, +6.866580716267418 e−01f, +6.113488038789190 e−01f, +5.306181649316597 e−01f, +4.471309850999502 e−01f, +3.639114681156236 e−01f, +2.841647033392408 e−01f, +2.110209448747969 e−01f, +1.472287968327703 e−01f, +9.482665349502291 e−02f, +5.482436608328477 e−02f, +2.701461405056264 e−02f, +9.996743588367519 e−03f, +0.000000000000000 e+00f, +0.000000000000000 e+00f, +0.000000000000000 e+00f, +0.000000000000000 e+00f, +0.000000000000000 e+00f, +0.000000000000000 e+00f, +0.000000000000000 e+00f, +0.000000000000000 e+00f, +0.000000000000000 e+00f, +0.000000000000000 e+00f, +0.000000000000000 e+00f, +0.000000000000000 e+00f, +0.000000000000000 e+00f, +0.000000000000000 e+00f, +0.000000000000000 e+00f, +0.000000000000000 e+00f, +0.000000000000000 e+00f, +0.000000000000000 e+00f, +0.000000000000000 e+00f, +0.000000000000000 e+00f, +0.000000000000000 e+00f, +0.000000000000000 e+00f, +0.000000000000000 e+00f, +0.000000000000000 e+00f, +0.000000000000000 e+00f, +0.000000000000000 e+00f, +0.000000000000000 e+00f, +0.000000000000000 e+00f, +0.000000000000000 e+00f, +0.000000000000000 e+00f

A numerical example of windowing function $w_{160}$, for frame size N=160, is herewith provided by the 320 entries for n=0 . . . 2N−1. As explained above, the last values may be constantly 0.

−4.619898752628163 e−04f, −9.747166718929050 e−04f, −1.664473096973725 e−03f, −2.597106916737789 e−03f, −3.806285163352241 e−03f, −5.324608721716763 e−03f, −7.175885277771099 e−03f, −9.382480860899108 e−03f, −1.195270300743193 e−02f, −1.489528159506296 e−02f, −1.820666399965468 e−02f, −2.187570925786862 e−02f, −2.588471937157619 e−02f, −3.020862738245264 e−02f, −3.481597793538342 e−02f, −3.967067992672979 e−02f, −4.472698045914417 e−02f, −4.994225863256500 e−02f, −5.526334794593565 e−02f, −6.063717235243996 e−02f, −6.600961519440657 e−02f, −7.131966266443390 e−02f, −7.651178225890490 e−02f, −8.152964005319532 e−02f, −8.631137544905677 e−02f, −9.080411291245728 e−02f, −9.495377758870335 e−02f, −9.870736514214426 e−02f, −1.020202684361974 e−01f, −1.048438825017798 e−01f, −1.071382314127799 e−01f, −1.088690135027248 e−01f, −1.099969655786929 e−01f, −1.104898474883336 e−01f, −1.103225838568563 e−01f, −1.094621746650760 e−01f, −1.078834293141886 e−01f, −1.055612509762041 e−01f, −1.024650162703341 e−01f, −9.857014566194629
e−02f, −9.384684920715425 e−02f, −8.826309993000785
e−02f, −8.178792716809512 e−02f, −7.438785600211463
e−02f, −6.602189797715241 e−02f, −5.665655641133161
e−02f, −4.624456893420224 e−02f, −3.474585776145929
e−02f, −2.211581608120528 e−02f, −8.310425696208936
e−03f, +6.717697635290676 e−03f, +2.300642061077823
e−02f, +4.060106462625085 e−02f, +5.953239090915557
e−02f, +7.983354189816511 e−02f, +1.015233140203748
e−01f, +1.246171387327525 e−01f, +1.491152519299797
e−01f, +1.750067399059861 e−01f, +2.022699854906251
e−01f, +2.308655379767671 e−01f, +2.607365124918583
e−01f, +2.918144694729168 e−01f, +3.240095704645023
e−01f, +3.572175180786021 e−01f, +3.913146885756875
e−01f, +4.261571642320424 e−01f, +4.615925445090212
e−01f, +4.974471592901086 e−01f, +5.335326819631583
e−01f, +5.696546730080154 e−01f, +6.056083823929643
e−01f, +6.411830842823245 e−01f, +6.761653499550255
e−01f, +7.103400549562944 e−01f, +7.434943718765665
e−01f, +7.754281892901473 e−01f, +8.059437233154637
e−01f, +8.348589373399948 e−01f, +8.620108336276733
e−01f, +8.872599706865123 e−01f, +9.104863121445679
e−01f, +9.315962496426278 e−01f, +9.505220861927248
e−01f, +9.672366712325431 e−01f, +9.817397501303696
e−01f, +9.940557180662704 e−01f, +1.004247514102417
e+00f, +1.012407428282884 e+00f, +1.018650990561848
e+00f, +1.023118841384460 e+00f, +1.025972450969440
e+00f, +1.027397523939210 e+00f, +1.027585830688143
e+00f, +1.026738673647482 e+00f, +1.025061777648234
e+00f, +1.022756514615106 e+00f, +1.020009139549275
e+00f, +1.016996499560845 e+00f, +1.013915946100629
e+00f, +1.011044869639164 e+00f, +1.007773858455400
e+00f, +1.004848753962734 e+00f, +1.002245009135684
e+00f, +9.999393169239009 e−01f, +9.979055415627330
e−01f, +9.961203379971326 e−01f, +9.945597525471822
e−01f, +9.932031606606762 e−01f, +9.920297273323891
e−01f, +9.910230654424902 e−01f, +9.901668953434221
e−01f, +9.894488374513719 e−01f, +9.888556356037892
e−01f, +9.883778520531268 e−01f, +9.880051626345804
e−01f, +9.877295459610343 e−01f, +9.875412739766566
e−01f, +9.874329809802893 e−01f, +9.873949921033299
e−01f, +9.874197049003676 e−01f, +9.874973205882319
e−01f, +9.876201238703241 e−01f, +9.877781920433015
e−01f, +9.879637979933339 e−01f, +9.881678007807095
e−01f, +9.883835200189653 e−01f, +9.886022219397892
e−01f, +9.888182771263505 e−01f, +9.890247977602895
e−01f, +9.892178658748239 e−01f, +9.893923680007577
e−01f, +9.895463342815009 e−01f, +9.896772011542693
e−01f, +9.897859195209235 e−01f, +9.898725363809847
e−01f, +9.899410789223559 e−01f, +9.899945557067980
e−01f, +9.900394023736973 e−01f, +9.900814722948890
e−01f, +9.901293790312005 e−01f, +9.901902265696609
e−01f, +9.902734448815004 e−01f, +9.903862280081246
e−01f, +9.905379830873822 e−01f, +9.907348826312993
e−01f, +9.909842592301273 e−01f, +9.912905118607647
e−01f, +9.916586940166509 e−01f, +9.920906151219310
e−01f, +9.925887208794144 e−01f, +9.931516528513824
e−01f, +9.937790866568735 e−01f, +9.944668184371617
e−01f, +9.952116634297566 e−01f, +9.960068616185641
e−01f, +9.968461329825753 e−01f, +9.977203369515556
e−01f, +9.986213520769593 e−01f, +9.995382582242990
e−01f, +1.000461955079660 e+00f, +1.001380551217109
e+00f, +1.002284871786226 e+00f, +1.003163845364970
e+00f, +1.004009147462043 e+00f, +1.004811375053364
e+00f, +1.005563968008037 e+00f, +1.006259855360867
e+00f, +1.006895570408563 e+00f, +1.007466616298057
e+00f, +1.007972441990187 e+00f, +1.008411468616852 e+00f, +1.008786009787269 e+00f, +1.009097763850333
e+00f, +1.009351762546296 e+00f, +1.009552401900961
e+00f, +1.009707093778162 e+00f, +1.009822090220407
e+00f, +1.009906958448099 e+00f, +1.009969021400474
e+00f, +1.010017890428877 e+00f, +1.010060809299530
e+00f, +1.010106564965965 e+00f, +1.010161131093372
e+00f, +1.010231078494249 e+00f, +1.010319484524512
e+00f, +1.010430470494512 e+00f, +1.010564099281000
e+00f, +1.010721360243234 e+00f, +1.010899655674578
e+00f, +1.011096993993037 e+00f, +1.011308167670753
e+00f, +1.011529185153809 e+00f, +1.011753008569803
e+00f, +1.011973876511603 e+00f, +1.012182837094955
e+00f, +1.012373028737774 e+00f, +1.012535058602453
e+00f, +1.012660975529858 e+00f, +1.012740575296603
e+00f, +1.012765922449960 e+00f, +1.012726958954961
e+00f, +1.012615904116265 e+00f, +1.012422888521601
e+00f, +1.012140460211194 e+00f, +1.011758810583150
e+00f, +1.011269960947744 e+00f, +1.010663676735228
e+00f, +1.009930754807923 e+00f, +1.009058249873833
e+00f, +1.008034308295421 e+00f, +1.006843352506855
e+00f, +1.005470005637052 e+00f, +1.003894772403371
e+00f, +1.002098854400575 e+00f, +1.000060686758758
e+00f, +9.977600196406868 e−01f, +9.951746430061121
e−01f, +9.922861082472264 e−01f, +9.890757868707590
e−01f, +9.847362453480265 e−01f, +9.798613526271561
e−01f, +9.741378617337759 e−01f, +9.673331975559332
e−01f, +9.592539757044516 e−01f, +9.496984081652284
e−01f, +9.384634163826711 e−01f, +9.253567968750328
e−01f, +9.101986790930605 e−01f, +8.928338316495705
e−01f, +8.731437835983047 e−01f, +8.510420440685049
e−01f, +8.264839911291133 e−01f, +7.994681492797084
e−01f, +7.700431275216928 e−01f, +7.383028603058783
e−01f, +7.043814340356083 e−01f, +6.684616478236647
e−01f, +6.307755329382612 e−01f, +5.915799587176216
e−01f, +5.511703155400274 e−01f, +5.098915423728179
e−01f, +4.681017110047964 e−01f, +4.261772971493010
e−01f, +3.845172335531009 e−01f, +3.435228672445613
e−01f, +3.036004651973099 e−01f, +2.651434678028531
e−01f, +2.285283969438072 e−01f, +1.941021906320984
e−01f, +1.621735416384830 e−01f, +1.330015240938615
e−01f, +1.067840430193724 e−01f, +8.365057236623041
e−02f, +6.365188111381356 e−02f, +4.676538412257621
e−02f, +3.288072750732215 e−02f, +2.183057564646270
e−02f, +1.336381425803019 e−02f, +6.758124889697787
e−03f, +0.000000000000000 e+00f, +0.000000000000000
e+00f, +0.000000000000000 e+00f, +0.000000000000000
e+00f, +0.000000000000000 e+00f, +0.000000000000000
e+00f, +0.000000000000000 e+00f, +0.000000000000000
e+00f, +0.000000000000000 e+00f, +0.000000000000000
e+00f, +0.000000000000000 e+00f, +0.000000000000000
e+00f, +0.000000000000000 e+00f, +0.000000000000000
e+00f, +0.000000000000000 e+00f, +0.000000000000000
e+00f, +0.000000000000000 e+00f, +0.000000000000000
e+00f, +0.000000000000000 e+00f, +0.000000000000000
e+00f, +0.000000000000000 e+00f, +0.000000000000000
e+00f, +0.000000000000000 e+00f, +0.000000000000000
e+00f, +0.000000000000000 e+00f, +0.000000000000000
e+00f, +0.000000000000000 e+00f, +0.000000000000000
e+00f, +0.000000000000000 e+00f, +0.000000000000000
e+00f, +0.000000000000000 e+00f, +0.000000000000000
e+00f, +0.000000000000000 e+00f, +0.000000000000000
e+00f, +0.000000000000000 e+00f, +0.000000000000000
e+00f, +0.000000000000000 e+00f, +0.000000000000000
e+00f, +0.000000000000000 e+00f, +0.000000000000000
e+00f, +0.000000000000000 e+00f, +0.000000000000000
e+00f, +0.000000000000000 e+00f, +0.000000000000000
e+00f, +0.000000000000000 e+00f, +0.000000000000000
e+00f, +0.000000000000000 e+00f, +0.000000000000000
e+00f, +0.000000000000000 e+00f, +0.000000000000000 e+00f, +0.000000000000000 e+00f, +0.000000000000000 e+00f, +0.000000000000000 e+00f, +0.000000000000000 e+00f, +0.000000000000000 e+00f, +0.000000000000000 e+00f, +0.000000000000000 e+00f, +0.000000000000000 e+00f, +0.000000000000000 e+00f, +0.000000000000000 e+00f.

A numerical example of windowing function $w_{240}$, for frame size N=240, is herewith provided (480 samples):

−3.613496418928369 e−04f, −7.078546706512391 e−04f, −1.074443637110903 e−03f, −1.533478537964509 e−03f, −2.098197727900724 e−03f, −2.778420871815740 e−03f, −3.584129920673041 e−03f, −4.525198076002370 e−03f, −5.609327243712055 e−03f, −6.843234536105624 e−03f, −8.233976327300612 e−03f, −9.785314755557023 e−03f, −1.149880303071551 e−02f, −1.337713096257934 e−02f, −1.542181679511618 e−02f, −1.762979910961727 e−02f, −1.999721557401502 e−02f, −2.252080561390149 e−02f, −2.519406300389030 e−02f, −2.800909464274782 e−02f, −3.095765092956728 e−02f, −3.402996266948349 e−02f, −3.721502082245055 e−02f, −4.050053247568393 e−02f, −4.387219218706189 e−02f, −4.731768261606175 e−02f, −5.082325342672667 e−02f, −5.437166635159518 e−02f, −5.794654834034055 e−02f, −6.153426201732499 e−02f, −6.511708163113709 e−02f, −6.867606753531441 e−02f, −7.219447805250771 e−02f, −7.565695975592170 e−02f, −7.904647440788692 e−02f, −8.234442557322251 e−02f, −8.553324579905185 e−02f, −8.859705468085925 e−02f, −9.152091100798199 e−02f, −9.428847446755965 e−02f, −9.688303623049198 e−02f, −9.929123258537813 e−02f, −1.015008467688577 e−01f, −1.034961241263523 e−01f, −1.052637003544443 e−01f, −1.067939984687745 e−01f, −1.080766457616878 e−01f, −1.090997300590506 e−01f, −1.098524491515805 e−01f, −1.103242262600913 e−01f, −1.105084619148789 e−01f, −1.103977408741932 e−01f, −1.099809851424550 e−01f, −1.092492774392824 e−01f, −1.081974227416502 e−01f, −1.068172142230882 e−01f, −1.050995803285455 e−01f, −1.030360111111103 e−01f, −1.006190418791648 e−01f, −9.784120023411771 e−02f, −9.469304216883027 e−02f, −9.116452506492527 e−02f, −8.724644532866996 e−02f, −8.293043914044632 e−02f, −7.820617483254730 e−02f, −7.306142427456862 e−02f, −6.748468182105991 e−02f, −6.146688124166948 e−02f, −5.499497258200362 e−02f, −4.805444424454820 e−02f, −4.063362855701623 e−02f, −3.272045590229335 e−02f, −2.430122582451853 e−02f, −1.536329520788766 e−02f, −5.891434269890659 e−03f, +4.126595858583295 e−03f, +1.470155068746303 e−02f, +2.584738191459814 e−02f, +3.757652772246801 e−02f, +4.989736509080558 e−02f, +6.282034030592902 e−02f, +7.635397728566121 e−02f, +9.050369257152079 e−02f, +1.052747118478660 e−01f, +1.206703467513333 e−01f, +1.366911019414417 e−01f, +1.533343890681390 e−01f, +1.705954709184399 e−01f, +1.884686389218322 e−01f, +2.069449962574092 e−01f, +2.260093000067393 e−01f, +2.456456803467095 e−01f, +2.658346019332584 e−01f, +2.865543814049772 e−01f, +3.077789078889820 e−01f, +3.294769437072290 e−01f, +3.516171481750350 e−01f, +3.741642373060188 e−01f, +3.970739591211551 e−01f, +4.203043046885219 e−01f, +4.438114799213576 e−01f, +4.675442291623012 e−01f, +4.914498631045615 e−01f, +5.154735456539700 e−01f, +5.395557644293222 e−01f, +5.636399817032525 e−01f, +5.876661722564289 e−01f, +6.115695310143157 e−01f, +6.352890592874099 e−01f, +6.587619767809000 e−01f, +6.819230974423550 e−01f, +7.047092819314779 e−01f, +7.270576699841359 e−01f, +7.489068963384272 e−01f, +7.701990187606995 e−01f, +7.908752989295335 e−01f, +8.108788692151807 e−01f, +8.301579139160681 e−01f, +8.486643364959733 e−01f, +8.663548164329093 e−01f, +8.831896853053627 e−01f, +8.991320235484349 e−01f, +9.141540563656075 e−01f, +9.282282546151819 e−01f, +9.413348145272842 e−01f, +9.534619388400459 e−01f, +9.646048250501910 e−01f, +9.747634827941575 e−01f, +9.839435385219192 e−01f, +9.921529097154242 e−01f, +9.994114730415857 e−01f, +1.005746084650236 e+00f, +1.011183971347815 e+00f, +1.015760373791603 e+00f, +1.019515072412387 e+00f, +1.022490937034641 e+00f, +1.024736164069697 e+00f, +1.026304095700693 e+00f, +1.027250978292214 e+00f, +1.027634294456205 e+00f, +1.027511063644843 e+00f, +1.026942795115598 e+00f, +1.025991493983836 e+00f, +1.024716149969084 e+00f, +1.023175976163407 e+00f, +1.021427210603284 e+00f, +1.019521566634239 e+00f, +1.017510118327508 e+00f, +1.015439859549357 e+00f, +1.013460916839174 e+00f, +1.011654901040475 e+00f, +1.009366925499550 e+00f, +1.007263182132894 e+00f, +1.005313192386866 e+00f, +1.003508162416449 e+00f, +1.001840787319378 e+00f, +1.000303927234380 e+00f, +9.988898206257559 e−01f, +9.975915283480670 e−01f, +9.964015284765968 e−01f, +9.953133902427869 e−01f, +9.943201078053212 e−01f, +9.934158959186011 e−01f, +9.925943919208190 e−01f, +9.918510277326026 e−01f, +9.911797988363887 e−01f, +9.905771957917731 e−01f, +9.900381047643838 e−01f, +9.895594394179152 e−01f, +9.891371616557014 e−01f, +9.887684373604154 e−01f, +9.884497924570929 e−01f, +9.881790747212391 e−01f, +9.879528358230726 e−01f, +9.877691368590689 e−01f, +9.876249269174586 e−01f, +9.875179947346887 e−01f, +9.874458127312921 e−01f, +9.874056275509585 e−01f, +9.873951115886979 e−01f, +9.874115368168944 e−01f, +9.874524849192456 e−01f, +9.875149888347144 e−01f, +9.875968894760857 e−01f, +9.876951134084213 e−01f, +9.878075819424549 e−01f, +9.879311998177238 e−01f, +9.880640617030884 e−01f, +9.882032571565917 e−01f, +9.883471084085503 e−01f, +9.884926873551375 e−01f, +9.886386592120545 e−01f, +9.887825578295630 e−01f, +9.889230031022089 e−01f, +9.890581715933395 e−01f, +9.891867674284610 e−01f, +9.893074965384659 e−01f, +9.894196399062921 e−01f, +9.895220757174378 e−01f, +9.896146331889107 e−01f, +9.896970346678272 e−01f, +9.897692596535289 e−01f, +9.898319269347060 e−01f, +9.898852572653667 e−01f, +9.899307640365727 e−01f, +9.899693102025343 e−01f, +9.900025692522435 e−01f, +9.900321562263099 e−01f, +9.900603352632121 e−01f, +9.900889812894406 e−01f, +9.901206586012907 e−01f, +9.901575015155720 e−01f, +9.902023946214220 e−01f, +9.902575406142213 e−01f, +9.903255289051605 e−01f, +9.904087914462694 e−01f, +9.905096491583045 e−01f, +9.906303787150326 e−01f, +9.907727108894024 e−01f, +9.909387444078919 e−01f, +9.911298894709990 e−01f, +9.913476318763218 e−01f, +9.915928560402563 e−01f, +9.918665491182922 e−01f, +9.921691315380984 e−01f, +9.925010851461232 e−01f, +9.928619727154252 e−01f, +9.932519181564613 e−01f, +9.936700207375173 e−01f, +9.941156069136238 e−01f, +9.945873147903244 e−01f, +9.950837402063278 e−01f, +9.956033775539884 e−01f, +9.961439922621166 e−01f, +9.967034533921340 e−01f, +9.972793109558521 e−01f, +9.978690858367024 e−01f, +9.984697087896268 e−01f, +9.990784840729244 e−01f, +9.996919011206490 e−01f, +1.000308193833526 e+00f, +1.000922365901945 e+00f, +1.001532636590676 e+00f, +1.002135464655177 e+00f, +1.002728111386909 e+00f, +1.003307449770187 e+00f, +1.003870934089686 e+00f, +1.004416038098237 e+00f, +1.004940548815171 e+00f, +1.005442141810160 e+00f, +1.005919224127911 e+00f, +1.006370303149314 e+00f, +1.006793927824538 e+00f, +1.007189345025525 e+00f, +1.007555573455895 e+00f, +1.007892674961336 e+00f, +1.008200146369426 e+00f, +1.008478423284851 e+00f, +1.008727884997619 e+00f, +1.008949493525753 e+00f, +1.009144112734761 e+00f, +1.009313224929575 e+00f, +1.009458241425143 e+00f, +1.009581280555682 e+00f, +1.009684090687164 e+00f, +1.009768980817384 e+00f, +1.009838308708799 e+00f, +1.009894548257807 e+00f, +1.009940336228694 e+00f, +1.009977916643680 e+00f, +1.010010230290263 e+00f, +1.010039453539107 e+00f, +1.010068202038694 e+00f, +1.010098388689342 e+00f, +1.010132323996401 e+00f, +1.010171656775640 e+00f, +1.010218096148412 e+00f, +1.010272524848519 e+00f, +1.010336490294771 e+00f, +1.010410221483215 e+00f, +1.010494354532353 e+00f, +1.010588873699422 e+00f, +1.010693501186928 e+00f, +1.010808068774316 e+00f, +1.010931436739342 e+00f, +1.011062876503041 e+00f, +1.011201071127927 e+00f, +1.011344700694417 e+00f, +1.011491904228184 e+00f, +1.011641272406023 e+00f, +1.011790282474963 e+00f, +1.011937567254485 e+00f, +1.012080125934687 e+00f, +1.012216235487353 e+00f, +1.012342907951334 e+00f, +1.012458183122033 e+00f, +1.012558879696851 e+00f, +1.012642857380847 e+00f, +1.012706955800289 e+00f, +1.012748952907404 e+00f, +1.012765799894453 e+00f, +1.012755013843985 e+00f, +1.012713798678211 e+00f, +1.012639775003457 e+00f, +1.012530134411619 e+00f, +1.012382309473470 e+00f, +1.012194068117524 e+00f, +1.011962331100864 e+00f, +1.011685173724601 e+00f, +1.011359143572147 e+00f, +1.010982135506986 e+00f, +1.010550715971368 e+00f, +1.010062133151922 e+00f, +1.009512438049510 e+00f, +1.008898689394160 e+00f, +1.008215923600973 e+00f, +1.007460860286395 e+00f, +1.006627741823389 e+00f, +1.005712337656749 e+00f, +1.004708677491086 e+00f, +1.003611467285588 e+00f, +1.002414286392268 e+00f, +1.001111413242302 e+00f, +9.996961651093181 e−01f, +9.981625949525345 e−01f, +9.965041017623596 e−01f, +9.947148884277037 e−01f, +9.927891912841345 e−01f, +9.907199995730845 e−01f, +9.884793707533194 e−01f, +9.855347660016696 e−01f, +9.823765865983286 e−01f, +9.789747333404933 e−01f, +9.751623811486372 e−01f, +9.708821747608998 e−01f, +9.660805524695870 e−01f, +9.606976399184645 e−01f, +9.546732976073706 e−01f, +9.479479345282376 e−01f, +9.404609052933396 e−01f, +9.321553861564006 e−01f, +9.229775478442888 e−01f, +9.128745354570823 e−01f, +9.018003682081348 e−01f, +8.897163275605041 e−01f, +8.765908974996186 e−01f, +8.623984077953557 e−01f, +8.471200801854385 e−01f, +8.307479727020245 e−01f, +8.132817365236141 e−01f, +7.947291447585267 e−01f, +7.751108841891807 e−01f, +7.544551974836834 e−01f, +7.327963552921717 e−01f, +7.101790843209148 e−01f, +6.866580716267418 e−01f, +6.622962432368731 e−01f, +6.371684119604742 e−01f, +6.113488038789190 e−01f, +5.849206604934815 e−01f, +5.579747428663487 e−01f, +5.306181649316717 e−01f, +5.029523957059122 e−01f, +4.750868825511614 e−01f, +4.471309850999535 e−01f, +4.192049917945288 e−01f, +3.914252910998820 e−01f, +3.639114681156252 e−01f, +3.367837772954476 e−01f, +3.101627843160973 e−01f, +2.841647033392418 e−01f, +2.589033711808454 e−01f, +2.344880603710975 e−01f, +2.110209448747974 e−01f, +1.885997642296488 e−01f, +1.673100807904834 e−01f, +1.472287968327706 e−01f, +1.284223074167396 e−01f, +1.109422548710344 e−01f, +9.482665349502306 e−02f, +8.009914366829558 e−02f, +6.676765847398403 e−02f, +5.482436608328485 e−02f, +4.424588851571281 e−02f, +3.499361000717621 e−02f, +2.701461405056267 e−02f, +2.024370180670145 e−02f, +1.460796755137538 e−02f, +9.996743588367531 e−03f, +5.305235098871444 e−03f, +0.000000000000000 e+00f, +0.000000000000000 e+00f, +0.000000000000000 e+00f, +0.000000000000000 e+00f, +0.000000000000000 e+00f, +0.000000000000000 e+00f, +0.000000000000000 e+00f, +0.000000000000000 e+00f, +0.000000000000000 e+00f, +0.000000000000000 e+00f, +0.000000000000000 e+00f, +0.000000000000000 e+00f, +0.000000000000000 e+00f, +0.000000000000000 e+00f, +0.000000000000000 e+00f, +0.000000000000000 e+00f, +0.000000000000000 e+00f, +0.000000000000000 e+00f, +0.000000000000000 e+00f, +0.000000000000000 e+00f, +0.000000000000000 e+00f, +0.000000000000000 e+00f, +0.000000000000000 e+00f, +0.000000000000000 e+00f, +0.000000000000000 e+00f, +0.000000000000000 e+00f, +0.000000000000000 e+00f, +0.000000000000000 e+00f, +0.000000000000000 e+00f, +0.000000000000000 e+00f, +0.000000000000000 e+00f, +0.000000000000000 e+00f, +0.000000000000000 e+00f, +0.000000000000000 e+00f, +0.000000000000000 e+00f, +0.000000000000000 e+00f, +0.000000000000000 e+00f, +0.000000000000000 e+00f, +0.000000000000000 e+00f, +0.000000000000000 e+00f, +0.000000000000000 e+00f, +0.000000000000000 e+00f, +0.000000000000000 e+00f, +0.000000000000000 e+00f, +0.000000000000000 e+00f, +0.000000000000000 e+00f, +0.000000000000000 e+00f, +0.000000000000000 e+00f, +0.000000000000000 e+00f, +0.000000000000000 e+00f, +0.000000000000000 e+00f, +0.000000000000000 e+00f, +0.000000000000000 e+00f, +0.000000000000000 e+00f, +0.000000000000000 e+00f, +0.000000000000000 e+00f, +0.000000000000000 e+00f, +0.000000000000000 e+00f, +0.000000000000000 e+00f, +0.000000000000000 e+00f, +0.000000000000000 e+00f, +0.000000000000000 e+00f, +0.000000000000000 e+00f, +0.000000000000000 e+00f, +0.000000000000000 e+00f, +0.000000000000000 e+00f, +0.000000000000000 e+00f, +0.000000000000000 e+00f, +0.000000000000000 e+00f, +0.000000000000000 e+00f, +0.000000000000000 e+00f, +0.000000000000000 e+00f, +0.000000000000000 e+00f, +0.000000000000000 e+00f, +0.000000000000000 e+00f, +0.000000000000000 e+00f, +0.000000000000000 e+00f, +0.000000000000000 e+00f, +0.000000000000000 e+00f, +0.000000000000000 e+00f, +0.000000000000000 e+00f, +0.000000000000000 e+00f, +0.000000000000000 e+00f, +0.000000000000000 e+00f, +0.000000000000000 e+00f, +0.000000000000000 e+00f, +0.000000000000000 e+00f, +0.000000000000000 e+00f, +0.000000000000000 e+00f, +0.000000000000000 e+00f}

A numerical example of windowing function $w_{320}$, for frame size N=320, is herewith provided (640 samples):

−3.021153494057143 e−04f, −5.867737487939294 e−04f, −8.366504004139796 e−04f, −1.126635355725494 e−03f, −1.470492941694331 e−03f, −1.873473391018495 e−03f, −2.339292362082021 e−03f, −2.872008069419264 e−03f, −3.476256385086407 e−03f, −4.155963816705528 e−03f, −4.914563787665504 e−03f, −5.755172503953251 e−03f, −6.680623380533122 e−03f, −7.693816924650567 e−03f, −8.796760749750191 e−03f, −9.990503073705982 e−03f, −1.127574117138621 e−02f, −1.265334152129685 e−02f, −1.412438986522702 e−02f, −1.568889620430290 e−02f, −1.734512089366117 e−02f, −1.909097368362797 e−02f, −2.092546711168754 e−02f, −2.284684792818856 e−02f, −2.485207716234951 e−02f, −2.693746704328349 e−02f, −2.909952486193999 e−02f, −3.133504629493832 e−02f, −3.363960728361352 e−02f, −3.600820974457969 e−02f, −3.843601741746971 e−02f, −4.091746034850161 e−02f, −4.344654894948344 e−02f, −4.601786724624048 e−02f, −4.862598509282497 e−02f, −5.126474204655663 e−02f, −5.392644753556616 e−02f, −5.660384311081047 e−02f, −5.929116747072080 e−02f, −6.198268202511926 e−02f, −6.467025548071184 e−02f, −6.734542216184526 e−02f, −7.000099017198280 e−02f, −7.263057011354321 e−02f, −7.522784961377151 e−02f, −7.778525942347714 e−02f, −8.029480247839878 e−02f, −8.274924535373614 e−02f, −8.514125464087215 e−02f, −8.746379123238275 e−02f, −8.971069341834263 e−02f, −9.187564084638347 e−02f, −9.395176975347193 e−02f, −9.593137735886889 e−02f, −9.780843257659243 e−02f, −9.957851303827886 e−02f, −1.012361165314596 e−01f, −1.027741036495644 e−01f, −1.041861222641119 e−01f, −1.054680247057000 e−01f, −1.066160875985523 e−01f, −1.076255384835563 e−01f, −1.084912299471198 e−01f, −1.092087422379003 e−01f, −1.097736146613313 e−01f, −1.101808861640070 e−01f, −1.104271876052675 e−01f, −1.105108362290460 e−01f, −1.104281465492726 e−01f, −1.101739218186236 e−01f, −1.097437360338336 e−01f, −1.091353125572511 e−01f, −1.083467335729228 e−01f, −1.073739938306107 e−01f, −1.062130155324388 e−01f, −1.048606145834788 e−01f, −1.033132401525343 e−01f, −1.015673163469357 e−01f, −9.962005506126154 e−02f, −9.746803229469267 e−02f, −9.510723623306666 e−02f, −9.253303383231506 e−02f, −8.974125216128212 e−02f, −8.672877689119252 e−02f, −8.349213839083708 e−02f, −8.002639902061687 e−02f, −7.632679536516856 e−02f, −7.238806162166744 e−02f, −6.820576796149519 e−02f, −6.377611429172260 e−02f, −5.909386001558149 e−02f, −5.415316322402774 e−02f, −4.894812724598650 e−02f, −4.347347112195197 e−02f, −3.772461300253332 e−02f, −3.169587609244436 e−02f, −2.538179830690266 e−02f, −1.877689096555516 e−02f, −1.187461378850388 e−02f, −4.669099247423082 e−03f, +2.844096748870385 e−03f, +1.066976124794342 e−02f, +1.881355950582949 e−02f, +2.728156010437695 e−02f, +3.607810469851272 e−02f, +4.520702759803914 e−02f, +5.467238802204326 e−02f, +6.447866054615346 e−02f, +7.462862199422061 e−02f, +8.512490568723846 e−02f, +9.596983987496970 e−02f, +1.071650779014335 e−01f, +1.187115850305241 e−01f, +1.306101067250375 e−01f, +1.428596447589721 e−01f, +1.554584725339102 e−01f, +1.684041609371527 e−01f, +1.816947894623263 e−01f, +1.953273880886783 e−01f, +2.092963206850239 e−01f, +2.235945635254679 e−01f, +2.382160219461597 e−01f, +2.531529721334063 e−01f, +2.683961570569586 e−01f, +2.839361392493072 e−01f, +2.997624255177811 e−01f, +3.158619077906196 e−01f, +3.322210551086769 e−01f, +3.488264676990591 e−01f, +3.656640377499646 e−01f, +3.827152968157059 e−01f, +3.999611859760947 e−01f, +4.173843265025887 e−01f, +4.349669624916473 e−01f, +4.526876397402144 e−01f, +4.705242008503956 e−01f, +4.884539254831315 e−01f, +5.064545550235134 e−01f, +5.245006748662190 e−01f, +5.425674372882107 e−01f, +5.606312044701524 e−01f, +5.786672646386708 e−01f, +5.966477035050948 e−01f, +6.145458904162185 e−01f, +6.323361944662236 e−01f, +6.499926319211774 e−01f, +6.674874032292857 e−01f, +6.847932667399612 e−01f, +7.018835463513400 e−01f, +7.187322544823347 e−01f, +7.353128213893310 e−01f, +7.516001985652684 e−01f, +7.675699252273948 e−01f, +7.831974571624924 e−01f, +7.984583859818390 e−01f, +8.133295347030278 e−01f, +8.277892271515950 e−01f, +8.418178561101360 e−01f, +8.553961300139363 e−01f, +8.685068980898102 e−01f, +8.811334436653052 e−01f, +8.932596784799233 e−01f, +9.048748835980528 e−01f, +9.159657608120536 e−01f, +9.265215299450000 e−01f, +9.365339988633418 e−01f, +9.459977028429117 e−01f, +9.549088408436811 e−01f, +9.632658122557368 e−01f, +9.710688896122810 e−01f, +9.783204156360773 e−01f, +9.850226760127131 e−01f, +9.911792082081333 e−01f, +9.967989944502682 e−01f, +1.001894024615659 e+00f, +1.006474342231823 e+00f, +1.010552057109195 e+00f, +1.014142538208007 e+00f, +1.017262593268930 e+00f, +1.019928842669923 e+00f, +1.022159867011177 e+00f, +1.023976320927187 e+00f, +1.025400734608122 e+00f, +1.026455340400072 e+00f, +1.027164510654160 e+00f, +1.027552729180790 e+00f, +1.027644462380432 e+00f, +1.027463246660797 e+00f, +1.027035903410657 e+00f, +1.026389068000259 e+00f, +1.025548201799728 e+00f, +1.024537134749709 e+00f, +1.023380803775376 e+00f, +1.022103695693341 e+00f, +1.020728359657958 e+00f, +1.019275334687329 e+00f, +1.017765178792830 e+00f, +1.016217355867531 e+00f, +1.014665311686846 e+00f, +1.013249071090664 e+00f, +1.011948006992127 e+00f, +1.010189090179223 e+00f, +1.008557961167850 e+00f, +1.007011287608451 e+00f, +1.005548764575910 e+00f, +1.004168417268956 e+00f, +1.002867268893035 e+00f, +1.001641769115897 e+00f, +1.000489068954641 e+00f, +9.994060799749374 e−01f, +9.983898865406841 e−01f, +9.974370849972721 e−01f, +9.965444836911705 e−01f, +9.957098545943852 e−01f, +9.949302413030897 e−01f, +9.942024045863540 e−01f, +9.935241604969254 e−01f, +9.928930430130044 e−01f, +9.923068103443909 e−01f, +9.917633778190438 e−01f, +9.912597642374404 e−01f, +9.907954498484041 e−01f, +9.903677893656558 e−01f, +9.899751611066148 e−01f, +9.896160337369861 e−01f, +9.892890160408989 e−01f, +9.889928511129679 e−01f, +9.887260333430423 e−01f, +9.884868721088945 e−01f, +9.882751039537586 e−01f, +9.880892168751595 e−01f, +9.879277114724612 e−01f, +9.877898261218510 e−01f, +9.876743442038471 e−01f, +9.875807496078497 e−01f, +9.875072021876561 e−01f, +9.874529447589979 e−01f, +9.874169741527905 e−01f, +9.873984685207834 e−01f, +9.873958301311858 e−01f, +9.874080027710336 e−01f, +9.874343401290739 e−01f, +9.874736235387018 e−01f, +9.875243137719285 e−01f, +9.875856201221135 e−01f, +9.876563785063032 e−01f, +9.877358921155149 e−01f, +9.878225576787804 e−01f, +9.879150968481590 e−01f, +9.880132731565830 e−01f, +9.881156946084619 e−01f, +9.882211314188272 e−01f, +9.883289032519310 e−01f, +9.884378310018685 e−01f, +9.885476787868710 e−01f, +9.886568414746639 e−01f, +9.887645868459630 e−01f, +9.888708540445242 e−01f, +9.889744320992592 e−01f, +9.890747269455915 e−01f, +9.891710038703801 e−01f, +9.892631024032380 e−01f, +9.893507219573624 e−01f, +9.894330645494204 e−01f, +9.895096919388534 e−01f, +9.895810813422480 e−01f, +9.896467469067676 e−01f, +9.897067365020641 e−01f, +9.897606930400666 e−01f, +9.898094478563998 e−01f, +9.898530133261707 e−01f, +9.898914705684924 e−01f, +9.899254194103574 e−01f, +9.899554202030650 e−01f, +9.899824494486951 e−01f, +9.900065116928948 e−01f, +9.900284805353695 e−01f, +9.900497484789281 e−01f, +9.900709561632662 e−01f, +9.900928358611601 e−01f, +9.901163920607219 e−01f, +9.901427479709606 e−01f, +9.901734275350572 e−01f, +9.902087332329851 e−01f, +9.902498637985275 e−01f, +9.902983686695558 e−01f, +9.903548501470234 e−01f, +9.904205084933333 e−01f, +9.904959297726740 e−01f, +9.905825150202904 e−01f, +9.906812569810133 e−01f, +9.907922087340426 e−01f, +9.909165464981378 e−01f, +9.910550740962871 e−01f, +9.912084614290896 e−01f, +9.913768610980639 e−01f, +9.915605826937839 e−01f, +9.917604214872976 e−01f, +9.919767175562684 e−01f, +9.922091101818779 e−01f, +9.924579135466506 e−01f, +9.927231225056266 e−01f, +9.930049538427406 e−01f, +9.933027281437943 e−01f, +9.936161084869942 e−01f, +9.939453714404443 e−01f, +9.942895145656371 e−01f, +9.946481676207727 e−01f, +9.950203031067961 e−01f, +9.954058173659507 e−01f, +9.958038713694317 e−01f, +9.962130271017117 e−01f, +9.966324689957675 e−01f, +9.970615306490058 e−01f, +9.974990583293081 e−01f, +9.979437430375855 e−01f, +9.983940572002874 e−01f, +9.988493116887893 e−01f, +9.993083430214909 e−01f, +9.997689221333534 e−01f, +1.000231131275969 e+00f, +1.000692135698996 e+00f, +1.001152013920163 e+00f, +1.001608526000461 e+00f, +1.002060493867275 e+00f, +1.002507212061815 e+00f, +1.002947129400411 e+00f, +1.003378909587027 e+00f, +1.003801368578070 e+00f, +1.004213810320699 e+00f, +1.004615386562846 e+00f, +1.005004618375781 e+00f, +1.005380628601598 e+00f, +1.005743282364652 e+00f, +1.006091510392348 e+00f, +1.006424907424988 e+00f, +1.006742427727669 e+00f, +1.007044321511378 e+00f, +1.007330218597112 e+00f, +1.007599401798709 e+00f, +1.007852064386603 e+00f, +1.008088176165563 e+00f, +1.008308033204578 e+00f, +1.008511247273756 e+00f, +1.008698144207627 e+00f, +1.008869515256392 e+00f, +1.009025659761512 e+00f, +1.009166718967367 e+00f, +1.009293362609020 e+00f, +1.009406398832440 e+00f, +1.009507017171120 e+00f, +1.009595264293017 e+00f, +1.009672145744679 e+00f, +1.009739084785160 e+00f, +1.009796675060142 e+00f, +1.009846137382005 e+00f, +1.009888083631667 e+00f, +1.009924092276850 e+00f, +1.009955384765721 e+00f, +1.009982268770147 e+00f, +1.010006298177305 e+00f, +1.010028618428735 e+00f, +1.010050254076988 e+00f, +1.010071952131355 e+00f, +1.010094366238073 e+00f, +1.010118917317053 e+00f, +1.010146497096682 e+00f, +1.010177110711677 e+00f, +1.010211755260102 e+00f, +1.010251003469427 e+00f, +1.010295468653759 e+00f, +1.010345234996637 e+00f, +1.010400316698172 e+00f, +1.010461564316351 e+00f, +1.010528615445659 e+00f, +1.010601521285347 e+00f, +1.010679788081867 e+00f, +1.010763905869062 e+00f, +1.010853429760676 e+00f, +1.010947547074519 e+00f, +1.011045953108263 e+00f, +1.011148486293359 e+00f, +1.011254397791134 e+00f, +1.011363082075863 e+00f, +1.011473302008831 e+00f, +1.011584996312149 e+00f, +1.011697416504599 e+00f, +1.011808919793469 e+00f, +1.011919264025716 e+00f, +1.012027240794153 e+00f, +1.012132151631041 e+00f, +1.012232734564333 e+00f, +1.012327560477901 e+00f, +1.012416383754384 e+00f, +1.012497890726292 e+00f, +1.012570434021054 e+00f, +1.012633295255708 e+00f, +1.012685277016726 e+00f, +1.012725564992284 e+00f, +1.012752577651415 e+00f, +1.012765062889864 e+00f, +1.012762356719162 e+00f, +1.012743376077777 e+00f, +1.012706484200181 e+00f, +1.012650842226435 e+00f, +1.012575427778520 e+00f, +1.012479473490919 e+00f, +1.012361105121003 e+00f, +1.012219809594718 e+00f, +1.012054359992419 e+00f, +1.011864000215460 e+00f, +1.011647223869087 e+00f, +1.011402518267713 e+00f, +1.011129654652857 e+00f, +1.010826951260377 e+00f, +1.010492924436361 e+00f, +1.010126353960416 e+00f, +1.009725892479312 e+00f, +1.009290060983833 e+00f, +1.008817301052548 e+00f, +1.008305027555130 e+00f, +1.007752833675443 e+00f, +1.007157827358150 e+00f, +1.006518049344503 e+00f, +1.005831403532018 e+00f, +1.005095592119373 e+00f, +1.004308630055050 e+00f, +1.003467498305776 e+00f, +1.002569500413888 e+00f, +1.001612710105563 e+00f, +1.000594272975683 e+00f, +9.995111701168786 e−01f, +9.983609218719522 e−01f, +9.971409288327860 e−01f, +9.958488863050556 e−01f, +9.944818543153893 e−01f, +9.930375282832211 e−01f, +9.915146560759479 e−01f, +9.899136802423638 e−01f, +9.881930623810997 e−01f, +9.859422591203311 e−01f, +9.835667898378924 e−01f, +9.811423034808365 e−01f, +9.785214441250228 e−01f, +9.756636036109838 e−01f, +9.725453442532574 e−01f, +9.691456634185092 e−01f, +9.654406178310209 e−01f, +9.614043615076308 e−01f, +9.570113065179300 e−01f, +9.522367669696690 e−01f, +9.470548839544214 e−01f, +9.414403740008491 e−01f, +9.353691612846549 e−01f, +9.288190093977164 e−01f, +9.217662887169115 e−01f, +9.141896283466009 e−01f, +9.060694681113471 e−01f, +8.973891675497357 e−01f, +8.881332000806269 e−01f, +8.782893885841422 e−01f, +8.678469565343039 e−01f, +8.567970644671067 e−01f, +8.451334654019180 e−01f, +8.328542805780399 e−01f, +8.199594783897041 e−01f, +8.064511006873497 e−01f, +7.923346478686025 e−01f, +7.776204488292163 e−01f, +7.623206183595970 e−01f, +7.464486491227057 e−01f, +7.300205729992958 e−01f, +7.130567383226717 e−01f, +6.955805444755916 e−01f, +6.776173229836567 e−01f, +6.591955305148172 e−01f, +6.403486426892321 e−01f, +6.211072197441818 e−01f, +6.015049275244730 e−01f, +5.815787608870452 e−01f, +5.613674511156324 e−01f, +5.409188627354076 e−01f, +5.202736834971303 e−01f, +4.994780733459294 e−01f, +4.785774177949064 e−01f, +4.576172599874928 e−01f, +4.366490208265804 e−01f, +4.157221460415995 e−01f, +3.948856590950757 e−01f, +3.741903189229770 e−01f, +3.536868899553974 e−01f, +3.334260017756462 e−01f, +3.134586473252229 e−01f, +2.938337904395871 e−01f, +2.745992637590817 e−01f, +2.558030636168172 e−01f, +2.374902188466697 e−01f, +2.197036032185785 e−01f, +2.024855415115456 e−01f, +1.858749915117319 e−01f, +1.699067802117410 e−01f, +1.546132267478873 e−01f, +1.400238206749695 e−01f, +1.261637395672913 e−01f, +1.130534434072719 e−01f, +1.007084973747940 e−01f, +8.914024389873081 e−02f, +7.835612100141792 e−02f, +6.835821233920988 e−02f, +5.914211536028976 e−02f, +5.069893012340832 e−02f, +4.301717763585550 e−02f, +3.608020726673359 e−02f, +2.986316337017630 e−02f, +2.433722657129812 e−02f, +1.947675241971700 e−02f, +1.525710171255895 e−02f, +1.163787492636240 e−02f, +8.433087782643718 e−03f, +4.449668997344735 e−03f, +0.000000000000000 e+00f, +0.000000000000000 e+00f, +0.000000000000000 e+00f, +0.000000000000000 e+00f, +0.000000000000000 e+00f, +0.000000000000000 e+00f, +0.000000000000000 e+00f, +0.000000000000000 e+00f, +0.000000000000000 e+00f, +0.000000000000000 e+00f, +0.000000000000000 e+00f, +0.000000000000000 e+00f, +0.000000000000000 e+00f, +0.000000000000000 e+00f, +0.000000000000000 e+00f, +0.000000000000000 e+00f, +0.000000000000000 e+00f, +0.000000000000000 e+00f, +0.000000000000000 e+00f, +0.000000000000000 e+00f, +0.000000000000000 e+00f, +0.000000000000000 e+00f, +0.000000000000000 e+00f, +0.000000000000000 e+00f, +0.000000000000000 e+00f, +0.000000000000000 e+00f, +0.000000000000000 e+00f, +0.000000000000000 e+00f, +0.000000000000000 e+00f, +0.000000000000000 e+00f, +0.000000000000000 e+00f, +0.000000000000000 e+00f, +0.000000000000000 e+00f, +0.000000000000000 e+00f, +0.000000000000000 e+00f, +0.000000000000000 e+00f, +0.000000000000000 e+00f, +0.000000000000000 e+00f, +0.000000000000000 e+00f, +0.000000000000000 e+00f, +0.000000000000000 e+00f, +0.000000000000000 e+00f, +0.000000000000000 e+00f, +0.000000000000000 e+00f, +0.000000000000000 e+00f, +0.000000000000000 e+00f, +0.000000000000000 e+00f, +0.000000000000000 e+00f, +0.000000000000000 e+00f, +0.000000000000000 e+00f, +0.000000000000000 e+00f, +0.000000000000000 e+00f, +0.000000000000000 e+00f, +0.000000000000000 e+00f, +0.000000000000000 e+00f, +0.000000000000000 e+00f, +0.000000000000000 e+00f, +0.000000000000000 e+00f, +0.000000000000000 e+00f, +0.000000000000000 e+00f, +0.000000000000000 e+00f, +0.000000000000000 e+00f, +0.000000000000000 e+00f, +0.000000000000000 e+00f, +0.000000000000000 e+00f, +0.000000000000000 e+00f, +0.000000000000000 e+00f, +0.000000000000000 e+00f, +0.000000000000000 e+00f, +0.000000000000000 e+00f, +0.000000000000000 e+00f, +0.000000000000000 e+00f, +0.000000000000000 e+00f, +0.000000000000000 e+00f, +0.000000000000000 e+00f, +0.000000000000000 e+00f, +0.000000000000000 e+00f, +0.000000000000000 e+00f, +0.000000000000000 e+00f, +0.000000000000000 e+00f, +0.000000000000000 e+00f, +0.000000000000000 e+00f, +0.000000000000000 e+00f, +0.000000000000000 e+00f, +0.000000000000000 e+00f, +0.000000000000000 e+00f, +0.000000000000000 e+00f, +0.000000000000000 e+00f, +0.000000000000000 e+00f, +0.000000000000000 e+00f, +0.000000000000000 e+00f, +0.000000000000000 e+00f, +0.000000000000000 e+00f, +0.000000000000000 e+00f, +0.000000000000000 e+00f, +0.000000000000000 e+00f, +0.000000000000000 e+00f, +0.000000000000000 e+00f, +0.000000000000000 e+00f, +0.000000000000000 e+00f, +0.000000000000000 e+00f, +0.000000000000000 e+00f, +0.000000000000000 e+00f, +0.000000000000000 e+00f, +0.000000000000000 e+00f, +0.000000000000000 e+00f, +0.000000000000000 e+00f, +0.000000000000000 e+00f, +0.000000000000000 e+00f, +0.000000000000000 e+00f, +0.000000000000000 e+00f, +0.000000000000000 e+00f, +0.000000000000000 e+00f, +0.000000000000000 e+00f, +0.000000000000000 e+00f, +0.000000000000000 e+00f, +0.000000000000000 e+00f, +0.000000000000000 e+00f, +0.000000000000000 e+00f, +0.000000000000000 e+00f

A numerical example of windowing function $w_{480}$, for frame size N=480, is herewith provided (960 samples):

−2.353032150516754 e−04f, −4.619898752628163 e−04f, −6.262931535610879 e−04f, −7.929180432976445 e−04f, −9.747166718929050 e−04f, −1.180256894474562 e−03f, −1.409209039594871 e−03f, −1.664473096973725 e−03f, −1.946591608170231 e−03f, −2.257081732588478 e−03f, −2.597106916737789 e−03f, −2.967607624839524 e−03f, −3.370454877988472 e−03f, −3.806285163352241 e−03f, −4.276873767639064 e−03f, −4.782469904501813 e−03f, −5.324608721716763 e−03f, −5.903403814095400 e−03f, −6.520419726599805 e−03f, −7.175885277771099 e−03f, −7.871422820642307 e−03f, −8.606586039759667 e−03f, −9.382480860899108 e−03f, −1.019827182163307 e−02f, −1.105520547739066 e−02f, −1.195270300743193 e−02f, −1.289205910303846 e−02f, −1.387263484323160 e−02f, −1.489528159506296 e−02f, −1.595856621933800 e−02f, −1.706288556735433 e−02f, −1.820666399965468 e−02f, −1.939065975232718 e−02f, −2.061355417582714 e−02f, −2.187570925786862 e−02f, −2.317526315266411 e−02f, −2.451227449041489 e−02f, −2.588471937157619 e−02f, −2.729263737090799 e−02f, −2.873390902713615 e−02f, −3.020862738245264 e−02f, −3.171440372994384 e−02f, −3.325098858986303 e−02f, −3.481597793538342 e−02f, −3.640892406933019 e−02f, −3.802742318209150 e−02f, −3.967067992672979 e−02f, −4.133575417353826 e−02f, −4.302203371734278 e−02f, −4.472698045914417 e−02f, −4.645022292934329 e−02f, −4.818891490266687 e−02f, −4.994225863256500 e−02f, −5.170690802826666 e−02f, −5.348162036097223 e−02f, −5.526334794593565 e−02f, −5.705123152423822 e−02f, −5.884271749745559 e−02f, −6.063717235243996 e−02f, −6.243104027829089 e−02f, −6.422303545004304 e−02f, −6.600961519440657 e−02f, −6.778962269634495 e−02f, −6.955996868581379 e−02f, −7.131966266443390 e−02f, −7.306581273272733 e−02f, −7.479758913001458 e−02f, −7.651178225890490 e−02f, −7.820711420768856 e−02f, −7.988010693411644 e−02f, −8.152964005319532 e−02f, −8.315237353264004 e−02f, −8.474728946770714 e−02f, −8.631137544905677 e−02f, −8.784374452959058 e−02f, −8.934164364321417 e−02f, −9.080411291245728 e−02f, −9.222795761428432 e−02f, −9.361232867223340 e−02f, −9.495377758870335 e−02f, −9.625155313139856 e−02f, −9.750284620437569 e−02f, −9.870736514214426 e−02f, −9.986271288271026 e−02f, −1.009680221406219 e−01f, −1.020202684361974 e−01f, −1.030183804850491 e−01f, −1.039596356759290 e−01f, −1.048438825017798 e−01f, −1.056686838192766 e−01f, −1.064342821660323 e−01f, −1.071382314127799 e−01f, −1.077799961121537 e−01f, −1.083570625865931 e−01f, −1.088690135027248 e−01f, −1.093135588677235 e−01f, −1.096903559498340 e−01f, −1.099969655786929 e−01f, −1.102332261219973 e−01f, −1.103972812085189 e−01f, −1.104898474883336 e−01f, −1.105086416532167 e−01f, −1.104537426996073 e−01f, −1.103225838568563 e−01f, −1.101145827722143 e−01f, −1.098276928170364 e−01f, −1.094621746650760 e−01f, −1.090163960055733 e−01f, −1.084908852561722 e−01f, −1.078834293141886 e−01f, −1.071937180231978 e−01f, −1.064196358069465 e−01f, −1.055612509762041 e−01f, −1.046162812518618 e−01f, −1.035849043557610 e−01f, −1.024650162703341 e−01f, −1.012568997532046 e−01f, −9.995864571932928 e−02f, −9.857014566194627 e−02f, −9.708911135857967 e−02f, −9.551545820689084 e−02f, −9.384684920715425 e−02f, −9.208300062891550 e−02f, −9.022171021406450 e−02f, −8.826309993000785 e−02f, −8.620493821803937 e−02f, −8.404742152815330 e−02f, −8.178792716809512 e−02f, −7.942625026703617 e−02f, −7.695980775819990 e−02f, −7.438785600211463 e−02f, −7.170797002873608 e−02f, −6.891994783815969 e−02f, −6.602189797715241 e−02f, −6.301349420724424 e−02f, −5.989191912667712 e−02f, −5.665655641133161 e−02f, −5.330406164482222 e−02f, −4.983427241976235 e−02f, −4.624456893420224 e−02f, −4.253455686336916 e−02f, −3.870195772538443 e−02f, −3.474585776145929 e−02f, −3.066341518682682 e−02f, −2.645425077642105 e−02f, −2.211581608120528 e−02f, −1.764740541599136 e−02f, −1.304581363895818 e−02f, −8.310425696208936 e−03f, −3.438268661133170 e−03f, +1.570315476576933 e−03f, +6.717697635290676 e−03f, +1.200477020244778 e−02f, +1.743398319747869 e−02f, +2.300642061077823 e−02f, +2.872481423270595 e−02f, +3.458896350634671 e−02f, +4.060106462625085 e−02f, +4.676102915752826 e−02f, +5.307133911821893 e−02f, +5.953239090915557 e−02f, +6.614647812869151 e−02f, +7.291293184312803 e−02f, +7.983354189816511 e−02f, +8.690807412770696 e−02f, +9.413813765275064 e−02f, +1.015233140203748 e−01f, +1.090651518336202 e−01f, +1.167626546016197 e−01f, +1.246171387327525 e−01f, +1.326272948938113 e−01f, +1.407938190608664 e−01f, +1.491152519299797 e−01f, +1.575921408388593 e−01f, +1.662224799248571 e−01f, +1.750067399059861 e−01f, +1.839431938620024 e−01f, +1.930318183054904 e−01f, +2.022699854906251 e−01f, +2.116567430906184 e−01f, +2.211888523410642 e−01f, +2.308655379767671 e−01f, +2.406837992341654 e−01f, +2.506420640291662 e−01f, +2.607365124918583 e−01f, +2.709659073501196 e−01f, +2.813259021832532 e−01f, +2.918144694729168 e−01f, +3.024270279840051 e−01f, +3.131603499997996
e−01f, +3.240095704645023 e−01f, +3.349719592361666
e−01f, +3.460422935204829 e−01f, +3.572175180786021
e−01f, +3.684915649120530 e−01f, +3.798595119591716
e−01f, +3.913146885756875 e−01f, +4.028532873867052
e−01f, +4.144688328137527 e−01f, +4.261571642320424
e−01f, +4.379113897565727 e−01f, +4.497256320417501
e−01f, +4.615925445090212 e−01f, +4.735067030065239
e−01f, +4.854600184866710 e−01f, +4.974471592901086
e−01f, +5.094597228333853 e−01f, +5.214909841729947
e−01f, +5.335326819631583 e−01f, +5.455789811615239
e−01f, +5.576217157959890 e−01f, +5.696546730080154
e−01f, +5.816685576268035 e−01f, +5.936560624526468
e−01f, +6.056083823929643 e−01f, +6.175192060085208
e−01f, +6.293796611336280 e−01f, +6.411830842823245
e−01f, +6.529203544876097 e−01f, +6.645840786371451
e−01f, +6.761653499550255 e−01f, +6.876573952173626
e−01f, +6.990511539119996 e−01f, +7.103400549562944
e−01f, +7.215149331458728 e−01f, +7.325691772738999
e−01f, +7.434943718765665 e−01f, +7.542846327442048
e−01f, +7.649313654540612 e−01f, +7.754281892901473
e−01f, +7.857670170752049 e−01f, +7.959414651061612
e−01f, +8.059437233154637 e−01f, +8.157687070715176
e−01f, +8.254086223972127 e−01f, +8.348589373399948
e−01f, +8.441125827416620 e−01f, +8.531651194538425
e−01f, +8.620108336276733 e−01f, +8.706456337542150
e−01f, +8.790631561061171 e−01f, +8.872599706865123
e−01f, +8.952313288619367 e−01f, +9.029751680353524
e−01f, +9.104863121445679 e−01f, +9.177625550620636
e−01f, +9.247997426966093 e−01f, +9.315962496426278
e−01f, +9.381494858921667 e−01f, +9.444588390359354
e−01f, +9.505220861927248 e−01f, +9.563402921286364
e−01f, +9.619114522936701 e−01f, +9.672366712325431
e−01f, +9.723156637834687 e−01f, +9.771501187120180
e−01f, +9.817397501303696 e−01f, +9.860865871353246
e−01f, +9.901906380163595 e−01f, +9.940557180662704
e−01f, +9.976842395284637 e−01f, +1.001080961257010
e+00f, +1.004247514102417 e+00f, +1.007188578458507
e+00f, +1.009906654565108 e+00f, +1.012407428282884
e+00f, +1.014694702432600 e+00f, +1.016774659209400
e+00f, +1.018650990561848 e+00f, +1.020330464463111
e+00f, +1.021817328911793 e+00f, +1.023118841384460
e+00f, +1.024240262467000 e+00f, +1.025189721888128
e+00f, +1.025972450969440 e+00f, +1.026596938589443
e+00f, +1.027069179375841 e+00f, +1.027397523939210
e+00f, +1.027587902203109 e+00f, +1.027648951922701
e+00f, +1.027585830688143 e+00f, +1.027408519661012
e+00f, +1.027122986826984 e+00f, +1.026738673647482
e+00f, +1.026261663878092 e+00f, +1.025701002415063
e+00f, +1.025061777648234 e+00f, +1.024353980976701
e+00f, +1.023582385618774 e+00f, +1.022756514615106
e+00f, +1.021880604350422 e+00f, +1.020963871317665
e+00f, +1.020009139549275 e+00f, +1.019027285501251
e+00f, +1.018019442784231 e+00f, +1.016996499560845
e+00f, +1.015957433206324 e+00f, +1.014923441259795
e+00f, +1.013915946100629 e+00f, +1.013047565149327
e+00f, +1.012216130365610 e+00f, +1.011044869639164
e+00f, +1.009914592130044 e+00f, +1.008824888092573
e+00f, +1.007773858455400 e+00f, +1.006761700412993
e+00f, +1.005786648810854 e+00f, +1.004848753962734
e+00f, +1.003946083413733 e+00f, +1.003078846506546
e+00f, +1.002245009135684 e+00f, +1.001444733905817
e+00f, +1.000676188436651 e+00f, +9.999393169239009
e−01f, +9.992320848298057 e−01f, +9.985548127155425
e−01f, +9.979055415627330 e−01f, +9.972842679758880
e−01f, +9.966890948441745 e−01f, +9.961203379971326
e−01f, +9.955761256313581 e−01f, +9.950565724564597
e−01f, +9.945597525471822 e−01f, +9.940860378486615
e−01f, +9.936337788972491 e−01f, +9.932031606606759
e−01f, +9.927921871265732 e−01f, +9.924015177880798
e−01f, +9.920297273323891 e−01f, +9.916767775088281
e−01f, +9.913408767719142 e−01f, +9.910230654424902
e−01f, +9.907216425865902 e−01f, +9.904366799536263
e−01f, +9.901668953434221 e−01f, +9.899131011580791
e−01f, +9.896735637374597 e−01f, +9.894488374513719
e−01f, +9.892374835404283 e−01f, +9.890401927796704
e−01f, +9.888556356037892 e−01f, +9.886843467692753
e−01f, +9.885247606051014 e−01f, +9.883778520531268
e−01f, +9.882423270582524 e−01f, +9.881185638915363
e−01f, +9.880051626345804 e−01f, +9.879032023766432
e−01f, +9.878111744348976 e−01f, +9.877295459610343
e−01f, +9.876571983429736 e−01f, +9.875949843246187
e−01f, +9.875412739766566 e−01f, +9.874969061399389
e−01f, +9.874606249127551 e−01f, +9.874329809802893
e−01f, +9.874126414437681 e−01f, +9.874004750404033
e−01f, +9.873949921033299 e−01f, +9.873969162747074
e−01f, +9.874049060317581 e−01f, +9.874197049003676
e−01f, +9.874399717110517 e−01f, +9.874663281231737
e−01f, +9.874973205882319 e−01f, +9.875338926695315
e−01f, +9.875746535410983 e−01f, +9.876201238703241
e−01f, +9.876689801932402 e−01f, +9.877221556193183
e−01f, +9.877781920433015 e−01f, +9.878376489591358
e−01f, +9.878991990245439 e−01f, +9.879637979933339
e−01f, +9.880300303653743 e−01f, +9.880984675859855
e−01f, +9.881678007807095 e−01f, +9.882390300097154
e−01f, +9.883107693992456 e−01f, +9.883835200189653
e−01f, +9.884560159878955 e−01f, +9.885294200392185
e−01f, +9.886022219397892 e−01f, +9.886749404176028
e−01f, +9.887466261142505 e−01f, +9.888182771263505
e−01f, +9.888882480852147 e−01f, +9.889574384705896
e−01f, +9.890247977602895 e−01f, +9.890911247701029
e−01f, +9.891551701556196 e−01f, +9.892178658748239
e−01f, +9.892779555818088 e−01f, +9.893365186903538
e−01f, +9.893923680007577 e−01f, +9.894462830852175
e−01f, +9.894972124952000 e−01f, +9.895463342815009
e−01f, +9.895923617530382 e−01f, +9.896362652966239
e−01f, +9.896772011542693 e−01f, +9.897162195263046
e−01f, +9.897520286480039 e−01f, +9.897859195209235
e−01f, +9.898170267411330 e−01f, +9.898462068764986
e−01f, +9.898725363809847 e−01f, +9.898975138787787
e−01f, +9.899200050208486 e−01f, +9.899410789223559
e−01f, +9.899600605054418 e−01f, +9.899782261038060
e−01f, +9.899945557067980 e−01f, +9.900103500807507
e−01f, +9.900248320990181 e−01f, +9.900394023736973
e−01f, +9.900532105829365 e−01f, +9.900674746047259
e−01f, +9.900814722948890 e−01f, +9.900966926051257
e−01f, +9.901122448734595 e−01f, +9.901293790312005
e−01f, +9.901474648912307 e−01f, +9.901680598867444
e−01f, +9.901902265696609 e−01f, +9.902151896501201
e−01f, +9.902424418296485 e−01f, +9.902734448815004
e−01f, +9.903071270768942 e−01f, +9.903448913950654
e−01f, +9.903862280081246 e−01f, +9.904324484666853
e−01f, +9.904825650601110 e−01f, +9.905379830873822
e−01f, +9.905980602136440 e−01f, +9.906640366554630
e−01f, +9.907348826312993 e−01f, +9.908120376822228
e−01f, +9.908947858311721 e−01f, +9.909842592301273
e−01f, +9.910795247770178 e−01f, +9.911819240108124
e−01f, +9.912905118607647 e−01f, +9.914064705361564
e−01f, +9.915288011543961 e−01f, +9.916586940166509
e−01f, +9.917952720685562 e−01f, +9.919396217291009
e−01f, +9.920906151219310 e−01f, +9.922495028313456
e−01f, +9.924152398352751 e−01f, +9.925887208794144
e−01f, +9.927688708468421 e−01f, +9.929569112537944
e−01f, +9.931516528513824 e−01f, +9.933539244159140 e−01f, +9.935626893131695 e−01f, +9.937790866568735 e−01f, +9.940016434044485 e−01f, +9.942312024833810 e−01f, +9.944668184371617 e−01f, +9.947093441694513 e−01f, +9.949572854565533 e−01f, +9.952116634297566 e−01f, +9.954712635321227 e−01f, +9.957367951478069 e−01f, +9.960068616185641 e−01f, +9.962823025614079 e−01f, +9.965617986382630 e−01f, +9.968461329825753 e−01f, +9.971338271912752 e−01f, +9.974256691222113 e−01f, +9.977203369515556 e−01f, +9.980185087055744 e−01f, +9.983185871761977 e−01f, +9.986213520769593 e−01f, +9.989255426466267 e−01f, +9.992317314100975 e−01f, +9.995382582242990 e−01f, +9.998461160718275 e−01f, +1.000153907612080 e+00f, +1.000461955079660 e+00f, +1.000768859280338 e+00f, +1.001075613053728 e+00f, +1.001380551217109 e+00f, +1.001684244734497 e+00f, +1.001985425397567 e+00f, +1.002284871786226 e+00f, +1.002580975161843 e+00f, +1.002874411368430 e+00f, +1.003163845364970 e+00f, +1.003450063374329 e+00f, +1.003731570287893 e+00f, +1.004009147462043 e+00f, +1.004281457582935 e+00f, +1.004549339226336 e+00f, +1.004811375053364 e+00f, +1.005068272394360 e+00f, +1.005318795748286 e+00f, +1.005563968008037 e+00f, +1.005802269635282 e+00f, +1.006034554002353 e+00f, +1.006259855360867 e+00f, +1.006479018139540 e+00f, +1.006690541428116 e+00f, +1.006895570408563 e+00f, +1.007093045696527 e+00f, +1.007283799246233 e+00f, +1.007466616298057 e+00f, +1.007642728426847 e+00f, +1.007811036585595 e+00f, +1.007972441990187 e+00f, +1.008125875904472 e+00f, +1.008272602383284 e+00f, +1.008411468616852 e+00f, +1.008543573152632 e+00f, +1.008668018334797 e+00f, +1.008786009787269 e+00f, +1.008896526233555 e+00f, +1.009000766336071 e+00f, +1.009097763850333 e+00f, +1.009188880897370 e+00f, +1.009273163797313 e+00f, +1.009351762546296 e+00f, +1.009423944949143 e+00f, +1.009491175244507 e+00f, +1.009552401900961 e+00f, +1.009608886895764 e+00f, +1.009659973830751 e+00f, +1.009707093778162 e+00f, +1.009749238562067 e+00f, +1.009787744284661 e+00f, +1.009822090220407 e+00f, +1.009853706282597 e+00f, +1.009881498943010 e+00f, +1.009906958448099 e+00f, +1.009929567021562 e+00f, +1.009950573483366 e+00f, +1.009969021400474 e+00f, +1.009986499185054 e+00f, +1.010002363879044 e+00f, +1.010017890428877 e+00f, +1.010032170180360 e+00f, +1.010046722045583 e+00f, +1.010060809299530 e+00f, +1.010075674445289 e+00f, +1.010090449982098 e+00f, +1.010106564965965 e+00f, +1.010123226584120 e+00f, +1.010141762173145 e+00f, +1.010161131093372 e+00f, +1.010182635897876 e+00f, +1.010205587931660 e+00f, +1.010231078494249 e+00f, +1.010257950227988 e+00f, +1.010287732968580 e+00f, +1.010319484524512 e+00f, +1.010354079663767 e+00f, +1.010390635488037 e+00f, +1.010430470494512 e+00f, +1.010472266495074 e+00f, +1.010517096381509 e+00f, +1.010564099281000 e+00f, +1.010614266894512 e+00f, +1.010666285876455 e+00f, +1.010721360243234 e+00f, +1.010778416755264 e+00f, +1.010838252644461 e+00f, +1.010899655674578 e+00f, +1.010963729626641 e+00f, +1.011029191301694 e+00f, +1.011096993993037 e+00f, +1.011165861239173 e+00f, +1.011236610341260 e+00f, +1.011308167670753 e+00f, +1.011381453638912 e+00f, +1.011454785713102 e+00f, +1.011529185153809 e+00f, +1.011603680910505 e+00f, +1.011678803938046 e+00f, +1.011753008569803 e+00f, +1.011827484797985 e+00f, +1.011900936547881 e+00f, +1.011973876511603 e+00f, +1.012044885003304 e+00f, +1.012114985644919 e+00f, +1.012182837094955 e+00f, +1.012249023976742 e+00f, +1.012312095063070 e+00f, +1.012373028737774 e+00f, +1.012430463679316 e+00f, +1.012484972246822 e+00f, +1.012535058602453 e+00f, +1.012581678169188 e+00f, +1.012623472898504 e+00f, +1.012660975529858 e+00f, +1.012692758750213 e+00f, +1.012719789201144 e+00f, +1.012740575296603 e+00f, +1.012755753887085 e+00f, +1.012763948841204 e+00f, +1.012765922449960 e+00f, +1.012760298661069 e+00f, +1.012747819936584 e+00f, +1.012726958954961 e+00f, +1.012698607692183 e+00f, +1.012661400539405 e+00f, +1.012615904116265 e+00f, +1.012560833005713 e+00f, +1.012497050269805 e+00f, +1.012422888521601 e+00f, +1.012339226241367 e+00f, +1.012244921966297 e+00f, +1.012140460211194 e+00f, +1.012024302085441 e+00f, +1.011897560567707 e+00f, +1.011758810583150 e+00f, +1.011608449127642 e+00f, +1.011445162723270 e+00f, +1.011269960947744 e+00f, +1.011081255645969 e+00f, +1.010879608424312 e+00f, +1.010663676735228 e+00f, +1.010434184200640 e+00f, +1.010189681124657 e+00f, +1.009930754807923 e+00f, +1.009655660215271 e+00f, +1.009365251564694 e+00f, +1.009058249873833 e+00f, +1.008734758578989 e+00f, +1.008393079963091 e+00f, +1.008034308295421 e+00f, +1.007656661215973 e+00f, +1.007260142622887 e+00f, +1.006843352506855 e+00f, +1.006407009542103 e+00f, +1.005949145170711 e+00f, +1.005470005637052 e+00f, +1.004967986424467 e+00f, +1.004443531995945 e+00f, +1.003894772403371 e+00f, +1.003321903663793 e+00f, +1.002723127308148 e+00f, +1.002098854400575 e+00f, +1.001447278873483 e+00f, +1.000768505317086 e+00f, +1.000060686758758 e+00f, +9.993242684851855 e−01f, +9.985573503390627 e−01f, +9.977600196406868 e−01f, +9.969306036935497 e−01f, +9.960694269553644 e−01f, +9.951746430061121 e−01f, +9.942466438407230 e−01f, +9.932837131068657 e−01f, +9.922861082472264 e−01f, +9.912523092989319 e−01f, +9.901827419790691 e−01f, +9.890757868707590 e−01f, +9.879313024174022 e−01f, +9.863553220272523 e−01f, +9.847362453480265 e−01f, +9.831750948772566 e−01f, +9.815583336011345 e−01f, +9.798613526271561 e−01f, +9.780617486993630 e−01f, +9.761574317374303 e−01f, +9.741378617337759 e−01f, +9.719990112065752 e−01f, +9.697327413658168 e−01f, +9.673331975559332 e−01f, +9.647915124057732 e−01f, +9.621011497566145 e−01f, +9.592539757044516 e−01f, +9.562427177295731 e−01f, +9.530600909726344 e−01f, +9.496984081652284 e−01f, +9.461498120176854 e−01f, +9.424071613625743 e−01f, +9.384634163826711 e−01f, +9.343112966094085 e−01f, +9.299449872197452 e−01f, +9.253567968750328 e−01f, +9.205404627076625 e−01f, +9.154896280575360 e−01f, +9.101986790930605 e−01f, +9.046620597741508 e−01f, +8.988755194372424 e−01f, +8.928338316495705 e−01f, +8.865337190368053 e−01f, +8.799712722567934 e−01f, +8.731437835983047 e−01f, +8.660476534563131 e−01f, +8.586812520174252 e−01f, +8.510420440685049 e−01f, +8.431297226886574 e−01f, +8.349435141989714 e−01f, +8.264839911291133 e−01f, +8.177505366573690 e−01f, +8.087449817124315 e−01f, +7.994681492797084 e−01f, +7.899235162194718 e−01f, +7.801137731566502 e−01f, +7.700431275216928 e−01f, +7.597145736971065 e−01f, +7.491330971820804 e−01f, +7.383028603058783 e−01f, +7.272298755824693 e−01f, +7.159201919962611 e−01f, +7.043814340356083 e−01f, +6.926196927377140 e−01f, +6.806438831866077 e−01f, +6.684616478236647 e−01f, +6.560830137986515 e−01f, +6.435179268559957 e−01f, +6.307755329382612 e−01f, +6.178641647786525 e−01f, +6.047954625702541 e−01f, +5.915799587176216 e−01f, +5.782289366005894 e−01f, +5.647535885752191 e−01f, +5.511703155400274 e−01f, +5.374905090437071 e−01f, +5.237263500445715 e−01f, +5.098915423728255 e−01f, +4.960008074926423
e−01f, +4.820662943337458 e−01f, +4.681017110048007
e−01f, +4.541216995958746 e−01f, +4.401421815729068
e−01f, +4.261772971493010 e−01f, +4.122417888542512
e−01f, +3.983499612526493 e−01f, +3.845172335531009
e−01f, +3.707583717376236 e−01f, +3.570886786795506
e−01f, +3.435228672445627 e−01f, +3.300763764703638
e−01f, +3.167640325043893 e−01f, +3.036004651973109
e−01f, +2.905996158436682 e−01f, +2.777758503744847
e−01f, +2.651434678028531 e−01f, +2.527161881181577
e−01f, +2.405069849650012 e−01f, +2.285283969438072
e−01f, +2.167933432162879 e−01f, +2.053139897833021
e−01f, +1.941021906320988 e−01f, +1.831680872008943
e−01f, +1.725221947208913 e−01f, +1.621735416384834
e−01f, +1.521320683467849 e−01f, +1.424052801149985
e−01f, +1.330015240938615 e−01f, +1.239260664828526
e−01f, +1.151858295527293 e−01f, +1.067840430193724
e−01f, +9.872637505002878 e−02f, +9.101379000888035
e−02f, +8.365057236623055 e−02f, +7.663508305536153
e−02f, +6.997033405748826 e−02f, +6.365188111381365
e−02f, +5.768176015814392 e−02f, +5.205244216987966
e−02f, +4.676538412257621 e−02f, +4.180950541438362
e−02f, +3.718640251368464 e−02f, +3.288072750732215
e−02f, +2.889548499582958 e−02f, +2.520980565928884
e−02f, +2.183057564646272 e−02f, +1.872896194002638
e−02f, +1.592127815153420 e−02f, +1.336381425803020
e−02f, +1.108558877807282 e−02f, +8.943474189364638
e−03f, +6.758124889697787 e−03f, +3.504438130619497
e−03f, +0.000000000000000 e+00f, +0.000000000000000
e+00f, +0.000000000000000 e+00f, +0.000000000000000
e+00f, +0.000000000000000 e+00f, +0.000000000000000
e+00f, +0.000000000000000 e+00f, +0.000000000000000
e+00f, +0.000000000000000 e+00f, +0.000000000000000
e+00f, +0.000000000000000 e+00f, +0.000000000000000
e+00f, +0.000000000000000 e+00f, +0.000000000000000
e+00f, +0.000000000000000 e+00f, +0.000000000000000
e+00f, +0.000000000000000 e+00f, +0.000000000000000
e+00f, +0.000000000000000 e+00f, +0.000000000000000
e+00f, +0.000000000000000 e+00f, +0.000000000000000
e+00f, +0.000000000000000 e+00f, +0.000000000000000
e+00f, +0.000000000000000 e+00f, +0.000000000000000
e+00f, +0.000000000000000 e+00f, +0.000000000000000
e+00f, +0.000000000000000 e+00f, +0.000000000000000
e+00f, +0.000000000000000 e+00f, +0.000000000000000
e+00f, +0.000000000000000 e+00f, +0.000000000000000
e+00f, +0.000000000000000 e+00f, +0.000000000000000
e+00f, +0.000000000000000 e+00f, +0.000000000000000
e+00f, +0.000000000000000 e+00f, +0.000000000000000
e+00f, +0.000000000000000 e+00f, +0.000000000000000
e+00f, +0.000000000000000 e+00f, +0.000000000000000
e+00f, +0.000000000000000 e+00f, +0.000000000000000
e+00f, +0.000000000000000 e+00f, +0.000000000000000
e+00f, +0.000000000000000 e+00f, +0.000000000000000
e+00f, +0.000000000000000 e+00f, +0.000000000000000
e+00f, +0.000000000000000 e+00f, +0.000000000000000
e+00f, +0.000000000000000 e+00f, +0.000000000000000
e+00f, +0.000000000000000 e+00f, +0.000000000000000
e+00f, +0.000000000000000 e+00f, +0.000000000000000
e+00f, +0.000000000000000 e+00f, +0.000000000000000
e+00f, +0.000000000000000 e+00f, +0.000000000000000
e+00f, +0.000000000000000 e+00f, +0.000000000000000
e+00f, +0.000000000000000 e+00f, +0.000000000000000
e+00f, +0.000000000000000 e+00f, +0.000000000000000
e+00f, +0.000000000000000 e+00f, +0.000000000000000
e+00f, +0.000000000000000 e+00f, +0.000000000000000
e+00f, +0.000000000000000 e+00f, +0.000000000000000
e+00f, +0.000000000000000 e+00f, +0.000000000000000 e+00f, +0.000000000000000 e+00f, +0.000000000000000
e+00f, +0.000000000000000 e+00f, +0.000000000000000
e+00f, +0.000000000000000 e+00f, +0.000000000000000
e+00f, +0.000000000000000 e+00f, +0.000000000000000
e+00f, +0.000000000000000 e+00f, +0.000000000000000
e+00f, +0.000000000000000 e+00f, +0.000000000000000
e+00f, +0.000000000000000 e+00f, +0.000000000000000
e+00f, +0.000000000000000 e+00f, +0.000000000000000
e+00f, +0.000000000000000 e+00f, +0.000000000000000
e+00f, +0.000000000000000 e+00f, +0.000000000000000
e+00f, +0.000000000000000 e+00f, +0.000000000000000
e+00f, +0.000000000000000 e+00f, +0.000000000000000
e+00f, +0.000000000000000 e+00f, +0.000000000000000
e+00f, +0.000000000000000 e+00f, +0.000000000000000
e+00f, +0.000000000000000 e+00f, +0.000000000000000
e+00f, +0.000000000000000 e+00f, +0.000000000000000
e+00f, +0.000000000000000 e+00f, +0.000000000000000
e+00f, +0.000000000000000 e+00f, +0.000000000000000
e+00f, +0.000000000000000 e+00f, +0.000000000000000
e+00f, +0.000000000000000 e+00f, +0.000000000000000
e+00f, +0.000000000000000 e+00f, +0.000000000000000
e+00f, +0.000000000000000 e+00f, +0.000000000000000
e+00f, +0.000000000000000 e+00f, +0.000000000000000
e+00f, +0.000000000000000 e+00f, +0.000000000000000
e+00f, +0.000000000000000 e+00f, +0.000000000000000
e+00f, +0.000000000000000 e+00f, +0.000000000000000
e+00f, +0.000000000000000 e+00f, +0.000000000000000
e+00f, +0.000000000000000 e+00f, +0.000000000000000
e+00f, +0.000000000000000 e+00f, +0.000000000000000
e+00f, +0.000000000000000 e+00f, +0.000000000000000
e+00f, +0.000000000000000 e+00f, +0.000000000000000
e+00f, +0.000000000000000 e+00f, +0.000000000000000
e+00f, +0.000000000000000 e+00f, +0.000000000000000
e+00f, +0.000000000000000 e+00f, +0.000000000000000
e+00f, +0.000000000000000 e+00f, +0.000000000000000
e+00f, +0.000000000000000 e+00f, +0.000000000000000
e+00f, +0.000000000000000 e+00f, +0.000000000000000
e+00f, +0.000000000000000 e+00f, +0.000000000000000
e+00f, +0.000000000000000 e+00f, +0.000000000000000
e+00f, +0.000000000000000 e+00f, +0.000000000000000
e+00f, +0.000000000000000 e+00f, +0.000000000000000
e+00f, +0.000000000000000 e+00f, +0.000000000000000
e+00f, +0.000000000000000 e+00f, +0.000000000000000
e+00f, +0.000000000000000 e+00f, +0.000000000000000
e+00f, +0.000000000000000 e+00f, +0.000000000000000
e+00f, +0.000000000000000 e+00f, +0.000000000000000
e+00f, +0.000000000000000 e+00f, +0.000000000000000
e+00f, +0.000000000000000 e+00f, +0.000000000000000
e+00f, +0.000000000000000 e+00f, +0.000000000000000
e+00f, +0.000000000000000 e+00f, +0.000000000000000
e+00f, +0.000000000000000 e+00f, +0.000000000000000
e+00f

A numerical example of windowing function $w_{960}$, for frame size N=960, is herewith provided (1920 samples):

−1.596869453315999 e−04, −3.021153494057143 e−04, −4.142323860121641 e−04, −5.058484031439142 e−04, −5.867737487939294 e−04, −6.666034929771656 e−04, −7.499813122143762 e−04, −8.366504004139794 e−04, −9.273096237893370 e−04, −1.023773491532728 e−03, −1.126635355725494 e−03, −1.235247794937702 e−03, −1.349627853510606 e−03, −1.470492941694331 e−03, −1.598145399394582 e−03, −1.732450700747454 e−03, −1.873473391018495 e−03, −2.021493133113876 e−03, −2.176721793926887 e−03, −2.339292362082021 e−03, −2.509298051958086 e−03, −2.686801873698675 e−03, −2.872008069419264 e−03, −3.065254982136409 e−03, −3.266686736002951 e−03, −3.476256385086407 e−03,

−3.694123506258334 e−03, −3.920651988943251 e−03,
−4.155963816705528 e−03, −4.399940204176431 e−03,
−4.652692827862344 e−03, −4.914563787665504 e−03,
−5.185653529531935 e−03, −5.465821495567872 e−03,
−5.755172503953251 e−03, −6.054056765330685 e−03,
−6.362583863449497 e−03, −6.680623380533122 e−03,
−7.008304674718039 e−03, −7.346013465075499 e−03,
−7.693816924650567 e−03, −8.051465262788033 e−03,
−8.419001443263380 e−03, −8.796760749750191 e−03,
−9.184751507972289 e−03, −9.582657230262597 e−03,
−9.990503073705982 e−03, −1.040865597419619 e−02,
−1.083716113754551 e−02, −1.127574117138621 e−02,
−1.172444049589271 e−02, −1.218362542421523 e−02,
−1.265334152129685 e−02, −1.313331245904876 e−02,
−1.362355747138776 e−02, −1.412438986522702 e−02,
−1.463576680723352 e−02, −1.515729094197161 e−02,
−1.568889620430290 e−02, −1.623084814367250 e−02,
−1.678306524600559 e−02, −1.734512089366117 e−02,
−1.791696516251699 e−02, −1.849892453107246 e−02,
−1.909097368362797 e−02, −1.969273308274951 e−02,
−2.030414376031160 e−02, −2.092546711168754 e−02,
−2.155660557689242 e−02, −2.219710359529686 e−02,
−2.284684792818856 e−02, −2.350606779320675 e−02,
−2.417463749934085 e−02, −2.485207716234951 e−02,
−2.553826580898371 e−02, −2.623344061522424 e−02,
−2.693746704328349 e−02, −2.764983997782559 e−02,
−2.837043858580717 e−02, −2.909952486193998 e−02,
−2.983695676902939 e−02, −3.058218787751172 e−02,
−3.133504629493832 e−02, −3.209573641742117 e−02,
−3.286409853195186 e−02, −3.363960728361352 e−02,
−3.442207835192332 e−02, −3.521166997276568 e−02,
−3.600820974457969 e−02, −3.681119317395579 e−02,
−3.762042487257546 e−02, −3.843601741746971 e−02,
−3.925772507976759 e−02, −4.008494689009130 e−02,
−4.091746034850161 e−02, −4.175542154425013 e−02,
−4.259863408038441 e−02, −4.344654894948344 e−02,
−4.429899287523113 e−02, −4.515616616948602 e−02,
−4.601786724624048 e−02, −4.688349274164030 e−02,
−4.775281564045485 e−02, −4.862598509282498 e−02,
−4.950274425624717 e−02, −5.038242975874127 e−02,
−5.126474204655663 e−02, −5.214974857230398 e−02,
−5.303718358615044 e−02, −5.392644753556616 e−02,
−5.481729406855359 e−02, −5.570983057565210 e−02,
−5.660384311081047 e−02, −5.749879655200370 e−02,
−5.839451321393058 e−02, −5.929116747072080 e−02,
−6.018848884279070 e−02, −6.108576415855094 e−02,
−6.198268202511926 e−02, −6.287933502598060 e−02,
−6.377542359879805 e−02, −6.467025548071184 e−02,
−6.556352962710620 e−02, −6.645533804325808 e−02,
−6.734542216184526 e−02, −6.823317113969737 e−02,
−6.911832800881393 e−02, −7.000099017198280 e−02,
−7.088091415536939 e−02, −7.175751581450866 e−02,
−7.263057011354321 e−02, −7.350020923324756 e−02,
−7.436618116832702 e−02, −7.522784961377151 e−02,
−7.608493286734087 e−02, −7.693750413779520 e−02,
−7.778525942347714 e−02, −7.862751920094575 e−02,
−7.946399769633587 e−02, −8.029480247839879 e−02,
−8.111965623403654 e−02, −8.193789640255647 e−02,
−8.274924535373614 e−02, −8.355381170261278 e−02,
−8.435134905678848 e−02, −8.514125464087215 e−02,
−8.592328028689659 e−02, −8.669753354886602 e−02,
−8.746379123238275 e−02, −8.822149831804039 e−02,
−8.897043074644968 e−02, −8.971069341834263 e−02,
−9.044201341183719 e−02, −9.116374329727489 e−02,
−9.187564084638347 e−02, −9.257786640497777 e−02,
−9.327014538321736 e−02, −9.395176975347193 e−02,
−9.462246851310178 e−02, −9.528240981433814 e−02,
−9.593137735886889 e−02, −9.656876884228789 e−02,
−9.719438533739366 e−02, −9.780843257659243 e−02,
−9.841075978146442 e−02, −9.900085534600200 e−02,
−9.957851303827886 e−02, −1.001438325530028 e−01,
−1.006965654660066 e−01, −1.012361165314596 e−01,
−1.017622262660318 e−01, −1.022749718234132 e−01,
−1.027741036495644 e−01, −1.032590485916072 e−01,
−1.037296416381658 e−01, −1.041861222641119 e−01,
−1.046283222746241 e−01, −1.050556674062305 e−01,
−1.054680247057000 e−01, −1.058657014776354 e−01,
−1.062485747526411 e−01, −1.066160875985523 e−01,
−1.069680384993124 e−01, −1.073045851468520 e−01,
−1.076255384835563 e−01, −1.079303623240916 e−01,
−1.082188709931267 e−01, −1.084912299471198 e−01,
−1.087472718159103 e−01, −1.089864959432877 e−01,
−1.092087422379003 e−01, −1.094141900597718 e−01,
−1.096026598727515 e−01, −1.097736146613313 e−01,
−1.099268894481712 e−01, −1.100626919008929 e−01,
−1.101808861640070 e−01, −1.102809952914802 e−01,
−1.103629709312858 e−01, −1.104271876052675 e−01,
−1.104735471815890 e−01, −1.105014789286600 e−01,
−1.105108362290460 e−01, −1.105018987914554 e−01,
−1.104745246005427 e−01, −1.104281465492726 e−01,
−1.103625464011331 e−01, −1.102778601442104 e−01,
−1.101739218186236 e−01, −1.100502639286607 e−01,
−1.099067826823344 e−01, −1.097437360338336 e−01,
−1.095610353779043 e−01, −1.093582462693348 e−01,
−1.091353125572511 e−01, −1.088925531745051 e−01,
−1.086298673699289 e−01, −1.083467335729228 e−01,
−1.080429791821427 e−01, −1.077187842899125 e−01,
−1.073739938306107 e−01, −1.070081184450032 e−01,
−1.066210413471652 e−01, −1.062130155324388 e−01,
−1.057838954855888 e−01, −1.053331389663558 e−01,
−1.048606145834788 e−01, −1.043666017588026 e−01,
−1.038509823636319 e−01, −1.033132401525343 e−01,
−1.027532566706549 e−01, −1.021713124102434 e−01,
−1.015673163469357 e−01, −1.009408032844788 e−01,
−1.002916459024019 e−01, −9.962005506126154 e−02,
−9.892587447037898 e−02, −9.820858231161539 e−02,
−9.746803229469267 e−02, −9.670445315437526 e−02,
−9.591769653314886 e−02, −9.510723623306666 e−02,
−9.427290387369003 e−02, −9.341489003828900 e−02,
−9.253303383231506 e−02, −9.162682426346705 e−02,
−9.069614104466586 e−02, −8.974125216128212 e−02,
−8.876201954716677 e−02, −8.775790063882420 e−02,
−8.672877689119252 e−02, −8.567495161533510 e−02,
−8.459627389188201 e−02, −8.349213839083708 e−02,
−8.236235749389448 e−02, −8.120716401834208 e−02,
−8.002639902061687 e−02, −7.881950797067065 e−02,
−7.758626878445929 e−02, −7.632679536516856 e−02,
−7.504088747769501 e−02, −7.372803129789816 e−02,
−7.238806162166744 e−02, −7.102116211954443 e−02,
−6.962720872934396 e−02, −6.820576796149519 e−02,
−6.675671622392269 e−02, −6.528023606863240 e−02,
−6.377611429172260 e−02, −6.224374611498080 e−02,
−6.068292908100376 e−02, −5.909386001558149 e−02,
−5.747627430502456 e−02, −5.582945016301614 e−02,
−5.415316322402774 e−02, −5.244768784057990 e−02,
−5.071287102956145 e−02, −4.894812724598650 e−02,
−4.715324945932696 e−02, −4.532841381541464 e−02,
−4.347347112195197 e−02, −4.158794238398249 e−02,
−3.967162909873025 e−02, −3.772461300253332 e−02,
−3.574664020854284 e−02, −3.373712599806719 e−02,
−3.169587609244436 e−02, −2.962308489442885 e−02,
−2.751857552683018 e−02, −2.538179830690266 e−02,
−2.321255714428171 e−02, −2.101100771772769 e−02,
−1.877689096555516 e−02, −1.650953674438219 e−02,

−1.420871083118669 e−02, −1.187461378850388 e−02,
−9.507008996713286 e−03, −7.105225746748432 e−03,
−4.669099247423082 e−03, −2.198970714838444 e−03,
+3.052506679844099 e−04, +2.844096748870384 e−03,
+5.417800316971459 e−03, +8.026287894631955 e−03,
+1.066976124794342 e−02, +1.334869917032908 e−02,
+1.606331521084708 e−02, +1.881355950582949 e−02,
+2.159970134663663 e−02, +2.442232147839131 e−02,
+2.728156010437695 e−02, +3.017712138573929 e−02,
+3.310912443052597 e−02, +3.607810469851272 e−02,
+3.908419391833869 e−02, +4.212712008909140 e−02,
+4.520702759803914 e−02, +4.832447852355055 e−02,
+5.147966118159461 e−02, +5.467238802204326 e−02,
+5.790284080082958 e−02, +6.117156717220185 e−02,
+6.447866054615346 e−02, +6.782376212130986 e−02,
+7.120692575100979 e−02, +7.462862199422061 e−02,
+7.808896236959446 e−02, +8.158769578329894 e−02,
+8.512490568723846 e−02, +8.870101069974845 e−02,
+9.231608110264714 e−02, +9.596983987496970 e−02,
+9.966236893806717 e−02, +1.033941063338643 e−01,
+1.071650779014335 e−01, +1.109748994439795 e−01,
+1.148235927259266 e−01, +1.187115850305241 e−01,
+1.226388834300689 e−01, +1.266050731283809 e−01,
+1.306101067250375 e−01, +1.346543064817742 e−01,
+1.387376249190578 e−01, +1.428596447589721 e−01,
+1.470203170721216 e−01, +1.512199592605080 e−01,
+1.554584725339102 e−01, +1.597353438179875 e−01,
+1.640504702561671 e−01, +1.684041609371527 e−01,
+1.727963503982179 e−01, +1.772265953627290 e−01,
+1.816947894623263 e−01, +1.862011624788949 e−01,
+1.907455489457267 e−01, +1.953273880886783 e−01,
+1.999464539304762 e−01, +2.046028558464008 e−01,
+2.092963206850239 e−01, +2.140261955702662 e−01,
+2.187922274259156 e−01, +2.235945635254679 e−01,
+2.284329840640989 e−01, +2.333068981094213 e−01,
+2.382160219461597 e−01, +2.431603785542250 e−01,
+2.481396077816722 e−01, +2.531529721334063 e−01,
+2.582001739497298 e−01, +2.632813508034234 e−01,
+2.683961570569586 e−01, +2.735437630266799 e−01,
+2.787237550375912 e−01, +2.839361392493072 e−01,
+2.891805257722012 e−01, +2.944561228780392 e−01,
+2.997624255177811 e−01, +3.050992195689690 e−01,
+3.104659867604553 e−01, +3.158619077906196 e−01,
+3.212865260033979 e−01, +3.267397428773339 e−01,
+3.322210551086769 e−01, +3.377295561726898 e−01,
+3.432647335893443 e−01, +3.488264676990591 e−01,
+3.544142074632647 e−01, +3.600269656734629 e−01,
+3.656640377499646 e−01, +3.713250061671226 e−01,
+3.770091190097118 e−01, +3.827152968157059 e−01,
+3.884429045609680 e−01, +3.941917466962361 e−01,
+3.999611859760947 e−01, +4.057501420991821 e−01,
+4.115579429637846 e−01, +4.173843265025887 e−01,
+4.232286297916428 e−01, +4.290897820858789 e−01,
+4.349669624916473 e−01, +4.408596056709005 e−01,
+4.467668696607166 e−01, +4.526876397402144 e−01,
+4.586211456831769 e−01, +4.645669547719424 e−01,
+4.705242008503956 e−01, +4.764915897192549 e−01,
+4.824682887794052 e−01, +4.884539254831315 e−01,
+4.944476636179056 e−01, +5.004481977619742 e−01,
+5.064545550235134 e−01, +5.124661018959751 e−01,
+5.184818933365749 e−01, +5.245006748662190 e−01,
+5.305215796893860 e−01, +5.365441251369431 e−01,
+5.425674372882107 e−01, +5.485902506852811 e−01,
+5.546116774259739 e−01, +5.606312044701524 e−01,
+5.666478652857275 e−01, +5.726602391687222 e−01,
+5.786672646386708 e−01, +5.846682453966959 e−01,
+5.906621680078100 e−01, +5.966477035050948 e−01,
+6.026239249993590 e−01, +6.085903032056262 e−01,
+6.145458904162185 e−01, +6.204893201838491 e−01,
+6.264196163765745 e−01, +6.323361944662236 e−01,
+6.382380808188793 e−01, +6.441239094712802 e−01,
+6.499926319211775 e−01, +6.558435212204078 e−01,
+6.616755522321309 e−01, +6.674874032292857 e−01,
+6.732781108033908 e−01, +6.790470657166684 e−01,
+6.847932667399612 e−01, +6.905153235578969 e−01,
+6.962122668445681 e−01, +7.018835463513400 e−01,
+7.075281787629503 e−01, +7.131447476468400 e−01,
+7.187322544823347 e−01, +7.242901217843889 e−01,
+7.298174107967581 e−01, +7.353128213893310 e−01,
+7.407754721062685 e−01, +7.462048970975652 e−01,
+7.516001985652684 e−01, +7.569600449843341 e−01,
+7.622834795152550 e−01, +7.675699252273948 e−01,
+7.728184915997067 e−01, +7.780279710901641 e−01,
+7.831974571624924 e−01, +7.883263448127340 e−01,
+7.934137241269077 e−01, +7.984583859818390 e−01,
+8.034595539057413 e−01, +8.084168767164887 e−01,
+8.133295347030278 e−01, +8.181962433248811 e−01,
+8.230162284197827 e−01, +8.277892271515950 e−01,
+8.325145336568091 e−01, +8.371909942430671 e−01,
+8.418178561101360 e−01, +8.463947757326752 e−01,
+8.509211545601609 e−01, +8.553961300139363 e−01,
+8.598190417223652 e−01, +8.641894434050258 e−01,
+8.685068980898102 e−01, +8.727709688046102 e−01,
+8.769788376631916 e−01, +8.811334436653052 e−01,
+8.852318659908962 e−01, +8.892739843568178 e−01,
+8.932596784799233 e−01, +8.971888108843806 e−01,
+9.010608486625941 e−01, +9.048748835980528 e−01,
+9.086304531070754 e−01, +9.123275405380156 e−01,
+9.159657608120536 e−01, +9.195443573144829 e−01,
+9.230629478622332 e−01, +9.265215299450000 e−01,
+9.299198500625820 e−01, +9.332574012340955 e−01,
+9.365339988633418 e−01, +9.397497768500882 e−01,
+9.429045261728636 e−01, +9.459977028429117 e−01,
+9.490292643083790 e−01, +9.519996619967281 e−01,
+9.549088408436811 e−01, +9.577562383751640 e−01,
+9.605417649811824 e−01, +9.632658122557368 e−01,
+9.659284562011029 e−01, +9.685294510301206 e−01,
+9.710688896122810 e−01, +9.735472021876628 e−01,
+9.759644676274450 e−01, +9.783204156360773 e−01,
+9.806151639385083 e−01, +9.828492160865892 e−01,
+9.850226760127131 e−01, +9.871352538808781 e−01,
+9.891871802564161 e−01, +9.911792082081333 e−01,
+9.931117453856605 e−01, +9.949848494122985 e−01,
+9.967989944502682 e−01, +9.985550647085534 e−01,
+1.000253445050194 e+00, +1.001894024615659 e+00,
+1.003477185929786 e+00, +1.005003807883761 e+00,
+1.006474342231823 e+00, +1.007888812850102 e+00,
+1.009247722934429 e+00, +1.010552057109195 e+00,
+1.011802420624526 e+00, +1.012999036304394 e+00,
+1.014142538208007 e+00, +1.015233969130880 e+00,
+1.016273931967023 e+00, +1.017262593268930 e+00,
+1.018200610205248 e+00, +1.019089129704898 e+00,
+1.019928842669923 e+00, +1.020719983374545 e+00,
+1.021463262031346 e+00, +1.022159867011177 e+00,
+1.022810581114847 e+00, +1.023415781467653 e+00,
+1.023976320927187 e+00, +1.024493524092612 e+00,
+1.024968218100715 e+00, +1.025400734608122 e+00,
+1.025791922603958 e+00, +1.026143150540689 e+00,
+1.026455340400072 e+00, +1.026728963502498 e+00,
+1.026964914246647 e+00, +1.027164510654160 e+00,
+1.027328632612924 e+00, +1.027457725038440 e+00,
+1.027552729180790 e+00, +1.027615074932096 e+00,
+1.027645580283665 e+00, +1.027644462380432 e+00,
+1.027612681261584 e+00, +1.027551936393756 e+00,

+1.027463246660797 e+00, +1.027346944848234 e+00,
+1.027203976311704 e+00, +1.027035903410657 e+00,
+1.026843704381356 e+00, +1.026627771359327 e+00,
+1.026389068000259 e+00, +1.026129124951269 e+00,
+1.025848782597774 e+00, +1.025548201799728 e+00,
+1.025228357342061 e+00, +1.024891029860151 e+00,
+1.024537134749709 e+00, +1.024166724015001 e+00,
+1.023780698019775 e+00, +1.023380803775376 e+00,
+1.022967885528204 e+00, +1.022541888689137 e+00,
+1.022103695693341 e+00, +1.021655115592693 e+00,
+1.021196819229254 e+00, +1.020728359657958 e+00,
+1.020250686272421 e+00, +1.019766121526662 e+00,
+1.019275334687329 e+00, +1.018777362174335 e+00,
+1.018273081302452 e+00, +1.017765178792830 e+00,
+1.017253984284701 e+00, +1.016737542074604 e+00,
+1.016217355867531 e+00, +1.015698328083719 e+00,
+1.015181679856847 e+00, +1.014665311686846 e+00,
+1.014158817803440 e+00, +1.013683181980586 e+00,
+1.013249071090664 e+00, +1.012854331657942 e+00,
+1.012450620480768 e+00, +1.011948006992127 e+00,
+1.011349594569779 e+00, +1.010750807770724 e+00,
+1.010189090179223 e+00, +1.009640487251585 e+00,
+1.009094771053394 e+00, +1.008557961167850 e+00,
+1.008032659941965 e+00, +1.007517375307989 e+00,
+1.007011287608451 e+00, +1.006514430011155 e+00,
+1.006026890813957 e+00, +1.005548764575910 e+00,
+1.005079874697786 e+00, +1.004619788163424 e+00,
+1.004168417268956 e+00, +1.003726014625139 e+00,
+1.003292461479605 e+00, +1.002867268893035 e+00,
+1.002450315292720 e+00, +1.002041847623544 e+00,
+1.001641769115897 e+00, +1.001249637387833 e+00,
+1.000865334924641 e+00, +1.000489068954641 e+00,
+1.000120698237067 e+00, +9.997597357106623 e−01,
+9.994060799749374 e−01, +9.990600138594018 e−01,
+9.987214414655692 e−01, +9.983898865406841 e−01,
+9.980652196577338 e−01, +9.977476599094836 e−01,
+9.974370849972721 e−01, +9.971330321102652 e−01,
+9.968354071802502 e−01, +9.965444836911705 e−01,
+9.962601672340514 e−01, +9.959819947971522 e−01,
+9.957098545943852 e−01, +9.954439865572462 e−01,
+9.951842733288886 e−01, +9.949302413030897 e−01,
+9.946817924874576 e−01, +9.944392047205887 e−01,
+9.942024045863540 e−01, +9.939709658067042 e−01,
+9.937448009691057 e−01, +9.935241604969254 e−01,
+9.933089182704574 e−01, +9.930985748592784 e−01,
+9.928930430130044 e−01, +9.926926485907741 e−01,
+9.924973655191176 e−01, +9.923068103443909 e−01,
+9.921208874284833 e−01, +9.919397899901643 e−01,
+9.917633778190438 e−01, +9.915911837376036 e−01,
+9.914231780519580 e−01, +9.912597642374404 e−01,
+9.911009195707438 e−01, +9.909461904886675 e−01,
+9.907954498484041 e−01, +9.906489032572322 e−01,
+9.905064710654814 e−01, +9.903677893656558 e−01,
+9.902328499802091 e−01, +9.901019951653361 e−01,
+9.899751611066148 e−01, +9.898518794779545 e−01,
+9.897320682428268 e−01, +9.896160337369861 e−01,
+9.895037256870947 e−01, +9.893947359604699 e−01,
+9.892890160408989 e−01, +9.891868774704359 e−01,
+9.890882840931410 e−01, +9.889928511129679 e−01,
+9.889005321235379 e−01, +9.888116182908468 e−01,
+9.887260333430423 e−01, +9.886433365303475 e−01,
+9.885634927535989 e−01, +9.884868721088945 e−01,
+9.884134697413018 e−01, +9.883429020724473 e−01,
+9.882751039537586 e−01, +9.882103306444820 e−01,
+9.881485041748238 e−01, +9.880892168751595 e−01,
+9.880324626554831 e−01, +9.879786335149536 e−01,
+9.879277114724612 e−01, +9.878792663495038 e−01,
+9.878332150629403 e−01, +9.877898261218510 e−01,
+9.877490592657352 e−01, +9.877105653505679 e−01,
+9.876743442038471 e−01, +9.876407405135295 e−01,
+9.876096955295567 e−01, +9.875807496078497 e−01,
+9.875538464766127 e−01, +9.875293349435258 e−01,
+9.875072021876561 e−01, +9.874870704481152 e−01,
+9.874688908826080 e−01, +9.874529447589979 e−01,
+9.874391758112012 e−01, +9.874271920836210 e−01,
+9.874169741527905 e−01, +9.874088727307169 e−01,
+9.874028477167635 e−01, +9.873984685207834 e−01,
+9.873956821201697 e−01, +9.873948143463702 e−01,
+9.873958301311858 e−01, +9.873983326194351 e−01,
+9.874022834012905 e−01, +9.874080027710336 e−01,
+9.874154551873394 e−01, +9.874242488204272 e−01,
+9.874343401290739 e−01, +9.874460335035745 e−01,
+9.874592688338504 e−01, +9.874736235387018 e−01,
+9.874890696412385 e−01, +9.875059727945840 e−01,
+9.875243137719285 e−01, +9.875436862847529 e−01,
+9.875640274936844 e−01, +9.875856201221136 e−01,
+9.876084084448705 e−01, +9.876319996758224 e−01,
+9.876563785063032 e−01, +9.876819048329899 e−01,
+9.877085492327816 e−01, +9.877358921155149 e−01,
+9.877638696088412 e−01, +9.877927754855115 e−01,
+9.878225576787804 e−01, +9.878528193014621 e−01,
+9.878835445497628 e−01, +9.879150968481590 e−01,
+9.879474521328961 e−01, +9.879801976843903 e−01,
+9.880132731565830 e−01, +9.880469724750991 e−01,
+9.880812445673735 e−01, +9.881156946084619 e−01,
+9.881503106987573 e−01, +9.881854620136666 e−01,
+9.882211314188272 e−01, +9.882569137253582 e−01,
+9.882927446902245 e−01, +9.883289032519310 e−01,
+9.883653317154473 e−01, +9.884016382257884 e−01,
+9.884378310018685 e−01, +9.884743146700878 e−01,
+9.885110753693968 e−01, +9.885476787868710 e−01,
+9.885840418353093 e−01, +9.886204379327659 e−01,
+9.886568414746639 e−01, +9.886929275063397 e−01,
+9.887287200468966 e−01, +9.887645868459630 e−01,
+9.888004757085318 e−01, +9.888359174300858 e−01,
+9.888708540445242 e−01, +9.889056416611736 e−01,
+9.889402846310907 e−01, +9.889744320992592 e−01,
+9.890080679866394 e−01, +9.890415110770159 e−01,
+9.890747269455915 e−01, +9.891073295256775 e−01,
+9.891393036472682 e−01, +9.891710038703801 e−01,
+9.892024062799223 e−01, +9.892331093959095 e−01,
+9.892631024032380 e−01, +9.892927650908963 e−01,
+9.893220982848433 e−01, +9.893507219573624 e−01,
+9.893786032000026 e−01, +9.894060580815116 e−01,
+9.894330645494204 e−01, +9.894592636950934 e−01,
+9.894846746832306 e−01, +9.895096919388534 e−01,
+9.895343083314785 e−01, +9.895581152602352 e−01,
+9.895810813422480 e−01, +9.896035553161019 e−01,
+9.896255512296797 e−01, +9.896467469067676 e−01,
+9.896671650245172 e−01, +9.896871706698203 e−01,
+9.897067365020641 e−01, +9.897254458138418 e−01,
+9.897432947038028 e−01, +9.897606930400666 e−01,
+9.897776834824588 e−01, +9.897939374675170 e−01,
+9.898094478563998 e−01, +9.898245305815332 e−01,
+9.898391682249337 e−01, +9.898530133261707 e−01,
+9.898661175792055 e−01, +9.898789278944983 e−01,
+9.898914705684924 e−01, +9.899033504013042 e−01,
+9.899145471163803 e−01, +9.899254194103574 e−01,
+9.899359976303029 e−01, +9.899459823437818 e−01,
+9.899554202030650 e−01, +9.899647016766845 e−01,
+9.899738352794291 e−01, +9.899824494486951 e−01,
+9.899905595941995 e−01, +9.899985686323577 e−01,
+9.900065116928948 e−01, +9.900140555182825 e−01,
+9.900212405447888 e−01, +9.900284805353695 e−01,

+9.900358124222742 e−01, +9.900428956722681 e−01,
+9.900497484789281 e−01, +9.900567489573141 e−01,
+9.900639252344197 e−01, +9.900709561632662 e−01,
+9.900778969424803 e−01, +9.900851772980046 e−01,
+9.900928358611601 e−01, +9.901005198590931 e−01,
+9.901082439265390 e−01, +9.901163920607219 e−01,
+9.901250018173793 e−01, +9.901337646053293 e−01,
+9.901427479709606 e−01, +9.901523931998540 e−01,
+9.901627402679979 e−01, +9.901734275350572 e−01,
+9.901844600451093 e−01, +9.901962127540933 e−01,
+9.902087332329851 e−01, +9.902217409846106 e−01,
+9.902353097103640 e−01, +9.902498637985275 e−01,
+9.902654188005916 e−01, +9.902815836378273 e−01,
+9.902983686695558 e−01, +9.903161882791064 e−01,
+9.903351096966241 e−01, +9.903548501470234 e−01,
+9.903754652821575 e−01, +9.903973477947732 e−01,
+9.904205084933333 e−01, +9.904445786599008 e−01,
+9.904695808487622 e−01, +9.904959297726740 e−01,
+9.905236810016560 e−01, +9.905525289918011 e−01,
+9.905825150202904 e−01, +9.906140262079994 e−01,
+9.906470660818262 e−01, +9.906812569810133 e−01,
+9.907166224339236 e−01, +9.907535876784416 e−01,
+9.907922087340426 e−01, +9.908321697026107 e−01,
+9.908734943143861 e−01, +9.909165464981378 e−01,
+9.909613313790248 e−01, +9.910074971074613 e−01,
+9.910550740962871 e−01, +9.911044737993845 e−01,
+9.911557226040716 e−01, +9.912084614290896 e−01,
+9.912627029879084 e−01, +9.913188323156490 e−01,
+9.913768610980639 e−01, +9.914364276145792 e−01,
+9.914975411562229 e−01, +9.915605826937839 e−01,
+9.916255751593622 e−01, +9.916921826078263 e−01,
+9.917604214872976 e−01, +9.918306597984429 e−01,
+9.919028873284097 e−01, +9.919767175562684 e−01,
+9.920521593387949 e−01, +9.921296166135889 e−01,
+9.922091101818779 e−01, +9.922902757201201 e−01,
+9.923730982524657 e−01, +9.924579135466506 e−01,
+9.925447043512063 e−01, +9.926331018900273 e−01,
+9.927231225056266 e−01, +9.928151658609977 e−01,
+9.929092387372991 e−01, +9.930049538427406 e−01,
+9.931022798104318 e−01, +9.932015434077218 e−01,
+9.933027281437943 e−01, +9.934054751445924 e−01,
+9.935098037935540 e−01, +9.936161084869942 e−01,
+9.937243666117925 e−01, +9.938341389810342 e−01,
+9.939453714404443 e−01, +9.940583985614073 e−01,
+9.941732232809857 e−01, +9.942895145656371 e−01,
+9.944072763730046 e−01, +9.945268452163670 e−01,
+9.946481676207727 e−01, +9.947708034711511 e−01,
+9.948947222146535 e−01, +9.950203031067961 e−01,
+9.951475444242728 e−01, +9.952760608735062 e−01,
+9.954058173659507 e−01, +9.955371298969039 e−01,
+9.956699511040611 e−01, +9.958038713694317 e−01,
+9.959388575029996 e−01, +9.960752523364563 e−01,
+9.962130271017117 e−01, +9.963517811272741 e−01,
+9.964914827801233 e−01, +9.966324689957675 e−01,
+9.967746939976430 e−01, +9.969177298776669 e−01,
+9.970615306490058 e−01, +9.972064329530154 e−01,
+9.973524075591346 e−01, +9.974990583293081 e−01,
+9.976463479353705 e−01, +9.977945971317506 e−01,
+9.979437430375855 e−01, +9.980933404947205 e−01,
+9.982433336615963 e−01, +9.983940572002874 e−01,
+9.985454907974421 e−01, +9.986972567262494 e−01,
+9.988493116887893 e−01, +9.990019468868200 e−01,
+9.991550977367476 e−01, +9.993083430214909 e−01,
+9.994615765165296 e−01, +9.996150231216515 e−01,
+9.997689221333534 e−01, +9.999235128481329 e−01,
+1.000076493002599 e+00, +1.000231131275969 e+00,
+1.000385125142624 e+00, +1.000538713539491 e+00,
+1.000692135698996 e+00, +1.000845616726739 e+00,
+1.000999050218361 e+00, +1.001152013920163 e+00,
+1.001304442627610 e+00, +1.001456627881216 e+00,
+1.001608526000461 e+00, +1.001759757645423 e+00,
+1.001910301800365 e+00, +1.002060493867275 e+00,
+1.002210277420412 e+00, +1.002359204811906 e+00,
+1.002507212061815 e+00, +1.002654620794815 e+00,
+1.002801392925948 e+00, +1.002947129400411 e+00,
+1.003091799884742 e+00, +1.003235742261295 e+00,
+1.003378909587027 e+00, +1.003520870253791 e+00,
+1.003661577107433 e+00, +1.003801368578070 e+00,
+1.003940212001390 e+00, +1.004077702628435 e+00,
+1.004213810320699 e+00, +1.004348879757933 e+00,
+1.004482876599046 e+00, +1.004615386562846 e+00,
+1.004746360645254 e+00, +1.004876116715471 e+00,
+1.005004618375781 e+00, +1.005131475392675 e+00,
+1.005256684766584 e+00, +1.005380628601598 e+00,
+1.005503275059852 e+00, +1.005624178100742 e+00,
+1.005743282364652 e+00, +1.005860927032197 e+00,
+1.005977115074116 e+00, +1.006091510392348 e+00,
+1.006204114728125 e+00, +1.006315265680367 e+00,
+1.006424907424988 e+00, +1.006532594023395 e+00,
+1.006638301298317 e+00, +1.006742427727669 e+00,
+1.006844991973082 e+00, +1.006945629196305 e+00,
+1.007044321511378 e+00, +1.007141399219649 e+00,
+1.007236829559076 e+00, +1.007330218597112 e+00,
+1.007421572075267 e+00, +1.007511294570522 e+00,
+1.007599401798709 e+00, +1.007685518441567 e+00,
+1.007769625953741 e+00, +1.007852064386603 e+00,
+1.007932817703069 e+00, +1.008011514905126 e+00,
+1.008088176165563 e+00, +1.008163211111724 e+00,
+1.008236628017949 e+00, +1.008308033204578 e+00,
+1.008377415429783 e+00, +1.008445148098658 e+00,
+1.008511247273756 e+00, +1.008575370579197 e+00,
+1.008637540589491 e+00, +1.008698144207627 e+00,
+1.008757190321980 e+00, +1.008814310258779 e+00,
+1.008869515256392 e+00, +1.008923196622113 e+00,
+1.008975366811245 e+00, +1.009025659761512 e+00,
+1.009074101779034 e+00, +1.009121111323685 e+00,
+1.009166718967367 e+00, +1.009210565968291 e+00,
+1.009252657087366 e+00, +1.009293362609020 e+00,
+1.009332706372757 e+00, +1.009370366213570 e+00,
+1.009406398832440 e+00, +1.009441237185677 e+00,
+1.009474905002031 e+00, +1.009507017171120 e+00,
+1.009537576990303 e+00, +1.009566978740742 e+00,
+1.009595264293017 e+00, +1.009622122007090 e+00,
+1.009647608302352 e+00, +1.009672145744679 e+00,
+1.009695757189383 e+00, +1.009718066587100 e+00,
+1.009739084785160 e+00, +1.009759212016967 e+00,
+1.009778504921465 e+00, +1.009796675060142 e+00,
+1.009813790867919 e+00, +1.009830274807737 e+00,
+1.009846137382005 e+00, +1.009860979702382 e+00,
+1.009874817539016 e+00, +1.009888083631667 e+00,
+1.009900853103284 e+00, +1.009912839830312 e+00,
+1.009924092276850 e+00, +1.009934992836975 e+00,
+1.009945546632798 e+00, +1.009955384765721 e+00,
+1.009964547970550 e+00, +1.009973486342123 e+00,
+1.009982268770147 e+00, +1.009990580458388 e+00,
+1.009998459694088 e+00, +1.010006298177305 e+00,
+1.010014110835447 e+00, +1.010021537788250 e+00,
+1.010028618428735 e+00, +1.010035791136646 e+00,
+1.010043112228827 e+00, +1.010050254076988 e+00,
+1.010057245369122 e+00, +1.010064471863242 e+00,
+1.010071952131355 e+00, +1.010079338752086 e+00,
+1.010086669402375 e+00, +1.010094366238073 e+00,
+1.010102470533325 e+00, +1.010110642277138 e+00,
+1.010118917317053 e+00, +1.010127706776959 e+00,

+1.010137026407425 e+00, +1.010146497096682 e+00,
+1.010156127541843 e+00, +1.010166316200025 e+00,
+1.010177110711677 e+00, +1.010188205550670 e+00,
+1.010199631706068 e+00, +1.010211755260102 e+00,
+1.010224555569669 e+00, +1.010237629352925 e+00,
+1.010251003469427 e+00, +1.010265134075557 e+00,
+1.010280073997043 e+00, +1.010295468653759 e+00,
+1.010311300308220 e+00, +1.010327891493345 e+00,
+1.010345234996637 e+00, +1.010362995486892 e+00,
+1.010381216558204 e+00, +1.010400316698172 e+00,
+1.010420292023388 e+00, +1.010440717183162 e+00,
+1.010461564316351 e+00, +1.010483206256578 e+00,
+1.010505666262059 e+00, +1.010528615445659 e+00,
+1.010552068219883 e+00, +1.010576380809038 e+00,
+1.010601521285347 e+00, +1.010627072440648 e+00,
+1.010653027053931 e+00, +1.010679788081867 e+00,
+1.010707375229772 e+00, +1.010735421976626 e+00,
+1.010763905869062 e+00, +1.010793149909083 e+00,
+1.010823120603859 e+00, +1.010853429760676 e+00,
+1.010884078284304 e+00, +1.010915454361544 e+00,
+1.010947547074519 e+00, +1.010979946214537 e+00,
+1.011012627395599 e+00, +1.011045953108263 e+00,
+1.011079907971760 e+00, +1.011114097416553 e+00,
+1.011148486293359 e+00, +1.011183400596362 e+00,
+1.011218823992338 e+00, +1.011254397791134 e+00,
+1.011290126474096 e+00, +1.011326374295525 e+00,
+1.011363082075863 e+00, +1.011399769951629 e+00,
+1.011436384522522 e+00, +1.011473302008831 e+00,
+1.011510547051838 e+00, +1.011547787220495 e+00,
+1.011584996312149 e+00, +1.011622454130127 e+00,
+1.011660075693276 e+00, +1.011697416504599 e+00,
+1.011734462313348 e+00, +1.011771627262926 e+00,
+1.011808919793469 e+00, +1.011845938738977 e+00,
+1.011882624964772 e+00, +1.011919264025716 e+00,
+1.011955790122897 e+00, +1.011991788266365 e+00,
+1.012027240794153 e+00, +1.012062525726662 e+00,
+1.012097630839309 e+00, +1.012132151631041 e+00,
+1.012166035659198 e+00, +1.012199583936457 e+00,
+1.012232734564333 e+00, +1.012265064558555 e+00,
+1.012296549102454 e+00, +1.012327560477901 e+00,
+1.012358082400925 e+00, +1.012387708001513 e+00,
+1.012416383754384 e+00, +1.012444410627777 e+00,
+1.012471723038292 e+00, +1.012497890726292 e+00,
+1.012522883349504 e+00, +1.012547069718292 e+00,
+1.012570434021054 e+00, +1.012592573402938 e+00,
+1.012613430563370 e+00, +1.012633295255708 e+00,
+1.012652102923549 e+00, +1.012669436800254 e+00,
+1.012685277016726 e+00, +1.012699998432300 e+00,
+1.012713572256585 e+00, +1.012725564992284 e+00,
+1.012735914876099 e+00, +1.012744934005791 e+00,
+1.012752577651415 e+00, +1.012758443858682 e+00,
+1.012762496111508 e+00, +1.012765062889864 e+00,
+1.012766104774385 e+00, +1.012765214703761 e+00,
+1.012762356719162 e+00, +1.012757865052107 e+00,
+1.012751685362581 e+00, +1.012743376077777 e+00,
+1.012732896174196 e+00, +1.012720605477780 e+00,
+1.012706484200181 e+00, +1.012690130527749 e+00,
+1.012671486975730 e+00, +1.012650842226435 e+00,
+1.012628146441024 e+00, +1.012603012552473 e+00,
+1.012575427778520 e+00, +1.012545750134419 e+00,
+1.012513922299362 e+00, +1.012479473490919 e+00,
+1.012442344023191 e+00, +1.012402887777359 e+00,
+1.012361105121003 e+00, +1.012316638832887 e+00,
+1.012269448366181 e+00, +1.012219809594718 e+00,
+1.012167638122170 e+00, +1.012112494069630 e+00,
+1.012054359992419 e+00, +1.011993638380370 e+00,
+1.011930323929956 e+00, +1.011864000215460 e+00,
+1.011794588601900 e+00, +1.011722351640686 e+00,
+1.011647223869087 e+00, +1.011568814072372 e+00,
+1.011487118812239 e+00, +1.011402518267713 e+00,
+1.011314978002071 e+00, +1.011224048846073 e+00,
+1.011129654652857 e+00, +1.011032094993283 e+00,
+1.010931324278397 e+00, +1.010826951260377 e+00,
+1.010718941241622 e+00, +1.010607614747097 e+00,
+1.010492924436361 e+00, +1.010374455963019 e+00,
+1.010252160684281 e+00, +1.010126353960416 e+00,
+1.009996954741022 e+00, +1.009863488188648 e+00,
+1.009725892479312 e+00, +1.009584519851048 e+00,
+1.009439365159565 e+00, +1.009290060983833 e+00,
+1.009136529912757 e+00, +1.008978985140192 e+00,
+1.008817301052548 e+00, +1.008651020208035 e+00,
+1.008480124067563 e+00, +1.008305027555130 e+00,
+1.008125704897790 e+00, +1.007941686009594 e+00,
+1.007752833675443 e+00, +1.007559349517223 e+00,
+1.007361141859567 e+00, +1.007157827358150 e+00,
+1.006949385806640 e+00, +1.006736153885735 e+00,
+1.006518049344503 e+00, +1.006294572836803 e+00,
+1.006065603926773 e+00, +1.005831403532018 e+00,
+1.005591890638477 e+00, +1.005346642064537 e+00,
+1.005095592119373 e+00, +1.004839030117511 e+00,
+1.004576865704429 e+00, +1.004308630055050 e+00,
+1.004034214698496 e+00, +1.003753871618025 e+00,
+1.003467498305776 e+00, +1.003174639260358 e+00,
+1.002875211027427 e+00, +1.002569500413888 e+00,
+1.002257424578396 e+00, +1.001938530973887 e+00,
+1.001612710105563 e+00, +1.001280195339107 e+00,
+1.000940870545871 e+00, +1.000594272975683 e+00,
+1.000240322030139 e+00, +9.998793163292398 e−01,
+9.995111701168786 e−01, +9.991354132324841 e−01,
+9.987519222567783 e−01, +9.983609218719522 e−01,
+9.979623130227679 e−01, +9.975556740764708 e−01,
+9.971409288327860 e−01, +9.967183432488375 e−01,
+9.962878170229250 e−01, +9.958488863050556 e−01,
+9.954014561350919 e−01, +9.949458000048871 e−01,
+9.944818543153893 e−01, +9.940092149931687 e−01,
+9.935277331184579 e−01, +9.930375282832211 e−01,
+9.925387139793089 e−01, +9.920313495175566 e−01,
+9.915146560759479 e−01, +9.909871983144850 e−01,
+9.904515643208522 e−01, +9.899136802423638 e−01,
+9.893635427366756 e−01, +9.887777731550811 e−01,
+9.881930623810997 e−01, +9.877024911349694 e−01,
+9.867719346048082 e−01, +9.859422591203311 e−01,
+9.851327817259932 e−01, +9.843446542813931 e−01,
+9.835667898378924 e−01, +9.827784388364600 e−01,
+9.819697981806308 e−01, +9.811423034808365 e−01,
+9.802944493567077 e−01, +9.794214312173470 e−01,
+9.785214441250228 e−01, +9.775957513212234 e−01,
+9.766438929361375 e−01, +9.756636036109838 e−01,
+9.746537914797736 e−01, +9.736145835187847 e−01,
+9.725453442532574 e−01, +9.714446445280863 e−01,
+9.703115557563614 e−01, +9.691456634185093 e−01,
+9.679460697948364 e−01, +9.667113883637859 e−01,
+9.654406178310210 e−01, +9.641331517728559 e−01,
+9.627881167626269 e−01, +9.614043615076308 e−01,
+9.599808797353324 e−01, +9.585168210361295 e−01,
+9.570113065179300 e−01, +9.554634210701282 e−01,
+9.538722275164798 e−01, +9.522367669696690 e−01,
+9.505560524788548 e−01, +9.488290728836637 e−01,
+9.470548839544214 e−01, +9.452326100986821 e−01,
+9.433613907645669 e−01, +9.414403740008491 e−01,
+9.394686283754716 e−01, +9.374451520790944 e−01,
+9.353691612846549 e−01, +9.332400814902009 e−01,
+9.310570687016885 e−01, +9.288190093977164 e−01,
+9.265249985708898 e−01, +9.241743479451956 e−01,

| | | | |
|---|---|---|---|
| +9.217662887169116 | e−01, | +9.192999665754161 | e−01, |
| +9.167746294201033 | e−01, | +9.141896283466009 | e−01, |
| +9.115442516266717 | e−01, | +9.088377281110291 | e−01, |
| +9.060694681113471 | e−01, | +9.032390575925977 | e−01, |
| +9.003458895224528 | e−01, | +8.973891675497357 | e−01, |
| +8.943683555809617 | e−01, | +8.912831789317232 | e−01, |
| +8.881332000806269 | e−01, | +8.849178157571976 | e−01, |
| +8.816366171218113 | e−01, | +8.782893885841422 | e−01, |
| +8.748757216290605 | e−01, | +8.713950183935990 | e−01, |
| +8.678469565343039 | e−01, | +8.642314881034361 | e−01, |
| +8.605483499580321 | e−01, | +8.567970644671067 | e−01, |
| +8.529774446610170 | e−01, | +8.490895965655302 | e−01, |
| +8.451334654019179 | e−01, | +8.411088323972666 | e−01, |
| +8.370156984112052 | e−01, | +8.328542805780399 | e−01, |
| +8.286245548070180 | e−01, | +8.243262611129502 | e−01, |
| +8.199594783897041 | e−01, | +8.155246236571582 | e−01, |
| +8.110218607207131 | e−01, | +8.064511006873497 | e−01, |
| +8.018126046593852 | e−01, | +7.971069856439827 | e−01, |
| +7.923346478686025 | e−01, | +7.874957820910923 | e−01, |
| +7.825908231062452 | e−01, | +7.776204488292163 | e−01, |
| +7.725851026241404 | e−01, | +7.674849949914248 | e−01, |
| +7.623206183595970 | e−01, | +7.570927486638241 | e−01, |
| +7.518019652814979 | e−01, | +7.464486491227057 | e−01, |
| +7.410334206850239 | e−01, | +7.355571439110484 | e−01, |
| +7.300205729992958 | e−01, | +7.244243523154849 | e−01, |
| +7.187693676298663 | e−01, | +7.130567383226717 | e−01, |
| +7.072872946666678 | e−01, | +7.014615845640527 | e−01, |
| +6.955805444755916 | e−01, | +6.896454997760704 | e−01, |
| +6.836575016451227 | e−01, | +6.776173229836567 | e−01, |
| +6.715260316843978 | e−01, | +6.653849997460716 | e−01, |
| +6.591955305148172 | e−01, | +6.529588449241264 | e−01, |
| +6.466761515320369 | e−01, | +6.403486426892321 | e−01, |
| +6.339773402000435 | e−01, | +6.275631129756770 | e−01, |
| +6.211072197441818 | e−01, | +6.146113064454106 | e−01, |
| +6.080768062101946 | e−01, | +6.015049275244732 | e−01, |
| +5.948969938609885 | e−01, | +5.882544536827298 | e−01, |
| +5.815787608870452 | e−01, | +5.748713693712827 | e−01, |
| +5.681329838024681 | e−01, | +5.613674511156831 | e−01, |
| +5.545756384163615 | e−01, | +5.477589552377587 | e−01, |
| +5.409188627354240 | e−01, | +5.340568757452271 | e−01, |
| +5.271745849688633 | e−01, | +5.202736834971303 | e−01, |
| +5.133560289814199 | e−01, | +5.064236063322167 | e−01, |
| +4.994780733459294 | e−01, | +4.925207788759675 | e−01, |
| +4.855532972838063 | e−01, | +4.785774177949064 | e−01, |
| +4.715949057752619 | e−01, | +4.646075325068186 | e−01, |
| +4.576172599874965 | e−01, | +4.506262048599546 | e−01, |
| +4.436362416499966 | e−01, | +4.366490208265834 | e−01, |
| +4.296663370497900 | e−01, | +4.226901117060164 | e−01, |
| +4.157221460416020 | e−01, | +4.087641442756610 | e−01, |
| +4.018179771137481 | e−01, | +3.948856590950779 | e−01, |
| +3.879690747948260 | e−01, | +3.810699982632091 | e−01, |
| +3.741903189229788 | e−01, | +3.673320150150139 | e−01, |
| +3.604969483256886 | e−01, | +3.536868899553974 | e−01, |
| +3.469037339648918 | e−01, | +3.401494735467201 | e−01, |
| +3.334260017756462 | e−01, | +3.267351352184045 | e−01, |
| +3.200787300572631 | e−01, | +3.134586473252229 | e−01, |
| +3.068766522215559 | e−01, | +3.003344428572218 | e−01, |
| +2.938337904395881 | e−01, | +2.873765136803315 | e−01, |
| +2.809644064498411 | e−01, | +2.745992637590826 | e−01, |
| +2.682828578001429 | e−01, | +2.620169058204753 | e−01, |
| +2.558030636168179 | e−01, | +2.496429506725780 | e−01, |
| +2.435381581076193 | e−01, | +2.374902188466703 | e−01, |
| +2.315007158769866 | e−01, | +2.255713139320687 | e−01, |
| +2.197036032185791 | e−01, | +2.138990608950040 | e−01, |
| +2.081591884177564 | e−01, | +2.024855415115456 | e−01, |
| +1.968794982265323 | e−01, | +1.913422230760984 | e−01, |
| +1.858749915117319 | e−01, | +1.804792270036454 | e−01, |

| | | | |
|---|---|---|---|
| +1.751561592043750 | e−01, | +1.699067802117410 | e−01, |
| +1.647322739698192 | e−01, | +1.596340539111631 | e−01, |
| +1.546132267478876 | e−01, | +1.496705434426226 | e−01, |
| +1.448069879076800 | e−01, | +1.400238206749698 | e−01, |
| +1.353218971490514 | e−01, | +1.307016182576054 | e−01, |
| +1.261637395672916 | e−01, | +1.217094187032866 | e−01, |
| +1.173392980385558 | e−01, | +1.130534434072722 | e−01, |
| +1.088524061173192 | e−01, | +1.047372831131808 | e−01, |
| +1.007084973747942 | e−01, | +9.676572618933918 | e−02, |
| +9.290929444691418 | e−02, | +8.914024389873081 | e−02, |
| +8.545874375771015 | e−02, | +8.186400751918757 | e−02, |
| +7.835612100141792 | e−02, | +7.493612463933132 | e−02, |
| +7.160392900131578 | e−02, | +6.835821233920988 | e−02, |
| +6.519882821193619 | e−02, | +6.212691236769909 | e−02, |
| +5.914211536028985 | e−02, | +5.624247476796568 | e−02, |
| +5.342762364238927 | e−02, | +5.069893012340838 | e−02, |
| +4.805577285587748 | e−02, | +4.549537570011979 | e−02, |
| +4.301717763585556 | e−02, | +4.062301532941800 | e−02, |
| +3.831198264259714 | e−02, | +3.608020726673365 | e−02, |
| +3.392698736873631 | e−02, | +3.185504779821543 | e−02, |
| +2.986316337017634 | e−02, | +2.794584821783607 | e−02, |
| +2.610239043507366 | e−02, | +2.433722657129812 | e−02, |
| +2.264871565562373 | e−02, | +2.102867478775550 | e−02, |
| +1.947675241971700 | e−02, | +1.800101670620712 | e−02, |
| +1.659903330901047 | e−02, | +1.525710171255895 | e−02, |
| +1.397610119023076 | e−02, | +1.277238121584596 | e−02, |
| +1.163787492636242 | e−02, | +1.053809096662833 | e−02, |
| +9.464262017505555 | e−03, | +8.433087782643726 | e−03, |
| +7.364501936162659 | e−03, | +6.073847663871269 | e−03, |
| +4.449668997344740 | e−03, | +2.485333612762431 | e−03, |
| +0.000000000000000 | e+00, | +0.000000000000000 | e+00, |
| +0.000000000000000 | e+00, | +0.000000000000000 | e+00, |
| +0.000000000000000 | e+00, | +0.000000000000000 | e+00, |
| +0.000000000000000 | e+00, | +0.000000000000000 | e+00, |
| +0.000000000000000 | e+00, | +0.000000000000000 | e+00, |
| +0.000000000000000 | e+00, | +0.000000000000000 | e+00, |
| +0.000000000000000 | e+00, | +0.000000000000000 | e+00, |
| +0.000000000000000 | e+00, | +0.000000000000000 | e+00, |
| +0.000000000000000 | e+00, | +0.000000000000000 | e+00, |
| +0.000000000000000 | e+00, | +0.000000000000000 | e+00, |
| +0.000000000000000 | e+00, | +0.000000000000000 | e+00, |
| +0.000000000000000 | e+00, | +0.000000000000000 | e+00, |
| +0.000000000000000 | e+00, | +0.000000000000000 | e+00, |
| +0.000000000000000 | e+00, | +0.000000000000000 | e+00, |
| +0.000000000000000 | e+00, | +0.000000000000000 | e+00, |
| +0.000000000000000 | e+00, | +0.000000000000000 | e+00, |
| +0.000000000000000 | e+00, | +0.000000000000000 | e+00, |
| +0.000000000000000 | e+00, | +0.000000000000000 | e+00, |
| +0.000000000000000 | e+00, | +0.000000000000000 | e+00, |
| +0.000000000000000 | e+00, | +0.000000000000000 | e+00, |
| +0.000000000000000 | e+00, | +0.000000000000000 | e+00, |
| +0.000000000000000 | e+00, | +0.000000000000000 | e+00, |
| +0.000000000000000 | e+00, | +0.000000000000000 | e+00, |
| +0.000000000000000 | e+00, | +0.000000000000000 | e+00, |
| +0.000000000000000 | e+00, | +0.000000000000000 | e+00, |
| +0.000000000000000 | e+00, | +0.000000000000000 | e+00, |
| +0.000000000000000 | e+00, | +0.000000000000000 | e+00, |
| +0.000000000000000 | e+00, | +0.000000000000000 | e+00, |
| +0.000000000000000 | e+00, | +0.000000000000000 | e+00, |
| +0.000000000000000 | e+00, | +0.000000000000000 | e+00, |
| +0.000000000000000 | e+00, | +0.000000000000000 | e+00, |
| +0.000000000000000 | e+00, | +0.000000000000000 | e+00, |
| +0.000000000000000 | e+00, | +0.000000000000000 | e+00, |
| +0.000000000000000 | e+00, | +0.000000000000000 | e+00, |
| +0.000000000000000 | e+00, | +0.000000000000000 | e+00, |
| +0.000000000000000 | e+00, | +0.000000000000000 | e+00, |
| +0.000000000000000 | e+00, | +0.000000000000000 | e+00, |

+0.000000000000000 e+00, +0.000000000000000 e+00,
+0.000000000000000 e+00, +0.000000000000000 e+00,
+0.000000000000000 e+00, +0.000000000000000 e+00,
+0.000000000000000 e+00, +0.000000000000000 e+00,
+0.000000000000000 e+00, +0.000000000000000 e+00,
+0.000000000000000 e+00, +0.000000000000000 e+00,
+0.000000000000000 e+00, +0.000000000000000 e+00,
+0.000000000000000 e+00, +0.000000000000000 e+00,
+0.000000000000000 e+00, +0.000000000000000 e+00,
+0.000000000000000 e+00, +0.000000000000000 e+00,
+0.000000000000000 e+00, +0.000000000000000 e+00,
+0.000000000000000 e+00, +0.000000000000000 e+00,
+0.000000000000000 e+00, +0.000000000000000 e+00,
+0.000000000000000 e+00, +0.000000000000000 e+00,
+0.000000000000000 e+00, +0.000000000000000 e+00,
+0.000000000000000 e+00, +0.000000000000000 e+00,
+0.000000000000000 e+00, +0.000000000000000 e+00,
+0.000000000000000 e+00, +0.000000000000000 e+00,
+0.000000000000000 e+00, +0.000000000000000 e+00,
+0.000000000000000 e+00, +0.000000000000000 e+00,
+0.000000000000000 e+00, +0.000000000000000 e+00,
+0.000000000000000 e+00, +0.000000000000000 e+00,
+0.000000000000000 e+00, +0.000000000000000 e+00,
+0.000000000000000 e+00, +0.000000000000000 e+00,
+0.000000000000000 e+00, +0.000000000000000 e+00,
+0.000000000000000 e+00, +0.000000000000000 e+00,
+0.000000000000000 e+00, +0.000000000000000 e+00,
+0.000000000000000 e+00, +0.000000000000000 e+00,
+0.000000000000000 e+00, +0.000000000000000 e+00,
+0.000000000000000 e+00, +0.000000000000000 e+00,
+0.000000000000000 e+00, +0.000000000000000 e+00,
+0.000000000000000 e+00, +0.000000000000000 e+00,
+0.000000000000000 e+00, +0.000000000000000 e+00,
+0.000000000000000 e+00, +0.000000000000000 e+00,
+0.000000000000000 e+00, +0.000000000000000 e+00,
+0.000000000000000 e+00, +0.000000000000000 e+00,
+0.000000000000000 e+00, +0.000000000000000 e+00,
+0.000000000000000 e+00, +0.000000000000000 e+00,
+0.000000000000000 e+00, +0.000000000000000 e+00,
+0.000000000000000 e+00, +0.000000000000000 e+00,
+0.000000000000000 e+00, +0.000000000000000 e+00,
+0.000000000000000 e+00, +0.000000000000000 e+00,
+0.000000000000000 e+00, +0.000000000000000 e+00,
+0.000000000000000 e+00, +0.000000000000000 e+00,
+0.000000000000000 e+00, +0.000000000000000 e+00,
+0.000000000000000 e+00, +0.000000000000000 e+00,
+0.000000000000000 e+00, +0.000000000000000 e+00,
+0.000000000000000 e+00, +0.000000000000000 e+00,
+0.000000000000000 e+00, +0.000000000000000 e+00,
+0.000000000000000 e+00, +0.000000000000000 e+00,
+0.000000000000000 e+00, +0.000000000000000 e+00,
+0.000000000000000 e+00, +0.000000000000000 e+00,
+0.000000000000000 e+00, +0.000000000000000 e+00,
+0.000000000000000 e+00, +0.000000000000000 e+00,
+0.000000000000000 e+00, +0.000000000000000 e+00,
+0.000000000000000 e+00, +0.000000000000000 e+00,
+0.000000000000000 e+00, +0.000000000000000 e+00,
+0.000000000000000 e+00, +0.000000000000000 e+00,
+0.000000000000000 e+00, +0.000000000000000 e+00,
+0.000000000000000 e+00, +0.000000000000000 e+00,
+0.000000000000000 e+00, +0.000000000000000 e+00,
+0.000000000000000 e+00, +0.000000000000000 e+00,
+0.000000000000000 e+00, +0.000000000000000 e+00,
+0.000000000000000 e+00, +0.000000000000000 e+00,
+0.000000000000000 e+00, +0.000000000000000 e+00,
+0.000000000000000 e+00, +0.000000000000000 e+00,
+0.000000000000000 e+00, +0.000000000000000 e+00,
+0.000000000000000 e+00, +0.000000000000000 e+00,
+0.000000000000000 e+00, +0.000000000000000 e+00,
+0.000000000000000 e+00, +0.000000000000000 e+00,
+0.000000000000000 e+00, +0.000000000000000 e+00,
+0.000000000000000 e+00, +0.000000000000000 e+00,
+0.000000000000000 e+00, +0.000000000000000 e+00,
+0.000000000000000 e+00, +0.000000000000000 e+00,
+0.000000000000000 e+00, +0.000000000000000 e+00,
+0.000000000000000 e+00, +0.000000000000000 e+00,
+0.000000000000000 e+00, +0.000000000000000 e+00,
+0.000000000000000 e+00, +0.000000000000000 e+00,
+0.000000000000000 e+00, +0.000000000000000 e+00,
+0.000000000000000 e+00, +0.000000000000000 e+00,
+0.000000000000000 e+00, +0.000000000000000 e+00,
+0.000000000000000 e+00, +0.000000000000000 e+00,
+0.000000000000000 e+00, +0.000000000000000 e+00,
+0.000000000000000 e+00, +0.000000000000000 e+00,
+0.000000000000000 e+00, +0.000000000000000 e+00,
+0.000000000000000 e+00, +0.000000000000000 e+00,
+0.000000000000000 e+00, +0.000000000000000 e+00,
+0.000000000000000 e+00, +0.000000000000000 e+00,
+0.000000000000000 e+00, +0.000000000000000 e+00,
+0.000000000000000 e+00, +0.000000000000000 e+00,
+0.000000000000000 e+00, +0.000000000000000 e+00,
+0.000000000000000 e+00, +0.000000000000000 e+00,
+0.000000000000000 e+00, +0.000000000000000 e+00,
+0.000000000000000 e+00, +0.000000000000000 e+00,
+0.000000000000000 e+00, +0.000000000000000 e+00,
+0.000000000000000 e+00, +0.000000000000000 e+00,
+0.000000000000000 e+00, +0.000000000000000 e+00,
+0.000000000000000 e+00, +0.000000000000000 e+00,
+0.000000000000000 e+00, +0.000000000000000 e+00,
+0.000000000000000 e+00, +0.000000000000000 e+00,
+0.000000000000000 e+00, +0.000000000000000 e+00,
+0.000000000000000 e+00, +0.000000000000000 e+00,
+0.000000000000000 e+00, +0.000000000000000 e+00,
+0.000000000000000 e+00, +0.000000000000000 e+00,
+0.000000000000000 e+00, +0.000000000000000 e+00,
+0.000000000000000 e+00, +0.000000000000000 e+00,
+0.000000000000000 e+00, +0.000000000000000 e+00,
+0.000000000000000 e+00, +0.000000000000000 e+00,
+0.000000000000000 e+00, +0.000000000000000 e+00,
+0.000000000000000 e+00, +0.000000000000000 e+00,
+0.000000000000000 e+00, +0.000000000000000 e+00,
+0.000000000000000 e+00, +0.000000000000000 e+00,
+0.000000000000000 e+00, +0.000000000000000 e+00,
+0.000000000000000 e+00, +0.000000000000000 e+00,
+0.000000000000000 e+00, +0.000000000000000 e+00,
+0.000000000000000 e+00, +0.000000000000000 e+00,
+0.000000000000000 e+00, +0.000000000000000 e+00,
+0.000000000000000 e+00, +0.000000000000000 e+00,
+0.000000000000000 e+00, +0.000000000000000 e+00,
+0.000000000000000 e+00, +0.000000000000000 e+00,
+0.000000000000000 e+00, +0.000000000000000 e+00,
+0.000000000000000 e+00, +0.000000000000000 e+00,
+0.000000000000000 e+00, +0.000000000000000 e+00,
+0.000000000000000 e+00, +0.000000000000000 e+00,
+0.000000000000000 e+00, +0.000000000000000 e+00,
+0.000000000000000 e+00, +0.000000000000000 e+00,
+0.000000000000000 e+00, +0.000000000000000 e+00,
+0.000000000000000 e+00, +0.000000000000000 e+00,
+0.000000000000000 e+00, +0.000000000000000 e+00,
+0.000000000000000 e+00, +0.000000000000000 e+00,
+0.000000000000000 e+00, +0.000000000000000 e+00,
+0.000000000000000 e+00, +0.000000000000000 e+00,
+0.000000000000000 e+00, +0.000000000000000 e+00,
+0.000000000000000 e+00, +0.000000000000000 e+00,

+0.000000000000000 e+00, +0.000000000000000 e+00, +0.000000000000000 e+00, +0.000000000000000 e+00, +0.000000000000000 e+00, +0.000000000000000 e+00, +0.000000000000000 e+00, +0.000000000000000 e+00, +0.000000000000000 e+00, +0.000000000000000 e+00, +0.000000000000000 e+00, +0.000000000000000 e+00, +0.000000000000000 e+00, +0.000000000000000 e+00, +0.000000000000000 e+00, +0.000000000000000 e+00, +0.000000000000000 e+00, +0.000000000000000 e+00.

Examples Associated to FIGS. 26 to 30

A numerical example of windowing function $w_{40}$, for frame size N=40, is herewith provided by the 80 entries for n=0 . . . 2N−1. As explained above, the last values may be zeros.

+9.959086585790517 e−04, +3.819056787237678 e−03, +9.540832613229890 e−03, +1.921659800166160 e−02, +3.382719081038548 e−02, +5.424831667522354 e−02, +8.120777668775610 e−02, +1.152171887125930 e−01, +1.564942331034909 e−01, +2.049363422022628 e−01, +2.601166575816199 e−01, +3.212814164616093 e−01, +3.873472997948746 e−01, +4.569497078592333 e−01, +5.285192958868393 e−01, +6.003522489375573 e−01, +6.706896380227332 e−01, +7.378044458510402 e−01, +8.000925313431716 e−01, +8.561409184410547 e−01, +9.048272294524792 e−01, +9.453685031730190 e−01, +9.773507430600533 e−01, +1.000800872826561 e+00, +1.016171590112097 e+00, +1.024315247630982 e+00, +1.026415431432931 e+00, +1.023858366571912 e+00, +1.018135705524407 e+00, +1.010794822557756 e+00, +1.003406509762925 e+00, +9.967831265986109 e−01, +9.920995520917141 e−01, +9.892206942816891 e−01, +9.879658322200813 e−01, +9.881273531631907 e−01, +9.894805541465801 e−01, +9.917849916000535 e−01, +9.947847580943504 e−01, +9.982119669301160 e−01, +1.001791235858836 e+00, +1.005242583245485 e+00, +1.008283053756130 e+00, +1.010631281038659 e+00, +1.012015300253356 e+00, +1.012180753005270 e+00, +1.010896765282633 e+00, +1.007963362035220 e+00, +1.003227255072391 e+00, +9.966050551498514 e−01, +9.868284225039941 e−01, +9.731250287581631 e−01, +9.540636479502398 e−01, +9.283864275822276 e−01, +8.950916858157935 e−01, +8.534769362643825 e−01, +8.032090930429980 e−01, +7.444735201251689 e−01, +6.780787033699449 e−01, +6.053970453856138 e−01, +5.282077505750667 e−01, +4.486552956056635 e−01, +3.691875990296312 e−01, +2.924566408966777 e−01, +2.210718537110463 e−01, +1.573148583944309 e−01, +1.030525757797768 e−01, +5.982732244758054 e−02, +2.871831923385133 e−02, +9.683884928956490 e−03, +0.000000000000000 e+00, +0.000000000000000 e+00, +0.000000000000000 e+00, +0.000000000000000 e+00, +0.000000000000000 e+00, +0.000000000000000 e+00, +0.000000000000000 e+00, +0.000000000000000 e+00, +0.000000000000000 e+00, +0.000000000000000 e+00.

A numerical example of windowing function $w_{80}$, for frame size N=80, is herewith provided by the 160 entries for n=0 . . . 2N−1. As explained above, the last values may be zeros.

+6.143388180964179 e−04, +1.489582832987000 e−03, +2.884104959764029 e−03, +4.934298832466617 e−03, +7.779130464154915 e−03, +1.154910606525086 e−02, +1.637155619860352 e−02, +2.237116158648752 e−02, +2.966159685753317 e−02, +3.835663329277230 e−02, +4.855610986150206 e−02, +6.035055738891727 e−02, +7.382288203064732 e−02, +8.903563687211119 e−02, +1.060356225286319 e−01, +1.248534855777947 e−01, +1.454931890869180 e−01, +1.679435556337752 e−01, +1.921728622634411 e−01, +2.181238261985594 e−01, +2.457259744642953 e−01, +2.748839432649996 e−01, +3.054824712370942 e−01, +3.373873799614014 e−01, +3.704415932452488 e−01, +4.044749630814483 e−01, +4.393004362003260 e−01, +4.747225454237193 e−01, +5.105341492548225 e−01, +5.465201916422433 e−01, +5.824658100332457 e−01, +6.181452662624718 e−01, +6.533411462740817 e−01, +6.878367295965062 e−01, +7.214176027060971 e−01, +7.538887973483771 e−01, +7.850546571907628 e−01, +8.147397447696774 e−01, +8.427819363777799 e−01, +8.690376742017057 e−01, +8.933935477349644 e−01, +9.157483563218768 e−01, +9.360270196617569 e−01, +9.541731142261065 e−01, +9.701635474343885 e−01, +9.840036439809510 e−01, +9.957199420334376 e−01, +1.005374268639838 e+00, +1.013046655758663 e+00, +1.018843380560658 e+00, +1.022896948293643 e+00, +1.025355286710874 e+00, +1.026382881625701 e+00, +1.026155530733488 e+00, +1.024853974580724 e+00, +1.022664602721801 e+00, +1.019779396547454 e+00, +1.016391686789653 e+00, +1.012697033320358 e+00, +1.008885191761748 e+00, +1.005378742804807 e+00, +1.001563778373068 e+00, +9.982531564931281 e−01, +9.954346644968789 e−01, +9.930950268060122 e−01, +9.912170911359961 e−01, +9.897805192546195 e−01, +9.887624937408933 e−01, +9.881383235740961 e−01, +9.878819413827574 e−01, +9.879662130250981 e−01, +9.883630508181326 e−01, +9.890434070785485 e−01, +9.899772316163624 e−01, +9.911334564321237 e−01, +9.924800441092685 e−01, +9.939841207305906 e−01, +9.956121471675398 e−01, +9.973300590248015 e−01, +9.991033633647473 e−01, +1.000897441314013 e+00, +1.002677088643863 e+00, +1.004407190937699 e+00, +1.006052289109999 e+00, +1.007576934100958 e+00, +1.008945862447015 e+00, +1.010124241309341 e+00, +1.011077969726137 e+00, +1.011773962181442 e+00, +1.012180362866919 e+00, +1.012266707295288 e+00, +1.012004064757857 e+00, +1.011365223023975 e+00, +1.010324996851905 e+00, +1.008860731864438 e+00, +1.006952983357691 e+00, +1.004586273379809 e+00, +1.001749900308864 e+00, +9.984386632116344 e−01, +9.946500332901397 e−01, +9.895756853352172 e−01, +9.838303127859196 e−01, +9.769999155793757 e−01, +9.689141159310996 e−01, +9.594038121639412 e−01, +9.483086322505029 e−01, +9.354860218216989 e−01, +9.208101305030523 e−01, +9.041732260327581 e−01, +8.854882249661838 e−01, +8.646864947605046 e−01, +8.417237467711145 e−01, +8.165875713256009 e−01, +7.892986353718001 e−01, +7.599171886893816 e−01, +7.285474515411827 e−01, +6.953282935906302 e−01, +6.604334017809461 e−01, +6.240661431421666 e−01, +5.864461424698465 e−01, +5.478160663871147 e−01, +5.084499758302218 e−01, +4.686361426418982 e−01, +4.286789889246253 e−01, +3.889032719013045 e−01, +3.496431418636314 e−01, +3.112360816586544 e−01, +2.740128472224535 e−01, +2.382847225401666 e−01, +2.043379825955252 e−01, +1.724305860483632 e−01, +1.427939789949265 e−01, +1.156385879569741 e−01, +9.115821766571995 e−02, +6.952749039054593 e−02, +5.088975408628225 e−02, +3.533430192568954 e−02, +2.286680405144430 e−02, +1.338005016725895 e−02, +6.640506529168652 e−03, +0.000000000000000 e+00, +0.000000000000000 e+00, +0.000000000000000 e+00, +0.000000000000000 e+00, +0.000000000000000 e+00, +0.000000000000000 e+00, +0.000000000000000 e+00, +0.000000000000000 e+00,

+0.000000000000000 e+00, +0.000000000000000 e+00, +0.000000000000000 e+00, +0.000000000000000 e+00, +0.000000000000000 e+00, +0.000000000000000 e+00, +0.000000000000000 e+00, +0.000000000000000 e+00, +0.000000000000000 e+00, +0.000000000000000 e+00, +0.000000000000000 e+00, +0.000000000000000 e+00.

A numerical example of windowing function $w_{120}$, for frame size N=120, is herewith provided by the 240 entries for n=0 . . . 2N−1. As explained above, the last values may be zeros.

+5.087227626168386 e−04, +9.959086585790517 e−04, +1.682208006328800 e−03, +2.609697259047744 e−03, +3.819056787237678 e−03, +5.349319592933909 e−03, +7.243906383895192 e−03, +9.540832613229890 e−03, +1.227637642543709 e−02, +1.548950238899404 e−02, +1.921659800166160 e−02, +2.349369619441617 e−02, +2.835199581667961 e−02, +3.382719081038548 e−02, +3.994939538719628 e−02, +4.674775238543380 e−02, +5.424831667522354 e−02, +6.247770776443612 e−02, +7.145835917501348 e−02, +8.120777668775610 e−02, +9.174400412319896 e−02, +1.030764959637497 e−01, +1.152171887125930 e−01, +1.281665713944242 e−01, +1.419264381068653 e−01, +1.564942331034909 e−01, +1.718593189799504 e−01, +1.880134254543744 e−01, +2.049363422022628 e−01, +2.226123055761096 e−01, +2.410151242797736 e−01, +2.601166575816199 e−01, +2.798871008989962 e−01, +3.002880135563586 e−01, +3.212814164616093 e−01, +3.428208463088390 e−01, +3.648596557863134 e−01, +3.873472997948746 e−01, +4.102294951869188 e−01, +4.334494534591082 e−01, +4.569497078592333 e−01, +4.806696403251166 e−01, +5.045473815014847 e−01, +5.285192958868393 e−01, +5.525196099932443 e−01, +5.764872452085427 e−01, +6.003522489375573 e−01, +6.240509872809882 e−01, +6.475182586093196 e−01, +6.706896380227332 e−01, +6.935029068990036 e−01, +7.158927516396895 e−01, +7.378044458510402 e−01, +7.591787241845952 e−01, +7.799586608897265 e−01, +8.000925313431716 e−01, +8.195318652294690 e−01, +8.382288957404715 e−01, +8.561409184410547 e−01, +8.732316951214179 e−01, +8.894702022170831 e−01, +9.048272294524792 e−01, +9.192736375782965 e−01, +9.327940405054362 e−01, +9.453685031730190 e−01, +9.569883933538136 e−01, +9.676486424195593 e−01, +9.773507430600533 e−01, +9.861027831072527 e−01, +9.939122412655677 e−01, +1.000800872826561 e+00, +1.006787811971719 e+00, +1.011901269172423 e+00, +1.016171590112097 e+00, +1.019636414864842 e+00, +1.022336613864005 e+00, +1.024315247630982 e+00, +1.025621299895396 e+00, +1.026303439275662 e+00, +1.026415431432931 e+00, +1.026007933174836 e+00, +1.025137435167917 e+00, +1.023858366571912 e+00, +1.022226936424625 e+00, +1.020300550334848 e+00, +1.018135705524407 e+00, +1.015792146756340 e+00, +1.013325966774524 e+00, +1.010794822557756 e+00, +1.008265131568879 e+00, +1.006046874304407 e+00, +1.003406509762925 e+00, +1.000977398831985 e+00, +9.987704535700208 e−01, +9.967831265986109 e−01, +9.950118905889862 e−01, +9.934523971504882 e−01, +9.920995520917141 e−01, +9.909475998606236 e−01, +9.899902426925508 e−01, +9.892206942816891 e−01, +9.886318043013834 e−01, +9.882160904669929 e−01, +9.879658322200813 e−01, +9.878730767519871 e−01, +9.879296932443894 e−01, +9.881273531631907 e−01, +9.884575535474619 e−01, +9.889115869213529 e−01, +9.894805541465801 e−01, +9.901553455166457 e−01, +9.909266562913843 e−01, +9.917849916000535 e−01, +9.927206838643636 e−01, +9.937239208721489 e−01, +9.947847580943504 e−01, +9.958931493776203 e−01, +9.970389567617592 e−01, +9.982119669301160 e−01, +9.994020338838508 e−01, +1.000598323893564 e+00, +1.001791235858836 e+00, +1.002969837054169 e+00, +1.004123786397111 e+00, +1.005242583245485 e+00, +1.006315717067918 e+00, +1.007332693127034 e+00, +1.008283053756130 e+00, +1.009156423082384 e+00, +1.009942535308151 e+00, +1.010631281038659 e+00, +1.011212744622770 e+00, +1.011677230257499 e+00, +1.012015300253356 e+00, +1.012217779097186 e+00, +1.012275790821109 e+00, +1.012180753005270 e+00, +1.011924425888915 e+00, +1.011498917644724 e+00, +1.010896765282633 e+00, +1.010110965619444 e+00, +1.009135094671655 e+00, +1.007963362035220 e+00, +1.006590756505588 e+00, +1.005013115379014 e+00, +1.003227255072391 e+00, +1.001231060075500 e+00, +9.990235555436858 e−01, +9.966050551498514 e−01, +9.939894706113089 e−01, +9.904539200261149 e−01, +9.868284225039941 e−01, +9.827716736909488 e−01, +9.782206672373213 e−01, +9.731250287581631 e−01, +9.674323528812744 e−01, +9.610947043524248 e−01, +9.540636479502398 e−01, +9.462952991190324 e−01, +9.377489107516087 e−01, +9.283864275822276 e−01, +9.181762606422500 e−01, +9.070861558801854 e−01, +8.950916858157935 e−01, +8.821696237804294 e−01, +8.683025287048570 e−01, +8.534769362643825 e−01, +8.376852006833730 e−01, +8.209275259764013 e−01, +8.032090930429980 e−01, +7.845450482523652 e−01, +7.649554851899686 e−01, +7.444735201251689 e−01, +7.231348066419057 e−01, +7.009860555207412 e−01, +6.780787033699450 e−01, +6.544686506489734 e−01, +6.302212149502727 e−01, +6.053970453856138 e−01, +5.800715766089168 e−01, +5.543129276657669 e−01, +5.282077505750727 e−01, +5.018369724442092 e−01, +4.752902962082383 e−01, +4.486552956056652 e−01, +4.220281118338883 e−01, +3.955057965950340 e−01, +3.691875990296320 e−01, +3.431732847389720 e−01, +3.175633015043183 e−01, +2.924566408966782 e−01, +2.679463783886042 e−01, +2.441231331518492 e−01, +2.210718537110466 e−01, +1.988719153219592 e−01, +1.775967625327044 e−01, +1.573148583944310 e−01, +1.380903364946733 e−01, +1.199837497591550 e−01, +1.030525757797769 e−01, +8.735085011789188 e−02, +7.292811584897502 e−02, +5.982732244758056 e−02, +4.808178837444506 e−02, +3.771135297837851 e−02, +2.871831923385135 e−02, +2.108352028641225 e−02, +1.476289412849005 e−02, +9.683884928956495 e−03, +5.642168789286858 e−03, +0.000000000000000 e+00, +0.000000000000000 e+00, +0.000000000000000 e+00, +0.000000000000000 e+00, +0.000000000000000 e+00, +0.000000000000000 e+00, +0.000000000000000 e+00, +0.000000000000000 e+00, +0.000000000000000 e+00, +0.000000000000000 e+00, +0.000000000000000 e+00, +0.000000000000000 e+00, +0.000000000000000 e+00, +0.000000000000000 e+00, +0.000000000000000 e+00, +0.000000000000000 e+00, +0.000000000000000 e+00, +0.000000000000000 e+00, +0.000000000000000 e+00, +0.000000000000000 e+00, +0.000000000000000 e+00, +0.000000000000000 e+00, +0.000000000000000 e+00, +0.000000000000000 e+00, +0.000000000000000 e+00, +0.000000000000000 e+00, +0.000000000000000 e+00, +0.000000000000000 e+00, +0.000000000000000 e+00, +0.000000000000000 e+00.

A numerical example of windowing function $w_{160}$, for frame size N=160, is herewith provided by the 320 entries for n=0 . . . 2N−1. As explained above, the last values may be 0.

+4.595886345493055 e−04, +7.919323614002698 e−04,
+1.227927169310031 e−03, +1.783653266717233 e−03,
+2.479549413444207 e−03, +3.329799454594261 e−03,
+4.353535478916468 e−03, +5.564965156664018 e−03,
+6.986108359341676 e−03, +8.629882322202329 e−03,
+1.051343406844975 e−02, +1.265082642578719 e−02,
+1.506090447446532 e−02, +1.775591229287213 e−02,
+2.075475983187825 e−02, +2.406813715401559 e−02,
+2.771207863541604 e−02, +3.169933248543932 e−02,
+3.604609640533871 e−02, +4.076128638095439 e−02,
+4.586038120884381 e−02, +5.135136676471998 e−02,
+5.724780220726930 e−02, +6.355854744461048 e−02,
+7.029450733434550 e−02, +7.745987198268531 e−02,
+8.506635369887924 e−02, +9.311641620512773 e−02,
+1.016162955027316 e−01, +1.105690806271684 e−01,
+1.199789286645804 e−01, +1.298417294090302 e−01,
+1.401623800497866 e−01, +1.509371564593891 e−01,
+1.621632295622287 e−01, +1.738354123649302 e−01,
+1.859520359191026 e−01, +1.985008828937603 e−01,
+2.114778554475382 e−01, +2.248732557074316 e−01,
+2.386763947872762 e−01, +2.528729453658238 e−01,
+2.674547009618951 e−01, +2.824031465430401 e−01,
+2.977050145264297 e−01, +3.133419120661713 e−01,
+3.292976696294886 e−01, +3.455490160824131 e−01,
+3.620795045342974 e−01, +3.788648665671841 e−01,
+3.958851576591690 e−01, +4.131143794748322 e−01,
+4.305308301005456 e−01, +4.481076715576617 e−01,
+4.658227790464821 e−01, +4.836466393241829 e−01,
+5.015564851667653 e−01, +5.195228071176610 e−01,
+5.375197039843709 e−01, +5.555183841040963 e−01,
+5.734957812557457 e−01, +5.914186654649489 e−01,
+6.092622887527459 e−01, +6.269981160888640 e−01,
+6.446002007776794 e−01, +6.620384583071039 e−01,
+6.792906550106088 e−01, +6.963256426589250 e−01,
+7.131194393772130 e−01, +7.296469905863920 e−01,
+7.458864594794676 e−01, +7.618094719403713 e−01,
+7.773958448163656 e−01, +7.926208751337592 e−01,
+8.074666387233143 e−01, +8.219101564897180 e−01,
+8.359343163788637 e−01, +8.495180470826319 e−01,
+8.626485837105826 e−01, +8.753083234662220 e−01,
+8.874884715160425 e−01, +8.991737724042251 e−01,
+9.103527429187326 e−01, +9.210144133066616 e−01,
+9.311556192776946 e−01, +9.407644740241826 e−01,
+9.498382236872068 e−01, +9.583732599601223 e−01,
+9.663690412284377 e−01, +9.738235617865406 e−01,
+9.807442506043361 e−01, +9.871297972052695 e−01,
+9.929872268444632 e−01, +9.983241398929388 e−01,
+1.003150760219063 e+00, +1.007473713377193 e+00,
+1.011309151636166 e+00, +1.014666681083198 e+00,
+1.017563337333301 e+00, +1.020014681326785 e+00,
+1.022039872150903 e+00, +1.023654257342442 e+00,
+1.024881624147540 e+00, +1.025739288978437 e+00,
+1.026250709375593 e+00, +1.026436666375082 e+00,
+1.026320857404224 e+00, +1.025922917798664 e+00,
+1.025269979527211 e+00, +1.024382188798244 e+00,
+1.023284940887058 e+00, +1.022000829220643 e+00,
+1.020555973231408 e+00, +1.018971390778550 e+00,
+1.017275179369116 e+00, +1.015489129111694 e+00,
+1.013639356938881 e+00, +1.011747750709711 e+00,
+1.009840844244693 e+00, +1.007939764480188 e+00,
+1.006407400915498 e+00, +1.004374825095777 e+00,
+1.002469814737132 e+00, +1.000689073754539 e+00,
+9.990346001249977 e−01, +9.975024904153303 e−01,
+9.960941547576162 e−01, +9.948051243621099 e−01,
+9.936362728142866 e−01, +9.925826537087717 e−01,
+9.916447007525191 e−01, +9.908170758245324 e−01,
+9.900998445795673 e−01, +9.894873685512386 e−01,
+9.889794323427195 e−01, +9.885701787626714 e−01,
+9.882591911282058 e−01, +9.880404423341358 e−01,
+9.879133688360181 e−01, +9.878718098237022 e−01,
+9.879150762106034 e−01, +9.880368938846610 e−01,
+9.882364564839506 e−01, +9.885073687439192 e−01,
+9.888487088987707 e−01, +9.892539488627546 e−01,
+9.897220412447528 e−01, +9.902463287269285 e−01,
+9.908256340476208 e−01, +9.914531811725067 e−01,
+9.921276814881759 e−01, +9.928422499725458 e−01,
+9.935955098307742 e−01, +9.943804814776256 e−01,
+9.951957244449919 e−01, +9.960341878404958 e−01,
+9.968943831870675 e−01, +9.977692009836100 e−01,
+9.986571134591464 e−01, +9.995509738170480 e−01,
+1.000449227898040 e+00, +1.001344692310058 e+00,
+1.002235786606954 e+00, +1.003115291715261 e+00,
+1.003981602446902 e+00, +1.004827468041713 e+00,
+1.005651275972376 e+00, +1.006445772052972 e+00,
+1.007209352772459 e+00, +1.007934783656087 e+00,
+1.008620496650569 e+00, +1.009259314290145 e+00,
+1.009849742422788 e+00, +1.010384692193296 e+00,
+1.010862783160582 e+00, +1.011277044709547 e+00,
+1.011626247430694 e+00, +1.011903571699736 e+00,
+1.012107954864219 e+00, +1.012232755709885 e+00,
+1.012277089047072 e+00, +1.012234505114778 e+00,
+1.012104319978655 e+00, +1.011880293122688 e+00,
+1.011561972516341 e+00, +1.011143373963981 e+00,
+1.010624321020038 e+00, +1.009999148545101 e+00,
+1.009268031808824 e+00, +1.008425698479647 e+00,
+1.007472774447058 e+00, +1.006404483571931 e+00,
+1.005222003295591 e+00, +1.003921160689206 e+00,
+1.002503762756151 e+00, +1.000966332772540 e+00,
+9.993114007411373 e−01, +9.975362702189898 e−01,
+9.956442306333592 e−01, +9.936333924912825 e−01,
+9.908677480361242 e−01, +9.882326326262749 e−01,
+9.853620567056602 e−01, +9.822305093671991 e−01,
+9.788185853162172 e−01, +9.751026333215268 e−01,
+9.710631852370086 e−01, +9.666759668947944 e−01,
+9.619242192293307 e−01, +9.567841986369235 e−01,
+9.512394303101863 e−01, +9.452700238623795 e−01,
+9.388615698236068 e−01, +9.319946435581106 e−01,
+9.246592033932568 e−01, +9.168383396399868 e−01,
+9.085218034087421 e−01, +8.996967011299613 e−01,
+8.903562054918268 e−01, +8.804877931535187 e−01,
+8.700884209228057 e−01, +8.591492134848259 e−01,
+8.476686394755906 e−01, +8.356428970797861 e−01,
+8.230753889817990 e−01, +8.099649296155544 e−01,
+7.963204506324437 e−01, +7.821460539775005 e−01,
+7.674541821769616 e−01, +7.522563457568547 e−01,
+7.365702052057368 e−01, +7.204090552899627 e−01,
+7.037975107157410 e−01, +6.867542812151157 e−01,
+6.693041888771051 e−01, +6.514710959179395 e−01,
+6.332854832820911 e−01, +6.147685389896460 e−01,
+5.959553778639692 e−01, +5.768737955463938 e−01,
+5.575534287167304 e−01, +5.380320138068979 e−01,
+5.183454027643563 e−01, +4.985259415650634 e−01,
+4.786156067459849 e−01, +4.586473038370941 e−01,
+4.386643656872842 e−01, +4.187046888325280 e−01,
+3.988123056192917 e−01, +3.790262923635886 e−01,
+3.593914828698096 e−01, +3.399474132903109 e−01,
+3.207392420889753 e−01, +3.018061113177048 e−01,
+2.831905952786929 e−01, +2.649288369241889 e−01,
+2.470608550624402 e−01, +2.296201119084317 e−01,
+2.126433716126151 e−01, +1.961601816145380 e−01,
+1.802035203864437 e−01, +1.647996883470626 e−01,
+1.499787548077656 e−01, +1.357643522991611 e−01,
+1.221842534547464 e−01, +1.092601994264172 e−01,
+9.701788451015501 e−02, +8.547680283183663 e−02,

+7.465976378295235 e−02, +6.458254322751883 e−02, +5.526281189874138 e−02, +4.670976978373095 e−02, +3.893244425578719 e−02, +3.192976013776996 e−02, +2.569810636390756 e−02, +2.022259265088492 e−02, +1.548317776486452 e−02, +1.144924909653903 e−02, +8.076482660383199 e−03, +5.300044080947794 e−03, +0.000000000000000 e+00, +0.000000000000000 e+00, +0.000000000000000 e+00, +0.000000000000000 e+00, +0.000000000000000 e+00, +0.000000000000000 e+00, +0.000000000000000 e+00, +0.000000000000000 e+00, +0.000000000000000 e+00, +0.000000000000000 e+00, +0.000000000000000 e+00, +0.000000000000000 e+00, +0.000000000000000 e+00, +0.000000000000000 e+00, +0.000000000000000 e+00, +0.000000000000000 e+00, +0.000000000000000 e+00, +0.000000000000000 e+00, +0.000000000000000 e+00, +0.000000000000000 e+00, +0.000000000000000 e+00, +0.000000000000000 e+00, +0.000000000000000 e+00, +0.000000000000000 e+00, +0.000000000000000 e+00, +0.000000000000000 e+00, +0.000000000000000 e+00, +0.000000000000000 e+00, +0.000000000000000 e+00, +0.000000000000000 e+00, +0.000000000000000 e+00, +0.000000000000000 e+00, +0.000000000000000 e+00, +0.000000000000000 e+00, +0.000000000000000 e+00, +0.000000000000000 e+00, +0.000000000000000 e+00, +0.000000000000000 e+00, +0.000000000000000 e+00, +0.000000000000000 e+00.

A numerical example of windowing function $w_{240}$, for frame size N=240, is herewith provided (480 samples):

+4.090106504820579 e−04, +6.143388180964179 e−04, +8.571759876954877 e−04, +1.147015057857495 e−03, +1.489582832987000 e−03, +1.889770382231583 e−03, +2.353000800169909 e−03, +2.884104959764029 e−03, +3.488213786635855 e−03, +4.170040431489613 e−03, +4.934298832466617 e−03, +5.787076505403503 e−03, +6.733811743137561 e−03, +7.779130464154915 e−03, +8.927044958757816 e−03, +1.018202888968871 e−02, +1.154910606525086 e−02, +1.303349217699797 e−02, +1.463951288465963 e−02, +1.637155619860352 e−02, +1.823455383898077 e−02, +2.023309488998589 e−02, +2.237116158648752 e−02, +2.465237348403478 e−02, +2.708101935270475 e−02, +2.966159685753317 e−02, +3.239884850877327 e−02, +3.529601774976465 e−02, +3.835663329277230 e−02, +4.158447932459513 e−02, +4.498322421745353 e−02, +4.855610986150206 e−02, +5.230596475016741 e−02, +5.623624576084146 e−02, +6.035055738891727 e−02, +6.465186317477950 e−02, +6.914195749790462 e−02, +7.382288203064732 e−02, +7.869709331995660 e−02, +8.376761638427657 e−02, +8.903563687211118 e−02, +9.450199243028472 e−02, +1.001680193006426 e−01, +1.060356225286319 e−01, +1.121060220821844 e−01, +1.183788547045326 e−01, +1.248534855777947 e−01, +1.315302847610869 e−01, +1.384103079528939 e−01, +1.454931890869180 e−01, +1.527772946853750 e−01, +1.602608842337125 e−01, +1.679435556337752 e−01, +1.758245615079801 e−01, +1.839020119821303 e−01, +1.921728622634411 e−01, +2.006344295681524 e−01, +2.092853879977170 e−01, +2.181238261985594 e−01, +2.271462264407930 e−01, +2.363479205237173 e−01, +2.457259744642953 e−01, +2.552771551741124 e−01, +2.649981094228982 e−01, +2.748839432649996 e−01, +2.849296444030153 e−01, +2.951306505827265 e−01, +3.054824712370942 e−01, +3.159799638238941 e−01, +3.266169794538543 e−01, +3.373873799614014 e−01, +3.482855915638277 e−01, +3.593057693987583 e−01, +3.704415932452488 e−01, +3.816862385160692 e−01, +3.930329782788047 e−01, +4.044749630814483 e−01, +4.160051103939122 e−01, +4.276159595085598 e−01, +4.393004362003260 e−01, +4.510516333434032 e−01, +4.628616046119925 e−01, +4.747225454237193 e−01, +4.866266705542529 e−01, +4.985664508456704 e−01, +5.105341492548225 e−01, +5.225212793188740 e−01, +5.345190505841265 e−01, +5.465201916422433 e−01, +5.585172769552711 e−01, +5.705021536899105 e−01, +5.824658100332457 e−01, +5.943991720381216 e−01, +6.062948176207270 e−01, +6.181452662624718 e−01, +6.299422016714543 e−01, +6.416768736044914 e−01, +6.533411462740817 e−01, +6.649277540000037 e−01, +6.764292700223311 e−01, +6.878367295965062 e−01, +6.991421467689277 e−01, +7.103379606632721 e−01, +7.214176027060971 e−01, +7.323746102405828 e−01, +7.432008025932804 e−01, +7.538887973483771 e−01, +7.644315495717613 e−01, +7.748223151443820 e−01, +7.850546571907628 e−01, +7.951223518167163 e−01, +8.050193862201107 e−01, +8.147397447696774 e−01, +8.242774413707643 e−01, +8.336267114335371 e−01, +8.427819363777799 e−01, +8.517386186427548 e−01, +8.604920874939698 e−01, +8.690376742017057 e−01, +8.773720451249032 e−01, +8.854927938913381 e−01, +8.933935477349644 e−01, +9.010727088526728 e−01, +9.085249398881980 e−01, +9.157483563218768 e−01, +9.227413839712016 e−01, +9.295017469413066 e−01, +9.360270196617569 e−01, +9.423143052164881 e−01, +9.483629792665091 e−01, +9.541731142261065 e−01, +9.597438382130120 e−01, +9.650738394220176 e−01, +9.701635474343885 e−01, +9.750143364412617 e−01, +9.796277191617885 e−01, +9.840036439809510 e−01, +9.881426772731259 e−01, +9.920470446911211 e−01, +9.957199420334376 e−01, +9.991640812275709 e−01, +1.002381307710643 e+00, +1.005374268639838 e+00, +1.008146718214831 e+00, +1.010703123647275 e+00, +1.013046655758663 e+00, +1.015181271161417 e+00, +1.017111643578857 e+00, +1.018843380560658 e+00, +1.020381713994816 e+00, +1.021731101971518 e+00, +1.022896948293643 e+00, +1.023885455671576 e+00, +1.024702974608899 e+00, +1.025355286710874 e+00, +1.025848243050604 e+00, +1.026188366261215 e+00, +1.026382881625701 e+00, +1.026438102255574 e+00, +1.026360125820994 e+00, +1.026155530733488 e+00, +1.025831456886557 e+00, +1.025395432284244 e+00, +1.024853974580724 e+00, +1.024213482124578 e+00, +1.023481184943025 e+00, +1.022664602721801 e+00, +1.021770903480975 e+00, +1.020806917660529 e+00, +1.019779396547454 e+00, +1.018695995335235 e+00, +1.017564416918053 e+00, +1.016391686789653 e+00, +1.015184918030332 e+00, +1.013950835315021 e+00, +1.012697033320358 e+00, +1.011430749860716 e+00, +1.010158346781076 e+00, +1.008885191761748 e+00, +1.007592718305943 e+00, +1.006805603478092 e+00, +1.005378742804807 e+00, +1.004049051787112 e+00, +1.002778356298787 e+00, +1.001563778373068 e+00, +1.000404915291105 e+00, +9.993014844615166 e−01, +9.982531564931281 e−01, +9.972595460676951 e−01, +9.963202131848272 e−01, +9.954346644968789 e−01, +9.946023543844607 e−01, +9.938226881029791 e−01, +9.930950268060122 e−01, +9.924186919309267 e−01, +9.917929657090736 e−01, +9.912170911359961 e−01, +9.906902760441473 e−01, +9.902117003786811 e−01, +9.897805192546193 e−01, +9.893958602389157 e−01, +9.890568243690241 e−01, +9.887624937408933 e−01, +9.885119364350415 e−01, +9.883042028597552 e−01, +9.881383235740961 e−01, +9.880133161159576 e−01, +9.879281898513085 e−01, +9.878819413827574 e−01, +9.878735508484809 e−01, +9.879019873841568 e−01, +9.879662130250981 e−01,

+9.880651778500144 e−01, +9.881978162133899 e−01,
+9.883630508181326 e−01, +9.885597957603544 e−01,
+9.887869526128024 e−01, +9.890434070785485 e−01,
+9.893280319166613 e−01, +9.896396899060125 e−01,
+9.899772316163624 e−01, +9.903394929409673 e−01,
+9.907252968668226 e−01, +9.911334564321237 e−01,
+9.915627747807666 e−01, +9.920120436855326 e−01,
+9.924800441092685 e−01, +9.929655482846576 e−01,
+9.934673212537685 e−01, +9.939841207305906 e−01,
+9.945146969322154 e−01, +9.950577931942117 e−01,
+9.956121471675398 e−01, +9.961764915534302 e−01,
+9.967495543671935 e−01, +9.973300590248015 e−01,
+9.979167245036720 e−01, +9.985082643417953 e−01,
+9.991033633647473 e−01, +9.997003478609010 e−01,
+1.000299741957418 e+00, +1.000897441314013 e+00,
+1.001493964257960 e+00, +1.002087624593489 e+00,
+1.002677088643863 e+00, +1.003261045483858 e+00,
+1.003838183774652 e+00, +1.004407190937699 e+00,
+1.004966753528881 e+00, +1.005515557572658 e+00,
+1.006052289109999 e+00, +1.006575635258931 e+00,
+1.007084285781611 e+00, +1.007576934100958 e+00,
+1.008052277555815 e+00, +1.008509017718116 e+00,
+1.008945862447015 e+00, +1.009361528531177 e+00,
+1.009754742820913 e+00, +1.010124241309341 e+00,
+1.010468769795370 e+00, +1.010787087537248 e+00,
+1.011077969726137 e+00, +1.011340205650538 e+00,
+1.011572597114216 e+00, +1.011773962181442 e+00,
+1.011943138906979 e+00, +1.012078982659783 e+00,
+1.012180362866919 e+00, +1.012246166897464 e+00,
+1.012275305013586 e+00, +1.012266707295288 e+00,
+1.012219319453278 e+00, +1.012132107622966 e+00,
+1.012004064757857 e+00, +1.011834207632025 e+00,
+1.011621572933544 e+00, +1.011365223023975 e+00,
+1.011064253702468 e+00, +1.010717792733157 e+00,
+1.010324996851905 e+00, +1.009885057526159 e+00,
+1.009397209381147 e+00, +1.008860731864438 e+00,
+1.008274947065247 e+00, +1.007639223374887 e+00,
+1.006952983357691 e+00, +1.006215708265639 e+00,
+1.005426938305289 e+00, +1.004586273379809 e+00,
+1.003693377657581 e+00, +1.002747984657666 e+00,
+1.001749900308864 e+00, +1.000699003803502 e+00,
+9.995952485989262 e−01, +9.984386632116344 e−01,
+9.972293415774932 e−01, +9.959672769174924 e−01,
+9.946500332901397 e−01, +9.932403996813470 e−01,
+9.912511516117244 e−01, +9.895756853352172 e−01,
+9.877713214760662 e−01, +9.858577479051078 e−01,
+9.838303127859196 e−01, +9.816822625580078 e−01,
+9.794074486605805 e−01, +9.769999155793757 e−01,
+9.744528356359687 e−01, +9.717597500340699 e−01,
+9.689141159310996 e−01, +9.659101618500662 e−01,
+9.627421831412876 e−01, +9.594038121639412 e−01,
+9.558889978382734 e−01, +9.521922434090249 e−01,
+9.483086322505029 e−01, +9.442332539187503 e−01,
+9.399607238929982 e−01, +9.354860218216989 e−01,
+9.308052967663477 e−01, +9.259146970284931 e−01,
+9.208101305030523 e−01, +9.154873597416558 e−01,
+9.099426066529104 e−01, +9.041732260327581 e−01,
+8.981763729936715 e−01, +8.919490241013392 e−01,
+8.854882249661838 e−01, +8.787919436722827 e−01,
+8.718585835568161 e−01, +8.646864947605047 e−01,
+8.572738135700366 e−01, +8.496195859658071 e−01,
+8.417237467711145 e−01, +8.335862715770727 e−01,
+8.252074428838668 e−01, +8.165875713256009 e−01,
+8.077280370477699 e−01, +7.986311592191131 e−01,
+7.892986353718001 e−01, +7.797330954210866 e−01,
+7.699379531983687 e−01, +7.599171886893816 e−01,
+7.496758423734833 e−01, +7.392176841476761 e−01,
+7.285474515411827 e−01, +7.176714478163359 e−01,
+7.065962311464494 e−01, +6.953282935906302 e−01,
+6.838739059112046 e−01, +6.722395305539791 e−01,
+6.604334017809461 e−01, +6.484643596235256 e−01,
+6.363395004626368 e−01, +6.240661431421666 e−01,
+6.116530334821534 e−01, +5.991098644638286 e−01,
+5.864461424698465 e−01, +5.736694851703749 e−01,
+5.607881029948401 e−01, +5.478160663871271 e−01,
+5.347619788897301 e−01, +5.216365147692703 e−01,
+5.084499758302256 e−01, +4.952135086430446 e−01,
+4.819387562519412 e−01, +4.686361426419003 e−01,
+4.553170769563941 e−01, +4.419939954454178 e−01,
+4.286789889246267 e−01, +4.153837786572842 e−01,
+4.021211063103491 e−01, +3.889032719013054 e−01,
+3.757425439137077 e−01, +3.626515183776310 e−01,
+3.496431418636322 e−01, +3.367290822653354 e−01,
+3.239228075238623 e−01, +3.112360816586549 e−01,
+2.986807941537710 e−01, +2.862694673284843 e−01,
+2.740128472224539 e−01, +2.619228330079575 e−01,
+2.500098438708934 e−01, +2.382847225401669 e−01,
+2.267578490199104 e−01, +2.154390996938547 e−01,
+2.043379825955254 e−01, +1.934636765792024 e−01,
+1.828250319214460 e−01, +1.724305860483634 e−01,
+1.622886348529314 e−01, +1.524071880359812 e−01,
+1.427939789949266 e−01, +1.334565845242183 e−01,
+1.244023922999665 e−01, +1.156385879569742 e−01,
+1.071721547807196 e−01, +9.900985872728905 e−02,
+9.115821766572002 e−02, +8.362344855837105 e−02,
+7.641140367416376 e−02, +6.952749039054598 e−02,
+6.297656454790079 e−02, +5.676284244020858 e−02,
+5.088975408628229 e−02, +4.535983304624439 e−02,
+4.017457306236873 e−02, +3.533430192568957 e−02,
+3.083806062123772 e−02, +2.668355420358626 e−02,
+2.286680405144430 e−02, +1.938236337675363 e−02,
+1.622312720409645 e−02, +1.338005016725895 e−02,
+1.084218595595746 e−02, +8.596753980908744 e−03,
+6.640506529168652 e−03, +5.172703110468352 e−03,
+0.000000000000000 e+00, +0.000000000000000 e+00,
+0.000000000000000 e+00, +0.000000000000000 e+00,
+0.000000000000000 e+00, +0.000000000000000 e+00,
+0.000000000000000 e+00, +0.000000000000000 e+00,
+0.000000000000000 e+00, +0.000000000000000 e+00,
+0.000000000000000 e+00, +0.000000000000000 e+00,
+0.000000000000000 e+00, +0.000000000000000 e+00,
+0.000000000000000 e+00, +0.000000000000000 e+00,
+0.000000000000000 e+00, +0.000000000000000 e+00,
+0.000000000000000 e+00, +0.000000000000000 e+00,
+0.000000000000000 e+00, +0.000000000000000 e+00,
+0.000000000000000 e+00, +0.000000000000000 e+00,
+0.000000000000000 e+00, +0.000000000000000 e+00,
+0.000000000000000 e+00, +0.000000000000000 e+00,
+0.000000000000000 e+00, +0.000000000000000 e+00,
+0.000000000000000 e+00, +0.000000000000000 e+00,
+0.000000000000000 e+00, +0.000000000000000 e+00,
+0.000000000000000 e+00, +0.000000000000000 e+00,
+0.000000000000000 e+00, +0.000000000000000 e+00,
+0.000000000000000 e+00, +0.000000000000000 e+00,
+0.000000000000000 e+00, +0.000000000000000 e+00,
+0.000000000000000 e+00, +0.000000000000000 e+00,
+0.000000000000000 e+00, +0.000000000000000 e+00,
+0.000000000000000 e+00, +0.000000000000000 e+00,
+0.000000000000000 e+00, +0.000000000000000 e+00,
+0.000000000000000 e+00, +0.000000000000000 e+00,
+0.000000000000000 e+00, +0.000000000000000 e+00,
+0.000000000000000 e+00, +0.000000000000000 e+00,
+0.000000000000000 e+00, +0.000000000000000 e+00,
+0.000000000000000 e+00, +0.000000000000000 e+00.

A numerical example of windowing function $w_{320}$, for frame size N=320, is herewith provided (640 samples). As explained above, the last values may be zeros.

+3.821992968116373 e−04, +5.337292962876158 e−04,
+7.010318350640769 e−04, +8.910357994632938 e−04,
+1.107726421735994 e−03, +1.354305556720234 e−03,
+1.632968062524617 e−03, +1.944392065549996 e−03,
+2.291251920978034 e−03, +2.676357471188558 e−03,
+3.102160324883627 e−03, +3.569302917352426 e−03,
+4.080147004222224 e−03, +4.637409387087253 e−03,
+5.243697651112320 e−03, +5.900394401532485 e−03,
+6.609908124535202 e−03, +7.375089966000295 e−03,
+8.197610411215884 e−03, +9.078195201482999 e−03,
+1.001888876231112 e−02, +1.102272421949215 e−02,
+1.209201783148431 e−02, +1.322773320467288 e−02,
+1.443170227861997 e−02, +1.570673344965518 e−02,
+1.705481769961258 e−02, +1.847711280171765 e−02,
+1.997546609433320 e−02, +2.155255505248360 e−02,
+2.320993080187466 e−02, +2.494800748775296 e−02,
+2.676898100961685 e−02, +2.867550388692567 e−02,
+3.066976865911597 e−02, +3.275241094528637 e−02,
+3.492474656851959 e−02, +3.718932683936013 e−02,
+3.954748420753697 e−02, +4.200013716597904 e−02,
+4.454866443036003 e−02, +4.719547798640356 e−02,
+4.994161943600844 e−02, +5.278755308483513 e−02,
+5.573471840677637 e−02, +5.878567633813699 e−02,
+6.194176167634657 e−02, +6.520301218579141 e−02,
+6.857009288032996 e−02, +7.204473108503576 e−02,
+7.562815385274406 e−02, +7.932038618419741 e−02,
+8.312281225703541 e−02, +8.703660776989294 e−02,
+9.106251913073614 e−02, +9.519952848393795 e−02,
+9.944854075501454 e−02, +1.038112769854394 e−01,
+1.082885168352610 e−01, +1.128793060660070 e−01,
+1.175834766182813 e−01, +1.224015773361210 e−01,
+1.273338065186211 e−01, +1.323793987456491 e−01,
+1.375389612590117 e−01, +1.428131506368226 e−01,
+1.482015069292479 e−01, +1.537021065265166 e−01,
+1.593143180431248 e−01, +1.650390046254505 e−01,
+1.708759773387028 e−01, +1.768238156096776 e−01,
+1.828814674176937 e−01, +1.890485613515956 e−01,
+1.953239376543276 e−01, +2.017057139908492 e−01,
+2.081934824879514 e−01, +2.147873518665726 e−01,
+2.214861559453727 e−01, +2.282869811837961 e−01,
+2.351877543503455 e−01, +2.421885165595468 e−01,
+2.492877833071390 e−01, +2.564833108170047 e−01,
+2.637736050921935 e−01, +2.711575593740559 e−01,
+2.786328295517739 e−01, +2.861965981859126 e−01,
+2.938469307293017 e−01, +3.015829286213736 e−01,
+3.094025219039914 e−01, +3.173023310827802 e−01,
+3.252796888787393 e−01, +3.333329987313211 e−01,
+3.414597523183469 e−01, +3.496568059948401 e−01,
+3.579215403419018 e−01, +3.662523018706806 e−01,
+3.746461722601965 e−01, +3.830993933108193 e−01,
+3.916090507233831 e−01, +4.001732470818926 e−01,
+4.087890872349265 e−01, +4.174524354370054 e−01,
+4.261601728427663 e−01, +4.349103424521226 e−01,
+4.436999665749521 e−01, +4.525250566690236 e−01,
+4.613821390145840 e−01, +4.702690556535691 e−01,
+4.791821288489955 e−01, +4.881175853001019 e−01,
+4.970720120437943 e−01, +5.060433154467696 e−01,
+5.150277508616620 e−01, +5.240208300352607 e−01,
+5.330187387865785 e−01, +5.420196856030712 e−01,
+5.510201184135838 e−01, +5.600165101133929 e−01,
+5.690047761849362 e−01, +5.779823098049300 e−01,
+5.869449780892492 e−01, +5.958886225335936 e−01,
+6.048099568741729 e−01, +6.137068698395559 e−01,
+6.225761217125432 e−01, +6.314128591964590 e−01,
+6.402134772829997 e−01, +6.489754897736506 e−01,
+6.576959114103553 e−01, +6.663704870510495 e−01,
+6.749962795110787 e−01, +6.835701860237697 e−01,
+6.920890588499607 e−01, +7.005478826218464 e−01,
+7.089444008783498 e−01, +7.172765338080037 e−01,
+7.255415386736762 e−01, +7.337354140683028 e−01,
+7.418546544582220 e−01, +7.498972580176051 e−01,
+7.578599326607545 e−01, +7.657390988438872 e−01,
+7.735317637507610 e−01, +7.812362247368221 e−01,
+7.888499478365373 e−01, +7.963691608881653 e−01,
+8.037915368847273 e−01, +8.111154166403033 e−01,
+8.183384161720055 e−01, +8.254567363530231 e−01,
+8.324682688387346 e−01, +8.393715063470556 e−01,
+8.461645428100565 e−01, +8.528442051510350 e−01,
+8.594088830061699 e−01, +8.658575289268042 e−01,
+8.721883611259660 e−01, +8.783992457627015 e−01,
+8.844895714000796 e−01, +8.904559910537616 e−01,
+8.962997945931150 e−01, +9.020168984242400 e−01,
+9.076056139480890 e−01, +9.130664170641334 e−01,
+9.183979162084582 e−01, +9.235994678560167 e−01,
+9.286692422352107 e−01, +9.336076279434850 e−01,
+9.384129048732400 e−01, +9.430836933050435 e−01,
+9.476197145049868 e−01, +9.520221006942875 e−01,
+9.562904165806793 e−01, +9.604235518327253 e−01,
+9.644205605875820 e−01, +9.682827690312492 e−01,
+9.720106722663890 e−01, +9.756042291745447 e−01,
+9.790638238608151 e−01, +9.823902028722666 e−01,
+9.855837812929384 e−01, +9.886436665180195 e−01,
+9.915714515450228 e−01, +9.943692859110803 e−01,
+9.970385179500313 e−01, +9.995787919228785 e−01,
+1.001991256344717 e+00, +1.004277707367492 e+00,
+1.006439806897506 e+00, +1.008478224880801 e+00,
+1.010395057449511 e+00, +1.012192316076366 e+00,
+1.013871638199171 e+00, +1.015433826923486 e+00,
+1.016881083871244 e+00, +1.018216717878600 e+00,
+1.019442870837515 e+00, +1.020560853084751 e+00,
+1.021572361827679 e+00, +1.022480682703848 e+00,
+1.023288268237906 e+00, +1.023997104737320 e+00,
+1.024609726504572 e+00, +1.025129444345768 e+00,
+1.025558707847599 e+00, +1.025899187425550 e+00,
+1.026153736073730 e+00, +1.026326400217514 e+00,
+1.026419755159132 e+00, +1.026435753513555 e+00,
+1.026376745497183 e+00, +1.026246413164014 e+00,
+1.026047802601159 e+00, +1.025783163725466 e+00,
+1.025455636062312 e+00, +1.025068712226252 e+00,
+1.024625269765159 e+00, +1.024127035189888 e+00,
+1.023577282345944 e+00, +1.022979990313458 e+00,
+1.022338337695996 e+00, +1.021654354624439 e+00,
+1.020930844259280 e+00, +1.020171385028845 e+00,
+1.019379551852598 e+00, +1.018557222865231 e+00,
+1.017708008483692 e+00, +1.016835630605444 e+00,
+1.015943000562828 e+00, +1.015032211107897 e+00,
+1.014106040189062 e+00, +1.013168810057302 e+00,
+1.012223533569952 e+00, +1.011272160610958 e+00,
+1.010317161995333 e+00, +1.009363573682324 e+00,
+1.008418957730006 e+00, +1.007443035427814 e+00,
+1.006980582693088 e+00, +1.005880191360173 e+00,
+1.004870660907557 e+00, +1.003887307826199 e+00,
+1.002933862630671 e+00, +1.002012456628431 e+00,
+1.001122929266782 e+00, +1.000264200804259 e+00,
+9.994361518334981 e−01, +9.986396025239043 e−01,
+9.978744044020248 e−01, +9.971394126637049 e−01,
+9.964344374346332 e−01, +9.957602381261346 e−01,
+9.951165794460692 e−01, +9.945022689695088 e−01,
+9.939170480434331 e−01, +9.933616056210112 e−01,
+9.928356667510468 e−01, +9.923379640068731 e−01,
+9.918682011153984 e−01, +9.914270132578689 e−01,

+9.910140670228395 e−01, +9.906280727376265 e−01,
+9.902686735168059 e−01, +9.899364775767996 e−01,
+9.896311064950427 e−01, +9.893512408407925 e−01,
+9.890965020344753 e−01, +9.888674481881904 e−01,
+9.886636955343167 e−01, +9.884838850803949 e−01,
+9.883276240055705 e−01, +9.881954463086439 e−01,
+9.880869460773882 e−01, +9.880007538329854 e−01,
+9.879364462155417 e−01, +9.878945575956836 e−01,
+9.878746493979034 e−01, +9.878753499522159 e−01,
+9.878962158879177 e−01, +9.879377642109470 e−01,
+9.879995488718708 e−01, +9.880801746803725 e−01,
+9.881791937541983 e−01, +9.882970966792446 e−01,
+9.884334355024147 e−01, +9.885867883714737 e−01,
+9.887566952073135 e−01, +9.889436358294569 e−01,
+9.891471384894399 e−01, +9.893657732439902 e−01,
+9.895990550550585 e−01, +9.898474573387898 e−01,
+9.901104832002432 e−01, +9.903866926546286 e−01,
+9.906755858999687 e−01, +9.909776136318341 e−01,
+9.912922749689899 e−01, +9.916181054602099 e−01,
+9.919545975686356 e−01, +9.923021872317422 e−01,
+9.926603609120486 e−01, +9.930276450366935 e−01,
+9.934035125599263 e−01, +9.937883997783191 e−01,
+9.941817792665538 e−01, +9.945821646067609 e−01,
+9.949890245456261 e−01, +9.954027843196593 e−01,
+9.958229139376651 e−01, +9.962479146150113 e−01,
+9.966772475112751 e−01, +9.971113385049125 e−01,
+9.975496462958124 e−01, +9.979906675056988 e−01,
+9.984338592613343 e−01, +9.988796523949821 e−01,
+9.993275431378141 e−01, +9.997753812452573 e−01,
+1.000224669219663 e+00, +1.000672909364706 e+00,
+1.001121604191588 e+00, +1.001568597382930 e+00,
+1.002013378040221 e+00, +1.002456372686098 e+00,
+1.002897030034197 e+00, +1.003333829980590 e+00,
+1.003766216551067 e+00, +1.004194607298016 e+00,
+1.004618447680436 e+00, +1.005036211788027 e+00,
+1.005447348229275 e+00, +1.005852270535212 e+00,
+1.006250425365265 e+00, +1.006640290029854 e+00,
+1.007021310029137 e+00, +1.007393907701933 e+00,
+1.007757528772291 e+00, +1.008110655922241 e+00,
+1.008452744553207 e+00, +1.008784215564761 e+00,
+1.009104530964226 e+00, +1.009412177137242 e+00,
+1.009706620067364 e+00, +1.009988296223056 e+00,
+1.010256673981368 e+00, +1.010510261597171 e+00,
+1.010748529051234 e+00, +1.010971938438940 e+00,
+1.011179974034890 e+00, +1.011371154144579 e+00,
+1.011544976893053 e+00, +1.011701915457469 e+00,
+1.011841483052088 e+00, +1.011962209203063 e+00,
+1.012063621581602 e+00, +1.012146211141323 e+00,
+1.012209509774826 e+00, +1.012252080651208 e+00,
+1.012273461473019 e+00, +1.012274179329824 e+00,
+1.012253779830287 e+00, +1.012210860152664 e+00,
+1.012144976732521 e+00, +1.012056685871527 e+00,
+1.011945565763788 e+00, +1.011810229432951 e+00,
+1.011650280893217 e+00, +1.011466289818154 e+00,
+1.011257880752579 e+00, +1.011023694799342 e+00,
+1.010763375755366 e+00, +1.010477533938561 e+00,
+1.010165826445586 e+00, +1.009826955798404 e+00,
+1.009460591235290 e+00, +1.009067412134881 e+00,
+1.008647118373303 e+00, +1.008198467170796 e+00,
+1.007721196075366 e+00, +1.007216031301935 e+00,
+1.006682757156533 e+00, +1.006120180721864 e+00,
+1.005528123164754 e+00, +1.004907385380564 e+00,
+1.004257813991292 e+00, +1.003578321293819 e+00,
+1.002868793771428 e+00, +1.002130123378852 e+00,
+1.001362250678481 e+00, +1.000564166270619 e+00,
+9.997358689793686 e−01, +9.988783302889642 e−01,
+9.979915852192069 e−01, +9.970747197397686 e−01,
+9.961277448216609 e−01, +9.951529474418550 e−01,
+9.941541831614942 e−01, +9.930678080460911 e−01,
+9.914646039976289 e−01, +9.902352352689523 e−01,
+9.889131869680553 e−01, +9.875383274623817 e−01,
+9.861028679251979 e−01, +9.846041087188396 e−01,
+9.830394337851476 e−01, +9.814052410296346 e−01,
+9.796987091039431 e−01, +9.779184677896273 e−01,
+9.760616740194450 e−01, +9.741245958128935 e−01,
+9.721043782586516 e−01, +9.699991325531057 e−01,
+9.678068213341133 e−01, +9.655234943873925 e−01,
+9.631470850364502 e−01, +9.606758082762421 e−01,
+9.581070287387355 e−01, +9.554372064329766 e−01,
+9.526641870716750 e−01, +9.497868942084339 e−01,
+9.468034353946915 e−01, +9.437103240778303 e−01,
+9.405054771915659 e−01, +9.371877218082764 e−01,
+9.337553821450042 e−01, +9.302057763482381 e−01,
+9.265373496318979 e−01, +9.227494594741956 e−01,
+9.188401295674290 e−01, +9.148067377557749 e−01,
+9.106476709258303 e−01, +9.063629680720371 e−01,
+9.019514987490371 e−01, +8.974108808873397 e−01,
+8.927398817643528 e−01, +8.879382683346716 e−01,
+8.830050715882986 e−01, +8.779385355821995 e−01,
+8.727379973888942 e−01, +8.674038889082810 e−01,
+8.619352566808824 e−01, +8.563305243162549 e−01,
+8.505893287555129 e−01, +8.447127297770400 e−01,
+8.387007637143140 e−01, +8.325523768291013 e−01,
+8.262677444285360 e−01, +8.198478927378535 e−01,
+8.132935411236417 e−01, +8.066040997239516 e−01,
+7.997809105802602 e−01, +7.928255537687610 e−01,
+7.857391245481645 e−01, +7.785212684545030 e−01,
+7.711744403395434 e−01, +7.637008160854790 e−01,
+7.561026668755407 e−01, +7.483805701761127 e−01,
+7.405363749469933 e−01, +7.325730245135402 e−01,
+7.244930008228270 e−01, +7.162980305440977 e−01,
+7.079910089690906 e−01, +6.995757887359807 e−01,
+6.910546259244099 e−01, +6.824295471401947 e−01,
+6.737031265887281 e−01, +6.648801659515325 e−01,
+6.559637902883004 e−01, +6.469573547411541 e−01,
+6.378629377753962 e−01, +6.286855280775698 e−01,
+6.194273058858271 e−01, +6.100922809170846 e−01,
+6.006842631336996 e−01, +5.912087588215279 e−01,
+5.816678990293079 e−01, +5.720650011081139 e−01,
+5.624031153715043 e−01, +5.526906296747590 e−01,
+5.429296335729603 e−01, +5.331253296256703 e−01,
+5.232805923025862 e−01, +5.134010079652535 e−01,
+5.034916218473681 e−01, +4.935565059779637 e−01,
+4.835996679580253 e−01, +4.736270399539165 e−01,
+4.636428606356920 e−01, +4.536519115376573 e−01,
+4.436589520558524 e−01, +4.336702110092904 e−01,
+4.236905139305571 e−01, +4.137241358370227 e−01,
+4.037764981593496 e−01, +3.938536636599411 e−01,
+3.839608678121244 e−01, +3.741023650337649 e−01,
+3.642834353302138 e−01, +3.545105744959439 e−01,
+3.447887254766501 e−01, +3.351225758795436 e−01,
+3.255174149216463 e−01, +3.159783340225490 e−01,
+3.065118829951374 e−01, +2.971215837581699 e−01,
+2.878124834032541 e−01, +2.785898831431837 e−01,
+2.694592444601873 e−01, +2.604240268886858 e−01,
+2.514886909115454 e−01, +2.426587307354934 e−01,
+2.339385917103926 e−01, +2.253316454409216 e−01,
+2.168420127437019 e−01, +2.084745870335012 e−01,
+2.002332724591125 e−01, +1.921209969418307 e−01,
+1.841414579810840 e−01, +1.762991374092108 e−01,
+1.685975427109672 e−01, +1.610392647455030 e−01,
+1.536276387455411 e−01, +1.463667950599712 e−01,
+1.392599476606262 e−01, +1.323093893293405 e−01,
+1.255182155111708 e−01, +1.188903216873086 e−01,

+1.124286726877977 e−01, +1.061353122093495 e−01,
+1.000130754353283 e−01, +9.406556557413207 e−02,
+8.829543394466104 e−02, +8.270438757849530 e−02,
+7.729486433686703 e−02, +7.206998099643687 e−02,
+6.703183558090599 e−02, +6.218153160076208 e−02,
+5.752079270262547 e−02, +5.305187265543024 e−02,
+4.877591488398974 e−02, +4.469299727922282 e−02,
+4.080367800167831 e−02, +3.710883802024244 e−02,
+3.360819061792393 e−02, +3.030027537135876 e−02,
+2.718416076819826 e−02, +2.425872983336823 e−02,
+2.152170070657780 e−02, +1.896992105664512 e−02,
+1.660053693426304 e−02, +1.441002712765955 e−02,
+1.239334766429038 e−02, +1.054549096241532 e−02,
+8.862485552559351 e−03, +7.329085750247888 e−03,
+5.896299968476346 e−03, +4.914753459788711 e−03,
+0.000000000000000 e+00, +0.000000000000000 e+00,
+0.000000000000000 e+00, +0.000000000000000 e+00,
+0.000000000000000 e+00, +0.000000000000000 e+00,
+0.000000000000000 e+00, +0.000000000000000 e+00,
+0.000000000000000 e+00, +0.000000000000000 e+00,
+0.000000000000000 e+00, +0.000000000000000 e+00,
+0.000000000000000 e+00, +0.000000000000000 e+00,
+0.000000000000000 e+00, +0.000000000000000 e+00,
+0.000000000000000 e+00, +0.000000000000000 e+00,
+0.000000000000000 e+00, +0.000000000000000 e+00,
+0.000000000000000 e+00, +0.000000000000000 e+00,
+0.000000000000000 e+00, +0.000000000000000 e+00,
+0.000000000000000 e+00, +0.000000000000000 e+00,
+0.000000000000000 e+00, +0.000000000000000 e+00,
+0.000000000000000 e+00, +0.000000000000000 e+00,
+0.000000000000000 e+00, +0.000000000000000 e+00,
+0.000000000000000 e+00, +0.000000000000000 e+00,
+0.000000000000000 e+00, +0.000000000000000 e+00,
+0.000000000000000 e+00, +0.000000000000000 e+00,
+0.000000000000000 e+00, +0.000000000000000 e+00,
+0.000000000000000 e+00, +0.000000000000000 e+00,
+0.000000000000000 e+00, +0.000000000000000 e+00,
+0.000000000000000 e+00, +0.000000000000000 e+00,
+0.000000000000000 e+00, +0.000000000000000 e+00,
+0.000000000000000 e+00, +0.000000000000000 e+00,
+0.000000000000000 e+00, +0.000000000000000 e+00,
+0.000000000000000 e+00, +0.000000000000000 e+00,
+0.000000000000000 e+00, +0.000000000000000 e+00,
+0.000000000000000 e+00, +0.000000000000000 e+00,
+0.000000000000000 e+00, +0.000000000000000 e+00,
+0.000000000000000 e+00, +0.000000000000000 e+00,
+0.000000000000000 e+00, +0.000000000000000 e+00,
+0.000000000000000 e+00, +0.000000000000000 e+00,
+0.000000000000000 e+00, +0.000000000000000 e+00,
+0.000000000000000 e+00, +0.000000000000000 e+00,
+0.000000000000000 e+00, +0.000000000000000 e+00,
+0.000000000000000 e+00, +0.000000000000000 e+00,
+0.000000000000000 e+00, +0.000000000000000 e+00,
+0.000000000000000 e+00, +0.000000000000000 e+00,
+0.000000000000000 e+00, +0.000000000000000 e+00.

A numerical example of windowing function $w_{480}$, for frame size N=480, is herewith provided (960 samples). As explained above, the last values may be zeros.

+3.538498803770035 e−04, +4.595886345493055 e−04,
+5.595519647227489 e−04, +6.718404887323839 e−04,
+7.919323614002698 e−04, +9.254835101516548 e−04,
+1.069418485858920 e−03, +1.227927169310031 e−03,
+1.398277791978983 e−03, +1.584491535026729 e−03,
+1.783653266717233 e−03, +1.999873692180148 e−03,
+2.230687004705732 e−03, +2.479549413444207 e−03,
+2.744274680521470 e−03, +3.028517203082985 e−03,
+3.329799454594260 e−03, +3.651493788541270 e−03,
+3.991659081158673 e−03, +4.353535478916468 e−03,
+4.734803493964832 e−03, +5.139354888882466 e−03,
+5.564965156664017 e−03, +6.015065135312130 e−03,
+6.487669532207667 e−03, +6.986108359341676 e−03,
+7.507986430774601 e−03, +8.056692238103912 e−03,
+8.629882322202329 e−03, +9.230898632007642 e−03,
+9.857619542786990 e−03, +1.051343406844975 e−02,
+1.119617236058772 e−02, +1.190938692951881 e−02,
+1.265082642578719 e−02, +1.342375201935177 e−02,
+1.422598597626579 e−02, +1.506090447446532 e−02,
+1.592611511144210 e−02, +1.682519266177794 e−02,
+1.775591229287213 e−02, +1.872166356881472 e−02,
+1.972014746423546 e−02, +2.075475983187825 e−02,
+2.182299926812682 e−02, +2.292828566629717 e−02,
+2.406813715401559 e−02, +2.524583465017564 e−02,
+2.645943128544517 e−02, +2.771207863541604 e−02,
+2.900157039370381 e−02, +3.033143686044867 e−02,
+3.169933248543932 e−02, +3.310834554878132 e−02,
+3.455615910816914 e−02, +3.604609640533871 e−02,
+3.757564512209753 e−02, +3.914808612511974 e−02,
+4.076128638095439 e−02, +4.241834056741758 e−02,
+4.411695502674887 e−02, +4.586038120884381 e−02,
+4.764607953574337 e−02, +4.947719681327219 e−02,
+5.135136676471998 e−02, +5.327183246133368 e−02,
+5.523619574402436 e−02, +5.724780220726930 e−02,
+5.930419525733627 e−02, +6.140861916695377 e−02,
+6.355854744461048 e−02, +6.575698564821578 e−02,
+6.800132774040281 e−02, +7.029450733434550 e−02,
+7.263424529955659 e−02, +7.502357150869594 e−02,
+7.745987198268531 e−02, +7.994662730757418 e−02,
+8.248121208201259 e−02, +8.506635369887924 e−02,
+8.769965758141890 e−02, +9.038399472465716 e−02,
+9.311641620512773 e−02, +9.590005739506280 e−02,
+9.873233942897164 e−02, +1.016162955027316 e−01,
+1.045493607096311 e−01, +1.075345731608719 e−01,
+1.105690806271684 e−01, +1.136556251529813 e−01,
+1.167913767515824 e−01, +1.199789286645804 e−01,
+1.232155302990620 e−01, +1.265040684552515 e−01,
+1.298417294090302 e−01, +1.332315661550852 e−01,
+1.366709127560524 e−01, +1.401623800497866 e−01,
+1.437031543339276 e−01, +1.472957921567060 e−01,
+1.509371564593891 e−01, +1.546298983040232 e−01,
+1.583709932021852 e−01, +1.621632295622287 e−01,
+1.660038996795837 e−01, +1.698955982096184 e−01,
+1.738354123649302 e−01, +1.778260015982545 e−01,
+1.818640789446629 e−01, +1.859520359191026 e−01,
+1.900868218108653 e−01, +1.942708017706291 e−01,
+1.985008828937603 e−01, +2.027798260494142 e−01,
+2.071046414574582 e−01, +2.114778554475382 e−01,
+2.158964254821512 e−01, +2.203627179356420 e−01,
+2.248732557074316 e−01, +2.294303802774835 e−01,
+2.340304946493155 e−01, +2.386763947872762 e−01,
+2.433647632018021 e−01, +2.480980084587409 e−01,
+2.528729453658238 e−01, +2.576919809402799 e−01,
+2.625518239753811 e−01, +2.674547009618951 e−01,
+2.723969864831702 e−01, +2.773809014717047 e−01,
+2.824031465430401 e−01, +2.874658392896952 e−01,
+2.925657097525320 e−01, +2.977050145264297 e−01,
+3.028802866809923 e−01, +3.080937708388026 e−01,
+3.133419120661713 e−01, +3.186267330325243 e−01,
+3.239446274586855 e−01, +3.292976696294886 e−01,
+3.346822587497995 e−01, +3.401004975161905 e−01,
+3.455490160824131 e−01, +3.510297825670005 e−01,
+3.565392648316303 e−01, +3.620795045342974 e−01,
+3.676468198385683 e−01, +3.732431609065464 e−01,
+3.788648665671841 e−01, +3.845139947587731 e−01,
+3.901867575702975 e−01, +3.958851576591690 e−01,

+4.016055596175310 e−01, +4.073498814407726 e−01,
+4.131143794748322 e−01, +4.189008731078437 e−01,
+4.247056871121635 e−01, +4.305308301005456 e−01,
+4.363724468005679 e−01, +4.422326205247767 e−01,
+4.481076715576617 e−01, +4.539992478845187 e−01,
+4.599036262256764 e−01, +4.658227790464821 e−01,
+4.717526717360889 e−01, +4.776951277513855 e−01,
+4.836466393241829 e−01, +4.896089037533445 e−01,
+4.955781691142885 e−01, +5.015564851667653 e−01,
+5.075397341675292 e−01, +5.135297950483941 e−01,
+5.195228071176610 e−01, +5.255203889406241 e−01,
+5.315186369941947 e−01, +5.375197039843709 e−01,
+5.435197203416460 e−01, +5.495204053284317 e−01,
+5.555183841040963 e−01, +5.615153912741460 e−01,
+5.675072245552497 e−01, +5.734957812557457 e−01,
+5.794770758870604 e−01, +5.854526176188222 e−01,
+5.914186654649489 e−01, +5.973773282523112 e−01,
+6.033245382283379 e−01, +6.092622887527459 e−01,
+6.151869491458284 e−01, +6.211002315674210 e−01,
+6.269981160888640 e−01, +6.328823912226461 e−01,
+6.387491304847892 e−01, +6.446002007776794 e−01,
+6.504316924413531 e−01, +6.562457600042717 e−01,
+6.620384583071039 e−01, +6.678117513456276 e−01,
+6.735619658538692 e−01, +6.792906550106088 e−01,
+6.849937204005565 e−01, +6.906734235708962 e−01,
+6.963256426589250 e−01, +7.019517880051427 e−01,
+7.075491663942173 e−01, +7.131194393772130 e−01,
+7.186585770351414 e−01, +7.241690155466505 e−01,
+7.296469905863920 e−01, +7.350940240070911 e−01,
+7.405065029424016 e−01, +7.458864594794676 e−01,
+7.512298245353598 e−01, +7.565387020584289 e−01,
+7.618094719403713 e−01, +7.670441227603888 e−01,
+7.722388831102434 e−01, +7.773958448163656 e−01,
+7.825113901786742 e−01, +7.875876391562497 e−01,
+7.926208751337592 e−01, +7.976131629355570 e−01,
+8.025610715609228 e−01, +8.074666387233143 e−01,
+8.123261531893655 e−01, +8.171419338595847 e−01,
+8.219101564897180 e−01, +8.266329452432137 e−01,
+8.313069432125857 e−01, +8.359343163788637 e−01,
+8.405111871797961 e−01, +8.450403211238631 e−01,
+8.495180470826319 e−01, +8.539464819668052 e−01,
+8.583225792686004 e−01, +8.626485837105826 e−01,
+8.669206756254478 e−01, +8.711415846800790 e−01,
+8.753083234662220 e−01, +8.794234355078734 e−01,
+8.834826778788665 e−01, +8.874884715160425 e−01,
+8.914384774585629 e−01, +8.953346996622868 e−01,
+8.991737724042251 e−01, +9.029574074899029 e−01,
+9.066828541224163 e−01, +9.103527429187326 e−01,
+9.139638342168577 e−01, +9.175184878836662 e−01,
+9.210144133066616 e−01, +9.244537632557187 e−01,
+9.278332160151861 e−01, +9.311556192776946 e−01,
+9.344176283021008 e−01, +9.376215186479845 e−01,
+9.407644740241826 e−01, +9.438492190005341 e−01,
+9.468728540294310 e−01, +9.498382236872068 e−01,
+9.527426712456687 e−01, +9.555885737210712 e−01,
+9.583732599601223 e−01, +9.610993609218629 e−01,
+9.637636503225360 e−01, +9.663690412284377 e−01,
+9.689132689491541 e−01, +9.713988678700001 e−01,
+9.738235617865406 e−01, +9.761902903500818 e−01,
+9.784963361871022 e−01, +9.807442506043361 e−01,
+9.829315352320943 e−01, +9.850609512273165 e−01,
+9.871297972052695 e−01, +9.891408802831312 e−01,
+9.910923625580078 e−01, +9.929872268444632 e−01,
+9.948228821209419 e−01, +9.966027455323081 e−01,
+9.983241398929388 e−01, +9.999898494568836 e−01,
+1.001597808884145 e+00, +1.003150760219063 e+00,
+1.004646500318265 e+00, +1.006088248744700 e+00,
+1.007473713377193 e+00, +1.008806248810530 e+00,
+1.010083776257753 e+00, +1.011309151636166 e+00,
+1.012480196393275 e+00, +1.013600067830152 e+00,
+1.014666681083198 e+00, +1.015683082766535 e+00,
+1.016647533889674 e+00, +1.017563337333301 e+00,
+1.018428468753963 e+00, +1.019246216134229 e+00,
+1.020014681326785 e+00, +1.020736921761459 e+00,
+1.021410866072808 e+00, +1.022039872150903 e+00,
+1.022622059577585 e+00, +1.023160749941404 e+00,
+1.023654257342442 e+00, +1.024105973101631 e+00,
+1.024514004504684 e+00, +1.024881624147540 e+00,
+1.025207065371760 e+00, +1.025493542877243 e+00,
+1.025739288978437 e+00, +1.025947636692103 e+00,
+1.026116939910040 e+00, +1.026250709375593 e+00,
+1.026347260729698 e+00, +1.026409787584788 e+00,
+1.026436666375082 e+00, +1.026431212267978 e+00,
+1.026391488022762 e+00, +1.026320857404224 e+00,
+1.026217843764236 e+00, +1.026085730009027 e+00,
+1.025922917798664 e+00, +1.025733019213987 e+00,
+1.025514292433933 e+00, +1.025269979527211 e+00,
+1.024998528084259 e+00, +1.024703212795365 e+00,
+1.024382188798244 e+00, +1.024039051426278 e+00,
+1.023672163232710 e+00, +1.023284940887058 e+00,
+1.022875917162315 e+00, +1.022448453314994 e+00,
+1.022000829220643 e+00, +1.021536599728231 e+00,
+1.021053875701803 e+00, +1.020555973231408 e+00,
+1.020041434676317 e+00, +1.019513866799503 e+00,
+1.018971390778550 e+00, +1.018417599116053 e+00,
+1.017851066303933 e+00, +1.017275179369116 e+00,
+1.016688023745155 e+00, +1.016093242802983 e+00,
+1.015489129111694 e+00, +1.014878956980025 e+00,
+1.014261064091392 e+00, +1.013639356938881 e+00,
+1.013011559583153 e+00, +1.012381741769641 e+00,
+1.011747750709711 e+00, +1.011113332101179 e+00,
+1.010476167900044 e+00, +1.009840844244693 e+00,
+1.009204021773819 e+00, +1.008572045006596 e+00,
+1.007939764480188 e+00, +1.007331850775798 e+00,
+1.007112182697132 e+00, +1.006407400915498 e+00,
+1.005715372118122 e+00, +1.005038785533845 e+00,
+1.004374825095777 e+00, +1.003726291405694 e+00,
+1.003090358040736 e+00, +1.002469814737132 e+00,
+1.001861838147367 e+00, +1.001269198108365 e+00,
+1.000689073754539 e+00, +1.000124220942757 e+00,
+9.995718119556711 e−01, +9.990346001249977 e−01,
+9.985097406611592 e−01, +9.979999918405413 e−01,
+9.975024904153303 e−01, +9.970199948970832 e−01,
+9.965496346682551 e−01, +9.960941547576162 e−01,
+9.956506910018569 e−01, +9.952219662800089 e−01,
+9.948051243621099 e−01, +9.944028741276870 e−01,
+9.940123528373235 e−01, +9.936362728142866 e−01,
+9.932717517525477 e−01, +9.929215102130406 e−01,
+9.925826537087717 e−01, +9.922578948824415 e−01,
+9.919443474477135 e−01, +9.916447007525191 e−01,
+9.913560821234982 e−01, +9.910811659133294 e−01,
+9.908170758245324 e−01, +9.905664908867821 e−01,
+9.903265196045258 e−01, +9.900998445795673 e−01,
+9.898835741176714 e−01, +9.896803735870122 e−01,
+9.894873685512386 e−01, +9.893072032520545 e−01,
+9.891370094863634 e−01, +9.889794323427195 e−01,
+9.888315884970242 e−01, +9.886961351016699 e−01,
+9.885701787626714 e−01, +9.884563716748773 e−01,
+9.883518302777313 e−01, +9.882591911282058 e−01,
+9.881755763473004 e−01, +9.881036242002076 e−01,
+9.880404423341358 e−01, +9.879886826752381 e−01,
+9.879454420034824 e−01, +9.879133688360181 e−01,
+9.878895706371619 e−01, +9.878766784594818 e−01,
+9.878718098237022 e−01, +9.878775927630988 e−01,

+9.878911354436840 e−01, +9.879150762106034 e−01,
+9.879465136687265 e−01, +9.879880844262307 e−01,
+9.880368938846610 e−01, +9.880955662657537 e−01,
+9.881612121412342 e−01, +9.882364564839506 e−01,
+9.883183975703879 e−01, +9.884096731867189 e−01,
+9.885073687439192 e−01, +9.886141241716089 e−01,
+9.887270275540468 e−01, +9.888487088987707 e−01,
+9.889762614809646 e−01, +9.891123127261381 e−01,
+9.892539488627546 e−01, +9.894038044982261 e−01,
+9.895589571176194 e−01, +9.897220412447528 e−01,
+9.898901380212467 e−01, +9.900658706993652 e−01,
+9.902463287269285 e−01, +9.904341281652976 e−01,
+9.906263564100900 e−01, +9.908256340476208 e−01,
+9.910290387632859 e−01, +9.912391966549245 e−01,
+9.914531811725067 e−01, +9.916736156286597 e−01,
+9.918975763831412 e−01, +9.921276814881759 e−01,
+9.923610074433741 e−01, +9.926001740490448 e−01,
+9.928422499725458 e−01, +9.930898628710855 e−01,
+9.933400717991352 e−01, +9.935955098307742 e−01,
+9.938532319665272 e−01, +9.941158706465729 e−01,
+9.943804814776256 e−01, +9.946496946937963 e−01,
+9.949205650500305 e−01, +9.951957244449919 e−01,
+9.954722223202400 e−01, +9.957526959635303 e−01,
+9.960341878404958 e−01, +9.963193400387707 e−01,
+9.966051908036528 e−01, +9.968943831870675 e−01,
+9.971839552785087 e−01, +9.974765480003592 e−01,
+9.977692009836100 e−01, +9.980645531056329 e−01,
+9.983596442023971 e−01, +9.986571134591464 e−01,
+9.989539982645417 e−01, +9.992529406343204 e−01,
+9.995509738170480 e−01, +9.998507434423984 e−01,
+1.000149278838447 e+00, +1.000449227898040 e+00,
+1.000747617880619 e+00, +1.001047097000738 e+00,
+1.001344692310058 e+00, +1.001643050985813 e+00,
+1.001939200113204 e+00, +1.002235786606954 e+00,
+1.002529835919150 e+00, +1.002823997223967 e+00,
+1.003115291715261 e+00, +1.003406373183356 e+00,
+1.003694257266035 e+00, +1.003981602446902 e+00,
+1.004265420574493 e+00, +1.004548371695603 e+00,
+1.004827468041713 e+00, +1.005105367331224 e+00,
+1.005379085053508 e+00, +1.005651275972376 e+00,
+1.005918957263603 e+00, +1.006184784468940 e+00,
+1.006445772052972 e+00, +1.006704580223772 e+00,
+1.006958219378997 e+00, +1.007209352772459 e+00,
+1.007454991591196 e+00, +1.007697795962687 e+00,
+1.007934783656087 e+00, +1.008168609148541 e+00,
+1.008396295152072 e+00, +1.008620496650569 e+00,
+1.008838233369544 e+00, +1.009052167883909 e+00,
+1.009259314290145 e+00, +1.009462340194419 e+00,
+1.009658261526612 e+00, +1.009849742422788 e+00,
+1.010033806431099 e+00, +1.010213115163429 e+00,
+1.010384692193296 e+00, +1.010551208502819 e+00,
+1.010709677336593 e+00, +1.010862783160582 e+00,
+1.011007533860188 e+00, +1.011146615898068 e+00,
+1.011277044709547 e+00, +1.011401501255448 e+00,
+1.011517007040469 e+00, +1.011626247430694 e+00,
+1.011726237740989 e+00, +1.011819675175864 e+00,
+1.011903571699736 e+00, +1.011980623923816 e+00,
+1.012047856645320 e+00, +1.012107954864219 e+00,
+1.012157955913755 e+00, +1.012200545438956 e+00,
+1.012232755709885 e+00, +1.012257286376882 e+00,
+1.012271163275396 e+00, +1.012277089047072 e+00,
+1.012272100156695 e+00, +1.012258889781605 e+00,
+1.012234505114778 e+00, +1.012201643414713 e+00,
+1.012157343029718 e+00, +1.012104319978655 e+00,
+1.012039603446877 e+00, +1.011965913685509 e+00,
+1.011880293122688 e+00, +1.011785448628142 e+00,
+1.011678439894684 e+00, +1.011561972516341 e+00,
+1.011433103151726 e+00, +1.011294553726738 e+00,
+1.011143373963981 e+00, +1.010982291036989 e+00,
+1.010808368434796 e+00, +1.010624321020038 e+00,
+1.010427231547075 e+00, +1.010219813871895 e+00,
+1.009999148545101 e+00, +1.009767970668237 e+00,
+1.009523347700539 e+00, +1.009268031808824 e+00,
+1.008999095526602 e+00, +1.008719286674458 e+00,
+1.008425698479647 e+00, +1.008121073095495 e+00,
+1.007802512993334 e+00, +1.007472774447058 e+00,
+1.007128952000889 e+00, +1.006773824218378 e+00,
+1.006404483571931 e+00, +1.006023715042962 e+00,
+1.005628630023041 e+00, +1.005222003295591 e+00,
+1.004800972930542 e+00, +1.004368308119956 e+00,
+1.003921160689206 e+00, +1.003462311571559 e+00,
+1.002988912076156 e+00, +1.002503762756151 e+00,
+1.002004016208227 e+00, +1.001492483526354 e+00,
+1.000966332772540 e+00, +1.000428371467870 e+00,
+9.998757944861690 e−01, +9.993114007411373 e−01,
+9.987324107135600 e−01, +9.981416218519609 e−01,
+9.975362702189898 e−01, +9.969191628491259 e−01,
+9.962875422935514 e−01, +9.956442306333592 e−01,
+9.949864765356604 e−01, +9.943171077259315 e−01,
+9.936333924912825 e−01, +9.929380432296178 e−01,
+9.917160727742302 e−01, +9.908677480361242 e−01,
+9.900143412821714 e−01, +9.891360093161795 e−01,
+9.882326326262749 e−01, +9.873035624860487 e−01,
+9.863463238550498 e−01, +9.853620567056602 e−01,
+9.843478797730104 e−01, +9.833051513036913 e−01,
+9.822305093671991 e−01, +9.811260856582836 e−01,
+9.799880424709783 e−01, +9.788185853162172 e−01,
+9.776142582502931 e−01, +9.763768210132104 e−01,
+9.751026333215269 e−01, +9.737939228124395 e−01,
+9.724467635816038 e−01, +9.710631852370086 e−01,
+9.696397017403771 e−01, +9.681786285613160 e−01,
+9.666759668947944 e−01, +9.651341172191925 e−01,
+9.635494800783196 e−01, +9.619242192293307 e−01,
+9.602543350544703 e−01, +9.585422731136767 e−01,
+9.567841986369237 e−01, +9.549824213719248 e−01,
+9.531333627775944 e−01, +9.512394303101863 e−01,
+9.492969005669868 e−01, +9.473083933922714 e−01,
+9.452700238623795 e−01, +9.431841637391052 e−01,
+9.410472222265884 e−01, +9.388615698236068 e−01,
+9.366234817959531 e−01, +9.343357002925867 e−01,
+9.319946435581106 e−01, +9.296028267859759 e−01,
+9.271568160852692 e−01, +9.246592033932568 e−01,
+9.221062052092852 e−01, +9.195004240356797 e−01,
+9.168383396399868 e−01, +9.141224927600506 e−01,
+9.113493760046765 e−01, +9.085218034087421 e−01,
+9.056363890361683 e−01, +9.026958474136628 e−01,
+8.996967011299613 e−01, +8.966416378522284 e−01,
+8.935272411148886 e−01, +8.903562054918268 e−01,
+8.871250499337346 e−01, +8.838366845222299 e−01,
+8.804877931535187 e−01, +8.770812736055238 e−01,
+8.736138336697008 e−01, +8.700884209228057 e−01,
+8.665016401172241 e−01, +8.628563075036018 e−01,
+8.591492134848260 e−01, +8.553833146397594 e−01,
+8.515554376987873 e−01, +8.476686394755906 e−01,
+8.437199738159921 e−01, +8.397124082723917 e−01,
+8.356428970797861 e−01, +8.315145717373513 e−01,
+8.273244136947282 e−01, +8.230753889817990 e−01,
+8.187646556254478 e−01, +8.143955052591809 e−01,
+8.099649296155544 e−01, +8.054763240960976 e−01,
+8.009271179588155 e−01, +7.963204506324437 e−01,
+7.916533519679438 e−01, +7.869294361891859 e−01,
+7.821460539775005 e−01, +7.773057646170487 e−01,
+7.724075191626083 e−01, +7.674541821769616 e−01,
+7.624428319731227 e−01, +7.573778165664506 e−01,

+7.522563457568547 e−01, +7.470817821499429 e−01,
+7.418518832940608 e−01, +7.365702052057368 e−01,
+7.312341927030358 e−01, +7.258478768003871 e−01,
+7.204090552899627 e−01, +7.149213766200488 e−01,
+7.093829112276890 e−01, +7.037975107157410 e−01,
+6.981626982337203 e−01, +6.924822574950567 e−01,
+6.867542812151157 e−01, +6.809822459535158 e−01,
+6.751641683711578 e−01, +6.693041888771051 e−01,
+6.634003182158815 e−01, +6.574563319397519 e−01,
+6.514710959179395 e−01, +6.454477530601381 e−01,
+6.393842401194645 e−01, +6.332854832820911 e−01,
+6.271477285210396 e−01, +6.209759156556838 e−01,
+6.147685389896460 e−01, +6.085293803703800 e−01,
+6.022569117623975 e−01, +5.959553778639692 e−01,
+5.896228984554688 e−01, +5.832624455793536 e−01,
+5.768737955463938 e−01, +5.704590282594502 e−01,
+5.640165022515612 e−01, +5.575534287167304 e−01,
+5.510670389249083 e−01, +5.445598110309068 e−01,
+5.380320138069060 e−01, +5.314874283056712 e−01,
+5.249238143777145 e−01, +5.183454027643609 e−01,
+5.117512861349316 e−01, +5.051454054672581 e−01,
+4.985259415650634 e−01, +4.918987341485414 e−01,
+4.852602812611293 e−01, +4.786156067459849 e−01,
+4.719635569001799 e−01, +4.653076657434153 e−01,
+4.586473038370960 e−01, +4.519865712901121 e−01,
+4.453241417472980 e−01, +4.386643656872857 e−01,
+4.320060235689271 e−01, +4.253531733174983 e−01,
+4.187046888325280 e−01, +4.120648989967404 e−01,
+4.054326930449553 e−01, +3.988123056192917 e−01,
+3.922024876218684 e−01, +3.856076044898875 e−01,
+3.790262923635895 e−01, +3.724631634624147 e−01,
+3.659167460890094 e−01, +3.593914828698104 e−01,
+3.528864871672291 e−01, +3.464055764938486 e−01,
+3.399474132903109 e−01, +3.335176660030293 e−01,
+3.271139090168518 e−01, +3.207392420889753 e−01,
+3.143954622458083 e−01, +3.080847161569418 e−01,
+3.018061113177053 e−01, +2.955645092490569 e−01,
+2.893580088818822 e−01, +2.831905952786933 e−01,
+2.770614560088827 e−01, +2.709746519672053 e−01,
+2.649288369241889 e−01, +2.589278854215034 e−01,
+2.529705733428521 e−01, +2.470608550624402 e−01,
+2.411974884962474 e−01, +2.353843453791010 e−01,
+2.296201119084320 e−01, +2.239085920293915 e−01,
+2.182484277107470 e−01, +2.126433716126154 e−01,
+2.070920316105701 e−01, +2.015981078416022 e−01,
+1.961601816145380 e−01, +1.907818965593135 e−01,
+1.854618027014993 e−01, +1.802035203864437 e−01,
+1.750055292053725 e−01, +1.698714235427536 e−01,
+1.647996883470628 e−01, +1.597938610874129 e−01,
+1.548523838673932 e−01, +1.499787548077658 e−01,
+1.451714001185458 e−01, +1.404337947365906 e−01,
+1.357643522991611 e−01, +1.311665152711531 e−01,
+1.266386794659985 e−01, +1.221842534547464 e−01,
+1.178016171445482 e−01, +1.134941442588690 e−01,
+1.092601994264173 e−01, +1.051031184506442 e−01,
+1.010212496137049 e−01, +9.701788451015510 e−02,
+9.309135143613317 e−02, +8.924488982596421 e−02,
+8.547680283183663 e−02, +8.179026694646475 e−02,
+7.818355556343952 e−02, +7.465976378295235 e−02,
+7.121713409722980 e−02, +6.785866241065035 e−02,
+6.458254322751886 e−02, +6.139166651287085 e−02,
+5.828416955031769 e−02, +5.526281189874142 e−02,
+5.232565602156542 e−02, +4.947530987083008 e−02,
+4.670976978373095 e−02, +4.403144898585497 e−02,
+4.143827607712719 e−02, +3.893244425578721 e−02,
+3.651180398163022 e−02, +3.417832280408597 e−02,
+3.192976013776998 e−02, +2.976774716313782 e−02,
+2.769013516567754 e−02, +2.569810636390758 e−02,
+2.378944369289586 e−02, +2.196497565730828 e−02,
+2.022259265088492 e−02, +1.856252261671509 e−02,
+1.698293043956028 e−02, +1.548317776486453 e−02,
+1.406194554493180 e−02, +1.271739094059619 e−02,
+1.144924909653903 e−02, +1.025352572459910 e−02,
+9.132141467690603 e−03, +8.076482660383204 e−03,
+7.093814769976364 e−03, +6.160346335510290 e−03,
+5.300044080947794 e−03, +4.327696566833525 e−03,
+0.000000000000000 e+00, +0.000000000000000 e+00,
+0.000000000000000 e+00, +0.000000000000000 e+00,
+0.000000000000000 e+00, +0.000000000000000 e+00,
+0.000000000000000 e+00, +0.000000000000000 e+00,
+0.000000000000000 e+00, +0.000000000000000 e+00,
+0.000000000000000 e+00, +0.000000000000000 e+00,
+0.000000000000000 e+00, +0.000000000000000 e+00,
+0.000000000000000 e+00, +0.000000000000000 e+00,
+0.000000000000000 e+00, +0.000000000000000 e+00,
+0.000000000000000 e+00, +0.000000000000000 e+00,
+0.000000000000000 e+00, +0.000000000000000 e+00,
+0.000000000000000 e+00, +0.000000000000000 e+00,
+0.000000000000000 e+00, +0.000000000000000 e+00,
+0.000000000000000 e+00, +0.000000000000000 e+00,
+0.000000000000000 e+00, +0.000000000000000 e+00,
+0.000000000000000 e+00, +0.000000000000000 e+00,
+0.000000000000000 e+00, +0.000000000000000 e+00,
+0.000000000000000 e+00, +0.000000000000000 e+00,
+0.000000000000000 e+00, +0.000000000000000 e+00,
+0.000000000000000 e+00, +0.000000000000000 e+00,
+0.000000000000000 e+00, +0.000000000000000 e+00,
+0.000000000000000 e+00, +0.000000000000000 e+00,
+0.000000000000000 e+00, +0.000000000000000 e+00,
+0.000000000000000 e+00, +0.000000000000000 e+00,
+0.000000000000000 e+00, +0.000000000000000 e+00,
+0.000000000000000 e+00, +0.000000000000000 e+00,
+0.000000000000000 e+00, +0.000000000000000 e+00,
+0.000000000000000 e+00, +0.000000000000000 e+00,
+0.000000000000000 e+00, +0.000000000000000 e+00,
+0.000000000000000 e+00, +0.000000000000000 e+00,
+0.000000000000000 e+00, +0.000000000000000 e+00,
+0.000000000000000 e+00, +0.000000000000000 e+00,
+0.000000000000000 e+00, +0.000000000000000 e+00,
+0.000000000000000 e+00, +0.000000000000000 e+00,
+0.000000000000000 e+00, +0.000000000000000 e+00,
+0.000000000000000 e+00, +0.000000000000000 e+00,
+0.000000000000000 e+00, +0.000000000000000 e+00,
+0.000000000000000 e+00, +0.000000000000000 e+00,
+0.000000000000000 e+00, +0.000000000000000 e+00,
+0.000000000000000 e+00, +0.000000000000000 e+00,
+0.000000000000000 e+00, +0.000000000000000 e+00,
+0.000000000000000 e+00, +0.000000000000000 e+00,
+0.000000000000000 e+00, +0.000000000000000 e+00,
+0.000000000000000 e+00, +0.000000000000000 e+00,
+0.000000000000000 e+00, +0.000000000000000 e+00,
+0.000000000000000 e+00, +0.000000000000000 e+00,
+0.000000000000000 e+00, +0.000000000000000 e+00,
+0.000000000000000 e+00, +0.000000000000000 e+00,
+0.000000000000000 e+00, +0.000000000000000 e+00,
+0.000000000000000 e+00, +0.000000000000000 e+00,
+0.000000000000000 e+00, +0.000000000000000 e+00,
+0.000000000000000 e+00, +0.000000000000000 e+00,
+0.000000000000000 e+00, +0.000000000000000 e+00,
+0.000000000000000 e+00, +0.000000000000000 e+00,
+0.000000000000000 e+00, +0.000000000000000 e+00,
+0.000000000000000 e+00, +0.000000000000000 e+00,
+0.000000000000000 e+00, +0.000000000000000 e+00,
+0.000000000000000 e+00, +0.000000000000000 e+00,

+0.000000000000000 e+00, +0.000000000000000 e+00, +0.000000000000000 e+00, +0.000000000000000 e+00.

A numerical example of windowing function, for frame size N=960, is herewith provided 1920 samples). As explained above, the last values may be zeros.

+3.235700349233950 e−04, +3.821992968116373 e−04, +4.346763076430269 e−04, +4.841399974556557 e−04, +5.337292962876158 e−04, +5.864735900759105 e−04, +6.428827504324996 e−04, +7.010318350640768 e−04, +7.608344672311270 e−04, +8.240821499679188 e−04, +8.910357994632938 e−04, +9.604008359868557 e−04, +1.032187650884365 e−03, +1.107726421735994 e−03, +1.187132578842487 e−03, +1.269300730654068 e−03, +1.354305556720234 e−03, +1.443403284874795 e−03, +1.536663296357133 e−03, +1.632968062524617 e−03, +1.732380147404573 e−03, +1.836145247521724 e−03, +1.944392065549996 e−03, +2.056125836181849 e−03, +2.171386021601719 e−03, +2.291251920978034 e−03, +2.415808383814314 e−03, +2.544144440874477 e−03, +2.676357471188558 e−03, +2.813551797283812 e−03, +2.955803613263345 e−03, +3.102160324883627 e−03, +3.252661103181324 e−03, +3.408341073385241 e−03, +3.569302917352426 e−03, +3.734713566068289 e−03, +3.904659832213214 e−03, +4.080147004222224 e−03, +4.261212283030981 e−03, +4.446929867132814 e−03, +4.637409387087253 e−03, +4.833793064672789 e−03, +5.036194779738963 e−03, +5.243697651112321 e−03, +5.456361749675164 e−03, +5.675227929566806 e−03, +5.900394401532485 e−03, +6.131014766883671 e−03, +6.367178191275927 e−03, +6.609908124535202 e−03, +6.859253963058476 e−03, +7.114293307371561 e−03, +7.375089966000295 e−03, +7.642693523739984 e−03, +7.917171839712018 e−03, +8.197610411215884 e−03, +8.484065880416487 e−03, +8.777567475206218 e−03, +9.078195201482999 e−03, +9.385078909241503 e−03, +9.698299554301988 e−03, +1.001888876231112 e−02, +1.034691797503113 e−02, +1.068149963936024 e−02, +1.102272421949215 e−02, +1.137165918496004 e−02, +1.172838973544289 e−02, +1.209201783148431 e−02, +1.246260014549782 e−02, +1.284114967210881 e−02, +1.322773320467288 e−02, +1.362147156562462 e−02, +1.402244719763268 e−02, +1.443170227861997 e−02, +1.484928966105225 e−02, +1.527427503031274 e−02, +1.570673344965518 e−02, +1.614774906895406 e−02, +1.659741217225623 e−02, +1.705481769961258 e−02, +1.752003567982498 e−02, +1.799411192217523 e−02, +1.847711280171765 e−02, +1.896812570518296 e−02, +1.946722405557199 e−02, +1.997546609433320 e−02, +2.049290306467406 e−02, +2.101858037652682 e−02, +2.155255505248360 e−02, +2.209589582354997 e−02, +2.264866778978731 e−02, +2.320993080187466 e−02, +2.377971919482778 e−02, +2.435904568934701 e−02, +2.494800748775296 e−02, +2.554578281793083 e−02, +2.615244880416785 e−02, +2.676898100961685 e−02, +2.739542549965559 e−02, +2.803090209537370 e−02, +2.867550388692567 e−02, +2.933029464839461 e−02, +2.999535245144327 e−02, +3.066976865911597 e−02, +3.135358217583060 e−02, +3.204778132642869 e−02, +3.275241094528637 e−02, +3.346657321987338 e−02, +3.419033915994245 e−02, +3.492474656851959 e−02, +3.566984393450434 e−02, +3.642469098112518 e−02, +3.718932683936013 e−02, +3.796477227376223 e−02, +3.875111047720054 e−02, +3.954748420753697 e−02, +4.035395199977597 e−02, +4.117148855800665 e−02, +4.200013716597904 e−02, +4.283901138210502 e−02, +4.368817991890082 e−02, +4.454866443036003 e−02, +4.542050595471842 e−02, +4.630276577789394 e−02, +4.719547798640356 e−02, +4.809965043366945 e−02, +4.901533344583754 e−02, +4.994161943600844 e−02, +5.087856571149934 e−02, +5.182719384692941 e−02, +5.278755308483513 e−02, +5.375872122678868 e−02, +5.474076083738614 e−02, +5.573471840677637 e−02, +5.674064972230924 e−02, +5.775761981233486 e−02, +5.878567633813699 e−02, +5.982584998609648 e−02, +6.087818970335195 e−02, +6.194176167634657 e−02, +6.301659162319866 e−02, +6.410366584958441 e−02, +6.520301218579141 e−02, +6.631369927165530 e−02, +6.743573988811077 e−02, +6.857009288032996 e−02, +6.971680213521406 e−02, +7.087499583595998 e−02, +7.204473108503576 e−02, +7.322699135891000 e−02, +7.442178588912410 e−02, +7.562815385274406 e−02, +7.684615718122945 e−02, +7.807687861830234 e−02, +7.932038618419741 e−02, +8.057572953286415 e−02, +8.184289534616669 e−02, +8.312281225703541 e−02, +8.441550376460240 e−02, +8.572008755967025 e−02, +8.703660776989294 e−02, +8.836603137189772 e−02, +8.970833701278809 e−02, +9.106251913073614 e−02, +9.242858978650852 e−02, +9.380757856153675 e−02, +9.519952848393795 e−02, +9.660349396690321 e−02, +9.801949952722568 e−02, +9.944854075501454 e−02, +1.008906469288751 e−01, +1.023448810132759 e−01, +1.038112769854394 e−01, +1.052908387348570 e−01, +1.067835785257166 e−01, +1.082885168352610 e−01, +1.098056403352340 e−01, +1.113359035023070 e−01, +1.128793060660070 e−01, +1.144348917022365 e−01, +1.160026418427939 e−01, +1.175834766182813 e−01, +1.191773817925584 e−01, +1.207834098631640 e−01, +1.224015773361210 e−01, +1.240328627276697 e−01, +1.256772653276007 e−01, +1.273338065186211 e−01, +1.290025000390856 e−01, +1.306843522870102 e−01, +1.323793987456491 e−01, +1.340867011604515 e−01, +1.358062490065425 e−01, +1.375389612590117 e−01, +1.392848238717889 e−01, +1.410428901194039 e−01, +1.428131506368226 e−01, +1.445965317426731 e−01, +1.463929885103623 e−01, +1.482015069292479 e−01, +1.500220583792976 e−01, +1.518555991923989 e−01, +1.537021065265166 e−01, +1.555605782414143 e−01, +1.574309942903742 e−01, +1.593143180431248 e−01, +1.612105639985474 e−01, +1.631187954209520 e−01, +1.650390046254505 e−01, +1.669721131327860 e−01, +1.689180947901775 e−01, +1.708759773387028 e−01, +1.728457537748600 e−01, +1.748283801430888 e−01, +1.768238156096776 e−01, +1.788310228663131 e−01, +1.808499369342717 e−01, +1.828814674176937 e−01, +1.849255792714432 e−01, +1.869812912624581 e−01, +1.890485613515956 e−01, +1.911282864915418 e−01, +1.932204127989935 e−01, +1.953239376543276 e−01, +1.974388457221676 e−01, +1.995661075971730 e−01, +2.017057139908492 e−01, +2.038566744769371 e−01, +2.060189557031752 e−01, +2.081934824879514 e−01, +2.103802237348733 e−01, +2.125781921411190 e−01, +2.147873518665726 e−01, +2.170086169288035 e−01, +2.192419082234839 e−01, +2.214861559453727 e−01, +2.237412958295601 e−01, +2.260082674736221 e−01, +2.282869811837961 e−01, +2.305763207809758 e−01, +2.328762384864272 e−01, +2.351877543503455 e−01, +2.375108487943784 e−01, +2.398444593573832 e−01, +2.421885165595468 e−01, +2.445439470704063 e−01, +2.469107075411724 e−01, +2.492877833071390 e−01, +2.516751260083683 e−01, +2.540736535206898 e−01, +2.564833108170047 e−01, +2.589030699085996 e−01, +2.613328676927456 e−01, +2.637736050921935 e−01, +2.662251902764728 e−01, +2.686865397612919 e−01, +2.711575593740559 e−01, +2.736391458519503 e−01,

+2.761312410342679 e−01, +2.786328295517739 e−01,
+2.811438338004066 e−01, +2.836651148767941 e−01,
+2.861965981859126 e−01, +2.887372740841138 e−01,
+2.912870864180725 e−01, +2.938469307293017 e−01,
+2.964167262145285 e−01, +2.989954170150198 e−01,
+3.015829286213736 e−01, +3.041801674023100 e−01,
+3.067870538332799 e−01, +3.094025219039914 e−01,
+3.120264728553777 e−01, +3.146597759277349 e−01,
+3.173023310827802 e−01, +3.199530692693200 e−01,
+3.226118955458964 e−01, +3.252796888787393 e−01,
+3.279563545740858 e−01, +3.306408240998973 e−01,
+3.333329987313211 e−01, +3.360337508241129 e−01,
+3.387430081844867 e−01, +3.414597523183469 e−01,
+3.441838955445625 e−01, +3.469162810132548 e−01,
+3.496568059948401 e−01, +3.524044231246164 e−01,
+3.551590444946287 e−01, +3.579215403419018 e−01,
+3.606918060977176 e−01, +3.634687629020059 e−01,
+3.662523018706806 e−01, +3.690432842592497 e−01,
+3.718416007949022 e−01, +3.746461722601965 e−01,
+3.774569030021080 e−01, +3.802746797947738 e−01,
+3.830993933108193 e−01, +3.859299384223780 e−01,
+3.887661993522015 e−01, +3.916090507233831 e−01,
+3.944583955021906 e−01, +3.973131637447736 e−01,
+4.001732470818926 e−01, +4.030394989766596 e−01,
+4.059118059100888 e−01, +4.087890872349265 e−01,
+4.116712207743528 e−01, +4.145590432995318 e−01,
+4.174524354370054 e−01, +4.203503225145663 e−01,
+4.232526082630496 e−01, +4.261601728427663 e−01,
+4.290728957232506 e−01, +4.319896569618181 e−01,
+4.349103424521226 e−01, +4.378358447638693 e−01,
+4.407660763679560 e−01, +4.436999665749521 e−01,
+4.466373809565015 e−01, +4.495791232066263 e−01,
+4.525250566690236 e−01, +4.554741060746665 e−01,
+4.584261742417322 e−01, +4.613821390145840 e−01,
+4.643418692214444 e−01, +4.673042252463159 e−01,
+4.702690556535691 e−01, +4.732372004975696 e−01,
+4.762085675098781 e−01, +4.791821288489955 e−01,
+4.821577734075715 e−01, +4.851363063006593 e−01,
+4.881175853001019 e−01, +4.911005242880451 e−01,
+4.940850327998220 e−01, +4.970720120437943 e−01,
+5.000613277949747 e−01, +5.030518116390311 e−01,
+5.060433154467696 e−01, +5.090367134250039 e−01,
+5.120318927612107 e−01, +5.150277508616620 e−01,
+5.180241439456884 e−01, +5.210218879576217 e−01,
+5.240208300352607 e−01, +5.270198510229556 e−01,
+5.300188492910082 e−01, +5.330187387865785 e−01,
+5.360194223342527 e−01, +5.390197891039044 e−01,
+5.420196856030712 e−01, +5.450199204515231 e−01,
+5.480203984293612 e−01, +5.510201184135838 e−01,
+5.540189939344148 e−01, +5.570178491640744 e−01,
+5.600165101133929 e−01, +5.630138095716375 e−01,
+5.660096045860781 e−01, +5.690047761849362 e−01,
+5.719992058026786 e−01, +5.749917722935854 e−01,
+5.779823098049300 e−01, +5.809716105476772 e−01,
+5.839595278786620 e−01, +5.869449780892492 e−01,
+5.899278766736546 e−01, +5.929091339529038 e−01,
+5.958886225335936 e−01, +5.988651785480291 e−01,
+6.018386614784691 e−01, +6.048099568741729 e−01,
+6.077789763021885 e−01, +6.107446538724647 e−01,
+6.137068698395559 e−01, +6.166664505621099 e−01,
+6.196232440099102 e−01, +6.225761217125432 e−01,
+6.255249461230102 e−01, +6.284705701386001 e−01,
+6.314128591964590 e−01, +6.343506915084997 e−01,
+6.372839411338272 e−01, +6.402134772829997 e−01,
+6.431391659393545 e−01, +6.460598714450869 e−01,
+6.489754897736506 e−01, +6.518869471124649 e−01,
+6.547941354100638 e−01, +6.576959114103553 e−01,

+6.605921398591732 e−01, +6.634836963621389 e−01,
+6.663704870510495 e−01, +6.692514453435826 e−01,
+6.721264409903913 e−01, +6.749962795110787 e−01,
+6.778607807385375 e−01, +6.807187840914061 e−01,
+6.835701860237697 e−01, +6.864159372105746 e−01,
+6.892559431770480 e−01, +6.920890588499607 e−01,
+6.949150680560000 e−01, +6.977346951975620 e−01,
+7.005478826218464 e−01, +7.033537849891354 e−01,
+7.061523680058837 e−01, +7.089444008783498 e−01,
+7.117296915594161 e−01, +7.145070977546192 e−01,
+7.172765338080037 e−01, +7.200389672139186 e−01,
+7.227943349906750 e−01, +7.255415386736762 e−01,
+7.282804177906205 e−01, +7.310117549409422 e−01,
+7.337354140683028 e−01, +7.364503418025881 e−01,
+7.391564587113454 e−01, +7.418546544582220 e−01,
+7.445447900371659 e−01, +7.472257006958800 e−01,
+7.498972580176051 e−01, +7.525603713200814 e−01,
+7.552149563509314 e−01, +7.578599326607545 e−01,
+7.604951971158384 e−01, +7.631216241889446 e−01,
+7.657390988438872 e−01, +7.683465174378752 e−01,
+7.709437746884765 e−01, +7.735317637507610 e−01,
+7.761103909474643 e−01, +7.786785753465276 e−01,
+7.812362247368221 e−01, +7.837842352787271 e−01,
+7.863225078411482 e−01, +7.888499478365373 e−01,
+7.913664452543058 e−01, +7.938728763542381 e−01,
+7.963691608881653 e−01, +7.988542608155023 e−01,
+8.013280948233752 e−01, +8.037915368847273 e−01,
+8.062444700164981 e−01, +8.086857893766403 e−01,
+8.111154166403033 e−01, +8.135342978258457 e−01,
+8.159423410909078 e−01, +8.183384161720055 e−01,
+8.207224042595236 e−01, +8.230952011363564 e−01,
+8.254567363530231 e−01, +8.278059715784122 e−01,
+8.301428451410482 e−01, +8.324682688387346 e−01,
+8.347821132094333 e−01, +8.370832131533167 e−01,
+8.393715063470556 e−01, +8.416480314488108 e−01,
+8.439127501937738 e−01, +8.461645428100565 e−01,
+8.484032850727410 e−01, +8.506298550754564 e−01,
+8.528442051510350 e−01, +8.550453592633493 e−01,
+8.572332837070840 e−01, +8.594088830061699 e−01,
+8.615720389795806 e−01, +8.637216156780773 e−01,
+8.658575289268042 e−01, +8.679807503377460 e−01,
+8.700913260411943 e−01, +8.721883611259660 e−01,
+8.742716585927360 e−01, +8.763417616681772 e−01,
+8.783992457627015 e−01, +8.804446862867205 e−01,
+8.824720518946858 e−01, +8.844895714000796 e−01,
+8.864924067856547 e−01, +8.884810495155143 e−01,
+8.904559910537616 e−01, +8.924176927432972 e−01,
+8.943659231393618 e−01, +8.962997945931150 e−01,
+8.982192307568165 e−01, +9.001249598283012 e−01,
+9.020168984242400 e−01, +9.038941561917321 e−01,
+9.057567533900666 e−01, +9.076056139480890 e−01,
+9.094406951444953 e−01, +9.112609887718295 e−01,
+9.130664170641334 e−01, +9.148578383916375 e−01,
+9.166352766163086 e−01, +9.183979162084582 e−01,
+9.201457654565685 e−01, +9.218796522413809 e−01,
+9.235994678560167 e−01, +9.253041759179184 e−01,
+9.269937646114531 e−01, +9.286692422352107 e−01,
+9.303305869999694 e−01, +9.319767447096182 e−01,
+9.336076279434850 e−01, +9.352241212055423 e−01,
+9.368261950246144 e−01, +9.384129048732400 e−01,
+9.399842532824511 e−01, +9.415411877758678 e−01,
+9.430836933050435 e−01, +9.446107932775473 e−01,
+9.461224797394725 e−01, +9.476197145049868 e−01,
+9.491025238239363 e−01, +9.505699947545118 e−01,
+9.520221006942875 e−01, +9.534597036603291 e−01,
+9.548827789205158 e−01, +9.562904165806793 e−01,
+9.576826318703395 e−01, +9.590603607072891 e−01,

+9.604235518327253 e−01, +9.617711703240024 e−01,
+9.631031827400425 e−01, +9.644205605875820 e−01,
+9.657233714331878 e−01, +9.670107721424878 e−01,
+9.682827690312492 e−01, +9.695402205004198 e−01,
+9.707831348559515 e−01, +9.720106722663890 e−01,
+9.732228900099870 e−01, +9.744207385215033 e−01,
+9.756042291745447 e−01, +9.767724349112544 e−01,
+9.779253363131216 e−01, +9.790638238608151 e−01,
+9.801879015797271 e−01, +9.812966868607661 e−01,
+9.823902028722666 e−01, +9.834693768739560 e−01,
+9.845342107123233 e−01, +9.855837812929384 e−01,
+9.866180804760872 e−01, +9.876380187637696 e−01,
+9.886436665180195 e−01, +9.896342515143703 e−01,
+9.906098638997559 e−01, +9.915714515450228 e−01,
+9.925190128422767 e−01, +9.934516032286224 e−01,
+9.943692859110803 e−01, +9.952731289730088 e−01,
+9.961631909904601 e−01, +9.970385179500313 e−01,
+9.978990898252071 e−01, +9.987458272559335 e−01,
+9.995787919228785 e−01, +1.000397182360297 e+00,
+1.001201041464802 e+00, +1.001991256344717 e+00,
+1.002767847497049 e+00, +1.003529972103569 e+00,
+1.004277707367492 e+00, +1.005012047094235 e+00,
+1.005733043131263 e+00, +1.006439806897506 e+00,
+1.007132401590545 e+00, +1.007811842988376 e+00,
+1.008478224880801 e+00, +1.009130715556477 e+00,
+1.009769355086547 e+00, +1.010395057449511 e+00,
+1.011007859994881 e+00, +1.011606924689628 e+00,
+1.012192316076366 e+00, +1.012765000430642 e+00,
+1.013325049263210 e+00, +1.013871638199171 e+00,
+1.014404818816957 e+00, +1.014925520781073 e+00,
+1.015433826923486 e+00, +1.015928972967257 e+00,
+1.016411066364942 e+00, +1.016881083871244 e+00,
+1.017339099302786 e+00, +1.017784285061100 e+00,
+1.018216717878600 e+00, +1.018637379379835 e+00,
+1.019046362683200 e+00, +1.019442870837515 e+00,
+1.019826975825003 e+00, +1.020199618679535 e+00,
+1.020560853084751 e+00, +1.020909847360410 e+00,
+1.021246684563866 e+00, +1.021572361827679 e+00,
+1.021886975685526 e+00, +1.022189721024281 e+00,
+1.022480682703848 e+00, +1.022760836860466 e+00,
+1.023030287959746 e+00, +1.023288268237906 e+00,
+1.023534888355832 e+00, +1.023771136381063 e+00,
+1.023997104737320 e+00, +1.024211990514308 e+00,
+1.024415875333744 e+00, +1.024609726504572 e+00,
+1.024793642571832 e+00, +1.024966852210664 e+00,
+1.025129444345768 e+00, +1.025282368545871 e+00,
+1.025425713582690 e+00, +1.025558707847599 e+00,
+1.025681449959415 e+00, +1.025794908567991 e+00,
+1.025899187425550 e+00, +1.025993525806572 e+00,
+1.026078042674063 e+00, +1.026153736073730 e+00,
+1.026220725639502 e+00, +1.026278251222302 e+00,
+1.026326400217514 e+00, +1.026366109298213 e+00,
+1.026397475218959 e+00, +1.026419755159132 e+00,
+1.026433063472609 e+00, +1.026438369530571 e+00,
+1.026435753513555 e+00, +1.026424407896423 e+00,
+1.026404414325658 e+00, +1.026376745497183 e+00,
+1.026341529591056 e+00, +1.026298047712657 e+00,
+1.026246413164014 e+00, +1.026187571341079 e+00,
+1.026121618202469 e+00, +1.026047802601159 e+00,
+1.025966259113017 e+00, +1.025878005857533 e+00,
+1.025783163725466 e+00, +1.025680955378961 e+00,
+1.025571464026533 e+00, +1.025455636062312 e+00,
+1.025333580354341 e+00, +1.025204567428491 e+00,
+1.025068712226252 e+00, +1.024926972279997 e+00,
+1.024779424810995 e+00, +1.024625269765159 e+00,
+1.024464619501421 e+00, +1.024298498053110 e+00,
+1.024127035189888 e+00, +1.023949464567318 e+00,
+1.023765888955297 e+00, +1.023577282345944 e+00,
+1.023383771098535 e+00, +1.023184632809730 e+00,
+1.022979990313458 e+00, +1.022770810566653 e+00,
+1.022557186135377 e+00, +1.022338337695996 e+00,
+1.022114387574851 e+00, +1.021886357834243 e+00,
+1.021654354624439 e+00, +1.021417567672874 e+00,
+1.021176074694516 e+00, +1.020930844259280 e+00,
+1.020681994464816 e+00, +1.020428792450358 e+00,
+1.020171385028845 e+00, +1.019910795563718 e+00,
+1.019647124626418 e+00, +1.019379551852598 e+00,
+1.019108176121263 e+00, +1.018834017611273 e+00,
+1.018557222865231 e+00, +1.018277062013127 e+00,
+1.017993662628480 e+00, +1.017708008483692 e+00,
+1.017420178311649 e+00, +1.017129349129694 e+00,
+1.016835630605444 e+00, +1.016540064652456 e+00,
+1.016242782169058 e+00, +1.015943000562828 e+00,
+1.015640812550351 e+00, +1.015337187460531 e+00,
+1.015032211107897 e+00, +1.014725089526348 e+00,
+1.014415991238242 e+00, +1.014106040189062 e+00,
+1.013795318041038 e+00, +1.013482869234993 e+00,
+1.013168810057302 e+00, +1.012854327596526 e+00,
+1.012539547722209 e+00, +1.012223533569952 e+00,
+1.011906384233988 e+00, +1.011589234882839 e+00,
+1.011272160610958 e+00, +1.010954179972212 e+00,
+1.010635428864728 e+00, +1.010317161995333 e+00,
+1.009999611212465 e+00, +1.009681947024951 e+00,
+1.009363573682324 e+00, +1.009044325068028 e+00,
+1.008727479269698 e+00, +1.008418957730006 e+00,
+1.008106691995008 e+00, +1.007763945845098 e+00,
+1.007443035427814 e+00, +1.007268321305087 e+00,
+1.007188313360058 e+00, +1.006980582693088 e+00,
+1.006607718427208 e+00, +1.006220813354843 e+00,
+1.005880191360173 e+00, +1.005548147634276 e+00,
+1.005208505985926 e+00, +1.004870660907557 e+00,
+1.004538945715620 e+00, +1.004211548979837 e+00,
+1.003887307826199 e+00, +1.003565998252022 e+00,
+1.003247928753973 e+00, +1.002933862630671 e+00,
+1.002623715011975 e+00, +1.002316573551338 e+00,
+1.002012456628431 e+00, +1.001712307918128 e+00,
+1.001416118705407 e+00, +1.001122929266782 e+00,
+1.000832736946922 e+00, +1.000546495806722 e+00,
+1.000264200804259 e+00, +9.999848879324513 e−01,
+9.997085530666436 e−01, +9.994361518334981 e−01,
+9.991676778789439 e−01, +9.989021630276661 e−01,
+9.986396025239043 e−01, +9.983809548686250 e−01,
+9.981262129964925 e−01, +9.978744044020248 e−01,
+9.976255227380388 e−01, +9.973805277659410 e−01,
+9.971394126637049 e−01, +9.969012039797195 e−01,
+9.966658933095314 e−01, +9.964344374346332 e−01,
+9.962068296990753 e−01, +9.959820998119757 e−01,
+9.957602381261346 e−01, +9.955421958422669 e−01,
+9.953279652235180 e−01, +9.951165794460692 e−01,
+9.949080290979398 e−01, +9.947032622296315 e−01,
+9.945022689695088 e−01, +9.943040815876473 e−01,
+9.941086912851109 e−01, +9.939170480434331 e−01,
+9.937291405239381 e−01, +9.935439962464298 e−01,
+9.933616056210112 e−01, +9.931829218182915 e−01,
+9.930079338821240 e−01, +9.928356667510468 e−01,
+9.926661086172732 e−01, +9.925002110373203 e−01,
+9.923379640068731 e−01, +9.921783957486814 e−01,
+9.920214929714285 e−01, +9.918682011153984 e−01,
+9.917185094982703 e−01, +9.915714511212392 e−01,
+9.914270132578689 e−01, +9.912861375369392 e−01,
+9.911488111762619 e−01, +9.910140670228395 e−01,
+9.908818932025615 e−01, +9.907532330064230 e−01,
+9.906280727376265 e−01, +9.905054418160028 e−01,
+9.903853272281469 e−01, +9.902686735168059 e−01,

+9.901554680972392 e−01, +9.900447411363362 e−01,
+9.899364775767996 e−01, +9.898316173651273 e−01,
+9.897301484429727 e−01, +9.896311064950427 e−01,
+9.895344764114521 e−01, +9.894411924684042 e−01,
+9.893512408407925 e−01, +9.892636595590807 e−01,
+9.891784350480575 e−01, +9.890965020344753 e−01,
+9.890178449763316 e−01, +9.889414982259392 e−01,
+9.888674481881904 e−01, +9.887966331854001 e−01,
+9.887290383256132 e−01, +9.886636955343167 e−01,
+9.886005893838439 e−01, +9.885406571815547 e−01,
+9.884838850803949 e−01, +9.884293079255704 e−01,
+9.883769097708243 e−01, +9.883276240055705 e−01,
+9.882814356355465 e−01, +9.882373812607220 e−01,
+9.881954463086439 e−01, +9.881565649335834 e−01,
+9.881207205644380 e−01, +9.880869460773882 e−01,
+9.880552270464479 e−01, +9.880265015932943 e−01,
+9.880007538329854 e−01, +9.879770139187286 e−01,
+9.879552655810734 e−01, +9.879364462155417 e−01,
+9.879205412712961 e−01, +9.879065840760606 e−01,
+9.878945575956836 e−01, +9.878853946070033 e−01,
+9.878790797412935 e−01, +9.878746493979034 e−01,
+9.878720878008731 e−01, +9.878723269672057 e−01,
+9.878753499522159 e−01, +9.878801909638151 e−01,
+9.878868346314371 e−01, +9.878962158879177 e−01,
+9.879083181018892 e−01, +9.879221731254697 e−01,
+9.879377642109470 e−01, +9.879560260604132 e−01,
+9.879769430009732 e−01, +9.879995488718708 e−01,
+9.880238263660437 e−01, +9.880507071322525 e−01,
+9.880801746803725 e−01, +9.881112643600719 e−01,
+9.881439599864610 e−01, +9.881791937541983 e−01,
+9.882169477221827 e−01, +9.882562539746005 e−01,
+9.882970966792446 e−01, +9.883404119215459 e−01,
+9.883861819949297 e−01, +9.884334355024147 e−01,
+9.884821553014376 e−01, +9.885332784979397 e−01,
+9.885867883714737 e−01, +9.886417143055318 e−01,
+9.886980383296721 e−01, +9.887566952073135 e−01,
+9.888176678250945 e−01, +9.888799871475064 e−01,
+9.889436358294569 e−01, +9.890095481884937 e−01,
+9.890777059811048 e−01, +9.891471384894399 e−01,
+9.892178286528791 e−01, +9.892907129712469 e−01,
+9.893657732439902 e−01, +9.894420366217603 e−01,
+9.895194850020712 e−01, +9.895990550550585 e−01,
+9.896807293945533 e−01, +9.897635364818964 e−01,
+9.898474573387898 e−01, +9.899334256730253 e−01,
+9.900214239316713 e−01, +9.901104832002432 e−01,
+9.902005849312988 e−01, +9.902926609798792 e−01,
+9.903866926546286 e−01, +9.904817107571495 e−01,
+9.905776973966729 e−01, +9.906755858999687 e−01,
+9.907753570146928 e−01, +9.908760390079692 e−01,
+9.909776136318341 e−01, +9.910810160568396 e−01,
+9.911862274458985 e−01, +9.912922749689899 e−01,
+9.913991395528559 e−01, +9.915077559112314 e−01,
+9.916181054602099 e−01, +9.917292162715997 e−01,
+9.918410691314309 e−01, +9.919545975686356 e−01,
+9.920697824274926 e−01, +9.921856518839308 e−01,
+9.923021872317422 e−01, +9.924203228138201 e−01,
+9.925400387231874 e−01, +9.926603609120486 e−01,
+9.927812708898945 e−01, +9.929037056012008 e−01,
+9.930276450366935 e−01, +9.931521123405382 e−01,
+9.932770885572193 e−01, +9.934035125599263 e−01,
+9.935313647282036 e−01, +9.936596669792295 e−01,
+9.937883997783191 e−01, +9.939185021388579 e−01,
+9.940499546103031 e−01, +9.941817792665538 e−01,
+9.943139564620480 e−01, +9.944474248344178 e−01,
+9.945821646067609 e−01, +9.947171976098198 e−01,
+9.948525044676624 e−01, +9.949890245456261 e−01,
+9.951267376194471 e−01, +9.952646639522682 e−01,
+9.954027843196593 e−01, +9.955420399208714 e−01,
+9.956824104013806 e−01, +9.958229139376651 e−01,
+9.959635310797721 e−01, +9.961052046849509 e−01,
+9.962479146150113 e−01, +9.963906777760744 e−01,
+9.965334742957022 e−01, +9.966772475112751 e−01,
+9.968219775371954 e−01, +9.969666812541205 e−01,
+9.971113385049125 e−01, +9.972568921184832 e−01,
+9.974033222384361 e−01, +9.975496462958124 e−01,
+9.976958440808505 e−01, +9.978428577721199 e−01,
+9.979906675056988 e−01, +9.981382913210521 e−01,
+9.982857084011294 e−01, +9.984338592613343 e−01,
+9.985827266667445 e−01, +9.987313348873088 e−01,
+9.988796523949821 e−01, +9.990285947364306 e−01,
+9.991781850354060 e−01, +9.993275431378141 e−01,
+9.994764863008044 e−01, +9.996255698609559 e−01,
+9.997753812452573 e−01, +9.999265078806980 e−01,
+1.000073497520791 e+00, +1.000224669219663 e+00,
+1.000374570389487 e+00, +1.000523787909342 e+00,
+1.000672909364706 e+00, +1.000822490899924 e+00,
+1.000972349809292 e+00, +1.001121604191588 e+00,
+1.001270276668384 e+00, +1.001419284847822 e+00,
+1.001568597382930 e+00, +1.001717235441161 e+00,
+1.001865181102795 e+00, +1.002013378040221 e+00,
+1.002161805549920 e+00, +1.002309477314975 e+00,
+1.002456372686098 e+00, +1.002603438051255 e+00,
+1.002750653220044 e+00, +1.002897030034197 e+00,
+1.003042547763044 e+00, +1.003188154489387 e+00,
+1.003333829980590 e+00, +1.003478584306210 e+00,
+1.003622396620552 e+00, +1.003766216551067 e+00,
+1.003910024058434 e+00, +1.004052828034629 e+00,
+1.004194607298016 e+00, +1.004336312014269 e+00,
+1.004477922478776 e+00, +1.004618447680436 e+00,
+1.004757866142788 e+00, +1.004897127367124 e+00,
+1.005036211788027 e+00, +1.005174129339999 e+00,
+1.005310858606722 e+00, +1.005447348229275 e+00,
+1.005583578404365 e+00, +1.005718559516336 e+00,
+1.005852270535212 e+00, +1.005985660340410 e+00,
+1.006118708775473 e+00, +1.006250425365265 e+00,
+1.006380789350186 e+00, +1.006510750945005 e+00,
+1.006640290029854 e+00, +1.006768414896740 e+00,
+1.006895104560895 e+00, +1.007021310029137 e+00,
+1.007147011697879 e+00, +1.007271218063607 e+00,
+1.007393907701933 e+00, +1.007516030573849 e+00,
+1.007637567482182 e+00, +1.007757528772291 e+00,
+1.007875893086371 e+00, +1.007993608628118 e+00,
+1.008110655922241 e+00, +1.008226046614216 e+00,
+1.008339760080372 e+00, +1.008452744553207 e+00,
+1.008564979989454 e+00, +1.008675477014256 e+00,
+1.008784215564761 e+00, +1.008892145905632 e+00,
+1.008999248092397 e+00, +1.009104530964226 e+00,
+1.009207974189350 e+00, +1.009310529294049 e+00,
+1.009412177137242 e+00, +1.009511926856510 e+00,
+1.009609757696156 e+00, +1.009706620067364 e+00,
+1.009802495163920 e+00, +1.009896393940608 e+00,
+1.009988296223056 e+00, +1.010079151649770 e+00,
+1.010168940724606 e+00, +1.010256673981368 e+00,
+1.010342332426681 e+00, +1.010426868280804 e+00,
+1.010510261597171 e+00, +1.010591519577714 e+00,
+1.010670623429633 e+00, +1.010748529051234 e+00,
+1.010825217388920 e+00, +1.010899693712359 e+00,
+1.010971938438940 e+00, +1.011042907905867 e+00,
+1.011112584131909 e+00, +1.011179974034890 e+00,
+1.011245058042453 e+00, +1.011308790830468 e+00,
+1.011371154144579 e+00, +1.011431156159085 e+00,
+1.011488778523215 e+00, +1.011544976893053 e+00,
+1.011599732403024 e+00, +1.011652051214875 e+00,
+1.011701915457469 e+00, +1.011750283661017 e+00,

+1.011797137846246 e+00, +1.011841483052088 e+00,
+1.011883300488277 e+00, +1.011923548068040 e+00,
+1.011962209203063 e+00, +1.011998292246508 e+00,
+1.012031778271071 e+00, +1.012063621581602 e+00,
+1.012093805289032 e+00, +1.012121340917460 e+00,
+1.012146211141323 e+00, +1.012169370028522 e+00,
+1.012190799612422 e+00, +1.012209509774826 e+00,
+1.012225484155619 e+00, +1.012239680217839 e+00,
+1.012252080651208 e+00, +1.012261693287047 e+00,
+1.012268500924551 e+00, +1.012273461473019 e+00,
+1.012276559127865 e+00, +1.012276804202582 e+00,
+1.012274179329824 e+00, +1.012269639581679 e+00,
+1.012263168844414 e+00, +1.012253779830287 e+00,
+1.012241456954404 e+00, +1.012227156156870 e+00,
+1.012210860152664 e+00, +1.012191578747083 e+00,
+1.012169297374220 e+00, +1.012144976732521 e+00,
+1.012118600449884 e+00, +1.012089175409008 e+00,
+1.012056685871527 e+00, +1.012022093240567 e+00,
+1.011985383173782 e+00, +1.011945565763788 e+00,
+1.011902624776521 e+00, +1.011857517445845 e+00,
+1.011810229432951 e+00, +1.011759775156899 e+00,
+1.011706140218275 e+00, +1.011650280893217 e+00,
+1.011592181601430 e+00, +1.011530855573595 e+00,
+1.011466289818154 e+00, +1.011399444375047 e+00,
+1.011330304370585 e+00, +1.011257880752579 e+00,
+1.011182159707019 e+00, +1.011104101993156 e+00,
+1.011023694799342 e+00, +1.010939952356944 e+00,
+1.010852860445419 e+00, +1.010763375755366 e+00,
+1.010671485695127 e+00, +1.010576209154936 e+00,
+1.010477533938561 e+00, +1.010376415807060 e+00,
+1.010272840810986 e+00, +1.010165826445586 e+00,
+1.010055362601328 e+00, +1.009942410277932 e+00,
+1.009826955798404 e+00, +1.009708012131765 e+00,
+1.009585568925891 e+00, +1.009460591235290 e+00,
+1.009333067695896 e+00, +1.009202011723081 e+00,
+1.009067412134881 e+00, +1.008930231993351 e+00,
+1.008790461334113 e+00, +1.008647118373303 e+00,
+1.008500193172393 e+00, +1.008350646299744 e+00,
+1.008198467170796 e+00, +1.008042675572153 e+00,
+1.007883264022713 e+00, +1.007721196075366 e+00,
+1.007556460824166 e+00, +1.007388074720253 e+00,
+1.007216031301935 e+00, +1.007041299348476 e+00,
+1.006863869718207 e+00, +1.006682757156533 e+00,
+1.006497954572682 e+00, +1.006310431304003 e+00,
+1.006120180721864 e+00, +1.005926221917719 e+00,
+1.005728547752975 e+00, +1.005528123164754 e+00,
+1.005324942594936 e+00, +1.005118031770913 e+00,
+1.004907385380564 e+00, +1.004693965144879 e+00,
+1.004477765157871 e+00, +1.004257813991292 e+00,
+1.004034108834670 e+00, +1.003807613226332 e+00,
+1.003578321293819 e+00, +1.003345260144698 e+00,
+1.003108428405854 e+00, +1.002868793771428 e+00,
+1.002626351889911 e+00, +1.002380128823734 e+00,
+1.002130123378852 e+00, +1.001877304672605 e+00,
+1.001621670689409 e+00, +1.001362250678481 e+00,
+1.001099043542970 e+00, +1.000833015458249 e+00,
+1.000564166270619 e+00, +1.000291531899435 e+00,
+1.000015112295927 e+00, +9.997358689793686 e−01,
+9.994538026878185 e−01, +9.991679559269192 e−01,
+9.988783302889642 e−01, +9.985858838509232 e−01,
+9.982906190683758 e−01, +9.979915852192069 e−01,
+9.976887805584920 e−01, +9.973831508544119 e−01,
+9.970747197397686 e−01, +9.967625861356061 e−01,
+9.964466729061831 e−01, +9.961277448216609 e−01,
+9.958061137774057 e−01, +9.954815632236269 e−01,
+9.951529474418550 e−01, +9.948184819816882 e−01,
+9.944824644674363 e−01, +9.941541831614942 e−01,
+9.938176459160070 e−01, +9.934356569036324 e−01,
+9.930678080460911 e−01, +9.928629897063861 e−01,
+9.920151198036643 e−01, +9.914646039976289 e−01,
+9.910580786225461 e−01, +9.906661670997940 e−01,
+9.902352352689523 e−01, +9.897945722571376 e−01,
+9.893565433952757 e−01, +9.889131869680553 e−01,
+9.884611897966706 e−01, +9.880027035297985 e−01,
+9.875383274623817 e−01, +9.870669099030384 e−01,
+9.865881954382273 e−01, +9.861028679251979 e−01,
+9.856108490726415 e−01, +9.851112908058255 e−01,
+9.846041087188396 e−01, +9.840899793789135 e−01,
+9.835687475691413 e−01, +9.830394337851477 e−01,
+9.825019919189980 e−01, +9.819573015637479 e−01,
+9.814052410296346 e−01, +9.808446911100914 e−01,
+9.802755449178991 e−01, +9.796987091039431 e−01,
+9.791141208337264 e−01, +9.785207439579823 e−01,
+9.779184677896273 e−01, +9.773081082723492 e−01,
+9.766895349125904 e−01, +9.760616740194450 e−01,
+9.754244530504396 e−01, +9.747787966745514 e−01,
+9.741245958128935 e−01, +9.734607083730100 e−01,
+9.727870063627455 e−01, +9.721043782586516 e−01,
+9.714127339971064 e−01, +9.707110047334955 e−01,
+9.699991325531057 e−01, +9.692780666596675 e−01,
+9.685476898124051 e−01, +9.678068213341131 e−01,
+9.670553568518259 e−01, +9.662942694162036 e−01,
+9.655234943873926 e−01, +9.647419268609606 e−01,
+9.639494801526087 e−01, +9.631470850364502 e−01,
+9.623346145023939 e−01, +9.615108868233452 e−01,
+9.606758082762421 e−01, +9.598303722906686 e−01,
+9.589744979972803 e−01, +9.581070287387355 e−01,
+9.572278607616873 e−01, +9.563379453266456 e−01,
+9.554372064329766 e−01, +9.545245399941635 e−01,
+9.535998779685757 e−01, +9.526641870716750 e−01,
+9.517173763138073 e−01, +9.507582991859514 e−01,
+9.497868942084339 e−01, +9.488041830577462 e−01,
+9.478100888078225 e−01, +9.468034353946915 e−01,
+9.457841175975197 e−01, +9.447531037006662 e−01,
+9.437103240778304 e−01, +9.426546695512183 e−01,
+9.415860667090934 e−01, +9.405054771915659 e−01,
+9.394128066604807 e−01, +9.383069072240268 e−01,
+9.371877218082764 e−01, +9.360562830727714 e−01,
+9.349125451819119 e−01, +9.337553821450042 e−01,
+9.325847195259637 e−01, +9.314015363873052 e−01,
+9.302057763482381 e−01, +9.289963473252155 e−01,
+9.277732047659371 e−01, +9.265373496318979 e−01,
+9.252887007804731 e−01, +9.240260966323954 e−01,
+9.227494594741956 e−01, +9.214597964334704 e−01,
+9.201570566323493 e−01, +9.188401295674291 e−01,
+9.175089523148627 e−01, +9.161645099567182 e−01,
+9.148067377557750 e−01, +9.134345222358713 e−01,
+9.120478227747287 e−01, +9.106476709258303 e−01,
+9.092340339068899 e−01, +9.078058138594686 e−01,
+9.063629680720371 e−01, +9.049065091670875 e−01,
+9.034363889945074 e−01, +9.019514987490371 e−01,
+9.004517876609461 e−01, +8.989382633487150 e−01,
+8.974108808873397 e−01, +8.958685426521079 e−01,
+8.943112058133614 e−01, +8.927398817643528 e−01,
+8.911545160393349 e−01, +8.895539896413210 e−01,
+8.879382683346716 e−01, +8.863084022826353 e−01,
+8.846643687806315 e−01, +8.830050715882986 e−01,
+8.813304835012828 e−01, +8.796416466159852 e−01,
+8.779385355821995 e−01, +8.762200577776852 e−01,
+8.744861938961381 e−01, +8.727379973888942 e−01,
+8.709754415944566 e−01, +8.691974194090119 e−01,
+8.674038889082810 e−01, +8.655958747817611 e−01,
+8.637733542642025 e−01, +8.619352566808824 e−01,
+8.600815675121538 e−01, +8.582133280699462 e−01,

+8.563305243162549 e−01, +8.544320869868485 e−01,
+8.525180054943617 e−01, +8.505893287555129 e−01,
+8.486460694867924 e−01, +8.466872027543964 e−01,
+8.447127297770400 e−01, +8.427236779556280 e−01,
+8.407200377231397 e−01, +8.387007637143141 e−01,
+8.366658636487900 e−01, +8.346163977407922 e−01,
+8.325523768291012 e−01, +8.304727614321823 e−01,
+8.283775428310826 e−01, +8.262677444285360 e−01,
+8.241433705663960 e−01, +8.220034073785601 e−01,
+8.198478927378535 e−01, +8.176779138137669 e−01,
+8.154934833957916 e−01, +8.132935411236417 e−01,
+8.110781042287996 e−01, +8.088482692756163 e−01,
+8.066040997239516 e−01, +8.043446229495154 e−01,
+8.020698771287099 e−01, +7.997809105802602 e−01,
+7.974777203962242 e−01, +7.951592558139738 e−01,
+7.928255537687610 e−01, +7.904777397235739 e−01,
+7.881159103734087 e−01, +7.857391245481645 e−01,
+7.833473203720548 e−01, +7.809413293257642 e−01,
+7.785212684545030 e−01, +7.760865347057494 e−01,
+7.736372881515523 e−01, +7.711744403395434 e−01,
+7.686979147929021 e−01, +7.662066652369949 e−01,
+7.637008160854790 e−01, +7.611816536232692 e−01,
+7.586492915456966 e−01, +7.561026668755407 e−01,
+7.535417845985437 e−01, +7.509677253608117 e−01,
+7.483805701761127 e−01, +7.457793976748408 e−01,
+7.431642988739133 e−01, +7.405363749469933 e−01,
+7.378956733994703 e−01, +7.352411918301537 e−01,
+7.325730245135402 e−01, +7.298923618910717 e−01,
+7.271993327965579 e−01, +7.244930008228270 e−01,
+7.217734421626190 e−01, +7.190417491579090 e−01,
+7.162980305440977 e−01, +7.135414111237446 e−01,
+7.107720243445051 e−01, +7.079910089690906 e−01,
+7.051984432364411 e−01, +7.023933467824965 e−01,
+6.995757887359807 e−01, +6.967468908559541 e−01,
+6.939067884621855 e−01, +6.910546259244099 e−01,
+6.881904964956265 e−01, +6.853154435187701 e−01,
+6.824295471401947 e−01, +6.795319276046549 e−01,
+6.766227310314311 e−01, +6.737031265887281 e−01,
+6.707732585543063 e−01, +6.678322438578169 e−01,
+6.648801659515325 e−01, +6.619180818581655 e−01,
+6.589461833521619 e−01, +6.559637902883004 e−01,
+6.529710426495826 e−01, +6.499688969386536 e−01,
+6.469573547411541 e−01, +6.439354791990427 e−01,
+6.409035288603075 e−01, +6.378629377753962 e−01,
+6.348137437689479 e−01, +6.317545972986219 e−01,
+6.286855280775698 e−01, +6.256079561741540 e−01,
+6.225221695832768 e−01, +6.194273058858271 e−01,
+6.163234711851669 e−01, +6.132117491461520 e−01,
+6.100922809170846 e−01, +6.069642650584504 e−01,
+6.038278760531646 e−01, +6.006842631336996 e−01,
+5.975336059686350 e−01, +5.943751066904921 e−01,
+5.912087588215279 e−01, +5.880353659529035 e−01,
+5.848551837605717 e−01, +5.816678990293079 e−01,
+5.784735261655043 e−01, +5.752724325989095 e−01,
+5.720650011081139 e−01, +5.688516144717076 e−01,
+5.656282061898663 e−01, +5.624031153715552 e−01,
+5.591715220043816 e−01, +5.559338788791430 e−01,
+5.526906296747757 e−01, +5.494421930334449 e−01,
+5.461886187066721 e−01, +5.429296335729603 e−01,
+5.396656057073835 e−01, +5.363974990167699 e−01,
+5.331253296256703 e−01, +5.298481989939661 e−01,
+5.265662376610855 e−01, +5.232805923025862 e−01,
+5.199914838946222 e−01, +5.166982164701727 e−01,
+5.134010079652577 e−01, +5.101009713211846 e−01,
+5.067981651483114 e−01, +5.034916218473716 e−01,
+5.001816735886107 e−01, +4.968699258080247 e−01,
+4.935565059779667 e−01, +4.902400722563398 e−01,
+4.869206550924504 e−01, +4.835996679580279 e−01,
+4.802774381791762 e−01, +4.769531954412434 e−01,
+4.736270399539189 e−01, +4.702999408508168 e−01,
+4.669720784607305 e−01, +4.636428606356920 e−01,
+4.603125364998776 e−01, +4.569821724233974 e−01,
+4.536519115376573 e−01, +4.503209953849403 e−01,
+4.469896264032189 e−01, +4.436589520558524 e−01,
+4.403291677455351 e−01, +4.369995283852560 e−01,
+4.336702110092919 e−01, +4.303423032287362 e−01,
+4.270159791313206 e−01, +4.236905139305585 e−01,
+4.203661194857656 e−01, +4.170439288466521 e−01,
+4.137241358370239 e−01, +4.104060097514602 e−01,
+4.070897555089031 e−01, +4.037764981593507 e−01,
+4.004664107465299 e−01, +3.971587296380776 e−01,
+3.938536636599421 e−01, +3.905523798917074 e−01,
+3.872550507871729 e−01, +3.839608678121244 e−01,
+3.806700467713708 e−01, +3.773838145590149 e−01,
+3.741023650337649 e−01, +3.708248707285573 e−01,
+3.675515053070522 e−01, +3.642834353302138 e−01,
+3.610208992409523 e−01, +3.577632145496031 e−01,
+3.545105744959446 e−01, +3.512640341612003 e−01,
+3.480236943438447 e−01, +3.447887254766508 e−01,
+3.415594491122957 e−01, +3.383373171891836 e−01,
+3.351225758795442 e−01, +3.319142610233081 e−01,
+3.287122759768420 e−01, +3.255174149216469 e−01,
+3.223300837378850 e−01, +3.191502945992604 e−01,
+3.159783340225497 e−01, +3.128147301790672 e−01,
+3.096594366002203 e−01, +3.065118829951374 e−01,
+3.033724163096057 e−01, +3.002422624347096 e−01,
+2.971215837581699 e−01, +2.940094940665994 e−01,
+2.909060968951387 e−01, +2.878124834032541 e−01,
+2.847288683996017 e−01, +2.816545966307170 e−01,
+2.785898831431842 e−01, +2.755357983580602 e−01,
+2.724924992373132 e−01, +2.694592444601876 e−01,
+2.664361954971699 e−01, +2.634244029834191 e−01,
+2.604240268886862 e−01, +2.574343504718905 e−01,
+2.544555518459914 e−01, +2.514886909115458 e−01,
+2.485339317782194 e−01, +2.455905549948218 e−01,
+2.426587307354937 e−01, +2.397395063360460 e−01,
+2.368330357314138 e−01, +2.339385917103926 e−01,
+2.310563352467077 e−01, +2.281873038963940 e−01,
+2.253316454409216 e−01, +2.224886282863191 e−01,
+2.196584073367104 e−01, +2.168420127437019 e−01,
+2.140395864128403 e−01, +2.112503945704412 e−01,
+2.084745870335015 e−01, +2.057131843889434 e−01,
+2.029663241873446 e−01, +2.002332724591127 e−01,
+1.975141729701546 e−01, +1.948100372792062 e−01,
+1.921209969418309 e−01, +1.894463139881238 e−01,
+1.867861307455174 e−01, +1.841414579810843 e−01,
+1.815124204803960 e−01, +1.788982688766118 e−01,
+1.762991374092110 e−01, +1.737160334143236 e−01,
+1.711490837149136 e−01, +1.685975427109672 e−01,
+1.660615404766350 e−01, +1.635420747284597 e−01,
+1.610392647455030 e−01, +1.585523606699242 e−01,
+1.560814882692011 e−01, +1.536276387455411 e−01,
+1.511909278215991 e−01, +1.487706056453130 e−01,
+1.463667950599714 e−01, +1.439804830586271 e−01,
+1.416117840041388 e−01, +1.392599476606263 e−01,
+1.369250939274206 e−01, +1.346082041944543 e−01,
+1.323093893293406 e−01, +1.300278987264480 e−01,
+1.277638491717384 e−01, +1.255182155111709 e−01,
+1.232911060463692 e−01, +1.210817706513393 e−01,
+1.188903216873087 e−01, +1.167177275528689 e−01,
+1.145640946398680 e−01, +1.124286726877977 e−01,
+1.103115703218860 e−01, +1.082137493008784 e−01,
+1.061353122093495 e−01, +1.040755094642518 e−01,
+1.020344462904939 e−01, +1.000130754353283 e−01,

+9.801149609996949 e−02, +9.602895962715033 e−02,
+9.406556557413213 e−02, +9.212225718017839 e−02,
+9.019912955294541 e−02, +8.829543394466111 e−02,
+8.641126446867767 e−02, +8.454755261333674 e−02,
+8.270438757849537 e−02, +8.088102201374671 e−02,
+7.907754246044904 e−02, +7.729486433686708 e−02,
+7.553307095292439 e−02, +7.379141728818767 e−02,
+7.206998099643694 e−02, +7.036965903891536 e−02,
+6.869052561376873 e−02, +6.703183558090599 e−02,
+6.539365708843246 e−02, +6.377686761792192 e−02,
+6.218153160076208 e−02, +6.060690353708294 e−02,
+5.905303920289844 e−02, +5.752079270262547 e−02,
+5.601021629546108 e−02, +5.452056276526779 e−02,
+5.305187265543028 e−02, +5.160497192770200 e−02,
+5.017990065949564 e−02, +4.877591488398978 e−02,
+4.739303765878024 e−02, +4.603205697395506 e−02,
+4.469299727922284 e−02, +4.337512126408456 e−02,
+4.207843336193631 e−02, +4.080367800167834 e−02,
+3.955086170148164 e−02, +3.831925359021936 e−02,
+3.710883802024247 e−02, +3.592031377191350 e−02,
+3.475367083924110 e−02, +3.360819061792393 e−02,
+3.248382426594506 e−02, +3.138119240391853 e−02,
+3.030027537135876 e−02, +2.924041340892334 e−02,
+2.820153617857359 e−02, +2.718416076819826 e−02,
+2.618823091914950 e−02, +2.521312012928253 e−02,
+2.425872983336824 e−02, +2.332548569166988 e−02,
+2.241332520509764 e−02, +2.152170070657781 e−02,
+2.065047207339204 e−02, +1.979990274080047 e−02,
+1.896992105664513 e−02, +1.816012507709582 e−02,
+1.737032543754079 e−02, +1.660053693426305 e−02,
+1.585068068878849 e−02, +1.512059554489944 e−02,
+1.441002712765956 e−02, +1.371861264850595 e−02,
+1.304629624757017 e−02, +1.239334766429038 e−02,
+1.175941174949483 e−02, +1.114348079271000 e−02,
+1.054549096241532 e−02, +9.966369456231951 e−03,
+9.405876078723861 e−03, +8.862485552559351 e−03,
+8.334801852513261 e−03, +7.821914540064593 e−03,
+7.329085750247891 e−03, +6.866427280374203 e−03,
+6.407912160580299 e−03, +5.896299968476348 e−03,
+5.431884551945897 e−03, +5.251971150005845 e−03,
+4.914753459788713 e−03, +3.326211257672788 e−03,
+0.000000000000000 e+00, +0.000000000000000 e+00,
+0.000000000000000 e+00, +0.000000000000000 e+00,
+0.000000000000000 e+00, +0.000000000000000 e+00,
+0.000000000000000 e+00, +0.000000000000000 e+00,
+0.000000000000000 e+00, +0.000000000000000 e+00,
+0.000000000000000 e+00, +0.000000000000000 e+00,
+0.000000000000000 e+00, +0.000000000000000 e+00,
+0.000000000000000 e+00, +0.000000000000000 e+00,
+0.000000000000000 e+00, +0.000000000000000 e+00,
+0.000000000000000 e+00, +0.000000000000000 e+00,
+0.000000000000000 e+00, +0.000000000000000 e+00,
+0.000000000000000 e+00, +0.000000000000000 e+00,
+0.000000000000000 e+00, +0.000000000000000 e+00,
+0.000000000000000 e+00, +0.000000000000000 e+00,
+0.000000000000000 e+00, +0.000000000000000 e+00,
+0.000000000000000 e+00, +0.000000000000000 e+00,
+0.000000000000000 e+00, +0.000000000000000 e+00,
+0.000000000000000 e+00, +0.000000000000000 e+00,
+0.000000000000000 e+00, +0.000000000000000 e+00,
+0.000000000000000 e+00, +0.000000000000000 e+00,
+0.000000000000000 e+00, +0.000000000000000 e+00,
+0.000000000000000 e+00, +0.000000000000000 e+00,
+0.000000000000000 e+00, +0.000000000000000 e+00,
+0.000000000000000 e+00, +0.000000000000000 e+00,
+0.000000000000000 e+00, +0.000000000000000 e+00,
+0.000000000000000 e+00, +0.000000000000000 e+00,
+0.000000000000000 e+00, +0.000000000000000 e+00,
+0.000000000000000 e+00, +0.000000000000000 e+00,
+0.000000000000000 e+00, +0.000000000000000 e+00,
+0.000000000000000 e+00, +0.000000000000000 e+00,
+0.000000000000000 e+00, +0.000000000000000 e+00,
+0.000000000000000 e+00, +0.000000000000000 e+00,
+0.000000000000000 e+00, +0.000000000000000 e+00,
+0.000000000000000 e+00, +0.000000000000000 e+00,
+0.000000000000000 e+00, +0.000000000000000 e+00,
+0.000000000000000 e+00, +0.000000000000000 e+00,
+0.000000000000000 e+00, +0.000000000000000 e+00,
+0.000000000000000 e+00, +0.000000000000000 e+00,
+0.000000000000000 e+00, +0.000000000000000 e+00,
+0.000000000000000 e+00, +0.000000000000000 e+00,
+0.000000000000000 e+00, +0.000000000000000 e+00,
+0.000000000000000 e+00, +0.000000000000000 e+00,
+0.000000000000000 e+00, +0.000000000000000 e+00,
+0.000000000000000 e+00, +0.000000000000000 e+00,
+0.000000000000000 e+00, +0.000000000000000 e+00,
+0.000000000000000 e+00, +0.000000000000000 e+00,
+0.000000000000000 e+00, +0.000000000000000 e+00,
+0.000000000000000 e+00, +0.000000000000000 e+00,
+0.000000000000000 e+00, +0.000000000000000 e+00,
+0.000000000000000 e+00, +0.000000000000000 e+00,
+0.000000000000000 e+00, +0.000000000000000 e+00,
+0.000000000000000 e+00, +0.000000000000000 e+00,
+0.000000000000000 e+00, +0.000000000000000 e+00,
+0.000000000000000 e+00, +0.000000000000000 e+00,
+0.000000000000000 e+00, +0.000000000000000 e+00,
+0.000000000000000 e+00, +0.000000000000000 e+00,
+0.000000000000000 e+00, +0.000000000000000 e+00,
+0.000000000000000 e+00, +0.000000000000000 e+00,
+0.000000000000000 e+00, +0.000000000000000 e+00,
+0.000000000000000 e+00, +0.000000000000000 e+00,
+0.000000000000000 e+00, +0.000000000000000 e+00,
+0.000000000000000 e+00, +0.000000000000000 e+00,
+0.000000000000000 e+00, +0.000000000000000 e+00,
+0.000000000000000 e+00, +0.000000000000000 e+00,
+0.000000000000000 e+00, +0.000000000000000 e+00,
+0.000000000000000 e+00, +0.000000000000000 e+00,
+0.000000000000000 e+00, +0.000000000000000 e+00,
+0.000000000000000 e+00, +0.000000000000000 e+00,
+0.000000000000000 e+00, +0.000000000000000 e+00,
+0.000000000000000 e+00, +0.000000000000000 e+00,
+0.000000000000000 e+00, +0.000000000000000 e+00,
+0.000000000000000 e+00, +0.000000000000000 e+00,
+0.000000000000000 e+00, +0.000000000000000 e+00,
+0.000000000000000 e+00, +0.000000000000000 e+00,
+0.000000000000000 e+00, +0.000000000000000 e+00,
+0.000000000000000 e+00, +0.000000000000000 e+00,
+0.000000000000000 e+00, +0.000000000000000 e+00,
+0.000000000000000 e+00, +0.000000000000000 e+00,
+0.000000000000000 e+00, +0.000000000000000 e+00,
+0.000000000000000 e+00, +0.000000000000000 e+00,
+0.000000000000000 e+00, +0.000000000000000 e+00,
+0.000000000000000 e+00, +0.000000000000000 e+00,
+0.000000000000000 e+00, +0.000000000000000 e+00,
+0.000000000000000 e+00, +0.000000000000000 e+00,
+0.000000000000000 e+00, +0.000000000000000 e+00,
+0.000000000000000 e+00, +0.000000000000000 e+00,
+0.000000000000000 e+00, +0.000000000000000 e+00,
+0.000000000000000 e+00, +0.000000000000000 e+00,
+0.000000000000000 e+00, +0.000000000000000 e+00,
+0.000000000000000 e+00, +0.000000000000000 e+00,
+0.000000000000000 e+00, +0.000000000000000 e+00,
+0.000000000000000 e+00, +0.000000000000000 e+00,
+0.000000000000000 e+00, +0.000000000000000 e+00,

+0.000000000000000 e+00, +0.000000000000000 e+00,
+0.000000000000000 e+00, +0.000000000000000 e+00,
+0.000000000000000 e+00, +0.000000000000000 e+00,
+0.000000000000000 e+00, +0.000000000000000 e+00,
+0.000000000000000 e+00, +0.000000000000000 e+00,
+0.000000000000000 e+00, +0.000000000000000 e+00,
+0.000000000000000 e+00, +0.000000000000000 e+00,
+0.000000000000000 e+00, +0.000000000000000 e+00,
+0.000000000000000 e+00, +0.000000000000000 e+00,
+0.000000000000000 e+00, +0.000000000000000 e+00,
+0.000000000000000 e+00, +0.000000000000000 e+00,
+0.000000000000000 e+00, +0.000000000000000 e+00,
+0.000000000000000 e+00, +0.000000000000000 e+00,
+0.000000000000000 e+00, +0.000000000000000 e+00,
+0.000000000000000 e+00, +0.000000000000000 e+00,
+0.000000000000000 e+00, +0.000000000000000 e+00,
+0.000000000000000 e+00, +0.000000000000000 e+00,
+0.000000000000000 e+00, +0.000000000000000 e+00,
+0.000000000000000 e+00, +0.000000000000000 e+00,
+0.000000000000000 e+00, +0.000000000000000 e+00,
+0.000000000000000 e+00, +0.000000000000000 e+00,
+0.000000000000000 e+00, +0.000000000000000 e+00,
+0.000000000000000 e+00, +0.000000000000000 e+00,
+0.000000000000000 e+00, +0.000000000000000 e+00,
+0.000000000000000 e+00, +0.000000000000000 e+00,
+0.000000000000000 e+00, +0.000000000000000 e+00,
+0.000000000000000 e+00, +0.000000000000000 e+00.

While this invention has been described in terms of several embodiments, there are alterations, permutations, and equivalents which fall within the scope of this invention. It should also be noted that there are many alternative ways of implementing the methods and compositions of the present invention. It is therefore intended that the following appended claims be interpreted as including all such alterations, permutations and equivalents as fall within the true spirit and scope of the present invention.

BIBLIOGRAPHY

[1] 3GPP, "Codec for Enhanced Voice Services (EVS); Detailed algorithmic description," [Online]. Available: http://www.3gpp.org/ftp/Specs/archive/26_series/26.445/26445-d00.zip.

[2] P. P. Julien Faure, "Delay-optimized overlap transform, coding/decoding weighting windows". U.S. Pat. No. 8,847,795, Jun. 28, 2011.

[3] Geiger, Audio Coding based on integer transform, Ilmenau: https://www.db-thueringen.de/receive/dbt_mods_00010054, 2004.

The invention claimed is:

1. An apparatus for encoding an audio signal comprising a plurality of frames, the apparatus comprising:

a processor configured to execute a modulated lapped transform tool, an arithmetic coder, a bitstream writer, a resampling tool, and a long term post filtering tool (LTPF);

a storage space to store values of an analysis windowing function, wherein:

the modulated lapped transform tool is configured to transform a time domain (TD) representation of the audio signal, or a processed version thereof, into a frequency domain (FD) representation, and to perform a modulated lapped transform analysis using the analysis windowing function comprising a meandering portion crossing a linear function in correspondence of at least four points;

the arithmetic coder is configured to compress the FD representation of the audio signal, or a processed version of the FD representation of the audio signal, by arithmetic coding, to output a compressed version of the FD representation of the audio signal;

the bitstream writer is configured to write the compressed version of the FD representation of the audio signal, or a processed version thereof, onto a bitstream; and the resampling tool is configured to downsample the TD representation of the audio signal to obtain a downsampled TD representation of the audio signal, and the LTPF tool is configured to receive the downsampled TD representation of the audio signal, an output of the LTPF tool being provided to the bitstream writer to be written in the bitstream; and a transmitter to transmit the bitstream, wherein the analysis windowing function is defined so as to be asymmetric, wherein the analysis windowing function is defined so as to be, in the meandering portion:

greater than the linear function in a first interval between a first crossing point and a second crossing point;

lower than the linear function in a second interval between the second crossing point and a third crossing point; and greater than the linear function in a third interval between the third crossing point and a fourth crossing point, wherein the analysis windowing function is defined so that an absolute maximum value is in one of the first and third intervals, and wherein the linear function is a constant function with constant value 1, the storage space is configured to store the values of the analysis windowing function in a first memory location of the storage space;

the storage space is configured to store time input buffers and/or cosine or sine values in a second memory location of the storage space;

the modulated lapped transform tool is configured to scale the time input buffers and/or cosine or sine values with respect to the values of the analysis windowing function.

2. The apparatus of claim 1, wherein the analysis windowing function is defined so that the absolute maximum value of the analysis windowing function is less than 25% greater than the constant value of the linear function at a same time instant.

3. The apparatus of claim 1, wherein the modulated lapped transform tool is configured to use the time input buffers in a form of $$t(n)=x(Z-N_F+n) \text{ for } n=0 \ldots 2N_F-1-Z, \text{ and}$$

$$t(2N-Z+n)=0 \text{ for } n=0 \ldots Z-1$$

wherein x(n) is a TD sample of the audio signal or the processed version of the audio signal at a time instant n, $N_F$ is the number of samples processed in one frame, and Z is the number of leading zeros in a modulated lapped transform window.

4. The apparatus of claim 1, wherein the modulated lapped transform tool is configured to perform:

$$X(k)=\sqrt{\frac{2}{N_F}}\sum_{n=0}^{2N_F-1} w_N(n)\cdot t(n)\cos\left[\frac{\pi}{N_F}\left(n+\frac{1}{2}+\frac{N_F}{2}\right)\left(k+\frac{1}{2}\right)\right]$$

$$\text{for } k=0 \ldots N_F-1$$

wherein X(k) is a modulated lapped transform frequency value at a frequency index k, n is a time instant, $w_N(n)$ is the analysis windowing function, t(n) is a time input buffer, and $N_F$ is the number of samples processed in one frame.

5. The apparatus of claim 1, wherein:

the analysis windowing function is defined so that, in the meandering portion, a relative maximum value is in the first or third interval and a relative minimum value is in the second interval.

6. The apparatus of claim 1, wherein:

the analysis windowing function is defined so as to present, in the meandering portion, a value greater than the linear function in an interval comprised of 30% and 50% of two frames.

7. The apparatus of claim 1, wherein:

the analysis windowing function is defined so that the absolute maximum value of the analysis windowing function is less than 5% greater than the constant value of the linear function at a same time instant.

8. The apparatus of claim 1, wherein:

the analysis windowing function is defined so as to present a second numerical differentiation between $-3*10^{-4}$ and $+3*10^{-4}$.

9. The apparatus of claim 1, wherein:

the analysis windowing function is defined so as to present a third numerical differentiation between $-2*10^{-5}$ and $+2*10^{-5}$.

10. The apparatus of claim 1, wherein:

the analysis windowing function is defined as a time reversed version of a synthesis windowing function.

11. The apparatus of claim 1, wherein a modulated lapped transform is a modified discrete cosine transform (MDCT) or a modified discrete sine transform (MDST).

12. The apparatus of claim 1, wherein the analysis windowing function comprises at least a succession, in forward or backward order, formed by the following values or at least a sub-succession with 10 values of the following values if different from 0, with ±1% of tolerance:

−7.078546706512391 e−04f, −2.098197727900724 e−03f, −4.525198076002370 e−03f, −8.233976327300612 e−03f, −1.337713096257934 e−02f, −1.999721557401502 e−02f, −2.800909464274782 e−02f, −3.721502082245055 e−02f, −4.731768261606175 e−02f, −5.794654834034055 e−02f, −6.867606753531441 e−02f, −7.904647440788692 e−02f, −8.859705468085925 e−02f, −9.688303623049199 e−02f, −1.034961241263523 e−01f, −1.080766457616878 e−01f, −1.103242262600913 e−01f, −1.099809851424550 e−01f, −1.068172142230882 e−01f, −1.006190418791648 e−01f, −9.116452506492527 e−02f, −7.820617483254730 e−02f, −6.146688124166948 e−02f, −4.063362855701623 e−02f, −1.536329520788766 e−02f, +1.470155068746303 e−02f, +4.989736509080558 e−02f, +9.050369257152079 e−02f, +1.366911019414417 e−01f, +1.884686389218322 e−01f, +2.456456803467095 e−01f, +3.077789078889820 e−01f, +3.741642373060188 e−01f, +4.438114799213576 e−01f, +5.154735456539700 e−01f, +5.876661722564289 e−01f, +6.587619767809000 e−01f, +7.270576699841359 e−01f, +7.908752989295335 e−01f, +8.486643364959733 e−01f, +8.991320235484349 e−01f, +9.413348145272842 e−01f, +9.747634827941575 e−01f, +9.994114730415857 e−01f, +1.015760373791603 e+00f, +1.024736164069697 e+00f, +1.027634294456205 e+00f, +1.025991493983836 e+00f, +1.021427210603284 e+00f, +1.015439859549357 e+00f, +1.009366925499550 e+00f, +1.003508162416449 e+00f, +9.988898206257559 e−01f, +9.953133902427869 e−01f, +9.925943919208190 e−01f, +9.905771957917731 e−01f, +9.891371616557014 e−01f, +9.881790747212391 e−01f, +9.876249269174586 e−01f, +9.874056275509585 e−01f, +9.874524849192456 e−01f, +9.876951134084213 e−01f, +9.880640617030884 e−01f, +9.884926873551375 e−01f, +9.889230031022089 e−01f, +9.893074965384659 e−01f, +9.896146331889107 e−01f, +9.898319269347060 e−01f, +9.899693102025342 e−01f, +9.900603352632121 e−01f, +9.901575015155720 e−01f, +9.903255289051605 e−01f, +9.906303787150326 e−01f, +9.911298894709990 e−01f, +9.918665491182922 e−01f, +9.928619727154252 e−01f, +9.941156069136238 e−01f, +9.956033775539884 e−01f, +9.972793109558521 e−01f, +9.990784840729244 e−01f, +1.000922365901945 e+00f, +1.002728111386909 e+00f, +1.004416038098237 e+00f, +1.005919224127911 e+00f, +1.007189345025525 e+00f, +1.008200146369426 e+00f, +1.008949493525753 e+00f, +1.009458241425143 e+00f, +1.009768980817384 e+00f, +1.009940336228694 e+00f, +1.010039453539107 e+00f, +1.010132323996401 e+00f, +1.010272524848519 e+00f, +1.010494354532353 e+00f, +1.010808068774316 e+00f, +1.011201071127927 e+00f, +1.011641272406023 e+00f, +1.012080125934687 e+00f, +1.012458183122033 e+00f, +1.012706955800289 e+00f, +1.012755013843985 e+00f, +1.012530134411619 e+00f, +1.011962331100864 e+00f, +1.010982135506986 e+00f, +1.009512438049510 e+00f, +1.007460860286395 e+00f, +1.004708677491086 e+00f, +1.001111413242302 e+00f, +9.965041017623596 e−01f, +9.907199995730845 e−01f, +9.823765865983288 e−01f, +9.708821747608998 e−01f, +9.546732976073705 e−01f, +9.321553861564006 e−01f, +9.018003682081348 e−01f, +8.623984077953557 e−01f, +8.132817365236141 e−01f, +7.544551974836834 e−01f, +6.866580716267418 e−01f, +6.113488038789190 e−01f, +5.306181649316597 e−01f, +4.471309850999502 e−01f, +3.639114681156236 e−01f, +2.841647033392408 e−01f, +2.110209448747969 e−01f, +1.472287968327703 e−01f, +9.482665349502291 e−02f, +5.482436608328477 e−02f, +2.701461405056264 e−02f, +9.996743588367519 e−03f, +0.000000000000000 e+00f, +0.000000000000000 e+00f, +0.000000000000000 e+00f, +0.000000000000000 e+00f, +0.000000000000000 e+00f, +0.000000000000000 e+00f, +0.000000000000000 e+00f, +0.000000000000000 e+00f, +0.000000000000000 e+00f, +0.000000000000000 e+00f, +0.000000000000000 e+00f, +0.000000000000000 e+00f, +0.000000000000000 e+00f, +0.000000000000000 e+00f, +0.000000000000000 e+00f, +0.000000000000000 e+00f, +0.000000000000000 e+00f, +0.000000000000000 e+00f, +0.000000000000000 e+00f, +0.000000000000000 e+00f, +0.000000000000000 e+00f, +0.000000000000000 e+00f, +0.000000000000000 e+00f, +0.000000000000000 e+00f, +0.000000000000000 e+00f, +0.000000000000000 e+00f, +0.000000000000000 e+00f, +0.000000000000000 e+00f, +0.000000000000000 e+00f, +0.000000000000000 e+00f.

13. The apparatus of claim 1, wherein the analysis windowing function comprises at least a succession, in forward or backward order, formed by the following values or at least a sub-succession with 10 values of the following values if different from 0, with ±1% of tolerance:

−4.619898752628163 e−04f, −9.747166718929050 e−04f, −1.664473096973725 e−03f, −2.597106916737789 e−03f, −3.806285163352241 e−03f, −5.324608721716763 e−03f, −7.175885277771099 e−03f, −9.382480860899108 e−03f, −1.195270300743193 e−02f, −1.489528159506296 e−02f, −1.820666399965468 e−02f, −2.187570925786862 e−02f, −2.588471937157619 e−02f, −3.020862738245264 e−02f, −3.481597793538342 e−02f, −3.967067992672979 e−02f, −4.472698045914417 e−02f, −4.994225863256500 e−02f, −5.526334794593565 e−02f, −6.063717235243996 e−02f, −6.600961519440657 e−02f, −7.131966266443390 e−02f, −7.651178225890490 e−02f, −8.152964005319532 e−02f, −8.631137544905677 e−02f, −9.080411291245728 e−02f, −9.495377758870335 e−02f, −9.870736514214426 e−02f, −1.020202684361974 e−01f, −1.048438825017798 e−01f, −1.071382314127799 e−01f, −1.088690135027248 e−01f, −1.099969655786929 e−01f, −1.104898474883336 e−01f, −1.103225838568563 e−01f, −1.094621746650760 e−01f, −1.078834293141886 e−01f, −1.055612509762041 e−01f, −1.024650162703341 e−01f, −9.857014566194629 e−02f, −9.384684920715425 e−02f, −8.826309993000785 e−02f, −8.178792716809512 e−02f, −7.438785600211463 e−02f, −6.602189797715241 e−02f, −5.665655641133161 e−02f, −4.624456893420224 e−02f, −3.474585776145929 e−02f, −2.211581608120528 e−02f, −8.310425696208936 e−03f, +6.717697635290676 e−03f, +2.300642061077823 e−02f, +4.060106462625085 e−02f, +5.953239090915557 e−02f, +7.983354189816511 e−02f, +1.015233140203748 e−01f, +1.246171387327525 e−01f, +1.491152519299797 e−01f, +1.750067399059861 e−01f, +2.022699854906251 e−01f, +2.308655379767671 e−01f, +2.607365124918583 e−01f, +2.918144694729168 e−01f, +3.240095704645023 e−01f, +3.572175180786021 e−01f, +3.913146885756875 e−01f, +4.261571642320424 e−01f, +4.615925445090212 e−01f, +4.974471592901086 e−01f, +5.335326819631583 e−01f, +5.696546730080154 e−01f, +6.056083823929643 e−01f, +6.411830842823245 e−01f, +6.761653499550255 e−01f, +7.103400549562944 e−01f, +7.434943718765665 e−01f, +7.754281892901473 e−01f, +8.059437233154637 e−01f, +8.348589373399948 e−01f, +8.620108336276733 e−01f, +8.872599706865123 e−01f, +9.104863121445679 e−01f, +9.315962496426278 e−01f, +9.505220861927248 e−01f, +9.672366712325431 e−01f, +9.817397501303696 e−01f, +9.940557180662704 e−01f, +1.004247514102417 e+00f, +1.012407428282884 e+00f, +1.018650990561848 e+00f, +1.023118841384460 e+00f, +1.025972450969440 e+00f, +1.027397523939210 e+00f, +1.027585830688143 e+00f, +1.026738673647482 e+00f, +1.025061777648234 e+00f, +1.022756514615106 e+00f, +1.020009139549275 e+00f, +1.016996499560845 e+00f, +1.013915946100629 e+00f, +1.011044869639164 e+00f, +1.007773858455400 e+00f, +1.004848753962734 e+00f, +1.002245009135684 e+00f, +9.999393169239009 e−01f, +9.979055415627330 e−01f, +9.961203379971326 e−01f, +9.945597525471822 e−01f, +9.932031606606762 e−01f, +9.920297273323891 e−01f, +9.910230654424902 e−01f, +9.901668953434221 e−01f, +9.894488374513719 e−01f, +9.888556356037892 e−01f, +9.883778520531268 e−01f, +9.880051626345804 e−01f, +9.877295459610343 e−01f, +9.875412739766566 e−01f, +9.874329809802893 e−01f, +9.873949921033299 e−01f, +9.874197049003676 e−01f, +9.874973205882319 e−01f, +9.876201238703241 e−01f, +9.877781920433015 e−01f, +9.879637979933339 e−01f, +9.881678007807095 e−01f, +9.883835200189653 e−01f, +9.886022219397892 e−01f, +9.888182771263505 e−01f, +9.890247977602895 e−01f, +9.892178658748239 e−01f, +9.893923680007577 e−01f, +9.895463342815009 e−01f, +9.896772011542693 e−01f, +9.897859195209235 e−01f, +9.898725363809847 e−01f, +9.899410789223559 e−01f, +9.899945557067980 e−01f, +9.900394023736973 e−01f, +9.900814722948890 e−01f, +9.901293790312005 e−01f, +9.901902265696609 e−01f, +9.902734448815004 e−01f, +9.903862280081246 e−01f, +9.905379830873822 e−01f, +9.907348826312993 e−01f, +9.909842592301273 e−01f, +9.912905118607647 e−01f, +9.916586940166509 e−01f, +9.920906151219310 e−01f, +9.925887208794144 e−01f, +9.931516528513824 e−01f, +9.937790866568735 e−01f, +9.944668184371617 e−01f, +9.952116634297566 e−01f, +9.960068616185641 e−01f, +9.968461329825753 e−01f, +9.977203369515556 e−01f, +9.986213520769593 e−01f, +9.995382582242990 e−01f, +1.000461955079660 e+00f, +1.001380551217109 e+00f, +1.002284871786226 e+00f, +1.003163845364970 e+00f, +1.004009147462043 e+00f, +1.004811375053364 e+00f, +1.005563968008037 e+00f, +1.006259855360867 e+00f, +1.006895570408563 e+00f, +1.007466616298057 e+00f, +1.007972441990187 e+00f, +1.008411468616852 e+00f, +1.008786009787269 e+00f, +1.009097763850333 e+00f, +1.009351762546296 e+00f, +1.009552401900961 e+00f, +1.009707093778162 e+00f, +1.009822090220407 e+00f, +1.009906958448099 e+00f, +1.009969021400474 e+00f, +1.010017890428877 e+00f, +1.010060809299530 e+00f, +1.010106564965965 e+00f, +1.010161131093372 e+00f, +1.010231078494249 e+00f, +1.010319484524512 e+00f, +1.010430470494512 e+00f, +1.010564099281000 e+00f, +1.010721360243234 e+00f, +1.010899655674578 e+00f, +1.011096993993037 e+00f, +1.011308167670753 e+00f, +1.011529185153809 e+00f, +1.011753008569803 e+00f, +1.011973876511603 e+00f, +1.012182837094955 e+00f, +1.012373028737774 e+00f, +1.012535058602453 e+00f, +1.012660975529858 e+00f, +1.012740575296603 e+00f, +1.012765922449960 e+00f, +1.012726958954961 e+00f, +1.012615904116265 e+00f, +1.012422888521601 e+00f, +1.012140460211194 e+00f, +1.011758810583150 e+00f, +1.011269960947744 e+00f, +1.010663676735228 e+00f, +1.009930754807923 e+00f, +1.009058249873833 e+00f, +1.008034308295421 e+00f, +1.006843352506855 e+00f, +1.005470005637052 e+00f, +1.003894772403371 e+00f, +1.002098854400575 e+00f, +1.000060686758758 e+00f, +9.977600196406868 e−01f, +9.951746430061121 e−01f, +9.922861082472264 e−01f, +9.890757868707590 e−01f, +9.847362453480265 e−01f, +9.798613526271561 e−01f, +9.741378617337759 e−01f, +9.673331975559332 e−01f, +9.592539757044516 e−01f, +9.496984081652284 e−01f, +9.384634163826711 e−01f, +9.253567968750328 e−01f, +9.101986790930605 e−01f, +8.928338316495705 e−01f, +8.731437835983047 e−01f, +8.510420440685049 e−01f, +8.264839911291133 e−01f, +7.994681492797084 e−01f, +7.700431275216928 e−01f, +7.383028603058783 e−01f, +7.043814340356083 e−01f, +6.684616478236647 e−01f, +6.307755329382612 e−01f, +5.915799587176216 e−01f, +5.511703155400274 e−01f, +5.098915423728179 e−01f, +4.681017110047964 e−01f, +4.261772971493010 e−01f, +3.845172335531009 e−01f, +3.435228672445613 e−01f, +3.036004651973099 e−01f, +2.651434678028531 e−01f, +2.285283969438072 e−01f, +1.941021906320984 e−01f, +1.621735416384830 e−01f, +1.330015240938615 e−01f, +1.067840430193724 e−01f, +8.365057236623041 e−02f, +6.365188111381356 e−02f, +4.676538412257621 e−02f, +3.288072750732215 e−02f, +2.183057564646270 e−02f, +1.336381425803019 e−02f, +6.758124889697787 e−03f, +0.000000000000000 e+00f, +0.000000000000000 e+00f, +0.000000000000000 e+00f, +0.000000000000000 e+00f, +0.000000000000000 e+00f, +0.000000000000000 e+00f, +0.000000000000000 e+00f, +0.000000000000000 e+00f, +0.000000000000000 e+00f, +0.000000000000000 e+00f, +0.000000000000000 e+00f, +0.000000000000000 e+00f, +0.000000000000000 e+00f, +0.000000000000000 e+00f, +0.000000000000000 e+00f, +0.000000000000000 e+00f, +0.000000000000000 e+00f, +0.000000000000000 e+00f, +0.000000000000000 e+00f, +0.000000000000000 e+00f, +0.000000000000000 e+00f, +0.000000000000000 e+00f, +0.000000000000000 e+00f, +0.000000000000000 e+00f, +0.000000000000000 e+00f, +0.000000000000000 e+00f, +0.000000000000000 e+00f, +0.000000000000000 e+00f, +0.000000000000000 e+00f, +0.000000000000000 e+00f, +0.000000000000000 e+00f, +0.000000000000000 e+00f, +0.000000000000000 e+00f, +0.000000000000000 e+00f, +0.000000000000000 e+00f, +0.000000000000000 e+00f, +0.000000000000000 e+00f, +0.000000000000000 e+00f, +0.000000000000000 e+00f, +0.000000000000000 e+00f, +0.000000000000000 e+00f, +0.000000000000000 e+00f, +0.000000000000000 e+00f, +0.000000000000000 e+00f, +0.000000000000000 e+00f, +0.000000000000000 e+00f, +0.000000000000000 e+00f, +0.000000000000000 e+00f, +0.000000000000000 e+00f, +0.000000000000000 e+00f, +0.000000000000000 e+00f, +0.000000000000000 e+00f, +0.000000000000000 e+00f, +0.000000000000000 e+00f, +0.000000000000000 e+00f, +0.000000000000000 e+00f, +0.000000000000000 e+00f, +0.000000000000000 e+00f, +0.000000000000000 e+00f, +0.000000000000000 e+00f.

14. The apparatus of claim 1, wherein the analysis windowing function comprises at least a succession, in forward or backward order, formed by the following values or at least a sub-succession with 10 values of the following values if different from 0, with ±1% of tolerance:

−3.613496418928369 e−04f, −7.078546706512391 e−04f, −1.074443637110903 e−03f, −1.533478537964509 e−03f, −2.098197727900724 e−03f, −2.778420871815740 e−03f, −3.584129920673041 e−03f, −4.525198076002370 e−03f, −5.609327243712055 e−03f, −6.843234536105624 e−03f, −8.233976327300612 e−03f, −9.785314755557023 e−03f, −1.149880303071551 e−02f, −1.337713096257934 e−02f, −1.542181679511618 e−02f, −1.762979910961727 e−02f, −1.999721557401502 e−02f, −2.252080561390149 e−02f, −2.519406300389030 e−02f, −2.800909464274782 e−02f, −3.095765092956728 e−02f, −3.402996266948349 e−02f, −3.721502082245055 e−02f, −4.050053247568393 e−02f, −4.387219218706189 e−02f, −4.731768261606175 e−02f, −5.082325342672667 e−02f, −5.437166635159518 e−02f, −5.794654834034055 e−02f, −6.153426201732499 e−02f, −6.511708163113709 e−02f, −6.867606753531441 e−02f, −7.219447805250771 e−02f, −7.565695975592170 e−02f, −7.904647440788692 e−02f, −8.234442557322251 e−02f, −8.553324579905185 e−02f, −8.859705468085925 e−02f, −9.152091100798199 e−02f, −9.428847446755965 e−02f, −9.688303623049198 e−02f, −9.929123258537813 e−02f, −1.015008467688577 e−01f, −1.034961241263523 e−01f, −1.052637003544443 e−01f, −1.067939984687745 e−01f, −1.080766457616878 e−01f, −1.090997300590506 e−01f, −1.098524491515805 e−01f, −1.103242262600913 e−01f, −1.105084619148789 e−01f,

−1.103977408741932 e−01f, −1.099809851424550 e−01f, −1.092492774392824 e−01f, −1.081974227416502 e−01f, −1.068172142230882 e−01f, −1.050995803285455 e−01f, −1.030360111111103 e−01f, −1.006190418791648 e−01f, −9.784120023411771 e−02f, −9.469304216883027 e−02f, −9.116452506492527 e−02f, −8.724644532866996 e−02f, −8.293043914044632 e−02f, −7.820617483254730 e−02f, −7.306142427456862 e−02f, −6.748468182105991 e−02f, −6.146688124166948 e−02f, −5.499497258200362 e−02f, −4.805444424454820 e−02f, −4.063362855701623 e−02f, −3.272045590229335 e−02f, −2.430122582451853 e−02f, −1.536329520788766 e−02f, −5.891434269890659 e−03f, +4.126595858583295 e−03f, +1.470155068746303 e−02f, +2.584738191459814 e−02f, +3.757652772246801 e−02f, +4.989736509080558 e−02f, +6.282034030592902 e−02f, +7.635397728566121 e−02f, +9.050369257152079 e−02f, +1.052747118478660 e−01f, +1.206703467513333 e−01f, +1.366911019414417 e−01f, +1.533343890681390 e−01f, +1.705954709184399 e−01f, +1.884686389218322 e−01f, +2.069449962574092 e−01f, +2.260093000067393 e−01f, +2.456456803467095 e−01f, +2.658346019332584 e−01f, +2.865543814049772 e−01f, +3.077789078889820 e−01f, +3.294769437072290 e−01f, +3.516171481750350 e−01f, +3.741642373060188 e−01f, +3.970739591211551 e−01f, +4.203043046885219 e−01f, +4.438114799213576 e−01f, +4.675442291623012 e−01f, +4.914498631045615 e−01f, +5.154735456539700 e−01f, +5.395557644293222 e−01f, +5.636399817032525 e−01f, +5.876661722564289 e−01f, +6.115695310143157 e−01f, +6.352890592874099 e−01f, +6.587619767809000 e−01f, +6.819230974423550 e−01f, +7.047092819314779 e−01f, +7.270576699841359 e−01f, +7.489068963384272 e−01f, +7.701990187606995 e−01f, +7.908752989295335 e−01f, +8.108788692151807 e−01f, +8.301579139160681 e−01f, +8.486643364959733 e−01f, +8.663548164329093 e−01f, +8.831896853053627 e−01f, +8.991320235484349 e−01f, +9.141540563656075 e−01f, +9.282282546151819 e−01f, +9.413348145272842 e−01f, +9.534619388400459 e−01f, +9.646048250501910 e−01f, +9.747634827941575 e−01f, +9.839435385219192 e−01f, +9.921529097154242 e−01f, +9.994114730415857 e−01f, +1.005746084650236 e+00f, +1.011183971347815 e+00f, +1.015760373791603 e+00f, +1.019515072412387 e+00f, +1.022490937034641 e+00f, +1.024736164069697 e+00f, +1.026304095700693 e+00f, +1.027250978292214 e+00f, +1.027634294456205 e+00f, +1.027511063644843 e+00f, +1.026942795115598 e+00f, +1.025991493983836 e+00f, +1.024716149969084 e+00f, +1.023175976163407 e+00f, +1.021427210603284 e+00f, +1.019521566634239 e+00f, +1.017510118327508 e+00f, +1.015439859549357 e+00f, +1.013460916839174 e+00f, +1.011654901040475 e+00f, +1.009366925499550 e+00f, +1.007263182132894 e+00f, +1.005313192386866 e+00f, +1.003508162416449 e+00f, +1.001840787319378 e+00f, +1.000303927234380 e+00f, +9.988898206257559 e−01f, +9.975915283480670 e−01f, +9.964015284765968 e−01f, +9.953133902427869 e−01f, +9.943201078053212 e−01f, +9.934158959186011 e−01f, +9.925943919208190 e−01f, +9.918510277326026 e−01f, +9.911797988363887 e−01f, +9.905771957917731 e−01f, +9.900381047643838 e−01f, +9.895594394179152 e−01f, +9.891371616557014 e−01f, +9.887684373604154 e−01f, +9.884497924570929 e−01f, +9.881790747212391 e−01f, +9.879528358230726 e−01f, +9.877691368590689 e−01f, +9.876249269174586 e−01f, +9.875179947346887 e−01f, +9.874458127312921 e−01f, +9.874056275509585 e−01f, +9.873951115886979 e−01f, +9.874115368168944 e−01f, +9.874524849192456 e−01f, +9.875149888347144 e−01f, +9.875968894760857 e−01f, +9.876951134084213 e−01f, +9.878075819424549 e−01f, +9.879311998177238 e−01f, +9.880640617030884 e−01f, +9.882032571565917 e−01f, +9.883471084085503 e−01f, +9.884926873551375 e−01f, +9.886386592120545 e−01f, +9.887825578295630 e−01f, +9.889230031022089 e−01f, +9.890581715933395 e−01f, +9.891867674284610 e−01f, +9.893074965384659 e−01f, +9.894196399062921 e−01f, +9.895220757174378 e−01f, +9.896146331889107 e−01f, +9.896970346678272 e−01f, +9.897692596535289 e−01f, +9.898319269347060 e−01f, +9.898852572653667 e−01f, +9.899307640365727 e−01f, +9.899693102025343 e−01f, +9.900025692522435 e−01f, +9.900321562263099 e−01f, +9.900603352632121 e−01f, +9.900889812894406 e−01f, +9.901206586012907 e−01f, +9.901575015155720 e−01f, +9.902023946214220 e−01f, +9.902575406142213 e−01f, +9.903255289051605 e−01f, +9.904087914462694 e−01f, +9.905096491583045 e−01f, +9.906303787150326 e−01f, +9.907727108894024 e−01f, +9.909387444078919 e−01f, +9.911298894709990 e−01f, +9.913476318763218 e−01f, +9.915928560402563 e−01f, +9.918665491182922 e−01f, +9.921691315380984 e−01f, +9.925010851461232 e−01f, +9.928619727154252 e−01f, +9.932519181564613 e−01f, +9.936700207375173 e−01f, +9.941156069136238 e−01f, +9.945873147903244 e−01f, +9.950837402063278 e−01f, +9.956033775539884 e−01f, +9.961439922621166 e−01f, +9.967034533921340 e−01f, +9.972793109558521 e−01f, +9.978690858367024 e−01f, +9.984697087896268 e−01f, +9.990784840729244 e−01f, +9.996919011206490 e−01f, +1.000308193833526 e+00f, +1.000922365901945 e+00f, +1.001532636590676 e+00f, +1.002135464655177 e+00f, +1.002728111386909 e+00f, +1.003307449770187 e+00f, +1.003870934089686 e+00f, +1.004416038098237 e+00f, +1.004940548815171 e+00f, +1.005442141810160 e+00f, +1.005919224127911 e+00f, +1.006370303149314 e+00f,

+1.006793927824538 e+00f, +1.007189345025525 e+00f, +1.007555573455895 e+00f, +1.007892674961336 e+00f, +1.008200146369426 e+00f, +1.008478423284851 e+00f, +1.008727884997619 e+00f, +1.008949493525753 e+00f, +1.009144112734761 e+00f, +1.009313224929575 e+00f, +1.009458241425143 e+00f, +1.009581280555682 e+00f, +1.009684090687164 e+00f, +1.009768980817384 e+00f, +1.009838308708799 e+00f, +1.009894548257807 e+00f, +1.009940336228694 e+00f, +1.009977916643680 e+00f, +1.010010230290263 e+00f, +1.010039453539107 e+00f, +1.010068202038694 e+00f, +1.010098388689342 e+00f, +1.010132323996401 e+00f, +1.010171656775640 e+00f, +1.010218096148412 e+00f, +1.010272524848519 e+00f, +1.010336490294771 e+00f, +1.010410221483215 e+00f, +1.010494354532353 e+00f, +1.010588873699422 e+00f, +1.010693501186928 e+00f, +1.010808068774316 e+00f, +1.010931436739342 e+00f, +1.011062876503041 e+00f, +1.011201071127927 e+00f, +1.011344700694417 e+00f, +1.011491904228184 e+00f, +1.011641272406023 e+00f, +1.011790282474963 e+00f, +1.011937567254485 e+00f, +1.012080125934687 e+00f, +1.012216235487353 e+00f, +1.012342907951334 e+00f, +1.012458183122033 e+00f, +1.012558879696851 e+00f, +1.012642857380847 e+00f, +1.012706955800289 e+00f, +1.012748952907404 e+00f, +1.012765799894453 e+00f, +1.012755013843985 e+00f, +1.012713798678211 e+00f, +1.012639775003457 e+00f, +1.012530134411619 e+00f, +1.012382309473470 e+00f, +1.012194068117524 e+00f, +1.011962331100864 e+00f, +1.011685173724601 e+00f, +1.011359143572147 e+00f, +1.010982135506986 e+00f, +1.010550715971368 e+00f, +1.010062133151922 e+00f, +1.009512438049510 e+00f, +1.008898689394160 e+00f, +1.008215923600973 e+00f, +1.007460860286395 e+00f, +1.006627741823389 e+00f, +1.005712337656749 e+00f, +1.004708677491086 e+00f, +1.003611467285588 e+00f, +1.002414286392268 e+00f, +1.001111413242302 e+00f, +9.996961651093181 e−01f, +9.981625949525345 e−01f, +9.965041017623596 e−01f, +9.947148884277037 e−01f, +9.927891912841345 e−01f, +9.907199995730845 e−01f, +9.884793707533194 e−01f, +9.855347660016696 e−01f, +9.823765865983286 e−01f, +9.789747333404933 e−01f, +9.751623811486372 e−01f, +9.708821747608998 e−01f, +9.660805524695870 e−01f, +9.606976399184645 e−01f, +9.546732976073706 e−01f, +9.479479345282376 e−01f, +9.404609052933396 e−01f, +9.321553861564006 e−01f, +9.229775478442888 e−01f, +9.128745354570823 e−01f, +9.018003682081348 e−01f, +8.897163275605041 e−01f, +8.765908974996186 e−01f, +8.623984077953557 e−01f, +8.471200801854385 e−01f, +8.307479727020245 e−01f, +8.132817365236141 e−01f, +7.947291447585267 e−01f, +7.751108841891807 e−01f, +7.544551974836834 e−01f, +7.327963552921717 e−01f, +7.101790843209148 e−01f, +6.866580716267418 e−01f, +6.622962432368731 e−01f, +6.371684119604742 e−01f, +6.113488038789190 e−01f, +5.849206604934815 e−01f, +5.579747428663487 e−01f, +5.306181649316717 e−01f, +5.029523957059122 e−01f, +4.750868825511614 e−01f, +4.471309850999535 e−01f, +4.192049917945288 e−01f, +3.914252910998820 e−01f, +3.639114681156252 e−01f, +3.367837772954476 e−01f, +3.101627843160973 e−01f, +2.841647033392418 e−01f, +2.589033711808454 e−01f, +2.344880603710975 e−01f, +2.110209448747974 e−01f, +1.885997642296488 e−01f, +1.673100807904834 e−01f, +1.472287968327706 e−01f, +1.284223074167396 e−01f, +1.109422548710344 e−01f, +9.482665349502306 e−02f, +8.009914366829558 e−02f, +6.676765847398403 e−02f, +5.482436608328485 e−02f, +4.424588851571281 e−02f, +3.499361000717621 e−02f, +2.701461405056267 e−02f, +2.024370180670145 e−02f, +1.460796755137538 e−02f, +9.996743588367531 e−03f, +5.305235098871444 e−03f, +0.000000000000000 e+00f, +0.000000000000000 e+00f, +0.000000000000000 e+00f, +0.000000000000000 e+00f, +0.000000000000000 e+00f, +0.000000000000000 e+00f, +0.000000000000000 e+00f, +0.000000000000000 e+00f, +0.000000000000000 e+00f, +0.000000000000000 e+00f, +0.000000000000000 e+00f, +0.000000000000000 e+00f, +0.000000000000000 e+00f, +0.000000000000000 e+00f, +0.000000000000000 e+00f, +0.000000000000000 e+00f, +0.000000000000000 e+00f, +0.000000000000000 e+00f, +0.000000000000000 e+00f, +0.000000000000000 e+00f, +0.000000000000000 e+00f, +0.000000000000000 e+00f, +0.000000000000000 e+00f, +0.000000000000000 e+00f, +0.000000000000000 e+00f, +0.000000000000000 e+00f, +0.000000000000000 e+00f, +0.000000000000000 e+00f, +0.000000000000000 e+00f, +0.000000000000000 e+00f, +0.000000000000000 e+00f, +0.000000000000000 e+00f, +0.000000000000000 e+00f, +0.000000000000000 e+00f, +0.000000000000000 e+00f, +0.000000000000000 e+00f, +0.000000000000000 e+00f, +0.000000000000000 e+00f, +0.000000000000000 e+00f, +0.000000000000000 e+00f, +0.000000000000000 e+00f, +0.000000000000000 e+00f, +0.000000000000000 e+00f, +0.000000000000000 e+00f, +0.000000000000000 e+00f, +0.000000000000000 e+00f, +0.000000000000000 e+00f, +0.000000000000000 e+00f, +0.000000000000000 e+00f, +0.000000000000000 e+00f, +0.000000000000000 e+00f, +0.000000000000000 e+00f, +0.000000000000000 e+00f, +0.000000000000000 e+00f, +0.000000000000000 e+00f, +0.000000000000000 e+00f, +0.000000000000000 e+00f, +0.000000000000000 e+00f, +0.000000000000000 e+00f, +0.000000000000000 e+00f, +0.000000000000000 e+00f, +0.000000000000000 e+00f, +0.000000000000000 e+00f,

+0.000000000000000 e+00f, +0.000000000000000 e+00f, +0.000000000000000 e+00f, +0.000000000000000 e+00f, +0.000000000000000 e+00f, +0.000000000000000 e+00f, +0.000000000000000 e+00f, +0.000000000000000 e+00f, +0.000000000000000 e+00f, +0.000000000000000 e+00f, +0.000000000000000 e+00f, +0.000000000000000 e+00f, +0.000000000000000 e+00f, +0.000000000000000 e+00f, +0.000000000000000 e+00f, +0.000000000000000 e+00f, +0.000000000000000 e+00f, +0.000000000000000 e+00f, +0.000000000000000 e+00f, +0.000000000000000 e+00f, +0.000000000000000 e+00f, +0.000000000000000 e+00f, +0.000000000000000 e+00f, +0.000000000000000 e+00f, +0.000000000000000 e+00f, +0.000000000000000 e+00f, +0.000000000000000 e+00f.

15. The apparatus of claim 1, wherein the analysis windowing function comprises at least a succession, in forward or backward order, formed by the following values or at least a sub-succession with 10 values of the following values if different from 0, with ±1% of tolerance:

−3.021153494057143 e−04f, −5.867737487939294 e−04f, −8.366504004139796 e−04f, −1.126635355725494 e−03f, −1.470492941694331 e−03f, −1.873473391018495 e−03f, −2.339292362082021 e−03f, −2.872008069419264 e−03f, −3.476256385086407 e−03f, −4.155963816705528 e−03f, −4.914563787665504 e−03f, −5.755172503953251 e−03f, −6.680623380533122 e−03f, −7.693816924650567 e−03f, −8.796760749750191 e−03f, −9.990503073705982 e−03f, −1.127574117138621 e−02f, −1.265334152129685 e−02f, −1.412438986522702 e−02f, −1.568889620430290 e−02f, −1.734512089366117 e−02f, −1.909097368362797 e−02f, −2.092546711168754 e−02f, −2.284684792818856 e−02f, −2.485207716234951 e−02f, −2.693746704328349 e−02f, −2.909952486193999 e−02f, −3.133504629493832 e−02f, −3.363960728361352 e−02f, −3.600820974457969 e−02f, −3.843601741746971 e−02f, −4.091746034850161 e−02f, −4.344654894948344 e−02f, −4.601786724624048 e−02f, −4.862598509282497 e−02f, −5.126474204655663 e−02f, −5.392644753556616 e−02f, −5.660384311081047 e−02f, −5.929116747072080 e−02f, −6.198268202511926 e−02f, −6.467025548071184 e−02f, −6.734542216184526 e−02f, −7.000099017198280 e−02f, −7.263057011354321 e−02f, −7.522784961377151 e−02f, −7.778525942347714 e−02f, −8.029480247839878 e−02f, −8.274924535373614 e−02f, −8.514125464087215 e−02f, −8.746379123238275 e−02f, −8.971069341834263 e−02f, −9.187564084638347 e−02f, −9.395176975347193 e−02f, −9.593137735886889 e−02f, −9.780843257659243 e−02f, −9.957851303827886 e−02f, −1.012361165314596 e−01f, −1.027741036495644 e−01f, −1.041861222641119 e-Olf, −1.054680247057000 e−01f, −1.066160875985523 e−01f, −1.076255384835563 e−01f, −1.084912299471198 e−01f, −1.092087422379003 e−01f, −1.097736146613313 e−01f, −1.101808861640070 e−01f, −1.104271876052675 e−01f, −1.105108362290460 e−01f, −1.104281465492726 e−01f, −1.101739218186236 e−01f, −1.097437360338336 e−01f, −1.091353125572511 e−01f, −1.083467335729228 e−01f, −1.073739938306107 e−01f, −1.062130155324388 e−01f, −1.048606145834788 e−01f, −1.033132401525343 e−01f, −1.015673163469357 e−01f, −9.962005506126154 e−02f, −9.746803229469267 e−02f, −9.510723623306666 e−02f, −9.253303383231506 e−02f, −8.974125216128212 e−02f, −8.672877689119252 e−02f, −8.349213839083708 e−02f, −8.002639902061687 e−02f, −7.632679536516856 e−02f, −7.238806162166744 e−02f, −6.820576796149519 e−02f, −6.377611429172260 e−02f, −5.909386001558149 e−02f, −5.415316322402774 e−02f, −4.894812724598650 e−02f, −4.347347112195197 e−02f, −3.772461300253332 e−02f, −3.169587609244436 e−02f, −2.538179830690266 e−02f, −1.877689096555516 e−02f, −1.187461378850388 e−02f, −4.669099247423082 e−03f, +2.844096748870385 e−03f, +1.066976124794342 e−02f, +1.881355950582949 e−02f, +2.728156010437695 e−02f, +3.607810469851272 e−02f, +4.520702759803914 e−02f, +5.467238802204326 e−02f, +6.447866054615346 e−02f, +7.462862199422061 e−02f, +8.512490568723846 e−02f, +9.596983987496970 e−02f, +1.071650779014335 e−01f, +1.187115850305241 e−01f, +1.306101067250375 e−01f, +1.428596447589721 e−01f, +1.554584725339102 e−01f, +1.684041609371527 e−01f, +1.816947894623263 e−01f, +1.953273880886783 e−01f, +2.092963206850239 e−01f, +2.235945635254679 e−01f, +2.382160219461597 e−01f, +2.531529721334063 e−01f, +2.683961570569586 e−01f, +2.839361392493072 e−01f, +2.997624255177811 e−01f, +3.158619077906196 e−01f, +3.322210551086769 e−01f, +3.488264676990591 e−01f, +3.656640377499646 e−01f, +3.827152968157059 e−01f, +3.999611859760947 e−01f, +4.173843265025887 e−01f, +4.349669624916473 e−01f, +4.526876397402144 e−01f, +4.705242008503956 e−01f, +4.884539254831315 e−01f, +5.064545550235134 e−01f, +5.245006748662190 e−01f, +5.425674372882107 e−01f, +5.606312044701524 e−01f, +5.786672646386708 e−01f, +5.966477035050948 e−01f, +6.145458904162185 e−01f, +6.323361944662236 e−01f, +6.499926319211774 e−01f, +6.674874032292857 e−01f, +6.847932667399612 e−01f, +7.018835463513400 e−01f, +7.187322544823347 e−01f, +7.353128213893310 e−01f, +7.516001985652684 e−01f, +7.675699252273948 e−01f, +7.831974571624924 e−01f, +7.984583859818390 e−01f, +8.133295347030278 e−01f, +8.277892271515950 e−01f, +8.418178561101360 e−01f, +8.553961300139363 e−01f, +8.685068980898102 e−01f, +8.811334436653052 e−01f, +8.932596784799233 e−01f, +9.048748835980528 e−01f, +9.159657608120536 e−01f, +9.265215299450000 e−01f, +9.365339988633418 e−01f, +9.459977028429117 e−01f, +9.549088408436811 e−01f, +9.632658122557368 e−01f, +9.710688896122810 e−01f, +9.783204156360773 e−01f, +9.850226760127131 e−01f, +9.911792082081333 e−01f, +9.967989944502682 e−01f, +1.001894024615659 e+00f, +1.006474342231823 e+00f, +1.010552057109195 e+00f, +1.014142538208007 e+00f, +1.017262593268930 e+00f, +1.019928842669923 e+00f, +1.022159867011177 e+00f, +1.023976320927187 e+00f, +1.025400734608122 e+00f, +1.026455340400072 e+00f, +1.027164510654160 e+00f, +1.027552729180790 e+00f, +1.027644462380432 e+00f, +1.027463246660797 e+00f, +1.027035903410657 e+00f, +1.026389068000259 e+00f, +1.025548201799728 e+00f, +1.024537134749709 e+00f, +1.023380803775376 e+00f, +1.022103695693341 e+00f, +1.020728359657958 e+00f, +1.019275334687329 e+00f, +1.017765178792830 e+00f, +1.016217355867531 e+00f, +1.014665311686846 e+00f, +1.013249071090664 e+00f, +1.011948006992127 e+00f, +1.010189090179223 e+00f, +1.008557961167850 e+00f, +1.007011287608451 e+00f, +1.005548764575910 e+00f, +1.004168417268956 e+00f, +1.002867268893035 e+00f, +1.001641769115897 e+00f, +1.000489068954641 e+00f, +9.994060799749374 e−01f, +9.983898865406841 e−01f, +9.974370849972721 e−01f, +9.965444836911705 e−01f, +9.957098545943852 e−01f, +9.949302413030897 e−01f, +9.942024045863540 e−01f, +9.935241604969254 e−01f, +9.928930430130044 e−01f, +9.923068103443909 e−01f, +9.917633778190438 e−01f, +9.912597642374404 e−01f, +9.907954498484041 e−01f, +9.903677893656558 e−01f, +9.899751611066148 e−01f, +9.896160337369861 e−01f, +9.892890160408989 e−01f, +9.889928511129679 e−01f, +9.887260333430423 e−01f, +9.884868721088945 e−01f, +9.882751039537586 e−01f, +9.880892168751595 e−01f, +9.879277114724612 e−01f, +9.877898261218510 e−01f, +9.876743442038471 e−01f, +9.875807496078497 e−01f, +9.875072021876561 e−01f, +9.874529447589979 e−01f, +9.874169741527905 e−01f, +9.873984685207834 e−01f, +9.873958301311858 e−01f, +9.874080027710336 e−01f, +9.874343401290739 e−01f, +9.874736235387018 e−01f, +9.875243137719285 e−01f, +9.875856201221135 e−01f, +9.876563785063032 e−01f, +9.877358921155149 e−01f, +9.878225576787804 e−01f, +9.879150968481590 e−01f, +9.880132731565830 e−01f, +9.881156946084619 e−01f, +9.882211314188272 e−01f, +9.883289032519310 e−01f, +9.884378310018685 e−01f, +9.885476787868710 e−01f, +9.886568414746639 e−01f, +9.887645868459630 e−01f, +9.888708540445242 e−01f, +9.889744320992592 e−01f, +9.890747269455915 e−01f, +9.891710038703801 e−01f, +9.892631024032380 e−01f, +9.893507219573624 e−01f, +9.894330645494204 e−01f, +9.895096919388534 e−01f, +9.895810813422480 e−01f, +9.896467469067676 e−01f,

+9.897067365020641 e−01f, +9.897606930400666 e−01f, +9.898094478563998 e−01f, +9.898530133261707 e−01f, +9.898914705684924 e−01f, +9.899254194103574 e−01f, +9.899554202030650 e−01f, +9.899824494486951 e−01f, +9.900065116928948 e−01f, +9.900284805353695 e−01f, +9.900497484789281 e−01f, +9.900709561632662 e−01f, +9.900928358611601 e−01f, +9.901163920607219 e−01f, +9.901427479709606 e−01f, +9.901734275350572 e−01f, +9.902087332329851 e−01f, +9.902498637985275 e−01f, +9.902983686695558 e−01f, +9.903548501470234 e−01f, +9.904205084933333 e−01f, +9.904959297726740 e−01f, +9.905825150202904 e−01f, +9.906812569810133 e−01f, +9.907922087340426 e−01f, +9.909165464981378 e−01f, +9.910550740962871 e−01f, +9.912084614290896 e−01f, +9.913768610980639 e−01f, +9.915605826937839 e−01f, +9.917604214872976 e−01f, +9.919767175562684 e−01f, +9.922091101818779 e−01f, +9.924579135466506 e−01f, +9.927231225056266 e−01f, +9.930049538427406 e−01f, +9.933027281437943 e−01f, +9.936161084869942 e−01f, +9.939453714404443 e−01f, +9.942895145656371 e−01f, +9.946481676207727 e−01f, +9.950203031067961 e−01f, +9.954058173659507 e−01f, +9.958038713694317 e−01f, +9.962130271017117 e−01f, +9.966324689957675 e−01f, +9.970615306490058 e−01f, +9.974990583293081 e−01f, +9.979437430375855 e−01f, +9.983940572002874 e−01f, +9.988493116887893 e−01f, +9.993083430214909 e−01f, +9.997689221333534 e−01f, +1.000231131275969 e+00f, +1.000692135698996 e+00f, +1.001152013920163 e+00f, +1.001608526000461 e+00f, +1.002060493867275 e+00f, +1.002507212061815 e+00f, +1.002947129400411 e+00f, +1.003378909587027 e+00f, +1.003801368578070 e+00f, +1.004213810320699 e+00f, +1.004615386562846 e+00f, +1.005004618375781 e+00f, +1.005380628601598 e+00f, +1.005743282364652 e+00f, +1.006091510392348 e+00f, +1.006424907424988 e+00f, +1.006742427727669 e+00f, +1.007044321511378 e+00f, +1.007330218597112 e+00f, +1.007599401798709 e+00f, +1.007852064386603 e+00f, +1.008088176165563 e+00f, +1.008308033204578 e+00f, +1.008511247273756 e+00f, +1.008698144207627 e+00f, +1.008869515256392 e+00f, +1.009025659761512 e+00f, +1.009166718967367 e+00f, +1.009293362609020 e+00f, +1.009406398832440 e+00f, +1.009507017171120 e+00f, +1.009595264293017 e+00f, +1.009672145744679 e+00f, +1.009739084785160 e+00f, +1.009796675060142 e+00f, +1.009846137382005 e+00f, +1.009888083631667 e+00f, +1.009924092276850 e+00f, +1.009955384765721 e+00f, +1.009982268770147 e+00f, +1.010006298177305 e+00f, +1.010028618428735 e+00f, +1.010050254076988 e+00f, +1.010071952131355 e+00f, +1.010094366238073 e+00f, +1.010118917317053 e+00f, +1.010146497096682 e+00f, +1.010177110711677 e+00f, +1.010211755260102 e+00f, +1.010251003469427 e+00f, +1.010295468653759 e+00f, +1.010345234996637 e+00f, +1.010400316698172 e+00f, +1.010461564316351 e+00f, +1.010528615445659 e+00f, +1.010601521285347 e+00f, +1.010679788081867 e+00f, +1.010763905869062 e+00f, +1.010853429760676 e+00f, +1.010947547074519 e+00f, +1.011045953108263 e+00f, +1.011148486293359 e+00f, +1.011254397791134 e+00f, +1.011363082075863 e+00f, +1.011473302008831 e+00f, +1.011584996312149 e+00f, +1.011697416504599 e+00f, +1.011808919793469 e+00f, +1.011919264025716 e+00f, +1.012027240794153 e+00f, +1.012132151631041 e+00f, +1.012232734564333 e+00f, +1.012327560477901 e+00f, +1.012416383754384 e+00f, +1.012497890726292 e+00f, +1.012570434021054 e+00f, +1.012633295255708 e+00f, +1.012685277016726 e+00f, +1.012725564992284 e+00f, +1.012752577651415 e+00f, +1.012765062889864 e+00f, +1.012762356719162 e+00f, +1.012743376077777 e+00f, +1.012706484200181 e+00f, +1.012650842226435 e+00f, +1.012575427778520 e+00f, +1.012479473490919 e+00f, +1.012361105121003 e+00f, +1.012219809594718 e+00f, +1.012054359992419 e+00f, +1.011864000215460 e+00f, +1.011647223869087 e+00f, +1.011402518267713 e+00f, +1.011129654652857 e+00f, +1.010826951260377 e+00f, +1.010492924436361 e+00f, +1.010126353960416 e+00f, +1.009725892479312 e+00f, +1.009290060983833 e+00f, +1.008817301052548 e+00f, +1.008305027555130 e+00f, +1.007752833675443 e+00f, +1.007157827358150 e+00f, +1.006518049344503 e+00f, +1.005831403532018 e+00f, +1.005095592119373 e+00f, +1.004308630055050 e+00f, +1.003467498305776 e+00f, +1.002569500413888 e+00f, +1.001612710105563 e+00f, +1.000594272975683 e+00f, +9.995111701168786 e−01f, +9.983609218719522 e−01f, +9.971409288327860 e−01f, +9.958488863050556 e−01f, +9.944818543153893 e−01f, +9.930375282832211 e−01f, +9.915146560759479 e−01f, +9.899136802423638 e−01f, +9.881930623810997 e−01f, +9.859422591203311 e−01f, +9.835667898378924 e−01f, +9.811423034808365 e−01f, +9.785214441250228 e−01f, +9.756636036109838 e−01f, +9.725453442532574 e−01f, +9.691456634185092 e−01f, +9.654406178310209 e−01f, +9.614043615076308 e−01f, +9.570113065179300 e−01f, +9.522367669696690 e−01f, +9.470548839544214 e−01f, +9.414403740008491 e−01f, +9.353691612846549 e−01f, +9.288190093977164 e−01f, +9.217662887169115 e−01f, +9.141896283466009 e−01f, +9.060694681113471 e−01f, +8.973891675497357 e−01f, +8.881332000806269 e−01f, +8.782893885841422 e−01f, +8.678469565343039 e−01f, +8.567970644671067 e−01f, +8.451334654019180 e−01f, +8.328542805780399 e−01f, +8.199594783897041 e−01f, +8.064511006873497 e−01f, +7.923346478686025 e−01f, +7.776204488292163 e−01f, +7.623206183595970 e−01f, +7.464486491227057 e−01f, +7.300205729992958 e−01f, +7.130567383226717 e−01f, +6.955805444755916 e−01f, +6.776173229836567 e−01f, +6.591955305148172 e−01f, +6.403486426892321 e−01f, +6.211072197441818 e−01f, +6.015049275244730 e−01f, +5.815787608870452 e−01f, +5.613674511156324 e−01f, +5.409188627354076 e−01f, +5.202736834971303 e−01f, +4.994780733459294 e−01f, +4.785774177949064 e−01f, +4.576172599874928 e−01f, +4.366490208265804 e−01f, +4.157221460415995 e−01f, +3.948856590950757 e−01f, +3.741903189229770 e−01f, +3.536868899553974 e−01f, +3.334260017756462 e−01f, +3.134586473252229 e−01f, +2.938337904395871 e−01f, +2.745992637590817 e−01f, +2.558030636168172 e−01f, +2.374902188466697 e−01f, +2.197036032185785 e−01f, +2.024855415115456 e−01f, +1.858749915117319 e−01f, +1.699067802117410 e−01f, +1.546132267478873 e−01f, +1.400238206749695 e−01f, +1.261637395672913 e−01f, +1.130534434072719 e−01f, +1.007084973747940 e−01f, +8.914024389873081 e−02f, +7.835612100141792 e−02f, +6.835821233920988 e−02f, +5.914211536028976 e−02f, +5.069893012340832 e−02f, +4.301717763585550 e−02f, +3.608020726673359 e−02f, +2.986316337017630 e−02f, +2.433722657129812 e−02f, +1.947675241971700 e−02f, +1.525710171255895 e−02f, +1.163787492636240 e−02f, +8.433087782643718 e−03f, +4.449668997344735 e−03f, +0.000000000000000 e+00f, +0.000000000000000 e+00f, +0.000000000000000 e+00f, +0.000000000000000 e+00f, +0.000000000000000 e+00f, +0.000000000000000 e+00f, +0.000000000000000 e+00f, +0.000000000000000 e+00f, +0.000000000000000 e+00f, +0.000000000000000 e+00f, +0.000000000000000 e+00f, +0.000000000000000 e+00f, +0.000000000000000 e+00f, +0.000000000000000 e+00f, +0.000000000000000 e+00f, +0.000000000000000 e+00f, +0.000000000000000 e+00f, +0.000000000000000 e+00f, +0.000000000000000 e+00f, +0.000000000000000 e+00f, +0.000000000000000 e+00f, +0.000000000000000 e+00f, +0.000000000000000 e+00f, +0.000000000000000 e+00f, +0.000000000000000 e+00f, +0.000000000000000 e+00f, +0.000000000000000 e+00f, +0.000000000000000 e+00f, +0.000000000000000 e+00f, +0.000000000000000 e+00f, +0.000000000000000 e+00f, +0.000000000000000 e+00f, +0.000000000000000 e+00f, +0.000000000000000 e+00f, +0.000000000000000 e+00f, +0.000000000000000 e+00f, +0.000000000000000 e+00f, +0.000000000000000 e+00f, +0.000000000000000 e+00f, +0.000000000000000 e+00f, +0.000000000000000 e+00f, +0.000000000000000 e+00f, +0.000000000000000 e+00f, +0.000000000000000 e+00f, +0.000000000000000 e+00f, +0.000000000000000 e+00f, +0.000000000000000 e+00f, +0.000000000000000 e+00f, +0.000000000000000 e+00f, +0.000000000000000 e+00f, +0.000000000000000 e+00f, +0.000000000000000 e+00f, +0.000000000000000 e+00f, +0.000000000000000 e+00f, +0.000000000000000 e+00f, +0.000000000000000 e+00f, +0.000000000000000 e+00f, +0.000000000000000 e+00f, +0.000000000000000 e+00f, +0.000000000000000 e+00f, +0.000000000000000 e+00f, +0.000000000000000 e+00f, +0.000000000000000 e+00f, +0.000000000000000 e+00f, +0.000000000000000 e+00f, +0.000000000000000 e+00f, +0.000000000000000 e+00f, +0.000000000000000 e+00f, +0.000000000000000 e+00f, +0.000000000000000 e+00f, +0.000000000000000 e+00f, +0.000000000000000 e+00f, +0.000000000000000 e+00f, +0.000000000000000 e+00f, +0.000000000000000 e+00f, +0.000000000000000 e+00f, +0.000000000000000 e+00f, +0.000000000000000 e+00f, +0.000000000000000 e+00f, +0.000000000000000 e+00f, +0.000000000000000 e+00f, +0.000000000000000 e+00f, +0.000000000000000 e+00f, +0.000000000000000 e+00f, +0.000000000000000 e+00f, +0.000000000000000 e+00f, +0.000000000000000 e+00f, +0.000000000000000 e+00f, +0.000000000000000 e+00f, +0.000000000000000 e+00f, +0.000000000000000 e+00f, +0.000000000000000 e+00f, +0.000000000000000 e+00f, +0.000000000000000 e+00f, +0.000000000000000 e+00f, +0.000000000000000 e+00f, +0.000000000000000 e+00f, +0.000000000000000 e+00f, +0.000000000000000 e+00f, +0.000000000000000 e+00f, +0.000000000000000 e+00f, +0.000000000000000 e+00f, +0.000000000000000 e+00f, +0.000000000000000 e+00f, +0.000000000000000 e+00f, +0.000000000000000 e+00f, +0.000000000000000 e+00f, +0.000000000000000 e+00f, +0.000000000000000 e+00f, +0.000000000000000 e+00f, +0.000000000000000 e+00f, +0.000000000000000 e+00f, +0.000000000000000 e+00f, +0.000000000000000 e+00f, +0.000000000000000 e+00f, +0.000000000000000 e+00f, +0.000000000000000 e+00f, +0.000000000000000 e+00f, +0.000000000000000 e+00f, +0.000000000000000 e+00f.

16. The apparatus of claim 1, wherein the analysis windowing function comprises at least a succession, in forward or backward order, formed by the following values or at least a sub-succession with 10 values of the following values if different from 0, with ±1% of tolerance:

−2.353032150516754 e−04f, −4.619898752628163 e−04f, −6.262931535610879 e−04f, −7.929180432976445 e−04f, −9.747166718929050 e−04f, −1.180256894474562 e−03f, −1.409209039594871 e−03f, −1.664473096973725 e−03f, −1.946591608170231 e−03f, −2.257081732588478 e−03f, −2.597106916737789 e−03f, −2.967607624839524 e−03f, −3.370454877988472 e−03f, −3.806285163352241 e−03f, −4.276873767639064 e−03f, −4.782469904501813 e−03f, −5.324608721716763 e−03f, −5.903403814095400 e−03f, −6.520419726599805 e−03f, −7.175885277771099 e−03f, −7.871422820642307 e−03f, −8.606586039759667 e−03f, −9.382480860899108 e−03f, −1.019827182163307 e−02f, −1.105520547739066 e−02f, −1.195270300743193 e−02f, −1.289205910303846 e−02f, −1.387263484323160 e−02f, −1.489528159506296 e−02f, −1.595856621933800 e−02f, −1.706288556735433 e−02f, −1.820666399965468 e−02f, −1.939065975232718 e−02f, −2.061355417582714 e−02f, −2.187570925786862 e−02f, −2.317526315266411 e−02f, −2.451227449041489 e−02f, −2.588471937157619 e−02f, −2.729263737090799 e−02f, −2.873390902713615 e−02f, −3.020862738245264 e−02f, −3.171440372994384 e−02f, −3.325098858986303 e−02f, −3.481597793538342 e−02f, −3.640892406933019 e−02f, −3.802742318209150 e−02f, −3.967067992672979 e−02f, −4.133575417353826 e−02f, −4.302203371734278 e−02f, −4.472698045914417 e−02f, −4.645022292934329 e−02f, −4.818891490266687 e−02f, −4.994225863256500 e−02f, −5.170690802826666 e−02f, −5.348162036097223 e−02f, −5.526334794593565 e−02f, −5.705123152423822 e−02f, −5.884271749745559 e−02f, −6.063717235243996 e−02f, −6.243104027829089 e−02f, −6.422303545004304 e−02f, −6.600961519440657 e−02f, −6.778962269634495 e−02f, −6.955996868581379 e−02f, −7.131966266443390 e−02f, −7.306581273272733 e−02f, −7.479758913001458 e−02f, −7.651178225890490 e−02f, −7.820711420768856 e−02f, −7.988010693411644 e−02f, −8.152964005319532 e−02f, −8.315237353264004 e−02f, −8.474728946770714 e−02f, −8.631137544905677 e−02f, −8.784374452959058 e−02f, −8.934164364321417 e−02f, −9.080411291245728 e−02f, −9.222795761428432 e−02f, −9.361232867223340 e−02f, −9.495377758870335 e−02f, −9.625155313139856 e−02f, −9.750284620437569 e−02f, −9.870736514214426 e−02f, −9.986271288271026 e−02f, −1.009680221406219 e−01f, −1.020202684361974 e−01f, −1.030183804850491 e−01f, −1.039596356759290 e−01f, −1.048438825017798 e−01f, −1.056686838192766 e−01f, −1.064342821660323 e−01f, −1.071382314127799 e−01f, −1.077799961121537 e−01f, −1.083570625865931 e−01f, −1.088690135027248 e−01f, −1.093135588677235 e−01f, −1.096903559498340 e−01f, −1.099969655786929 e−01f, −1.102332261219973 e−01f, −1.103972812085189 e−01f, −1.104898474883336 e−01f, −1.105086416532167 e−01f, −1.104537426996073 e−01f, −1.103225838568563 e−01f, −1.101145827722143 e−01f, −1.098276928170364 e−01f, −1.094621746650760 e−01f, −1.090163960055733 e−01f, −1.084908852561722 e−01f, −1.078834293141886 e−01f, −1.071937180231978 e−01f, −1.064196358069465 e−01f, −1.055612509762041 e−01f, −1.046162812518618 e−01f, −1.035849043557610 e−01f, −1.024650162703341 e−01f, −1.012568997532046 e−01f, −9.995864571932928 e−02f, −9.857014566194627 e−02f, −9.708911135857967 e−02f, −9.551545820689084 e−02f, −9.384684920715425 e−02f, −9.208300062891550 e−02f, −9.022171021406450 e−02f, −8.826309993000785 e−02f, −8.620493821803937 e−02f, −8.404742152815330 e−02f, −8.178792716809512 e−02f, −7.942625026703617 e−02f, −7.695980775819990 e−02f, −7.438785600211463 e−02f, −7.170797002873608 e−02f, −6.891994783815969 e−02f, −6.602189797715241 e−02f, −6.301349420724424 e−02f, −5.989191912667712 e−02f, −5.665655641133161 e−02f, −5.330406164482222 e−02f, −4.983427241976235 e−02f, −4.624456893420224 e−02f, −4.253455686336916 e−02f, −3.870195772538443 e−02f, −3.474585776145929 e−02f, −3.066341518682682 e−02f, −2.645425077642105 e−02f, −2.211581608120528 e−02f, −1.764740541599136 e−02f, −1.304581363895818 e−02f, −8.310425696208936 e−03f, −3.438268661133170 e−03f, +1.570315476576933 e−03f, +6.717697635290676 e−03f, +1.200477020244778 e−02f, +1.743398319747869 e−02f, +2.300642061077823 e−02f, +2.872481423270595 e−02f, +3.458896350634671 e−02f, +4.060106462625085 e−02f, +4.676102915752826 e−02f, +5.307133911821893 e−02f, +5.953239090915557 e−02f, +6.614647812869151 e−02f, +7.291293184312803 e−02f, +7.983354189816511 e−02f, +8.690807412770696 e−02f, +9.413813765275064 e−02f, +1.015233140203748 e−01f, +1.090651518336202 e−01f, +1.167626546016197 e−01f, +1.246171387327525 e−01f, +1.326272948938113 e−01f, +1.407938190608664 e−01f, +1.491152519299797 e−01f, +1.575921408388593 e−01f, +1.662224799248571 e−01f, +1.750067399059861 e−01f, +1.839431938620024 e−01f, +1.930318183054904 e−01f, +2.022699854906251 e−01f, +2.116567430906184 e−01f, +2.211888523410642 e−01f, +2.308655379767671 e−01f, +2.406837992341654 e−01f, +2.506420640291662 e−01f, +2.607365124918583 e−01f, +2.709659073501196 e−01f, +2.813259021832532 e−01f, +2.918144694729168 e−01f, +3.024270279840051 e−01f, +3.131603499997996 e−01f, +3.240095704645023 e−01f, +3.349719592361666 e−01f, +3.460422935204829 e−01f, +3.572175180786021 e−01f, +3.684915649120530 e−01f, +3.798595119591716 e−01f, +3.913146885756875 e−01f, +4.028532873867052 e−01f, +4.144688328137527 e−01f, +4.261571642320424 e−01f, +4.379113897565727 e−01f, +4.497256320417501 e−01f, +4.615925445090212 e−01f, +4.735067030065239 e−01f, +4.854600184866710 e−01f, +4.974471592901086 e−01f, +5.094597228333853 e−01f, +5.214909841729947 e−01f, +5.335326819631583 e−01f, +5.455789811615239 e−01f, +5.576217157959890 e−01f, +5.696546730080154 e−01f, +5.816685576268035 e−01f, +5.936560624526468 e−01f, +6.056083823929643 e−01f, +6.175192060085208 e−01f, +6.293796611336280 e−01f, +6.411830842823245 e−01f, +6.529203544876097 e−01f, +6.645840786371451 e−01f, +6.761653499550255 e−01f, +6.876573952173626 e−01f, +6.990511539119996 e−01f, +7.103400549562944 e−01f, +7.215149331458728 e−01f, +7.325691772738999 e−01f, +7.434943718765665 e−01f, +7.542846327442048 e−01f, +7.649313654540612 e−01f, +7.754281892901473 e−01f, +7.857670170752049 e−01f, +7.959414651061612 e−01f, +8.059437233154637 e−01f, +8.157687070715176 e−01f, +8.254086223972127 e−01f, +8.348589373399948 e−01f, +8.441125827416620 e−01f, +8.531651194538425 e−01f, +8.620108336276733 e−01f, +8.706456337542150 e−01f, +8.790631561061171 e−01f, +8.872599706865123 e−01f, +8.952313288619367 e−01f, +9.029751680353524 e−01f, +9.104863121445679 e−01f, +9.177625550620636 e−01f, +9.247997426966093 e−01f, +9.315962496426278 e−01f, +9.381494858921667 e−01f, +9.444588390359354 e−01f, +9.505220861927248 e−01f, +9.563402921286364 e−01f, +9.619114522936701 e−01f, +9.672366712325431 e−01f, +9.723156637834687 e−01f, +9.771501187120180 e−01f, +9.817397501303696 e−01f, +9.860865871353246 e−01f, +9.901906380163595 e−01f, +9.940557180662704 e−01f, +9.976842395284637 e−01f, +1.001080961257010 e+00f, +1.004247514102417 e+00f, +1.007188578458507 e+00f, +1.009906654565108 e+00f, +1.012407428282884 e+00f, +1.014694702432600 e+00f, +1.016774659209400 e+00f, +1.018650990561848 e+00f, +1.020330464463111 e+00f, +1.021817328911793 e+00f, +1.023118841384460 e+00f, +1.024240262467000 e+00f, +1.025189721888128 e+00f, +1.025972450969440 e+00f, +1.026596938589443 e+00f, +1.027069179375841 e+00f, +1.027397523939210 e+00f, +1.027587902203109 e+00f, +1.027648951922701 e+00f, +1.027585830688143 e+00f, +1.027408519661012 e+00f, +1.027122986826984 e+00f, +1.026738673647482 e+00f, +1.026261663878092 e+00f, +1.025701002415063 e+00f, +1.025061777648234 e+00f, +1.024353980976701 e+00f, +1.023582385618774 e+00f, +1.022756514615106 e+00f, +1.021880604350422 e+00f, +1.020963871317665 e+00f, +1.020009139549275 e+00f, +1.019027285501251 e+00f, +1.018019442784231 e+00f, +1.016996499560845 e+00f, +1.015957433206324 e+00f, +1.014923441259795 e+00f, +1.013915946100629 e+00f, +1.013047565149327 e+00f, +1.012216130365610 e+00f, +1.011044869639164 e+00f, +1.009914592130044 e+00f, +1.008824888092573 e+00f, +1.007773858455400 e+00f, +1.006761700412993 e+00f, +1.005786648810854 e+00f, +1.004848753962734 e+00f, +1.003946083413733 e+00f, +1.003078846506546 e+00f, +1.002245009135684 e+00f, +1.001444733905817 e+00f, +1.000676188436651 e+00f, +9.999393169239009 e−01f, +9.992320848298057 e−01f, +9.985548127155425 e−01f, +9.979055415627330 e−01f, +9.972842679758880 e−01f, +9.966890948441745 e−01f, +9.961203379971326 e−01f, +9.955761256313581 e−01f, +9.950565724564597 e−01f, +9.945597525471822 e–01f, +9.940860378486615 e–01f, +9.936337788972491 e–01f, +9.932031606606759 e–01f, +9.927921871265732 e–01f, +9.924015177880798 e–01f, +9.920297273323891 e–01f, +9.916767775088281 e–01f, +9.913408767719142 e–01f, +9.910230654424902 e–01f, +9.907216425865902 e–01f, +9.904366799536263 e–01f, +9.901668953434221 e–01f, +9.899131011580791 e–01f, +9.896735637374597 e–01f, +9.894488374513719 e–01f, +9.892374835404283 e–01f, +9.890401927796704 e–01f, +9.888556356037892 e–01f, +9.886843467692753 e–01f, +9.885247606051014 e–01f, +9.883778520531268 e–01f, +9.882423270582524 e–01f, +9.881185638915363 e–01f, +9.880051626345804 e–01f, +9.879032023766432 e–01f, +9.878111744348976 e–01f, +9.877295459610343 e–01f, +9.876571983429736 e–01f, +9.875949843246187 e–01f, +9.875412739766566 e–01f, +9.874969061399389 e–01f, +9.874606249127551 e–01f, +9.874329809802893 e–01f, +9.874126414437681 e–01f, +9.874004750404033 e–01f, +9.873949921033299 e–01f, +9.873969162747074 e–01f, +9.874049060317581 e–01f, +9.874197049003676 e–01f, +9.874399717110517 e–01f, +9.874663281231737 e–01f, +9.874973205882319 e–01f, +9.875338926695315 e–01f, +9.875746535410983 e–01f, +9.876201238703241 e–01f, +9.876689801932402 e–01f, +9.877221556193183 e–01f, +9.877781920433015 e–01f, +9.878376489591358 e–01f, +9.878991990245439 e–01f, +9.879637979933339 e–01f, +9.880300303653743 e–01f, +9.880984675859855 e–01f, +9.881678007807095 e–01f, +9.882390300097154 e–01f, +9.883107693992456 e–01f, +9.883835200189653 e–01f, +9.884560159878955 e–01f, +9.885294200392185 e–01f, +9.886022219397892 e–01f, +9.886749404176028 e–01f, +9.887466261142505 e–01f, +9.888182771263505 e–01f, +9.888882480852147 e–01f, +9.889574384705896 e–01f, +9.890247977602895 e–01f, +9.890911247701029 e–01f, +9.891551701556196 e–01f, +9.892178658748239 e–01f, +9.892779555818088 e–01f, +9.893365186903538 e–01f, +9.893923680007577 e–01f, +9.894462830852175 e–01f, +9.894972124952000 e–01f, +9.895463342815009 e–01f, +9.895923617530382 e–01f, +9.896362652966239 e–01f, +9.896772011542693 e–01f, +9.897162195263046 e–01f, +9.897520286480039 e–01f, +9.897859195209235 e–01f, +9.898170267411330 e–01f, +9.898462068764986 e–01f, +9.898725363809847 e–01f, +9.898975138787787 e–01f, +9.899200050208486 e–01f, +9.899410789223559 e–01f, +9.899600605054418 e–01f, +9.899782261038060 e–01f, +9.899945557067980 e–01f, +9.900103500807507 e–01f, +9.900248320990181 e–01f, +9.900394023736973 e–01f, +9.900532105829365 e–01f, +9.900674746047259 e–01f, +9.900814722948890 e–01f, +9.900966926051257 e–01f, +9.901122448734595 e–01f, +9.901293790312005 e–01f, +9.901474648912307 e–01f,

+9.901680598867444 e–01f, +9.901902265696609 e–01f, +9.902151896501201 e–01f, +9.902424418296485 e–01f, +9.902734448815004 e–01f, +9.903071270768942 e–01f, +9.903448913950654 e–01f, +9.903862280081246 e–01f, +9.904324484666853 e–01f, +9.904825650601110 e–01f, +9.905379830873822 e–01f, +9.905980602136440 e–01f, +9.906640366554630 e–01f, +9.907348826312993 e–01f, +9.908120376822228 e–01f, +9.908947858311721 e–01f, +9.909842592301273 e–01f, +9.910795247770178 e–01f, +9.911819240108124 e–01f, +9.912905118607647 e–01f, +9.914064705361564 e–01f, +9.915288011543961 e–01f, +9.916586940166509 e–01f, +9.917952720685562 e–01f, +9.919396217291009 e–01f, +9.920906151219310 e–01f, +9.922495028313456 e–01f, +9.924152398352751 e–01f, +9.925887208794144 e–01f, +9.927688708468421 e–01f, +9.929569112537944 e–01f, +9.931516528513824 e–01f, +9.933539244159140 e–01f, +9.935626893131695 e–01f, +9.937790866568735 e–01f, +9.940016434044485 e–01f, +9.942312024833810 e–01f, +9.944668184371617 e–01f, +9.947093441694513 e–01f, +9.949572854565533 e–01f, +9.952116634297566 e–01f, +9.954712635321227 e–01f, +9.957367951478069 e–01f, +9.960068616185641 e–01f, +9.962823025614079 e–01f, +9.965617986382630 e–01f, +9.968461329825753 e–01f, +9.971338271912752 e–01f, +9.974256691222113 e–01f, +9.977203369515556 e–01f, +9.980185087055744 e–01f, +9.983185871761977 e–01f, +9.986213520769593 e–01f, +9.989255426466267 e–01f, +9.992317314100975 e–01f, +9.995382582242990 e–01f, +9.998461160718275 e–01f, +1.000153907612080 e+00f, +1.000461955079660 e+00f, +1.000768859280338 e+00f, +1.001075613053728 e+00f, +1.001380551217109 e+00f, +1.001684244734497 e+00f, +1.001985425397567 e+00f, +1.002284871786226 e+00f, +1.002580975161843 e+00f, +1.002874411368430 e+00f, +1.003163845364970 e+00f, +1.003450063374329 e+00f, +1.003731570287893 e+00f, +1.004009147462043 e+00f, +1.004281457582935 e+00f, +1.004549339226336 e+00f, +1.004811375053364 e+00f, +1.005068272394360 e+00f, +1.005318795748286 e+00f, +1.005563968008037 e+00f, +1.005802269635282 e+00f, +1.006034554002353 e+00f, +1.006259855360867 e+00f, +1.006479018139540 e+00f, +1.006690541428116 e+00f, +1.006895570408563 e+00f, +1.007093045696527 e+00f, +1.007283799246233 e+00f, +1.007466616298057 e+00f, +1.007642728426847 e+00f, +1.007811036585595 e+00f, +1.007972441990187 e+00f, +1.008125875904472 e+00f, +1.008272602383284 e+00f, +1.008411468616852 e+00f, +1.008543573152632 e+00f, +1.008668018334797 e+00f, +1.008786009787269 e+00f, +1.008896526233555 e+00f, +1.009000766336071 e+00f, +1.009097763850333 e+00f, +1.009188880897370 e+00f, +1.009273163797313 e+00f, +1.009351762546296 e+00f, +1.009423944949143 e+00f, +1.009491175244507 e+00f, +1.009552401900961 e+00f, +1.009608886895764 e+00f, +1.009659973830751 e+00f, +1.009707093778162 e+00f, +1.009749238562067 e+00f, +1.009787744284661 e+00f, +1.009822090220407 e+00f, +1.009853706282597 e+00f, +1.009881498943010 e+00f, +1.009906958448099 e+00f, +1.009929567021562 e+00f, +1.009950573483366 e+00f, +1.009969021400474 e+00f, +1.009986499185054 e+00f, +1.010002363879044 e+00f, +1.010017890428877 e+00f, +1.010032170180360 e+00f, +1.010046722045583 e+00f, +1.010060809299530 e+00f, +1.010075674445289 e+00f, +1.010090449982098 e+00f, +1.010106564965965 e+00f, +1.010123226584120 e+00f, +1.010141762173145 e+00f, +1.010161131093372 e+00f, +1.010182635897876 e+00f, +1.010205587931660 e+00f, +1.010231078494249 e+00f, +1.010257950227988 e+00f, +1.010287732968580 e+00f, +1.010319484524512 e+00f, +1.010354079663767 e+00f, +1.010390635488037 e+00f, +1.010430470494512 e+00f, +1.010472266495074 e+00f, +1.010517096381509 e+00f, +1.010564099281000 e+00f, +1.010614266894512 e+00f, +1.010666285876455 e+00f, +1.010721360243234 e+00f, +1.010778416755264 e+00f, +1.010838252644461 e+00f, +1.010899655674578 e+00f, +1.010963729626641 e+00f, +1.011029191301694 e+00f, +1.011096993993037 e+00f, +1.011165861239173 e+00f, +1.011236610341260 e+00f, +1.011308167670753 e+00f, +1.011381453638912 e+00f, +1.011454785713102 e+00f, +1.011529185153809 e+00f, +1.011603680910505 e+00f, +1.011678803938046 e+00f, +1.011753008569803 e+00f, +1.011827484797985 e+00f, +1.011900936547881 e+00f, +1.011973876511603 e+00f, +1.012044885003304 e+00f, +1.012114985644919 e+00f, +1.012182837094955 e+00f, +1.012249023976742 e+00f, +1.012312095063070 e+00f, +1.012373028737774 e+00f, +1.012430463679316 e+00f, +1.012484972246822 e+00f, +1.012535058602453 e+00f, +1.012581678169188 e+00f, +1.012623472898504 e+00f, +1.012660975529858 e+00f, +1.012692758750213 e+00f, +1.012719789201144 e+00f, +1.012740575296603 e+00f, +1.012755753887085 e+00f, +1.012763948841204 e+00f, +1.012765922449960 e+00f, +1.012760298661069 e+00f, +1.012747819936584 e+00f, +1.012726958954961 e+00f, +1.012698607692183 e+00f, +1.012661400539405 e+00f, +1.012615904116265 e+00f, +1.012560833005713 e+00f, +1.012497050269805 e+00f, +1.012422888521601 e+00f, +1.012339226241367 e+00f, +1.012244921966297 e+00f, +1.012140460211194 e+00f, +1.012024302085441 e+00f, +1.011897560567707 e+00f, +1.011758810583150 e+00f, +1.011608449127642 e+00f, +1.011445162723270 e+00f, +1.011269960947744 e+00f, +1.011081255645969 e+00f, +1.010879608424312 e+00f, +1.010663676735228 e+00f, +1.010434184200640 e+00f,

+1.010189681124657 e+00f, +1.009930754807923 e+00f, +1.009655660215271 e+00f, +1.009365251564694 e+00f, +1.009058249873833 e+00f, +1.008734758578989 e+00f, +1.008393079963091 e+00f, +1.008034308295421 e+00f, +1.007656661215973 e+00f, +1.007260142622887 e+00f, +1.006843352506855 e+00f, +1.006407009542103 e+00f, +1.005949145170711 e+00f, +1.005470005637052 e+00f, +1.004967986424467 e+00f, +1.004443531995945 e+00f, +1.003894772403371 e+00f, +1.003321903663793 e+00f, +1.002723127308148 e+00f, +1.002098854400575 e+00f, +1.001447278873483 e+00f, +1.000768505317086 e+00f, +1.000060686758758 e+00f, +9.993242684851855 e−01f, +9.985573503390627 e−01f, +9.977600196406868 e−01f, +9.969306036935497 e−01f, +9.960694269553644 e−01f, +9.951746430061121 e−01f, +9.942466438407230 e−01f, +9.932837131068657 e−01f, +9.922861082472264 e−01f, +9.912523092989319 e−01f, +9.901827419790691 e−01f, +9.890757868707590 e−01f, +9.879313024174022 e−01f, +9.863553220272523 e−01f, +9.847362453480265 e−01f, +9.831750948772566 e−01f, +9.815583336011345 e−01f, +9.798613526271561 e−01f, +9.780617486993630 e−01f, +9.761574317374303 e−01f, +9.741378617337759 e−01f, +9.719990112065752 e−01f, +9.697327413658168 e−01f, +9.673331975559332 e−01f, +9.647915124057732 e−01f, +9.621011497566145 e−01f, +9.592539757044516 e−01f, +9.562427177295731 e−01f, +9.530600909726344 e−01f, +9.496984081652284 e−01f, +9.461498120176854 e−01f, +9.424071613625743 e−01f, +9.384634163826711 e−01f, +9.343112966094085 e−01f, +9.299449872197452 e−01f, +9.253567968750328 e−01f, +9.205404627076625 e−01f, +9.154896280575360 e−01f, +9.101986790930605 e−01f, +9.046620597741508 e−01f, +8.988755194372424 e−01f, +8.928338316495705 e−01f, +8.865337190368053 e−01f, +8.799712722567934 e−01f, +8.731437835983047 e−01f, +8.660476534563131 e−01f, +8.586812520174252 e−01f, +8.510420440685049 e−01f, +8.431297226886574 e−01f, +8.349435141989714 e−01f, +8.264839911291133 e−01f, +8.177505366573690 e−01f, +8.087449817124315 e−01f, +7.994681492797084 e−01f, +7.899235162194718 e−01f, +7.801137731566502 e−01f, +7.700431275216928 e−01f, +7.597145736971065 e−01f, +7.491330971820804 e−01f, +7.383028603058783 e−01f, +7.272298755824693 e−01f, +7.159201919962611 e−01f, +7.043814340356083 e−01f, +6.926196927377140 e−01f, +6.806438831866077 e−01f, +6.684616478236647 e−01f, +6.560830137986515 e−01f, +6.435179268559957 e−01f, +6.307755329382612 e−01f, +6.178641647786525 e−01f, +6.047954625702541 e−01f, +5.915799587176216 e−01f, +5.782289366005894 e−01f, +5.647535885752191 e−01f, +5.511703155400274 e−01f, +5.374905090437071 e−01f, +5.237263500445715 e−01f, +5.098915423728255 e−01f, +4.960008074926423 e−01f, +4.820662943337458 e−01f, +4.681017110048007 e−01f, +4.541216995958746 e−01f, +4.401421815729068 e−01f, +4.261772971493010 e−01f, +4.122417888542512 e−01f, +3.983499612526493 e−01f, +3.845172335531009 e−01f, +3.707583717376236 e−01f, +3.570886786795506 e−01f, +3.435228672445627 e−01f, +3.300763764703638 e−01f, +3.167640325043893 e−01f, +3.036004651973109 e−01f, +2.905996158436682 e−01f, +2.777758503744847 e−01f, +2.651434678028531 e−01f, +2.527161881181577 e−01f, +2.405069849650012 e−01f, +2.285283969438072 e−01f, +2.167933432162879 e−01f, +2.053139897833021 e−01f, +1.941021906320988 e−01f, +1.831680872008943 e−01f, +1.725221947208913 e−01f, +1.621735416384834 e−01f, +1.521320683467849 e−01f, +1.424052801149985 e−01f, +1.330015240938615 e−01f, +1.239260664828526 e−01f, +1.151858295527293 e−01f, +1.067840430193724 e−01f, +9.872637505002878 e−02f, +9.101379000888035 e−02f, +8.365057236623055 e−02f, +7.663508305536153 e−02f, +6.997033405748826 e−02f, +6.365188111381365 e−02f, +5.768176015814392 e−02f, +5.205244216987966 e−02f, +4.676538412257621 e−02f, +4.180950541438362 e−02f, +3.718640251368464 e−02f, +3.288072750732215 e−02f, +2.889548499582958 e−02f, +2.520980565928884 e−02f, +2.183057564646272 e−02f, +1.872896194002638 e−02f, +1.592127815153420 e−02f, +1.336381425803020 e−02f, +1.108558877807282 e−02f, +8.943474189364638 e−03f, +6.758124889697787 e−03f, +3.504438130619497 e−03f, +0.000000000000000 e+00f, +0.000000000000000 e+00f, +0.000000000000000 e+00f, +0.000000000000000 e+00f, +0.000000000000000 e+00f, +0.000000000000000 e+00f, +0.000000000000000 e+00f, +0.000000000000000 e+00f, +0.000000000000000 e+00f, +0.000000000000000 e+00f, +0.000000000000000 e+00f, +0.000000000000000 e+00f, +0.000000000000000 e+00f, +0.000000000000000 e+00f, +0.000000000000000 e+00f, +0.000000000000000 e+00f, +0.000000000000000 e+00f, +0.000000000000000 e+00f, +0.000000000000000 e+00f, +0.000000000000000 e+00f, +0.000000000000000 e+00f, +0.000000000000000 e+00f, +0.000000000000000 e+00f, +0.000000000000000 e+00f, +0.000000000000000 e+00f, +0.000000000000000 e+00f, +0.000000000000000 e+00f, +0.000000000000000 e+00f, +0.000000000000000 e+00f, +0.000000000000000 e+00f, +0.000000000000000 e+00f, +0.000000000000000 e+00f, +0.000000000000000 e+00f, +0.000000000000000 e+00f, +0.000000000000000 e+00f, +0.000000000000000 e+00f, +0.000000000000000 e+00f, +0.000000000000000 e+00f, +0.000000000000000 e+00f, +0.000000000000000 e+00f, +0.000000000000000 e+00f, +0.000000000000000 e+00f, +0.000000000000000 e+00f, +0.000000000000000 e+00f, +0.000000000000000 e+00f, +0.000000000000000 e+00f, +0.000000000000000 e+00f, +0.000000000000000 e+00f, +0.000000000000000 e+00f, +0.000000000000000 e+00f, +0.000000000000000 e+00f, +0.000000000000000 e+00f, +0.000000000000000 e+00f, +0.000000000000000 e+00f, +0.000000000000000 e+00f, +0.000000000000000 e+00f, +0.000000000000000 e+00f, +0.000000000000000 e+00f, +0.000000000000000 e+00f, +0.000000000000000 e+00f, +0.000000000000000 e+00f, +0.000000000000000 e+00f, +0.000000000000000 e+00f, +0.000000000000000 e+00f, +0.000000000000000 e+00f, +0.000000000000000 e+00f, +0.000000000000000 e+00f, +0.000000000000000 e+00f, +0.000000000000000 e+00f, +0.000000000000000 e+00f, +0.000000000000000 e+00f, +0.000000000000000 e+00f, +0.000000000000000 e+00f, +0.000000000000000 e+00f, +0.000000000000000 e+00f, +0.000000000000000 e+00f, +0.000000000000000 e+00f, +0.000000000000000 e+00f, +0.000000000000000 e+00f, +0.000000000000000 e+00f, +0.000000000000000 e+00f, +0.000000000000000 e+00f, +0.000000000000000 e+00f, +0.000000000000000 e+00f, +0.000000000000000 e+00f, +0.000000000000000 e+00f, +0.000000000000000 e+00f, +0.000000000000000 e+00f, +0.000000000000000 e+00f, +0.000000000000000 e+00f, +0.000000000000000 e+00f, +0.000000000000000 e+00f, +0.000000000000000 e+00f, +0.000000000000000 e+00f, +0.000000000000000 e+00f, +0.000000000000000 e+00f, +0.000000000000000 e+00f, +0.000000000000000 e+00f, +0.000000000000000 e+00f, +0.000000000000000 e+00f, +0.000000000000000 e+00f, +0.000000000000000 e+00f, +0.000000000000000 e+00f, +0.000000000000000 e+00f, +0.000000000000000 e+00f, +0.000000000000000 e+00f, +0.000000000000000 e+00f, +0.000000000000000 e+00f, +0.000000000000000 e+00f, +0.000000000000000 e+00f, +0.000000000000000 e+00f, +0.000000000000000 e+00f, +0.000000000000000 e+00f, +0.000000000000000 e+00f, +0.000000000000000 e+00f, +0.000000000000000 e+00f, +0.000000000000000 e+00f, +0.000000000000000 e+00f, +0.000000000000000 e+00f, +0.000000000000000 e+00f, +0.000000000000000 e+00f, +0.000000000000000 e+00f, +0.000000000000000 e+00f, +0.000000000000000 e+00f, +0.000000000000000 e+00f, +0.000000000000000 e+00f, +0.000000000000000 e+00f, +0.000000000000000 e+00f, +0.000000000000000 e+00f, +0.000000000000000 e+00f, +0.000000000000000 e+00f, +0.000000000000000 e+00f, +0.000000000000000 e+00f, +0.000000000000000 e+00f, +0.000000000000000 e+00f, +0.000000000000000 e+00f, +0.000000000000000 e+00f, +0.000000000000000 e+00f, +0.000000000000000 e+00f, +0.000000000000000 e+00f, +0.000000000000000 e+00f, +0.000000000000000 e+00f, +0.000000000000000 e+00f, +0.000000000000000 e+00f, +0.000000000000000 e+00f, +0.000000000000000 e+00f, +0.000000000000000 e+00f, +0.000000000000000 e+00f, +0.000000000000000 e+00f, +0.000000000000000 e+00f, +0.000000000000000 e+00f, +0.000000000000000 e+00f, +0.000000000000000 e+00f, +0.000000000000000 e+00f, +0.000000000000000 e+00f, +0.000000000000000 e+00f, +0.000000000000000 e+00f, +0.000000000000000 e+00f, +0.000000000000000 e+00f, +0.000000000000000 e+00f, +0.000000000000000 e+00f, +0.000000000000000 e+00f, +0.000000000000000 e+00f, +0.000000000000000 e+00f, +0.000000000000000 e+00f, +0.000000000000000 e+00f, +0.000000000000000 e+00f, +0.000000000000000 e+00f, +0.000000000000000 e+00f, +0.000000000000000 e+00f, +0.000000000000000 e+00f, +0.000000000000000 e+00f, +0.000000000000000 e+00f, +0.000000000000000 e+00f, +0.000000000000000 e+00f, +0.000000000000000 e+00f, +0.000000000000000 e+00f, +0.000000000000000 e+00f, +0.000000000000000 e+00f, +0.000000000000000 e+00f.

17. The apparatus of claim 1, wherein the analysis windowing function comprises at least a succession, in forward or backward order, formed by the following values or at least a sub-succession with 10 values of the following values if different from 0, with ±1% of tolerance:

−1.596869453315999 e−04, −3.021153494057143 e−04, −4.142323860121641 e−04, −5.058484031439142 e−04, −5.867737487939294 e−04, −6.666034929771656 e−04, −7.499813122143762 e−04, −8.366504004139794 e−04, −9.273096237893370 e−04, −1.023773491532728 e−03, −1.126635355725494 e−03, −1.235247794937702 e−03, −1.349627853510606 e−03, −1.470492941694331 e−03, −1.598145399394582 e−03, −1.732450700747454 e−03, −1.873473391018495 e−03, −2.021493133113876 e−03, −2.176721793926887 e−03, −2.339292362082021 e−03, −2.509298051958086 e−03, −2.686801873698675 e−03, −2.872008069419264 e−03, −3.065254982136409 e−03, −3.266686736002951 e−03, −3.476256385086407 e−03, −3.694123506258334 e−03, −3.920651988943251 e−03, −4.155963816705528 e−03, −4.399940204176431 e−03, −4.652692827862344 e−03, −4.914563787665504 e−03, −5.185653529531935 e−03, −5.465821495567872 e−03, −5.755172503953251 e−03, −6.054056765330685 e−03, −6.362583863449497 e−03, −6.680623380533122 e−03, −7.008304674718039 e−03, −7.346013465075499 e−03, −7.693816924650567 e−03, −8.051465262788033 e−03, −8.419001443263380 e−03, −8.796760749750191 e−03, −9.184751507972289 e−03, −9.582657230262597 e−03, −9.990503073705982 e−03, −1.040865597419619 e−02, −1.083716113754551 e−02, −1.127574117138621 e−02, −1.172444049589271 e−02, −1.218362542421523 e−02, −1.265334152129685 e−02, −1.313331245904876 e−02, −1.362355747138776 e−02, −1.412438986522702 e−02, −1.463576680723352 e−02, −1.515729094197161 e−02, −1.568889620430290 e−02, −1.623084814367250 e−02, −1.678306524600559 e−02, −1.734512089366117 e−02, −1.791696516251699 e−02, −1.849892453107246 e−02, −1.909097368362797 e−02, −1.969273308274951 e−02, −2.030414376031160 e−02, −2.092546711168754 e−02, −2.155660557689242 e−02, −2.219710359529686 e−02, −2.284684792818856 e−02, −2.350606779320675 e−02, −2.417463749934085 e−02, −2.485207716234951 e−02, −2.553826580898371 e−02, −2.623344061522424 e−02, −2.693746704328349 e−02, −2.764983997782559 e−02, −2.837043858580717 e−02, −2.909952486193998 e−02, −2.983695676902939 e−02, −3.058218787751172 e−02, −3.133504629493832 e−02, −3.209573641742117 e−02, −3.286409853195186 e−02, −3.363960728361352 e−02, −3.442207835192332 e−02, −3.521166997276568 e−02, −3.600820974457969 e−02, −3.681119317395579 e−02, −3.762042487257546 e−02, −3.843601741746971 e−02, −3.925772507976759 e−02, −4.008494689009130 e−02, −4.091746034850161 e−02, −4.175542154425013 e−02, −4.259863408038441 e−02, −4.344654894948344 e−02, −4.429899287523113 e−02, −4.515616616948602 e−02, −4.601786724624048 e−02, −4.688349274164030 e−02, −4.775281564045485 e−02, −4.862598509282498 e−02, −4.950274425624717 e−02, −5.038242975874127 e−02, −5.126474204655663 e−02, −5.214974857230398 e−02, −5.303718358615044 e−02, −5.392644753556616 e−02, −5.481729406855359 e−02, −5.570983057565210 e−02, −5.660384311081047 e−02, −5.749879655200370 e−02, −5.839451321393058 e−02, −5.929116747072080 e−02, −6.018848884279070 e−02, −6.108576415855094 e−02, −6.198268202511926 e−02, −6.287933502598060 e−02, −6.377542359879805 e−02, −6.467025548071184 e−02, −6.556352962710620 e−02, −6.645533804325808 e−02, −6.734542216184526 e−02, −6.823317113969737 e−02, −6.911832800881393 e−02, −7.000099017198280 e−02, −7.088091415536939 e−02, −7.175751581450866 e−02, −7.263057011354321 e−02, −7.350020923324756 e−02, −7.436618116832702 e−02, −7.522784961377151 e−02, −7.608493286734087 e−02, −7.693750413779520 e−02, −7.778525942347714 e−02, −7.862751920094575 e−02, −7.946399769633587 e−02, −8.029480247839879 e−02, −8.111965623403654 e−02, −8.193789640255647 e−02, −8.274924535373614 e−02, −8.355381170261278 e−02, −8.435134905678848 e−02, −8.514125464087215 e−02, −8.592328028689659 e−02, −8.669753354886602 e−02, −8.746379123238275 e−02, −8.822149831804039 e−02, −8.897043074644968 e−02, −8.971069341834263 e−02, −9.044201341183719 e−02, −9.116374329727489 e−02, −9.187564084638347 e−02, −9.257786640497777 e−02, −9.327014538321736 e−02, −9.395176975347193 e−02, −9.462246851310178 e−02, −9.528240981433814 e−02, −9.593137735886889 e−02, −9.656876884228789 e−02, −9.719438533739366 e−02, −9.780843257659243 e−02, −9.841075978146442 e−02, −9.900085534600200 e−02, −9.957851303827886 e−02, −1.001438325530028 e−01, −1.006965654660066 e−01, −1.012361165314596 e−01, −1.017622262660318 e−01, −1.022749718234132 e−01, −1.027741036495644 e−01, −1.032590485916072 e−01, −1.037296416381658 e−01, −1.041861222641119 e−01, −1.046283222746241 e−01, −1.050556674062305 e−01, −1.054680247057000 e−01, −1.058657014776354 e−01, −1.062485747526411 e−01, −1.066160875985523 e−01, −1.069680384993124 e−01, −1.073045851468520 e−01, −1.076255384835563 e−01, −1.079303623240916 e−01, −1.082188709931267 e−01, −1.084912299471198 e−01, −1.087472718159103 e−01, −1.089864959432877 e−01, −1.092087422379003 e−01, −1.094141900597718 e−01, −1.096026598727515 e−01, −1.097736146613313 e−01, −1.099268894481712 e−01, −1.100626919008929 e−01, −1.101808861640070 e−01, −1.102809952914802 e−01, −1.103629709312858 e−01, −1.104271876052675 e−01, −1.104735471815890 e−01, −1.105014789286600 e−01, −1.105108362290460 e−01, −1.105018987914554 e−01, −1.104745246005427 e−01, −1.104281465492726 e−01, −1.103625464011331 e−01, −1.102778601442104 e−01, −1.101739218186236 e−01, −1.100502639286607 e−01, −1.099067826823344 e−01, −1.097437360338336 e−01, −1.095610353779043 e−01, −1.093582462693348 e−01, −1.091353125572511 e−01, −1.088925531745051 e−01, −1.086298673699289 e−01, −1.083467335729228 e−01, −1.080429791821427 e−01, −1.077187842899125 e−01, −1.073739938306107 e−01, −1.070081184450032 e−01, −1.066210413471652 e−01, −1.062130155324388 e−01, −1.057838954855888 e−01, −1.053331389663558 e−01, −1.048606145834788 e−01, −1.043666017588026 e−01, −1.038509823636319 e−01, −1.033132401525343 e−01, −1.027532566706549 e−01, −1.021713124102434 e−01, −1.015673163469357 e−01, −1.009408032844788 e−01, −1.002916459024019 e−01, −9.962005506126154 e−02, −9.892587447037898 e−02, −9.820858231161539 e−02, −9.746803229469267 e−02, −9.670445315437526 e−02, −9.591769653314886 e−02, −9.510723623306666 e−02, −9.427290387369003 e−02, −9.341489003828900 e−02, −9.253303383231506 e−02, −9.162682426346705 e−02, −9.069614104466586 e−02, −8.974125216128212 e−02, −8.876201954716677 e−02, −8.775790063882420 e−02, −8.672877689119252 e−02, −8.567495161533510 e−02, −8.459627389188201 e−02, −8.349213839083708 e−02, −8.236235749389448 e−02, −8.120716401834208 e−02, −8.002639902061687 e−02, −7.881950797067065 e−02, −7.758626878445929 e−02, −7.632679536516856 e−02, −7.504088747769501 e−02, −7.372803129789816 e−02, −7.238806162166744 e−02, −7.102116211954443 e−02, −6.962720872934396 e−02, −6.820576796149519 e−02, −6.675671622392269 e−02, −6.528023606863240 e−02, −6.377611429172260 e−02, −6.224374611498080 e−02, −6.068292908100376 e−02, −5.909386001558149 e−02, −5.747627430502456 e−02, −5.582945016301614 e−02, −5.415316322402774 e−02, −5.244768784057990 e−02, −5.071287102956145 e−02, −4.894812724598650 e−02, −4.715324945932696 e−02, −4.532841381541464 e−02, −4.347347112195197 e−02, −4.158794238398249 e−02, −3.967162909873025 e−02, −3.772461300253332 e−02, −3.574664020854284 e−02, −3.373712599806719 e−02, −3.169587609244436 e−02, −2.962308489442885 e−02, −2.751857552683018 e−02, −2.538179830690266 e−02, −2.321255714428171 e−02, −2.101100771772769 e−02, −1.877689096555516 e−02, −1.650953674438219 e−02, −1.420871083118669 e−02, −1.187461378850388 e−02, −9.507008996713286 e−03, −7.105225746748432 e−03, −4.669099247423082 e−03, −2.198970714838444 e−03, +3.052506679844099 e−04, +2.844096748870384 e−03, +5.417800316971459 e−03, +8.026287894631955 e−03, +1.066976124794342 e−02, +1.334869917032908 e−02, +1.606331521084708 e−02, +1.881355950582949 e−02, +2.159970134663663 e−02, +2.442232147839131 e−02, +2.728156010437695 e−02, +3.017712138573929 e−02, +3.310912443052597 e−02, +3.607810469851272 e−02, +3.908419391833869 e−02, +4.212712008909140 e−02, +4.520702759803914 e−02, +4.832447852355055 e−02, +5.147966118159461 e−02, +5.467238802204326 e−02, +5.790284080082958 e−02, +6.117156717220185 e−02, +6.447866054615346 e−02, +6.782376212130986 e−02, +7.120692575100979 e−02, +7.462862199422061 e−02, +7.808896236959446 e−02, +8.158769578329894 e−02, +8.512490568723846 e−02, +8.870101069974845 e−02, +9.231608110264714 e−02, +9.596983987496970 e−02, +9.966236893806717 e−02, +1.033941063338643 e−01, +1.071650779014335 e−01, +1.109748994439795 e−01, +1.148235927259266 e−01, +1.187115850305241 e−01, +1.226388834300689 e−01, +1.266050731283809 e−01, +1.306101067250375 e−01, +1.346543064817742 e−01, +1.387376249190578 e−01, +1.428596447589721 e−01, +1.470203170721216 e−01, +1.512199592605080 e−01, +1.554584725339102 e−01, +1.597353438179875 e−01, +1.640504702561671 e−01, +1.684041609371527 e−01, +1.727963503982179 e−01, +1.772265953627290 e−01, +1.816947894623263 e−01, +1.862011624788949 e−01, +1.907455489457267 e−01, +1.953273880886783 e−01, +1.999464539304762 e−01, +2.046028558464008 e−01, +2.092963206850239 e−01, +2.140261955702662 e−01, +2.187922274259156 e−01, +2.235945635254679 e−01, +2.284329840640989 e−01, +2.333068981094213 e−01, +2.382160219461597 e−01, +2.431603785542250 e−01, +2.481396077816722 e−01, +2.531529721334063 e−01, +2.582001739497298 e−01, +2.632813508034234 e−01, +2.683961570569586 e−01, +2.735437630266799 e−01, +2.787237550375912 e−01, +2.839361392493072 e−01, +2.891805257722012 e−01, +2.944561228780392 e−01, +2.997624255177811 e−01, +3.050992195689690 e−01, +3.104659867604553 e−01, +3.158619077906196 e−01, +3.212865260033979 e−01, +3.267397428773339 e−01, +3.322210551086769 e−01, +3.377295561726898 e−01, +3.432647335893443 e−01, +3.488264676990591 e−01, +3.544142074632647 e−01, +3.600269656734629 e−01, +3.656640377499646 e−01, +3.713250061671226 e−01, +3.770091190097118 e−01, +3.827152968157059 e−01, +3.884429045609680 e−01, +3.941917466962361 e−01, +3.999611859760947 e−01, +4.057501420991821 e−01, +4.115579429637846 e−01, +4.173843265025887 e−01, +4.232286297916428 e−01, +4.290897820858789 e−01, +4.349669624916473 e−01, +4.408596056709005 e−01, +4.467668696607166 e−01, +4.526876397402144 e−01, +4.586211456831769 e−01, +4.645669547719424 e−01, +4.705242008503956 e−01, +4.764915897192549 e−01, +4.824682887794052 e−01, +4.884539254831315 e−01, +4.944476636179056 e−01, +5.004481977619742 e−01, +5.064545550235134 e−01, +5.124661018959751 e−01, +5.184818933365749 e−01, +5.245006748662190 e−01, +5.305215796893860 e−01, +5.365441251369431 e−01, +5.425674372882107 e−01, +5.485902506852811 e−01, +5.546116774259739 e−01, +5.606312044701524 e−01, +5.666478652857275 e−01, +5.726602391687222 e−01, +5.786672646386708 e−01, +5.846682453966959 e−01, +5.906621680078100 e−01, +5.966477035050948 e−01, +6.026239249993590 e−01, +6.085903032056262 e−01, +6.145458904162185 e−01, +6.204893201838491 e−01, +6.264196163765745 e−01, +6.323361944662236 e−01, +6.382380808188793 e−01, +6.441239094712802 e−01, +6.499926319211775 e−01, +6.558435212204078 e−01, +6.616755522321309 e−01, +6.674874032292857 e−01, +6.732781108033908 e−01, +6.790470657166684 e−01, +6.847932667399612 e−01, +6.905153235578969 e−01, +6.962122668445681 e−01, +7.018835463513400 e−01, +7.075281787629503 e−01, +7.131447476468400 e−01, +7.187322544823347 e−01, +7.242901217843889 e−01, +7.298174107967581 e−01, +7.353128213893310 e−01, +7.407754721062685 e−01, +7.462048970975652 e−01, +7.516001985652684 e−01, +7.569600449843341 e−01, +7.622834795152550 e−01, +7.675699252273948 e−01, +7.728184915997067 e−01, +7.780279710901641 e−01, +7.831974571624924 e−01,

+7.883263448127340 e−01, +7.934137241269077 e−01, +7.984583859818390 e−01, +8.034595539057413 e−01, +8.084168767164887 e−01, +8.133295347030278 e−01, +8.181962433248811 e−01, +8.230162284197827 e−01, +8.277892271515950 e−01, +8.325145336568091 e−01, +8.371909942430671 e−01, +8.418178561101360 e−01, +8.463947757326752 e−01, +8.509211545601609 e−01, +8.553961300139363 e−01, +8.598190417223652 e−01, +8.641894434050258 e−01, +8.685068980898102 e−01, +8.727709688046102 e−01, +8.769788376631916 e−01, +8.811334436653052 e−01, +8.852318659908962 e−01, +8.892739843568178 e−01, +8.932596784799233 e−01, +8.971888108843806 e−01, +9.010608486625941 e−01, +9.048748835980528 e−01, +9.086304531070754 e−01, +9.123275405380156 e−01, +9.159657608120536 e−01, +9.195443573144829 e−01, +9.230629478622332 e−01, +9.265215299450000 e−01, +9.299198500625820 e−01, +9.332574012340955 e−01, +9.365339988633418 e−01, +9.397497768500882 e−01, +9.429045261728636 e−01, +9.459977028429117 e−01, +9.490292643083790 e−01, +9.519996619967281 e−01, +9.549088408436811 e−01, +9.577562383751640 e−01, +9.605417649811824 e−01, +9.632658122557368 e−01, +9.659284562011029 e−01, +9.685294510301206 e−01, +9.710688896122810 e−01, +9.735472021876628 e−01, +9.759644676274450 e−01, +9.783204156360773 e−01, +9.806151639385083 e−01, +9.828492160865892 e−01, +9.850226760127131 e−01, +9.871352538808781 e−01, +9.891871802564161 e−01, +9.911792082081333 e−01, +9.931117453856605 e−01, +9.949848494122985 e−01, +9.967989944502682 e−01, +9.985550647085534 e−01, +1.000253445050194 e+00, +1.001894024615659 e+00, +1.003477185929786 e+00, +1.005003807883761 e+00, +1.006474342231823 e+00, +1.007888812850102 e+00, +1.009247722934429 e+00, +1.010552057109195 e+00, +1.011802420624526 e+00, +1.012999036304394 e+00, +1.014142538208007 e+00, +1.015233969130880 e+00, +1.016273931967023 e+00, +1.017262593268930 e+00, +1.018200610205248 e+00, +1.019089129704898 e+00, +1.019928842669923 e+00, +1.020719983374545 e+00, +1.021463262031346 e+00, +1.022159867011177 e+00, +1.022810581114847 e+00, +1.023415781467653 e+00, +1.023976320927187 e+00, +1.024493524092612 e+00, +1.024968218100715 e+00, +1.025400734608122 e+00, +1.025791922603958 e+00, +1.026143150540689 e+00, +1.026455340400072 e+00, +1.026728963502498 e+00, +1.026964914246647 e+00, +1.027164510654160 e+00, +1.027328632612924 e+00, +1.027457725038440 e+00, +1.027552729180790 e+00, +1.027615074932096 e+00, +1.027645580283665 e+00, +1.027644462380432 e+00, +1.027612681261584 e+00, +1.027551936393756 e+00, +1.027463246660797 e+00, +1.027346944848234 e+00, +1.027203976311704 e+00, +1.027035903410657 e+00, +1.026843704381356 e+00, +1.026627771359327 e+00, +1.026389068000259 e+00, +1.026129124951269 e+00, +1.025848782597774 e+00, +1.025548201799728 e+00, +1.025228357342061 e+00, +1.024891029860151 e+00, +1.024537134749709 e+00, +1.024166724015001 e+00, +1.023780698019775 e+00, +1.023380803775376 e+00, +1.022967885528204 e+00, +1.022541888689137 e+00, +1.022103695693341 e+00, +1.021655115592693 e+00, +1.021196819229254 e+00, +1.020728359657958 e+00, +1.020250686272421 e+00, +1.019766121526662 e+00, +1.019275334687329 e+00, +1.018777362174335 e+00, +1.018273081302452 e+00, +1.017765178792830 e+00, +1.017253984284701 e+00, +1.016737542074604 e+00, +1.016217355867531 e+00, +1.015698328083719 e+00, +1.015181679856847 e+00, +1.014665311686846 e+00, +1.014158817803440 e+00, +1.013683181980586 e+00, +1.013249071090664 e+00, +1.012854331657942 e+00, +1.012450620480768 e+00, +1.011948006992127 e+00, +1.011349594569779 e+00, +1.010750807770724 e+00, +1.010189090179223 e+00, +1.009640487251585 e+00, +1.009094771053394 e+00, +1.008557961167850 e+00, +1.008032659941965 e+00, +1.007517375307989 e+00, +1.007011287608451 e+00, +1.006514430011155 e+00, +1.006026890813957 e+00, +1.005548764575910 e+00, +1.005079874697786 e+00, +1.004619788163424 e+00, +1.004168417268956 e+00, +1.003726014625139 e+00, +1.003292461479605 e+00, +1.002867268893035 e+00, +1.002450315292720 e+00, +1.002041847623544 e+00, +1.001641769115897 e+00, +1.001249637387833 e+00, +1.000865334924641 e+00, +1.000489068954641 e+00, +1.000120698237067 e+00, +9.997597357106623 e−01, +9.994060799749374 e−01, +9.990600138594018 e−01, +9.987214414655692 e−01, +9.983898865406841 e−01, +9.980652196577338 e−01, +9.977476599094836 e−01, +9.974370849972721 e−01, +9.971330321102652 e−01, +9.968354071802502 e−01, +9.965444836911705 e−01, +9.962601672340514 e−01, +9.959819947971522 e−01, +9.957098545943852 e−01, +9.954439865572462 e−01, +9.951842733288886 e−01, +9.949302413030897 e−01, +9.946817924874576 e−01, +9.944392047205887 e−01, +9.942024045863540 e−01, +9.939709658067042 e−01, +9.937448009691057 e−01, +9.935241604969254 e−01, +9.933089182704574 e−01, +9.930985748592784 e−01, +9.928930430130044 e−01, +9.926926485907741 e−01, +9.924973655191176 e−01, +9.923068103443909 e−01, +9.921208874284833 e−01, +9.919397899901643 e−01, +9.917633778190438 e−01, +9.915911837376036 e−01, +9.914231780519580 e−01, +9.912597642374404 e−01, +9.911009195707438 e−01, +9.909461904886675 e−01, +9.907954498484041 e−01, +9.906489032572322 e−01, +9.905064710654814 e−01, +9.903677893656558 e−01, +9.902328499802091 e−01, +9.901019951653361 e−01, +9.899751611066148 e−01, +9.898518794779545 e−01, +9.897320682428268 e−01, +9.896160337369861 e−01, +9.895037256870947 e−01, +9.893947359604699 e−01, +9.892890160408989 e−01, +9.891868774704359 e−01, +9.890882840931410 e−01, +9.889928511129679 e−01, +9.889005321235379 e−01, +9.888116182908468 e−01, +9.887260333430423 e−01, +9.886433365303475 e−01, +9.885634927535989 e−01, +9.884868721088945 e−01, +9.884134697413018 e−01, +9.883429020724473 e−01, +9.882751039537586 e−01, +9.882103306444820 e−01, +9.881485041748238 e−01, +9.880892168751595 e−01, +9.880324626554831 e−01, +9.879786335149536 e−01, +9.879277114724612 e−01, +9.878792663495038 e−01, +9.878332150629403 e−01, +9.877898261218510 e−01, +9.877490592657352 e−01, +9.877105653505679 e−01, +9.876743442038471 e−01, +9.876407405135295 e−01, +9.876096955295567 e−01, +9.875807496078497 e−01, +9.875538464766127 e−01, +9.875293349435258 e−01, +9.875072021876561 e−01, +9.874870704481152 e−01, +9.874688908826080 e−01, +9.874529447589979 e−01, +9.874391758112012 e−01, +9.874271920836210 e−01, +9.874169741527905 e−01, +9.874088727307169 e−01, +9.874028477167635 e−01, +9.873984685207834 e−01, +9.873956821201697 e−01, +9.873948143463702 e−01, +9.873958301311858 e−01, +9.873983326194351 e−01, +9.874022834012905 e−01, +9.874080027710336 e−01, +9.874154551873394 e−01, +9.874242488204272 e−01, +9.874343401290739 e−01, +9.874460335035745 e−01, +9.874592688338504 e−01, +9.874736235387018 e−01, +9.874890696412385 e−01, +9.875059727945840 e−01, +9.875243137719285 e−01, +9.875436862847529 e−01, +9.875640274936844 e−01, +9.875856201221136 e−01, +9.876084084448705 e−01, +9.876319996758224 e−01, +9.876563785063032 e−01, +9.876819048329899 e−01, +9.877085492327816 e−01, +9.877358921155149 e−01, +9.877638696088412 e−01, +9.877927754855115 e−01, +9.878225576787804 e−01, +9.878528193014621 e−01, +9.878835445497628 e−01, +9.879150968481590 e−01, +9.879474521328961 e−01, +9.879801976843903 e−01, +9.880132731565830 e−01, +9.880469724750991 e−01, +9.880812445673735 e−01, +9.881156946084619 e−01, +9.881503106987573 e−01, +9.881854620136666 e−01, +9.882211314188272 e−01, +9.882569137253582 e−01, +9.882927446902245 e−01, +9.883289032519310 e−01, +9.883653317154473 e−01, +9.884016382257884 e−01, +9.884378310018685 e−01, +9.884743146700878 e−01, +9.885110753693968 e−01, +9.885476787868710 e−01, +9.885840418353093 e−01, +9.886204379327659 e−01, +9.886568414746639 e−01, +9.886929275063397 e−01, +9.887287200468966 e−01, +9.887645868459630 e−01, +9.888004757085318 e−01, +9.888359174300858 e−01, +9.888708540445242 e−01, +9.889056416611736 e−01, +9.889402846310907 e−01, +9.889744320992592 e−01, +9.890080679866394 e−01, +9.890415110770159 e−01, +9.890747269455915 e−01, +9.891073295256775 e−01, +9.891393036472682 e−01, +9.891710038703801 e−01, +9.892024062799223 e−01, +9.892331093959095 e−01, +9.892631024032380 e−01, +9.892927650908963 e−01, +9.893220982848433 e−01, +9.893507219573624 e−01, +9.893786032000026 e−01, +9.894060580815116 e−01, +9.894330645494204 e−01, +9.894592636950934 e−01, +9.894846746832306 e−01, +9.895096919388534 e−01, +9.895343083314785 e−01, +9.895581152602352 e−01, +9.895810813422480 e−01, +9.896035553161019 e−01, +9.896255512296797 e−01, +9.896467469067676 e−01, +9.896671650245172 e−01, +9.896871706698203 e−01, +9.897067365020641 e−01, +9.897254458138418 e−01, +9.897432947038028 e−01, +9.897606930400666 e−01, +9.897776834824588 e−01, +9.897939374675170 e−01, +9.898094478563998 e−01, +9.898245305815332 e−01, +9.898391682249337 e−01, +9.898530133261707 e−01, +9.898661175792055 e−01, +9.898789278944983 e−01, +9.898914705684924 e−01, +9.899033504013042 e−01, +9.899145471163803 e−01, +9.899254194103574 e−01, +9.899359976303029 e−01, +9.899459823437818 e−01, +9.899554202030650 e−01, +9.899647016766845 e−01, +9.899738352794291 e−01, +9.899824494486951 e−01, +9.899905595941995 e−01, +9.899985686323577 e−01, +9.900065116928948 e−01, +9.900140555182825 e−01, +9.900212405447888 e−01, +9.900284805353695 e−01, +9.900358124222742 e−01, +9.900428956722681 e−01, +9.900497484789281 e−01, +9.900567489573141 e−01, +9.900639252344197 e−01, +9.900709561632662 e−01, +9.900778969424803 e−01, +9.900851772980046 e−01, +9.900928358611601 e−01, +9.901005198590931 e−01, +9.901082439265390 e−01, +9.901163920607219 e−01, +9.901250018173793 e−01, +9.901337646053293 e−01, +9.901427479709606 e−01, +9.901523931998540 e−01, +9.901627402679979 e−01, +9.901734275350572 e−01, +9.901844600451093 e−01, +9.901962127540933 e−01, +9.902087332329851 e−01, +9.902217409846106 e−01, +9.902353097103640 e−01, +9.902498637985275 e−01, +9.902654188005916 e−01, +9.902815836378273 e−01, +9.902983686695558 e−01, +9.903161882791064 e−01, +9.903351096966241 e−01, +9.903548501470234 e−01, +9.903754652821575 e−01, +9.903973477947732 e−01, +9.904205084933333 e−01,

+9.904445786599008 e−01, +9.904695808487622 e−01, +9.904959297726740 e−01, +9.905236810016560 e−01, +9.905525289918011 e−01, +9.905825150202904 e−01, +9.906140262079994 e−01, +9.906470660818262 e−01, +9.906812569810133 e−01, +9.907166224339236 e−01, +9.907535876784416 e−01, +9.907922087340426 e−01, +9.908321697026107 e−01, +9.908734943143861 e−01, +9.909165464981378 e−01, +9.909613313790248 e−01, +9.910074971074613 e−01, +9.910550740962871 e−01, +9.911044737993845 e−01, +9.911557226040716 e−01, +9.912084614290896 e−01, +9.912627029879084 e−01, +9.913188323156490 e−01, +9.913768610980639 e−01, +9.914364276145792 e−01, +9.914975411562229 e−01, +9.915605826937839 e−01, +9.916255751593622 e−01, +9.916921826078263 e−01, +9.917604214872976 e−01, +9.918306597984429 e−01, +9.919028873284097 e−01, +9.919767175562684 e−01, +9.920521593387949 e−01, +9.921296166135889 e−01, +9.922091101818779 e−01, +9.922902757201201 e−01, +9.923730982524657 e−01, +9.924579135466506 e−01, +9.925447043512063 e−01, +9.926331018900273 e−01, +9.927231225056266 e−01, +9.928151658609977 e−01, +9.929092387372991 e−01, +9.930049538427406 e−01, +9.931022798104318 e−01, +9.932015434077218 e−01, +9.933027281437943 e−01, +9.934054751445924 e−01, +9.935098037935540 e−01, +9.936161084869942 e−01, +9.937243666117925 e−01, +9.938341389810342 e−01, +9.939453714404443 e−01, +9.940583985614073 e−01, +9.941732232809857 e−01, +9.942895145656371 e−01, +9.944072763730046 e−01, +9.945268452163670 e−01, +9.946481676207727 e−01, +9.947708034711511 e−01, +9.948947222146535 e−01, +9.950203031067961 e−01, +9.951475444242728 e−01, +9.952760608735062 e−01, +9.954058173659507 e−01, +9.955371298969039 e−01, +9.956699511040611 e−01, +9.958038713694317 e−01, +9.959388575029996 e−01, +9.960752523364563 e−01, +9.962130271017117 e−01, +9.963517811272741 e−01, +9.964914827801233 e−01, +9.966324689957675 e−01, +9.967746939976430 e−01, +9.969177298776669 e−01, +9.970615306490058 e−01, +9.972064329530154 e−01, +9.973524075591346 e−01, +9.974990583293081 e−01, +9.976463479353705 e−01, +9.977945971317506 e−01, +9.979437430375855 e−01, +9.980933404947205 e−01, +9.982433336615963 e−01, +9.983940572002874 e−01, +9.985454907974421 e−01, +9.986972567262494 e−01, +9.988493116887893 e−01, +9.990019468868200 e−01, +9.991550977367476 e−01, +9.993083430214909 e−01, +9.994615765165296 e−01, +9.996150231216515 e−01, +9.997689221333534 e−01, +9.999235128481329 e−01, +1.000076493002599 e+00, +1.000231131275969 e+00, +1.000385125142624 e+00, +1.000538713539491 e+00, +1.000692135698996 e+00, +1.000845616726739 e+00, +1.000999050218361 e+00, +1.001152013920163 e+00, +1.001304442627610 e+00, +1.001456627881216 e+00, +1.001608526000461 e+00, +1.001759757645423 e+00, +1.001910301800365 e+00, +1.002060493867275 e+00, +1.002210277420412 e+00, +1.002359204811906 e+00, +1.002507212061815 e+00, +1.002654620794815 e+00, +1.002801392925948 e+00, +1.002947129400411 e+00, +1.003091799884742 e+00, +1.003235742261295 e+00, +1.003378909587027 e+00, +1.003520870253791 e+00, +1.003661577107433 e+00, +1.003801368578070 e+00, +1.003940212001390 e+00, +1.004077702628435 e+00, +1.004213810320699 e+00, +1.004348879757933 e+00, +1.004482876599046 e+00, +1.004615386562846 e+00, +1.004746360645254 e+00, +1.004876116715471 e+00, +1.005004618375781 e+00, +1.005131475392675 e+00, +1.005256684766584 e+00, +1.005380628601598 e+00, +1.005503275059852 e+00, +1.005624178100742 e+00, +1.005743282364652 e+00, +1.005860927032197 e+00, +1.005977115074116 e+00, +1.006091510392348 e+00, +1.006204114728125 e+00, +1.006315265680367 e+00, +1.006424907424988 e+00, +1.006532594023395 e+00, +1.006638301298317 e+00, +1.006742427727669 e+00, +1.006844991973082 e+00, +1.006945629196305 e+00, +1.007044321511378 e+00, +1.007141399219649 e+00, +1.007236829559076 e+00, +1.007330218597112 e+00, +1.007421572075267 e+00, +1.007511294570522 e+00, +1.007599401798709 e+00, +1.007685518441567 e+00, +1.007769625953741 e+00, +1.007852064386603 e+00, +1.007932817703069 e+00, +1.008011514905126 e+00, +1.008088176165563 e+00, +1.008163211111724 e+00, +1.008236628017949 e+00, +1.008308033204578 e+00, +1.008377415429783 e+00, +1.008445148098658 e+00, +1.008511247273756 e+00, +1.008575370579197 e+00, +1.008637540589491 e+00, +1.008698144207627 e+00, +1.008757190321980 e+00, +1.008814310258779 e+00, +1.008869515256392 e+00, +1.008923196622113 e+00, +1.008975366811245 e+00, +1.009025659761512 e+00, +1.009074101779034 e+00, +1.009121111323685 e+00, +1.009166718967367 e+00, +1.009210565968291 e+00, +1.009252657087366 e+00, +1.009293362609020 e+00, +1.009332706372757 e+00, +1.009370366213570 e+00, +1.009406398832440 e+00, +1.009441237185677 e+00, +1.009474905002031 e+00, +1.009507017171120 e+00, +1.009537576990303 e+00, +1.009566978740742 e+00, +1.009595264293017 e+00, +1.009622122007090 e+00, +1.009647608302352 e+00, +1.009672145744679 e+00, +1.009695757189383 e+00, +1.009718066587100 e+00, +1.009739084785160 e+00, +1.009759212016967 e+00, +1.009778504921465 e+00, +1.009796675060142 e+00, +1.009813790867919 e+00, +1.009830274807737 e+00, +1.009846137382005 e+00, +1.009860979702382 e+00, +1.009874817539016 e+00, +1.009888083631667 e+00, +1.009900853103284 e+00, +1.009912839830312 e+00, +1.009924092276850 e+00, +1.009934992836975 e+00, +1.009945546632798 e+00, +1.009955384765721 e+00, +1.009964547970550 e+00, +1.009973486342123 e+00, +1.009982268770147 e+00, +1.009990580458388 e+00, +1.009998459694088 e+00, +1.010006298177305 e+00, +1.010014110835447 e+00, +1.010021537788250 e+00, +1.010028618428735 e+00, +1.010035791136646 e+00, +1.010043112228827 e+00, +1.010050254076988 e+00, +1.010057245369122 e+00, +1.010064471863242 e+00, +1.010071952131355 e+00, +1.010079338752086 e+00, +1.010086669402375 e+00, +1.010094366238073 e+00, +1.010102470533325 e+00, +1.010110642277138 e+00, +1.010118917317053 e+00, +1.010127706776959 e+00, +1.010137026407425 e+00, +1.010146497096682 e+00, +1.010156127541843 e+00, +1.010166316200025 e+00, +1.010177110711677 e+00, +1.010188205550670 e+00, +1.010199631706068 e+00, +1.010211755260102 e+00, +1.010224555569669 e+00, +1.010237629352925 e+00, +1.010251003469427 e+00, +1.010265134075557 e+00, +1.010280073997043 e+00, +1.010295468653759 e+00, +1.010311300308220 e+00, +1.010327891493345 e+00, +1.010345234996637 e+00, +1.010362995486892 e+00, +1.010381216558204 e+00, +1.010400316698172 e+00, +1.010420292023388 e+00, +1.010440717183162 e+00, +1.010461564316351 e+00, +1.010483206256578 e+00, +1.010505666262059 e+00, +1.010528615445659 e+00, +1.010552068219883 e+00, +1.010576380809038 e+00, +1.010601521285347 e+00, +1.010627072440648 e+00, +1.010653027053931 e+00, +1.010679788081867 e+00, +1.010707375229772 e+00, +1.010735421976626 e+00, +1.010763905869062 e+00, +1.010793149909083 e+00, +1.010823120603859 e+00, +1.010853429760676 e+00, +1.010884078284304 e+00, +1.010915454361544 e+00, +1.010947547074519 e+00, +1.010979946214537 e+00, +1.011012627395599 e+00, +1.011045953108263 e+00, +1.011079907971760 e+00, +1.011114097416553 e+00, +1.011148486293359 e+00, +1.011183400596362 e+00, +1.011218823992338 e+00, +1.011254397791134 e+00, +1.011290126474096 e+00, +1.011326374295525 e+00, +1.011363082075863 e+00, +1.011399769951629 e+00, +1.011436384522522 e+00, +1.011473302008831 e+00, +1.011510547051838 e+00, +1.011547787220495 e+00, +1.011584996312149 e+00, +1.011622454130127 e+00, +1.011660075693276 e+00, +1.011697416504599 e+00, +1.011734462313348 e+00, +1.011771627262926 e+00, +1.011808919793469 e+00, +1.011845938738977 e+00, +1.011882624964772 e+00, +1.011919264025716 e+00, +1.011955790122897 e+00, +1.011991788266365 e+00, +1.012027240794153 e+00, +1.012062525726662 e+00, +1.012097630839309 e+00, +1.012132151631041 e+00, +1.012166035659198 e+00, +1.012199583936457 e+00, +1.012232734564333 e+00, +1.012265064558555 e+00, +1.012296549102454 e+00, +1.012327560477901 e+00, +1.012358082400925 e+00, +1.012387708001513 e+00, +1.012416383754384 e+00, +1.012444410627777 e+00, +1.012471723038292 e+00, +1.012497890726292 e+00, +1.012522883349504 e+00, +1.012547069718292 e+00, +1.012570434021054 e+00, +1.012592573402938 e+00, +1.012613430563370 e+00, +1.012633295255708 e+00, +1.012652102923549 e+00, +1.012669436800254 e+00, +1.012685277016726 e+00, +1.012699998432300 e+00, +1.012713572256585 e+00, +1.012725564992284 e+00, +1.012735914876099 e+00, +1.012744934005791 e+00, +1.012752577651415 e+00, +1.012758443858682 e+00, +1.012762496111508 e+00, +1.012765062889864 e+00, +1.012766104774385 e+00, +1.012765214703761 e+00, +1.012762356719162 e+00, +1.012757865052107 e+00, +1.012751685362581 e+00, +1.012743376077777 e+00, +1.012732896174196 e+00, +1.012720605477780 e+00, +1.012706484200181 e+00, +1.012690130527749 e+00, +1.012671486975730 e+00, +1.012650842226435 e+00, +1.012628146441024 e+00, +1.012603012552473 e+00, +1.012575427778520 e+00, +1.012545750134419 e+00, +1.012513922299362 e+00, +1.012479473490919 e+00, +1.012442344023191 e+00, +1.012402887777359 e+00, +1.012361105121003 e+00, +1.012316638832887 e+00, +1.012269448366181 e+00, +1.012219809594718 e+00, +1.012167638122170 e+00, +1.012112494069630 e+00, +1.012054359992419 e+00, +1.011993638380370 e+00, +1.011930323929956 e+00, +1.011864000215460 e+00, +1.011794588601900 e+00, +1.011722351640686 e+00, +1.011647223869087 e+00, +1.011568814072372 e+00, +1.011487118812239 e+00, +1.011402518267713 e+00, +1.011314978002071 e+00, +1.011224048846073 e+00, +1.011129654652857 e+00, +1.011032094993283 e+00, +1.010931324278397 e+00, +1.010826951260377 e+00, +1.010718941241622 e+00, +1.010607614747097 e+00, +1.010492924436361 e+00, +1.010374455963019 e+00, +1.010252160684281 e+00, +1.010126353960416 e+00, +1.009996954741022 e+00, +1.009863488188648 e+00, +1.009725892479312 e+00, +1.009584519851048 e+00, +1.009439365159565 e+00, +1.009290060983833 e+00, +1.009136529912757 e+00, +1.008978985140192 e+00, +1.008817301052548 e+00, +1.008651020208035 e+00, +1.008480124067563 e+00, +1.008305027555130 e+00, +1.008125704897790 e+00, +1.007941686009594 e+00, +1.007752833675443 e+00, +1.007559349517223 e+00, +1.007361141859567 e+00, +1.007157827358150 e+00, +1.006949385806640 e+00, +1.006736153885735 e+00, +1.006518049344503 e+00, +1.006294572836803 e+00, +1.006065603926773 e+00, +1.005831403532018 e+00, +1.005591890638477 e+00, +1.005346642064537 e+00, +1.005095592119373 e+00, +1.004839030117511 e+00, +1.004576865704429 e+00, +1.004308630055050 e+00, +1.004034214698496 e+00, +1.003753871618025 e+00, +1.003467498305776 e+00, +1.003174639260358 e+00, +1.002875211027427 e+00, +1.002569500413888 e+00, +1.002257424578396 e+00, +1.001938530973887 e+00, +1.001612710105563 e+00, +1.001280195339107 e+00, +1.000940870545871 e+00, +1.000594272975683 e+00, +1.000240322030139 e+00, +9.998793163292398 e−01, +9.995111701168786 e−01, +9.991354132324841 e−01, +9.987519222567783 e−01, +9.983609218719522 e−01, +9.979623130227679 e−01, +9.975556740764708 e−01, +9.971409288327860 e−01, +9.967183432488375 e−01, +9.962878170229250 e−01, +9.958488863050556 e−01, +9.954014561350919 e−01, +9.949458000048871 e−01, +9.944818543153893 e−01, +9.940092149931687 e−01, +9.935277331184579 e−01, +9.930375282832211 e−01, +9.925387139793089 e−01, +9.920313495175566 e−01, +9.915146560759479 e−01, +9.909871983144850 e−01, +9.904515643208522 e−01, +9.899136802423638 e−01, +9.893635427366756 e−01, +9.887777731550811 e−01, +9.881930623810997 e−01, +9.877024911349694 e−01, +9.867719346048082 e−01, +9.859422591203311 e−01, +9.851327817259932 e−01, +9.843446542813931 e−01, +9.835667898378924 e−01, +9.827784388364600 e−01, +9.819697981806308 e−01, +9.811423034808365 e−01, +9.802944493567077 e−01, +9.794214312173470 e−01, +9.785214441250228 e−01, +9.775957513212234 e−01, +9.766438929361375 e−01, +9.756636036109838 e−01, +9.746537914797736 e−01, +9.736145835187847 e−01, +9.725453442532574 e−01, +9.714446445280863 e−01, +9.703115557563614 e−01, +9.691456634185093 e−01, +9.679460697948364 e−01, +9.667113883637859 e−01, +9.654406178310210 e−01, +9.641331517728559 e−01, +9.627881167626269 e−01, +9.614043615076308 e−01, +9.599808797353324 e−01, +9.585168210361295 e−01, +9.570113065179300 e−01, +9.554634210701282 e−01, +9.538722275164798 e−01, +9.522367669696690 e−01, +9.505560524788548 e−01, +9.488290728836637 e−01, +9.470548839544214 e−01, +9.452326100986821 e−01, +9.433613907645669 e−01, +9.414403740008491 e−01, +9.394686283754716 e−01, +9.374451520790944 e−01, +9.353691612846549 e−01, +9.332400814902009 e−01, +9.310570687016885 e−01, +9.288190093977164 e−01, +9.265249985708898 e−01, +9.241743479451956 e−01, +9.217662887169116 e−01, +9.192999665754161 e−01, +9.167746294201033 e−01, +9.141896283466009 e−01, +9.115442516266717 e−01, +9.088377281110291 e−01, +9.060694681113471 e−01, +9.032390575925977 e−01, +9.003458895224528 e−01, +8.973891675497357 e−01, +8.943683555809617 e−01, +8.912831789317232 e−01, +8.881332000806269 e−01, +8.849178157571976 e−01, +8.816366171218113 e−01, +8.782893885841422 e−01, +8.748757216290605 e−01, +8.713950183935990 e−01, +8.678469565343039 e−01, +8.642314881034361 e−01, +8.605483499580321 e−01, +8.567970644671067 e−01, +8.529774446610170 e−01, +8.490895965655302 e−01, +8.451334654019179 e−01, +8.411088323972666 e−01, +8.370156984112052 e−01, +8.328542805780399 e−01, +8.286245548070180 e−01, +8.243262611129502 e−01, +8.199594783897041 e−01, +8.155246236571582 e−01, +8.110218607207131 e−01, +8.064511006873497 e−01, +8.018126046593852 e−01, +7.971069856439827 e−01, +7.923346478686025 e−01, +7.874957820910923 e−01, +7.825908231062452 e−01, +7.776204488292163 e−01, +7.725851026241404 e−01, +7.674849949914248 e−01, +7.623206183595970 e−01, +7.570927486638241 e−01, +7.518019652814979 e−01, +7.464486491227057 e−01, +7.410334206850239 e−01, +7.355571439110484 e−01, +7.300205729992958 e−01, +7.244243523154849 e−01, +7.187693676298663 e−01, +7.130567383226717 e−01, +7.072872946666678 e−01, +7.014615845640527 e−01, +6.955805444755916 e−01, +6.896454997760704 e−01, +6.836575016451227 e−01, +6.776173229836567 e−01, +6.715260316843978 e−01, +6.653849997460716 e−01, +6.591955305148172 e−01, +6.529588449241264 e−01, +6.466761515320369 e−01, +6.403486426892321 e−01, +6.339773402000435 e−01, +6.275631129756770 e−01, +6.211072197441818 e−01, +6.146113064454106 e−01, +6.080768062101946 e−01, +6.015049275244732 e−01, +5.948969938609885 e−01, +5.882544536827298 e−01, +5.815787608870452 e−01, +5.748713693712827 e−01, +5.681329838024681 e−01, +5.613674511156831 e−01, +5.545756384163615 e−01, +5.477589552377587 e−01, +5.409188627354240 e−01, +5.340568757452271 e−01, +5.271745849688633 e−01, +5.202736834971303 e−01, +5.133560289814199 e−01, +5.064236063322167 e−01, +4.994780733459294 e−01, +4.925207788759675 e−01, +4.855532972838063 e−01, +4.785774177949064 e−01, +4.715949057752619 e−01, +4.646075325068186 e−01, +4.576172599874965 e−01, +4.506262048599546 e−01, +4.436362416499966 e−01, +4.366490208265834 e−01, +4.296663370497900 e−01, +4.226901117060164 e−01, +4.157221460416020 e−01, +4.087641442756610 e−01, +4.018179771137481 e−01, +3.948856590950779 e−01,

+3.879690747948260 e−01, +3.810699982632091 e−01, +3.741903189229788 e−01, +3.673320150150139 e−01, +3.604969483256886 e−01, +3.536868899553974 e−01, +3.469037339648918 e−01, +3.401494735467201 e−01, +3.334260017756462 e−01, +3.267351352184045 e−01, +3.200787300572631 e−01, +3.134586473252229 e−01, +3.068766522215559 e−01, +3.003344428572218 e−01, +2.938337904395881 e−01, +2.873765136803315 e−01, +2.809644064498411 e−01, +2.745992637590826 e−01, +2.682828578001429 e−01, +2.620169058204753 e−01, +2.558030636168179 e−01, +2.496429506725780 e−01, +2.435381581076193 e−01, +2.374902188466703 e−01, +2.315007158769866 e−01, +2.255713139320687 e−01, +2.197036032185791 e−01, +2.138990608950040 e−01, +2.081591884177564 e−01, +2.024855415115456 e−01, +1.968794982265323 e−01, +1.913422230760984 e−01, +1.858749915117319 e−01, +1.804792270036454 e−01, +1.751561592043750 e−01, +1.699067802117410 e−01, +1.647322739698192 e−01, +1.596340539111631 e−01, +1.546132267478876 e−01, +1.496705434426226 e−01, +1.448069879076800 e−01, +1.400238206749698 e−01, +1.353218971490514 e−01, +1.307016182576054 e−01, +1.261637395672916 e−01, +1.217094187032866 e−01, +1.173392980385558 e−01, +1.130534434072722 e−01, +1.088524061173192 e−01, +1.047372831131808 e−01, +1.007084973747942 e−01, +9.676572618933918 e−02, +9.290929444691418 e−02, +8.914024389873081 e−02, +8.545874375771015 e−02, +8.186400751918757 e−02, +7.835612100141792 e−02, +7.493612463933132 e−02, +7.160392900131578 e−02, +6.835821233920988 e−02, +6.519882821193619 e−02, +6.212691236769909 e−02, +5.914211536028985 e−02, +5.624247476796568 e−02, +5.342762364238927 e−02, +5.069893012340838 e−02, +4.805577285587748 e−02, +4.549537570011979 e−02, +4.301717763585556 e−02, +4.062301532941800 e−02, +3.831198264259714 e−02, +3.608020726673365 e−02, +3.392698736873631 e−02, +3.185504779821543 e−02, +2.986316337017634 e−02, +2.794584821783607 e−02, +2.610239043507366 e−02, +2.433722657129812 e−02, +2.264871565562373 e−02, +2.102867478775550 e−02, +1.947675241971700 e−02, +1.800101670620712 e−02, +1.659903330901047 e−02, +1.525710171255895 e−02, +1.397610119023076 e−02, +1.277238121584596 e−02, +1.163787492636242 e−02, +1.053809096662833 e−02, +9.464262017505555 e−03, +8.433087782643726 e−03, +7.364501936162659 e−03, +6.073847663871269 e−03, +4.449668997344740 e−03, +2.485333612762431 e−03, +0.000000000000000 e+00, +0.000000000000000 e+00, +0.000000000000000 e+00, +0.000000000000000 e+00, +0.000000000000000 e+00, +0.000000000000000 e+00, +0.000000000000000 e+00, +0.000000000000000 e+00, +0.000000000000000 e+00, +0.000000000000000 e+00, +0.000000000000000 e+00, +0.000000000000000 e+00, +0.000000000000000 e+00, +0.000000000000000 e+00, +0.000000000000000 e+00, +0.000000000000000 e+00, +0.000000000000000 e+00, +0.000000000000000 e+00, +0.000000000000000 e+00, +0.000000000000000 e+00, +0.000000000000000 e+00, +0.000000000000000 e+00, +0.000000000000000 e+00, +0.000000000000000 e+00, +0.000000000000000 e+00, +0.000000000000000 e+00, +0.000000000000000 e+00, +0.000000000000000 e+00, +0.000000000000000 e+00, +0.000000000000000 e+00, +0.000000000000000 e+00, +0.000000000000000 e+00, +0.000000000000000 e+00, +0.000000000000000 e+00, +0.000000000000000 e+00, +0.000000000000000 e+00, +0.000000000000000 e+00, +0.000000000000000 e+00, +0.000000000000000 e+00, +0.000000000000000 e+00, +0.000000000000000 e+00, +0.000000000000000 e+00, +0.000000000000000 e+00, +0.000000000000000 e+00, +0.000000000000000 e+00, +0.000000000000000 e+00, +0.000000000000000 e+00, +0.000000000000000 e+00, +0.000000000000000 e+00, +0.000000000000000 e+00, +0.000000000000000 e+00, +0.000000000000000 e+00, +0.000000000000000 e+00, +0.000000000000000 e+00, +0.000000000000000 e+00, +0.000000000000000 e+00, +0.000000000000000 e+00, +0.000000000000000 e+00, +0.000000000000000 e+00, +0.000000000000000 e+00, +0.000000000000000 e+00, +0.000000000000000 e+00, +0.000000000000000 e+00, +0.000000000000000 e+00, +0.000000000000000 e+00, +0.000000000000000 e+00, +0.000000000000000 e+00, +0.000000000000000 e+00, +0.000000000000000 e+00, +0.000000000000000 e+00, +0.000000000000000 e+00, +0.000000000000000 e+00, +0.000000000000000 e+00, +0.000000000000000 e+00, +0.000000000000000 e+00, +0.000000000000000 e+00, +0.000000000000000 e+00, +0.000000000000000 e+00, +0.000000000000000 e+00, +0.000000000000000 e+00, +0.000000000000000 e+00, +0.000000000000000 e+00, +0.000000000000000 e+00, +0.000000000000000 e+00, +0.000000000000000 e+00, +0.000000000000000 e+00, +0.000000000000000 e+00, +0.000000000000000 e+00, +0.000000000000000 e+00, +0.000000000000000 e+00, +0.000000000000000 e+00, +0.000000000000000 e+00, +0.000000000000000 e+00, +0.000000000000000 e+00, +0.000000000000000 e+00, +0.000000000000000 e+00, +0.000000000000000 e+00, +0.000000000000000 e+00, +0.000000000000000 e+00, +0.000000000000000 e+00, +0.000000000000000 e+00, +0.000000000000000 e+00, +0.000000000000000 e+00, +0.000000000000000 e+00, +0.000000000000000 e+00, +0.000000000000000 e+00, +0.000000000000000 e+00, +0.000000000000000 e+00, +0.000000000000000 e+00, +0.000000000000000 e+00, +0.000000000000000 e+00, +0.000000000000000 e+00, +0.000000000000000 e+00, +0.000000000000000 e+00, +0.000000000000000 e+00, +0.000000000000000 e+00, +0.000000000000000 e+00, +0.000000000000000 e+00, +0.000000000000000 e+00, +0.000000000000000 e+00, +0.000000000000000 e+00, +0.000000000000000 e+00, +0.000000000000000 e+00, +0.000000000000000 e+00, +0.000000000000000 e+00, +0.000000000000000 e+00, +0.000000000000000 e+00, +0.000000000000000 e+00, +0.000000000000000 e+00, +0.000000000000000 e+00, +0.000000000000000 e+00, +0.000000000000000 e+00, +0.000000000000000 e+00, +0.000000000000000 e+00, +0.000000000000000 e+00, +0.000000000000000 e+00, +0.000000000000000 e+00, +0.000000000000000 e+00, +0.000000000000000 e+00, +0.000000000000000 e+00, +0.000000000000000 e+00, +0.000000000000000 e+00, +0.000000000000000 e+00, +0.000000000000000 e+00, +0.000000000000000 e+00, +0.000000000000000 e+00, +0.000000000000000 e+00, +0.000000000000000 e+00, +0.000000000000000 e+00, +0.000000000000000 e+00, +0.000000000000000 e+00, +0.000000000000000 e+00, +0.000000000000000 e+00, +0.000000000000000 e+00, +0.000000000000000 e+00, +0.000000000000000 e+00, +0.000000000000000 e+00, +0.000000000000000 e+00, +0.000000000000000 e+00, +0.000000000000000 e+00, +0.000000000000000 e+00, +0.000000000000000 e+00, +0.000000000000000 e+00, +0.000000000000000 e+00, +0.000000000000000 e+00, +0.000000000000000 e+00, +0.000000000000000 e+00, +0.000000000000000 e+00, +0.000000000000000 e+00, +0.000000000000000 e+00, +0.000000000000000 e+00, +0.000000000000000 e+00, +0.000000000000000 e+00, +0.000000000000000 e+00, +0.000000000000000 e+00, +0.000000000000000 e+00, +0.000000000000000 e+00, +0.000000000000000 e+00, +0.000000000000000 e+00, +0.000000000000000 e+00, +0.000000000000000 e+00, +0.000000000000000 e+00, +0.000000000000000 e+00, +0.000000000000000 e+00, +0.000000000000000 e+00, +0.000000000000000 e+00, +0.000000000000000 e+00, +0.000000000000000 e+00, +0.000000000000000 e+00, +0.000000000000000 e+00, +0.000000000000000 e+00, +0.000000000000000 e+00, +0.000000000000000 e+00, +0.000000000000000 e+00, +0.000000000000000 e+00, +0.000000000000000 e+00, +0.000000000000000 e+00, +0.000000000000000 e+00, +0.000000000000000 e+00, +0.000000000000000 e+00, +0.000000000000000 e+00, +0.000000000000000 e+00, +0.000000000000000 e+00, +0.000000000000000 e+00, +0.000000000000000 e+00, +0.000000000000000 e+00, +0.000000000000000 e+00, +0.000000000000000 e+00, +0.000000000000000 e+00, +0.000000000000000 e+00, +0.000000000000000 e+00, +0.000000000000000 e+00, +0.000000000000000 e+00, +0.000000000000000 e+00, +0.000000000000000 e+00, +0.000000000000000 e+00, +0.000000000000000 e+00, +0.000000000000000 e+00, +0.000000000000000 e+00, +0.000000000000000 e+00, +0.000000000000000 e+00, +0.000000000000000 e+00, +0.000000000000000 e+00, +0.000000000000000 e+00, +0.000000000000000 e+00, +0.000000000000000 e+00, +0.000000000000000 e+00, +0.000000000000000 e+00, +0.000000000000000 e+00, +0.000000000000000 e+00, +0.000000000000000 e+00, +0.000000000000000 e+00, +0.000000000000000 e+00, +0.000000000000000 e+00, +0.000000000000000 e+00, +0.000000000000000 e+00, +0.000000000000000 e+00, +0.000000000000000 e+00, +0.000000000000000 e+00, +0.000000000000000 e+00, +0.000000000000000 e+00, +0.000000000000000 e+00, +0.000000000000000 e+00, +0.000000000000000 e+00, +0.000000000000000 e+00, +0.000000000000000 e+00, +0.000000000000000 e+00, +0.000000000000000 e+00, +0.000000000000000 e+00, +0.000000000000000 e+00, +0.000000000000000 e+00, +0.000000000000000 e+00, +0.000000000000000 e+00, +0.000000000000000 e+00, +0.000000000000000 e+00, +0.000000000000000 e+00, +0.000000000000000 e+00, +0.000000000000000 e+00, +0.000000000000000 e+00, +0.000000000000000 e+00, +0.000000000000000 e+00, +0.000000000000000 e+00, +0.000000000000000 e+00, +0.000000000000000 e+00, +0.000000000000000 e+00, +0.000000000000000 e+00, +0.000000000000000 e+00, +0.000000000000000 e+00, +0.000000000000000 e+00, +0.000000000000000 e+00, +0.000000000000000 e+00, +0.000000000000000 e+00, +0.000000000000000 e+00, +0.000000000000000 e+00, +0.000000000000000 e+00, +0.000000000000000 e+00, +0.000000000000000 e+00, +0.000000000000000 e+00, +0.000000000000000 e+00, +0.000000000000000 e+00, +0.000000000000000 e+00, +0.000000000000000 e+00, +0.000000000000000 e+00, +0.000000000000000 e+00, +0.000000000000000 e+00, +0.000000000000000 e+00, +0.000000000000000 e+00, +0.000000000000000 e+00, +0.000000000000000 e+00, +0.000000000000000 e+00, +0.000000000000000 e+00, +0.000000000000000 e+00, +0.000000000000000 e+00, +0.000000000000000 e+00, +0.000000000000000 e+00, +0.000000000000000 e+00, +0.000000000000000 e+00, +0.000000000000000 e+00, +0.000000000000000 e+00, +0.000000000000000 e+00, +0.000000000000000 e+00, +0.000000000000000 e+00, +0.000000000000000 e+00, +0.000000000000000 e+00, +0.000000000000000 e+00, +0.000000000000000 e+00, +0.000000000000000 e+00, +0.000000000000000 e+00, +0.000000000000000 e+00, +0.000000000000000 e+00, +0.000000000000000 e+00, +0.000000000000000 e+00, +0.000000000000000 e+00, +0.000000000000000 e+00, +0.000000000000000 e+00, +0.000000000000000 e+00, +0.000000000000000 e+00, +0.000000000000000 e+00, +0.000000000000000 e+00, +0.000000000000000 e+00, +0.000000000000000 e+00, +0.000000000000000 e+00, +0.000000000000000 e+00, +0.000000000000000 e+00, +0.000000000000000 e+00, +0.000000000000000 e+00, +0.000000000000000 e+00, +0.000000000000000 e+00, +0.000000000000000 e+00, +0.000000000000000 e+00, +0.000000000000000 e+00, +0.000000000000000 e+00, +0.000000000000000 e+00, +0.000000000000000 e+00, +0.000000000000000 e+00, +0.000000000000000 e+00, +0.000000000000000 e+00, +0.000000000000000 e+00, +0.000000000000000 e+00, +0.000000000000000 e+00, +0.000000000000000 e+00, +0.000000000000000 e+00, +0.000000000000000 e+00, +0.000000000000000 e+00, +0.000000000000000 e+00, +0.000000000000000 e+00, +0.000000000000000 e+00, +0.000000000000000 e+00, +0.000000000000000 e+00, +0.000000000000000 e+00, +0.000000000000000 e+00, +0.000000000000000 e+00, +0.000000000000000 e+00, +0.000000000000000 e+00, +0.000000000000000 e+00, +0.000000000000000 e+00, +0.000000000000000 e+00, +0.000000000000000 e+00, +0.000000000000000 e+00, +0.000000000000000 e+00.

18. The apparatus of claim 1, wherein the analysis windowing function comprises at least a succession, in forward or backward order, formed by the following values or at least a sub-succession with 10 values of the following values if different from 0, with ±1% of tolerance:

+9.959086585790517 e−04, +3.819056787237678 e−03, +9.540832613229890 e−03, +1.921659800166160 e−02, +3.382719081038548 e−02, +5.424831667522354 e−02, +8.120777668775610 e−02, +1.152171887125930 e−01, +1.564942331034909 e−01, +2.049363422022628 e−01, +2.601166575816199 e−01, +3.212814164616093 e−01, +3.873472997948746 e−01, +4.569497078592333 e−01, +5.285192958868393 e−01, +6.003522489375573 e−01, +6.706896380227332 e−01, +7.378044458510402 e−01, +8.000925313431716 e−01, +8.561409184410547 e−01, +9.048272294524792 e−01, +9.453685031730190 e−01, +9.773507430600533 e−01, +1.000800872826561 e+00, +1.016171590112097 e+00, +1.024315247630982 e+00, +1.026415431432931 e+00, +1.023858366571912 e+00, +1.018135705524407 e+00, +1.010794822557756 e+00, +1.003406509762925 e+00, +9.967831265986109 e−01, +9.920995520917141 e−01, +9.892206942816891 e−01, +9.879658322200813 e−01, +9.881273531631907 e−01, +9.894805541465801 e−01, +9.917849916000535 e−01, +9.947847580943504 e−01, +9.982119669301160 e−01, +1.001791235858836 e+00,

+1.005242583245485 e+00, +1.008283053756130 e+00, +1.010631281038659 e+00, +1.012015300253356 e+00, +1.012180753005270 e+00, +1.010896765282633 e+00, +1.007963362035220 e+00, +1.003227255072391 e+00, +9.966050551498514 e−01, +9.868284225039941 e−01, +9.731250287581631 e−01, +9.540636479502398 e−01, +9.283864275822276 e−01, +8.950916858157935 e−01, +8.534769362643825 e−01, +8.032090930429980 e−01, +7.444735201251689 e−01, +6.780787033699449 e−01, +6.053970453856138 e−01, +5.282077505750667 e−01, +4.486552956056635 e−01, +3.691875990296312 e−01, +2.924566408966777 e−01, +2.210718537110463 e−01, +1.573148583944309 e−01, +1.030525757797768 e−01, +5.982732244758054 e−02, +2.871831923385133 e−02, +9.683884928956490 e−03, +0.000000000000000 e+00, +0.000000000000000 e+00, +0.000000000000000 e+00, +0.000000000000000 e+00, +0.000000000000000 e+00, +0.000000000000000 e+00, +0.000000000000000 e+00, +0.000000000000000 e+00, +0.000000000000000 e+00, +0.000000000000000 e+00.

19. The apparatus of claim 1, wherein the analysis windowing function comprises at least a succession, in forward or backward order, formed by the following values or at least a sub-succession with 10 values of the following values if different from 0, with ±1% of tolerance:

+6.143388180964179 e−04, +1.489582832987000 e−03, +2.884104959764029 e−03, +4.934298832466617 e−03, +7.779130464154915 e−03, +1.154910606525086 e−02, +1.637155619860352 e−02, +2.237116158648752 e−02, +2.966159685753317 e−02, +3.835663329277230 e−02, +4.855610986150206 e−02, +6.035055738891727 e−02, +7.382288203064732 e−02, +8.903563687211119 e−02, +1.060356225286319 e−01, +1.248534855777947 e−01, +1.454931890869180 e−01, +1.679435556337752 e−01, +1.921728622634411 e−01, +2.181238261985594 e−01, +2.457259744642953 e−01, +2.748839432649996 e−01, +3.054824712370942 e−01, +3.373873799614014 e−01, +3.704415932452488 e−01, +4.044749630814483 e−01, +4.393004362003260 e−01, +4.747225454237193 e−01, +5.105341492548225 e−01, +5.465201916422433 e−01, +5.824658100332457 e−01, +6.181452662624718 e−01, +6.533411462740817 e−01, +6.878367295965062 e−01, +7.214176027060971 e−01, +7.538887973483771 e−01, +7.850546571907628 e−01, +8.147397447696774 e−01, +8.427819363777799 e−01, +8.690376742017057 e−01, +8.933935477349644 e−01, +9.157483563218768 e−01, +9.360270196617569 e−01, +9.541731142261065 e−01, +9.701635474343885 e−01, +9.840036439809510 e−01, +9.957199420334376 e−01, +1.005374268639838 e+00, +1.013046655758663 e+00, +1.018843380560658 e+00, +1.022896948293643 e+00, +1.025355286710874 e+00, +1.026382881625701 e+00, +1.026155530733488 e+00, +1.024853974580724 e+00, +1.022664602721801 e+00, +1.019779396547454 e+00, +1.016391686789653 e+00, +1.012697033320358 e+00, +1.008885191761748 e+00, +1.005378742804807 e+00, +1.001563778373068 e+00, +9.982531564931281 e−01, +9.954346644968789 e−01, +9.930950268060122 e−01, +9.912170911359961 e−01, +9.897805192546195 e−01, +9.887624937408933 e−01, +9.881383235740961 e−01, +9.878819413827574 e−01, +9.879662130250981 e−01, +9.883630508181326 e−01, +9.890434070785485 e−01, +9.899772316163624 e−01, +9.911334564321237 e−01, +9.924800441092685 e−01, +9.939841207305906 e−01, +9.956121471675398 e−01, +9.973300590248015 e−01, +9.991033633647473 e−01, +1.000897441314013 e+00, +1.002677088643863 e+00, +1.004407190937699 e+00, +1.006052289109999 e+00, +1.007576934100958 e+00, +1.008945862447015 e+00, +1.010124241309341 e+00, +1.011077969726137 e+00, +1.011773962181442 e+00, +1.012180362866919 e+00, +1.012266707295288 e+00, +1.012004064757857 e+00, +1.011365223023975 e+00, +1.010324996851905 e+00, +1.008860731864438 e+00, +1.006952983357691 e+00, +1.004586273379809 e+00, +1.001749900308864 e+00, +9.984386632116344 e−01, +9.946500332901397 e−01, +9.895756853352172 e−01, +9.838303127859196 e−01, +9.769999155793757 e−01, +9.689141159310996 e−01, +9.594038121639412 e−01, +9.483086322505029 e−01, +9.354860218216989 e−01, +9.208101305030523 e−01, +9.041732260327581 e−01, +8.854882249661838 e−01, +8.646864947605046 e−01, +8.417237467711145 e−01, +8.165875713256009 e−01, +7.892986353718001 e−01, +7.599171886893816 e−01, +7.285474515411827 e−01, +6.953282935906302 e−01, +6.604334017809461 e−01, +6.240661431421666 e−01, +5.864461424698465 e−01, +5.478160663871147 e−01, +5.084499758302218 e−01, +4.686361426418982 e−01, +4.286789889246253 e−01, +3.889032719013045 e−01, +3.496431418636314 e−01, +3.112360816586544 e−01, +2.740128472224535 e−01, +2.382847225401666 e−01, +2.043379825955252 e−01, +1.724305860483632 e−01, +1.427939789949265 e−01, +1.156385879569741 e−01, +9.115821766571995 e−02, +6.952749039054593 e−02, +5.088975408628225 e−02, +3.533430192568954 e−02, +2.286680405144430 e−02, +1.338005016725895 e−02, +6.640506529168652 e−03, +0.000000000000000 e+00, +0.000000000000000 e+00, +0.000000000000000 e+00, +0.000000000000000 e+00, +0.000000000000000 e+00, +0.000000000000000 e+00, +0.000000000000000 e+00, +0.000000000000000 e+00, +0.000000000000000 e+00, +0.000000000000000 e+00, +0.000000000000000 e+00, +0.000000000000000 e+00, +0.000000000000000 e+00, +0.000000000000000 e+00, +0.000000000000000 e+00,

+0.000000000000000 e+00, +0.000000000000000 e+00, +0.000000000000000 e+00, +0.000000000000000 e+00, +0.000000000000000 e+00.

20. The apparatus of claim 1, wherein the analysis windowing function comprises at least a succession, in forward or backward order, formed by the following values or at least a sub-succession with 10 values of the following values if different from 0, with ±1% of tolerance:

+5.087227626168386 e−04, +9.959086585790517 e−04, +1.682208006328800 e−03, +2.609697259047744 e−03, +3.819056787237678 e−03, +5.349319592933909 e−03, +7.243906383895192 e−03, +9.540832613229890 e−03, +1.227637642543709 e−02, +1.548950238899404 e−02, +1.921659800166160 e−02, +2.349369619441617 e−02, +2.835199581667961 e−02, +3.382719081038548 e−02, +3.994939538719628 e−02, +4.674775238543380 e−02, +5.424831667522354 e−02, +6.247770776443612 e−02, +7.145835917501348 e−02, +8.120777668775610 e−02, +9.174400412319896 e−02, +1.030764959637497 e−01, +1.152171887125930 e−01, +1.281665713944242 e−01, +1.419264381068653 e−01, +1.564942331034909 e−01, +1.718593189799504 e−01, +1.880134254543744 e−01, +2.049363422022628 e−01, +2.226123055761096 e−01, +2.410151242797736 e−01, +2.601166575816199 e−01, +2.798871008989962 e−01, +3.002880135563586 e−01, +3.212814164616093 e−01, +3.428208463088390 e−01, +3.648596557863134 e−01, +3.873472997948746 e−01, +4.102294951869188 e−01, +4.334494534591082 e−01, +4.569497078592333 e−01, +4.806696403251166 e−01, +5.045473815014847 e−01, +5.285192958868393 e−01, +5.525196099932443 e−01, +5.764872452085427 e−01, +6.003522489375573 e−01, +6.240509872809882 e−01, +6.475182586093196 e−01, +6.706896380227332 e−01, +6.935029068990036 e−01, +7.158927516396895 e−01, +7.378044458510402 e−01, +7.591787241845952 e−01, +7.799586608897265 e−01, +8.000925313431716 e−01, +8.195318652294690 e−01, +8.382288957404715 e−01, +8.561409184410547 e−01, +8.732316951214179 e−01, +8.894702022170831 e−01, +9.048272294524792 e−01, +9.192736375782965 e−01, +9.327940405054362 e−01, +9.453685031730190 e−01, +9.569883933538136 e−01, +9.676486424195593 e−01, +9.773507430600533 e−01, +9.861027831072527 e−01, +9.939122412655677 e−01, +1.000800872826561 e+00, +1.006787811971719 e+00, +1.011901269172423 e+00, +1.016171590112097 e+00, +1.019636414864842 e+00, +1.022336613864005 e+00, +1.024315247630982 e+00, +1.025621299895396 e+00, +1.026303439275662 e+00, +1.026415431432931 e+00, +1.026007933174836 e+00, +1.025137435167917 e+00, +1.023858366571912 e+00, +1.022226936424625 e+00, +1.020300550334848 e+00, +1.018135705524407 e+00, +1.015792146756340 e+00, +1.013325966774524 e+00, +1.010794822557756 e+00, +1.008265131568879 e+00, +1.006046874304407 e+00, +1.003406509762925 e+00, +1.000977398831985 e+00, +9.987704535700208 e−01, +9.967831265986109 e−01, +9.950118905889862 e−01, +9.934523971504882 e−01, +9.920995520917141 e−01, +9.909475998606236 e−01, +9.899902426925508 e−01, +9.892206942816891 e−01, +9.886318043013834 e−01, +9.882160904669929 e−01, +9.879658322200813 e−01, +9.878730767519871 e−01, +9.879296932443894 e−01, +9.881273531631907 e−01, +9.884575535474619 e−01, +9.889115869213529 e−01, +9.894805541465801 e−01, +9.901553455166457 e−01, +9.909266562913843 e−01, +9.917849916000535 e−01, +9.927206838643636 e−01, +9.937239208721489 e−01, +9.947847580943504 e−01, +9.958931493776203 e−01, +9.970389567617592 e−01, +9.982119669301160 e−01, +9.994020338838508 e−01, +1.000598323893564 e+00, +1.001791235858836 e+00, +1.002969837054169 e+00, +1.004123786397111 e+00, +1.005242583245485 e+00, +1.006315717067918 e+00, +1.007332693127034 e+00, +1.008283053756130 e+00, +1.009156423082384 e+00, +1.009942535308151 e+00, +1.010631281038659 e+00, +1.011212744622770 e+00, +1.011677230257499 e+00, +1.012015300253356 e+00, +1.012217779097186 e+00, +1.012275790821109 e+00, +1.012180753005270 e+00, +1.011924425888915 e+00, +1.011498917644724 e+00, +1.010896765282633 e+00, +1.010110965619444 e+00, +1.009135094671655 e+00, +1.007963362035220 e+00, +1.006590756505588 e+00, +1.005013115379014 e+00, +1.003227255072391 e+00, +1.001231060075500 e+00, +9.990235555436858 e−01, +9.966050551498514 e−01, +9.939894706113089 e−01, +9.904539200261149 e−01, +9.868284225039941 e−01, +9.827716736909488 e−01, +9.782206672373213 e−01, +9.731250287581631 e−01, +9.674323528812744 e−01, +9.610947043524248 e−01, +9.540636479502398 e−01, +9.462952991190324 e−01, +9.377489107516087 e−01, +9.283864275822276 e−01, +9.181762606422500 e−01, +9.070861558801854 e−01, +8.950916858157935 e−01, +8.821696237804294 e−01, +8.683025287048570 e−01, +8.534769362643825 e−01, +8.376852006833730 e−01, +8.209275259764013 e−01, +8.032090930429980 e−01, +7.845450482523652 e−01, +7.649554851899686 e−01, +7.444735201251689 e−01, +7.231348066419057 e−01, +7.009860555207412 e−01, +6.780787033699450 e−01, +6.544686506489734 e−01, +6.302212149502727 e−01, +6.053970453856138 e−01, +5.800715766089168 e−01, +5.543129276657669 e−01, +5.282077505750727 e−01, +5.018369724442092 e−01, +4.752902962082383 e−01, +4.486552956056652 e−01, +4.220281118338883 e−01, +3.955057965950340 e−01, +3.691875990296320 e−01,

+3.431732847389720 e-01, +3.175633015043183 e-01, +2.924566408966782 e-01, +2.679463783886042 e-01, +2.441231331518492 e-01, +2.210718537110466 e-01, +1.988719153219592 e-01, +1.775967625327044 e-01, +1.573148583944310 e-01, +1.380903364946733 e-01, +1.199837497591550 e-01, +1.030525757797769 e-01, +8.735085011789188 e-02, +7.292811584897502 e-02, +5.982732244758056 e-02, +4.808178837444506 e-02, +3.771135297837851 e-02, +2.871831923385135 e-02, +2.108352028641225 e-02, +1.476289412849005 e-02, +9.683884928956495 e-03, +5.642168789286858 e-03, +0.000000000000000 e+00, +0.000000000000000 e+00, +0.000000000000000 e+00, +0.000000000000000 e+00, +0.000000000000000 e+00, +0.000000000000000 e+00, +0.000000000000000 e+00, +0.000000000000000 e+00, +0.000000000000000 e+00, +0.000000000000000 e+00, +0.000000000000000 e+00, +0.000000000000000 e+00, +0.000000000000000 e+00, +0.000000000000000 e+00, +0.000000000000000 e+00, +0.000000000000000 e+00, +0.000000000000000 e+00, +0.000000000000000 e+00, +0.000000000000000 e+00, +0.000000000000000 e+00, +0.000000000000000 e+00, +0.000000000000000 e+00, +0.000000000000000 e+00, +0.000000000000000 e+00, +0.000000000000000 e+00, +0.000000000000000 e+00, +0.000000000000000 e+00, +0.000000000000000 e+00, +0.000000000000000 e+00, +0.000000000000000 e+00.

21. The apparatus of claim 1, wherein the analysis windowing function comprises at least a succession, in forward or backward order, formed by the following values or at least a sub-succession with 10 values of the following values if different from 0, with ±1% of tolerance:

+4.595886345493055 e-04, +7.919323614002698 e-04, +1.227927169310031 e-03, +1.783653266717233 e-03, +2.479549413444207 e-03, +3.329799454594261 e-03, +4.353535478916468 e-03, +5.564965156664018 e-03, +6.986108359341676 e-03, +8.629882322202329 e-03, +1.051343406844975 e-02, +1.265082642578719 e-02, +1.506090447446532 e-02, +1.775591229287213 e-02, +2.075475983187825 e-02, +2.406813715401559 e-02, +2.771207863541604 e-02, +3.169933248543932 e-02, +3.604609640533871 e-02, +4.076128638095439 e-02, +4.586038120884381 e-02, +5.135136676471998 e-02, +5.724780220726930 e-02, +6.355854744461048 e-02, +7.029450733434550 e-02, +7.745987198268531 e-02, +8.506635369887924 e-02, +9.311641620512773 e-02, +1.016162955027316 e-01, +1.105690806271684 e-01, +1.199789286645804 e-01, +1.298417294090302 e-01, +1.401623800497866 e-01, +1.509371564593891 e-01, +1.621632295622287 e-01, +1.738354123649302 e-01, +1.859520359191026 e-01, +1.985008828937603 e-01, +2.114778554475382 e-01, +2.248732557074316 e-01, +2.386763947872762 e-01, +2.528729453658238 e-01, +2.674547009618951 e-01, +2.824031465430401 e-01, +2.977050145264297 e-01, +3.133419120661713 e-01, +3.292976696294886 e-01, +3.455490160824131 e-01, +3.620795045342974 e-01, +3.788648665671841 e-01, +3.958851576591690 e-01, +4.131143794748322 e-01, +4.305308301005456 e-01, +4.481076715576617 e-01, +4.658227790464821 e-01, +4.836466393241829 e-01, +5.015564851667653 e-01, +5.195228071176610 e-01, +5.375197039843709 e-01, +5.555183841040963 e-01, +5.734957812557457 e-01, +5.914186654649489 e-01, +6.092622887527459 e-01, +6.269981160888640 e-01, +6.446002007776794 e-01, +6.620384583071039 e-01, +6.792906550106088 e-01, +6.963256426589250 e-01, +7.131194393772130 e-01, +7.296469905863920 e-01, +7.458864594794676 e-01, +7.618094719403713 e-01, +7.773958448163656 e-01, +7.926208751337592 e-01, +8.074666387233143 e-01, +8.219101564897180 e-01, +8.359343163788637 e-01, +8.495180470826319 e-01, +8.626485837105826 e-01, +8.753083234662220 e-01, +8.874884715160425 e-01, +8.991737724042251 e-01, +9.103527429187326 e-01, +9.210144133066616 e-01, +9.311556192776946 e-01, +9.407644740241826 e-01, +9.498382236872068 e-01, +9.583732599601223 e-01, +9.663690412284377 e-01, +9.738235617865406 e-01, +9.807442506043361 e-01, +9.871297972052695 e-01, +9.929872268444632 e-01, +9.983241398929388 e-01, +1.003150760219063 e+00, +1.007473713377193 e+00, +1.011309151636166 e+00, +1.014666681083198 e+00, +1.017563337333301 e+00, +1.020014681326785 e+00, +1.022039872150903 e+00, +1.023654257342442 e+00, +1.024881624147540 e+00, +1.025739288978437 e+00, +1.026250709375593 e+00, +1.026436666375082 e+00, +1.026320857404224 e+00, +1.025922917798664 e+00, +1.025269979527211 e+00, +1.024382188798244 e+00, +1.023284940887058 e+00, +1.022000829220643 e+00, +1.020555973231408 e+00, +1.018971390778550 e+00, +1.017275179369116 e+00, +1.015489129111694 e+00, +1.013639356938881 e+00, +1.011747750709711 e+00, +1.009840844244693 e+00, +1.007939764480188 e+00, +1.006407400915498 e+00, +1.004374825095777 e+00, +1.002469814737132 e+00, +1.000689073754539 e+00, +9.990346001249977 e-01, +9.975024904153303 e-01, +9.960941547576162 e-01, +9.948051243621099 e-01, +9.936362728142866 e-01, +9.925826537087717 e-01, +9.916447007525191 e-01, +9.908170758245324 e-01, +9.900998445795673 e-01, +9.894873685512386 e-01, +9.889794323427195 e-01, +9.885701787626714 e-01, +9.882591911282058 e-01, +9.880404423341358 e-01, +9.879133688360181 e-01, +9.878718098237022 e-01, +9.879150762106034 e-01, +9.880368938846610 e−01, +9.882364564839506 e−01, +9.885073687439192 e−01, +9.888487088987707 e−01, +9.892539488627546 e−01, +9.897220412447528 e−01, +9.902463287269285 e−01, +9.908256340476208 e−01, +9.914531811725067 e−01, +9.921276814881759 e−01, +9.928422499725458 e−01, +9.935955098307742 e−01, +9.943804814776256 e−01, +9.951957244449919 e−01, +9.960341878404958 e−01, +9.968943831870675 e−01, +9.977692009836100 e−01, +9.986571134591464 e−01, +9.995509738170480 e−01, +1.000449227898040 e+00, +1.001344692310058 e+00, +1.002235786606954 e+00, +1.003115291715261 e+00, +1.003981602446902 e+00, +1.004827468041713 e+00, +1.005651275972376 e+00, +1.006445772052972 e+00, +1.007209352772459 e+00, +1.007934783656087 e+00, +1.008620496650569 e+00, +1.009259314290145 e+00, +1.009849742422788 e+00, +1.010384692193296 e+00, +1.010862783160582 e+00, +1.011277044709547 e+00, +1.011626247430694 e+00, +1.011903571699736 e+00, +1.012107954864219 e+00, +1.012232755709885 e+00, +1.012277089047072 e+00, +1.012234505114778 e+00, +1.012104319978655 e+00, +1.011880293122688 e+00, +1.011561972516341 e+00, +1.011143373963981 e+00, +1.010624321020038 e+00, +1.009999148545101 e+00, +1.009268031808824 e+00, +1.008425698479647 e+00, +1.007472774447058 e+00, +1.006404483571931 e+00, +1.005222003295591 e+00, +1.003921160689206 e+00, +1.002503762756151 e+00, +1.000966332772540 e+00, +9.993114007411373 e−01, +9.975362702189898 e−01, +9.956442306333592 e−01, +9.936333924912825 e−01, +9.908677480361242 e−01, +9.882326326262749 e−01, +9.853620567056602 e−01, +9.822305093671991 e−01, +9.788185853162172 e−01, +9.751026333215268 e−01, +9.710631852370086 e−01, +9.666759668947944 e−01, +9.619242192293307 e−01, +9.567841986369235 e−01, +9.512394303101863 e−01, +9.452700238623795 e−01, +9.388615698236068 e−01, +9.319946435581106 e−01, +9.246592033932568 e−01, +9.168383396399868 e−01, +9.085218034087421 e−01, +8.996967011299613 e−01, +8.903562054918268 e−01, +8.804877931535187 e−01, +8.700884209228057 e−01, +8.591492134848259 e−01, +8.476686394755906 e−01, +8.356428970797861 e−01, +8.230753889817990 e−01, +8.099649296155544 e−01, +7.963204506324437 e−01, +7.821460539775005 e−01, +7.674541821769616 e−01, +7.522563457568547 e−01, +7.365702052057368 e−01, +7.204090552899627 e−01, +7.037975107157410 e−01, +6.867542812151157 e−01, +6.693041888771051 e−01, +6.514710959179395 e−01, +6.332854832820911 e−01, +6.147685389896460 e−01, +5.959553778639692 e−01, +5.768737955463938 e−01, +5.575534287167304 e−01, +5.380320138068979 e−01, +5.183454027643563 e−01, +4.985259415650634 e−01, +4.786156067459849 e−01, +4.586473038370941 e−01, +4.386643656872842 e−01, +4.187046888325280 e−01, +3.988123056192917 e−01, +3.790262923635886 e−01, +3.593914828698096 e−01, +3.399474132903109 e−01, +3.207392420889753 e−01, +3.018061113177048 e−01, +2.831905952786929 e−01, +2.649288369241889 e−01, +2.470608550624402 e−01, +2.296201119084317 e−01, +2.126433716126151 e−01, +1.961601816145380 e−01, +1.802035203864437 e−01, +1.647996883470626 e−01, +1.499787548077656 e−01, +1.357643522991611 e−01, +1.221842534547464 e−01, +1.092601994264172 e−01, +9.701788451015501 e−02, +8.547680283183663 e−02, +7.465976378295235 e−02, +6.458254322751883 e−02, +5.526281189874138 e−02, +4.670976978373095 e−02, +3.893244425578719 e−02, +3.192976013776996 e−02, +2.569810636390756 e−02, +2.022259265088492 e−02, +1.548317776486452 e−02, +1.144924909653903 e−02, +8.076482660383199 e−03, +5.300044080947794 e−03, +0.000000000000000 e+00, +0.000000000000000 e+00, +0.000000000000000 e+00, +0.000000000000000 e+00, +0.000000000000000 e+00, +0.000000000000000 e+00, +0.000000000000000 e+00, +0.000000000000000 e+00, +0.000000000000000 e+00, +0.000000000000000 e+00, +0.000000000000000 e+00, +0.000000000000000 e+00, +0.000000000000000 e+00, +0.000000000000000 e+00, +0.000000000000000 e+00, +0.000000000000000 e+00, +0.000000000000000 e+00, +0.000000000000000 e+00, +0.000000000000000 e+00, +0.000000000000000 e+00, +0.000000000000000 e+00, +0.000000000000000 e+00, +0.000000000000000 e+00, +0.000000000000000 e+00, +0.000000000000000 e+00, +0.000000000000000 e+00, +0.000000000000000 e+00, +0.000000000000000 e+00, +0.000000000000000 e+00, +0.000000000000000 e+00, +0.000000000000000 e+00, +0.000000000000000 e+00, +0.000000000000000 e+00, +0.000000000000000 e+00, +0.000000000000000 e+00, +0.000000000000000 e+00, +0.000000000000000 e+00, +0.000000000000000 e+00, +0.000000000000000 e+00, +0.000000000000000 e+00.

22. The apparatus of claim 1, wherein the analysis windowing function comprises at least a succession, in forward or backward order, formed by the following values or at least a sub-succession with 10 values of the following values if different from 0, with ±1% of tolerance:

+4.090106504820579 e−04, +6.143388180964179 e−04, +8.571759876954877 e−04, +1.147015057857495 e−03, +1.489582832987000 e−03, +1.889770382231583 e−03, +2.353000800169909 e−03, +2.884104959764029 e−03, +3.488213786635855 e−03, +4.170040431489613 e−03, +4.934298832466617 e−03, +5.787076505403503 e−03, +6.733811743137561 e−03, +7.779130464154915 e−03, +8.927044958757816 e−03, +1.018202888968871 e−02, +1.154910606525086 e−02, +1.303349217699797 e−02, +1.463951288465963 e−02, +1.637155619860352 e−02, +1.823455383898077 e−02, +2.023309488998589 e−02, +2.237116158648752 e−02, +2.465237348403478 e−02, +2.708101935270475 e−02, +2.966159685753317 e−02, +3.239884850877327 e−02, +3.529601774976465 e−02, +3.835663329277230 e−02, +4.158447932459513 e−02, +4.498322421745353 e−02, +4.855610986150206 e−02, +5.230596475016741 e−02, +5.623624576084146 e−02, +6.035055738891727 e−02, +6.465186317477950 e−02, +6.914195749790462 e−02, +7.382288203064732 e−02, +7.869709331995660 e−02, +8.376761638427657 e−02, +8.903563687211118 e−02, +9.450199243028472 e−02, +1.001680193006426 e−01, +1.060356225286319 e−01, +1.121060220821844 e−01, +1.183788547045326 e−01, +1.248534855777947 e−01, +1.315302847610869 e−01, +1.384103079528939 e−01, +1.454931890869180 e−01, +1.527772946853750 e−01, +1.602608842337125 e−01, +1.679435556337752 e−01, +1.758245615079801 e−01, +1.839020119821303 e−01, +1.921728622634411 e−01, +2.006344295681524 e−01, +2.092853879977170 e−01, +2.181238261985594 e−01, +2.271462264407930 e−01, +2.363479205237173 e−01, +2.457259744642953 e−01, +2.552771551741124 e−01, +2.649981094228982 e−01, +2.748839432649996 e−01, +2.849296444030153 e−01, +2.951306505827265 e−01, +3.054824712370942 e−01, +3.159799638238941 e−01, +3.266169794538543 e−01, +3.373873799614014 e−01, +3.482855915638277 e−01, +3.593057693987583 e−01, +3.704415932452488 e−01, +3.816862385160692 e−01, +3.930329782788047 e−01, +4.044749630814483 e−01, +4.160051103939122 e−01, +4.276159595085598 e−01, +4.393004362003260 e−01, +4.510516333434032 e−01, +4.628616046119925 e−01, +4.747225454237193 e−01, +4.866266705542529 e−01, +4.985664508456704 e−01, +5.105341492548225 e−01, +5.225212793188740 e−01, +5.345190505841265 e−01, +5.465201916422433 e−01, +5.585172769552711 e−01, +5.705021536899105 e−01, +5.824658100332457 e−01, +5.943991720381216 e−01, +6.062948176207270 e−01, +6.181452662624718 e−01, +6.299422016714543 e−01, +6.416768736044914 e−01, +6.533411462740817 e−01, +6.649277540000037 e−01, +6.764292700223311 e−01, +6.878367295965062 e−01, +6.991421467689277 e−01, +7.103379606632721 e−01, +7.214176027060971 e−01, +7.323746102405828 e−01, +7.432008025932804 e−01, +7.538887973483771 e−01, +7.644315495717613 e−01, +7.748223151443820 e−01, +7.850546571907628 e−01, +7.951223518167163 e−01, +8.050193862201107 e−01, +8.147397447696774 e−01, +8.242774413707643 e−01, +8.336267114335371 e−01, +8.427819363777799 e−01,

+8.517386186427548 e−01, +8.604920874939698 e−01, +8.690376742017057 e−01, +8.773720451249032 e−01, +8.854927938913381 e−01, +8.933935477349644 e−01, +9.010727088526728 e−01, +9.085249398881980 e−01, +9.157483563218768 e−01, +9.227413839712016 e−01, +9.295017469413066 e−01, +9.360270196617569 e−01, +9.423143052164881 e−01, +9.483629792665091 e−01, +9.541731142261065 e−01, +9.597438382130120 e−01, +9.650738394220176 e−01, +9.701635474343885 e−01, +9.750143364412617 e−01, +9.796277191617885 e−01, +9.840036439809510 e−01, +9.881426772731259 e−01, +9.920470446911211 e−01, +9.957199420334376 e−01, +9.991640812275709 e−01, +1.002381307710643 e+00, +1.005374268639838 e+00, +1.008146718214831 e+00, +1.010703123647275 e+00, +1.013046655758663 e+00, +1.015181271161417 e+00, +1.017111643578857 e+00, +1.018843380560658 e+00, +1.020381713994816 e+00, +1.021731101971518 e+00, +1.022896948293643 e+00, +1.023885455671576 e+00, +1.024702974608899 e+00, +1.025355286710874 e+00, +1.025848243050604 e+00, +1.026188366261215 e+00, +1.026382881625701 e+00, +1.026438102255574 e+00, +1.026360125820994 e+00, +1.026155530733488 e+00, +1.025831456886557 e+00, +1.025395432284244 e+00, +1.024853974580724 e+00, +1.024213482124578 e+00, +1.023481184943025 e+00, +1.022664602721801 e+00, +1.021770903480975 e+00, +1.020806917660529 e+00, +1.019779396547454 e+00, +1.018695995335235 e+00, +1.017564416918053 e+00, +1.016391686789653 e+00, +1.015184918030332 e+00, +1.013950835315021 e+00, +1.012697033320358 e+00, +1.011430749860716 e+00, +1.010158346781076 e+00, +1.008885191761748 e+00, +1.007592718305943 e+00, +1.006805603478092 e+00, +1.005378742804807 e+00, +1.004049051787112 e+00, +1.002778356298787 e+00, +1.001563778373068 e+00, +1.000404915291105 e+00, +9.993014844615166 e−01, +9.982531564931281 e−01, +9.972595460676951 e−01, +9.963202131848272 e−01, +9.954346644968789 e−01, +9.946023543844607 e−01, +9.938226881029791 e−01, +9.930950268060122 e−01, +9.924186919309267 e−01, +9.917929657090736 e−01, +9.912170911359961 e−01, +9.906902760441473 e−01, +9.902117003786811 e−01, +9.897805192546193 e−01, +9.893958602389157 e−01, +9.890568243690241 e−01, +9.887624937408933 e−01, +9.885119364350415 e−01, +9.883042028597552 e−01, +9.881383235740961 e−01, +9.880133161159576 e−01, +9.879281898513085 e−01, +9.878819413827574 e−01, +9.878735508484809 e−01, +9.879019873841568 e−01, +9.879662130250981 e−01, +9.880651778500144 e−01, +9.881978162133899 e−01, +9.883630508181326 e−01, +9.885597957603544 e−01, +9.887869526128024 e-01, +9.890434070785485 e-01, +9.893280319166613 e-01, +9.896396899060125 e-01, +9.899772316163624 e-01, +9.903394929409673 e-01, +9.907252968668226 e-01, +9.911334564321237 e-01, +9.915627747807666 e-01, +9.920120436855326 e-01, +9.924800441092685 e-01, +9.929655482846576 e-01, +9.934673212537685 e-01, +9.939841207305906 e-01, +9.945146969322154 e-01, +9.950577931942117 e-01, +9.956121471675398 e-01, +9.961764915534302 e-01, +9.967495543671935 e-01, +9.973300590248015 e-01, +9.979167245036720 e-01, +9.985082643417953 e-01, +9.991033633647473 e-01, +9.997003478609010 e-01, +1.000299741957418 e+00, +1.000897441314013 e+00, +1.001493964257960 e+00, +1.002087624593489 e+00, +1.002677088643863 e+00, +1.003261045483858 e+00, +1.003838183774652 e+00, +1.004407190937699 e+00, +1.004966753528881 e+00, +1.005515557572658 e+00, +1.006052289109999 e+00, +1.006575635258931 e+00, +1.007084285781611 e+00, +1.007576934100958 e+00, +1.008052277555815 e+00, +1.008509017718116 e+00, +1.008945862447015 e+00, +1.009361528531177 e+00, +1.009754742820913 e+00, +1.010124241309341 e+00, +1.010468769795370 e+00, +1.010787087537248 e+00, +1.011077969726137 e+00, +1.011340205650538 e+00, +1.011572597114216 e+00, +1.011773962181442 e+00, +1.011943138906979 e+00, +1.012078982659783 e+00, +1.012180362866919 e+00, +1.012246166897464 e+00, +1.012275305013586 e+00, +1.012266707295288 e+00, +1.012219319453278 e+00, +1.012132107622966 e+00, +1.012004064757857 e+00, +1.011834207632025 e+00, +1.011621572933544 e+00, +1.011365223023975 e+00, +1.011064253702468 e+00, +1.010717792733157 e+00, +1.010324996851905 e+00, +1.009885057526159 e+00, +1.009397209381147 e+00, +1.008860731864438 e+00, +1.008274947065247 e+00, +1.007639223374887 e+00, +1.006952983357691 e+00, +1.006215708265639 e+00, +1.005426938305289 e+00, +1.004586273379809 e+00, +1.003693377657581 e+00, +1.002747984657666 e+00, +1.001749900308864 e+00, +1.000699003803502 e+00, +9.995952485989262 e-01, +9.984386632116344 e-01, +9.972293415774932 e-01, +9.959672769174924 e-01, +9.946500332901397 e-01, +9.932403996813470 e-01, +9.912511516117244 e-01, +9.895756853352172 e-01, +9.877713214760662 e-01, +9.858577479051078 e-01, +9.838303127859196 e-01, +9.816822625580078 e-01, +9.794074486605805 e-01, +9.769999155793757 e-01, +9.744528356359687 e-01, +9.717597500340699 e-01, +9.689141159310996 e-01, +9.659101618500662 e-01, +9.627421831412876 e-01, +9.594038121639412 e-01, +9.558889978382734 e-01, +9.521922434090249 e-01, +9.483086322505029 e-01, +9.442332539187503 e-01, +9.399607238929982 e-01, +9.354860218216989 e-01, +9.308052967663477 e-01, +9.259146970284931 e-01, +9.208101305030523 e-01, +9.154873597416558 e-01, +9.099426066529104 e-01, +9.041732260327581 e-01, +8.981763729936715 e-01, +8.919490241013392 e-01, +8.854882249661838 e-01, +8.787919436722827 e-01, +8.718585835568161 e-01, +8.646864947605047 e-01, +8.572738135700366 e-01, +8.496195859658071 e-01, +8.417237467711145 e-01, +8.335862715770727 e-01, +8.252074428838668 e-01, +8.165875713256009 e-01, +8.077280370477699 e-01, +7.986311592191131 e-01, +7.892986353718001 e-01, +7.797330954210866 e-01, +7.699379531983687 e-01, +7.599171886893816 e-01, +7.496758423734833 e-01, +7.392176841476761 e-01, +7.285474515411827 e-01, +7.176714478163359 e-01, +7.065962311464494 e-01, +6.953282935906302 e-01, +6.838739059112046 e-01, +6.722395305539791 e-01, +6.604334017809461 e-01, +6.484643596235256 e-01, +6.363395004626368 e-01, +6.240661431421666 e-01, +6.116530334821534 e-01, +5.991098644638286 e-01, +5.864461424698465 e-01, +5.736694851703749 e-01, +5.607881029948401 e-01, +5.478160663871271 e-01, +5.347619788897301 e-01, +5.216365147692703 e-01, +5.084499758302256 e-01, +4.952135086430446 e-01, +4.819387562519412 e-01, +4.686361426419003 e-01, +4.553170769563941 e-01, +4.419939954454178 e-01, +4.286789889246267 e-01, +4.153837786572842 e-01, +4.021211063103491 e-01, +3.889032719013054 e-01, +3.757425439137077 e-01, +3.626515183776310 e-01, +3.496431418636322 e-01, +3.367290822653354 e-01, +3.239228075238623 e-01, +3.112360816586549 e-01, +2.986807941537710 e-01, +2.862694673284843 e-01, +2.740128472224539 e-01, +2.619228330079575 e-01, +2.500098438708934 e-01, +2.382847225401669 e-01, +2.267578490199104 e-01, +2.154390996938547 e-01, +2.043379825955254 e-01, +1.934636765792024 e-01, +1.828250319214460 e-01, +1.724305860483634 e-01, +1.622886348529314 e-01, +1.524071880359812 e-01, +1.427939789949266 e-01, +1.334565845242183 e-01, +1.244023922999665 e-01, +1.156385879569742 e-01, +1.071721547807196 e-01, +9.900985872728905 e-02, +9.115821766572002 e-02, +8.362344855837105 e-02, +7.641140367416376 e-02, +6.952749039054598 e-02, +6.297656454790079 e-02, +5.676284244020858 e-02, +5.088975408628229 e-02, +4.535983304624439 e-02, +4.017457306236873 e-02, +3.533430192568957 e-02, +3.083806062123772 e-02, +2.668355420358626 e-02, +2.286680405144430 e-02, +1.938236337675363 e-02, +1.622312720409645 e-02, +1.338005016725895 e-02, +1.084218595595746 e-02, +8.596753980908744 e−03, +6.640506529168652 e−03, +5.172703110468352 e−03, +0.000000000000000 e+00, +0.000000000000000 e+00, +0.000000000000000 e+00, +0.000000000000000 e+00, +0.000000000000000 e+00, +0.000000000000000 e+00, +0.000000000000000 e+00, +0.000000000000000 e+00, +0.000000000000000 e+00, +0.000000000000000 e+00, +0.000000000000000 e+00, +0.000000000000000 e+00, +0.000000000000000 e+00, +0.000000000000000 e+00, +0.000000000000000 e+00, +0.000000000000000 e+00, +0.000000000000000 e+00, +0.000000000000000 e+00, +0.000000000000000 e+00, +0.000000000000000 e+00, +0.000000000000000 e+00, +0.000000000000000 e+00, +0.000000000000000 e+00, +0.000000000000000 e+00, +0.000000000000000 e+00, +0.000000000000000 e+00, +0.000000000000000 e+00, +0.000000000000000 e+00, +0.000000000000000 e+00, +0.000000000000000 e+00, +0.000000000000000 e+00, +0.000000000000000 e+00, +0.000000000000000 e+00, +0.000000000000000 e+00, +0.000000000000000 e+00, +0.000000000000000 e+00, +0.000000000000000 e+00, +0.000000000000000 e+00, +0.000000000000000 e+00, +0.000000000000000 e+00, +0.000000000000000 e+00, +0.000000000000000 e+00, +0.000000000000000 e+00, +0.000000000000000 e+00, +0.000000000000000 e+00, +0.000000000000000 e+00, +0.000000000000000 e+00, +0.000000000000000 e+00, +0.000000000000000 e+00, +0.000000000000000 e+00, +0.000000000000000 e+00, +0.000000000000000 e+00, +0.000000000000000 e+00, +0.000000000000000 e+00, +0.000000000000000 e+00, +0.000000000000000 e+00, +0.000000000000000 e+00, +0.000000000000000 e+00, +0.000000000000000 e+00, +0.000000000000000 e+00.

23. The apparatus of claim 1, wherein the analysis windowing function comprises at least a succession, in forward or backward order, formed by the following values or at least a sub-succession with 10 values of the following values if different from 0, with ±1% of tolerance:

+3.821992968116373 e−04, +5.337292962876158 e−04, +7.010318350640769 e−04, +8.910357994632938 e−04, +1.107726421735994 e−03, +1.354305556720234 e−03, +1.632968062524617 e−03, +1.944392065549996 e−03, +2.291251920978034 e−03, +2.676357471188558 e−03, +3.102160324883627 e−03, +3.569302917352426 e−03, +4.080147004222224 e−03, +4.637409387087253 e−03, +5.243697651112320 e−03, +5.900394401532485 e−03, +6.609908124535202 e−03, +7.375089966000295 e−03, +8.197610411215884 e−03, +9.078195201482999 e−03, +1.001888876231112 e−02, +1.102272421949215 e−02, +1.209201783148431 e−02, +1.322773320467288 e−02, +1.443170227861997 e−02, +1.570673344965518 e−02, +1.705481769961258 e−02, +1.847711280171765 e−02, +1.997546609433320 e−02, +2.155255505248360 e−02, +2.320993080187466 e−02, +2.494800748775296 e−02, +2.676898100961685 e−02, +2.867550388692567 e−02, +3.066976865911597 e−02, +3.275241094528637 e−02, +3.492474656851959 e−02, +3.718932683936013 e−02, +3.954748420753697 e−02, +4.200013716597904 e−02, +4.454866443036003 e−02, +4.719547798640356 e−02, +4.994161943600844 e−02, +5.278755308483513 e−02, +5.573471840677637 e−02, +5.878567633813699 e−02, +6.194176167634657 e−02, +6.520301218579141 e−02, +6.857009288032996 e−02, +7.204473108503576 e−02, +7.562815385274406 e−02, +7.932038618419741 e−02, +8.312281225703541 e−02, +8.703660776989294 e−02, +9.106251913073614 e−02, +9.519952848393795 e−02, +9.944854075501454 e−02, +1.038112769854394 e−01, +1.082885168352610 e−01, +1.128793060660070 e−01, +1.175834766182813 e−01, +1.224015773361210 e−01, +1.273338065186211 e−01, +1.323793987456491 e−01, +1.375389612590117 e−01, +1.428131506368226 e−01, +1.482015069292479 e−01, +1.537021065265166 e−01, +1.593143180431248 e−01, +1.650390046254505 e−01, +1.708759773387028 e−01, +1.768238156096776 e−01, +1.828814674176937 e−01, +1.890485613515956 e−01, +1.953239376543276 e−01, +2.017057139908492 e−01, +2.081934824879514 e−01, +2.147873518665726 e−01, +2.214861559453727 e−01, +2.282869811837961 e−01, +2.351877543503455 e−01, +2.421885165595468 e−01, +2.492877833071390 e−01, +2.564833108170047 e−01, +2.637736050921935 e−01, +2.711575593740559 e−01, +2.786328295517739 e−01, +2.861965981859126 e−01, +2.938469307293017 e−01, +3.015829286213736 e−01, +3.094025219039914 e−01, +3.173023310827802 e−01, +3.252796888787393 e−01, +3.333329987313211 e−01, +3.414597523183469 e−01, +3.496568059948401 e−01, +3.579215403419018 e−01, +3.662523018706806 e−01, +3.746461722601965 e−01, +3.830993933108193 e−01, +3.916090507233831 e−01, +4.001732470818926 e−01, +4.087890872349265 e−01, +4.174524354370054 e−01, +4.261601728427663 e−01, +4.349103424521226 e−01, +4.436999665749521 e−01, +4.525250566690236 e−01, +4.613821390145840 e−01, +4.702690556535691 e−01, +4.791821288489955 e−01, +4.881175853001019 e−01, +4.970720120437943 e−01, +5.060433154467696 e−01, +5.150277508616620 e−01, +5.240208300352607 e−01, +5.330187387865785 e−01, +5.420196856030712 e−01, +5.510201184135838 e−01, +5.600165101133929 e−01, +5.690047761849362 e−01, +5.779823098049300 e−01, +5.869449780892492 e−01, +5.958886225335936 e−01, +6.048099568741729 e−01, +6.137068698395559 e−01, +6.225761217125432 e−01, +6.314128591964590 e−01, +6.402134772829997 e−01, +6.489754897736506 e−01, +6.576959114103553 e−01,

+6.663704870510495 e−01, +6.749962795110787 e−01, +6.835701860237697 e−01, +6.920890588499607 e−01, +7.005478826218464 e−01, +7.089444008783498 e−01, +7.172765338080037 e−01, +7.255415386736762 e−01, +7.337354140683028 e−01, +7.418546544582220 e−01, +7.498972580176051 e−01, +7.578599326607545 e−01, +7.657390988438872 e−01, +7.735317637507610 e−01, +7.812362247368221 e−01, +7.888499478365373 e−01, +7.963691608881653 e−01, +8.037915368847273 e−01, +8.111154166403033 e−01, +8.183384161720055 e−01, +8.254567363530231 e−01, +8.324682688387346 e−01, +8.393715063470556 e−01, +8.461645428100565 e−01, +8.528442051510350 e−01, +8.594088830061699 e−01, +8.658575289268042 e−01, +8.721883611259660 e−01, +8.783992457627015 e−01, +8.844895714000796 e−01, +8.904559910537616 e−01, +8.962997945931150 e−01, +9.020168984242400 e−01, +9.076056139480890 e−01, +9.130664170641334 e−01, +9.183979162084582 e−01, +9.235994678560167 e−01, +9.286692422352107 e−01, +9.336076279434850 e−01, +9.384129048732400 e−01, +9.430836933050435 e−01, +9.476197145049868 e−01, +9.520221006942875 e−01, +9.562904165806793 e−01, +9.604235518327253 e−01, +9.644205605875820 e−01, +9.682827690312492 e−01, +9.720106722663890 e−01, +9.756042291745447 e−01, +9.790638238608151 e−01, +9.823902028722666 e−01, +9.855837812929384 e−01, +9.886436665180195 e−01, +9.915714515450228 e−01, +9.943692859110803 e−01, +9.970385179500313 e−01, +9.995787919228785 e−01, +1.001991256344717 e+00, +1.004277707367492 e+00, +1.006439806897506 e+00, +1.008478224880801 e+00, +1.010395057449511 e+00, +1.012192316076366 e+00, +1.013871638199171 e+00, +1.015433826923486 e+00, +1.016881083871244 e+00, +1.018216717878600 e+00, +1.019442870837515 e+00, +1.020560853084751 e+00, +1.021572361827679 e+00, +1.022480682703848 e+00, +1.023288268237906 e+00, +1.023997104737320 e+00, +1.024609726504572 e+00, +1.025129444345768 e+00, +1.025558707847599 e+00, +1.025899187425550 e+00, +1.026153736073730 e+00, +1.026326400217514 e+00, +1.026419755159132 e+00, +1.026435753513555 e+00, +1.026376745497183 e+00, +1.026246413164014 e+00, +1.026047802601159 e+00, +1.025783163725466 e+00, +1.025455636062312 e+00, +1.025068712226252 e+00, +1.024625269765159 e+00, +1.024127035189888 e+00, +1.023577282345944 e+00, +1.022979990313458 e+00, +1.022338337695996 e+00, +1.021654354624439 e+00, +1.020930844259280 e+00, +1.020171385028845 e+00, +1.019379551852598 e+00, +1.018557222865231 e+00, +1.017708008483692 e+00, +1.016835630605444 e+00, +1.015943000562828 e+00, +1.015032211107897 e+00, +1.014106040189062 e+00, +1.013168810057302 e+00, +1.012223533569952 e+00, +1.011272160610958 e+00, +1.010317161995333 e+00, +1.009363573682324 e+00, +1.008418957730006 e+00, +1.007443035427814 e+00, +1.006980582693088 e+00, +1.005880191360173 e+00, +1.004870660907557 e+00, +1.003887307826199 e+00, +1.002933862630671 e+00, +1.002012456628431 e+00, +1.001122929266782 e+00, +1.000264200804259 e+00, +9.994361518334981 e−01, +9.986396025239043 e−01, +9.978744044020248 e−01, +9.971394126637049 e−01, +9.964344374346332 e−01, +9.957602381261346 e−01, +9.951165794460692 e−01, +9.945022689695088 e−01, +9.939170480434331 e−01, +9.933616056210112 e−01, +9.928356667510468 e−01, +9.923379640068731 e−01, +9.918682011153984 e−01, +9.914270132578689 e−01, +9.910140670228395 e−01, +9.906280727376265 e−01, +9.902686735168059 e−01, +9.899364775767996 e−01, +9.896311064950427 e−01, +9.893512408407925 e−01, +9.890965020344753 e−01, +9.888674481881904 e−01, +9.886636955343167 e−01, +9.884838850803949 e−01, +9.883276240055705 e−01, +9.881954463086439 e−01, +9.880869460773882 e−01, +9.880007538329854 e−01, +9.879364462155417 e−01, +9.878945575956836 e−01, +9.878746493979034 e−01, +9.878753499522159 e−01, +9.878962158879177 e−01, +9.879377642109470 e−01, +9.879995488718708 e−01, +9.880801746803725 e−01, +9.881791937541983 e−01, +9.882970966792446 e−01, +9.884334355024147 e−01, +9.885867883714737 e−01, +9.887566952073135 e−01, +9.889436358294569 e−01, +9.891471384894399 e−01, +9.893657732439902 e−01, +9.895990550550585 e−01, +9.898474573387898 e−01, +9.901104832002432 e−01, +9.903866926546286 e−01, +9.906755858999687 e−01, +9.909776136318341 e−01, +9.912922749689899 e−01, +9.916181054602099 e−01, +9.919545975686356 e−01, +9.923021872317422 e−01, +9.926603609120486 e−01, +9.930276450366935 e−01, +9.934035125599263 e−01, +9.937883997783191 e−01, +9.941817792665538 e−01, +9.945821646067609 e−01, +9.949890245456261 e−01, +9.954027843196593 e−01, +9.958229139376651 e−01, +9.962479146150113 e−01, +9.966772475112751 e−01, +9.971113385049125 e−01, +9.975496462958124 e−01, +9.979906675056988 e−01, +9.984338592613343 e−01, +9.988796523949821 e−01, +9.993275431378141 e−01, +9.997753812452573 e−01, +1.000224669219663 e+00, +1.000672909364706 e+00, +1.001121604191588 e+00, +1.001568597382930 e+00, +1.002013378040221 e+00, +1.002456372686098 e+00, +1.002897030034197 e+00, +1.003333829980590 e+00, +1.003766216551067 e+00, +1.004194607298016 e+00, +1.004618447680436 e+00, +1.005036211788027 e+00,

+1.005447348229275 e+00, +1.005852270535212 e+00, +1.006250425365265 e+00, +1.006640290029854 e+00, +1.007021310029137 e+00, +1.007393907701933 e+00, +1.007757528772291 e+00, +1.008110655922241 e+00, +1.008452744553207 e+00, +1.008784215564761 e+00, +1.009104530964226 e+00, +1.009412177137242 e+00, +1.009706620067364 e+00, +1.009988296223056 e+00, +1.010256673981368 e+00, +1.010510261597171 e+00, +1.010748529051234 e+00, +1.010971938438940 e+00, +1.011179974034890 e+00, +1.011371154144579 e+00, +1.011544976893053 e+00, +1.011701915457469 e+00, +1.011841483052088 e+00, +1.011962209203063 e+00, +1.012063621581602 e+00, +1.012146211141323 e+00, +1.012209509774826 e+00, +1.012252080651208 e+00, +1.012273461473019 e+00, +1.012274179329824 e+00, +1.012253779830287 e+00, +1.012210860152664 e+00, +1.012144976732521 e+00, +1.012056685871527 e+00, +1.011945565763788 e+00, +1.011810229432951 e+00, +1.011650280893217 e+00, +1.011466289818154 e+00, +1.011257880752579 e+00, +1.011023694799342 e+00, +1.010763375755366 e+00, +1.010477533938561 e+00, +1.010165826445586 e+00, +1.009826955798404 e+00, +1.009460591235290 e+00, +1.009067412134881 e+00, +1.008647118373303 e+00, +1.008198467170796 e+00, +1.007721196075366 e+00, +1.007216031301935 e+00, +1.006682757156533 e+00, +1.006120180721864 e+00, +1.005528123164754 e+00, +1.004907385380564 e+00, +1.004257813991292 e+00, +1.003578321293819 e+00, +1.002868793771428 e+00, +1.002130123378852 e+00, +1.001362250678481 e+00, +1.000564166270619 e+00, +9.997358689793686 e−01, +9.988783302889642 e−01, +9.979915852192069 e−01, +9.970747197397686 e−01, +9.961277448216609 e−01, +9.951529474418550 e−01, +9.941541831614942 e−01, +9.930678080460911 e−01, +9.914646039976289 e−01, +9.902352352689523 e−01, +9.889131869680553 e−01, +9.875383274623817 e−01, +9.861028679251979 e−01, +9.846041087188396 e−01, +9.830394337851476 e−01, +9.814052410296346 e−01, +9.796987091039431 e−01, +9.779184677896273 e−01, +9.760616740194450 e−01, +9.741245958128935 e−01, +9.721043782586516 e−01, +9.699991325531057 e−01, +9.678068213341133 e−01, +9.655234943873925 e−01, +9.631470850364502 e−01, +9.606758082762421 e−01, +9.581070287387355 e−01, +9.554372064329766 e−01, +9.526641870716750 e−01, +9.497868942084339 e−01, +9.468034353946915 e−01, +9.437103240778303 e−01, +9.405054771915659 e−01, +9.371877218082764 e−01, +9.337553821450042 e−01, +9.302057763482381 e−01, +9.265373496318979 e−01, +9.227494594741956 e−01, +9.188401295674290 e−01, +9.148067377557749 e−01, +9.106476709258303 e−01, +9.063629680720371 e−01, +9.019514987490371 e−01, +8.974108808873397 e−01, +8.927398817643528 e−01, +8.879382683346716 e−01, +8.830050715882986 e−01, +8.779385355821995 e−01, +8.727379973888942 e−01, +8.674038889082810 e−01, +8.619352566808824 e−01, +8.563305243162549 e−01, +8.505893287555129 e−01, +8.447127297770400 e−01, +8.387007637143140 e−01, +8.325523768291013 e−01, +8.262677444285360 e−01, +8.198478927378535 e−01, +8.132935411236417 e−01, +8.066040997239516 e−01, +7.997809105802602 e−01, +7.928255537687610 e−01, +7.857391245481645 e−01, +7.785212684545030 e−01, +7.711744403395434 e−01, +7.637008160854790 e−01, +7.561026668755407 e−01, +7.483805701761127 e−01, +7.405363749469933 e−01, +7.325730245135402 e−01, +7.244930008228270 e−01, +7.162980305440977 e−01, +7.079910089690906 e−01, +6.995757887359807 e−01, +6.910546259244099 e−01, +6.824295471401947 e−01, +6.737031265887281 e−01, +6.648801659515325 e−01, +6.559637902883004 e−01, +6.469573547411541 e−01, +6.378629377753962 e−01, +6.286855280775698 e−01, +6.194273058858271 e−01, +6.100922809170846 e−01, +6.006842631336996 e−01, +5.912087588215279 e−01, +5.816678990293079 e−01, +5.720650011081139 e−01, +5.624031153715043 e−01, +5.526906296747590 e−01, +5.429296335729603 e−01, +5.331253296256703 e−01, +5.232805923025862 e−01, +5.134010079652535 e−01, +5.034916218473681 e−01, +4.935565059779637 e−01, +4.835996679580253 e−01, +4.736270399539165 e−01, +4.636428606356920 e−01, +4.536519115376573 e−01, +4.436589520558524 e−01, +4.336702110092904 e−01, +4.236905139305571 e−01, +4.137241358370227 e−01, +4.037764981593496 e−01, +3.938536636599411 e−01, +3.839608678121244 e−01, +3.741023650337649 e−01, +3.642834353302138 e−01, +3.545105744959439 e−01, +3.447887254766501 e−01, +3.351225758795436 e−01, +3.255174149216463 e−01, +3.159783340225490 e−01, +3.065118829951374 e−01, +2.971215837581699 e−01, +2.878124834032541 e−01, +2.785898831431837 e−01, +2.694592444601873 e−01, +2.604240268886858 e−01, +2.514886909115454 e−01, +2.426587307354934 e−01, +2.339385917103926 e−01, +2.253316454409216 e−01, +2.168420127437019 e−01, +2.084745870335012 e−01, +2.002332724591125 e−01, +1.921209969418307 e−01, +1.841414579810840 e−01, +1.762991374092108 e−01, +1.685975427109672 e−01, +1.610392647455030 e−01, +1.536276387455411 e−01, +1.463667950599712 e−01, +1.392599476606262 e−01, +1.323093893293405 e−01, +1.255182155111708 e−01, +1.188903216873086 e−01, +1.124286726877977 e−01, +1.061353122093495 e−01, +1.000130754353283 e−01,

+9.406556557413207 e-02, +8.829543394466104 e-02, +8.270438757849530 e-02, +7.729486433686703 e-02, +7.206998099643687 e-02, +6.703183558090599 e-02, +6.218153160076208 e-02, +5.752079270262547 e-02, +5.305187265543024 e-02, +4.877591488398974 e-02, +4.469299727922282 e-02, +4.080367800167831 e-02, +3.710883802024244 e-02, +3.360819061792393 e-02, +3.030027537135876 e-02, +2.718416076819826 e-02, +2.425872983336823 e-02, +2.152170070657780 e-02, +1.896992105664512 e-02, +1.660053693426304 e-02, +1.441002712765955 e-02, +1.239334766429038 e-02, +1.054549096241532 e-02, +8.862485552559351 e-03, +7.329085750247888 e-03, +5.896299968476346 e-03, +4.914753459788711 e-03, +0.000000000000000 e+00, +0.000000000000000 e+00, +0.000000000000000 e+00, +0.000000000000000 e+00, +0.000000000000000 e+00, +0.000000000000000 e+00, +0.000000000000000 e+00, +0.000000000000000 e+00, +0.000000000000000 e+00, +0.000000000000000 e+00, +0.000000000000000 e+00, +0.000000000000000 e+00, +0.000000000000000 e+00, +0.000000000000000 e+00, +0.000000000000000 e+00, +0.000000000000000 e+00, +0.000000000000000 e+00, +0.000000000000000 e+00, +0.000000000000000 e+00, +0.000000000000000 e+00, +0.000000000000000 e+00, +0.000000000000000 e+00, +0.000000000000000 e+00, +0.000000000000000 e+00, +0.000000000000000 e+00, +0.000000000000000 e+00, +0.000000000000000 e+00, +0.000000000000000 e+00, +0.000000000000000 e+00, +0.000000000000000 e+00, +0.000000000000000 e+00, +0.000000000000000 e+00, +0.000000000000000 e+00, +0.000000000000000 e+00, +0.000000000000000 e+00, +0.000000000000000 e+00, +0.000000000000000 e+00, +0.000000000000000 e+00, +0.000000000000000 e+00, +0.000000000000000 e+00, +0.000000000000000 e+00, +0.000000000000000 e+00, +0.000000000000000 e+00, +0.000000000000000 e+00, +0.000000000000000 e+00, +0.000000000000000 e+00, +0.000000000000000 e+00, +0.000000000000000 e+00, +0.000000000000000 e+00, +0.000000000000000 e+00, +0.000000000000000 e+00, +0.000000000000000 e+00, +0.000000000000000 e+00, +0.000000000000000 e+00, +0.000000000000000 e+00, +0.000000000000000 e+00, +0.000000000000000 e+00, +0.000000000000000 e+00, +0.000000000000000 e+00, +0.000000000000000 e+00, +0.000000000000000 e+00, +0.000000000000000 e+00, +0.000000000000000 e+00, +0.000000000000000 e+00, +0.000000000000000 e+00, +0.000000000000000 e+00, +0.000000000000000 e+00, +0.000000000000000 e+00, +0.000000000000000 e+00, +0.000000000000000 e+00, +0.000000000000000 e+00, +0.000000000000000 e+00, +0.000000000000000 e+00, +0.000000000000000 e+00, +0.000000000000000 e+00, +0.000000000000000 e+00, +0.000000000000000 e+00, +0.000000000000000 e+00, +0.000000000000000 e+00, +0.000000000000000 e+00.

24. The apparatus of claim 1, wherein the analysis windowing function comprises at least a succession, in forward or backward order, formed by the following values or at least a sub-succession with 10 values of the following values if different from 0, with ±1% of tolerance:

+3.538498803770035 e-04, +4.595886345493055 e-04, +5.595519647227489 e-04, +6.718404887323839 e-04, +7.919323614002698 e-04, +9.254835101516548 e-04, +1.069418485858920 e-03, +1.227927169310031 e-03, +1.398277791978983 e-03, +1.584491535026729 e-03, +1.783653266717233 e-03, +1.999873692180148 e-03, +2.230687004705732 e-03, +2.479549413444207 e-03, +2.744274680521470 e-03, +3.028517203082985 e-03, +3.329799454594260 e-03, +3.651493788541270 e-03, +3.991659081158673 e-03, +4.353535478916468 e-03, +4.734803493964832 e-03, +5.139354888882466 e-03, +5.564965156664017 e-03, +6.015065135312130 e-03, +6.487669532207667 e-03, +6.986108359341676 e-03, +7.507986430774601 e-03, +8.056692238103912 e-03, +8.629882322202329 e-03, +9.230898632007642 e-03, +9.857619542786990 e-03, +1.051343406844975 e-02, +1.119617236058772 e-02, +1.190938692951881 e-02, +1.265082642578719 e-02, +1.342375201935177 e-02, +1.422598597626579 e-02, +1.506090447446532 e-02, +1.592611511144210 e-02, +1.682519266177794 e-02, +1.775591229287213 e-02, +1.872166356881472 e-02, +1.972014746423546 e-02, +2.075475983187825 e-02, +2.182299926812682 e-02, +2.292828566629717 e-02, +2.406813715401559 e-02, +2.524583465017564 e-02, +2.645943128544517 e-02, +2.771207863541604 e-02, +2.900157039370381 e-02, +3.033143686044867 e-02, +3.169933248543932 e-02, +3.310834554878132 e-02, +3.455615910816914 e-02, +3.604609640533871 e-02, +3.757564512209753 e-02, +3.914808612511974 e-02, +4.076128638095439 e-02, +4.241834056741758 e-02, +4.411695502674887 e-02, +4.586038120884381 e-02, +4.764607953574337 e-02, +4.947719681327219 e-02, +5.135136676471998 e-02, +5.327183246133368 e-02, +5.523619574402436 e-02, +5.724780220726930 e-02, +5.930419525733627 e-02, +6.140861916695377 e-02, +6.355854744461048 e-02, +6.575698564821578 e-02, +6.800132774040281 e-02, +7.029450733434550 e-02, +7.263424529955659 e-02, +7.502357150869594 e-02, +7.745987198268531 e-02, +7.994662730757418 e-02, +8.248121208201259 e-02, +8.506635369887924 e-02, +8.769965758141890 e-02, +9.038399472465716 e-02, +9.311641620512773 e-02, +9.590005739506280 e-02, +9.873233942897164 e-02, +1.016162955027316 e-01,

+1.045493607096311 e-01, +1.075345731608719 e-01, +1.105690806271684 e-01, +1.136556251529813 e-01, +1.167913767515824 e-01, +1.199789286645804 e-01, +1.232155302990620 e-01, +1.265040684552515 e-01, +1.298417294090302 e-01, +1.332315661550852 e-01, +1.366709127560524 e-01, +1.401623800497866 e-01, +1.437031543339276 e-01, +1.472957921567060 e-01, +1.509371564593891 e-01, +1.546298983040232 e-01, +1.583709932021852 e-01, +1.621632295622287 e-01, +1.660038996795837 e-01, +1.698955982096184 e-01, +1.738354123649302 e-01, +1.778260015982545 e-01, +1.818640789446629 e-01, +1.859520359191026 e-01, +1.900868218108653 e-01, +1.942708017706291 e-01, +1.985008828937603 e-01, +2.027798260494142 e-01, +2.071046414574582 e-01, +2.114778554475382 e-01, +2.158964254821512 e-01, +2.203627179356420 e-01, +2.248732557074316 e-01, +2.294303802774835 e-01, +2.340304946493155 e-01, +2.386763947872762 e-01, +2.433647632018021 e-01, +2.480980084587409 e-01, +2.528729453658238 e-01, +2.576919809402799 e-01, +2.625518239753811 e-01, +2.674547009618951 e-01, +2.723969864831702 e-01, +2.773809014717047 e-01, +2.824031465430401 e-01, +2.874658392896952 e-01, +2.925657097525320 e-01, +2.977050145264297 e-01, +3.028802866809923 e-01, +3.080937708388026 e-01, +3.133419120661713 e-01, +3.186267330325243 e-01, +3.239446274586855 e-01, +3.292976696294886 e-01, +3.346822587497995 e-01, +3.401004975161905 e-01, +3.455490160824131 e-01, +3.510297825670005 e-01, +3.565392648316303 e-01, +3.620795045342974 e-01, +3.676468198385683 e-01, +3.732431609065464 e-01, +3.788648665671841 e-01, +3.845139947587731 e-01, +3.901867575702975 e-01, +3.958851576591690 e-01, +4.016055596175310 e-01, +4.073498814407726 e-01, +4.131143794748322 e-01, +4.189008731078437 e-01, +4.247056871121635 e-01, +4.305308301005456 e-01, +4.363724468005679 e-01, +4.422326205247767 e-01, +4.481076715576617 e-01, +4.539992478845187 e-01, +4.599036262256764 e-01, +4.658227790464821 e-01, +4.717526717360889 e-01, +4.776951277513855 e-01, +4.836466393241829 e-01, +4.896089037533445 e-01, +4.955781691142885 e-01, +5.015564851667653 e-01, +5.075397341675292 e-01, +5.135297950483941 e-01, +5.195228071176610 e-01, +5.255203889406241 e-01, +5.315186369941947 e-01, +5.375197039843709 e-01, +5.435197203416460 e-01, +5.495204053284317 e-01, +5.555183841040963 e-01, +5.615153912741460 e-01, +5.675072245552497 e-01, +5.734957812557457 e-01, +5.794770758870604 e-01, +5.854526176188222 e-01, +5.914186654649489 e-01, +5.973773282523112 e-01, +6.033245382283379 e-01, +6.092622887527459 e-01, +6.151869491458284 e-01, +6.211002315674210 e-01, +6.269981160888640 e-01, +6.328823912226461 e-01, +6.387491304847892 e-01, +6.446002007776794 e-01, +6.504316924413531 e-01, +6.562457600042717 e-01, +6.620384583071039 e-01, +6.678117513456276 e-01, +6.735619658538692 e-01, +6.792906550106088 e-01, +6.849937204005565 e-01, +6.906734235708962 e-01, +6.963256426589250 e-01, +7.019517880051427 e-01, +7.075491663942173 e-01, +7.131194393772130 e-01, +7.186585770351414 e-01, +7.241690155466505 e-01, +7.296469905863920 e-01, +7.350940240070911 e-01, +7.405065029424016 e-01, +7.458864594794676 e-01, +7.512298245353598 e-01, +7.565387020584289 e-01, +7.618094719403713 e-01, +7.670441227603888 e-01, +7.722388831102434 e-01, +7.773958448163656 e-01, +7.825113901786742 e-01, +7.875876391562497 e-01, +7.926208751337592 e-01, +7.976131629355570 e-01, +8.025610715609228 e-01, +8.074666387233143 e-01, +8.123261531893655 e-01, +8.171419338595847 e-01, +8.219101564897180 e-01, +8.266329452432137 e-01, +8.313069432125857 e-01, +8.359343163788637 e-01, +8.405111871797961 e-01, +8.450403211238631 e-01, +8.495180470826319 e-01, +8.539464819668052 e-01, +8.583225792686004 e-01, +8.626485837105826 e-01, +8.669206756254478 e-01, +8.711415846800790 e-01, +8.753083234662220 e-01, +8.794234355078734 e-01, +8.834826778788665 e-01, +8.874884715160425 e-01, +8.914384774585629 e-01, +8.953346996622868 e-01, +8.991737724042251 e-01, +9.029574074899029 e-01, +9.066828541224163 e-01, +9.103527429187326 e-01, +9.139638342168577 e-01, +9.175184878836662 e-01, +9.210144133066616 e-01, +9.244537632557187 e-01, +9.278332160151861 e-01, +9.311556192776946 e-01, +9.344176283021008 e-01, +9.376215186479845 e-01, +9.407644740241826 e-01, +9.438492190005341 e-01, +9.468728540294310 e-01, +9.498382236872068 e-01, +9.527426712456687 e-01, +9.555885737210712 e-01, +9.583732599601223 e-01, +9.610993609218629 e-01, +9.637636503225360 e-01, +9.663690412284377 e-01, +9.689132689491541 e-01, +9.713988678700001 e-01, +9.738235617865406 e-01, +9.761902903500818 e-01, +9.784963361871022 e-01, +9.807442506043361 e-01, +9.829315352320943 e-01, +9.850609512273165 e-01, +9.871297972052695 e-01, +9.891408802831312 e-01, +9.910923625580078 e-01, +9.929872268444632 e-01, +9.948228821209419 e-01, +9.966027455323081 e-01, +9.983241398929388 e-01, +9.999898494568836 e-01, +1.001597808884145 e+00, +1.003150760219063 e+00, +1.004646500318265 e+00, +1.006088248744700 e+00, +1.007473713377193 e+00,

+1.008806248810530 e+00, +1.010083776257753 e+00, +1.011309151636166 e+00, +1.012480196393275 e+00, +1.013600067830152 e+00, +1.014666681083198 e+00, +1.015683082766535 e+00, +1.016647533889674 e+00, +1.017563337333301 e+00, +1.018428468753963 e+00, +1.019246216134229 e+00, +1.020014681326785 e+00, +1.020736921761459 e+00, +1.021410866072808 e+00, +1.022039872150903 e+00, +1.022622059577585 e+00, +1.023160749941404 e+00, +1.023654257342442 e+00, +1.024105973101631 e+00, +1.024514004504684 e+00, +1.024881624147540 e+00, +1.025207065371760 e+00, +1.025493542877243 e+00, +1.025739288978437 e+00, +1.025947636692103 e+00, +1.026116939910040 e+00, +1.026250709375593 e+00, +1.026347260729698 e+00, +1.026409787584788 e+00, +1.026436666375082 e+00, +1.026431212267978 e+00, +1.026391488022762 e+00, +1.026320857404224 e+00, +1.026217843764236 e+00, +1.026085730009027 e+00, +1.025922917798664 e+00, +1.025733019213987 e+00, +1.025514292433933 e+00, +1.025269979527211 e+00, +1.024998528084259 e+00, +1.024703212795365 e+00, +1.024382188798244 e+00, +1.024039051426278 e+00, +1.023672163232710 e+00, +1.023284940887058 e+00, +1.022875917162315 e+00, +1.022448453314994 e+00, +1.022000829220643 e+00, +1.021536599728231 e+00, +1.021053875701803 e+00, +1.020555973231408 e+00, +1.020041434676317 e+00, +1.019513866799503 e+00, +1.018971390778550 e+00, +1.018417599116053 e+00, +1.017851066303933 e+00, +1.017275179369116 e+00, +1.016688023745155 e+00, +1.016093242802983 e+00, +1.015489129111694 e+00, +1.014878956980025 e+00, +1.014261064091392 e+00, +1.013639356938881 e+00, +1.013011559583153 e+00, +1.012381741769641 e+00, +1.011747750709711 e+00, +1.011113332101179 e+00, +1.010476167900044 e+00, +1.009840844244693 e+00, +1.009204021773819 e+00, +1.008572045006596 e+00, +1.007939764480188 e+00, +1.007331850775798 e+00, +1.007112182697132 e+00, +1.006407400915498 e+00, +1.005715372118122 e+00, +1.005038785533845 e+00, +1.004374825095777 e+00, +1.003726291405694 e+00, +1.003090358040736 e+00, +1.002469814737132 e+00, +1.001861838147367 e+00, +1.001269198108365 e+00, +1.000689073754539 e+00, +1.000124220942757 e+00, +9.995718119556711 e−01, +9.990346001249977 e−01, +9.985097406611592 e−01, +9.979999918405413 e−01, +9.975024904153303 e−01, +9.970199948970832 e−01, +9.965496346682551 e−01, +9.960941547576162 e−01, +9.956506910018569 e−01, +9.952219662800089 e−01, +9.948051243621099 e−01, +9.944028741276870 e−01, +9.940123528373235 e−01, +9.936362728142866 e−01, +9.932717517525477 e−01, +9.929215102130406 e−01, +9.925826537087717 e−01, +9.922578948824415 e−01, +9.919443474477135 e−01, +9.916447007525191 e−01, +9.913560821234982 e−01, +9.910811659133294 e−01, +9.908170758245324 e−01, +9.905664908867821 e−01, +9.903265196045258 e−01, +9.900998445795673 e−01, +9.898835741176714 e−01, +9.896803735870122 e−01, +9.894873685512386 e−01, +9.893072032520545 e−01, +9.891370094863634 e−01, +9.889794323427195 e−01, +9.888315884970242 e−01, +9.886961351016699 e−01, +9.885701787626714 e−01, +9.884563716748773 e−01, +9.883518302777313 e−01, +9.882591911282058 e−01, +9.881755763473004 e−01, +9.881036242002076 e−01, +9.880404423341358 e−01, +9.879886826752381 e−01, +9.879454420034824 e−01, +9.879133688360181 e−01, +9.878895706371619 e−01, +9.878766784594818 e−01, +9.878718098237022 e−01, +9.878775927630988 e−01, +9.878911354436840 e−01, +9.879150762106034 e−01, +9.879465136687265 e−01, +9.879880844262307 e−01, +9.880368938846610 e−01, +9.880955662657537 e−01, +9.881612121412342 e−01, +9.882364564839506 e−01, +9.883183975703879 e−01, +9.884096731867189 e−01, +9.885073687439192 e−01, +9.886141241716089 e−01, +9.887270275540468 e−01, +9.888487088987707 e−01, +9.889762614809646 e−01, +9.891123127261381 e−01, +9.892539488627546 e−01, +9.894038044982261 e−01, +9.895589571176194 e−01, +9.897220412447528 e−01, +9.898901380212467 e−01, +9.900658706993652 e−01, +9.902463287269285 e−01, +9.904341281652976 e−01, +9.906263564100900 e−01, +9.908256340476208 e−01, +9.910290387632859 e−01, +9.912391966549245 e−01, +9.914531811725067 e−01, +9.916736156286597 e−01, +9.918975763831412 e−01, +9.921276814881759 e−01, +9.923610074433741 e−01, +9.926001740490448 e−01, +9.928422499725458 e−01, +9.930898628710855 e−01, +9.933400717991352 e−01, +9.935955098307742 e−01, +9.938532319665272 e−01, +9.941158706465729 e−01, +9.943804814776256 e−01, +9.946496946937963 e−01, +9.949205650500305 e−01, +9.951957244449919 e−01, +9.954722223202400 e−01, +9.957526959635303 e−01, +9.960341878404958 e−01, +9.963193400387707 e−01, +9.966051908036528 e−01, +9.968943831870675 e−01, +9.971839552785087 e−01, +9.974765480003592 e−01, +9.977692009836100 e−01, +9.980645531056329 e−01, +9.983596442023971 e−01, +9.986571134591464 e−01, +9.989539982645417 e−01, +9.992529406343204 e−01, +9.995509738170480 e−01, +9.998507434423984 e−01, +1.000149278838447 e+00, +1.000449227898040 e+00, +1.000747617880619 e+00, +1.001047097000738 e+00, +1.001344692310058 e+00, +1.001643050985813 e+00, +1.001939200113204 e+00, +1.002235786606954 e+00,

+1.002529835919150 e+00, +1.002823997223967 e+00, +1.003115291715261 e+00, +1.003406373183356 e+00, +1.003694257266035 e+00, +1.003981602446902 e+00, +1.004265420574493 e+00, +1.004548371695603 e+00, +1.004827468041713 e+00, +1.005105367331224 e+00, +1.005379085053508 e+00, +1.005651275972376 e+00, +1.005918957263603 e+00, +1.006184784468940 e+00, +1.006445772052972 e+00, +1.006704580223772 e+00, +1.006958219378997 e+00, +1.007209352772459 e+00, +1.007454991591196 e+00, +1.007697795962687 e+00, +1.007934783656087 e+00, +1.008168609148541 e+00, +1.008396295152072 e+00, +1.008620496650569 e+00, +1.008838233369544 e+00, +1.009052167883909 e+00, +1.009259314290145 e+00, +1.009462340194419 e+00, +1.009658261526612 e+00, +1.009849742422788 e+00, +1.010033806431099 e+00, +1.010213115163429 e+00, +1.010384692193296 e+00, +1.010551208502819 e+00, +1.010709677336593 e+00, +1.010862783160582 e+00, +1.011007533860188 e+00, +1.011146615898068 e+00, +1.011277044709547 e+00, +1.011401501255448 e+00, +1.011517007040469 e+00, +1.011626247430694 e+00, +1.011726237740989 e+00, +1.011819675175864 e+00, +1.011903571699736 e+00, +1.011980623923816 e+00, +1.012047856645320 e+00, +1.012107954864219 e+00, +1.012157955913755 e+00, +1.012200545438956 e+00, +1.012232755709885 e+00, +1.012257286376882 e+00, +1.012271163275396 e+00, +1.012277089047072 e+00, +1.012272100156695 e+00, +1.012258889781605 e+00, +1.012234505114778 e+00, +1.012201643414713 e+00, +1.012157343029718 e+00, +1.012104319978655 e+00, +1.012039603446877 e+00, +1.011965913685509 e+00, +1.011880293122688 e+00, +1.011785448628142 e+00, +1.011678439894684 e+00, +1.011561972516341 e+00, +1.011433103151726 e+00, +1.011294553726738 e+00, +1.011143373963981 e+00, +1.010982291036989 e+00, +1.010808368434796 e+00, +1.010624321020038 e+00, +1.010427231547075 e+00, +1.010219813871895 e+00, +1.009999148545101 e+00, +1.009767970668237 e+00, +1.009523347700539 e+00, +1.009268031808824 e+00, +1.008999095526602 e+00, +1.008719286674458 e+00, +1.008425698479647 e+00, +1.008121073095495 e+00, +1.007802512993334 e+00, +1.007472774447058 e+00, +1.007128952000889 e+00, +1.006773824218378 e+00, +1.006404483571931 e+00, +1.006023715042962 e+00, +1.005628630023041 e+00, +1.005222003295591 e+00, +1.004800972930542 e+00, +1.004368308119956 e+00, +1.003921160689206 e+00, +1.003462311571559 e+00, +1.002988912076156 e+00, +1.002503762756151 e+00, +1.002004016208227 e+00, +1.001492483526354 e+00, +1.000966332772540 e+00, +1.000428371467870 e+00, +9.998757944861690 e-01, +9.993114007411373 e-01, +9.987324107135600 e-01, +9.981416218519609 e-01, +9.975362702189898 e-01, +9.969191628491259 e-01, +9.962875422935514 e-01, +9.956442306333592 e-01, +9.949864765356604 e-01, +9.943171077259315 e-01, +9.936333924912825 e-01, +9.929380432296178 e-01, +9.917160727742302 e-01, +9.908677480361242 e-01, +9.900143412821714 e-01, +9.891360093161795 e-01, +9.882326326262749 e-01, +9.873035624860487 e-01, +9.863463238550498 e-01, +9.853620567056602 e-01, +9.843478797730104 e-01, +9.833051513036913 e-01, +9.822305093671991 e-01, +9.811260856582836 e-01, +9.799880424709783 e-01, +9.788185853162172 e-01, +9.776142582502931 e-01, +9.763768210132104 e-01, +9.751026333215269 e-01, +9.737939228124395 e-01, +9.724467635816038 e-01, +9.710631852370086 e-01, +9.696397017403771 e-01, +9.681786285613160 e-01, +9.666759668947944 e-01, +9.651341172191925 e-01, +9.635494800783196 e-01, +9.619242192293307 e-01, +9.602543350544703 e-01, +9.585422731136767 e-01, +9.567841986369237 e-01, +9.549824213719248 e-01, +9.531333627775944 e-01, +9.512394303101863 e-01, +9.492969005669868 e-01, +9.473083933922714 e-01, +9.452700238623795 e-01, +9.431841637391052 e-01, +9.410472222265884 e-01, +9.388615698236068 e-01, +9.366234817959531 e-01, +9.343357002925867 e-01, +9.319946435581106 e-01, +9.296028267859759 e-01, +9.271568160852692 e-01, +9.246592033932568 e-01, +9.221062052092852 e-01, +9.195004240356797 e-01, +9.168383396399868 e-01, +9.141224927600506 e-01, +9.113493760046765 e-01, +9.085218034087421 e-01, +9.056363890361683 e-01, +9.026958474136628 e-01, +8.996967011299613 e-01, +8.966416378522284 e-01, +8.935272411148886 e-01, +8.903562054918268 e-01, +8.871250499337346 e-01, +8.838366845222299 e-01, +8.804877931535187 e-01, +8.770812736055238 e-01, +8.736138336697008 e-01, +8.700884209228057 e-01, +8.665016401172241 e-01, +8.628563075036018 e-01, +8.591492134848260 e-01, +8.553833146397594 e-01, +8.515554376987873 e-01, +8.476686394755906 e-01, +8.437199738159921 e-01, +8.397124082723917 e-01, +8.356428970797861 e-01, +8.315145717373513 e-01, +8.273244136947282 e-01, +8.230753889817990 e-01, +8.187646556254478 e-01, +8.143955052591809 e-01, +8.099649296155544 e-01, +8.054763240960976 e-01, +8.009271179588155 e-01, +7.963204506324437 e-01, +7.916533519679438 e-01, +7.869294361891859 e-01, +7.821460539775005 e-01, +7.773057646170487 e-01, +7.724075191626083 e-01, +7.674541821769616 e-01, +7.624428319731227 e-01, +7.573778165664506 e-01, +7.522563457568547 e-01,

+7.470817821499429 e−01, +7.418518832940608 e−01, +7.365702052057368 e−01, +7.312341927030358 e−01, +7.258478768003871 e−01, +7.204090552899627 e−01, +7.149213766200488 e−01, +7.093829112276890 e−01, +7.037975107157410 e−01, +6.981626982337203 e−01, +6.924822574950567 e−01, +6.867542812151157 e−01, +6.809822459535158 e−01, +6.751641683711578 e−01, +6.693041888771051 e−01, +6.634003182158815 e−01, +6.574563319397519 e−01, +6.514710959179395 e−01, +6.454477530601381 e−01, +6.393842401194645 e−01, +6.332854832820911 e−01, +6.271477285210396 e−01, +6.209759156556838 e−01, +6.147685389896460 e−01, +6.085293803703800 e−01, +6.022569117623975 e−01, +5.959553778639692 e−01, +5.896228984554688 e−01, +5.832624455793536 e−01, +5.768737955463938 e−01, +5.704590282594502 e−01, +5.640165022515612 e−01, +5.575534287167304 e−01, +5.510670389249083 e−01, +5.445598110309068 e−01, +5.380320138069060 e−01, +5.314874283056712 e−01, +5.249238143777145 e−01, +5.183454027643609 e−01, +5.117512861349316 e−01, +5.051454054672581 e−01, +4.985259415650634 e−01, +4.918987341485414 e−01, +4.852602812611293 e−01, +4.786156067459849 e−01, +4.719635569001799 e−01, +4.653076657434153 e−01, +4.586473038370960 e−01, +4.519865712901121 e−01, +4.453241417472980 e−01, +4.386643656872857 e−01, +4.320060235689271 e−01, +4.253531733174983 e−01, +4.187046888325280 e−01, +4.120648989967404 e−01, +4.054326930449553 e−01, +3.988123056192917 e−01, +3.922024876218684 e−01, +3.856076044898875 e−01, +3.790262923635895 e−01, +3.724631634624147 e−01, +3.659167460890094 e−01, +3.593914828698104 e−01, +3.528864871672291 e−01, +3.464055764938486 e−01, +3.399474132903109 e−01, +3.335176660030293 e−01, +3.271139090168518 e−01, +3.207392420889753 e−01, +3.143954622458083 e−01, +3.080847161569418 e−01, +3.018061113177053 e−01, +2.955645092490569 e−01, +2.893580088818822 e−01, +2.831905952786933 e−01, +2.770614560088827 e−01, +2.709746519672053 e−01, +2.649288369241889 e−01, +2.589278854215034 e−01, +2.529705733428521 e−01, +2.470608550624402 e−01, +2.411974884962474 e−01, +2.353843453791010 e−01, +2.296201119084320 e−01, +2.239085920293915 e−01, +2.182484277107470 e−01, +2.126433716126154 e−01, +2.070920316105701 e−01, +2.015981078416022 e−01, +1.961601816145380 e−01, +1.907818965593135 e−01, +1.854618027014993 e−01, +1.802035203864437 e−01, +1.750055292053725 e−01, +1.698714235427536 e−01, +1.647996883470628 e−01, +1.597938610874129 e−01, +1.548523838673932 e−01, +1.499787548077658 e−01, +1.451714001185458 e−01, +1.404337947365906 e−01, +1.357643522991611 e−01, +1.311665152711531 e−01, +1.266386794659985 e−01, +1.221842534547464 e−01, +1.178016171445482 e−01, +1.134941442588690 e−01, +1.092601994264173 e−01, +1.051031184506442 e−01, +1.010212496137049 e−01, +9.701788451015510 e−02, +9.309135143613317 e−02, +8.924488982596421 e−02, +8.547680283183663 e−02, +8.179026694646475 e−02, +7.818355556343952 e−02, +7.465976378295235 e−02, +7.121713409722980 e−02, +6.785866241065035 e−02, +6.458254322751886 e−02, +6.139166651287085 e−02, +5.828416955031769 e−02, +5.526281189874142 e−02, +5.232565602156542 e−02, +4.947530987083008 e−02, +4.670976978373095 e−02, +4.403144898585497 e−02, +4.143827607712719 e−02, +3.893244425578721 e−02, +3.651180398163022 e−02, +3.417832280408597 e−02, +3.192976013776998 e−02, +2.976774716313782 e−02, +2.769013516567754 e−02, +2.569810636390758 e−02, +2.378944369289586 e−02, +2.196497565730828 e−02, +2.022259265088492 e−02, +1.856252261671509 e−02, +1.698293043956028 e−02, +1.548317776486453 e−02, +1.406194554493180 e−02, +1.271739094059619 e−02, +1.144924909653903 e−02, +1.025352572459910 e−02, +9.132141467690603 e−03, +8.076482660383204 e−03, +7.093814769976364 e−03, +6.160346335510290 e−03, +5.300044080947794 e−03, +4.327696566833525 e−03, +0.000000000000000 e+00, +0.000000000000000 e+00, +0.000000000000000 e+00, +0.000000000000000 e+00, +0.000000000000000 e+00, +0.000000000000000 e+00, +0.000000000000000 e+00, +0.000000000000000 e+00, +0.000000000000000 e+00, +0.000000000000000 e+00, +0.000000000000000 e+00, +0.000000000000000 e+00, +0.000000000000000 e+00, +0.000000000000000 e+00, +0.000000000000000 e+00, +0.000000000000000 e+00, +0.000000000000000 e+00, +0.000000000000000 e+00, +0.000000000000000 e+00, +0.000000000000000 e+00, +0.000000000000000 e+00, +0.000000000000000 e+00, +0.000000000000000 e+00, +0.000000000000000 e+00, +0.000000000000000 e+00, +0.000000000000000 e+00, +0.000000000000000 e+00, +0.000000000000000 e+00, +0.000000000000000 e+00, +0.000000000000000 e+00, +0.000000000000000 e+00, +0.000000000000000 e+00, +0.000000000000000 e+00, +0.000000000000000 e+00, +0.000000000000000 e+00, +0.000000000000000 e+00, +0.000000000000000 e+00, +0.000000000000000 e+00, +0.000000000000000 e+00, +0.000000000000000 e+00, +0.000000000000000 e+00, +0.000000000000000 e+00, +0.000000000000000 e+00, +0.000000000000000 e+00, +0.000000000000000 e+00, +0.000000000000000 e+00, +0.000000000000000 e+00, +0.000000000000000 e+00, +0.000000000000000 e+00, +0.000000000000000 e+00,

+0.000000000000000 e+00, +0.000000000000000 e+00, +0.000000000000000 e+00, +0.000000000000000 e+00, +0.000000000000000 e+00, +0.000000000000000 e+00, +0.000000000000000 e+00, +0.000000000000000 e+00, +0.000000000000000 e+00, +0.000000000000000 e+00, +0.000000000000000 e+00, +0.000000000000000 e+00, +0.000000000000000 e+00, +0.000000000000000 e+00, +0.000000000000000 e+00, +0.000000000000000 e+00, +0.000000000000000 e+00, +0.000000000000000 e+00, +0.000000000000000 e+00, +0.000000000000000 e+00, +0.000000000000000 e+00, +0.000000000000000 e+00, +0.000000000000000 e+00, +0.000000000000000 e+00, +0.000000000000000 e+00, +0.000000000000000 e+00, +0.000000000000000 e+00, +0.000000000000000 e+00, +0.000000000000000 e+00, +0.000000000000000 e+00, +0.000000000000000 e+00, +0.000000000000000 e+00, +0.000000000000000 e+00, +0.000000000000000 e+00, +0.000000000000000 e+00, +0.000000000000000 e+00, +0.000000000000000 e+00, +0.000000000000000 e+00, +0.000000000000000 e+00, +0.000000000000000 e+00, +0.000000000000000 e+00, +0.000000000000000 e+00, +0.000000000000000 e+00, +0.000000000000000 e+00, +0.000000000000000 e+00, +0.000000000000000 e+00, +0.000000000000000 e+00, +0.000000000000000 e+00, +0.000000000000000 e+00, +0.000000000000000 e+00, +0.000000000000000 e+00, +0.000000000000000 e+00, +0.000000000000000 e+00, +0.000000000000000 e+00, +0.000000000000000 e+00, +0.000000000000000 e+00, +0.000000000000000 e+00, +0.000000000000000 e+00, +0.000000000000000 e+00, +0.000000000000000 e+00, +0.000000000000000 e+00, +0.000000000000000 e+00, +0.000000000000000 e+00, +0.000000000000000 e+00, +0.000000000000000 e+00, +0.000000000000000 e+00, +0.000000000000000 e+00, +0.000000000000000 e+00, +0.000000000000000 e+00, +0.000000000000000 e+00.

25. The apparatus of claim 1, wherein the analysis windowing function comprises at least a succession, in forward or backward order, formed by the following values or at least a sub-succession with 10 values of the following values if different from 0, with ±1% of tolerance:

+3.235700349233950 e−04, +3.821992968116373 e−04, +4.346763076430269 e−04, +4.841399974556557 e−04, +5.337292962876158 e−04, +5.864735900759105 e−04, +6.428827504324996 e−04, +7.010318350640768 e−04, +7.608344672311270 e−04, +8.240821499679188 e−04, +8.910357994632938 e−04, +9.604008359868557 e−04, +1.032187650884365 e−03, +1.107726421735994 e−03, +1.187132578842487 e−03, +1.269300730654068 e−03, +1.354305556720234 e−03, +1.443403284874795 e−03, +1.536663296357133 e−03, +1.632968062524617 e−03, +1.732380147404573 e−03, +1.836145247521724 e−03, +1.944392065549996 e−03, +2.056125836181849 e−03, +2.171386021601719 e−03, +2.291251920978034 e−03, +2.415808383814314 e−03, +2.544144440874477 e−03, +2.676357471188558 e−03, +2.813551797283812 e−03, +2.955803613263345 e−03, +3.102160324883627 e−03, +3.252661103181324 e−03, +3.408341073385241 e−03, +3.569302917352426 e−03, +3.734713566068289 e−03, +3.904659832213214 e−03, +4.080147004222224 e−03, +4.261212283030981 e−03, +4.446929867132814 e−03, +4.637409387087253 e−03, +4.833793064672789 e−03, +5.036194779738963 e−03, +5.243697651112321 e−03, +5.456361749675164 e−03, +5.675227929566806 e−03, +5.900394401532485 e−03, +6.131014766883671 e−03, +6.367178191275927 e−03, +6.609908124535202 e−03, +6.859253963058476 e−03, +7.114293307371561 e−03, +7.375089966000295 e−03, +7.642693523739984 e−03, +7.917171839712018 e−03, +8.197610411215884 e−03, +8.484065880416487 e−03, +8.777567475206218 e−03, +9.078195201482999 e−03, +9.385078909241503 e−03, +9.698299554301988 e−03, +1.001888876231112 e−02, +1.034691797503113 e−02, +1.068149963936024 e−02, +1.102272421949215 e−02, +1.137165918496004 e−02, +1.172838973544289 e−02, +1.209201783148431 e−02, +1.246260014549782 e−02, +1.284114967210881 e−02, +1.322773320467288 e−02, +1.362147156562462 e−02, +1.402244719763268 e−02, +1.443170227861997 e−02, +1.484928966105225 e−02, +1.527427503031274 e−02, +1.570673344965518 e−02, +1.614774906895406 e−02, +1.659741217225623 e−02, +1.705481769961258 e−02, +1.752003567982498 e−02, +1.799411192217523 e−02, +1.847711280171765 e−02, +1.896812570518296 e−02, +1.946722405557199 e−02, +1.997546609433320 e−02, +2.049290306467406 e−02, +2.101858037652682 e−02, +2.155255505248360 e−02, +2.209589582354997 e−02, +2.264866778978731 e−02, +2.320993080187466 e−02, +2.377971919482778 e−02, +2.435904568934701 e−02, +2.494800748775296 e−02, +2.554578281793083 e−02, +2.615244880416785 e−02, +2.676898100961685 e−02, +2.739542549965559 e−02, +2.803090209537370 e−02, +2.867550388692567 e−02, +2.933029464839461 e−02, +2.999535245144327 e−02, +3.066976865911597 e−02, +3.135358217583060 e−02, +3.204778132642869 e−02, +3.275241094528637 e−02, +3.346657321987338 e−02, +3.419033915994245 e−02, +3.492474656851959 e−02, +3.566984393450434 e−02, +3.642469098112518 e−02, +3.718932683936013 e−02, +3.796477227376223 e−02, +3.875111047720054 e−02, +3.954748420753697 e−02, +4.035395199977597 e−02, +4.117148855800665 e−02, +4.200013716597904 e−02, +4.283901138210502 e−02, +4.368817991890082 e−02, +4.454866443036003 e−02, +4.542050595471842 e−02, +4.630276577789394 e−02, +4.719547798640356 e−02, +4.809965043366945 e−02, +4.901533344583754 e−02, +4.994161943600844 e−02, +5.087856571149934 e−02, +5.182719384692941 e−02, +5.278755308483513 e−02, +5.375872122678868 e−02, +5.474076083738614 e−02, +5.573471840677637 e−02, +5.674064972230924 e−02, +5.775761981233486 e−02, +5.878567633813699 e−02, +5.982584998609648 e−02, +6.087818970335195 e−02, +6.194176167634657 e−02, +6.301659162319866 e−02, +6.410366584958441 e−02, +6.520301218579141 e−02, +6.631369927165530 e−02, +6.743573988811077 e−02, +6.857009288032996 e−02, +6.971680213521406 e−02, +7.087499583595998 e−02, +7.204473108503576 e−02, +7.322699135891000 e−02, +7.442178588912410 e−02, +7.562815385274406 e−02, +7.684615718122945 e−02, +7.807687861830234 e−02, +7.932038618419741 e−02, +8.057572953286415 e−02, +8.184289534616669 e−02, +8.312281225703541 e−02, +8.441550376460240 e−02, +8.572008755967025 e−02, +8.703660776989294 e−02, +8.836603137189772 e−02, +8.970833701278809 e−02, +9.106251913073614 e−02, +9.242858978650852 e−02, +9.380757856153675 e−02, +9.519952848393795 e−02, +9.660349396690321 e−02, +9.801949952722568 e−02, +9.944854075501454 e−02, +1.008906469288751 e−01, +1.023448810132759 e−01, +1.038112769854394 e−01, +1.052908387348570 e−01, +1.067835785257166 e−01, +1.082885168352610 e−01, +1.098056403352340 e−01, +1.113359035023070 e−01, +1.128793060660070 e−01, +1.144348917022365 e−01, +1.160026418427939 e−01, +1.175834766182813 e−01, +1.191773817925584 e−01, +1.207834098631640 e−01, +1.224015773361210 e−01, +1.240328627276697 e−01, +1.256772653276007 e−01, +1.273338065186211 e−01, +1.290025000390856 e−01, +1.306843522870102 e−01, +1.323793987456491 e−01, +1.340867011604515 e−01, +1.358062490065425 e−01, +1.375389612590117 e−01, +1.392848238717889 e−01, +1.410428901194039 e−01, +1.428131506368226 e−01, +1.445965317426731 e−01, +1.463929885103623 e−01, +1.482015069292479 e−01, +1.500220583792976 e−01, +1.518555991923989 e−01, +1.537021065265166 e−01, +1.555605782414143 e−01, +1.574309942903742 e−01, +1.593143180431248 e−01, +1.612105639985474 e−01, +1.631187954209520 e−01, +1.650390046254505 e−01, +1.669721131327860 e−01, +1.689180947901775 e−01, +1.708759773387028 e−01, +1.728457537748600 e−01, +1.748283801430888 e−01, +1.768238156096776 e−01, +1.788310228663131 e−01, +1.808499369342717 e−01, +1.828814674176937 e−01, +1.849255792714432 e−01, +1.869812912624581 e−01, +1.890485613515956 e−01, +1.911282864915418 e−01, +1.932204127989935 e−01, +1.953239376543276 e−01,

+1.974388457221676 e−01, +1.995661075971730 e−01, +2.017057139908492 e−01, +2.038566744769371 e−01, +2.060189557031752 e−01, +2.081934824879514 e−01, +2.103802237348733 e−01, +2.125781921411190 e−01, +2.147873518665726 e−01, +2.170086169288035 e−01, +2.192419082234839 e−01, +2.214861559453727 e−01, +2.237412958295601 e−01, +2.260082674736221 e−01, +2.282869811837961 e−01, +2.305763207809758 e−01, +2.328762384864272 e−01, +2.351877543503455 e−01, +2.375108487943784 e−01, +2.398444593573832 e−01, +2.421885165595468 e−01, +2.445439470704063 e−01, +2.469107075411724 e−01, +2.492877833071390 e−01, +2.516751260083683 e−01, +2.540736535206898 e−01, +2.564833108170047 e−01, +2.589030699085996 e−01, +2.613328676927456 e−01, +2.637736050921935 e−01, +2.662251902764728 e−01, +2.686865397612919 e−01, +2.711575593740559 e−01, +2.736391458519503 e−01, +2.761312410342679 e−01, +2.786328295517739 e−01, +2.811438338004066 e−01, +2.836651148767941 e−01, +2.861965981859126 e−01, +2.887372740841138 e−01, +2.912870864180725 e−01, +2.938469307293017 e−01, +2.964167262145285 e−01, +2.989954170150198 e−01, +3.015829286213736 e−01, +3.041801674023100 e−01, +3.067870538332799 e−01, +3.094025219039914 e−01, +3.120264728553777 e−01, +3.146597759277349 e−01, +3.173023310827802 e−01, +3.199530692693200 e−01, +3.226118955458964 e−01, +3.252796888787393 e−01, +3.279563545740858 e−01, +3.306408240998973 e−01, +3.333329987313211 e−01, +3.360337508241129 e−01, +3.387430081844867 e−01, +3.414597523183469 e−01, +3.441838955445625 e−01, +3.469162810132548 e−01, +3.496568059948401 e−01, +3.524044231246164 e−01, +3.551590444946287 e−01, +3.579215403419018 e−01, +3.606918060977176 e−01, +3.634687629020059 e−01, +3.662523018706806 e−01, +3.690432842592497 e−01, +3.718416007949022 e−01, +3.746461722601965 e−01, +3.774569030021080 e−01, +3.802746797947738 e−01, +3.830993933108193 e−01, +3.859299384223780 e−01, +3.887661993522015 e−01, +3.916090507233831 e−01, +3.944583955021906 e−01, +3.973131637447736 e−01, +4.001732470818926 e−01, +4.030394989766596 e−01, +4.059118059100888 e−01, +4.087890872349265 e−01, +4.116712207743528 e−01, +4.145590432995318 e−01, +4.174524354370054 e−01, +4.203503225145663 e−01, +4.232526082630496 e−01, +4.261601728427663 e−01, +4.290728957232506 e−01, +4.319896569618181 e−01, +4.349103424521226 e−01, +4.378358447638693 e−01, +4.407660763679560 e−01, +4.436999665749521 e−01, +4.466373809565015 e−01, +4.495791232066263 e−01, +4.525250566690236 e−01, +4.554741060746665 e−01, +4.584261742417322 e−01, +4.613821390145840 e−01, +4.643418692214444 e−01, +4.673042252463159 e−01, +4.702690556535691 e−01, +4.732372004975696 e−01, +4.762085675098781 e−01, +4.791821288489955 e−01, +4.821577734075715 e−01, +4.851363063006593 e−01, +4.881175853001019 e−01, +4.911005242880451 e−01, +4.940850327998220 e−01, +4.970720120437943 e−01, +5.000613277949747 e−01, +5.030518116390311 e−01, +5.060433154467696 e−01, +5.090367134250039 e−01, +5.120318927612107 e−01, +5.150277508616620 e−01, +5.180241439456884 e−01, +5.210218879576217 e−01, +5.240208300352607 e−01, +5.270198510229556 e−01, +5.300188492910082 e−01, +5.330187387865785 e−01, +5.360194223342527 e−01, +5.390197891039044 e−01, +5.420196856030712 e−01, +5.450199204515231 e−01, +5.480203984293612 e−01, +5.510201184135838 e−01, +5.540189939344148 e−01, +5.570178491640744 e−01, +5.600165101133929 e−01, +5.630138095716375 e−01, +5.660096045860781 e−01, +5.690047761849362 e−01, +5.719992058026786 e−01, +5.749917722935854 e−01, +5.779823098049300 e−01, +5.809716105476772 e−01, +5.839595278786620 e−01, +5.869449780892492 e−01, +5.899278766736546 e−01, +5.929091339529038 e−01, +5.958886225335936 e−01, +5.988651785480291 e−01, +6.018386614784691 e−01, +6.048099568741729 e−01, +6.077789763021885 e−01, +6.107446538724647 e−01, +6.137068698395559 e−01, +6.166664505621099 e−01, +6.196232440099102 e−01, +6.225761217125432 e−01, +6.255249461230102 e−01, +6.284705701386001 e−01, +6.314128591964590 e−01, +6.343506915084997 e−01, +6.372839411338272 e−01, +6.402134772829997 e−01, +6.431391659393545 e−01, +6.460598714450869 e−01, +6.489754897736506 e−01, +6.518869471124649 e−01, +6.547941354100638 e−01, +6.576959114103553 e−01, +6.605921398591732 e−01, +6.634836963621389 e−01, +6.663704870510495 e−01, +6.692514453435826 e−01, +6.721264409903913 e−01, +6.749962795110787 e−01, +6.778607807385375 e−01, +6.807187840914061 e−01, +6.835701860237697 e−01, +6.864159372105746 e−01, +6.892559431770480 e−01, +6.920890588499607 e−01, +6.949150680560000 e−01, +6.977346951975620 e−01, +7.005478826218464 e−01, +7.033537849891354 e−01, +7.061523680058837 e−01, +7.089444008783498 e−01, +7.117296915594161 e−01, +7.145070977546192 e−01, +7.172765338080037 e−01, +7.200389672139186 e−01, +7.227943349906750 e−01, +7.255415386736762 e−01, +7.282804177906205 e−01, +7.310117549409422 e−01, +7.337354140683028 e−01, +7.364503418025881 e−01, +7.391564587113454 e−01, +7.418546544582220 e−01, +7.445447900371659 e−01, +7.472257006958800 e−01, +7.498972580176051 e−01, +7.525603713200814 e−01, +7.552149563509314 e−01, +7.578599326607545 e−01, +7.604951971158384 e−01, +7.631216241889446 e−01, +7.657390988438872 e−01, +7.683465174378752 e−01, +7.709437746884765 e−01, +7.735317637507610 e−01, +7.761103909474643 e−01, +7.786785753465276 e−01, +7.812362247368221 e−01, +7.837842352787271 e−01, +7.863225078411482 e−01, +7.888499478365373 e−01, +7.913664452543058 e−01, +7.938728763542381 e−01, +7.963691608881653 e−01, +7.988542608155023 e−01, +8.013280948233752 e−01, +8.037915368847273 e−01, +8.062444700164981 e−01, +8.086857893766403 e−01, +8.111154166403033 e−01, +8.135342978258457 e−01, +8.159423410909078 e−01, +8.183384161720055 e−01, +8.207224042595236 e−01, +8.230952011363564 e−01, +8.254567363530231 e−01, +8.278059715784122 e−01, +8.301428451410482 e−01, +8.324682688387346 e−01, +8.347821132094333 e−01, +8.370832131533167 e−01, +8.393715063470556 e−01, +8.416480314488108 e−01, +8.439127501937738 e−01, +8.461645428100565 e−01, +8.484032850727410 e−01, +8.506298550754564 e−01, +8.528442051510350 e−01, +8.550453592633493 e−01, +8.572332837070840 e−01, +8.594088830061699 e−01, +8.615720389795806 e−01, +8.637216156780773 e−01, +8.658575289268042 e−01, +8.679807503377460 e−01, +8.700913260411943 e−01, +8.721883611259660 e−01, +8.742716585927360 e−01, +8.763417616681772 e−01, +8.783992457627015 e−01, +8.804446862867205 e−01, +8.824720518946858 e−01, +8.844895714000796 e−01, +8.864924067856547 e−01, +8.884810495155143 e−01, +8.904559910537616 e−01, +8.924176927432972 e−01, +8.943659231393618 e−01, +8.962997945931150 e−01, +8.982192307568165 e−01, +9.001249598283012 e−01, +9.020168984242400 e−01, +9.038941561917321 e−01, +9.057567533900666 e−01, +9.076056139480890 e−01, +9.094406951444953 e−01, +9.112609887718295 e−01, +9.130664170641334 e−01, +9.148578383916375 e−01, +9.166352766163086 e−01, +9.183979162084582 e−01, +9.201457654565685 e−01, +9.218796522413809 e−01, +9.235994678560167 e−01, +9.253041759179184 e−01, +9.269937646114531 e−01, +9.286692422352107 e−01, +9.303305869999694 e−01, +9.319767447096182 e−01, +9.336076279434850 e−01, +9.352241212055423 e−01, +9.368261950246144 e−01, +9.384129048732400 e−01, +9.399842532824511 e−01, +9.415411877758678 e−01, +9.430836933050435 e−01, +9.446107932775473 e−01, +9.461224797394725 e−01, +9.476197145049868 e−01, +9.491025238239363 e−01, +9.505699947545118 e−01, +9.520221006942875 e−01, +9.534597036603291 e−01, +9.548827789205158 e−01, +9.562904165806793 e−01, +9.576826318703395 e−01, +9.590603607072891 e−01, +9.604235518327253 e−01, +9.617711703240024 e−01, +9.631031827400425 e−01, +9.644205605875820 e−01, +9.657233714331878 e−01, +9.670107721424878 e−01, +9.682827690312492 e−01, +9.695402205004198 e−01, +9.707831348559515 e−01, +9.720106722663890 e−01, +9.732228900099870 e−01, +9.744207385215033 e−01, +9.756042291745447 e−01, +9.767724349112544 e−01, +9.779253363131216 e−01, +9.790638238608151 e−01, +9.801879015797271 e−01, +9.812966868607661 e−01, +9.823902028722666 e−01, +9.834693768739560 e−01, +9.845342107123233 e−01, +9.855837812929384 e−01, +9.866180804760872 e−01, +9.876380187637696 e−01, +9.886436665180195 e−01, +9.896342515143703 e−01, +9.906098638997559 e−01, +9.915714515450228 e−01, +9.925190128422767 e−01, +9.934516032286224 e−01, +9.943692859110803 e−01, +9.952731289730088 e−01, +9.961631909904601 e−01, +9.970385179500313 e−01, +9.978990898252071 e−01, +9.987458272559335 e−01, +9.995787919228785 e−01, +1.000397182360297 e+00, +1.001201041464802 e+00, +1.001991256344717 e+00, +1.002767847497049 e+00, +1.003529972103569 e+00, +1.004277707367492 e+00, +1.005012047094235 e+00, +1.005733043131263 e+00, +1.006439806897506 e+00, +1.007132401590545 e+00, +1.007811842988376 e+00, +1.008478224880801 e+00, +1.009130715556477 e+00, +1.009769355086547 e+00, +1.010395057449511 e+00, +1.011007859994881 e+00, +1.011606924689628 e+00, +1.012192316076366 e+00, +1.012765000430642 e+00, +1.013325049263210 e+00, +1.013871638199171 e+00, +1.014404818816957 e+00, +1.014925520781073 e+00, +1.015433826923486 e+00, +1.015928972967257 e+00, +1.016411066364942 e+00, +1.016881083871244 e+00, +1.017339099302786 e+00, +1.017784285061100 e+00, +1.018216717878600 e+00, +1.018637379379835 e+00, +1.019046362683200 e+00, +1.019442870837515 e+00, +1.019826975825003 e+00, +1.020199618679535 e+00, +1.020560853084751 e+00, +1.020909847360410 e+00, +1.021246684563866 e+00, +1.021572361827679 e+00, +1.021886975685526 e+00, +1.022189721024281 e+00, +1.022480682703848 e+00, +1.022760836860466 e+00, +1.023030287959746 e+00, +1.023288268237906 e+00, +1.023534888355832 e+00, +1.023771136381063 e+00, +1.023997104737320 e+00, +1.024211990514308 e+00, +1.024415875333744 e+00, +1.024609726504572 e+00, +1.024793642571832 e+00, +1.024966852210664 e+00, +1.025129444345768 e+00, +1.025282368545871 e+00, +1.025425713582690 e+00, +1.025558707847599 e+00, +1.025681449959415 e+00, +1.025794908567991 e+00, +1.025899187425550 e+00, +1.025993525806572 e+00, +1.026078042674063 e+00, +1.026153736073730 e+00,

+1.026220725639502 e+00, +1.026278251222302 e+00, +1.026326400217514 e+00, +1.026366109298213 e+00, +1.026397475218959 e+00, +1.026419755159132 e+00, +1.026433063472609 e+00, +1.026438369530571 e+00, +1.026435753513555 e+00, +1.026424407896423 e+00, +1.026404414325658 e+00, +1.026376745497183 e+00, +1.026341529591056 e+00, +1.026298047712657 e+00, +1.026246413164014 e+00, +1.026187571341079 e+00, +1.026121618202469 e+00, +1.026047802601159 e+00, +1.025966259113017 e+00, +1.025878005857533 e+00, +1.025783163725466 e+00, +1.025680955378961 e+00, +1.025571464026533 e+00, +1.025455636062312 e+00, +1.025333580354341 e+00, +1.025204567428491 e+00, +1.025068712226252 e+00, +1.024926972279997 e+00, +1.024779424810995 e+00, +1.024625269765159 e+00, +1.024464619501421 e+00, +1.024298498053110 e+00, +1.024127035189888 e+00, +1.023949464567318 e+00, +1.023765888955297 e+00, +1.023577282345944 e+00, +1.023383771098535 e+00, +1.023184632809730 e+00, +1.022979990313458 e+00, +1.022770810566653 e+00, +1.022557186135377 e+00, +1.022338337695996 e+00, +1.022114387574851 e+00, +1.021886357834243 e+00, +1.021654354624439 e+00, +1.021417567672874 e+00, +1.021176074694516 e+00, +1.020930844259280 e+00, +1.020681994464816 e+00, +1.020428792450358 e+00, +1.020171385028845 e+00, +1.019910795563718 e+00, +1.019647124626418 e+00, +1.019379551852598 e+00, +1.019108176121263 e+00, +1.018834017611273 e+00, +1.018557222865231 e+00, +1.018277062013127 e+00, +1.017993662628480 e+00, +1.017708008483692 e+00, +1.017420178311649 e+00, +1.017129349129694 e+00, +1.016835630605444 e+00, +1.016540064652456 e+00, +1.016242782169058 e+00, +1.015943000562828 e+00, +1.015640812550351 e+00, +1.015337187460531 e+00, +1.015032211107897 e+00, +1.014725089526348 e+00, +1.014415991238242 e+00, +1.014106040189062 e+00, +1.013795318041038 e+00, +1.013482869234993 e+00, +1.013168810057302 e+00, +1.012854327596526 e+00, +1.012539547722209 e+00, +1.012223533569952 e+00, +1.011906384233988 e+00, +1.011589234882839 e+00, +1.011272160610958 e+00, +1.010954179972212 e+00, +1.010635428864728 e+00, +1.010317161995333 e+00, +1.009999611212465 e+00, +1.009681947024951 e+00, +1.009363573682324 e+00, +1.009044325068028 e+00, +1.008727479269698 e+00, +1.008418957730006 e+00, +1.008106691995008 e+00, +1.007763945845098 e+00, +1.007443035427814 e+00, +1.007268321305087 e+00, +1.007188313360058 e+00, +1.006980582693088 e+00, +1.006607718427208 e+00, +1.006220813354843 e+00, +1.005880191360173 e+00, +1.005548147634276 e+00, +1.005208505985926 e+00, +1.004870660907557 e+00, +1.004538945715620 e+00, +1.004211548979837 e+00, +1.003887307826199 e+00, +1.003565998252022 e+00, +1.003247928753973 e+00, +1.002933862630671 e+00, +1.002623715011975 e+00, +1.002316573551338 e+00, +1.002012456628431 e+00, +1.001712307918128 e+00, +1.001416118705407 e+00, +1.001122929266782 e+00, +1.000832736946922 e+00, +1.000546495806722 e+00, +1.000264200804259 e+00, +9.999848879324513 e-01, +9.997085530666436 e-01, +9.994361518334981 e-01, +9.991676778789439 e-01, +9.989021630276661 e-01, +9.986396025239043 e-01, +9.983809548686250 e-01, +9.981262129964925 e-01, +9.978744044020248 e-01, +9.976255227380388 e-01, +9.973805277659410 e-01, +9.971394126637049 e-01, +9.969012039797195 e-01, +9.966658933095314 e-01, +9.964344374346332 e-01, +9.962068296990753 e-01, +9.959820998119757 e-01, +9.957602381261346 e-01, +9.955421958422669 e-01, +9.953279652235180 e-01, +9.951165794460692 e-01, +9.949080290979398 e-01, +9.947032622296315 e-01, +9.945022689695088 e-01, +9.943040815876473 e-01, +9.941086912851109 e-01, +9.939170480434331 e-01, +9.937291405239381 e-01, +9.935439962464298 e-01, +9.933616056210112 e-01, +9.931829218182915 e-01, +9.930079338821240 e-01, +9.928356667510468 e-01, +9.926661086172732 e-01, +9.925002110373203 e-01, +9.923379640068731 e-01, +9.921783957486814 e-01, +9.920214929714285 e-01, +9.918682011153984 e-01, +9.917185094982703 e-01, +9.915714511212392 e-01, +9.914270132578689 e-01, +9.912861375369392 e-01, +9.911488111762619 e-01, +9.910140670228395 e-01, +9.908818932025615 e-01, +9.907532330064230 e-01, +9.906280727376265 e-01, +9.905054418160028 e-01, +9.903853272281469 e-01, +9.902686735168059 e-01, +9.901554680972392 e-01, +9.900447411363362 e-01, +9.899364775767996 e-01, +9.898316173651273 e-01, +9.897301484429727 e-01, +9.896311064950427 e-01, +9.895344764114521 e-01, +9.894411924684042 e-01, +9.893512408407925 e-01, +9.892636595590807 e-01, +9.891784350480575 e-01, +9.890965020344753 e-01, +9.890178449763316 e-01, +9.889414982259392 e-01, +9.888674481881904 e-01, +9.887966331854001 e-01, +9.887290383256132 e-01, +9.886636955343167 e-01, +9.886005893838439 e-01, +9.885406571815547 e-01, +9.884838850803949 e-01, +9.884293079255704 e-01, +9.883769097708243 e-01, +9.883276240055705 e-01, +9.882814356355465 e-01, +9.882373812607220 e-01, +9.881954463086439 e-01, +9.881565649335834 e-01, +9.881207205644380 e-01, +9.880869460773882 e-01, +9.880552270464479 e-01, +9.880265015932943 e-01, +9.880007538329854 e-01, +9.879770139187286 e-01, +9.879552655810734 e-01, +9.879364462155417 e-01, +9.879205412712961 e-01, +9.879065840760606 e-01, +9.878945575956836 e-01, +9.878853946070033 e-01, +9.878790797412935 e-01, +9.878746493979034 e-01, +9.878720878008731 e-01, +9.878723269672057 e-01, +9.878753499522159 e-01, +9.878801909638151 e-01, +9.878868346314371 e-01, +9.878962158879177 e-01, +9.879083181018892 e-01, +9.879221731254697 e-01, +9.879377642109470 e-01, +9.879560260604132 e-01, +9.879769430009732 e-01, +9.879995488718708 e-01, +9.880238263660437 e-01, +9.880507071322525 e-01, +9.880801746803725 e-01, +9.881112643600719 e-01, +9.881439599864610 e-01, +9.881791937541983 e-01, +9.882169477221827 e-01, +9.882562539746005 e-01, +9.882970966792446 e-01, +9.883404119215459 e-01, +9.883861819949297 e-01, +9.884334355024147 e-01, +9.884821553014376 e-01, +9.885332784979397 e-01, +9.885867883714737 e-01, +9.886417143055318 e-01, +9.886980383296721 e-01, +9.887566952073135 e-01, +9.888176678250945 e-01, +9.888799871475064 e-01, +9.889436358294569 e-01, +9.890095481884937 e-01, +9.890777059811048 e-01, +9.891471384894399 e-01, +9.892178286528791 e-01, +9.892907129712469 e-01, +9.893657732439902 e-01, +9.894420366217603 e-01, +9.895194850020712 e-01, +9.895990550550585 e-01, +9.896807293945533 e-01, +9.897635364818964 e-01, +9.898474573387898 e-01, +9.899334256730253 e-01, +9.900214239316713 e-01, +9.901104832002432 e-01, +9.902005849312988 e-01, +9.902926609798792 e-01, +9.903866926546286 e-01, +9.904817107571495 e-01, +9.905776973966729 e-01, +9.906755858999687 e-01, +9.907753570146928 e-01, +9.908760390079692 e-01, +9.909776136318341 e-01, +9.910810160568396 e-01, +9.911862274458985 e-01, +9.912922749689899 e-01, +9.913991395528559 e-01, +9.915077559112314 e-01, +9.916181054602099 e-01, +9.917292162715997 e-01, +9.918410691314309 e-01, +9.919545975686356 e-01, +9.920697824274926 e-01, +9.921856518839308 e-01, +9.923021872317422 e-01, +9.924203228138201 e-01, +9.925400387231874 e-01, +9.926603609120486 e-01, +9.927812708898945 e-01, +9.929037056012008 e-01, +9.930276450366935 e-01, +9.931521123405382 e-01, +9.932770885572193 e-01, +9.934035125599263 e-01, +9.935313647282036 e-01, +9.936596669792295 e-01, +9.937883997783191 e-01, +9.939185021388579 e-01, +9.940499546103031 e-01, +9.941817792665538 e-01, +9.943139564620480 e-01, +9.944474248344178 e-01, +9.945821646067609 e-01, +9.947171976098198 e-01, +9.948525044676624 e-01, +9.949890245456261 e-01, +9.951267376194471 e-01, +9.952646639522682 e−01, +9.954027843196593 e−01, +9.955420399208714 e−01, +9.956824104013806 e−01, +9.958229139376651 e−01, +9.959635310797721 e−01, +9.961052046849509 e−01, +9.962479146150113 e−01, +9.963906777760744 e−01, +9.965334742957022 e−01, +9.966772475112751 e−01, +9.968219775371954 e−01, +9.969666812541205 e−01, +9.971113385049125 e−01, +9.972568921184832 e−01, +9.974033222384361 e−01, +9.975496462958124 e−01, +9.976958440808505 e−01, +9.978428577721199 e−01, +9.979906675056988 e−01, +9.981382913210521 e−01, +9.982857084011294 e−01, +9.984338592613343 e−01, +9.985827266667445 e−01, +9.987313348873088 e−01, +9.988796523949821 e−01, +9.990285947364306 e−01, +9.991781850354060 e−01, +9.993275431378141 e−01, +9.994764863008044 e−01, +9.996255698609559 e−01, +9.997753812452573 e−01, +9.999265078806980 e−01, +1.000073497520791 e+00, +1.000224669219663 e+00, +1.000374570389487 e+00, +1.000523787909342 e+00, +1.000672909364706 e+00, +1.000822490899924 e+00, +1.000972349809292 e+00, +1.001121604191588 e+00, +1.001270276668384 e+00, +1.001419284847822 e+00, +1.001568597382930 e+00, +1.001717235441161 e+00, +1.001865181102795 e+00, +1.002013378040221 e+00, +1.002161805549920 e+00, +1.002309477314975 e+00, +1.002456372686098 e+00, +1.002603438051255 e+00, +1.002750653220044 e+00, +1.002897030034197 e+00, +1.003042547763044 e+00, +1.003188154489387 e+00, +1.003333829980590 e+00, +1.003478584306210 e+00, +1.003622396620552 e+00, +1.003766216551067 e+00, +1.003910024058434 e+00, +1.004052828034629 e+00, +1.004194607298016 e+00, +1.004336312014269 e+00, +1.004477922478776 e+00, +1.004618447680436 e+00, +1.004757866142788 e+00, +1.004897127367124 e+00, +1.005036211788027 e+00, +1.005174129339999 e+00, +1.005310858606722 e+00, +1.005447348229275 e+00, +1.005583578404365 e+00, +1.005718559516336 e+00, +1.005852270535212 e+00, +1.005985660340410 e+00, +1.006118708775473 e+00, +1.006250425365265 e+00, +1.006380789350186 e+00, +1.006510750945005 e+00, +1.006640290029854 e+00, +1.006768414896740 e+00, +1.006895104560895 e+00, +1.007021310029137 e+00, +1.007147011697879 e+00, +1.007271218063607 e+00, +1.007393907701933 e+00, +1.007516030573849 e+00, +1.007637567482182 e+00, +1.007757528772291 e+00, +1.007875893086371 e+00, +1.007993608628118 e+00, +1.008110655922241 e+00, +1.008226046614216 e+00, +1.008339760080372 e+00, +1.008452744553207 e+00, +1.008564979989454 e+00, +1.008675477014256 e+00, +1.008784215564761 e+00, +1.008892145905632 e+00, +1.008999248092397 e+00, +1.009104530964226 e+00,

+1.009207974189350 e+00, +1.009310529294049 e+00, +1.009412177137242 e+00, +1.009511926856510 e+00, +1.009609757696156 e+00, +1.009706620067364 e+00, +1.009802495163920 e+00, +1.009896393940608 e+00, +1.009988296223056 e+00, +1.010079151649770 e+00, +1.010168940724606 e+00, +1.010256673981368 e+00, +1.010342332426681 e+00, +1.010426868280804 e+00, +1.010510261597171 e+00, +1.010591519577714 e+00, +1.010670623429633 e+00, +1.010748529051234 e+00, +1.010825217388920 e+00, +1.010899693712359 e+00, +1.010971938438940 e+00, +1.011042907905867 e+00, +1.011112584131909 e+00, +1.011179974034890 e+00, +1.011245058042453 e+00, +1.011308790830468 e+00, +1.011371154144579 e+00, +1.011431156159085 e+00, +1.011488778523215 e+00, +1.011544976893053 e+00, +1.011599732403024 e+00, +1.011652051214875 e+00, +1.011701915457469 e+00, +1.011750283661017 e+00, +1.011797137846246 e+00, +1.011841483052088 e+00, +1.011883300488277 e+00, +1.011923548068040 e+00, +1.011962209203063 e+00, +1.011998292246508 e+00, +1.012031778271071 e+00, +1.012063621581602 e+00, +1.012093805289032 e+00, +1.012121340917460 e+00, +1.012146211141323 e+00, +1.012169370028522 e+00, +1.012190799612422 e+00, +1.012209509774826 e+00, +1.012225484155619 e+00, +1.012239680217839 e+00, +1.012252080651208 e+00, +1.012261693287047 e+00, +1.012268500924551 e+00, +1.012273461473019 e+00, +1.012276559127865 e+00, +1.012276804202582 e+00, +1.012274179329824 e+00, +1.012269639581679 e+00, +1.012263168844414 e+00, +1.012253779830287 e+00, +1.012241456954404 e+00, +1.012227156156870 e+00, +1.012210860152664 e+00, +1.012191578747083 e+00, +1.012169297374220 e+00, +1.012144976732521 e+00, +1.012118600449884 e+00, +1.012089175409008 e+00, +1.012056685871527 e+00, +1.012022093240567 e+00, +1.011985383173782 e+00, +1.011945565763788 e+00, +1.011902624776521 e+00, +1.011857517445845 e+00, +1.011810229432951 e+00, +1.011759775156899 e+00, +1.011706140218275 e+00, +1.011650280893217 e+00, +1.011592181601430 e+00, +1.011530855573595 e+00, +1.011466289818154 e+00, +1.011399444375047 e+00, +1.011330304370585 e+00, +1.011257880752579 e+00, +1.011182159707019 e+00, +1.011104101993156 e+00, +1.011023694799342 e+00, +1.010939952356944 e+00, +1.010852860445419 e+00, +1.010763375755366 e+00, +1.010671485695127 e+00, +1.010576209154936 e+00, +1.010477533938561 e+00, +1.010376415807060 e+00, +1.010272840810986 e+00, +1.010165826445586 e+00, +1.010055362601328 e+00, +1.009942410277932 e+00, +1.009826955798404 e+00, +1.009708012131765 e+00, +1.009585568925891 e+00, +1.009460591235290 e+00, +1.009333067695896 e+00, +1.009202011723081 e+00, +1.009067412134881 e+00, +1.008930231993351 e+00, +1.008790461334113 e+00, +1.008647118373303 e+00, +1.008500193172393 e+00, +1.008350646299744 e+00, +1.008198467170796 e+00, +1.008042675572153 e+00, +1.007883264022713 e+00, +1.007721196075366 e+00, +1.007556460824166 e+00, +1.007388074720253 e+00, +1.007216031301935 e+00, +1.007041299348476 e+00, +1.006863869718207 e+00, +1.006682757156533 e+00, +1.006497954572682 e+00, +1.006310431304003 e+00, +1.006120180721864 e+00, +1.005926221917719 e+00, +1.005728547752975 e+00, +1.005528123164754 e+00, +1.005324942594936 e+00, +1.005118031770913 e+00, +1.004907385380564 e+00, +1.004693965144879 e+00, +1.004477765157871 e+00, +1.004257813991292 e+00, +1.004034108834670 e+00, +1.003807613226332 e+00, +1.003578321293819 e+00, +1.003345260144698 e+00, +1.003108428405854 e+00, +1.002868793771428 e+00, +1.002626351889911 e+00, +1.002380128823734 e+00, +1.002130123378852 e+00, +1.001877304672605 e+00, +1.001621670689409 e+00, +1.001362250678481 e+00, +1.001099043542970 e+00, +1.000833015458249 e+00, +1.000564166270619 e+00, +1.000291531899435 e+00, +1.000015112295927 e+00, +9.997358689793686 e−01, +9.994538026878185 e−01, +9.991679559269192 e−01, +9.988783302889642 e−01, +9.985858838509232 e−01, +9.982906190683758 e−01, +9.979915852192069 e−01, +9.976887805584920 e−01, +9.973831508544119 e−01, +9.970747197397686 e−01, +9.967625861356061 e−01, +9.964466729061831 e−01, +9.961277448216609 e−01, +9.958061137774057 e−01, +9.954815632236269 e−01, +9.951529474418550 e−01, +9.948184819816882 e−01, +9.944824644674363 e−01, +9.941541831614942 e−01, +9.938176459160070 e−01, +9.934356569036324 e−01, +9.930678080460911 e−01, +9.928629897063861 e−01, +9.920151198036643 e−01, +9.914646039976289 e−01, +9.910580786225461 e−01, +9.906661670997940 e−01, +9.902352352689523 e−01, +9.897945722571376 e−01, +9.893565433952757 e−01, +9.889131869680553 e−01, +9.884611897966706 e−01, +9.880027035297985 e−01, +9.875383274623817 e−01, +9.870669099030384 e−01, +9.865881954382273 e−01, +9.861028679251979 e−01, +9.856108490726415 e−01, +9.851112908058255 e−01, +9.846041087188396 e−01, +9.840899793789135 e−01, +9.835687475691413 e−01, +9.830394337851477 e−01, +9.825019919189980 e−01, +9.819573015637479 e−01, +9.814052410296346 e−01, +9.808446911100914 e−01, +9.802755449178991 e−01, +9.796987091039431 e−01, +9.791141208337264 e−01, +9.785207439579823 e−01, +9.779184677896273 e−01, +9.773081082723492 e−01, +9.766895349125904 e−01, +9.760616740194450 e−01, +9.754244530504396 e−01, +9.747787966745514 e−01, +9.741245958128935 e−01, +9.734607083730100 e−01, +9.727870063627455 e−01, +9.721043782586516 e−01, +9.714127339971064 e−01, +9.707110047334955 e−01, +9.699991325531057 e−01, +9.692780666596675 e−01, +9.685476898124051 e−01, +9.678068213341131 e−01, +9.670553568518259 e−01, +9.662942694162036 e−01, +9.655234943873926 e−01, +9.647419268609606 e−01, +9.639494801526087 e−01, +9.631470850364502 e−01, +9.623346145023939 e−01, +9.615108868233452 e−01, +9.606758082762421 e−01, +9.598303722906686 e−01, +9.589744979972803 e−01, +9.581070287387355 e−01, +9.572278607616873 e−01, +9.563379453266456 e−01, +9.554372064329766 e−01, +9.545245399941635 e−01, +9.535998779685757 e−01, +9.526641870716750 e−01, +9.517173763138073 e−01, +9.507582991859514 e−01, +9.497868942084339 e−01, +9.488041830577462 e−01, +9.478100888078225 e−01, +9.468034353946915 e−01, +9.457841175975197 e−01, +9.447531037006662 e−01, +9.437103240778304 e−01, +9.426546695512183 e−01, +9.415860667090934 e−01, +9.405054771915659 e−01, +9.394128066604807 e−01, +9.383069072240268 e−01, +9.371877218082764 e−01, +9.360562830727714 e−01, +9.349125451819119 e−01, +9.337553821450042 e−01, +9.325847195259637 e−01, +9.314015363873052 e−01, +9.302057763482381 e−01, +9.289963473252155 e−01, +9.277732047659371 e−01, +9.265373496318979 e−01, +9.252887007804731 e−01, +9.240260966323954 e−01, +9.227494594741956 e−01, +9.214597964334704 e−01, +9.201570566323493 e−01, +9.188401295674291 e−01, +9.175089523148627 e−01, +9.161645099567182 e−01, +9.148067377557750 e−01, +9.134345222358713 e−01, +9.120478227747287 e−01, +9.106476709258303 e−01, +9.092340339068899 e−01, +9.078058138594686 e−01, +9.063629680720371 e−01, +9.049065091670875 e−01, +9.034363889945074 e−01, +9.019514987490371 e−01, +9.004517876609461 e−01, +8.989382633487150 e−01, +8.974108808873397 e−01, +8.958685426521079 e−01, +8.943112058133614 e−01, +8.927398817643528 e−01, +8.911545160393349 e−01, +8.895539896413210 e−01, +8.879382683346716 e−01, +8.863084022826353 e−01, +8.846643687806315 e−01, +8.830050715882986 e−01, +8.813304835012828 e−01, +8.796416466159852 e−01, +8.779385355821995 e−01, +8.762200577776852 e−01, +8.744861938961381 e−01, +8.727379973888942 e−01, +8.709754415944566 e−01, +8.691974194090119 e−01, +8.674038889082810 e−01, +8.655958747817611 e−01, +8.637733542642025 e−01, +8.619352566808824 e−01, +8.600815675121538 e−01, +8.582133280699462 e-01, +8.563305243162549 e-01, +8.544320869868485 e-01, +8.525180054943617 e-01, +8.505893287555129 e-01, +8.486460694867924 e-01, +8.466872027543964 e-01, +8.447127297770400 e-01, +8.427236779556280 e-01, +8.407200377231397 e-01, +8.387007637143141 e-01, +8.366658636487900 e-01, +8.346163977407922 e-01, +8.325523768291012 e-01, +8.304727614321823 e-01, +8.283775428310826 e-01, +8.262677444285360 e-01, +8.241433705663960 e-01, +8.220034073785601 e-01, +8.198478927378535 e-01, +8.176779138137669 e-01, +8.154934833957916 e-01, +8.132935411236417 e-01, +8.110781042287996 e-01, +8.088482692756163 e-01, +8.066040997239516 e-01, +8.043446229495154 e-01, +8.020698771287099 e-01, +7.997809105802602 e-01, +7.974777203962242 e-01, +7.951592558139738 e-01, +7.928255537687610 e-01, +7.904777397235739 e-01, +7.881159103734087 e-01, +7.857391245481645 e-01, +7.833473203720548 e-01, +7.809413293257642 e-01, +7.785212684545030 e-01, +7.760865347057494 e-01, +7.736372881515523 e-01, +7.711744403395434 e-01, +7.686979147929021 e-01, +7.662066652369949 e-01, +7.637008160854790 e-01, +7.611816536232692 e-01, +7.586492915456966 e-01, +7.561026668755407 e-01, +7.535417845985437 e-01, +7.509677253608117 e-01, +7.483805701761127 e-01, +7.457793976748408 e-01, +7.431642988739133 e-01, +7.405363749469933 e-01, +7.378956733994703 e-01, +7.352411918301537 e-01, +7.325730245135402 e-01, +7.298923618910717 e-01, +7.271993327965579 e-01, +7.244930008228270 e-01, +7.217734421626190 e-01, +7.190417491579090 e-01, +7.162980305440977 e-01, +7.135414111237446 e-01, +7.107720243445051 e-01, +7.079910089690906 e-01, +7.051984432364411 e-01, +7.023933467824965 e-01, +6.995757887359807 e-01, +6.967468908559541 e-01, +6.939067884621855 e-01, +6.910546259244099 e-01, +6.881904964956265 e-01, +6.853154435187701 e-01, +6.824295471401947 e-01, +6.795319276046549 e-01, +6.766227310314311 e-01, +6.737031265887281 e-01, +6.707732585543063 e-01, +6.678322438578169 e-01, +6.648801659515325 e-01, +6.619180818581655 e-01, +6.589461833521619 e-01, +6.559637902883004 e-01, +6.529710426495826 e-01, +6.499688969386536 e-01, +6.469573547411541 e-01, +6.439354791990427 e-01, +6.409035288603075 e-01, +6.378629377753962 e-01, +6.348137437689479 e-01, +6.317545972986219 e-01, +6.286855280775698 e-01, +6.256079561741540 e-01, +6.225221695832768 e-01, +6.194273058858271 e-01, +6.163234711851669 e-01, +6.132117491461520 e-01, +6.100922809170846 e-01, +6.069642650584504 e-01, +6.038278760531646 e-01, +6.006842631336996 e-01, +5.975336059686350 e-01, +5.943751066904921 e-01, +5.912087588215279 e-01, +5.880353659529035 e-01, +5.848551837605717 e-01, +5.816678990293079 e-01, +5.784735261655043 e-01, +5.752724325989095 e-01, +5.720650011081139 e-01, +5.688516144717076 e-01, +5.656282061898663 e-01, +5.624031153715552 e-01, +5.591715220043816 e-01, +5.559338788791430 e-01, +5.526906296747757 e-01, +5.494421930334449 e-01, +5.461886187066721 e-01, +5.429296335729603 e-01, +5.396656057073835 e-01, +5.363974990167699 e-01, +5.331253296256703 e-01, +5.298481989939661 e-01, +5.265662376610855 e-01, +5.232805923025862 e-01, +5.199914838946222 e-01, +5.166982164701727 e-01, +5.134010079652577 e-01, +5.101009713211846 e-01, +5.067981651483114 e-01, +5.034916218473716 e-01, +5.001816735886107 e-01, +4.968699258080247 e-01, +4.935565059779667 e-01, +4.902400722563398 e-01, +4.869206550924504 e-01, +4.835996679580279 e-01, +4.802774381791762 e-01, +4.769531954412434 e-01, +4.736270399539189 e-01, +4.702999408508168 e-01, +4.669720784607305 e-01, +4.636428606356920 e-01, +4.603125364998776 e-01, +4.569821724233974 e-01, +4.536519115376573 e-01, +4.503209953849403 e-01, +4.469896264032189 e-01, +4.436589520558524 e-01, +4.403291677455351 e-01, +4.369995283852560 e-01, +4.336702110092919 e-01, +4.303423032287362 e-01, +4.270159791313206 e-01, +4.236905139305585 e-01, +4.203661194857656 e-01, +4.170439288466521 e-01, +4.137241358370239 e-01, +4.104060097514602 e-01, +4.070897555089031 e-01, +4.037764981593507 e-01, +4.004664107465299 e-01, +3.971587296380776 e-01, +3.938536636599421 e-01, +3.905523798917074 e-01, +3.872550507871729 e-01, +3.839608678121244 e-01, +3.806700467713708 e-01, +3.773838145590149 e-01, +3.741023650337649 e-01, +3.708248707285573 e-01, +3.675515053070522 e-01, +3.642834353302138 e-01, +3.610208992409523 e-01, +3.577632145496031 e-01, +3.545105744959446 e-01, +3.512640341612003 e-01, +3.480236943438447 e-01, +3.447887254766508 e-01, +3.415594491122957 e-01, +3.383373171891836 e-01, +3.351225758795442 e-01, +3.319142610233081 e-01, +3.287122759768420 e-01, +3.255174149216469 e-01, +3.223300837378850 e-01, +3.191502945992604 e-01, +3.159783340225497 e-01, +3.128147301790672 e-01, +3.096594366002203 e-01, +3.065118829951374 e-01, +3.033724163096057 e-01, +3.002422624347096 e-01, +2.971215837581699 e-01, +2.940094940665994 e-01, +2.909060968951387 e-01, +2.878124834032541 e-01, +2.847288683996017 e-01, +2.816545966307170 e-01, +2.785898831431842 e-01, +2.755357983580602 e-01, +2.724924992373132 e−01, +2.694592444601876 e−01, +2.664361954971699 e−01, +2.634244029834191 e−01, +2.604240268886862 e−01, +2.574343504718905 e−01, +2.544555518459914 e−01, +2.514886909115458 e−01, +2.485339317782194 e−01, +2.455905549948218 e−01, +2.426587307354937 e−01, +2.397395063360460 e−01, +2.368330357314138 e−01, +2.339385917103926 e−01, +2.310563352467077 e−01, +2.281873038963940 e−01, +2.253316454409216 e−01, +2.224886282863191 e−01, +2.196584073367104 e−01, +2.168420127437019 e−01, +2.140395864128403 e−01, +2.112503945704412 e−01, +2.084745870335015 e−01, +2.057131843889434 e−01, +2.029663241873446 e−01, +2.002332724591127 e−01, +1.975141729701546 e−01, +1.948100372792062 e−01, +1.921209969418309 e−01, +1.894463139881238 e−01, +1.867861307455174 e−01, +1.841414579810843 e−01, +1.815124204803960 e−01, +1.788982688766118 e−01, +1.762991374092110 e−01, +1.737160334143236 e−01, +1.711490837149136 e−01, +1.685975427109672 e−01, +1.660615404766350 e−01, +1.635420747284597 e−01, +1.610392647455030 e−01, +1.585523606699242 e−01, +1.560814882692011 e−01, +1.536276387455411 e−01, +1.511909278215991 e−01, +1.487706056453130 e−01, +1.463667950599714 e−01, +1.439804830586271 e−01, +1.416117840041388 e−01, +1.392599476606263 e−01, +1.369250939274206 e−01, +1.346082041944543 e−01, +1.323093893293406 e−01, +1.300278987264480 e−01, +1.277638491717384 e−01, +1.255182155111709 e−01, +1.232911060463692 e−01, +1.210817706513393 e−01, +1.188903216873087 e−01, +1.167177275528689 e−01, +1.145640946398680 e−01, +1.124286726877977 e−01, +1.103115703218860 e−01, +1.082137493008784 e−01, +1.061353122093495 e−01, +1.040755094642518 e−01, +1.020344462904939 e−01, +1.000130754353283 e−01, +9.801149609996949 e−02, +9.602895962715033 e−02, +9.406556557413213 e−02, +9.212225718017839 e−02, +9.019912955294541 e−02, +8.829543394466111 e−02, +8.641126446867767 e−02, +8.454755261333674 e−02, +8.270438757849537 e−02, +8.088102201374671 e−02, +7.907754246044904 e−02, +7.729486433686708 e−02, +7.553307095292439 e−02, +7.379141728818767 e−02, +7.206998099643694 e−02, +7.036965903891536 e−02, +6.869052561376873 e−02, +6.703183558090599 e−02, +6.539365708843246 e−02, +6.377686761792192 e−02, +6.218153160076208 e−02, +6.060690353708294 e−02, +5.905303920289844 e−02, +5.752079270262547 e−02, +5.601021629546108 e−02, +5.452056276526779 e−02, +5.305187265543028 e−02, +5.160497192770200 e−02, +5.017990065949564 e−02, +4.877591488398978 e−02, +4.739303765878024 e−02, +4.603205697395506 e−02, +4.469299727922284 e−02, +4.337512126408456 e−02, +4.207843336193631 e−02, +4.080367800167834 e−02, +3.955086170148164 e−02, +3.831925359021936 e−02, +3.710883802024247 e−02, +3.592031377191350 e−02, +3.475367083924110 e−02, +3.360819061792393 e−02, +3.248382426594506 e−02, +3.138119240391853 e−02, +3.030027537135876 e−02, +2.924041340892334 e−02, +2.820153617857359 e−02, +2.718416076819826 e−02, +2.618823091914950 e−02, +2.521312012928253 e−02, +2.425872983336824 e−02, +2.332548569166988 e−02, +2.241332520509764 e−02, +2.152170070657781 e−02, +2.065047207339204 e−02, +1.979990274080047 e−02, +1.896992105664513 e−02, +1.816012507709582 e−02, +1.737032543754079 e−02, +1.660053693426305 e−02, +1.585068068878849 e−02, +1.512059554489944 e−02, +1.441002712765956 e−02, +1.371861264850595 e−02, +1.304629624757017 e−02, +1.239334766429038 e−02, +1.175941174949483 e−02, +1.114348079271000 e−02, +1.054549096241532 e−02, +9.966369456231951 e−03, +9.405876078723861 e−03, +8.862485552559351 e−03, +8.334801852513261 e−03, +7.821914540064593 e−03, +7.329085750247891 e−03, +6.866427280374203 e−03, +6.407912160580299 e−03, +5.896299968476348 e−03, +5.431884551945897 e−03, +5.251971150005845 e−03, +4.914753459788713 e−03, +3.326211257672788 e−03, +0.000000000000000 e+00, +0.000000000000000 e+00, +0.000000000000000 e+00, +0.000000000000000 e+00, +0.000000000000000 e+00, +0.000000000000000 e+00, +0.000000000000000 e+00, +0.000000000000000 e+00, +0.000000000000000 e+00, +0.000000000000000 e+00, +0.000000000000000 e+00, +0.000000000000000 e+00, +0.000000000000000 e+00, +0.000000000000000 e+00, +0.000000000000000 e+00, +0.000000000000000 e+00, +0.000000000000000 e+00, +0.000000000000000 e+00, +0.000000000000000 e+00, +0.000000000000000 e+00, +0.000000000000000 e+00, +0.000000000000000 e+00, +0.000000000000000 e+00, +0.000000000000000 e+00, +0.000000000000000 e+00, +0.000000000000000 e+00, +0.000000000000000 e+00, +0.000000000000000 e+00, +0.000000000000000 e+00, +0.000000000000000 e+00, +0.000000000000000 e+00, +0.000000000000000 e+00, +0.000000000000000 e+00, +0.000000000000000 e+00, +0.000000000000000 e+00, +0.000000000000000 e+00, +0.000000000000000 e+00, +0.000000000000000 e+00, +0.000000000000000 e+00, +0.000000000000000 e+00, +0.000000000000000 e+00, +0.000000000000000 e+00, +0.000000000000000 e+00, +0.000000000000000 e+00, +0.000000000000000 e+00, +0.000000000000000 e+00, +0.000000000000000 e+00, +0.000000000000000 e+00, +0.000000000000000 e+00, +0.000000000000000 e+00, +0.000000000000000 e+00, +0.000000000000000 e+00, +0.000000000000000 e+00, +0.000000000000000 e+00, +0.000000000000000 e+00, +0.000000000000000 e+00, +0.000000000000000 e+00, +0.000000000000000 e+00, +0.000000000000000 e+00, +0.000000000000000 e+00, +0.000000000000000 e+00, +0.000000000000000 e+00, +0.000000000000000 e+00, +0.000000000000000 e+00, +0.000000000000000 e+00, +0.000000000000000 e+00, +0.000000000000000 e+00, +0.000000000000000 e+00, +0.000000000000000 e+00, +0.000000000000000 e+00, +0.000000000000000 e+00, +0.000000000000000 e+00, +0.000000000000000 e+00, +0.000000000000000 e+00, +0.000000000000000 e+00, +0.000000000000000 e+00, +0.000000000000000 e+00, +0.000000000000000 e+00, +0.000000000000000 e+00, +0.000000000000000 e+00, +0.000000000000000 e+00, +0.000000000000000 e+00, +0.000000000000000 e+00, +0.000000000000000 e+00, +0.000000000000000 e+00, +0.000000000000000 e+00, +0.000000000000000 e+00, +0.000000000000000 e+00, +0.000000000000000 e+00, +0.000000000000000 e+00, +0.000000000000000 e+00, +0.000000000000000 e+00, +0.000000000000000 e+00, +0.000000000000000 e+00, +0.000000000000000 e+00, +0.000000000000000 e+00, +0.000000000000000 e+00, +0.000000000000000 e+00, +0.000000000000000 e+00, +0.000000000000000 e+00, +0.000000000000000 e+00, +0.000000000000000 e+00, +0.000000000000000 e+00, +0.000000000000000 e+00, +0.000000000000000 e+00, +0.000000000000000 e+00, +0.000000000000000 e+00, +0.000000000000000 e+00, +0.000000000000000 e+00, +0.000000000000000 e+00, +0.000000000000000 e+00, +0.000000000000000 e+00, +0.000000000000000 e+00, +0.000000000000000 e+00, +0.000000000000000 e+00, +0.000000000000000 e+00, +0.000000000000000 e+00, +0.000000000000000 e+00, +0.000000000000000 e+00, +0.000000000000000 e+00, +0.000000000000000 e+00, +0.000000000000000 e+00, +0.000000000000000 e+00, +0.000000000000000 e+00, +0.000000000000000 e+00, +0.000000000000000 e+00, +0.000000000000000 e+00, +0.000000000000000 e+00, +0.000000000000000 e+00, +0.000000000000000 e+00, +0.000000000000000 e+00, +0.000000000000000 e+00, +0.000000000000000 e+00, +0.000000000000000 e+00, +0.000000000000000 e+00, +0.000000000000000 e+00, +0.000000000000000 e+00, +0.000000000000000 e+00, +0.000000000000000 e+00, +0.000000000000000 e+00, +0.000000000000000 e+00, +0.000000000000000 e+00, +0.000000000000000 e+00, +0.000000000000000 e+00, +0.000000000000000 e+00, +0.000000000000000 e+00, +0.000000000000000 e+00, +0.000000000000000 e+00, +0.000000000000000 e+00, +0.000000000000000 e+00, +0.000000000000000 e+00, +0.000000000000000 e+00, +0.000000000000000 e+00, +0.000000000000000 e+00, +0.000000000000000 e+00, +0.000000000000000 e+00, +0.000000000000000 e+00, +0.000000000000000 e+00, +0.000000000000000 e+00, +0.000000000000000 e+00, +0.000000000000000 e+00, +0.000000000000000 e+00, +0.000000000000000 e+00, +0.000000000000000 e+00, +0.000000000000000 e+00, +0.000000000000000 e+00, +0.000000000000000 e+00, +0.000000000000000 e+00, +0.000000000000000 e+00, +0.000000000000000 e+00, +0.000000000000000 e+00, +0.000000000000000 e+00, +0.000000000000000 e+00, +0.000000000000000 e+00, +0.000000000000000 e+00, +0.000000000000000 e+00, +0.000000000000000 e+00, +0.000000000000000 e+00, +0.000000000000000 e+00, +0.000000000000000 e+00, +0.000000000000000 e+00, +0.000000000000000 e+00, +0.000000000000000 e+00, +0.000000000000000 e+00, +0.000000000000000 e+00, +0.000000000000000 e+00, +0.000000000000000 e+00, +0.000000000000000 e+00, +0.000000000000000 e+00, +0.000000000000000 e+00, +0.000000000000000 e+00, +0.000000000000000 e+00, +0.000000000000000 e+00, +0.000000000000000 e+00, +0.000000000000000 e+00, +0.000000000000000 e+00, +0.000000000000000 e+00, +0.000000000000000 e+00, +0.000000000000000 e+00, +0.000000000000000 e+00, +0.000000000000000 e+00, +0.000000000000000 e+00, +0.000000000000000 e+00, +0.000000000000000 e+00, +0.000000000000000 e+00, +0.000000000000000 e+00, +0.000000000000000 e+00, +0.000000000000000 e+00, +0.000000000000000 e+00, +0.000000000000000 e+00, +0.000000000000000 e+00, +0.000000000000000 e+00, +0.000000000000000 e+00, +0.000000000000000 e+00, +0.000000000000000 e+00, +0.000000000000000 e+00, +0.000000000000000 e+00, +0.000000000000000 e+00, +0.000000000000000 e+00, +0.000000000000000 e+00, +0.000000000000000 e+00, +0.000000000000000 e+00, +0.000000000000000 e+00, +0.000000000000000 e+00, +0.000000000000000 e+00, +0.000000000000000 e+00, +0.000000000000000 e+00, +0.000000000000000 e+00, +0.000000000000000 e+00, +0.000000000000000 e+00, +0.000000000000000 e+00, +0.000000000000000 e+00, +0.000000000000000 e+00, +0.000000000000000 e+00, +0.000000000000000 e+00, +0.000000000000000 e+00, +0.000000000000000 e+00, +0.000000000000000 e+00, +0.000000000000000 e+00, +0.000000000000000 e+00.

26. An apparatus according to claim 1, wherein the analysis windowing function is defined so as to present a first numerical differentiation between −0.01 and +0.01.

27. An apparatus according to claim 1, wherein the analysis windowing function is defined so as to present a second numerical differentiation between $-10^{-4}$ and $+10^{-4}$.

28. An apparatus according to claim 1, wherein the analysis windowing function is defined so as to present a third numerical differentiation between $-10^{-5}$ and $+10^{-5}$.

29. A method for encoding an audio signal comprising a plurality of frames, the method using a processor configured to execute a modulated lapped transform tool, an arithmetic coder, a bitstream writer, a resampling tool, and a long term post filtering tool (LTPF), and a storage space to store values of an analysis windowing function, the method comprising:

performing, by the modulated lapped transform tool, a modified cosine transformation (MDCT) analysis for transforming a time domain (TD) representation of the audio signal, or a processed version thereof, into a frequency domain (FD) representation, using the analysis windowing function comprising a meandering portion which passes a linear function in correspondence of at least four points; and performing, by the arithmetic coder, an arithmetic coding of the FD representation of the audio signal, or a processed version of the FD representation of the audio signal, to output a compressed version of the FD representation of the audio signal;

writing, by the bitstream writer, the compressed version of the FD representation of the audio signal, or a processed version thereof, onto a bitstream; and downsampling, by the resampling tool, the TD representation of the audio signal to obtain a downsampled TD representation of the audio signal, receiving, by the LTPF tool, the downsampled TD representation of the audio signal, and an output of the LTPF tool being provided to the bitstream writer to be written in the bitstream, transmitting, by a transmitter, the bitstream, wherein the analysis windowing function is defined so as to be asymmetric, wherein the analysis windowing function is defined so as to be, in the meandering portion:

greater than the linear function in a first interval between a first crossing point and a second crossing point;

lower than the linear function in a second interval between the second crossing point and a third crossing point; and greater than the linear function in a third interval between the third crossing point and a fourth crossing point, wherein the analysis windowing function is defined so that an absolute maximum value is in one of the first and third intervals, and wherein the linear function is a constant function with constant value 1, wherein the method further comprises:

storing, by the storage space, the values of the analysis windowing function in a first memory location of the storage space;

storing, by the storage space, time input buffers and/or cosine or sine values in a second memory location of the storage space;

scaling, by the modulated lapped transform tool, the time input buffers and/or cosine or sine values with respect to the values of the analysis windowing function.

30. A non-transitory digital storage medium having a computer program stored thereon to perform, when the computer program is run by a computer, a method for encoding an audio signal comprising a plurality of frames, the method using a processor configured to execute a modulated lapped transform tool, an arithmetic coder, a bitstream writer, a resampling tool, and a long term post filtering tool (LTPF), and a storage space to store values of an analysis windowing function, the method comprising:

performing, by the modulated lapped transform tool, a modified cosine transformation (MDCT) analysis for transforming a time domain (TD) representation of the audio signal, or a processed version thereof, into a frequency domain (FD) representation, using the analysis windowing function comprising a meandering portion which passes a linear function in correspondence of at least four points; and performing, by the arithmetic coder, an arithmetic coding of the FD representation of the audio signal, or a processed version of the FD representation of the audio signal, to output a compressed version of the FD representation of the audio signal;

writing, by the bitstream writer, the compressed version of the FD representation of the audio signal, or a processed version thereof, onto a bitstream; and downsampling, by the resampling tool, the TD representation of the audio signal to obtain a downsampled TD representation of the audio signal, receiving, by the LTPF tool, the downsampled TD representation of the audio signal, and an output of the LTPF tool being provided to the bitstream writer to be written in the bitstream, transmitting, by a transmitter, the bitstream, wherein the analysis windowing function is defined so as to be asymmetric, wherein the analysis windowing function is defined so as to be, in the meandering portion:

greater than the linear function in a first interval between a first crossing point and a second crossing point;

lower than the linear function in a second interval between the second crossing point and a third crossing point; and greater than the linear function in a third interval between the third crossing point and a fourth crossing point, wherein the analysis windowing function is defined so that an absolute maximum value is in one of the first and third intervals, and wherein the linear function is a constant function with constant value 1, wherein the method further comprises:

storing, by the storage space, the values of the analysis windowing function in a first memory location of the storage space;

storing, by the storage space, time input buffers and/or cosine or sine values in a second memory location of the storage space;

scaling, by the modulated lapped transform tool, the time input buffers and/or cosine or sine values with respect to the values of the analysis windowing function.

31. The apparatus of claim 1, further comprising a spectral noise shaping (SNS) tool, downstream to the modulated lapped transform tool and upstream to the arithmetic coder, to provide the processed version of the FD representation of the audio signal, to thereby provide coefficients to the bitstream writer so that the coefficients are included in the bitstream.

32. The apparatus of claim 1, further comprising a temporal noise shaping (TNS) tool, to control a temporal shape of noise within each window of an information signal output by the modulated lapped transform tool, or a processed version thereof.

* * * * *